(12) United States Patent
Schneider et al.

(10) Patent No.: US 10,193,736 B2
(45) Date of Patent: Jan. 29, 2019

(54) CODING AND MODULATION APPARATUS USING NON-UNIFORM CONSTELLATION AND DIFFERENT PHY MODES

(71) Applicant: Sony Corporation, Tokyo (JP)

(72) Inventors: Daniel Schneider, Stuttgart (DE);
Nabil Sven Loghin, Stuttgart (DE);
Lothar Stadelmeier, Stuttgart (DE);
Thomas Handte, Stuttgart (DE)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/564,993

(22) PCT Filed: Apr. 14, 2016

(86) PCT No.: PCT/EP2016/058175
§ 371 (c)(1),
(2) Date: Oct. 6, 2017

(87) PCT Pub. No.: WO2016/166188
PCT Pub. Date: Oct. 20, 2016

(65) Prior Publication Data
US 2018/0102933 A1 Apr. 12, 2018

(30) Foreign Application Priority Data

Apr. 14, 2015 (EP) .................................... 15163465

(51) Int. Cl.
*H04L 5/00* (2006.01)
*H04L 27/34* (2006.01)
*H04L 1/00* (2006.01)

(52) U.S. Cl.
CPC ........ *H04L 27/3444* (2013.01); *H04L 1/0003* (2013.01); *H04L 1/0057* (2013.01); *H04L 27/3405* (2013.01); *H04L 5/0007* (2013.01)

(58) Field of Classification Search
CPC . H04L 27/3444; H04L 1/0003; H04L 1/0057; H04L 27/3405; H04L 5/0007
See application file for complete search history.

(56) References Cited

PUBLICATIONS

Daniel Schneider, "Non-Uniform Constellations for Higher Order QAMs; 11-15-0096-01-ng60-non-uniform-constellations-for-higher-order-qams," IEEE Draft, IEEE-SA Mentor, XP068082636, vol. 802.11 NG60, No. 1, Jan. 12, 2015, (10 pages).
Catherine Douillard, et al., "The Bit Interleaved Coded Modulation Module for DVB-NGH Enhanced features for mobile reception," IEEE 2012 19th International Conference on Telecommunications, XP032188384, Apr. 23, 2012, (6 pages).

(Continued)

*Primary Examiner* — Janice N Tieu
(74) *Attorney, Agent, or Firm* — Xsensus LLP

(57) ABSTRACT

A coding and modulation apparatus and method are presented, particularly for use in a system according to IEEE 802.11. The apparatus comprises an encoder configured to encode input data into cell words according to a low density parity check code, LDPC, and a modulator configured to modulate said cell words into constellation values of a non-uniform constellation and to assign bit combinations to constellation values of the used non-uniform constellation, wherein said modulator is configured to use, based on the PHY mode, the total number M of constellation points of the constellation and the code rate, a particular non-uniform constellation.

18 Claims, 4 Drawing Sheets

(56) References Cited

PUBLICATIONS

P. Pedrosa, et al., "Iterative Frequency Domain Equalization and Carrier Synchronization for Multi-Resolution Constellations," IEEE Transactions on Broadcasting, XP013318885, vol. 56, No. 4, Dec. 2010, pp. 551-557.
Nabil Loghin, et al., "High Order Non-Uniform Constellations," Digital Video Broadcasting, TM_MIM0xxxx_h i gh_order_nuc_sony_tubs.pdf, XP017844570, Jun. 9, 2014, (57 pages).
International Search Report dated Jul. 21, 2016 in PCT/EP2016/058175 filed Apr. 14, 2016.

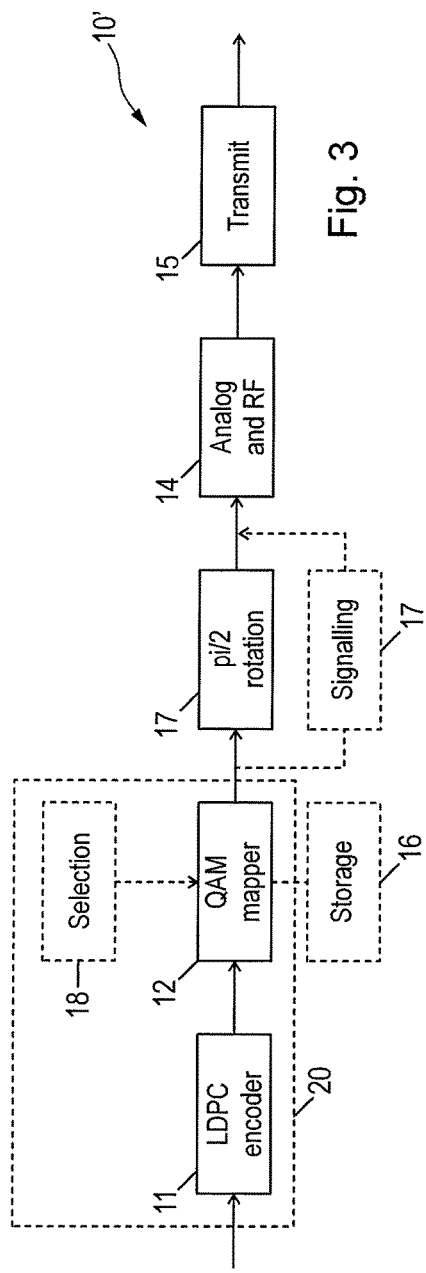
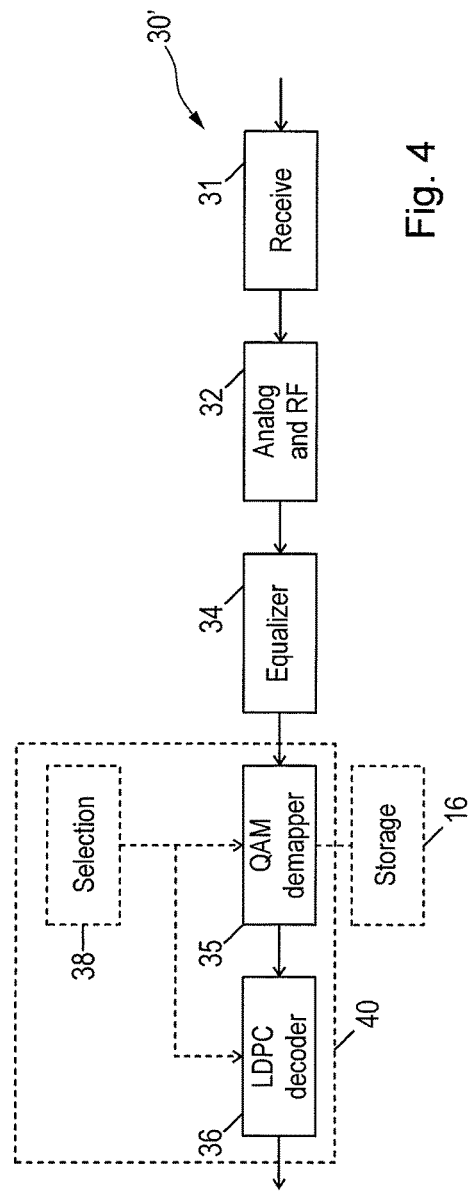
Fig. 3
Fig. 4

CODING AND MODULATION APPARATUS USING NON-UNIFORM CONSTELLATION AND DIFFERENT PHY MODES

PRIORITY INFORMATION

The present application claims priority to European Patent Application 15163465.6, filed in the European Patent Office on Apr. 14, 2015, the entire contents of which is incorporated herein by reference.

BACKGROUND

Field of the Disclosure

The present disclosure relates to a coding and modulation apparatus and method as well as a demodulation and decoding apparatus and method. Further, the present disclosure relates to a transmission apparatus and method as well as a receiving apparatus and method. Still further, the present disclosure relates to a computer program and a non-transitory computer-readable recording medium.

Description of Related Art

Modern communications systems typically employ, among other elements, a coding and modulation apparatus (as part of a transmission apparatus) and a decoding and demodulation apparatus (as part of a receiving apparatus). The coding and modulation apparatus is often part of a so called BICM (Bit Interleaved Coded Modulation) apparatus, which generally comprises (at the transmitter side) a serial concatenation of a FEC (Forward Error Correction) encoder, a bit interleaver, and a modulator, which uses spectral efficient modulation such as BPSK (Binary Phase Shift Keying), QPSK (Quaternary Phase Shift Keying), or QAM (Quadrature Amplitude Modulation).

BICM allows for good performance due to the use of the interleaver and/or the FEC encoder. It has a reasonable decoding complexity as opposed to multilevel coding (MLC) coding schemes and is thus used frequently in communications systems, such as in all DVB systems (e.g. DVB-S2x), powerline communications (e.g., Homeplug AV), DAB, LTE, WiFi (IEEE 802.11), ATSC 3.0, etc. The first generation of 60 GHz WLAN is specified in IEEE 802.11ad. Systems in accordance with IEEE 802.11ad use uniform constellations. Several Modulation and Coding Schemes (MCSs) are defined. Currently, there is a study group which investigates possible technologies for the next generation of the specification which will likely be called 802.11ay.

Generally, the coding and modulation capacity, such as the BICM capacity in systems using a BICM apparatus, is considered as a target function, and it is desired to find optimum constellation points such that this capacity is maximized, often subject to a power normalization, i.e., the average power of the constellation points should be normalized to e.g. 1.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admitted as prior art against the present disclosure.

SUMMARY

It is an object to provide a coding and modulation apparatus and method providing an increased or even maximized coding and modulation capacity and a reduced bit error rate and reception with a reduced required SNR (signal-to-noise ratio). It is a further object to provide a demodulation and decoding apparatus and method as well as a corresponding computer program for implementing said methods and a non-transitory computer-readable recording medium for implementing said methods.

According to an aspect there is provided a coding and modulation apparatus comprising
an encoder configured to encode input data into cell words according to a low density parity check code, LDPC, and
a modulator configured to modulate said cell words into constellation values of a non-uniform constellation and to assign bit combinations to constellation values of the used non-uniform constellation,
wherein said modulator is configured to use, based on the PHY mode, the total number M of constellation points of the constellation and the code rate, one of the non-uniform constellations as defined in claim 1.

According to a further aspect there is provided a transmission apparatus comprising
a coding and modulation apparatus as claimed in claim 1 configured to encode and modulate input data into constellation values,
a converter configured to convert said constellation values into one or more transmission streams to be transmitted, and
a transmitter configured to transmit said one or more transmission streams.

According to another aspect there is provided a demodulation and decoding apparatus comprising
a demodulator configured to demodulate constellation values of a non-uniform constellation into cell words and to assign bit combinations to constellation values of the used non-uniform constellation, and
a decoder configured to decode cell words into output data according to a low density parity check code, LDPC,
wherein said demodulator is configured to use, based on the PHY mode, the total number M of constellation points of the constellation and the code rate, one of the non-uniform constellations as defined in claim 15.

According to a further aspect there is provided a receiving apparatus comprising
receiving one or more transmission streams,
deconverting one or more transmission streams into said constellation values, and
demodulating and decoding said constellation values into output data according to a method as claimed in claim 16.

According to still further aspects corresponding methods, a computer program comprising program means for causing a computer to carry out the steps of the methods disclosed herein, when said computer program is carried out on a computer, as well as a non-transitory computer-readable recording medium that stores therein a computer program product, which, when executed by a processor, causes the methods disclosed herein to be performed are provided.

Preferred embodiments are defined in the dependent claims. It shall be understood that the claimed methods, the claimed computer program and the claimed computer-readable recording medium have similar and/or identical preferred embodiments as the claimed apparatus and as defined in the dependent claims.

One of the aspects of the disclosure is that the constellation points of the used constellations, called non-uniform constellations, are not located on a regular grid with equidistant symbols, but rather on optimized locations, dependent on the channel conditions between the transmission apparatus and a receiving apparatus with which the transmission apparatus wants to communicate (e.g. in a WiFi network). Further, the used constellation is selected (preferably in advance, but generally on the fly in other embodiments) dependent on the code rate and the desired total number of constellation points of the used constellation. The code rate and total number of constellation points (also referred to as "modulation order") depends among other parameters on the channel quality, such as signal-to-noise ratio. A method how to find and optimize these non-uniform constellations (in the following called NUCs) will be explained below. Further, for the proposed non-uniform constellations an optimized bit labelling (i.e. an optimized assignment of bit combinations to constellation values of the used non-uniform constellation) is proposed.

Depending on the capabilities of the transmission apparatus and the receiving apparatus, the transmission apparatus, in an embodiment, is able to select between the use of OFDM or single carrier (SC) mode as PHY (physical layer) mode. The SC mode is simpler and more suited for good channel conditions with mainly line of sight. The OFDM mode usually provides increased performance especially for multi-path channel conditions. The PHY mode may be one criterion for selecting the constellation used by the modulator. In other embodiment the SC mode may be the default mode, but OFDM mode may be optionally used, particularly if both the transmitting apparatus and the receiving apparatus support OFDM, i.e. in this case the transmission apparatus can choose to transmit in OFDM mode. Hence, also apparatus and methods not supporting OFDM may make use of the proposed teaching, even if the use SC mode as PHY mode and if they make use of one of the non-uniform constellations disclosed herein for use with SC mode.

In the tables various constellations are provided for different values of M, for different code rates and for different PHY modes. It should be noted that the code rate R indicated in the tables are not to be understood such that a particular constellation is only valid for exactly this code rate, but also for slightly different code rates. The code rate as indicated in the modulation and coding scheme (MCS) index might differ from the true code rate of the system, e.g. because of padding and other constraints related to the frame structure.

It should also be noted that one or more of the following "invariant transformations" do not affect the properties of the constellations:
1. rotation of all symbols by an arbitrary angle $\varphi$,
2. inversion of m-th bit $y\_m = b \in \{0,1\}$ to $y\_m = \bar{b}$, where the bar indicates inversion,
3. interchanging of bit positions $y\_k1$ and $y\_k2$,
4. reflection on $Re\{x1\}$- and/or $Im\{x1\}$-axis,
5. predistortion,
6. mirroring on any line in the complex plane.

Thus, the modulator may also use a non-uniform constellation obtained from a constellation from anyone of groups A or B through rotation by an angle around the origin, an inversion of bit labels for all constellation points, an interchanging of bit positions for all constellation points and/or a reflection on the real part and/or imaginary part axis. For instance, if one constellation point has bit labels 0010 for 16-QAM, all first bit labels can be inverted such that this point becomes 1010. Further, constellation obtained through any other trivial manipulation, such as rounding of the constellation points' positions shall generally be covered by the claims. Through one or more of these operations an equivalent mapping to the mapping of the constellations defined in the above mentioned groups is achieved.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 3 shows a schematic diagram of an embodiment of a transmission apparatus according to the present disclosure using single carrier mode as PHY mode, FIG. 4 shows a schematic diagram of an embodiment of a receiving apparatus according to the present disclosure using single carrier mode as PHY mode.

DESCRIPTION OF THE EMBODIMENTS

Figure 1:
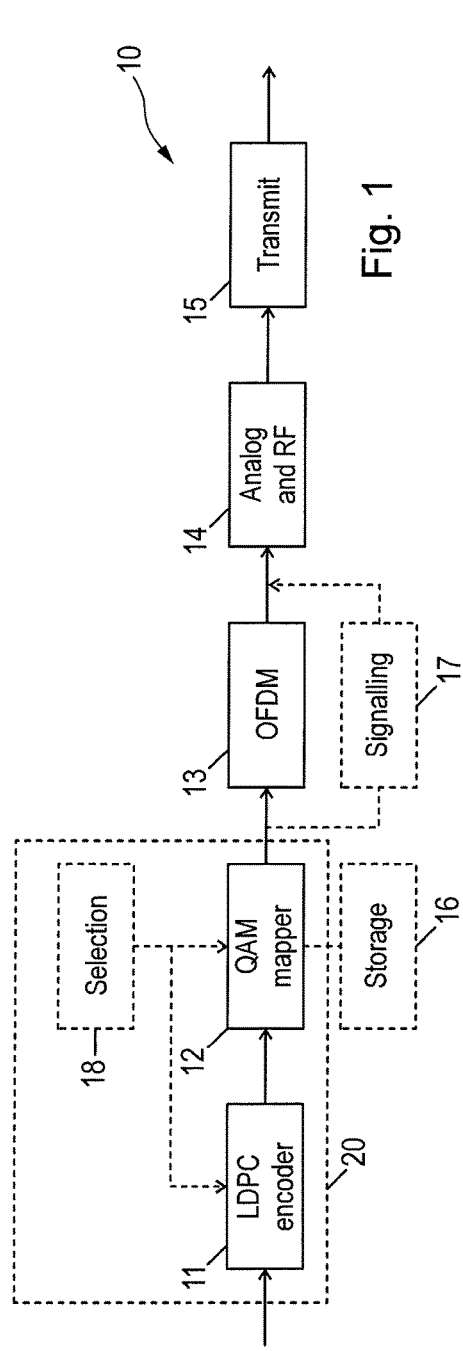
FIG. 1 shows a schematic diagram of an embodiment of a transmission apparatus according to the present disclosure using OFDM as PHY mode.

IEEE 802.11ad supports two different PHY modes: Orthogonal Frequency Division Multiplex (OFDM) mode (similar to "classical" WLAN operating in the frequency ranges of 2.4 GHz and 5 GHz) and single carrier (SC) mode. Referring now to the drawings, wherein like reference numerals designate identical or corresponding parts throughout the several views, FIGS. 1 and 2 illustrate a first embodiment for OFDM mode and FIGS. 3 and 4 illustrate a second embodiment for SC mode.

Figure 2:
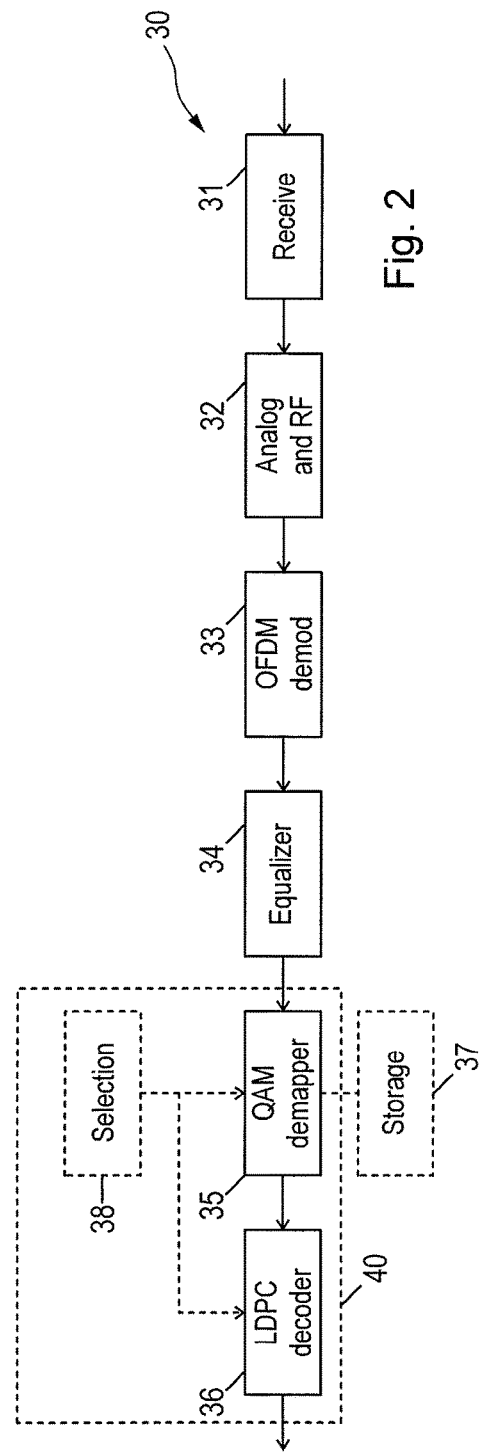
FIG. 2 shows a schematic diagram of an embodiment of a receiving apparatus according to the present disclosure using OFDM as PHY mode.

FIG. 1 shows an embodiment of a transmission apparatus 10 according to the present disclosure including an embodiment of a coding and modulation apparatus 20 according to the present disclosure for use with OFDM as PHY mode. The transmission apparatus 10 comprises an FEC (forward error correction) encoder 11 for encoding the input data by use of an LDPC (low density parity check) code. The code rate may depend on the MCS (modulation and coding scheme) index, which is generally predetermined or selected.

The transmission apparatus 10 further comprises a constellation mapper 12 (generally also called modulator), in particular a QAM (quadrature amplitude modulation) mapper, that maps the encoded bits of the input data to complex symbols (also called constellation points) in a constellation, in particular a QAM constellation. The modulation order (i.e. the number M of constellations points of the constellation) may also depend on the MCS index.

The transmission apparatus 10 further comprises an OFDM unit 13 for OFDM modulation, an RF processing unit 14 for RF processing like frequency up-conversion, power amplifier, transmit filters, digital-to-analog conversion, etc., and a transmit unit 15 for transmitting the finally obtained signals over a channel to a receiving apparatus. In other embodiments of the transmission apparatus 10 additional elements may be provided, such as an input processing unit and/or a frame building unit, or other elements as e.g. conventionally used in a transmission apparatus of a system in accordance with IEEE 802.11ad.

The FEC encoder 11, and the constellation mapper (modulator) 12 are often summarized as BICM (bit-interleaved coded modulation) apparatus and represent the coding and modulation apparatus 20 according to the present disclosure. The FEC encoder 11 generally encodes input data into cell words according to an LDPC code. The modulator 12 generally modulates said cell words into constellation values of a non-uniform constellation and assigns bit combinations to constellation values of the used non-uniform constellation. Generally, the output of the FEC encoder 11 is referred to as a codeword (e.g. a couple of hundred bits), which are then divided into "tuples" (of e.g. 4 bits in case of 16-QAM), referred to also as cell words (of the codeword). These tuples (cell words) are then assigned to the constellations points by the modulator 12.

Based on the PHY mode (OFDM in this embodiment), the total number M of constellation points of the constellation (i.e. the modulation order) and the code rate, one of a selection of non-uniform constellations of different groups is used. Details of those different groups of constellations will be explained in more detail below. The constellations and the constellations values are generally predetermined and e.g. stored in a constellations storage 16 or retrieved from an external source. The MCS parameters may also be stored in the constellations storage 16 or the external source.

FIG. 2 shows an embodiment of a corresponding receiving apparatus 30 according to the present disclosure including an embodiment of a decoding and demodulation apparatus 40 according to the present disclosure for use with OFDM as PHY mode. Basically, the same blocks of the transmitter apparatus are reversed. After reception by a receiving unit 31, RF processing like frequency down-conversion, receive filtering, analog-to-digital conversion, etc. is performed by an RF unit 32 and OFDM demodulation is performed by an OFDM demodulator 33. An equalizer 34 reverses the effect of channel distortions and forwards the equalized QAM symbols to the QAM demapper 35 (also called demodulator) for QAM demapping. Finally, LDPC decoding is performed in a FEC decoder 36. In other embodiments of the receiving apparatus 30 additional elements may be provided, such as an output processing unit and/or a deframing unit, or other elements as e.g. conventionally used in a receiving apparatus of a system in accordance with IEEE 802.11ad.

The QAM demapper 35 (demodulator) and the FEC decoder 36 are often summarized as BICM demodulation apparatus and represent the decoding and demodulation apparatus 40 according to the present disclosure. The demodulator 35 generally demodulates received constellation values of a non-uniform constellation into cell words, whereby bit combinations are assigned to constellation values of the used non-uniform constellation. Based on a signalling information included in the received data the receiving apparatus 30 knows which one of a selection of non-uniform constellations of different groups has been used by the transmission apparatus 10 so that the receiving apparatus 30 can use the same non-uniform constellation for demodulation. The FEC decoder 36 generally decodes the cell words according to the used PHY mode into output words. Also in the receiving apparatus 30 the constellations and the constellations values may be stored in a constellations storage 37 or retrieved from an external source.

The preferred demodulation and decoding considers soft values as opposed to hard decided values (0 and 1). Soft values represent the continuously distributed received values (possibly after A/D conversion including quantization) by more than two states (as in the case of binary (hard) decision). The reason is that for hard decision, the non-uniform constellations are generally not optimal. Nowadays, BICM receivers typically are soft receivers anyway.

FIG. 3 shows another embodiment of a transmission apparatus 10' according to the present disclosure for use with SC as PHY mode. Differently from the transmission apparatus 10 shown in FIG. 1, the transmission apparatus 10' comprises a pi/2 rotation unit 17 that introduces a pi/2 rotation, which improves the RF properties of the transmit signal. The pi/2 rotation has no influence on the BICM performance and is therefore generally not relevant to the NUC performance and optimization. Further, no OFDM unit is provided.

FIG. 4 shows an embodiment of a corresponding receiving apparatus 30' according to the present disclosure for use with SC as PHY mode. Differently from the receiving apparatus 30 shown in FIG. 2, the receiving apparatus 30' just omits the OFDM demodulation unit 33.

Figure 5:
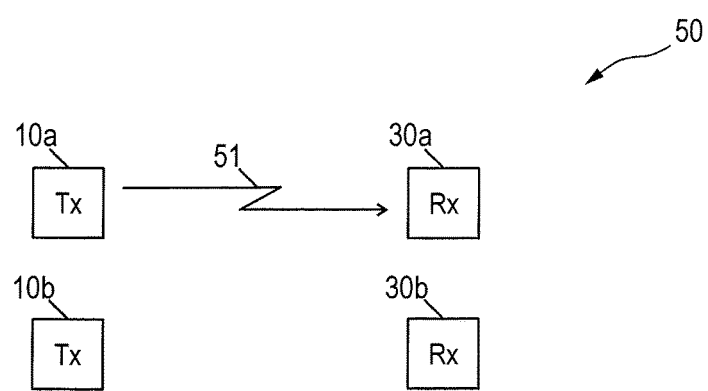
FIG. 5 shows a schematic diagram of an embodiment of a communications system according to the present disclosure.

FIG. 5 shows an embodiment of a communications system 50 according to the present disclosure comprising one (or more) transmission apparatus 10a, 10b (Tx), which—depending on the used PHY mode—may either be transmission apparatus 10 as shown in FIG. 1 or transmission apparatus 10' as shown in FIG. 3, and one or more receiving apparatus 30a, 30b (Rx), which—depending on the used PHY mode—may either be receiving apparatus 30 as shown in FIG. 2 or receiving apparatus 30' as shown in FIG. 4. As an example, the transmission apparatus 10a, which may be a WiFi access point or WiFi router, communicates with a receiving apparatus 30a, which may be a user device like a smartphone, laptop or tablet, via a bi-directional communication channel 51, for instance to provide access to the internet to the receiving apparatus 30a. Both the transmission apparatus 10a, 10b and the receiving apparatus 30a, 30b may use the ideas of the present disclosure in said communication session.

Today's systems in accordance with IEEE 802.11ad (WLAN, WiFi) generally use uniform constellations. Several Modulation and Coding Schemes (MCSs) are defined for use in such systems. According to the present disclosure, non-uniform constellations and their bit labelling are proposed, which are optimized with respect to coding and modulation capacity and which may be used in systems in accordance with IEEE 802.11, particularly in accordance with versions like IEEE 802.11ad or upcoming versions such as IEEE 802.11ay.

The parameters of the basic MCSs for a transmitting apparatus are given in IEEE 802.11ad. The MCS index as described above defines the PHY mode, the QAM modulation order (indicating the value of M) and the used code rate R. The receiver needs to know which MCS index (or, alternatively, which PHY mode, modulation order and code rate R) is used at transmitter side for correct decoding. The transmission apparatus therefore signals the used MCS index (or, alternatively, which PHY mode, modulation order and code rate R). This signalling may be done at the beginning of each transmitted frame. For instance, this signalling information may be carried at the beginning of the frame in a special signal field. An example of a field which may be used is the HEADER field. For inserting such signalling information a signalling unit 17 may be provided in the transmission apparatus 10, 10'.

In case of OFDM as PHY mode, the signalling information is typically carried within a small number (in particular 1 or 2) of OFDM symbols of the Header. This small number of signalling OFDM symbols follows short and long training symbols which form the beginning of each frame (the training symbols and signalling symbols are typically called preamble). In case of SC as PHY mode, the signalling information is typically carried in the Header.

The transmission apparatus 10, 10' may optionally comprise a selection unit 18, shown with dashed lines in FIGS. 1 and 3, which selects the MCS index (or the respective parameters indicated by the MCS index) depending on the channel conditions to the receiving apparatus 30, 30'. For bad channel conditions a small MCS index is selected (lower throughput but also smaller error probability), for good channel conditions a higher MCS index is selected (higher throughput but also more prone to bit errors).

In other embodiments no such selection unit 18 is provided, but the transmission apparatus 10, 10' uses only SC mode as PHY mode and uses one of the disclosed non-uniform constellations for SC mode. This is particularly true if the transmission apparatus and the receiving apparatus do not support OFDM.

The PHY mode generally affects if the OFDM unit 13 or the pi/2 rotation unit 17 is used in the transmission apparatus. In the receiving apparatus it defines if the OFDM demodulator 33 is used/bypassed or not.

The receiving apparatus 30, 30' may optionally comprise a selection unit 38 as well, shown with dashed lines in FIGS. 2 and 4, which selects the MCS index (or the respective parameters indicated by the MCS index) depending on the signalling information signalled by the transmission apparatus 10, 10'.

According to the present disclosure a NUC is proposed for each MCS index separately for OFDM and SC as PHY mode. In particular for MCS index 10-12 and 18-24 of IEEE 802.11ad such NUCs are proposed. Additionally, NUCs are proposed for OFDM with 128-QAM and 256-QAM as well as for SC with 32-QAM, 64-QAM, 128-QAM and 256-QAM, for which no MCS index has been defined (yet) but which may particularly be used in systems in accordance with IEEE 802.11ad or IEEE 802.11ay.

According to the present disclosure the modulator 12 is configured to use, based on the PHY mode, the total number M of constellation points of the constellation and the code rate a predetermined non-uniform constellation and bit labeling. The selection unit 18 may be configured to select the total number M of constellation points of the constellation and the code rate based on channel conditions between a transmission apparatus including said coding and modulation apparatus and a receiving apparatus with which said transmission apparatus seeks to communicate. Preferably, the selection unit 18 selects a constellation with a higher number of M and/or a higher code rate the better the channel conditions are.

If OFDM is used as PHY mode and if M=16, 64, 128 or 256, a non-uniform constellation and bit labeling is used from a group A, the group A comprising constellations as defined in sub-group A1 for 16-QAM with M=16 and code rates of 1/2, 5/8, 3/4 or 13/16, sub-group A2 for 64-QAM with M=64 and code rates of 5/8, 3/4 or 13/16, sub-group A3 for 128-QAM with M=128 and code rates of 1/2, 5/8, 3/4 or 13/16, and sub-group A4 for 256-QAM with M=256 and code rates of 1/2, 5/8, 3/4 or 13/16, wherein the constellation points are defined by a constellation position vector $w_0 \ldots w_{M-1}$ and wherein the constellation position vectors of the different constellations are defined as follows:

A) M-QAM non-uniform constellations of group A for OFDM as PHY mode:

A1) 16-QAM NUC

| w | bit label | R = 1/2 (MCS = 18) (or R = 5/8, 3/4 or 13/16) | R = 5/8 (MCS = 19) (or R = 1/2, 3/4 or 13/16) | R = 3/4 (MCS = 20) (or R = 5/8, 1/2 or 13/16) | R = 13/16 (MCS = 21) (or R = 1/2, 5/8 or 3/4) |
|---|---|---|---|---|---|
| w0 | 0000 | +0.4925 + 1.2040i | +0.2173 + 0.4189i | +0.2976 − 0.2976i | +0.3018 − 0.3018i |
| w1 | 0001 | +0.2530 + 0.4936i | +0.6578 + 0.2571i | +0.2976 − 0.9547i | −0.3018 − 0.3018i |
| w2 | 0010 | +0.4925 − 1.2040i | +0.4326 + 1.1445i | −0.2976 − 0.2976i | +0.3018 − 0.9534i |
| w3 | 0011 | +0.2530 − 0.4936i | +1.2088 + 0.5659i | −0.2976 − 0.9547i | −0.3018 − 0.9534i |
| w4 | 0100 | +1.2040 + 0.4925i | +0.2173 − 0.4189i | +0.9547 − 0.2976i | +0.3018 + 0.3018i |
| w5 | 0101 | +0.4936 + 0.2530i | +0.6578 − 0.2571i | +0.9547 − 0.9547i | −0.3018 + 0.3018i |
| w6 | 0110 | +1.2040 − 0.4925i | +0.4326 − 1.1445i | −0.9547 − 0.2976i | +0.3018 + 0.9534i |
| w7 | 0111 | +0.4936 − 0.2530i | +1.2088 − 0.5659i | −0.9547 − 0.9547i | −0.3018 + 0.9534i |
| w8 | 1000 | −0.4925 + 1.2040i | −0.2173 + 0.4189i | +0.2976 + 0.2976i | +0.9534 − 0.3018i |
| w9 | 1001 | −0.2530 + 0.4936i | −0.6578 + 0.2571i | +0.2976 + 0.9547i | −0.9534 − 0.3018i |
| w10 | 1010 | −0.4925 − 1.2040i | −0.4326 + 1.1445i | −0.2976 + 0.2976i | +0.9534 − 0.9534i |
| w11 | 1011 | −0.2530 − 0.4936i | −1.2088 + 0.5659i | −0.2976 + 0.9547i | −0.9534 − 0.9534i |
| w12 | 1100 | −1.2040 + 0.4925i | −0.2173 − 0.4189i | +0.9547 + 0.2976i | +0.9534 + 0.3018i |
| w13 | 1101 | −0.4936 + 0.2530i | −0.6578 − 0.2571i | +0.9547 + 0.9547i | −0.9534 + 0.3018i |
| w14 | 1110 | −1.2040 − 0.4925i | −0.4326 − 1.1445i | −0.9547 + 0.2976i | +0.9534 + 0.9534i |
| w15 | 1111 | −0.4936 − 0.2530i | −1.2088 − 0.5659i | −0.9547 + 0.9547i | −0.9534 + 0.9534i |

A2) 64-QAM NUC

| w/MCS index | bit label | R = 5/8 (MCS = 22) (or R = 3/4 or 13/16) | R = 3/4 (MCS = 23) (or R = 5/8 or 13/16) | R = 13/16 (MCS = 24) (or R = 5/8 or 3/4) |
|---|---|---|---|---|
| w0 | 000000 | +1.4730 + 0.3019i | +1.0501 − 0.1676i | +1.0414 − 0.1712i |
| w1 | 000001 | +1.2124 + 0.8333i | +1.4380 − 0.2294i | −1.0414 − 0.1712i |
| w2 | 000010 | −1.4730 + 0.3019i | +0.7233 − 0.1496i | +1.0414 + 0.1712i |

-continued

| w/MCS index | bit label | R = 5/8 (MCS = 22) (or R = 3/4 or 13/16) | R = 3/4 (MCS = 23) (or R = 5/8 or 13/16) | R = 13/16 (MCS = 24) (or R = 5/8 or 3/4) |
|---|---|---|---|---|
| w3 | 000011 | −1.2124 + 0.8333i | +0.6220 − 1.1896i | −1.0414 + 0.1712i |
| w4 | 000100 | +1.4730 − 0.3019i | −1.0501 − 0.1676i | +1.4058 + 0.2115i |
| w5 | 000101 | +1.2124 − 0.8333i | −1.4380 − 0.2294i | −1.4058 − 0.2115i |
| w6 | 000110 | −1.4730 − 0.3019i | −0.7233 − 0.1496i | +1.4058 + 0.2115i |
| w7 | 000111 | −1.2124 − 0.8333i | −0.6220 − 1.1896i | −1.4058 + 0.2115i |
| w8 | 001000 | +1.0895 + 0.2172i | +0.1398 − 0.1309i | +0.1414 − 0.1379i |
| w9 | 001001 | +0.8988 + 0.5768i | +0.1680 − 1.0338i | −0.1414 − 0.1379i |
| w10 | 001010 | −1.0895 + 0.2172i | +0.4246 − 0.1370i | +0.1414 − 0.1379i |
| w11 | 001011 | −0.8988 + 0.5768i | +0.2326 − 1.3986i | −0.1414 − 0.1379i |
| w12 | 001100 | +1.0895 − 0.2172i | −0.1398 − 0.1309i | +0.1695 − 1.0298i |
| w13 | 001101 | +0.8988 − 0.5768i | −0.1680 − 1.0338i | −0.1695 − 1.0298i |
| w14 | 001110 | −1.0895 − 0.2172i | −0.4246 − 0.1370i | +0.1695 − 1.0298i |
| w15 | 001111 | −0.8988 − 0.5768i | −0.2326 − 1.3986i | −0.1695 + 1.0298i |
| w16 | 010000 | +0.2775 + 1.4188i | +1.0501 + 0.1676i | +0.7230 − 0.1517i |
| w17 | 010001 | +0.7921 + 1.2096i | +1.4380 + 0.2294i | −0.7230 − 0.1517i |
| w18 | 010010 | −0.2775 + 1.4188i | +0.7233 + 0.1496i | +0.7230 − 0.1517i |
| w19 | 010011 | −0.7921 + 1.2096i | +0.6220 + 1.1896i | −0.7230 − 0.1517i |
| w20 | 010100 | +0.2775 − 1.4188i | −1.0501 + 0.1676i | +0.5981 − 1.1597i |
| w21 | 010101 | +0.7921 − 1.2096i | −1.4380 + 0.2294i | −0.5981 − 1.1597i |
| w22 | 010110 | −0.2775 − 1.4188i | −0.7233 + 0.1496i | +0.5981 − 1.1597i |
| w23 | 010111 | −0.7921 − 1.2096i | −0.6220 + 1.1896i | −0.5981 − 1.1597i |
| w24 | 011000 | +0.2177 + 1.0243i | +0.1398 + 0.1309i | +0.4272 − 0.1421i |
| w25 | 011001 | +0.6056 + 0.8481i | +0.1680 + 1.0338i | −0.4272 − 0.1421i |
| w26 | 011010 | −0.2177 + 1.0243i | +0.4246 + 0.1370i | +0.4272 − 0.1421i |
| w27 | 011011 | −0.6056 + 0.8481i | +0.2326 + 1.3986i | −0.4272 − 0.1421i |
| w28 | 011100 | +0.2177 − 1.0243i | −0.1398 + 0.1309i | +0.2236 − 1.3784i |
| w29 | 011101 | +0.6056 − 0.8481i | −0.1680 + 1.0338i | −0.2236 − 1.3784i |
| w30 | 011110 | −0.2177 − 1.0243i | −0.4246 + 0.1370i | +0.2236 + 1.3784i |
| w31 | 011111 | −0.6056 − 0.8481i | −0.2326 + 1.3986i | −0.2236 + 1.3784i |
| w32 | 100000 | +0.1419 + 0.1122i | +1.0725 − 0.5328i | +1.0997 − 0.5419i |
| w33 | 100001 | +0.3733 + 0.1498i | +1.0771 − 0.9315i | −1.0997 − 0.5419i |
| w34 | 100010 | −0.1419 + 0.1122i | +0.7267 − 0.4592i | +1.0997 − 0.5419i |
| w35 | 100011 | −0.3733 + 0.1498i | +0.6956 − 0.8095i | −1.0997 − 0.5419i |
| w36 | 100100 | +0.1419 − 0.1122i | −1.0725 − 0.5328i | +1.0691 − 0.9443i |
| w37 | 100101 | +0.3733 − 0.1498i | −1.0771 − 0.9315i | −1.0691 − 0.9443i |
| w38 | 100110 | −0.1419 − 0.1122i | −0.7267 − 0.4592i | +1.0691 + 0.9443i |
| w39 | 100111 | −0.3733 − 0.1498i | −0.6956 − 0.8095i | −1.0691 + 0.9443i |
| w40 | 101000 | +0.7863 + 0.1337i | +0.1361 − 0.4023i | +0.1440 − 0.4167i |
| w41 | 101001 | +0.6394 + 0.3211i | +0.1373 − 0.7043i | −0.1440 − 0.4167i |
| w42 | 101010 | −0.7863 + 0.1337i | +0.4198 − 0.4151i | +0.1440 − 0.4167i |
| w43 | 101011 | −0.6394 + 0.3211i | +0.4114 − 0.7109i | −0.1440 − 0.4167i |
| w44 | 101100 | +0.7863 − 0.1337i | −0.1361 − 0.4023i | +0.1426 − 0.7102i |
| w45 | 101101 | +0.6394 − 0.3211i | −0.1373 − 0.7043i | −0.1426 − 0.7102i |
| w46 | 101110 | −0.7863 − 0.1337i | −0.4198 − 0.4151i | +0.1426 − 0.7102i |
| w47 | 101111 | −0.6394 − 0.3211i | −0.4114 − 0.7109i | −0.1426 − 0.7102i |
| w48 | 110000 | +0.1138 + 0.3999i | +1.0725 + 0.5328i | +0.7484 − 0.4663i |
| w49 | 110001 | +0.2891 + 0.3910i | +1.0771 + 0.9315i | −0.7484 − 0.4663i |
| w50 | 110010 | −0.1138 + 0.3999i | +0.7267 + 0.4592i | +0.7484 − 0.4663i |
| w51 | 110011 | −0.2891 + 0.3910i | +0.6956 + 0.8095i | −0.7484 − 0.4663i |
| w52 | 110100 | +0.1138 − 0.3999i | −1.0725 + 0.5328i | +0.7360 − 0.8042i |
| w53 | 110101 | +0.2891 − 0.3910i | −1.0771 + 0.9315i | −0.7360 − 0.8042i |
| w54 | 110110 | −0.1138 − 0.3999i | −0.7267 + 0.4592i | +0.7360 + 0.8042i |
| w55 | 110111 | −0.2891 − 0.3910i | −0.6956 + 0.8095i | −0.7360 + 0.8042i |
| w56 | 111000 | +0.1487 + 0.7260i | +0.1361 + 0.4023i | +0.4369 − 0.4317i |
| w57 | 111001 | +0.4397 + 0.5853i | +0.1373 + 0.7043i | −0.4369 − 0.4317i |
| w58 | 111010 | −0.1487 + 0.7260i | +0.4198 + 0.4151i | +0.4369 − 0.4317i |
| w59 | 111011 | −0.4397 + 0.5853i | +0.4114 + 0.7109i | −0.4369 − 0.4317i |
| w60 | 111100 | +0.1487 − 0.7260i | −0.1361 + 0.4023i | +0.4351 − 0.7394i |
| w61 | 111101 | +0.4397 − 0.5853i | −0.1373 + 0.7043i | −0.4351 − 0.7394i |
| w62 | 111110 | −0.1487 − 0.7260i | −0.4198 + 0.4151i | +0.4351 + 0.7394i |
| w63 | 111111 | −0.4397 − 0.5853i | −0.4114 + 0.7109i | −0.4351 + 0.7394i |

A3) 128-QAM NUC for R=1/2 (or R=5/8, 3/4 or 13/16):

| w index | bit label | Constellation point |
|---|---|---|
| w0 | 0000000 | +0.7383 − 1.3947i |
| w1 | 0000000 | +0.2726 − 1.6070i |
| w2 | 0000001 | +0.7383 + 1.3947i |
| w3 | 0000001 | +0.2726 + 1.6070i |
| w4 | 0000010 | +1.5779 − 0.2230i |
| w5 | 0000010 | +1.2114 − 0.1662i |
| w6 | 0000011 | +1.5779 + 0.2230i |
| w7 | 0000011 | +1.2114 + 0.1662i |
| w8 | 0000100 | +0.5286 − 1.0997i |
| w9 | 0000100 | +0.1915 − 1.2689i |
| w10 | 0000101 | +0.5286 + 1.0997i |
| w11 | 0000101 | +0.1915 + 1.2689i |
| w12 | 0000110 | +0.7620 − 0.1121i |
| w13 | 0000110 | +0.9103 − 0.1272i |

-continued

| w index | bit label | Constellation point |
|---|---|---|
| w14 | 0000111 | +0.7620 + 0.1121i |
| w15 | 0000111 | +0.9103 + 0.1272i |
| w16 | 0001000 | +1.0680 − 1.0753i |
| w17 | 0001000 | +1.0389 − 0.7336i |
| w18 | 0001001 | +1.0680 + 1.0753i |
| w19 | 0001001 | +1.0389 + 0.7336i |
| w20 | 0001010 | +1.4915 − 0.6927i |
| w21 | 0001010 | +1.1447 − 0.4719i |
| w22 | 0001011 | +1.4915 + 0.6927i |
| w23 | 0001011 | +1.1447 + 0.4719i |
| w24 | 0001100 | +0.6878 − 0.8578i |
| w25 | 0001100 | +0.7725 − 0.6723i |
| w26 | 0001101 | +0.6878 + 0.8578i |
| w27 | 0001101 | +0.7725 + 0.6723i |
| w28 | 0001110 | +0.7359 − 0.3230i |
| w29 | 0001110 | +0.8236 − 0.3936i |
| w30 | 0001111 | +0.7359 + 0.3230i |
| w31 | 0001111 | +0.8236 + 0.3936i |
| w32 | 0010000 | −0.7383 − 1.3947i |
| w33 | 0010000 | −0.2726 − 1.6070i |
| w34 | 0010001 | −0.7383 + 1.3947i |
| w35 | 0010001 | −0.2726 + 1.6070i |
| w36 | 0010010 | −1.5779 − 0.2230i |
| w37 | 0010010 | −1.2114 − 0.1662i |
| w38 | 0010011 | −1.5779 + 0.2230i |
| w39 | 0010011 | −1.2114 + 0.1662i |
| w40 | 0010100 | −0.5286 − 1.0997i |
| w41 | 0010100 | −0.1915 − 1.2689i |
| w42 | 0010101 | −0.5286 + 1.0997i |
| w43 | 0010101 | −0.1915 + 1.2689i |
| w44 | 0010110 | −0.7620 − 0.1121i |
| w45 | 0010110 | −0.9103 − 0.1272i |
| w46 | 0010111 | −0.7620 + 0.1121i |
| w47 | 0010111 | −0.9103 + 0.1272i |
| w48 | 0011000 | −1.0680 − 1.0753i |
| w49 | 0011000 | −1.0389 − 0.7336i |
| w50 | 0011001 | −1.0680 + 1.0753i |
| w51 | 0011001 | −1.0389 + 0.7336i |
| w52 | 0011010 | −1.4915 − 0.6927i |
| w53 | 0011010 | −1.1447 − 0.4719i |
| w54 | 0011011 | −1.4915 + 0.6927i |
| w55 | 0011011 | −1.1447 + 0.4719i |
| w56 | 0011100 | −0.6878 − 0.8578i |
| w57 | 0011100 | −0.7725 − 0.6723i |
| w58 | 0011101 | −0.6878 + 0.8578i |
| w59 | 0011101 | −0.7725 + 0.6723i |
| w60 | 0011110 | −0.7359 − 0.3230i |
| w61 | 0011110 | −0.8236 − 0.3936i |
| w62 | 0011111 | −0.7359 + 0.3230i |
| w63 | 0011111 | −0.8236 + 0.3936i |
| w64 | 01000000 | +0.1315 − 0.7332i |
| w65 | 01000001 | +0.1038 − 0.7607i |
| w66 | 01000010 | +0.1315 + 0.7332i |
| w67 | 01000011 | +0.1038 + 0.7607i |
| w68 | 01000100 | +0.1461 − 0.1146i |
| w69 | 01000101 | +0.1573 − 0.1142i |
| w70 | 01000110 | +0.1461 + 0.1146i |
| w71 | 01000111 | +0.1573 + 0.1142i |
| w72 | 01001000 | +0.3255 − 0.9067i |
| w73 | 01001001 | +0.1588 − 1.0122i |
| w74 | 01001010 | +0.3255 + 0.9067i |
| w75 | 01001011 | +0.1588 + 1.0122i |
| w76 | 01001100 | +0.4774 − 0.1074i |
| w77 | 01001101 | +0.4323 − 0.1096i |
| w78 | 01001110 | +0.4774 + 0.1074i |
| w79 | 01001111 | +0.4323 + 0.1096i |
| w80 | 01010000 | +0.1647 − 0.5388i |
| w81 | 01010001 | +0.1629 − 0.5296i |
| w82 | 01010010 | +0.1647 + 0.5388i |
| w83 | 01010011 | +0.1629 + 0.5296i |
| w84 | 01010100 | +0.1535 − 0.3082i |
| w85 | 01010101 | +0.1629 − 0.3084i |
| w86 | 01010110 | +0.1535 + 0.3082i |
| w87 | 01010111 | +0.1629 + 0.3084i |
| w88 | 01011000 | +0.4535 − 0.6452i |
| w89 | 01011001 | +0.4645 − 0.5898i |
| w90 | 01011010 | +0.4535 + 0.6452i |
| w91 | 01011011 | +0.4645 + 0.5898i |
| w92 | 01011100 | +0.4853 − 0.3237i |
| w93 | 01011101 | +0.4637 − 0.3425i |
| w94 | 01011110 | +0.4853 + 0.3237i |
| w95 | 01011111 | +0.4637 + 0.3425i |
| w96 | 01100000 | −0.1315 − 0.7332i |
| w97 | 01100001 | −0.1038 − 0.7607i |
| w98 | 01100010 | −0.1315 + 0.7332i |
| w99 | 01100011 | −0.1038 + 0.7607i |
| w100 | 01100100 | −0.1461 − 0.1146i |
| w101 | 01100101 | −0.1573 − 0.1142i |
| w102 | 01100110 | −0.1461 + 0.1146i |
| w103 | 01100111 | −0.1573 + 0.1142i |
| w104 | 01101000 | −0.3255 − 0.9067i |
| w105 | 01101001 | −0.1588 − 1.0122i |
| w106 | 01101010 | −0.3255 + 0.9067i |
| w107 | 01101011 | −0.1588 + 1.0122i |
| w108 | 01101100 | −0.4774 − 0.1074i |
| w109 | 01101101 | −0.4323 − 0.1096i |
| w110 | 01101110 | −0.4774 + 0.1074i |
| w111 | 01101111 | −0.4323 + 0.1096i |
| w112 | 01110000 | −0.1647 − 0.5388i |
| w113 | 01110001 | −0.1629 − 0.5296i |
| w114 | 01110010 | −0.1647 + 0.5388i |
| w115 | 01110011 | −0.1629 + 0.5296i |
| w116 | 01110100 | −0.1535 − 0.3082i |
| w117 | 01110101 | −0.1629 − 0.3084i |
| w118 | 01110110 | −0.1535 + 0.3082i |
| w119 | 01110111 | −0.1629 + 0.3084i |
| w120 | 01111000 | −0.4535 − 0.6452i |
| w121 | 01111001 | −0.4645 − 0.5898i |
| w122 | 01111010 | −0.4535 + 0.6452i |
| w123 | 01111011 | −0.4645 + 0.5898i |
| w124 | 01111100 | −0.4853 − 0.3237i |
| w125 | 01111101 | −0.4637 − 0.3425i |
| w126 | 01111110 | −0.4853 + 0.3237i |
| w127 | 01111111 | −0.4637 + 0.3425i | for R=5/8 (or R=1/2, 3/4 or 13/16):

| w index | bit label | Constellation point |
|---|---|---|
| w0 | 0000000 | +1.1470 + 0.4332i |
| w1 | 0000000 | +0.5553 + 0.4183i |
| w2 | 0000001 | +1.1804 + 0.7965i |
| w3 | 0000001 | +0.5406 + 0.6294i |
| w4 | 0000010 | +1.1470 − 0.4332i |
| w5 | 0000010 | +0.5553 − 0.4183i |
| w6 | 0000011 | +1.1804 − 0.7965i |
| w7 | 0000011 | +0.5406 − 0.6294i |
| w8 | 0000100 | −1.1470 + 0.4332i |
| w9 | 0000100 | −0.5553 + 0.4183i |
| w10 | 0000101 | −1.1804 + 0.7965i |
| w11 | 0000101 | −0.5406 + 0.6294i |
| w12 | 0000110 | −1.1470 − 0.4332i |
| w13 | 0000110 | −0.5553 − 0.4183i |
| w14 | 0000111 | −1.1804 − 0.7965i |
| w15 | 0000111 | −0.5406 − 0.6294i |
| w16 | 0001000 | +0.1029 + 0.4847i |
| w17 | 0001000 | +0.3416 + 0.4299i |
| w18 | 0001001 | +0.1167 + 0.6847i |
| w19 | 0001001 | +0.3403 + 0.6639i |
| w20 | 0001010 | +0.1029 − 0.4847i |
| w21 | 0001010 | +0.3416 − 0.4299i |
| w22 | 0001011 | +0.1167 − 0.6847i |
| w23 | 0001011 | +0.3403 − 0.6639i |
| w24 | 0001100 | −0.1029 + 0.4847i |
| w25 | 0001100 | −0.3416 + 0.4299i |
| w26 | 0001101 | −0.1167 + 0.6847i |
| w27 | 0001101 | −0.3403 + 0.6639i |
| w28 | 0001110 | −0.1029 − 0.4847i |
| w29 | 0001110 | −0.3416 − 0.4299i |
| w30 | 0001111 | −0.1167 − 0.6847i |
| w31 | 0001111 | −0.3403 − 0.6639i |
| w32 | 0010000 | +1.1636 + 0.1437i |

-continued

| w index | bit label | Constellation point |
|---|---|---|
| w33 | 0010000 | +0.5673 + 0.1212i |
| w34 | 0010001 | +1.4805 + 0.1788i |
| w35 | 0010001 | +0.9781 + 1.1963i |
| w36 | 0010010 | +1.1636 − 0.1437i |
| w37 | 0010010 | +0.5673 − 0.1212i |
| w38 | 0010011 | +1.4805 − 0.1788i |
| w39 | 0010011 | +0.9781 − 1.1963i |
| w40 | 0010100 | −1.1636 + 0.1437i |
| w41 | 0010100 | −0.5673 + 0.1212i |
| w42 | 0010101 | −1.4805 + 0.1788i |
| w43 | 0010101 | −0.9781 + 1.1963i |
| w44 | 0010110 | −1.1636 − 0.1437i |
| w45 | 0010110 | −0.5673 − 0.1212i |
| w46 | 0010111 | −1.4805 − 0.1788i |
| w47 | 0010111 | −0.9781 − 1.1963i |
| w48 | 0011000 | +0.1058 + 0.0889i |
| w49 | 0011000 | +0.3723 + 0.1109i |
| w50 | 0011001 | +0.1939 + 1.4903i |
| w51 | 0011001 | +0.5867 + 1.4162i |
| w52 | 0011010 | +0.1058 − 0.0889i |
| w53 | 0011010 | +0.3723 − 0.1109i |
| w54 | 0011011 | +0.1939 − 1.4903i |
| w55 | 0011011 | +0.5867 − 1.4162i |
| w56 | 0011100 | −0.1058 + 0.0889i |
| w57 | 0011100 | −0.3723 + 0.1109i |
| w58 | 0011101 | −0.1939 + 1.4903i |
| w59 | 0011101 | −0.5867 + 1.4162i |
| w60 | 0011110 | −0.1058 − 0.0889i |
| w61 | 0011110 | −0.3723 − 0.1109i |
| w62 | 0011111 | −0.1939 − 1.4903i |
| w63 | 0011111 | −0.5867 − 1.4162i |
| w64 | 01000000 | +0.9015 + 0.4159i |
| w65 | 01000001 | +0.6908 + 0.3786i |
| w66 | 01000010 | +0.8996 + 0.6935i |
| w67 | 01000011 | +0.6580 + 0.7616i |
| w68 | 01000100 | +0.9015 − 0.4159i |
| w69 | 01000101 | +0.6908 − 0.3786i |
| w70 | 01000110 | +0.8996 − 0.6935i |
| w71 | 01000111 | +0.6580 − 0.7616i |
| w72 | 01001000 | −0.9015 + 0.4159i |
| w73 | 01001001 | −0.6908 + 0.3786i |
| w74 | 01001010 | −0.8996 + 0.6935i |
| w75 | 01001011 | −0.6580 + 0.7616i |
| w76 | 01001100 | −0.9015 − 0.4159i |
| w77 | 01001101 | −0.6908 − 0.3786i |
| w78 | 01001110 | −0.8996 − 0.6935i |
| w79 | 01001111 | −0.6580 − 0.7616i |
| w80 | 01010000 | +0.1029 + 0.3518i |
| w81 | 01010001 | +0.2989 + 0.3450i |
| w82 | 01010010 | +0.1222 + 0.9046i |
| w83 | 01010011 | +0.3701 + 0.8771i |
| w84 | 01010100 | +0.1029 − 0.3518i |
| w85 | 01010101 | +0.2989 − 0.3450i |
| w86 | 01010110 | +0.1222 − 0.9046i |
| w87 | 01010111 | +0.3701 − 0.8771i |
| w88 | 01011000 | −0.1029 + 0.3518i |
| w89 | 01011001 | −0.2989 + 0.3450i |
| w90 | 01011010 | −0.1222 + 0.9046i |
| w91 | 01011011 | −0.3701 + 0.8771i |
| w92 | 01011100 | −0.1029 − 0.3518i |
| w93 | 01011101 | −0.2989 − 0.3450i |
| w94 | 01011110 | −0.1222 − 0.9046i |
| w95 | 01011111 | −0.3701 − 0.8771i |
| w96 | 01100000 | +0.9136 + 0.1312i |
| w97 | 01100001 | +0.6911 + 0.1387i |
| w98 | 01100010 | +1.5526 + 0.5600i |
| w99 | 01100011 | +0.7165 + 1.0174i |
| w100 | 01100100 | +0.9136 − 0.1312i |
| w101 | 01100101 | +0.6911 − 0.1387i |
| w102 | 01100110 | +1.5526 − 0.5600i |
| w103 | 01100111 | +0.7165 − 1.0174i |
| w104 | 01101000 | −0.9136 + 0.1312i |
| w105 | 01101001 | −0.6911 + 0.1387i |
| w106 | 01101010 | −1.5526 + 0.5600i |
| w107 | 01101011 | −0.7165 + 1.0174i |
| w108 | 01101100 | −0.9136 − 0.1312i |
| w109 | 01101101 | −0.6911 − 0.1387i |
| w110 | 01101110 | −1.5526 − 0.5600i |
| w111 | 01101111 | −0.7165 − 1.0174i |
| w112 | 01110000 | +0.1130 + 0.1512i |
| w113 | 01110001 | +0.3195 + 0.1563i |
| w114 | 01110010 | +0.1450 + 1.1700i |
| w115 | 01110011 | +0.4379 + 1.1192i |
| w116 | 01110100 | +0.1130 − 0.1512i |
| w117 | 01110101 | +0.3195 − 0.1563i |
| w118 | 01110110 | +0.1450 − 1.1700i |
| w119 | 01110111 | +0.4379 − 1.1192i |
| w120 | 01111000 | −0.1130 + 0.1512i |
| w121 | 01111001 | −0.3195 + 0.1563i |
| w122 | 01111010 | −0.1450 + 1.1700i |
| w123 | 01111011 | −0.4379 + 1.1192i |
| w124 | 01111100 | −0.1130 − 0.1512i |
| w125 | 01111101 | −0.3195 − 0.1563i |
| w126 | 01111110 | −0.1450 − 1.1700i |
| w127 | 01111111 | −0.4379 − 1.1192i | for R=3/4 (or R=1/2, 5/8 or 13/16):

| w index | bit label | Constellation point |
|---|---|---|
| w0 | 0000000 | +1.0484 + 0.3435i |
| w1 | 0000000 | +1.1392 + 0.5908i |
| w2 | 0000001 | −1.0484 + 0.3435i |
| w3 | 0000001 | −1.1392 + 0.5908i |
| w4 | 0000010 | +1.0205 + 0.1130i |
| w5 | 0000010 | +1.3137 + 0.1401i |
| w6 | 0000011 | −1.0205 + 0.1130i |
| w7 | 0000011 | −1.3137 + 0.1401i |
| w8 | 0000100 | +0.8050 + 0.3736i |
| w9 | 0000100 | +0.8767 + 0.6075i |
| w10 | 0000101 | −0.8050 + 0.3736i |
| w11 | 0000101 | −0.8767 + 0.6075i |
| w12 | 0000110 | +0.7794 + 0.1239i |
| w13 | 0000110 | +1.4466 + 0.4199i |
| w14 | 0000111 | −0.7794 + 0.1239i |
| w15 | 0000111 | −1.4466 + 0.4199i |
| w16 | 0001000 | +0.5512 + 0.5784i |
| w17 | 0001000 | +0.5926 + 0.7787i |
| w18 | 0001001 | −0.5512 + 0.5784i |
| w19 | 0001001 | −0.5926 + 0.7787i |
| w20 | 0001010 | +0.4970 + 0.0732i |
| w21 | 0001010 | +1.1801 + 0.9322i |
| w22 | 0001011 | −0.4970 + 0.0732i |
| w23 | 0001011 | −1.1801 + 0.9322i |
| w24 | 0001100 | +0.5773 + 0.3945i |
| w25 | 0001100 | +0.8273 + 0.8515i |
| w26 | 0001101 | −0.5773 + 0.3945i |
| w27 | 0001101 | −0.8273 + 0.8515i |
| w28 | 0001110 | +0.5611 + 0.2103i |
| w29 | 0001110 | +0.9097 + 1.1442i |
| w30 | 0001111 | −0.5611 + 0.2103i |
| w31 | 0001111 | −0.9097 + 1.1442i |
| w32 | 0010000 | +0.1137 + 0.6007i |
| w33 | 0010000 | +0.1177 + 0.7939i |
| w34 | 0010001 | −0.1137 + 0.6007i |
| w35 | 0010001 | −0.1177 + 0.7939i |
| w36 | 0010010 | +0.0988 + 0.0864i |
| w37 | 0010010 | +0.1761 + 1.5225i |
| w38 | 0010011 | −0.0988 + 0.0864i |
| w39 | 0010011 | −0.1761 + 1.5225i |
| w40 | 0010100 | +0.1075 + 0.4242i |
| w41 | 0010100 | +0.1232 + 1.0065i |
| w42 | 0010101 | −0.1075 + 0.4242i |
| w43 | 0010101 | −0.1232 + 1.0065i |
| w44 | 0010110 | +0.1016 + 0.2562i |
| w45 | 0010110 | +0.1403 + 1.2447i |
| w46 | 0010111 | −0.1016 + 0.2562i |
| w47 | 0010111 | −0.1403 + 1.2447i |
| w48 | 0011000 | +0.3358 + 0.5918i |
| w49 | 0011000 | +0.3537 + 0.7995i |
| w50 | 0011001 | −0.3358 + 0.5918i |
| w51 | 0011001 | −0.3537 + 0.7995i |

-continued

| w index | bit label | Constellation point |
|---|---|---|
| w52 | 0011010 | +0.2966 + 0.0872i |
| w53 | 0011010 | +0.4861 + 1.3847i |
| w54 | 0011011 | −0.2966 + 0.0872i |
| w55 | 0011011 | −0.4861 + 1.3847i |
| w56 | 0011100 | +0.3322 + 0.4087i |
| w57 | 0011100 | +0.3791 + 1.0277i |
| w58 | 0011101 | −0.3322 + 0.4087i |
| w59 | 0011101 | −0.3791 + 1.0277i |
| w60 | 0011110 | +0.3142 + 0.2509i |
| w61 | 0011110 | +0.6160 + 1.1277i |
| w62 | 0011111 | −0.3142 + 0.2509i |
| w63 | 0011111 | −0.6160 + 1.1277i |
| w64 | 01000000 | +1.0484 − 0.3435i |
| w65 | 01000001 | +1.1392 − 0.5908i |
| w66 | 01000010 | −1.0484 − 0.3435i |
| w67 | 01000011 | −1.1392 − 0.5908i |
| w68 | 01000100 | +1.0205 − 0.1130i |
| w69 | 01000101 | +1.3137 − 0.1401i |
| w70 | 01000110 | −1.0205 − 0.1130i |
| w71 | 01000111 | −1.3137 − 0.1401i |
| w72 | 01001000 | +0.8050 − 0.3736i |
| w73 | 01001001 | +0.8767 − 0.6075i |
| w74 | 01001010 | −0.8050 − 0.3736i |
| w75 | 01001011 | −0.8767 − 0.6075i |
| w76 | 01001100 | +0.7794 − 0.1239i |
| w77 | 01001101 | +1.4466 − 0.4199i |
| w78 | 01001110 | −0.7794 − 0.1239i |
| w79 | 01001111 | −1.4466 − 0.4199i |
| w80 | 01010000 | +0.5512 − 0.5784i |
| w81 | 01010001 | +0.5926 − 0.7787i |
| w82 | 01010010 | −0.5512 − 0.5784i |
| w83 | 01010011 | −0.5926 − 0.7787i |
| w84 | 01010100 | +0.4970 − 0.0732i |
| w85 | 01010101 | +1.1801 − 0.9322i |
| w86 | 01010110 | −0.4970 − 0.0732i |
| w87 | 01010111 | −1.1801 − 0.9322i |
| w88 | 01011000 | +0.5773 − 0.3945i |
| w89 | 01011001 | +0.8273 − 0.8515i |
| w90 | 01011010 | −0.5773 − 0.3945i |
| w91 | 01011011 | −0.8273 − 0.8515i |
| w92 | 01011100 | +0.5611 − 0.2103i |
| w93 | 01011101 | +0.9097 − 1.1442i |
| w94 | 01011110 | −0.5611 − 0.2103i |
| w95 | 01011111 | −0.9097 − 1.1442i |
| w96 | 01100000 | +0.1137 − 0.6007i |
| w97 | 01100001 | +0.1177 − 0.7939i |
| w98 | 01100010 | −0.1137 − 0.6007i |
| w99 | 01100011 | −0.1177 − 0.7939i |
| w100 | 01100100 | +0.0988 − 0.0864i |
| w101 | 01100101 | +0.1761 − 1.5225i |
| w102 | 01100110 | −0.0988 − 0.0864i |
| w103 | 01100111 | −0.1761 − 1.5225i |
| w104 | 01101000 | +0.1075 − 0.4242i |
| w105 | 01101001 | +0.1232 − 1.0065i |
| w106 | 01101010 | −0.1075 − 0.4242i |
| w107 | 01101011 | −0.1232 − 1.0065i |
| w108 | 01101100 | +0.1016 − 0.2562i |
| w109 | 01101101 | +0.1403 − 1.2447i |
| w110 | 01101110 | −0.1016 − 0.2562i |
| w111 | 01101111 | −0.1403 − 1.2447i |
| w112 | 01110000 | +0.3358 − 0.5918i |
| w113 | 01110001 | +0.3537 − 0.7995i |
| w114 | 01110010 | −0.3358 − 0.5918i |
| w115 | 01110011 | −0.3537 − 0.7995i |
| w116 | 01110100 | +0.2966 − 0.0872i |
| w117 | 01110101 | +0.4861 − 1.3847i |
| w118 | 01110110 | −0.2966 − 0.0872i |
| w119 | 01110111 | −0.4861 − 1.3847i |
| w120 | 01111000 | +0.3322 − 0.4087i |
| w121 | 01111001 | +0.3791 − 1.0277i |
| w122 | 01111010 | −0.3322 − 0.4087i |
| w123 | 01111011 | −0.3791 − 1.0277i |
| w124 | 01111100 | +0.3142 − 0.2509i |
| w125 | 01111101 | +0.6160 − 1.1277i |
| w126 | 01111110 | −0.3142 − 0.2509i |
| w127 | 01111111 | −0.6160 − 1.1277i | for R=13/16 (or R=1/2, 5/8 or 3/4):

| w index | bit label | Constellation point |
|---|---|---|
| w0 | 0000000 | +1.0422 + 0.3376i |
| w1 | 0000000 | +1.0422 − 0.3376i |
| w2 | 0000001 | −1.0422 + 0.3376i |
| w3 | 0000001 | −1.0422 − 0.3376i |
| w4 | 0000010 | +0.7966 + 0.3496i |
| w5 | 0000010 | +0.7966 − 0.3496i |
| w6 | 0000011 | −0.7966 + 0.3496i |
| w7 | 0000011 | −0.7966 − 0.3496i |
| w8 | 0000100 | +1.1154 + 0.5839i |
| w9 | 0000100 | +1.1154 − 0.5839i |
| w10 | 0000101 | −1.1154 + 0.5839i |
| w11 | 0000101 | −1.1154 − 0.5839i |
| w12 | 0000110 | +0.8563 + 0.5705i |
| w13 | 0000110 | +0.8563 − 0.5705i |
| w14 | 0000111 | −0.8563 + 0.5705i |
| w15 | 0000111 | −0.8563 − 0.5705i |
| w16 | 0001000 | +1.0010 + 0.1105i |
| w17 | 0001000 | +1.0010 − 0.1105i |
| w18 | 0001001 | −1.0010 + 0.1105i |
| w19 | 0001001 | −1.0010 − 0.1105i |
| w20 | 0001010 | +0.7613 + 0.1187i |
| w21 | 0001010 | +0.7613 − 0.1187i |
| w22 | 0001011 | −0.7613 + 0.1187i |
| w23 | 0001011 | −0.7613 − 0.1187i |
| w24 | 0001100 | +1.2844 + 0.1345i |
| w25 | 0001100 | +1.2844 − 0.1345i |
| w26 | 0001101 | −1.2844 + 0.1345i |
| w27 | 0001101 | −1.2844 − 0.1345i |
| w28 | 0001110 | +1.4001 + 0.4092i |
| w29 | 0001110 | +1.4001 − 0.4092i |
| w30 | 0001111 | −1.4001 + 0.4092i |
| w31 | 0001111 | −1.4001 − 0.4092i |
| w32 | 0010000 | +0.1125 + 0.6269i |
| w33 | 0010000 | +0.1125 − 0.6269i |
| w34 | 0010001 | −0.1125 + 0.6269i |
| w35 | 0010001 | −0.1125 − 0.6269i |
| w36 | 0010010 | +0.1109 + 0.4454i |
| w37 | 0010010 | +0.1109 − 0.4454i |
| w38 | 0010011 | −0.1109 + 0.4454i |
| w39 | 0010011 | −0.1109 − 0.4454i |
| w40 | 0010100 | +0.1155 + 0.8217i |
| w41 | 0010100 | +0.1155 − 0.8217i |
| w42 | 0010101 | −0.1155 + 0.8217i |
| w43 | 0010101 | −0.1155 − 0.8217i |
| w44 | 0010110 | +0.1239 + 1.0311i |
| w45 | 0010110 | +0.1239 − 1.0311i |
| w46 | 0010111 | −0.1239 + 1.0311i |
| w47 | 0010111 | −0.1239 − 1.0311i |
| w48 | 0011000 | +0.0978 + 0.0913i |
| w49 | 0011000 | +0.0978 − 0.0913i |
| w50 | 0011001 | −0.0978 + 0.0913i |
| w51 | 0011001 | −0.0978 − 0.0913i |
| w52 | 0011010 | +0.1038 + 0.2705i |
| w53 | 0011010 | +0.1038 − 0.2705i |
| w54 | 0011011 | −0.1038 + 0.2705i |
| w55 | 0011011 | −0.1038 − 0.2705i |
| w56 | 0011100 | +0.1646 + 1.5274i |
| w57 | 0011100 | +0.1646 − 1.5274i |
| w58 | 0011101 | −0.1646 + 1.5274i |
| w59 | 0011101 | −0.1646 − 1.5274i |
| w60 | 0011110 | +0.1345 + 1.2611i |
| w61 | 0011110 | +0.1345 − 1.2611i |
| w62 | 0011111 | −0.1345 + 1.2611i |
| w63 | 0011111 | −0.1345 − 1.2611i |
| w64 | 01000000 | +0.5556 + 0.6306i |
| w65 | 01000001 | +0.5556 − 0.6306i |
| w66 | 01000010 | −0.5556 + 0.6306i |
| w67 | 01000011 | −0.5556 − 0.6306i |
| w68 | 01000100 | +0.5761 + 0.4286i |
| w69 | 01000101 | +0.5761 − 0.4286i |
| w70 | 01000110 | −0.5761 + 0.4286i |
| w71 | 01000111 | −0.5761 − 0.4286i |
| w72 | 01001000 | +0.5970 + 0.8482i |
| w73 | 01001001 | +0.5970 − 0.8482i |
| w74 | 01001010 | −0.5970 + 0.8482i |
| w75 | 01001011 | −0.5970 − 0.8482i |

-continued

| w index | bit label | Constellation point |
|---|---|---|
| w76 | 01001100 | +0.8378 + 0.8041i |
| w77 | 01001101 | +0.8378 − 0.8041i |
| w78 | 01001110 | −0.8378 + 0.8041i |
| w79 | 01001111 | −0.8378 − 0.8041i |
| w80 | 01010000 | +0.4942 + 0.0780i |
| w81 | 01010001 | +0.4942 − 0.0780i |
| w82 | 01010010 | −0.4942 + 0.0780i |
| w83 | 01010011 | −0.4942 − 0.0780i |
| w84 | 01010100 | +0.5456 + 0.2367i |
| w85 | 01010101 | +0.5456 − 0.2367i |
| w86 | 01010110 | −0.5456 + 0.2367i |
| w87 | 01010111 | −0.5456 − 0.2367i |
| w88 | 01011000 | +1.1670 + 0.8997i |
| w89 | 01011001 | +1.1670 − 0.8997i |
| w90 | 01011010 | −1.1670 + 0.8997i |
| w91 | 01011011 | −1.1670 − 0.8997i |
| w92 | 01011100 | +0.9031 + 1.0698i |
| w93 | 01011101 | +0.9031 − 1.0698i |
| w94 | 01011110 | −0.9031 + 1.0698i |
| w95 | 01011111 | −0.9031 − 1.0698i |
| w96 | 01100000 | +0.3351 + 0.6308i |
| w97 | 01100001 | +0.3351 − 0.6308i |
| w98 | 01100010 | −0.3351 + 0.6308i |
| w99 | 01100011 | −0.3351 − 0.6308i |
| w100 | 01100100 | +0.3383 + 0.4404i |
| w101 | 01100101 | +0.3383 − 0.4404i |
| w102 | 01100110 | −0.3383 + 0.4404i |
| w103 | 01100111 | −0.3383 − 0.4404i |
| w104 | 01101000 | +0.3510 + 0.8405i |
| w105 | 01101001 | +0.3510 − 0.8405i |
| w106 | 01101010 | −0.3510 + 0.8405i |
| w107 | 01101011 | −0.3510 − 0.8405i |
| w108 | 01101100 | +0.3850 + 1.0724i |
| w109 | 01101101 | +0.3850 − 1.0724i |
| w110 | 01101110 | −0.3850 + 1.0724i |
| w111 | 01101111 | −0.3850 − 1.0724i |
| w112 | 01110000 | +0.2935 + 0.0906i |
| w113 | 01110001 | +0.2935 − 0.0906i |
| w114 | 01110010 | −0.2935 + 0.0906i |
| w115 | 01110011 | −0.2935 − 0.0906i |
| w116 | 01110100 | +0.3172 + 0.2666i |
| w117 | 01110101 | +0.3172 − 0.2666i |
| w118 | 01110110 | −0.3172 + 0.2666i |
| w119 | 01110111 | −0.3172 − 0.2666i |
| w120 | 01111000 | +0.4543 + 1.3933i |
| w121 | 01111001 | +0.4543 − 1.3933i |
| w122 | 01111010 | −0.4543 + 1.3933i |
| w123 | 01111011 | −0.4543 − 1.3933i |
| w124 | 01111100 | +0.6436 + 1.1770i |
| w125 | 01111101 | +0.6436 − 1.1770i |
| w126 | 01111110 | −0.6436 + 1.1770i |
| w127 | 01111111 | −0.6436 − 1.1770i |

A4) 256-QAM NUC
for R=1/2 (or R=5/8, 3/4 or 13/16):

| w index | bit label | Constellation point |
|---|---|---|
| w0 | 0000000 | −1.2901 + 1.0495i |
| w1 | 0000000 | −0.7273 + 0.6160i |
| w2 | 0000001 | −1.0646 + 1.2876i |
| w3 | 0000001 | −0.5707 + 0.7662i |
| w4 | 0000010 | +1.2901 + 1.0495i |
| w5 | 0000010 | +0.7273 + 0.6160i |
| w6 | 0000011 | +1.0646 + 1.2876i |
| w7 | 0000011 | +0.5707 + 0.7662i |
| w8 | 0000100 | −1.4625 + 0.7740i |
| w9 | 0000100 | −0.8177 + 0.4841i |
| w10 | 0000101 | −0.7949 + 1.4772i |
| w11 | 0000101 | −0.4490 + 0.8461i |
| w12 | 0000110 | +1.4625 + 0.7740i |
| w13 | 0000110 | +0.8177 + 0.4841i |
| w14 | 0000111 | +0.7949 + 1.4772i |
| w15 | 0000111 | +0.4490 + 0.8461i |
| w16 | 0001000 | −0.2844 + 0.1296i |
| w17 | 0001000 | −0.5902 + 0.4857i |
| w18 | 0001001 | −0.1053 + 0.1494i |
| w19 | 0001001 | −0.4294 + 0.6363i |
| w20 | 0001010 | +0.2844 + 0.1296i |
| w21 | 0001010 | +0.5902 + 0.4857i |
| w22 | 0001011 | +0.1053 + 0.1494i |
| w23 | 0001011 | +0.4294 + 0.6363i |
| w24 | 0001100 | −0.2853 + 0.1309i |
| w25 | 0001100 | −0.6355 + 0.4185i |
| w26 | 0001101 | −0.1052 + 0.1495i |
| w27 | 0001101 | −0.3744 + 0.6744i |
| w28 | 0001110 | +0.2853 + 0.1309i |
| w29 | 0001110 | +0.6355 + 0.4185i |
| w30 | 0001111 | +0.1052 + 0.1495i |
| w31 | 0001111 | +0.3744 + 0.6744i |
| w32 | 0010000 | −1.6350 + 0.1593i |
| w33 | 0010000 | −0.9430 + 0.1100i |
| w34 | 0010001 | −0.1658 + 1.6747i |
| w35 | 0010001 | −0.1088 + 0.9530i |
| w36 | 0010010 | +1.6350 + 0.1593i |
| w37 | 0010010 | +0.9430 + 0.1100i |
| w38 | 0010011 | +0.1658 + 1.6747i |
| w39 | 0010011 | +0.1088 + 0.9530i |
| w40 | 0010100 | −1.5776 + 0.4735i |
| w41 | 0010100 | −0.9069 + 0.2829i |
| w42 | 0010101 | −0.4907 + 1.6084i |
| w43 | 0010101 | −0.2464 + 0.9270i |
| w44 | 0010110 | +1.5776 + 0.4735i |
| w45 | 0010110 | +0.9069 + 0.2829i |
| w46 | 0010111 | +0.4907 + 1.6084i |
| w47 | 0010111 | +0.2464 + 0.9270i |
| w48 | 0011000 | −0.3237 + 0.0849i |
| w49 | 0011000 | −0.7502 + 0.1138i |
| w50 | 0011001 | −0.0872 + 0.1390i |
| w51 | 0011001 | −0.1091 + 0.7656i |
| w52 | 0011010 | +0.3237 + 0.0849i |
| w53 | 0011010 | +0.7502 + 0.1138i |
| w54 | 0011011 | +0.0872 + 0.1390i |
| w55 | 0011011 | +0.1091 + 0.7656i |
| w56 | 0011100 | −0.3228 + 0.0867i |
| w57 | 0011100 | −0.7325 + 0.2088i |
| w58 | 0011101 | −0.0871 + 0.1392i |
| w59 | 0011101 | −0.1699 + 0.7537i |
| w60 | 0011110 | +0.3228 + 0.0867i |
| w61 | 0011110 | +0.7325 + 0.2088i |
| w62 | 0011111 | +0.0871 + 0.1392i |
| w63 | 0011111 | +0.1699 + 0.7537i |
| w64 | 01000000 | −1.2901 − 1.0495i |
| w65 | 01000001 | −0.7273 − 0.6160i |
| w66 | 01000010 | −1.0646 − 1.2876i |
| w67 | 01000011 | −0.5707 − 0.7662i |
| w68 | 01000100 | +1.2901 − 1.0495i |
| w69 | 01000101 | +0.7273 − 0.6160i |
| w70 | 01000110 | +1.0646 − 1.2876i |
| w71 | 01000111 | +0.5707 − 0.7662i |
| w72 | 01001000 | −1.4625 − 0.7740i |
| w73 | 01001001 | −0.8177 − 0.4841i |
| w74 | 01001010 | −0.7949 − 1.4772i |
| w75 | 01001011 | −0.4490 − 0.8461i |
| w76 | 01001100 | +1.4625 − 0.7740i |
| w77 | 01001101 | +0.8177 − 0.4841i |
| w78 | 01001110 | +0.7949 − 1.4772i |
| w79 | 01001111 | +0.4490 − 0.8461i |
| w80 | 01010000 | −0.2844 − 0.1296i |
| w81 | 01010001 | −0.5902 − 0.4857i |
| w82 | 01010010 | −0.1053 − 0.1494i |
| w83 | 01010011 | −0.4294 − 0.6363i |
| w84 | 01010100 | +0.2844 − 0.1296i |
| w85 | 01010101 | +0.5902 − 0.4857i |
| w86 | 01010110 | +0.1053 − 0.1494i |
| w87 | 01010111 | +0.4294 − 0.6363i |
| w88 | 01011000 | −0.2853 − 0.1309i |
| w89 | 01011001 | −0.6355 − 0.4185i |
| w90 | 01011010 | −0.1052 − 0.1495i |
| w91 | 01011011 | −0.3744 − 0.6744i |
| w92 | 01011100 | +0.2853 − 0.1309i |
| w93 | 01011101 | +0.6355 − 0.4185i |

| w index | bit label | Constellation point |
|---|---|---|
| w94 | 01011110 | +0.1052 − 0.1495i |
| w95 | 01011111 | +0.3744 − 0.6744i |
| w96 | 01100000 | −1.6350 − 0.1593i |
| w97 | 01100001 | −0.9430 − 0.1100i |
| w98 | 01100010 | −0.1658 − 1.6747i |
| w99 | 01100011 | −0.1088 − 0.9530i |
| w100 | 01100100 | +1.6350 − 0.1593i |
| w101 | 01100101 | +0.9430 − 0.1100i |
| w102 | 01100110 | +0.1658 − 1.6747i |
| w103 | 01100111 | +0.1088 − 0.9530i |
| w104 | 01101000 | −1.5776 − 0.4735i |
| w105 | 01101001 | −0.9069 − 0.2829i |
| w106 | 01101010 | −0.4907 − 1.6084i |
| w107 | 01101011 | −0.2464 − 0.9270i |
| w108 | 01101100 | +1.5776 − 0.4735i |
| w109 | 01101101 | +0.9069 − 0.2829i |
| w110 | 01101110 | +0.4907 − 1.6084i |
| w111 | 01101111 | +0.2464 − 0.9270i |
| w112 | 01110000 | −0.3237 − 0.0849i |
| w113 | 01110001 | −0.7502 − 0.1138i |
| w114 | 01110010 | −0.0872 − 0.1390i |
| w115 | 01110011 | −0.1091 − 0.7656i |
| w116 | 01110100 | +0.3237 − 0.0849i |
| w117 | 01110101 | +0.7502 − 0.1138i |
| w118 | 01110110 | +0.0872 − 0.1390i |
| w119 | 01110111 | +0.1091 − 0.7656i |
| w120 | 01111000 | −0.3228 − 0.0867i |
| w121 | 01111001 | −0.7325 − 0.2088i |
| w122 | 01111010 | −0.0871 − 0.1392i |
| w123 | 01111011 | −0.1699 − 0.7537i |
| w124 | 01111100 | +0.3228 − 0.0867i |
| w125 | 01111101 | +0.7325 − 0.2088i |
| w126 | 01111110 | +0.0871 − 0.1392i |
| w127 | 01111111 | +0.1699 − 0.7537i |
| w128 | 10000000 | −1.0382 + 0.8623i |
| w129 | 10000001 | −0.8504 + 0.7217i |
| w130 | 10000010 | −0.8555 + 1.0542i |
| w131 | 10000011 | −0.6961 + 0.8850i |
| w132 | 10000100 | +1.0382 + 0.8623i |
| w133 | 10000101 | +0.8504 + 0.7217i |
| w134 | 10000110 | +0.8555 + 1.0542i |
| w135 | 10000111 | +0.6961 + 0.8850i |
| w136 | 10001000 | −1.1794 + 0.6376i |
| w137 | 10001001 | −0.9638 + 0.5407i |
| w138 | 10001010 | −0.6363 + 1.2064i |
| w139 | 10001011 | −0.5229 + 1.0037i |
| w140 | 10001100 | +1.1794 + 0.6376i |
| w141 | 10001101 | +0.9638 + 0.5407i |
| w142 | 10001110 | +0.6363 + 1.2064i |
| w143 | 10001111 | +0.5229 + 1.0037i |
| w144 | 10010000 | −0.3734 + 0.2560i |
| w145 | 10010001 | −0.4968 + 0.3947i |
| w146 | 10010010 | −0.1938 + 0.3621i |
| w147 | 10010011 | −0.3224 + 0.5236i |
| w148 | 10010100 | +0.3734 + 0.2560i |
| w149 | 10010101 | +0.4968 + 0.3947i |
| w150 | 10010110 | +0.1938 + 0.3621i |
| w151 | 10010111 | +0.3224 + 0.5236i |
| w152 | 10011000 | −0.3799 + 0.2517i |
| w153 | 10011001 | −0.5231 + 0.3644i |
| w154 | 10011010 | −0.1909 + 0.3627i |
| w155 | 10011011 | −0.3016 + 0.5347i |
| w156 | 10011100 | +0.3799 + 0.2517i |
| w157 | 10011101 | +0.5231 + 0.3644i |
| w158 | 10011110 | +0.1909 + 0.3627i |
| w159 | 10011111 | +0.3016 + 0.5347i |
| w160 | 10100000 | −1.3225 + 0.1320i |
| w161 | 10100001 | −1.0854 + 0.1139i |
| w162 | 10100010 | −0.1322 + 1.3631i |
| w163 | 10100011 | −0.1124 + 1.1327i |
| w164 | 10100100 | +1.3225 + 0.1320i |
| w165 | 10100101 | +1.0854 + 0.1139i |
| w166 | 10100110 | +0.1322 + 1.3631i |
| w167 | 10100111 | +0.1124 + 1.1327i |
| w168 | 10101000 | −1.2742 + 0.3922i |
| w169 | 10101001 | −1.0441 + 0.3296i |
| w170 | 10101010 | −0.3929 + 1.3102i |
| w171 | 10101011 | −0.3160 + 1.0913i |
| w172 | 10101100 | +1.2742 + 0.3922i |
| w173 | 10101101 | +1.0441 + 0.3296i |
| w174 | 10101110 | +0.3929 + 1.3102i |
| w175 | 10101111 | +0.3160 + 1.0913i |
| w176 | 10110000 | −0.4582 + 0.1123i |
| w177 | 10110001 | −0.6473 + 0.1138i |
| w178 | 10110010 | −0.0928 + 0.3970i |
| w179 | 10110011 | −0.1054 + 0.5979i |
| w180 | 10110100 | +0.4582 + 0.1123i |
| w181 | 10110101 | +0.6473 + 0.1138i |
| w182 | 10110110 | +0.0928 + 0.3970i |
| w183 | 10110111 | +0.1054 + 0.5979i |
| w184 | 10111000 | −0.4545 + 0.1251i |
| w185 | 10111001 | −0.6339 + 0.1702i |
| w186 | 10111010 | −0.0937 + 0.3973i |
| w187 | 10111011 | −0.1230 + 0.5949i |
| w188 | 10111100 | +0.4545 + 0.1251i |
| w189 | 10111101 | +0.6339 + 0.1702i |
| w190 | 10111110 | +0.0937 + 0.3973i |
| w191 | 10111111 | +0.1230 + 0.5949i |
| w192 | 11000000 | −1.0382 − 0.8623i |
| w193 | 11000001 | −0.8504 − 0.7217i |
| w194 | 11000010 | −0.8555 − 1.0542i |
| w195 | 11000011 | −0.6961 − 0.8850i |
| w196 | 11000100 | +1.0382 − 0.8623i |
| w197 | 11000101 | +0.8504 − 0.7217i |
| w198 | 11000110 | +0.8555 − 1.0542i |
| w199 | 11000111 | +0.6961 − 0.8850i |
| w200 | 11001000 | −1.1794 − 0.6376i |
| w201 | 11001001 | −0.9638 − 0.5407i |
| w202 | 11001010 | −0.6363 − 1.2064i |
| w203 | 11001011 | −0.5229 − 1.0037i |
| w204 | 11001100 | +1.1794 − 0.6376i |
| w205 | 11001101 | +0.9638 − 0.5407i |
| w206 | 11001110 | +0.6363 − 1.2064i |
| w207 | 11001111 | +0.5229 − 1.0037i |
| w208 | 11010000 | −0.3734 − 0.2560i |
| w209 | 11010001 | −0.4968 − 0.3947i |
| w210 | 11010010 | −0.1938 − 0.3621i |
| w211 | 11010011 | −0.3224 − 0.5236i |
| w212 | 11010100 | +0.3734 − 0.2560i |
| w213 | 11010101 | +0.4968 − 0.3947i |
| w214 | 11010110 | +0.1938 − 0.3621i |
| w215 | 11010111 | +0.3224 − 0.5236i |
| w216 | 11011000 | −0.3799 − 0.2517i |
| w217 | 11011001 | −0.5231 − 0.3644i |
| w218 | 11011010 | −0.1909 − 0.3627i |
| w219 | 11011011 | −0.3016 − 0.5347i |
| w220 | 11011100 | +0.3799 − 0.2517i |
| w221 | 11011101 | +0.5231 − 0.3644i |
| w222 | 11011110 | +0.1909 − 0.3627i |
| w223 | 11011111 | +0.3016 − 0.5347i |
| w224 | 11100000 | −1.3225 − 0.1320i |
| w225 | 11100001 | −1.0854 − 0.1139i |
| w226 | 11100010 | −0.1322 − 1.3631i |
| w227 | 11100011 | −0.1124 − 1.1327i |
| w228 | 11100100 | +1.3225 − 0.1320i |
| w229 | 11100101 | +1.0854 − 0.1139i |
| w230 | 11100110 | +0.1322 − 1.3631i |
| w231 | 11100111 | +0.1124 − 1.1327i |
| w232 | 11101000 | −1.2742 − 0.3922i |
| w233 | 11101001 | −1.0441 − 0.3296i |
| w234 | 11101010 | −0.3929 − 1.3102i |
| w235 | 11101011 | −0.3160 − 1.0913i |
| w236 | 11101100 | +1.2742 − 0.3922i |
| w237 | 11101101 | +1.0441 − 0.3296i |
| w238 | 11101110 | +0.3929 − 1.3102i |
| w239 | 11101111 | +0.3160 − 1.0913i |
| w240 | 11110000 | −0.4582 − 0.1123i |
| w241 | 11110001 | −0.6473 − 0.1138i |
| w242 | 11110010 | −0.0928 − 0.3970i |
| w243 | 11110011 | −0.1054 − 0.5979i |
| w244 | 11110100 | +0.4582 − 0.1123i |
| w245 | 11110101 | +0.6473 − 0.1138i |
| w246 | 11110110 | +0.0928 − 0.3970i |
| w247 | 11110111 | +0.1054 − 0.5979i |

-continued

| w index | bit label | Constellation point |
|---|---|---|
| w248 | 11111000 | −0.4545 − 0.1251i |
| w249 | 11111001 | −0.6339 − 0.1702i |
| w250 | 11111010 | −0.0937 − 0.3973i |
| w251 | 11111011 | −0.1230 − 0.5949i |
| w252 | 11111100 | +0.4545 − 0.1251i |
| w253 | 11111101 | +0.6339 − 0.1702i |
| w254 | 11111110 | +0.0937 − 0.3973i |
| w255 | 11111111 | +0.1230 − 0.5949i | for R=5/8 (or R=1/2, 3/4 or 13/16):

| w index | bit label | Constellation point |
|---|---|---|
| w0 | 0000000 | −1.2537 + 1.0045i |
| w1 | 0000000 | −0.2443 + 0.2114i |
| w2 | 0000001 | −0.7404 + 0.6074i |
| w3 | 0000001 | −0.6039 + 0.5118i |
| w4 | 0000010 | −1.5761 + 0.1512i |
| w5 | 0000010 | −0.2545 + 0.0723i |
| w6 | 0000011 | −0.9317 + 0.0939i |
| w7 | 0000011 | −0.7729 + 0.0813i |
| w8 | 0000100 | +1.2537 + 1.0045i |
| w9 | 0000100 | +0.2443 + 0.2114i |
| w10 | 0000101 | +0.7404 + 0.6074i |
| w11 | 0000101 | +0.6039 + 0.5118i |
| w12 | 0000110 | +1.5761 + 0.1512i |
| w13 | 0000110 | +0.2545 + 0.0723i |
| w14 | 0000111 | +0.9317 + 0.0939i |
| w15 | 0000111 | +0.7729 + 0.0813i |
| w16 | 0001000 | −1.2537 − 1.0045i |
| w17 | 0001000 | −0.2443 − 0.2114i |
| w18 | 0001001 | −0.7404 − 0.6074i |
| w19 | 0001001 | −0.6039 − 0.5118i |
| w20 | 0001010 | −1.5761 − 0.1512i |
| w21 | 0001010 | −0.2545 − 0.0723i |
| w22 | 0001011 | −0.9317 − 0.0939i |
| w23 | 0001011 | −0.7729 − 0.0813i |
| w24 | 0001100 | +1.2537 − 1.0045i |
| w25 | 0001100 | +0.2443 − 0.2114i |
| w26 | 0001101 | +0.7404 − 0.6074i |
| w27 | 0001101 | +0.6039 − 0.5118i |
| w28 | 0001110 | +1.5761 − 0.1512i |
| w29 | 0001110 | +0.2545 − 0.0723i |
| w30 | 0001111 | +0.9317 − 0.0939i |
| w31 | 0001111 | +0.7729 − 0.0813i |
| w32 | 0010000 | −1.0376 + 1.2347i |
| w33 | 0010000 | −0.0940 + 0.2611i |
| w34 | 0010001 | −0.6205 + 0.7476i |
| w35 | 0010001 | −0.5048 + 0.6321i |
| w36 | 0010010 | −0.1632 + 1.6163i |
| w37 | 0010010 | −0.0734 + 0.0858i |
| w38 | 0010011 | −0.1006 + 0.9948i |
| w39 | 0010011 | −0.0848 + 0.8427i |
| w40 | 0010100 | +1.0376 + 1.2347i |
| w41 | 0010100 | +0.0940 + 0.2611i |
| w42 | 0010101 | +0.6205 + 0.7476i |
| w43 | 0010101 | +0.5048 + 0.6321i |
| w44 | 0010110 | +0.1632 + 1.6163i |
| w45 | 0010110 | +0.0734 + 0.0858i |
| w46 | 0010111 | +0.1006 + 0.9948i |
| w47 | 0010111 | +0.0848 + 0.8427i |
| w48 | 0011000 | −1.0376 − 1.2347i |
| w49 | 0011000 | −0.0940 − 0.2611i |
| w50 | 0011001 | −0.6205 − 0.7476i |
| w51 | 0011001 | −0.5048 − 0.6321i |
| w52 | 0011010 | −0.1632 − 1.6163i |
| w53 | 0011010 | −0.0734 − 0.0858i |
| w54 | 0011011 | −0.1006 − 0.9948i |
| w55 | 0011011 | −0.0848 − 0.8427i |
| w56 | 0011100 | +1.0376 − 1.2347i |
| w57 | 0011100 | +0.0940 − 0.2611i |
| w58 | 0011101 | +0.6205 − 0.7476i |
| w59 | 0011101 | +0.5048 − 0.6321i |
| w60 | 0011110 | +0.1632 − 1.6163i |
| w61 | 0011110 | +0.0734 − 0.0858i |

-continued

| w index | bit label | Constellation point |
|---|---|---|
| w62 | 0011111 | +0.1006 − 0.9948i |
| w63 | 0011111 | +0.0848 − 0.8427i |
| w64 | 01000000 | −1.4164 + 0.7386i |
| w65 | 01000001 | −0.2508 + 0.2043i |
| w66 | 01000010 | −0.8324 + 0.4499i |
| w67 | 01000011 | −0.6808 + 0.3821i |
| w68 | 01000100 | −1.5251 + 0.4510i |
| w69 | 01000101 | −0.2566 + 0.0761i |
| w70 | 01000110 | −0.8975 + 0.2781i |
| w71 | 01000111 | −0.7412 + 0.2345i |
| w72 | 01001000 | +1.4164 + 0.7386i |
| w73 | 01001001 | +0.2508 + 0.2043i |
| w74 | 01001010 | +0.8324 + 0.4499i |
| w75 | 01001011 | +0.6808 + 0.3821i |
| w76 | 01001100 | +1.5251 + 0.4510i |
| w77 | 01001101 | +0.2566 + 0.0761i |
| w78 | 01001110 | +0.8975 + 0.2781i |
| w79 | 01001111 | +0.7412 + 0.2345i |
| w80 | 01010000 | −1.4164 − 0.7386i |
| w81 | 01010001 | −0.2508 − 0.2043i |
| w82 | 01010010 | −0.8324 − 0.4499i |
| w83 | 01010011 | −0.6808 − 0.3821i |
| w84 | 01010100 | −1.5251 − 0.4510i |
| w85 | 01010101 | −0.2566 − 0.0761i |
| w86 | 01010110 | −0.8975 − 0.2781i |
| w87 | 01010111 | −0.7412 − 0.2345i |
| w88 | 01011000 | +1.4164 − 0.7386i |
| w89 | 01011001 | +0.2508 − 0.2043i |
| w90 | 01011010 | +0.8324 − 0.4499i |
| w91 | 01011011 | +0.6808 − 0.3821i |
| w92 | 01011100 | +1.5251 − 0.4510i |
| w93 | 01011101 | +0.2566 − 0.0761i |
| w94 | 01011110 | +0.8975 − 0.2781i |
| w95 | 01011111 | +0.7412 − 0.2345i |
| w96 | 01100000 | −0.7769 + 1.4193i |
| w97 | 01100001 | −0.0898 + 0.2628i |
| w98 | 01100010 | −0.4711 + 0.8645i |
| w99 | 01100011 | −0.3892 + 0.7279i |
| w100 | 01100100 | −0.4813 + 1.5486i |
| w101 | 01100101 | −0.0722 + 0.0860i |
| w102 | 01100110 | −0.2955 + 0.9492i |
| w103 | 01100111 | −0.2443 + 0.8036i |
| w104 | 01101000 | +0.7769 + 1.4193i |
| w105 | 01101001 | +0.0898 + 0.2628i |
| w106 | 01101010 | +0.4711 + 0.8645i |
| w107 | 01101011 | +0.3892 + 0.7279i |
| w108 | 01101100 | +0.4813 + 1.5486i |
| w109 | 01101101 | +0.0722 + 0.0860i |
| w110 | 01101110 | +0.2955 + 0.9492i |
| w111 | 01101111 | +0.2443 + 0.8036i |
| w112 | 01110000 | −0.7769 − 1.4193i |
| w113 | 01110001 | −0.0898 − 0.2628i |
| w114 | 01110010 | −0.4711 − 0.8645i |
| w115 | 01110011 | −0.3892 − 0.7279i |
| w116 | 01110100 | −0.4813 − 1.5486i |
| w117 | 01110101 | −0.0722 − 0.0860i |
| w118 | 01110110 | −0.2955 − 0.9492i |
| w119 | 01110111 | −0.2443 − 0.8036i |
| w120 | 01111000 | +0.7769 − 1.4193i |
| w121 | 01111001 | +0.0898 − 0.2628i |
| w122 | 01111010 | +0.4711 − 0.8645i |
| w123 | 01111011 | +0.3892 − 0.7279i |
| w124 | 01111100 | +0.4813 − 1.5486i |
| w125 | 01111101 | +0.0722 − 0.0860i |
| w126 | 01111110 | +0.2955 − 0.9492i |
| w127 | 01111111 | +0.2443 − 0.8036i |
| w128 | 10000000 | −1.0508 + 0.8392i |
| w129 | 10000001 | −0.3516 + 0.3079i |
| w130 | 10000010 | −0.8852 + 0.7128i |
| w131 | 10000011 | −0.4734 + 0.4145i |
| w132 | 10000100 | −1.3158 + 0.1269i |
| w133 | 10000101 | −0.4512 + 0.0729i |
| w134 | 10000110 | −1.1073 + 0.1093i |
| w135 | 10000111 | −0.6187 + 0.0756i |
| w136 | 10001000 | +1.0508 + 0.8392i |
| w137 | 10001001 | +0.3516 + 0.3079i |
| w138 | 10001010 | +0.8852 + 0.7128i |

-continued

| w index | bit label | Constellation point |
|---|---|---|
| w139 | 10001011 | +0.4734 + 0.4145i |
| w140 | 10001100 | +1.3158 + 0.1269i |
| w141 | 10001101 | +0.4512 + 0.0729i |
| w142 | 10001110 | +1.1073 + 0.1093i |
| w143 | 10001111 | +0.6187 + 0.0756i |
| w144 | 10010000 | −1.0508 − 0.8392i |
| w145 | 10010001 | −0.3516 − 0.3079i |
| w146 | 10010010 | −0.8852 − 0.7128i |
| w147 | 10010011 | −0.4734 − 0.4145i |
| w148 | 10010100 | −1.3158 − 0.1269i |
| w149 | 10010101 | −0.4512 − 0.0729i |
| w150 | 10010110 | −1.1073 − 0.1093i |
| w151 | 10010111 | −0.6187 − 0.0756i |
| w152 | 10011000 | +1.0508 − 0.8392i |
| w153 | 10011001 | +0.3516 − 0.3079i |
| w154 | 10011010 | +0.8852 − 0.7128i |
| w155 | 10011011 | +0.4734 − 0.4145i |
| w156 | 10011100 | +1.3158 − 0.1269i |
| w157 | 10011101 | +0.4512 − 0.0729i |
| w158 | 10011110 | +1.1073 − 0.1093i |
| w159 | 10011111 | +0.6187 − 0.0756i |
| w160 | 10100000 | −0.8734 + 1.0335i |
| w161 | 10100001 | −0.2145 + 0.4159i |
| w162 | 10100010 | −0.7384 + 0.8777i |
| w163 | 10100011 | −0.3752 + 0.5265i |
| w164 | 10100100 | −0.1381 + 1.3596i |
| w165 | 10100101 | −0.0693 + 0.5212i |
| w166 | 10100110 | −0.1180 + 1.1596i |
| w167 | 10100111 | −0.0788 + 0.6933i |
| w168 | 10101000 | +0.8734 + 1.0335i |
| w169 | 10101001 | +0.2145 + 0.4159i |
| w170 | 10101010 | +0.7384 + 0.8777i |
| w171 | 10101011 | +0.3752 + 0.5265i |
| w172 | 10101100 | +0.1381 + 1.3596i |
| w173 | 10101101 | +0.0693 + 0.5212i |
| w174 | 10101110 | +0.1180 + 1.1596i |
| w175 | 10101111 | +0.0788 + 0.6933i |
| w176 | 10110000 | −0.8734 − 1.0335i |
| w177 | 10110001 | −0.2145 − 0.4159i |
| w178 | 10110010 | −0.7384 − 0.8777i |
| w179 | 10110011 | −0.3752 − 0.5265i |
| w180 | 10110100 | −0.1381 − 1.3596i |
| w181 | 10110101 | −0.0693 − 0.5212i |
| w182 | 10110110 | −0.1180 − 1.1596i |
| w183 | 10110111 | −0.0788 − 0.6933i |
| w184 | 10111000 | +0.8734 − 1.0335i |
| w185 | 10111001 | +0.2145 − 0.4159i |
| w186 | 10111010 | +0.7384 − 0.8777i |
| w187 | 10111011 | +0.3752 − 0.5265i |
| w188 | 10111100 | +0.1381 − 1.3596i |
| w189 | 10111101 | +0.0693 − 0.5212i |
| w190 | 10111110 | +0.1180 − 1.1596i |
| w191 | 10111111 | +0.0788 − 0.6933i |
| w192 | 11000000 | −1.1844 + 0.6172i |
| w193 | 11000001 | −0.3812 + 0.2673i |
| w194 | 11000010 | −0.9957 + 0.5259i |
| w195 | 11000011 | −0.5340 + 0.3230i |
| w196 | 11000100 | −1.2728 + 0.3773i |
| w197 | 11000101 | −0.4434 + 0.1145i |
| w198 | 11000110 | −1.0701 + 0.3230i |
| w199 | 11000111 | −0.5946 + 0.1815i |
| w200 | 11001000 | +1.1844 + 0.6172i |
| w201 | 11001001 | +0.3812 + 0.2673i |
| w202 | 11001010 | +0.9957 + 0.5259i |
| w203 | 11001011 | +0.5340 + 0.3230i |
| w204 | 11001100 | +1.2728 + 0.3773i |
| w205 | 11001101 | +0.4434 + 0.1145i |
| w206 | 11001110 | +1.0701 + 0.3230i |
| w207 | 11001111 | +0.5946 + 0.1815i |
| w208 | 11010000 | −1.1844 − 0.6172i |
| w209 | 11010001 | −0.3812 − 0.2673i |
| w210 | 11010010 | −0.9957 − 0.5259i |
| w211 | 11010011 | −0.5340 − 0.3230i |
| w212 | 11010100 | −1.2728 − 0.3773i |
| w213 | 11010101 | −0.4434 − 0.1145i |
| w214 | 11010110 | −1.0701 − 0.3230i |
| w215 | 11010111 | −0.5946 − 0.1815i |
| w216 | 11011000 | +1.1844 − 0.6172i |
| w217 | 11011001 | +0.3812 − 0.2673i |
| w218 | 11011010 | +0.9957 − 0.5259i |
| w219 | 11011011 | +0.5340 − 0.3230i |
| w220 | 11011100 | +1.2728 − 0.3773i |
| w221 | 11011101 | +0.4434 − 0.1145i |
| w222 | 11011110 | +1.0701 − 0.3230i |
| w223 | 11011111 | +0.5946 − 0.1815i |
| w224 | 11100000 | −0.6562 + 1.1905i |
| w225 | 11100001 | −0.1928 + 0.4287i |
| w226 | 11100010 | −0.5570 + 1.0128i |
| w227 | 11100011 | −0.3076 + 0.5885i |
| w228 | 11100100 | −0.4076 + 1.3018i |
| w229 | 11100101 | −0.0896 + 0.5118i |
| w230 | 11100110 | −0.3468 + 1.1091i |
| w231 | 11100111 | −0.1793 + 0.6649i |
| w232 | 11101000 | +0.6562 + 1.1905i |
| w233 | 11101001 | +0.1928 + 0.4287i |
| w234 | 11101010 | +0.5570 + 1.0128i |
| w235 | 11101011 | +0.3076 + 0.5885i |
| w236 | 11101100 | +0.4076 + 1.3018i |
| w237 | 11101101 | +0.0896 + 0.5118i |
| w238 | 11101110 | +0.3468 + 1.1091i |
| w239 | 11101111 | +0.1793 + 0.6649i |
| w240 | 11110000 | −0.6562 − 1.1905i |
| w241 | 11110001 | −0.1928 − 0.4287i |
| w242 | 11110010 | −0.5570 − 1.0128i |
| w243 | 11110011 | −0.3076 − 0.5885i |
| w244 | 11110100 | −0.4076 − 1.3018i |
| w245 | 11110101 | −0.0896 − 0.5118i |
| w246 | 11110110 | −0.3468 − 1.1091i |
| w247 | 11110111 | −0.1793 − 0.6649i |
| w248 | 11111000 | +0.6562 − 1.1905i |
| w249 | 11111001 | +0.1928 − 0.4287i |
| w250 | 11111010 | +0.5570 − 1.0128i |
| w251 | 11111011 | +0.3076 − 0.5885i |
| w252 | 11111100 | +0.4076 − 1.3018i |
| w253 | 11111101 | +0.0896 − 0.5118i |
| w254 | 11111110 | +0.3468 − 1.1091i |
| w255 | 11111111 | +0.1793 − 0.6649i | for R=3/4 (or R=1/2, 5/8 or 13/16):

| w index | bit label | Constellation point |
|---|---|---|
| w0 | 0000000 | −0.5115 + 1.2063i |
| w1 | 0000000 | −0.5115 − 1.2063i |
| w2 | 0000001 | −0.3049 + 1.2378i |
| w3 | 0000001 | −0.3049 − 1.2378i |
| w4 | 0000010 | +0.5115 + 1.2063i |
| w5 | 0000010 | +0.5115 − 1.2063i |
| w6 | 0000011 | +0.3049 + 1.2378i |
| w7 | 0000011 | +0.3049 − 1.2378i |
| w8 | 0000100 | −0.4952 + 1.0059i |
| w9 | 0000100 | −0.4952 − 1.0059i |
| w10 | 0000101 | −0.3032 + 1.0518i |
| w11 | 0000101 | −0.3032 − 1.0518i |
| w12 | 0000110 | +0.4952 + 1.0059i |
| w13 | 0000110 | +0.4952 − 1.0059i |
| w14 | 0000111 | +0.3032 + 1.0518i |
| w15 | 0000111 | +0.3032 − 1.0518i |
| w16 | 0001000 | −1.1670 + 1.1014i |
| w17 | 0001000 | −1.1670 − 1.1014i |
| w18 | 0001001 | −0.1010 + 1.2545i |
| w19 | 0001001 | −0.1010 − 1.2545i |
| w20 | 0001010 | +1.1670 + 1.1014i |
| w21 | 0001010 | +1.1670 − 1.1014i |
| w22 | 0001011 | +0.1010 + 1.2545i |
| w23 | 0001011 | +0.1010 − 1.2545i |
| w24 | 0001100 | −1.2421 + 0.8557i |
| w25 | 0001100 | −1.2421 − 0.8557i |
| w26 | 0001101 | −0.0956 + 1.0676i |
| w27 | 0001101 | −0.0956 − 1.0676i |
| w28 | 0001110 | +1.2421 + 0.8557i |
| w29 | 0001110 | +1.2421 − 0.8557i |

-continued

| w index | bit label | Constellation point |
|---|---|---|
| w30 | 0001111 | +0.0956 + 1.0676i |
| w31 | 0001111 | +0.0956 − 1.0676i |
| w32 | 0010000 | −0.6286 + 0.6639i |
| w33 | 0010000 | −0.6286 − 0.6639i |
| w34 | 0010001 | −0.4729 + 0.6321i |
| w35 | 0010001 | −0.4729 − 0.6321i |
| w36 | 0010010 | +0.6286 + 0.6639i |
| w37 | 0010010 | +0.6286 − 0.6639i |
| w38 | 0010011 | +0.4729 + 0.6321i |
| w39 | 0010011 | +0.4729 − 0.6321i |
| w40 | 0010100 | −0.5851 + 0.8353i |
| w41 | 0010100 | −0.5851 − 0.8353i |
| w42 | 0010101 | −0.4392 + 0.7880i |
| w43 | 0010101 | −0.4392 − 0.7880i |
| w44 | 0010110 | +0.5851 + 0.8353i |
| w45 | 0010110 | +0.5851 − 0.8353i |
| w46 | 0010111 | +0.4392 + 0.7880i |
| w47 | 0010111 | +0.4392 − 0.7880i |
| w48 | 0011000 | −1.2110 + 0.5795i |
| w49 | 0011000 | −1.2110 − 0.5795i |
| w50 | 0011001 | −0.0690 + 0.5518i |
| w51 | 0011001 | −0.0690 − 0.5518i |
| w52 | 0011010 | +1.2110 + 0.5795i |
| w53 | 0011010 | +1.2110 − 0.5795i |
| w54 | 0011011 | +0.0690 + 0.5513i |
| w55 | 0011011 | +0.0690 − 0.5518i |
| w56 | 0011100 | −1.4215 + 0.6637i |
| w57 | 0011100 | −1.4215 − 0.6637i |
| w58 | 0011101 | −0.0552 + 0.6903i |
| w59 | 0011101 | −0.0552 − 0.6903i |
| w60 | 0011110 | +1.4215 + 0.6637i |
| w61 | 0011110 | +1.4215 − 0.6637i |
| w62 | 0011111 | +0.0552 + 0.6903i |
| w63 | 0011111 | +0.0552 − 0.6903i |
| w64 | 01000000 | −0.6596 + 0.0715i |
| w65 | 01000001 | −0.6596 − 0.0715i |
| w66 | 01000010 | −0.5124 + 0.0667i |
| w67 | 01000011 | −0.5124 − 0.0667i |
| w68 | 01000100 | +0.6596 + 0.0715i |
| w69 | 01000101 | +0.6596 − 0.0715i |
| w70 | 01000110 | +0.5124 + 0.0667i |
| w71 | 01000111 | +0.5124 − 0.0667i |
| w72 | 01001000 | −0.6597 + 0.2116i |
| w73 | 01001001 | −0.6597 − 0.2116i |
| w74 | 01001010 | −0.5095 + 0.2008i |
| w75 | 01001011 | −0.5095 − 0.2008i |
| w76 | 01001100 | +0.6597 + 0.2116i |
| w77 | 01001101 | +0.6597 − 0.2116i |
| w78 | 01001110 | +0.5095 + 0.2008i |
| w79 | 01001111 | +0.5095 − 0.2008i |
| w80 | 01010000 | −1.4366 + 0.1213i |
| w81 | 01010001 | −1.4366 − 0.1213i |
| w82 | 01010010 | −0.0739 + 0.0596i |
| w83 | 01010011 | −0.0739 − 0.0596i |
| w84 | 01010100 | +1.4366 + 0.1213i |
| w85 | 01010101 | +1.4366 − 0.1213i |
| w86 | 01010110 | +0.0739 + 0.0596i |
| w87 | 01010111 | +0.0739 − 0.0596i |
| w88 | 01011000 | −1.2098 + 0.1077i |
| w89 | 01011001 | −1.2098 − 0.1077i |
| w90 | 01011010 | −0.0731 + 0.1767i |
| w91 | 01011011 | −0.0731 − 0.1767i |
| w92 | 01011100 | +1.2098 + 0.1077i |
| w93 | 01011101 | +1.2098 − 0.1077i |
| w94 | 01011110 | +0.0731 + 0.1767i |
| w95 | 01011111 | +0.0731 − 0.1767i |
| w96 | 01100000 | −0.6467 + 0.5036i |
| w97 | 01100001 | −0.6467 − 0.5036i |
| w98 | 01100010 | −0.4945 + 0.4818i |
| w99 | 01100011 | −0.4946 − 0.4818i |
| w100 | 01100100 | +0.6467 + 0.5036i |
| w101 | 01100101 | +0.6467 − 0.5036i |
| w102 | 01100110 | +0.4946 + 0.4818i |
| w103 | 01100111 | +0.4946 − 0.4818i |
| w104 | 01101000 | −0.6572 + 0.3526i |
| w105 | 01101001 | −0.6572 − 0.3526i |
| w106 | 01101010 | −0.5050 + 0.3380i |
| w107 | 01101011 | −0.5050 − 0.3380i |
| w108 | 01101100 | +0.6572 + 0.3526i |
| w109 | 01101101 | +0.6572 − 0.3526i |
| w110 | 01101110 | +0.5050 + 0.3380i |
| w111 | 01101111 | +0.5050 − 0.3380i |
| w112 | 01110000 | −1.4264 + 0.3764i |
| w113 | 01110001 | −1.4264 − 0.3764i |
| w114 | 01110010 | −0.0715 + 0.4218i |
| w115 | 01110011 | −0.0715 − 0.4218i |
| w116 | 01110100 | +1.4264 + 0.3764i |
| w117 | 01110101 | +1.4264 − 0.3764i |
| w118 | 01110110 | +0.0715 + 0.4218i |
| w119 | 01110111 | +0.0715 − 0.4218i |
| w120 | 01111000 | −1.2130 + 0.3237i |
| w121 | 01111001 | −1.2130 − 0.3237i |
| w122 | 01111010 | −0.0725 + 0.2978i |
| w123 | 01111011 | −0.0725 − 0.2978i |
| w124 | 01111100 | +1.2130 + 0.3237i |
| w125 | 01111101 | +1.2130 − 0.3237i |
| w126 | 01111110 | +0.0725 + 0.2978i |
| w127 | 01111111 | +0.0725 − 0.2978i |
| w128 | 10000000 | −0.5901 + 1.4171i |
| w129 | 10000001 | −0.5901 − 1.4171i |
| w130 | 10000010 | −0.3511 + 1.4584i |
| w131 | 10000011 | −0.3511 − 1.4584i |
| w132 | 10000100 | +0.5901 + 1.4171i |
| w133 | 10000101 | +0.5901 − 1.4171i |
| w134 | 10000110 | +0.3511 + 1.4584i |
| w135 | 10000111 | +0.3511 − 1.4584i |
| w136 | 10001000 | −0.6935 + 1.0466i |
| W137 | 10001001 | −0.6935 − 1.0466i |
| w138 | 10001010 | −0.2603 + 0.9107i |
| w139 | 10001011 | −0.2603 − 0.9107i |
| w140 | 10001100 | +0.6935 + 1.0466i |
| w141 | 10001101 | +0.6935 − 1.0466i |
| w142 | 10001110 | +0.2603 + 0.9107i |
| w143 | 10001111 | +0.2603 − 0.9107i |
| w144 | 10010000 | −0.8039 + 1.2957i |
| w145 | 10010001 | −0.8039 − 1.2957i |
| w146 | 10010010 | −0.1167 + 1.4782i |
| w147 | 10010011 | −0.1167 − 1.4782i |
| w148 | 10010100 | +0.8039 + 1.2957i |
| w149 | 10010101 | +0.8039 − 1.2957i |
| w150 | 10010110 | +0.1167 + 1.4782i |
| w151 | 10010111 | +0.1167 − 1.4782i |
| w152 | 10011000 | −0.8956 + 1.0881i |
| w153 | 10011001 | −0.8956 − 1.0881i |
| w154 | 10011010 | −0.0882 + 0.8981i |
| w155 | 10011011 | −0.0882 − 0.8981i |
| w156 | 10011100 | +0.8956 + 1.0881i |
| w157 | 10011101 | +0.8956 − 1.0881i |
| w158 | 10011110 | +0.0882 + 0.8981i |
| w159 | 10011111 | +0.0882 − 0.8981i |
| w160 | 10100000 | −0.8022 + 0.6879i |
| w161 | 10100001 | −0.8022 − 0.6879i |
| w162 | 10100010 | −0.3274 + 0.6045i |
| w163 | 10100011 | −0.3274 − 0.6045i |
| w164 | 10100100 | +0.8022 + 0.6879i |
| w165 | 10100101 | +0.8022 − 0.6879i |
| w166 | 10100110 | +0.3274 + 0.6045i |
| w167 | 10100111 | +0.3274 − 0.6045i |
| w168 | 10101000 | −0.7622 + 0.8634i |
| w169 | 10101001 | −0.7622 − 0.8634i |
| w170 | 10101010 | −0.2965 + 0.7629i |
| w171 | 10101011 | −0.2965 − 0.7629i |
| w172 | 10101100 | +0.7622 + 0.8634i |
| w173 | 10101101 | +0.7622 − 0.8634i |
| w174 | 10101110 | +0.2965 + 0.7629i |
| w175 | 10101111 | +0.2965 − 0.7629i |
| w176 | 10110000 | −1.0082 + 0.6930i |
| w177 | 10110001 | −1.0082 − 0.6930i |
| w178 | 10110010 | −0.1987 + 0.5742i |
| w179 | 10110011 | −0.1987 − 0.5742i |
| w180 | 10110100 | +1.0082 + 0.6930i |
| w181 | 10110101 | +1.0082 − 0.6930i |
| w182 | 10110110 | +0.1987 + 0.5742i |
| w183 | 10110111 | +0.1987 − 0.5742i |

-continued

| w index | bit label | Constellation point |
| --- | --- | --- |
| w184 | 10111000 | −0.9647 + 0.8849i |
| w185 | 10111001 | −0.9647 − 0.8849i |
| w186 | 10111010 | −0.1564 + 0.7374i |
| w187 | 10111011 | −0.1564 − 0.7374i |
| w188 | 10111100 | +0.9647 + 0.8849i |
| w189 | 10111101 | +0.9647 − 0.8849i |
| w190 | 10111110 | +0.1564 + 0.7374i |
| w191 | 10111111 | +0.1564 − 0.7374i |
| w192 | 11000000 | −0.8131 + 0.0729i |
| w193 | 11000001 | −0.8131 − 0.0729i |
| w194 | 11000010 | −0.3658 + 0.0625i |
| w195 | 11000011 | −0.3658 − 0.0625i |
| w196 | 11000100 | +0.8131 + 0.0729i |
| w197 | 11000101 | +0.8131 − 0.0729i |
| w198 | 11000110 | +0.3658 + 0.0625i |
| w199 | 11000111 | +0.3658 − 0.0625i |
| w200 | 11001000 | −0.8246 + 0.2158i |
| w201 | 11001001 | −0.8246 − 0.2158i |
| w202 | 11001010 | −0.3642 + 0.1899i |
| w203 | 11001011 | −0.3642 − 0.1899i |
| w204 | 11001100 | +0.8245 + 0.2158i |
| w205 | 11001101 | +0.8246 − 0.2158i |
| w206 | 11001110 | +0.3642 + 0.1899i |
| w207 | 11001111 | +0.3642 − 0.1899i |
| w208 | 11010000 | −0.9801 + 0.0651i |
| w209 | 11010001 | −0.9801 − 0.0651i |
| w210 | 11010010 | −0.2198 + 0.0612i |
| w211 | 11010011 | −0.2198 − 0.0612i |
| w212 | 11010100 | +0.9801 + 0.0651i |
| w213 | 11010101 | +0.9801 − 0.0651i |
| w214 | 11010110 | +0.2198 + 0.0612i |
| w215 | 11010111 | +0.2198 − 0.0612i |
| w216 | 11011000 | −1.0115 + 0.2009i |
| w217 | 11011001 | −1.0115 − 0.2009i |
| w218 | 11011010 | −0.2192 + 0.1815i |
| w219 | 11011011 | −0.2192 − 0.1815i |
| w220 | 11011100 | +1.0115 + 0.2009i |
| w221 | 11011101 | +1.0115 − 0.2009i |
| w222 | 11011110 | +0.2192 + 0.1815i |
| w223 | 11011111 | +0.2192 − 0.1815i |
| w224 | 11100000 | −0.8086 + 0.5185i |
| w225 | 11100001 | −0.8086 − 0.5185i |
| w226 | 11100010 | −0.3499 + 0.4571i |
| w227 | 11100011 | −0.3499 − 0.4571i |
| w228 | 11100100 | +0.8086 + 0.5185i |
| w229 | 11100101 | +0.8086 − 0.5185i |
| w230 | 11100110 | +0.3499 + 0.4571i |
| w231 | 11100111 | +0.3499 − 0.4571i |
| w232 | 11101000 | −0.8245 + 0.3593i |
| w233 | 11101001 | −0.8245 − 0.3593i |
| w234 | 11101010 | −0.3599 + 0.3216i |
| w235 | 11101011 | −0.3599 − 0.3216i |
| w236 | 11101100 | +0.8245 + 0.3593i |
| w237 | 11101101 | +0.8245 − 0.3593i |
| w238 | 11101110 | +0.3599 + 0.3216i |
| w239 | 11101111 | +0.3599 − 0.3216i |
| w240 | 11110000 | −0.9814 + 0.5205i |
| w241 | 11110001 | −0.9814 − 0.5205i |
| w242 | 11110010 | −0.2115 + 0.4337i |
| w243 | 11110011 | −0.2115 − 0.4337i |
| w244 | 11110100 | +0.9814 + 0.5205i |
| w245 | 11110101 | +0.9814 − 0.5205i |
| w246 | 11110110 | +0.2115 + 0.4337i |
| w247 | 11110111 | +0.2115 − 0.4337i |
| w248 | 11111000 | −1.0163 + 0.3615i |
| w249 | 11111001 | −1.0163 − 0.3615i |
| w250 | 11111010 | −0.2167 + 0.3057i |
| w251 | 11111011 | −0.2167 − 0.3057i |
| w252 | 11111100 | +1.0163 + 0.3615i |
| w253 | 11111101 | +1.0163 − 0.3615i |
| w254 | 11111110 | +0.2167 + 0.3057i |
| w255 | 11111111 | +0.2167 − 0.3057i | for R=13/16 (or R=1/2, 5/8 or 3/4):

| w index | bit label | Constellation point |
| --- | --- | --- |
| w0 | 0000000 | −0.4934 + 1.1976i |
| w1 | 0000000 | −0.6474 + 0.6881i |
| w2 | 0000001 | −0.6614 + 0.0730i |
| w3 | 0000001 | −0.6545 + 0.5220i |
| w4 | 0000010 | −0.4787 + 1.0113i |
| w5 | 0000010 | −0.6010 + 0.8566i |
| w6 | 0000011 | −0.6676 + 0.2192i |
| w7 | 0000011 | −0.6674 + 0.3672i |
| w8 | 0000100 | −1.1592 + 1.0404i |
| w9 | 0000100 | −1.1898 + 0.5538i |
| w10 | 0000101 | −1.3908 + 0.1102i |
| w11 | 0000101 | −1.4081 + 0.3370i |
| w12 | 0000110 | −1.2410 + 0.8061i |
| w13 | 0000110 | −1.3911 + 0.5975i |
| w14 | 0000111 | −1.1855 + 0.1041i |
| w15 | 0000111 | −1.2043 + 0.3138i |
| w16 | 0001000 | −0.2985 + 1.2655i |
| w17 | 0001000 | −0.4920 + 0.6512i |
| w18 | 0001001 | −0.5130 + 0.0697i |
| w19 | 0001001 | −0.5045 + 0.4981i |
| w20 | 0001010 | −0.2876 + 1.0856i |
| w21 | 0001010 | −0.4556 + 0.8064i |
| w22 | 0001011 | −0.5147 + 0.2097i |
| w23 | 0001011 | −0.5132 + 0.3515i |
| w24 | 0001100 | −0.0980 + 1.2511i |
| w25 | 0001100 | −0.0701 + 0.5794i |
| w26 | 0001101 | −0.0734 + 0.0629i |
| w27 | 0001101 | −0.0724 + 0.4450i |
| w28 | 0001110 | −0.0934 + 1.0735i |
| w29 | 0001110 | −0.0582 + 0.7208i |
| w30 | 0001111 | −0.0734 + 0.1890i |
| w31 | 0001111 | −0.0731 + 0.3164i |
| w32 | 0010000 | −0.5534 + 1.3936i |
| w33 | 0010000 | −0.8188 + 0.7082i |
| w34 | 0010001 | −0.8139 + 0.0752i |
| w35 | 0010001 | −0.8096 + 0.5376i |
| w36 | 0010010 | −0.6787 + 1.0583i |
| w37 | 0010010 | −0.7729 + 0.8860i |
| w38 | 0010011 | −0.8305 + 0.2250i |
| w39 | 0010011 | −0.8315 + 0.3759i |
| w40 | 0010100 | −0.7567 + 1.2808i |
| w41 | 0010100 | −1.0161 + 0.7012i |
| w42 | 0010101 | −0.9757 + 0.0702i |
| w43 | 0010101 | −0.9739 + 0.5345i |
| w44 | 0010110 | −0.8952 + 1.0953i |
| w45 | 0010110 | −0.9646 + 0.8865i |
| w46 | 0010111 | −1.0091 + 0.2141i |
| w47 | 0010111 | −1.0164 + 0.3745i |
| w48 | 0011000 | −0.3350 + 1.4701i |
| w49 | 0011000 | −0.3446 + 0.6254i |
| w50 | 0011001 | −0.3664 + 0.0666i |
| w51 | 0011001 | −0.3586 + 0.4775i |
| w52 | 0011010 | −0.2713 + 0.9300i |
| w53 | 0011010 | −0.3149 + 0.7791i |
| w54 | 0011011 | −0.3666 + 0.2005i |
| w55 | 0011011 | −0.3649 + 0.3365i |
| w56 | 0011100 | −0.1095 + 1.4559i |
| w57 | 0011100 | −0.2067 + 0.6018i |
| w58 | 0011101 | −0.2200 + 0.0642i |
| w59 | 0011101 | −0.2160 + 0.4587i |
| w60 | 0011110 | −0.0910 + 0.9104i |
| w61 | 0011110 | −0.1761 + 0.7590i |
| w62 | 0011111 | −0.2199 + 0.1932i |
| w63 | 0011111 | −0.2191 + 0.3239i |
| w64 | 01000000 | −0.4934 − 1.1976i |
| w65 | 01000001 | −0.6474 − 0.6881i |
| w66 | 01000010 | −0.6614 − 0.0730i |
| w67 | 01000011 | −0.6545 − 0.5220i |
| w68 | 01000100 | −0.4787 − 1.0113i |
| w69 | 01000101 | −0.6010 − 0.8566i |
| w70 | 01000110 | −0.6676 − 0.2192i |
| w71 | 01000111 | −0.6674 − 0.3672i |
| w72 | 01001000 | −1.1592 − 1.0404i |
| w73 | 01001001 | −1.1898 − 0.5538i |
| w74 | 01001010 | −1.3908 − 0.1102i |
| w75 | 01001011 | −1.4081 − 0.3370i |

-continued

| w index | bit label | Constellation point |
|---|---|---|
| w76 | 01001100 | −1.2410 − 0.8061i |
| w77 | 01001101 | −1.3911 − 0.5975i |
| w78 | 01001110 | −1.1855 − 0.1041i |
| w79 | 01001111 | −1.2043 − 0.3138i |
| w80 | 01010000 | −0.2985 − 1.2655i |
| w81 | 01010001 | −0.4920 − 0.6512i |
| w82 | 01010010 | −0.5130 − 0.0697i |
| w83 | 01010011 | −0.5045 − 0.4981i |
| w84 | 01010100 | −0.2876 − 1.0856i |
| w85 | 01010101 | −0.4556 − 0.8064i |
| w86 | 01010110 | −0.5147 − 0.2097i |
| w87 | 01010111 | −0.5132 − 0.3515i |
| w88 | 01011000 | −0.0980 − 1.2511i |
| w89 | 01011001 | −0.0701 − 0.5794i |
| w90 | 01011010 | −0.0734 − 0.0629i |
| w91 | 01011011 | −0.0724 − 0.4460i |
| w92 | 01011100 | −0.0934 − 1.0735i |
| w93 | 01011101 | −0.0582 − 0.7208i |
| w94 | 01011110 | −0.0734 − 0.1890i |
| w95 | 01011111 | −0.0731 − 0.3164i |
| w96 | 01100000 | −0.5534 − 1.3936i |
| w97 | 01100001 | −0.8188 − 0.7082i |
| w98 | 01100010 | −0.8139 − 0.0752i |
| w99 | 01100011 | −0.8096 − 0.5376i |
| w100 | 01100100 | −0.6787 − 1.0583i |
| w101 | 01100101 | −0.7729 − 0.8860i |
| w102 | 01100110 | −0.8305 − 0.2250i |
| w103 | 01100111 | −0.8315 − 0.3759i |
| w104 | 01101000 | −0.7567 − 1.2808i |
| w105 | 01101001 | −1.0161 − 0.7012i |
| w106 | 01101010 | −0.9757 − 0.0702i |
| w107 | 01101011 | −0.9739 − 0.5345i |
| w108 | 01101100 | −0.8952 − 1.0953i |
| w109 | 01101101 | −0.9646 − 0.8865i |
| w110 | 01101110 | −1.0091 − 0.2141i |
| w111 | 01101111 | −1.0164 − 0.3745i |
| w112 | 01110000 | −0.3350 − 1.4701i |
| w113 | 01110001 | −0.3446 − 0.6254i |
| w114 | 01110010 | −0.3664 − 0.0666i |
| w115 | 01110011 | −0.3586 − 0.4775i |
| w116 | 01110100 | −0.2713 − 0.9300i |
| w117 | 01110101 | −0.3149 − 0.7791i |
| w118 | 01110110 | −0.3666 − 0.2005i |
| w119 | 01110111 | −0.3649 − 0.3365i |
| w120 | 01111000 | −0.1095 − 1.4559i |
| w121 | 01111001 | −0.2067 − 0.6018i |
| w122 | 01111010 | −0.2200 − 0.0642i |
| w123 | 01111011 | −0.2160 − 0.4587i |
| w124 | 01111100 | −0.0910 − 0.9104i |
| w125 | 01111101 | −0.1761 − 0.7590i |
| w126 | 01111110 | −0.2199 − 0.1932i |
| w127 | 01111111 | −0.2191 − 0.3239i |
| w128 | 10000000 | +0.4934 + 1.1976i |
| w129 | 10000001 | +0.6474 + 0.6881i |
| w130 | 10000010 | +0.6614 + 0.0730i |
| w131 | 10000011 | +0.6545 + 0.5220i |
| w132 | 10000100 | +0.4787 + 1.0113i |
| w133 | 10000101 | +0.6010 + 0.8566i |
| w134 | 10000110 | +0.6676 + 0.2192i |
| w135 | 10000111 | +0.6674 + 0.3672i |
| w136 | 10001000 | +1.1592 + 1.0404i |
| w137 | 10001001 | +1.1898 + 0.5538i |
| w138 | 10001010 | +1.3908 + 0.1102i |
| w139 | 10001011 | +1.4081 + 0.3370i |
| w140 | 10001100 | +1.2410 + 0.8061i |
| w141 | 10001101 | +1.3911 + 0.5975i |
| w142 | 10001110 | +1.1855 + 0.1041i |
| w143 | 10001111 | +1.2043 + 0.3138i |
| w144 | 10010000 | +0.2985 + 1.2655i |
| w145 | 10010001 | +0.4920 + 0.6512i |
| w146 | 10010010 | +0.5130 + 0.0697i |
| w147 | 10010011 | +0.5045 + 0.4981i |
| w148 | 10010100 | +0.2876 + 1.0856i |
| w149 | 10010101 | +0.4556 + 0.8064i |
| w150 | 10010110 | +0.5147 + 0.2097i |
| w151 | 10010111 | +0.5132 + 0.3515i |
| w152 | 10011000 | +0.0980 + 1.2511i |
| w153 | 10011001 | +0.0701 + 0.5794i |
| w154 | 10011010 | +0.0734 + 0.0629i |
| w155 | 10011011 | +0.0724 + 0.4450i |
| w156 | 10011100 | +0.0934 + 1.0735i |
| w157 | 10011101 | +0.0582 + 0.7208i |
| w158 | 10011110 | +0.0734 + 0.1890i |
| w159 | 10011111 | +0.0731 + 0.3164i |
| w160 | 10100000 | +0.5534 + 1.3936i |
| w161 | 10100001 | +0.8188 + 0.7082i |
| w162 | 10100010 | +0.8139 + 0.0752i |
| w163 | 10100011 | +0.8096 + 0.5376i |
| w164 | 10100100 | +0.6787 + 1.0583i |
| w165 | 10100101 | +0.7729 + 0.8860i |
| w166 | 10100110 | +0.8305 + 0.2250i |
| w167 | 10100111 | +0.8315 + 0.3759i |
| w168 | 10101000 | +0.7567 + 1.2808i |
| w169 | 10101001 | +1.0161 + 0.7012i |
| w170 | 10101010 | +0.9757 + 0.0702i |
| w171 | 10101011 | +0.9739 + 0.5345i |
| w172 | 10101100 | +0.8952 + 1.0953i |
| w173 | 10101101 | +0.9646 + 0.8865i |
| w174 | 10101110 | +1.0091 + 0.2141i |
| w175 | 10101111 | +1.0164 + 0.3745i |
| w176 | 10110000 | +0.3350 + 1.4701i |
| w177 | 10110001 | +0.3446 + 0.6254i |
| w178 | 10110010 | +0.3664 + 0.0666i |
| w179 | 10110011 | +0.3586 + 0.4775i |
| w180 | 10110100 | +0.2713 + 0.9300i |
| w181 | 10110101 | +0.3149 + 0.7791i |
| w182 | 10110110 | +0.3666 + 0.2005i |
| w183 | 10110111 | +0.3649 + 0.3365i |
| w184 | 10111000 | +0.1095 + 1.4559i |
| w185 | 10111001 | +0.2067 + 0.6018i |
| w186 | 10111010 | +0.2200 + 0.0642i |
| w187 | 10111011 | +0.2160 + 0.4587i |
| w188 | 10111100 | +0.0910 + 0.9104i |
| w189 | 10111101 | +0.1761 + 0.7590i |
| w190 | 10111110 | +0.2199 + 0.1932i |
| w191 | 10111111 | +0.2191 + 0.3239i |
| w192 | 11000000 | +0.4934 − 1.1976i |
| w193 | 11000001 | +0.6474 − 0.6881i |
| w194 | 11000010 | +0.6614 − 0.0730i |
| w195 | 11000011 | +0.6545 − 0.5220i |
| w196 | 11000100 | +0.4787 − 1.0113i |
| w197 | 11000101 | +0.6010 − 0.8566i |
| w198 | 11000110 | +0.6676 − 0.2192i |
| w199 | 11000111 | +0.6674 − 0.3672i |
| w200 | 11001000 | +1.1592 − 1.0404i |
| w201 | 11001001 | +1.1898 − 0.5538i |
| w202 | 11001010 | +1.3908 − 0.1102i |
| w203 | 11001011 | +1.4081 − 0.3370i |
| w204 | 11001100 | +1.2410 − 0.8061i |
| w205 | 11001101 | +1.3911 − 0.5975i |
| w206 | 11001110 | +1.1855 − 0.1041i |
| w207 | 11001111 | +1.2043 − 0.3138i |
| w208 | 11010000 | +0.2985 − 1.2655i |
| w209 | 11010001 | +0.4920 − 0.6512i |
| w210 | 11010010 | +0.5130 − 0.0697i |
| w211 | 11010011 | +0.5045 − 0.4981i |
| w212 | 11010100 | +0.2876 − 1.0856i |
| w213 | 11010101 | +0.4556 − 0.8064i |
| w214 | 11010110 | +0.5147 − 0.2097i |
| w215 | 11010111 | +0.5132 − 0.3515i |
| w216 | 11011000 | +0.0980 − 1.2511i |
| w217 | 11011001 | +0.0701 − 0.5794i |
| w218 | 11011010 | +0.0734 − 0.0629i |
| w219 | 11011011 | +0.0724 − 0.4460i |
| w220 | 11011100 | +0.0934 − 1.0735i |
| w221 | 11011101 | +0.0582 − 0.7208i |
| w222 | 11011110 | +0.0734 − 0.1890i |
| w223 | 11011111 | +0.0731 − 0.3164i |
| w224 | 11100000 | +0.5534 − 1.3936i |
| w225 | 11100001 | +0.8188 − 0.7082i |
| w226 | 11100010 | +0.8139 − 0.0752i |
| w227 | 11100011 | +0.8096 − 0.5376i |
| w228 | 11100100 | +0.6787 − 1.0583i |
| w229 | 11100101 | +0.7729 − 0.8860i |

| w index | bit label | Constellation point |
|---|---|---|
| w230 | 11100110 | +0.8305 − 0.2250i |
| w231 | 11100111 | +0.8315 − 0.3759i |
| w232 | 11101000 | +0.7567 − 1.2808i |
| w233 | 11101001 | +1.0161 − 0.7012i |
| w234 | 11101010 | +0.9757 − 0.0702i |
| w235 | 11101011 | +0.9739 − 0.5345i |
| w236 | 11101100 | +0.8952 − 1.0953i |
| w237 | 11101101 | +0.9646 − 0.8865i |
| w238 | 11101110 | +1.0091 − 0.2141i |
| w239 | 11101111 | +1.0164 − 0.3745i |
| w240 | 11110000 | +0.3350 − 1.4701i |
| w241 | 11110001 | +0.3446 − 0.6254i |
| w242 | 11110010 | +0.3664 − 0.0666i |
| w243 | 11110011 | +0.3586 − 0.4775i |
| w244 | 11110100 | +0.2713 − 0.9300i |
| w245 | 11110101 | +0.3149 − 0.7791i |
| w246 | 11110110 | +0.3666 − 0.2005i |
| w247 | 11110111 | +0.3649 − 0.3365i |
| w248 | 11111000 | +0.1095 − 1.4559i |
| w249 | 11111001 | +0.2067 − 0.6018i |
| w250 | 11111010 | +0.2200 − 0.0642i |
| w251 | 11111011 | +0.2160 − 0.4587i |
| w252 | 11111100 | +0.0910 − 0.9104i |
| w253 | 11111101 | +0.1761 − 0.7590i |
| w254 | 11111110 | +0.2199 + 0.1932i |
| w255 | 11111111 | +0.2191 − 0.3239i |

If SC is used as PHY mode and if M=16, 32, 64, 128 or 256, a non-uniform constellation and bit labeling is used from a group B, the group B comprising constellations as defined in:

sub-group B1 for 16-QAM with M=16 and code rates of 1/2, 5/8 or 3/4, sub-group B2 for 32-QAM with M=32 and code rates of 1/2, 5/8, 3/4 or 13/16, sub-group B3 for 64-QAM with M=64 and code rates of 1/2, 5/8, 3/4 or 13/16, sub-group B4 for 128-QAM with M=128 and code rates of 1/2, 5/8, 3/4 or 13/16, and sub-group B5 for 256-QAM with M=256 and code rates of 1/2, 5/8, 3/4 or 13/16, wherein the constellation points are defined by a constellation position vector $w_0 \ldots w_{M-1}$ and wherein the constellation position vectors of the different constellations are defined as follows:

B) M-QAM non-uniform constellations of group B for single carrier mode as PHY mode:

B1) 16-QAM NUC

| w | bit label | R = 1/2 (MCS = 10) (or R = 5/8 or 3/4) | R = 5/8 (MCS = 11) (or R = 1/2 or 3/4) | R = 3/4 (MCS = 12) (or R = 1/2 or 5/8) |
|---|---|---|---|---|
| w0 | 0000 | +0.4925 + 1.2040i | +0.2173 + 0.4189i | +0.2949 − 0.2949i |
| w1 | 0001 | +0.4925 − 1.2040i | +0.4326 + 1.1445i | +0.9555 − 0.2949i |
| w2 | 0010 | +0.2530 + 0.4936i | −0.2173 + 0.4189i | −0.2949 − 0.2949i |
| w3 | 0011 | +0.2530 − 0.4936i | −0.4326 + 1.1445i | −0.9555 − 0.2949i |
| w4 | 0100 | −0.4925 + 1.2040i | +0.2173 − 0.4189i | +0.2949 − 0.9555i |
| w5 | 0101 | −0.4925 − 1.2040i | +0.4326 − 1.1445i | +0.9555 − 0.9555i |
| w6 | 0110 | −0.2530 + 0.4936i | −0.2173 − 0.4189i | −0.2949 − 0.9555i |
| w7 | 0111 | −0.2530 − 0.4936i | −0.4326 − 1.1445i | −0.9555 − 0.9555i |
| w8 | 1000 | +1.2040 + 0.4925i | +0.6578 + 0.2571i | +0.2949 + 0.2949i |
| w9 | 1001 | +1.2040 − 0.4925i | +1.2088 + 0.5659i | +0.9555 + 0.2949i |
| w10 | 1010 | +0.4936 + 0.2530i | −0.6578 + 0.2571i | −0.2949 + 0.2949i |
| w11 | 1011 | +0.4936 − 0.2530i | −1.2088 + 0.5659i | −0.9555 + 0.2949i |
| w12 | 1100 | −1.2040 + 0.4925i | +0.6578 − 0.2571i | +0.2949 + 0.9555i |
| w13 | 1101 | −1.2040 − 0.4925i | +1.2088 − 0.5659i | +0.9555 + 0.9555i |
| w14 | 1110 | −0.4936 + 0.2530i | −0.6578 − 0.2571i | −0.2949 + 0.9555i |
| w15 | 1111 | −0.4936 − 0.2530i | −1.2088 − 0.5659i | −0.9555 + 0.9555i |

B2) 32-QAM NUC

| w/MCS index | bit label | R = 1/2 (or R = 5/8, 3/4 or 13/16) | R = 5/8 (or R = 1/2, 3/4 or 13/16) | R = 3/4 (or R = 1/2, 5/8 or 13/16) | R = 13/16 (or R = 1/2, 5/8 or 3/4) |
|---|---|---|---|---|---|
| w0 | 00000 | +0.1929 + 0.1744i | +0.2187 + 0.1559i | +0.2113 + 0.1813i | +0.2082 + 0.1996i |
| w1 | 00001 | +0.2283 + 0.5038i | +0.2225 + 0.5103i | +0.6163 + 1.2930i | +0.6964 + 1.2272i |
| w2 | 00010 | +0.6963 + 0.1782i | +0.2187 − 0.1559i | +0.2113 − 0.1819i | +0.2041 + 0.6147i |
| w3 | 00011 | +0.6364 + 0.4437i | +0.2225 − 0.5103i | +0.6163 − 1.2930i | +0.2297 + 1.0778i |
| w4 | 00100 | +0.1929 − 0.1744i | −0.2187 + 0.1559i | +0.6590 + 0.1934i | +0.6409 + 0.2027i |
| w5 | 00101 | +0.2283 − 0.5036i | −0.2225 + 0.5103i | +1.1691 + 0.2524i | +1.1236 + 0.2383i |
| w6 | 00110 | +0.6963 − 0.1782i | −0.2187 − 0.1559i | +0.6590 − 0.1934i | +0.6262 + 0.6234i |
| w7 | 00111 | +0.6364 − 0.4437i | −0.2225 − 0.5103i | +1.1691 − 0.2524i | +1.0921 + 0.7399i |
| w8 | 01000 | +0.3541 + 1.4168i | +0.7211 + 0.1755i | −0.2113 + 0.1819i | +0.2082 − 0.1996i |
| w9 | 01001 | +0.2627 + 0.9170i | +0.6446 + 0.5183i | −0.6163 + 1.2930i | +0.6964 − 1.2272i |
| w10 | 01010 | +1.3162 + 0.3270i | +0.7211 − 0.1755i | −0.2113 − 0.1819i | +0.2041 − 0.6147i |
| w11 | 01011 | +0.9382 + 0.8637i | +0.6446 − 0.5183i | −0.6163 − 1.2930i | +0.2297 − 1.0778i |
| w12 | 01100 | +0.3541 − 1.4168i | −0.7211 + 0.1755i | −0.6590 + 0.1934i | +0.6409 − 0.2027i |
| w13 | 01101 | +0.2627 − 0.9170i | −0.6446 + 0.5183i | −1.1691 + 0.2524i | +1.1236 − 0.2383i |
| w14 | 01110 | +1.3162 − 0.3270i | −0.7211 − 0.1755i | −0.6590 − 0.1934i | +0.6262 − 0.6234i |
| w15 | 01111 | +0.9382 − 0.8637i | −0.6446 − 0.5183i | −1.1691 − 0.2524i | +1.0921 − 0.7399i |
| w16 | 10000 | −0.1929 + 0.1744i | +0.3459 + 1.3987i | +0.2042 + 0.5736i | −0.2082 + 0.1996i |
| w17 | 10001 | −0.2283 + 0.5036i | +0.2415 + 0.9207i | +0.2154 + 1.0277i | −0.6964 + 1.2272i |
| w18 | 10010 | −0.6963 + 0.1782i | +0.3459 − 1.3987i | +0.2042 − 0.5736i | −0.2041 + 0.6147i |

-continued

| w/MCS index | bit label | R = ½ (or R = ⅝, ¾ or ¹³/₁₆) | R = ⅝ (or R = ½, ¾ or ¹³/₁₆) | R = ¾ (or R = ½, ⅝ or ¹³/₁₆) | R = ¹³/₁₆ (or R = ½, ⅝ or ¾) |
|---|---|---|---|---|---|
| w19 | 10011 | −0.6364 + 0.4437i | +0.2415 − 0.9207i | +0.2154 − 1.0277i | −0.2297 + 1.0778i |
| w20 | 10100 | −0.1929 − 0.1744i | −0.3459 + 1.3987i | +0.6214 + 0.5984i | −0.6409 + 0.2027i |
| w21 | 10101 | −0.2283 − 0.5036i | −0.2415 + 0.9207i | +1.0670 + 0.7825i | −1.1236 + 0.2383i |
| w22 | 10110 | −0.6963 − 0.1782i | −0.3459 − 1.3987i | +0.6214 − 0.5984i | −0.6262 + 0.6234i |
| w23 | 10111 | −0.6364 − 0.4437i | −0.2415 − 0.9207i | +1.0670 − 0.7825i | −1.0921 + 0.7399i |
| w24 | 11000 | −0.3541 + 1.4168i | +1.2734 + 0.3186i | −0.2042 + 0.5736i | −0.2082 − 0.1996i |
| w25 | 11001 | −0.2627 + 0.9170i | +0.9258 + 0.9059i | −0.2154 + 1.0277i | −0.6964 − 1.2272i |
| w26 | 11010 | −1.3162 + 0.3270i | +1.2734 − 0.3186i | −0.2042 − 0.5736i | −0.2041 − 0.6147i |
| w27 | 11011 | −0.9382 + 0.8637i | +0.9258 − 0.9059i | −0.2154 − 1.0277i | −0.2297 − 1.0778i |
| w28 | 11100 | −0.3541 − 1.4168i | −1.2734 + 0.3186i | −0.6214 + 0.5984i | −0.6409 − 0.2027i |
| w29 | 11101 | −0.2627 − 0.9170i | −0.9258 + 0.9059i | −1.0670 + 0.7825i | −1.1236 − 0.2383i |
| w30 | 11110 | −1.3162 − 0.3270i | −1.2734 − 0.3186i | −0.6214 − 0.5984i | −0.6262 − 0.6234i |
| w31 | 11111 | −0.9382 − 0.8637i | −0.9258 − 0.9059i | −1.0670 − 0.7825i | −1.0921 − 0.7399i |

B3) 64-QAM NUC

| w/MCS index | bit label | R = ½ (or R = ⅝, ¾ or ¹³/₁₆) | R = ⅝ (or R = ½, ¾ or ¹³/₁₆) | R = ¾ (or R = ½, ⅝ or ¹³/₁₆) | R = ¹³/₁₆ (or R = ½, ⅝ or ¾) |
|---|---|---|---|---|---|
| w0 | 000000 | +1.4732 + 0.2920i | +1.4730 + 0.3019i | +1.0501 − 0.1676i | +1.0414 − 0.1712i |
| w1 | 000001 | +1.2487 + 0.8348i | −1.4730 + 0.3019i | +1.4380 − 0.2294i | +0.7230 − 0.1517i |
| w2 | 000010 | +1.4732 − 0.2920i | +1.0895 − 0.2172i | +0.1398 − 0.1309i | +1.0997 − 0.5419i |
| w3 | 000011 | +1.2487 − 0.8348i | −1.0895 − 0.2172i | +0.1680 − 1.0338i | +0.7484 − 0.4663i |
| w4 | 000100 | +1.0283 + 0.2071i | +0.1419 + 0.1122i | +1.0725 − 0.5328i | −1.0414 − 0.1712i |
| w5 | 000101 | +0.8760 + 0.5811i | −0.1419 + 0.1122i | +1.0771 − 0.9315i | −0.7230 − 0.1517i |
| w6 | 000110 | +1.0283 − 0.2071i | +0.7863 + 0.1337i | +0.1361 − 0.4023i | −1.0997 − 0.5419i |
| w7 | 000111 | +0.8760 − 0.5811i | −0.7863 + 0.1337i | +0.1373 − 0.7043i | −0.7484 − 0.4663i |
| w8 | 001000 | −1.4732 + 0.2920i | +1.4730 − 0.3019i | +1.0501 + 0.1676i | +1.0414 + 0.1712i |
| w9 | 001001 | −1.2487 + 0.8348i | −1.4730 − 0.3019i | +1.4380 + 0.2294i | +0.7230 + 0.1517i |
| w10 | 001010 | −1.4732 − 0.2920i | +1.0895 − 0.2172i | +0.1398 + 0.1309i | +1.0997 + 0.5419i |
| w11 | 001011 | −1.2487 − 0.8348i | −1.0895 − 0.2172i | +0.1680 + 1.0338i | +0.7484 + 0.4663i |
| w12 | 001100 | −1.0283 + 0.2071i | +0.1419 − 0.1122i | +1.0725 + 0.5328i | −1.0414 + 0.1712i |
| w13 | 001101 | −0.8760 + 0.5811i | −0.1419 − 0.1122i | +1.0771 + 0.9315i | −0.7230 + 0.1517i |
| w14 | 001110 | −1.0283 − 0.2071i | +0.7863 − 0.1337i | +0.1361 + 0.4023i | −1.0997 + 0.5419i |
| w15 | 001111 | −0.8760 − 0.5811i | −0.7863 − 0.1337i | +0.1373 + 0.7043i | −0.7484 + 0.4663i |
| w16 | 010000 | +0.2920 + 1.4732i | +1.2124 + 0.8333i | +0.7233 − 0.1496i | +0.1414 − 0.1379i |
| w17 | 010001 | +0.8348 + 1.2487i | −1.2124 + 0.8333i | +0.6220 − 1.1896i | +0.4272 − 0.1421i |
| w18 | 010010 | +0.2920 − 1.4732i | +0.8988 + 0.5768i | +0.4246 − 0.1370i | +0.1440 − 0.4167i |
| w19 | 010011 | +0.8348 − 1.2487i | −0.8988 + 0.5768i | +0.2326 − 1.3986i | +0.4369 − 0.4317i |
| w20 | 010100 | +0.2071 + 1.0283i | +0.3733 + 0.1498i | +0.7267 − 0.4592i | −0.1414 − 0.1379i |
| w21 | 010101 | +0.5811 + 0.8760i | −0.3733 + 0.1498i | +0.6956 − 0.8095i | −0.4272 − 0.1421i |
| w22 | 010110 | +0.2071 − 1.0283i | +0.6394 + 0.3211i | +0.4198 − 0.4151i | −0.1440 − 0.4167i |
| w23 | 010111 | +0.5811 − 0.8760i | −0.6394 + 0.3211i | +0.4114 − 0.7109i | −0.4369 − 0.4317i |
| w24 | 011000 | −0.2920 + 1.4732i | +1.2124 − 0.8333i | +0.7233 + 0.1496i | +0.1414 + 0.1379i |
| w25 | 011001 | −0.8348 + 1.2487i | −1.2124 − 0.8333i | +0.6220 + 1.1896i | +0.4272 + 0.1421i |
| w26 | 011010 | −0.2920 − 1.4732i | +0.8988 − 0.5768i | +0.4246 + 0.1370i | +0.1440 + 0.4167i |
| w27 | 011011 | −0.8348 − 1.2487i | −0.8988 − 0.5768i | +0.2326 + 1.3986i | +0.4369 + 0.4317i |
| w28 | 011100 | −0.2071 + 1.0283i | +0.3733 − 0.1498i | +0.7267 + 0.4592i | −0.1414 + 0.1379i |
| w29 | 011101 | −0.5811 + 0.8760i | −0.3733 − 0.1498i | +0.6956 + 0.8095i | −0.4272 + 0.1421i |
| w30 | 011110 | −0.2071 − 1.0283i | +0.6394 − 0.3211i | +0.4198 + 0.4151i | −0.1440 + 0.4167i |
| w31 | 011111 | −0.5811 − 0.8760i | −0.6394 − 0.3211i | +0.4114 + 0.7109i | −0.4369 + 0.4317i |
| w32 | 100000 | +0.3138 + 0.1393i | +0.2775 + 1.4188i | −1.0501 − 0.1676i | +1.4058 − 0.2115i |
| w33 | 100001 | +0.3094 + 0.1671i | −0.2775 + 1.4188i | −1.4380 − 0.2294i | +0.5981 − 1.1597i |
| w34 | 100010 | +0.3138 − 0.1393i | +0.2177 + 1.0243i | −0.1398 − 0.1309i | +1.0691 − 0.9443i |
| w35 | 100011 | +0.3094 − 0.1671i | −0.2177 + 1.0243i | −0.1680 − 1.0338i | +0.7360 − 0.8042i |
| w36 | 100100 | +0.7004 + 0.1720i | +0.1138 + 0.3999i | −1.0725 − 0.5328i | −1.4058 − 0.2115i |
| w37 | 100101 | +0.6174 + 0.3741i | −0.1138 + 0.3999i | −1.0771 − 0.9315i | −0.5981 − 1.1597i |
| w38 | 100110 | +0.7004 − 0.1720i | +0.1487 + 0.7260i | −0.1361 − 0.4023i | −1.0691 − 0.9443i |
| w39 | 100111 | +0.6174 − 0.3741i | −0.1487 + 0.7260i | −0.1373 − 0.7043i | −0.7360 − 0.8042i |
| w40 | 101000 | −0.3138 + 0.1393i | +0.2775 − 1.4188i | −1.0501 + 0.1676i | +1.4058 + 0.2115i |
| w41 | 101001 | −0.3094 + 0.1671i | −0.2775 − 1.4188i | −1.4380 + 0.2294i | +0.5981 + 1.1597i |
| w42 | 101010 | −0.3138 − 0.1393i | +0.2177 − 1.0243i | −0.1398 + 0.1309i | +1.0691 + 0.9443i |
| w43 | 101011 | −0.3094 − 0.1671i | −0.2177 − 1.0243i | −0.1680 + 1.0338i | +0.7360 + 0.8042i |
| w44 | 101100 | −0.7004 + 0.1720i | +0.1138 − 0.3999i | −1.0725 + 0.5328i | −1.4058 + 0.2115i |
| w45 | 101101 | −0.6174 + 0.3741i | −0.1138 − 0.3999i | −1.0771 + 0.9315i | −0.5981 + 1.1597i |
| w46 | 101110 | −0.7004 − 0.1720i | +0.1487 − 0.7260i | −0.1361 + 0.4023i | −1.0691 + 0.9443i |
| w47 | 101111 | −0.6174 − 0.3741i | −0.1487 − 0.7260i | −0.1373 + 0.7043i | −0.7360 + 0.8042i |
| w48 | 110000 | +0.1393 + 0.3138i | +0.7921 + 1.2096i | −0.7233 − 0.1496i | +0.1695 − 1.0298i |
| w49 | 110001 | +0.1671 + 0.3094i | −0.7921 + 1.2096i | −0.6220 − 1.1896i | +0.2236 − 1.3784i |
| w50 | 110010 | +0.1393 − 0.3138i | +0.6056 + 0.8481i | −0.4246 − 0.1370i | +0.1426 − 0.7102i |
| w51 | 110011 | +0.1671 − 0.3094i | −0.6056 + 0.8481i | −0.2326 − 1.3986i | +0.4351 − 0.7394i |

-continued

| w/MCS index | bit label | R = ½ (or R = ⅝, ¾ or ¹³⁄₁₆) | R = ⅝ (or R = ½, ¾ or ¹³⁄₁₆) | R = ¾ (or R = ½, ⅝ or ¹³⁄₁₆) | R = ¹³⁄₁₆ (or R = ½, ⅝ or ¾) |
|---|---|---|---|---|---|
| w52 | 110100 | +0.1720 + 0.7004i | +0.2891 + 0.3910i | −0.7267 − 0.4592i | −0.1695 − 1.0298i |
| w53 | 110101 | +0.3741 + 0.6174i | −0.2891 + 0.3910i | −0.6956 − 0.8095i | −0.2236 − 1.3784i |
| w54 | 110110 | +0.1720 − 0.7004i | +0.4397 + 0.5853i | −0.4198 − 0.4151i | −0.1426 − 0.7102i |
| w55 | 110111 | +0.3741 − 0.6174i | −0.4397 + 0.5853i | −0.4114 − 0.7109i | −0.4351 − 0.7394i |
| w56 | 111000 | −0.1393 + 0.3138i | +0.7921 − 1.2096i | −0.7233 + 0.1496i | +0.1695 + 1.0298i |
| w57 | 111001 | −0.1671 + 0.3094i | −0.7921 − 1.2096i | −0.6220 + 1.1896i | +0.2236 + 1.3784i |
| w58 | 111010 | −0.1393 − 0.3138i | +0.6056 − 0.8481i | −0.4246 + 0.1370i | +0.1426 + 0.7102i |
| w59 | 111011 | −0.1671 − 0.3094i | −0.6056 − 0.8481i | −0.2326 + 1.3986i | +0.4351 + 0.7394i |
| w60 | 111100 | −0.1720 + 0.7004i | +0.2891 − 0.3910i | −0.7267 − 0.4592i | −0.1695 − 1.0298i |
| w61 | 111101 | −0.3741 + 0.6174i | −0.2891 − 0.3910i | −0.6956 − 0.8095i | −0.2236 − 1.3784i |
| w62 | 111110 | −0.1720 − 0.7004i | +0.4397 − 0.5853i | −0.4198 − 0.4151i | −0.1426 − 0.7102i |
| w63 | 111111 | −0.3741 − 0.6174i | −0.4397 − 0.5853i | −0.4114 + 0.7109i | −0.4351 − 0.7394i |

B4) 128-QAM NUC
for R=1/2 (or R=5/8, 3/4 or 13/16):

| w index | bit label | Constellation point |
|---|---|---|
| w0 | 0000000 | +0.7383 − 1.3947i |
| w1 | 0000000 | +0.2726 − 1.6070i |
| w2 | 0000001 | +0.7383 + 1.3947i |
| w3 | 0000001 | +0.2726 − 1.6070i |
| w4 | 0000010 | −0.7383 − 1.3947i |
| w5 | 0000010 | −0.2726 − 1.6070i |
| w6 | 0000011 | −0.7383 + 1.3947i |
| w7 | 0000011 | −0.2726 + 1.6070i |
| w8 | 0000100 | +1.0680 − 1.0753i |
| w9 | 0000100 | +1.0389 − 0.7336i |
| w10 | 0000101 | +1.0680 + 1.0753i |
| w11 | 0000101 | +1.0389 + 0.7336i |
| w12 | 0000110 | −1.0680 − 1.0753i |
| w13 | 0000110 | −1.0389 − 0.7336i |
| w14 | 0000111 | −1.0680 + 1.0753i |
| w15 | 0000111 | −1.0389 + 0.7336i |
| w16 | 0001000 | +0.5286 − 1.0997i |
| w17 | 0001000 | +0.1915 − 1.2689i |
| w18 | 0001001 | +0.5286 + 1.0997i |
| w19 | 0001001 | +0.1915 + 1.2689i |
| w20 | 0001010 | −0.5286 − 1.0997i |
| w21 | 0001010 | −0.1915 − 1.2689i |
| w22 | 0001011 | −0.5286 + 1.0997i |
| w23 | 0001011 | −0.1915 + 1.2689i |
| w24 | 0001100 | +0.6878 − 0.8578i |
| w25 | 0001100 | +0.7725 − 0.6723i |
| w26 | 0001101 | +0.6878 + 0.8578i |
| w27 | 0001101 | +0.7725 + 0.6723i |
| w28 | 0001110 | −0.6878 − 0.8578i |
| w29 | 0001110 | −0.7725 − 0.6723i |
| w30 | 0001111 | −0.6878 + 0.8578i |
| w31 | 0001111 | −0.7725 + 0.6723i |
| w32 | 0010000 | +0.1315 − 0.7332i |
| w33 | 0010000 | +0.1038 − 0.7607i |
| w34 | 0010001 | +0.1315 + 0.7332i |
| w35 | 0010001 | +0.1038 + 0.7607i |
| w36 | 0010010 | −0.1315 − 0.7332i |
| w37 | 0010010 | −0.1038 − 0.7607i |
| w38 | 0010011 | −0.1315 + 0.7332i |
| w39 | 0010011 | −0.1038 + 0.7607i |
| w40 | 0010100 | +0.1647 − 0.5388i |
| w41 | 0010100 | +0.1629 − 0.5296i |
| w42 | 0010101 | +0.1647 + 0.5388i |
| w43 | 0010101 | +0.1629 + 0.5296i |
| w44 | 0010110 | −0.1647 − 0.5388i |
| w45 | 0010110 | −0.1629 − 0.5296i |
| w46 | 0010111 | −0.1647 + 0.5388i |
| w47 | 0010111 | −0.1629 + 0.5296i |
| w48 | 0011000 | +0.3255 − 0.9067i |
| w49 | 0011000 | +0.1588 − 1.0122i |
| w50 | 0011001 | +0.3255 + 0.9067i |
| w51 | 0011001 | +0.1588 + 1.0122i |
| w52 | 0011010 | −0.3255 − 0.9067i |
| w53 | 0011010 | −0.1588 − 1.0122i |
| w54 | 0011011 | −0.3255 + 0.9067i |
| w55 | 0011011 | −0.1588 + 1.0122i |
| w56 | 0011100 | +0.4535 − 0.6452i |
| w57 | 0011100 | +0.4645 − 0.5898i |
| w58 | 0011101 | +0.4535 + 0.6452i |
| w59 | 0011101 | +0.4645 + 0.5898i |
| w60 | 0011110 | −0.4535 − 0.6452i |
| w61 | 0011110 | −0.4645 − 0.5898i |
| w62 | 0011111 | −0.4535 + 0.6452i |
| w63 | 0011111 | −0.4645 + 0.5898i |
| w64 | 01000000 | +1.5779 − 0.2230i |
| w65 | 01000001 | +1.2114 − 0.1662i |
| w66 | 01000010 | +1.5779 + 0.2230i |
| w67 | 01000011 | +1.2114 + 0.1662i |
| w68 | 01000100 | −1.5779 − 0.2230i |
| w69 | 01000101 | −1.2114 − 0.1662i |
| w70 | 01000110 | −1.5779 + 0.2230i |
| w71 | 01000111 | −1.2114 + 0.1662i |
| w72 | 01001000 | +1.4915 − 0.6927i |
| w73 | 01001001 | +1.1447 − 0.4719i |
| w74 | 01001010 | +1.4915 + 0.6927i |
| w75 | 01001011 | +1.1447 + 0.4719i |
| w76 | 01001100 | −1.4915 − 0.6927i |
| w77 | 01001101 | −1.1447 − 0.4719i |
| w78 | 01001110 | −1.4915 + 0.6927i |
| w79 | 01001111 | −1.1447 + 0.4719i |
| w80 | 01010000 | +0.7620 − 0.1121i |
| w81 | 01010001 | +0.9103 − 0.1272i |
| w82 | 01010010 | +0.7620 + 0.1121i |
| w83 | 01010011 | +0.9103 + 0.1272i |
| w84 | 01010100 | −0.7620 − 0.1121i |
| w85 | 01010101 | −0.9103 − 0.1272i |
| w86 | 01010110 | −0.7620 + 0.1121i |
| w87 | 01010111 | −0.9103 + 0.1272i |
| w88 | 01011000 | +0.7359 − 0.3230i |
| w89 | 01011001 | +0.8236 − 0.3936i |
| w90 | 01011010 | +0.7359 + 0.3230i |
| w91 | 01011011 | +0.8236 + 0.3936i |
| w92 | 01011100 | −0.7359 − 0.3230i |
| w93 | 01011101 | −0.8236 − 0.3936i |
| w94 | 01011110 | −0.7359 + 0.3230i |
| w95 | 01011111 | −0.8236 + 0.3936i |
| w96 | 01100000 | +0.1461 − 0.1146i |
| w97 | 01100001 | +0.1573 − 0.1142i |
| w98 | 01100010 | +0.1461 + 0.1146i |
| w99 | 01100011 | +0.1573 + 0.1142i |
| w100 | 01100100 | −0.1461 − 0.1146i |
| w101 | 01100101 | −0.1573 − 0.1142i |
| w102 | 01100110 | −0.1461 + 0.1146i |
| w103 | 01100111 | −0.1573 + 0.1142i |
| w104 | 01101000 | +0.1535 − 0.3082i |
| w105 | 01101001 | +0.1629 − 0.3084i |
| w106 | 01101010 | +0.1535 + 0.3082i |
| w107 | 01101011 | +0.1629 + 0.3084i |
| w108 | 01101100 | −0.1535 − 0.3082i |
| w109 | 01101101 | −0.1629 − 0.3084i |

-continued

| w index | bit label | Constellation point |
|---|---|---|
| w110 | 01101110 | −0.1535 + 0.3082i |
| w111 | 01101111 | −0.1629 + 0.3084i |
| w112 | 01110000 | +0.4774 − 0.1074i |
| w113 | 01110001 | +0.4323 − 0.1096i |
| w114 | 01110010 | +0.4774 + 0.1074i |
| w115 | 01110011 | +0.4323 + 0.1096i |
| w116 | 01110100 | −0.4774 − 0.1074i |
| w117 | 01110101 | −0.4323 − 0.1096i |
| w118 | 01110110 | −0.4774 + 0.1074i |
| w119 | 01110111 | −0.4323 + 0.1096i |
| w120 | 01111000 | +0.4853 − 0.3237i |
| w121 | 01111001 | +0.4637 − 0.3425i |
| w122 | 01111010 | +0.4853 + 0.3237i |
| w123 | 01111011 | +0.4537 + 0.3425i |
| w124 | 01111100 | −0.4853 − 0.3237i |
| w125 | 01111101 | −0.4637 − 0.3425i |
| w126 | 01111110 | −0.4853 + 0.3237i |
| w127 | 01111111 | −0.4637 + 0.3425i | for R=5/8 (or R=1/2, 3/4 or 13/16):

| w index | bit label | Constellation point |
|---|---|---|
| w0 | 0000000 | +1.1438 + 0.4323i |
| w1 | 0000000 | +0.1045 + 0.4578i |
| w2 | 0000001 | −1.1438 + 0.4323i |
| w3 | 0000001 | −0.1045 + 0.4578i |
| w4 | 0000010 | +0.9006 + 0.4173i |
| w5 | 0000010 | +0.1067 + 0.3515i |
| w6 | 0000011 | −0.9006 + 0.4173i |
| w7 | 0000011 | −0.1067 + 0.3515i |
| w8 | 0000100 | +1.1598 + 0.1437i |
| w9 | 0000100 | +0.1075 + 0.0988i |
| w10 | 0000101 | −1.1598 + 0.1437i |
| w11 | 0000101 | −0.1075 + 0.0988i |
| w12 | 0000110 | +0.9102 + 0.1324i |
| w13 | 0000110 | +0.1136 + 0.1402i |
| w14 | 0000111 | −0.9102 + 0.1324i |
| w15 | 0000111 | −0.1136 + 0.1402i |
| w16 | 0001000 | +0.5578 + 0.4216i |
| w17 | 0001000 | +0.3411 + 0.4189i |
| w18 | 0001001 | −0.5578 + 0.4216i |
| w19 | 0001001 | −0.3411 + 0.4189i |
| w20 | 0001010 | +0.6797 + 0.3850i |
| w21 | 0001010 | +0.3088 + 0.3456i |
| w22 | 0001011 | −0.6797 + 0.3850i |
| w23 | 0001011 | −0.3088 + 0.3456i |
| w24 | 0001100 | +0.5755 + 0.1222i |
| w25 | 0001100 | +0.3700 + 0.1151i |
| w26 | 0001101 | −0.5755 + 0.1222i |
| w27 | 0001101 | −0.3700 + 0.1151i |
| w28 | 0001110 | +0.6787 + 0.1401i |
| w29 | 0001110 | +0.3294 + 0.1448i |
| w30 | 0001111 | −0.6787 + 0.1401i |
| w31 | 0001111 | −0.3294 + 0.1448i |
| w32 | 0010000 | +1.1837 + 0.8001i |
| w33 | 0010000 | +0.1121 + 0.6749i |
| w34 | 0010001 | −1.1837 + 0.8001i |
| w35 | 0010001 | −0.1121 + 0.6749i |
| w36 | 0010010 | +0.9008 + 0.6972i |
| w37 | 0010010 | +0.1179 + 0.8955i |
| w38 | 0010011 | −0.9008 + 0.6972i |
| w39 | 0010011 | −0.1179 + 0.8955i |
| w40 | 0010100 | +1.4855 + 0.1793i |
| w41 | 0010100 | +0.1933 + 1.4991i |
| w42 | 0010101 | −1.4855 + 0.1793i |
| w43 | 0010101 | −0.1933 + 1.4991i |
| w44 | 0010110 | +1.5681 + 0.5636i |
| w45 | 0010110 | +0.1440 + 1.1691i |
| w46 | 0010111 | −1.5681 + 0.5636i |
| w47 | 0010111 | −0.1440 + 1.1691i |
| w48 | 0011000 | +0.5354 + 0.6351i |
| w49 | 0011000 | +0.3342 + 0.6628i |
| w50 | 0011001 | −0.5354 + 0.6351i |
| w51 | 0011001 | −0.3342 + 0.6628i |
| w52 | 0011010 | +0.6549 + 0.7546i |
| w53 | 0011010 | +0.3585 + 0.8699i |
| w54 | 0011011 | −0.6549 + 0.7546i |
| w55 | 0011011 | −0.3585 + 0.8699i |
| w56 | 0011100 | +0.9727 + 1.2109i |
| w57 | 0011100 | +0.5835 + 1.4250i |
| w58 | 0011101 | −0.9727 + 1.2109i |
| w59 | 0011101 | −0.5835 + 1.4250i |
| w60 | 0011110 | +0.7102 + 1.0171i |
| w61 | 0011110 | +0.4344 + 1.1140i |
| w62 | 0011111 | −0.7102 + 1.0171i |
| w63 | 0011111 | −0.4344 + 1.1140i |
| w64 | 01000000 | +1.1438 − 0.4323i |
| w65 | 01000001 | +0.1045 − 0.4578i |
| w66 | 01000010 | −1.1438 − 0.4323i |
| w67 | 01000011 | −0.1045 − 0.4578i |
| w68 | 01000100 | +0.9006 − 0.4173i |
| w69 | 01000101 | +0.1067 − 0.3515i |
| w70 | 01000110 | −0.9006 − 0.4173i |
| w71 | 01000111 | −0.1067 − 0.3515i |
| w72 | 01001000 | +1.1598 − 0.1437i |
| w73 | 01001001 | +0.1075 − 0.0988i |
| w74 | 01001010 | −1.1598 − 0.1437i |
| w75 | 01001011 | −0.1075 − 0.0988i |
| w76 | 01001100 | +0.9102 − 0.1324i |
| w77 | 01001101 | +0.1136 − 0.1402i |
| w78 | 01001110 | −0.9102 − 0.1324i |
| w79 | 01001111 | −0.1136 − 0.1402i |
| w80 | 01010000 | +0.5578 − 0.4216i |
| w81 | 01010001 | +0.3411 − 0.4189i |
| w82 | 01010010 | −0.5578 − 0.4216i |
| w83 | 01010011 | −0.3411 − 0.4189i |
| w84 | 01010100 | +0.6797 − 0.3850i |
| w85 | 01010101 | +0.3088 − 0.3456i |
| w86 | 01010110 | −0.6797 − 0.3850i |
| w87 | 01010111 | −0.3088 − 0.3456i |
| w88 | 01011000 | +0.5755 − 0.1222i |
| w89 | 01011001 | +0.3700 − 0.1151i |
| w90 | 01011010 | −0.5755 − 0.1222i |
| w91 | 01011011 | −0.3700 − 0.1151i |
| w92 | 01011100 | +0.6787 − 0.1401i |
| w93 | 01011101 | +0.3294 − 0.1448i |
| w94 | 01011110 | −0.6787 − 0.1401i |
| w95 | 01011111 | −0.3294 − 0.1448i |
| w96 | 01100000 | +1.1837 − 0.8001i |
| w97 | 01100001 | +0.1121 − 0.6749i |
| w98 | 01100010 | −1.1837 − 0.8001i |
| w99 | 01100011 | −0.1121 − 0.6749i |
| w100 | 01100100 | +0.9008 − 0.6972i |
| w101 | 01100101 | +0.1179 − 0.8955i |
| w102 | 01100110 | −0.9008 − 0.6972i |
| w103 | 01100111 | −0.1179 − 0.8955i |
| w104 | 01101000 | +1.4855 − 0.1793i |
| w105 | 01101001 | +0.1933 − 1.4991i |
| w106 | 01101010 | −1.4855 − 0.1793i |
| w107 | 01101011 | −0.1933 − 1.4991i |
| w108 | 01101100 | +1.5681 − 0.5636i |
| w109 | 01101101 | +0.1440 − 1.1691i |
| w110 | 01101110 | −1.5681 − 0.5636i |
| w111 | 01101111 | −0.1440 − 1.1691i |
| w112 | 01110000 | +0.5354 − 0.6351i |
| w113 | 01110001 | +0.3342 − 0.6628i |
| w114 | 01110010 | −0.5354 − 0.6351i |
| w115 | 01110011 | −0.3342 − 0.6628i |
| w116 | 01110100 | +0.6549 − 0.7546i |
| w117 | 01110101 | +0.3585 − 0.8699i |
| w118 | 01110110 | −0.6549 − 0.7546i |
| w119 | 01110111 | −0.3585 − 0.8699i |
| w120 | 01111000 | +0.9727 − 1.2109i |
| w121 | 01111001 | +0.5835 − 1.4250i |
| w122 | 01111010 | −0.9727 − 1.2109i |
| w123 | 01111011 | −0.5835 − 1.4250i |
| w124 | 01111100 | +0.7102 − 1.0171i |
| w125 | 01111101 | +0.4344 − 1.1140i |
| w126 | 01111110 | −0.7102 − 1.0171i |
| w127 | 01111111 | −0.4344 − 1.1140i | for R=3/4 (or R=1/2, 5/8 or 13/16):

| w index | bit label | Constellation point |
|---|---|---|
| w0 | 0000000 | +1.0837 + 0.3878i |
| w1 | 0000000 | +0.5568 + 0.5351i |
| w2 | 0000001 | +1.0837 − 0.3878i |
| w3 | 0000001 | +0.5568 − 0.5351i |
| w4 | 0000010 | +0.8372 + 0.4015i |
| w5 | 0000010 | +0.5992 + 0.3732i |
| w6 | 0000011 | +0.8372 − 0.4015i |
| w7 | 0000011 | +0.5992 − 0.3732i |
| w8 | 0000100 | +1.1795 + 0.6737i |
| w9 | 0000100 | +0.5823 + 0.7120i |
| w10 | 0000101 | +1.1795 − 0.6737i |
| w11 | 0000101 | +0.5823 − 0.7120i |
| w12 | 0000110 | +0.8934 + 0.6718i |
| w13 | 0000110 | +0.7091 + 0.8942i |
| w14 | 0000111 | +0.8934 − 0.6718i |
| w15 | 0000111 | +0.7091 − 0.8942i |
| w16 | 0001000 | +0.1125 + 0.5652i |
| w17 | 0001000 | +0.3356 + 0.5485i |
| w18 | 0001001 | +0.1125 − 0.5652i |
| w19 | 0001001 | +0.3356 − 0.5485i |
| w20 | 0001010 | +0.1063 + 0.3959i |
| w21 | 0001010 | +0.3354 + 0.3801i |
| w22 | 0001011 | +0.1063 − 0.3959i |
| w23 | 0001011 | +0.3354 − 0.3801i |
| w24 | 0001100 | +0.1174 + 0.7565i |
| w25 | 0001100 | +0.3498 + 0.7450i |
| w26 | 0001101 | +0.1174 − 0.7565i |
| w27 | 0001101 | +0.3498 − 0.7450i |
| w28 | 0001110 | +0.1285 + 0.9672i |
| w29 | 0001110 | +0.3973 + 0.9520i |
| w30 | 0001111 | +0.1285 − 0.9672i |
| w31 | 0001111 | +0.3973 − 0.9520i |
| w32 | 0010000 | −1.0837 + 0.3878i |
| w33 | 0010000 | −0.5568 + 0.5351i |
| w34 | 0010001 | −1.0837 − 0.3878i |
| w35 | 0010001 | −0.5568 − 0.5351i |
| w36 | 0010010 | −0.8372 + 0.4015i |
| w37 | 0010010 | −0.5992 + 0.3732i |
| w38 | 0010011 | −0.8372 − 0.4015i |
| w39 | 0010011 | −0.5992 − 0.3732i |
| w40 | 0010100 | −1.1795 + 0.6737i |
| w41 | 0010100 | −0.5823 + 0.7120i |
| w42 | 0010101 | −1.1795 − 0.6737i |
| w43 | 0010101 | −0.5823 − 0.7120i |
| w44 | 0010110 | −0.8934 + 0.6718i |
| w45 | 0010110 | −0.7091 + 0.8942i |
| w46 | 0010111 | −0.8934 − 0.6718i |
| w47 | 0010111 | −0.7091 − 0.8942i |
| w48 | 0011000 | −0.1125 + 0.5652i |
| w49 | 0011000 | −0.3356 + 0.5485i |
| w50 | 0011001 | −0.1125 − 0.5652i |
| w51 | 0011001 | −0.3356 − 0.5485i |
| w52 | 0011010 | −0.1063 + 0.3959i |
| w53 | 0011010 | −0.3354 + 0.3801i |
| w54 | 0011011 | −0.1063 − 0.3959i |
| w55 | 0011011 | −0.3354 − 0.3801i |
| w56 | 0011100 | −0.1174 + 0.7565i |
| w57 | 0011100 | −0.3498 + 0.7450i |
| w58 | 0011101 | −0.1174 − 0.7565i |
| w59 | 0011101 | −0.3498 − 0.7450i |
| w60 | 0011110 | −0.1285 + 0.9672i |
| w61 | 0011110 | −0.3973 + 0.9520i |
| w62 | 0011111 | −0.1285 − 0.9672i |
| w63 | 0011111 | −0.3973 − 0.9520i |
| w64 | 01000000 | +1.0605 + 0.1271i |
| w65 | 01000001 | +0.5216 + 0.0747i |
| w66 | 01000010 | +1.0605 − 0.1271i |
| w67 | 01000011 | +0.5216 + 0.0747i |
| w68 | 01000100 | +0.8209 + 0.1292i |
| w69 | 01000101 | +0.6018 + 0.1929i |
| w70 | 01000110 | +0.8209 − 0.1292i |
| w71 | 01000111 | +0.6018 − 0.1929i |
| w72 | 01001000 | +1.3525 + 0.1471i |
| w73 | 01001001 | +1.0702 + 1.0357i |
| w74 | 01001010 | +1.3525 − 0.1471i |
| w75 | 01001011 | +1.0702 − 1.0357i |
| w76 | 01001100 | +1.4799 + 0.4422i |
| w77 | 01001101 | +0.7653 + 1.1720i |
| w78 | 01001110 | +1.4799 − 0.4422i |
| w79 | 01001111 | +0.7653 − 1.1720i |
| w80 | 01010000 | +0.1054 + 0.0790i |
| w81 | 01010001 | +0.3169 + 0.0841i |
| w82 | 01010010 | +0.1054 − 0.0790i |
| w83 | 01010011 | +0.3169 − 0.0841i |
| w84 | 01010100 | +0.1042 + 0.2345i |
| w85 | 01010101 | +0.3223 + 0.2346i |
| w86 | 01010110 | +0.1042 − 0.2345i |
| w87 | 01010111 | +0.3223 − 0.2346i |
| w88 | 01011000 | +0.1687 + 1.4929i |
| w89 | 01011001 | +0.5173 + 1.4708i |
| w90 | 01011010 | +0.1687 − 1.4929i |
| w91 | 01011011 | +0.5173 − 1.4708i |
| w92 | 01011100 | +0.1455 + 1.2047i |
| w93 | 01011101 | +0.4442 + 1.1814i |
| w94 | 01011110 | +0.1455 − 1.2047i |
| w95 | 01011111 | +0.4442 − 1.1814i |
| w96 | 01100000 | −1.0605 + 0.1271i |
| w97 | 01100001 | −0.5216 + 0.0747i |
| w98 | 01100010 | −1.0605 − 0.1271i |
| w99 | 01100011 | −0.5216 − 0.0747i |
| w100 | 01100100 | −0.8209 + 0.1292i |
| w101 | 01100101 | −0.6018 + 0.1929i |
| w102 | 01100110 | −0.8209 − 0.1292i |
| w103 | 01100111 | −0.6018 − 0.1929i |
| w104 | 01101000 | −1.3525 + 0.1471i |
| w105 | 01101001 | −1.0702 + 1.0857i |
| w106 | 01101010 | −1.3525 − 0.1471i |
| w107 | 01101011 | −1.0702 − 1.0357i |
| w108 | 01101100 | −1.4799 + 0.4422i |
| w109 | 01101101 | −0.7653 + 1.1720i |
| w110 | 01101110 | −1.4799 − 0.4422i |
| w111 | 01101111 | −0.7653 − 1.1720i |
| w112 | 01110000 | −0.1054 + 0.0790i |
| w113 | 01110001 | −0.3169 + 0.0841i |
| w114 | 01110010 | −0.1054 − 0.0790i |
| w115 | 01110011 | −0.3169 − 0.0841i |
| w116 | 01110100 | −0.1042 + 0.2345i |
| w117 | 01110101 | −0.3223 + 0.2346i |
| w118 | 01110110 | −0.1042 − 0.2345i |
| w119 | 01110111 | −0.3223 − 0.2346i |
| w120 | 01111000 | −0.1687 + 1.4929i |
| w121 | 01111001 | −0.5173 + 1.4708i |
| w122 | 01111010 | −0.1687 − 1.4929i |
| w123 | 01111011 | −0.5173 − 1.4708i |
| w124 | 01111100 | −0.1455 + 1.2047i |
| w125 | 01111101 | −0.4442 + 1.1814i |
| w126 | 01111110 | −0.1455 − 1.2047i |
| w127 | 01111111 | −0.4442 − 1.1814i | for R=13/16 (or R=1/2, 5/8 or 3/4):

| w index | bit label | Constellation point |
|---|---|---|
| w0 | 0000000 | +1.0422 + 0.3376i |
| w1 | 0000000 | −1.0422 + 0.3376i |
| w2 | 0000001 | +1.0422 − 0.3376i |
| w3 | 0000001 | −1.0422 − 0.3376i |
| w4 | 0000010 | +0.1125 + 0.6269i |
| w5 | 0000010 | −0.1125 + 0.6269i |
| w6 | 0000011 | +0.1125 − 0.6269i |
| w7 | 0000011 | −0.1125 − 0.6269i |
| w8 | 0000100 | +1.0010 + 0.1105i |
| w9 | 0000100 | −1.0010 + 0.1105i |
| w10 | 0000101 | +1.0010 − 0.1105i |
| w11 | 0000101 | −1.0010 − 0.1105i |
| w12 | 0000110 | +0.0978 + 0.0913i |
| w13 | 0000110 | −0.0978 + 0.0913i |
| w14 | 0000111 | +0.0978 − 0.0913i |
| w15 | 0000111 | −0.0978 − 0.0913i |
| w16 | 0001000 | +0.7966 + 0.3496i |
| w17 | 0001000 | −0.7966 + 0.3496i |

| w index | bit label | Constellation point |
| --- | --- | --- |
| w18 | 0001001 | +0.7966 − 0.3496i |
| w19 | 0001001 | −0.7966 − 0.3496i |
| w20 | 0001010 | +0.1109 + 0.4454i |
| w21 | 0001010 | −0.1109 + 0.4454i |
| w22 | 0001011 | +0.1109 − 0.4454i |
| w23 | 0001011 | −0.1109 − 0.4454i |
| w24 | 0001100 | +0.7613 + 0.1187i |
| w25 | 0001100 | −0.7613 + 0.1187i |
| w26 | 0001101 | +0.7613 − 0.1187i |
| w27 | 0001101 | −0.7613 − 0.1187i |
| w28 | 0001110 | +0.1038 + 0.2705i |
| w29 | 0001110 | −0.1038 + 0.2705i |
| w30 | 0001111 | +0.1038 − 0.2705i |
| w31 | 0001111 | −0.1038 − 0.2705i |
| w32 | 0010000 | +0.5556 + 0.6306i |
| w33 | 0010000 | −0.5556 + 0.6306i |
| w34 | 0010001 | +0.5556 − 0.6306i |
| w35 | 0010001 | −0.5556 − 0.6306i |
| w36 | 0010010 | +0.3351 + 0.6308i |
| w37 | 0010010 | −0.3351 + 0.6308i |
| w38 | 0010011 | +0.3351 − 0.6308i |
| w39 | 0010011 | −0.3351 − 0.6308i |
| w40 | 0010100 | +0.4942 + 0.0780i |
| w41 | 0010100 | −0.4942 + 0.0780i |
| w42 | 0010101 | +0.4942 − 0.0780i |
| w43 | 0010101 | −0.4942 − 0.0780i |
| w44 | 0010110 | +0.2935 + 0.0906i |
| w45 | 0010110 | −0.2935 + 0.0906i |
| w46 | 0010111 | +0.2935 − 0.0906i |
| w47 | 0010111 | −0.2935 − 0.0906i |
| w48 | 0011000 | +0.5761 + 0.4286i |
| w49 | 0011000 | −0.5761 + 0.4286i |
| w50 | 0011001 | +0.5761 − 0.4286i |
| w51 | 0011001 | −0.5761 − 0.4286i |
| w52 | 0011010 | +0.3383 + 0.4404i |
| w53 | 0011010 | −0.3383 + 0.4404i |
| w54 | 0011011 | +0.3383 − 0.4404i |
| w55 | 0011011 | −0.3383 − 0.4404i |
| w56 | 0011100 | +0.5456 + 0.2367i |
| w57 | 0011100 | −0.5456 + 0.2367i |
| w58 | 0011101 | +0.5456 − 0.2367i |
| w59 | 0011101 | −0.5456 − 0.2367i |
| w60 | 0011110 | +0.3172 + 0.2666i |
| w61 | 0011110 | −0.3172 + 0.2666i |
| w62 | 0011111 | +0.3172 − 0.2666i |
| w63 | 0011111 | −0.3172 − 0.2666i |
| w64 | 01000000 | +1.1154 + 0.5839i |
| w65 | 01000001 | −1.1154 + 0.5839i |
| w66 | 01000010 | +1.1154 − 0.5839i |
| w67 | 01000011 | −1.1154 − 0.5839i |
| w68 | 01000100 | +0.1155 + 0.8217i |
| w69 | 01000101 | −0.1155 + 0.8217i |
| w70 | 01000110 | +0.1155 − 0.8217i |
| w71 | 01000111 | −0.1155 − 0.8217i |
| w72 | 01001000 | +1.2844 + 0.1345i |
| w73 | 01001001 | −1.2844 + 0.1345i |
| w74 | 01001010 | +1.2844 − 0.1345i |
| w75 | 01001011 | −1.2844 − 0.1345i |
| w76 | 01001100 | +0.1646 + 1.5274i |
| w77 | 01001101 | −0.1646 + 1.5274i |
| w78 | 01001110 | +0.1646 − 1.5274i |
| w79 | 01001111 | −0.1646 − 1.5274i |
| w80 | 01010000 | +0.8563 + 0.5705i |
| w81 | 01010001 | −0.8563 + 0.5705i |
| w82 | 01010010 | +0.8563 − 0.5705i |
| w83 | 01010011 | −0.8563 − 0.5705i |
| w84 | 01010100 | +0.1239 + 1.0311i |
| w85 | 01010101 | −0.1239 + 1.0311i |
| w86 | 01010110 | +0.1239 − 1.0311i |
| w87 | 01010111 | −0.1239 − 1.0311i |
| w88 | 01011000 | +1.4001 + 0.4092i |
| w89 | 01011001 | −1.4001 + 0.4092i |
| w90 | 01011010 | +1.4001 − 0.4092i |
| w91 | 01011011 | −1.4001 − 0.4092i |
| w92 | 01011100 | +0.1345 + 1.2611i |
| w93 | 01011101 | −0.1345 + 1.2611i |
| w94 | 01011110 | +0.1345 − 1.2611i |
| w95 | 01011111 | −0.1345 − 1.2611i |
| w96 | 01100000 | +0.5970 + 0.8482i |
| w97 | 01100001 | −0.5970 + 0.8482i |
| w98 | 01100010 | +0.5970 − 0.8482i |
| w99 | 01100011 | −0.5970 − 0.8482i |
| w100 | 01100100 | +0.3510 + 0.8405i |
| w101 | 01100101 | −0.3510 + 0.8405i |
| w102 | 01100110 | +0.3510 − 0.8405i |
| w103 | 01100111 | −0.3510 − 0.8405i |
| w104 | 01101000 | +1.1670 + 0.8997i |
| w105 | 01101001 | −1.1670 + 0.8997i |
| w106 | 01101010 | +1.1670 − 0.8997i |
| w107 | 01101011 | −1.1670 − 0.8997i |
| w108 | 01101100 | +0.4543 + 1.3933i |
| w109 | 01101101 | −0.4543 + 1.3933i |
| w110 | 01101110 | +0.4543 − 1.3933i |
| w111 | 01101111 | −0.4543 − 1.3933i |
| w112 | 01110000 | +0.8378 + 0.8041i |
| w113 | 01110001 | −0.8378 + 0.8041i |
| w114 | 01110010 | +0.8378 − 0.8041i |
| w115 | 01110011 | −0.8378 − 0.8041i |
| w116 | 01110100 | +0.3850 + 1.0724i |
| w117 | 01110101 | −0.3850 + 1.0724i |
| w118 | 01110110 | +0.3850 − 1.0724i |
| w119 | 01110111 | −0.3850 − 1.0724i |
| w120 | 01111000 | +0.9031 + 1.0698i |
| w121 | 01111001 | −0.9031 + 1.0698i |
| w122 | 01111010 | +0.9031 − 1.0698i |
| w123 | 01111011 | −0.9031 − 1.0698i |
| w124 | 01111100 | +0.6436 + 1.1770i |
| w125 | 01111101 | −0.6436 + 1.1770i |
| w126 | 01111110 | +0.6436 − 1.1770i |
| w127 | 01111111 | −0.6436 − 1.1770i |

B5) 256-QAM NUC
for R=1/2 (or R=5/8, 3/4 or 13/16):

| w index | bit label | Constellation point |
| --- | --- | --- |
| w0 | 0000000 | −1.2901 + 1.0495i |
| w1 | 0000000 | −1.6350 + 0.1593i |
| w2 | 0000001 | −0.2844 + 0.1296i |
| w3 | 0000001 | −0.3237 + 0.0849i |
| w4 | 0000010 | −1.4625 + 0.7740i |
| w5 | 0000010 | −1.5776 + 0.4735i |
| w6 | 0000011 | −0.2853 + 0.1309i |
| w7 | 0000011 | −0.3228 + 0.0867i |
| w8 | 0000100 | +1.2901 + 1.0495i |
| w9 | 0000100 | +1.6350 + 0.1593i |
| w10 | 0000101 | +0.2844 + 0.1296i |
| w11 | 0000101 | +0.3237 + 0.0849i |
| w12 | 0000110 | +1.4525 + 0.7740i |
| w13 | 0000110 | +1.5776 + 0.4735i |
| w14 | 0000111 | +0.2853 + 0.1309i |
| w15 | 0000111 | +0.3228 + 0.0867i |
| w16 | 0001000 | −0.7273 + 0.6160i |
| w17 | 0001000 | −0.9430 + 0.1100i |
| w18 | 0001001 | −0.5902 + 0.4857i |
| w19 | 0001001 | −0.7502 + 0.1138i |
| w20 | 0001010 | −0.8177 + 0.4841i |
| w21 | 0001010 | −0.9069 + 0.2829i |
| w22 | 0001011 | −0.6355 + 0.4185i |
| w23 | 0001011 | −0.7325 + 0.2088i |
| w24 | 0001100 | +0.7273 + 0.6160i |
| w25 | 0001100 | +0.9430 + 0.1100i |
| w26 | 0001101 | +0.5902 + 0.4857i |
| w27 | 0001101 | +0.7502 + 0.1138i |
| w28 | 0001110 | +0.8177 + 0.4841i |
| w29 | 0001110 | +0.9069 + 0.2829i |
| w30 | 0001111 | +0.6355 + 0.4185i |
| w31 | 0001111 | +0.7325 + 0.2088i |
| w32 | 0010000 | −1.0646 + 1.2876i |
| w33 | 0010000 | −0.1658 + 1.6747i |
| w34 | 0010001 | −0.1053 + 0.1494i |
| w35 | 0010001 | −0.0872 + 0.1390i |

-continued

| w index | bit label | Constellation point |
| --- | --- | --- |
| w36 | 0010010 | −0.7949 + 1.4772i |
| w37 | 0010010 | −0.4907 + 1.6084i |
| w38 | 0010011 | −0.1052 + 0.1495i |
| w39 | 0010011 | −0.0871 + 0.1392i |
| w40 | 0010100 | +1.0645 + 1.2876i |
| w41 | 0010100 | +0.1658 + 1.6747i |
| w42 | 0010101 | +0.1053 + 0.1494i |
| w43 | 0010101 | +0.0872 + 0.1390i |
| w44 | 0010110 | +0.7949 + 1.4772i |
| w45 | 0010110 | +0.4907 + 1.6084i |
| w46 | 0010111 | +0.1052 + 0.1495i |
| w47 | 0010111 | +0.0871 + 0.1392i |
| w48 | 0011000 | −0.5707 + 0.7662i |
| w49 | 0011000 | −0.1088 + 0.9530i |
| w50 | 0011001 | −0.4294 + 0.6363i |
| w51 | 0011001 | −0.1091 + 0.7656i |
| w52 | 0011010 | −0.4490 + 0.8461i |
| w53 | 0011010 | −0.2464 + 0.9270i |
| w54 | 0011011 | −0.3744 + 0.6744i |
| w55 | 0011011 | −0.1699 + 0.7537i |
| w56 | 0011100 | +0.5707 + 0.7662i |
| w57 | 0011100 | +0.1088 + 0.9530i |
| w58 | 0011101 | +0.4294 + 0.6363i |
| w59 | 0011101 | +0.1091 + 0.7656i |
| w60 | 0011110 | +0.4490 + 0.8451i |
| w61 | 0011110 | +0.2464 + 0.9270i |
| w62 | 0011111 | +0.3744 + 0.6744i |
| w63 | 0011111 | +0.1699 + 0.7537i |
| w64 | 01000000 | −1.0382 + 0.8623i |
| w65 | 01000001 | −1.3225 + 0.1320i |
| w66 | 01000010 | −0.3734 + 0.2560i |
| w67 | 01000011 | −0.4582 + 0.1123i |
| w68 | 01000100 | −1.1794 + 0.6376i |
| w69 | 01000101 | −1.2742 + 0.3922i |
| w70 | 01000110 | −0.3799 + 0.2517i |
| w71 | 01000111 | −0.4545 + 0.1251i |
| w72 | 01001000 | +1.0382 + 0.8623i |
| w73 | 01001001 | +1.3225 + 0.1320i |
| w74 | 01001010 | +0.3734 + 0.2560i |
| w75 | 01001011 | +0.4582 + 0.1123i |
| w76 | 01001100 | +1.1794 + 0.6376i |
| w77 | 01001101 | +1.2742 + 0.3922i |
| w78 | 01001110 | +0.3799 + 0.2517i |
| w79 | 01001111 | +0.4545 + 0.1251i |
| w80 | 01010000 | −0.8504 + 0.7217i |
| w81 | 01010001 | −1.0854 + 0.1139i |
| w82 | 01010010 | −0.4968 + 0.3947i |
| w83 | 01010011 | −0.6473 + 0.1138i |
| w84 | 01010100 | −0.9638 + 0.5407i |
| w85 | 01010101 | −1.0441 + 0.3296i |
| w86 | 01010110 | −0.5231 + 0.3644i |
| w87 | 01010111 | −0.6339 + 0.1702i |
| w88 | 01011000 | +0.8504 + 0.7217i |
| w89 | 01011001 | +1.0854 + 0.1139i |
| w90 | 01011010 | +0.4968 + 0.3947i |
| w91 | 01011011 | +0.6473 + 0.1138i |
| w92 | 01011100 | +0.9638 + 05407i |
| w93 | 01011101 | +1.0441 + 0.3296i |
| w94 | 01011110 | +0.5231 + 0.3644i |
| w95 | 01011111 | +0.6339 + 0.1702i |
| w96 | 01100000 | −0.8555 + 1.0542i |
| w97 | 01100001 | −0.1322 + 1.3631i |
| w98 | 01100010 | −0.1938 + 0.3621i |
| w99 | 01100011 | −0.0928 + 0.3970i |
| w100 | 01100100 | −0.6363 + 1.2064i |
| w101 | 01100101 | −0.3929 + 1.3102i |
| w102 | 01100110 | −0.1909 + 0.3627i |
| w103 | 01100111 | −0.0937 + 0.3973i |
| w104 | 01101000 | +0.8555 + 1.0542i |
| w105 | 01101001 | +0.1322 + 1.3631i |
| w106 | 01101010 | +0.1938 + 0.3621i |
| w107 | 01101011 | +0.0928 + 0.3970i |
| w108 | 01101100 | +0.6363 + 1.2064i |
| w109 | 01101101 | +0.3929 + 1.3102i |
| w110 | 01101110 | +0.1909 + 0.3627i |
| w111 | 01101111 | +0.0937 + 0.3973i |
| w112 | 01110000 | −0.6961 + 0.8850i |
| w113 | 01110001 | −0.1124 + 1.1327i |
| w114 | 01110010 | −0.3224 + 0.5236i |
| w115 | 01110011 | −0.1054 + 0.5979i |
| w116 | 01110100 | −0.5229 + 1.0037i |
| w117 | 01110101 | −0.3160 + 1.0913i |
| w118 | 01110110 | −0.3016 + 0.5347i |
| w119 | 01110111 | −0.1230 + 0.5949i |
| w120 | 01111000 | +0.6961 + 0.8850i |
| w121 | 01111001 | +0.1124 + 1.1327i |
| w122 | 01111010 | +0.3224 + 0.5236i |
| w123 | 01111011 | +0.1054 + 0.5979i |
| w124 | 01111100 | +0.5229 + 1.0037i |
| w125 | 01111101 | +0.3160 + 1.0913i |
| w126 | 01111110 | +0.3016 + 0.5347i |
| w127 | 01111111 | +0.1230 + 0.5949i |
| w128 | 10000000 | −1.2901 − 1.0495i |
| w129 | 10000001 | −1.6350 − 0.1593i |
| w130 | 10000010 | −0.2844 − 0.1296i |
| w131 | 10000011 | −0.3237 − 0.0849i |
| w132 | 10000100 | −1.4625 − 0.7740i |
| w133 | 10000101 | −1.5776 − 0.4735i |
| w134 | 10000110 | −0.2853 − 0.1309i |
| w135 | 10000111 | −0.3228 − 0.0867i |
| w136 | 10001000 | +1.2901 − 1.0495i |
| w137 | 10001001 | +1.6350 − 0.1593i |
| w138 | 10001010 | +0.2844 − 0.1296i |
| w139 | 10001011 | +0.3237 − 0.0849i |
| w140 | 10001100 | +1.4525 − 0.7740i |
| w141 | 10001101 | +1.5776 − 0.4735i |
| w142 | 10001110 | +0.2853 − 0.1309i |
| w143 | 10001111 | +0.3228 − 0.0867i |
| w144 | 10010000 | −0.7273 − 0.6160i |
| w145 | 10010001 | −0.9430 − 0.1100i |
| w146 | 10010010 | −0.5902 − 0.4857i |
| w147 | 10010011 | −0.7502 − 0.1138i |
| w148 | 10010100 | −0.8177 − 0.4841i |
| w149 | 10010101 | −0.9069 − 0.2829i |
| w150 | 10010110 | −0.6355 − 0.4185i |
| w151 | 10010111 | −0.7325 − 0.2088i |
| w152 | 10011000 | +0.7273 − 0.6160i |
| w153 | 10011001 | +0.9430 − 0.1100i |
| w154 | 10011010 | +0.5902 − 0.4857i |
| w155 | 10011011 | +0.7502 − 0.1138i |
| w156 | 10011100 | +0.8177 − 0.4841i |
| w157 | 10011101 | +0.9069 − 0.2829i |
| w158 | 10011110 | +0.6355 − 0.4185i |
| w159 | 10011111 | +0.7325 − 0.2088i |
| w160 | 10100000 | −1.0646 − 1.2876i |
| w161 | 10100001 | −0.1658 − 1.6747i |
| w162 | 10100010 | −0.1053 − 0.1494i |
| w163 | 10100011 | −0.0872 − 0.1390i |
| w164 | 10100100 | −0.7949 − 1.4772i |
| w165 | 10100101 | −0.4907 − 1.6084i |
| w166 | 10100110 | −0.1052 − 0.1495i |
| w167 | 10100111 | −0.0871 − 0.1392i |
| w168 | 10101000 | +1.0645 − 1.2876i |
| w169 | 10101001 | +0.1658 − 1.6747i |
| w170 | 10101010 | +0.1053 − 0.1494i |
| w171 | 10101011 | +0.0872 − 0.1390i |
| w172 | 10101100 | +0.7949 − 1.4772i |
| w173 | 10101101 | +0.4907 − 1.6084i |
| w174 | 10101110 | +0.1052 − 0.1495i |
| w175 | 10101111 | +0.0871 − 0.1392i |
| w176 | 10110000 | −0.5707 − 0.7662i |
| w177 | 10110001 | −0.1088 − 0.9530i |
| w178 | 10110010 | −0.4294 − 0.6363i |
| w179 | 10110011 | −0.1091 − 0.7656i |
| w180 | 10110100 | −0.4490 − 0.8461i |
| w181 | 10110101 | −0.2464 − 0.9270i |
| w182 | 10110110 | −0.3744 − 0.6744i |
| w183 | 10110111 | −0.1699 − 0.7537i |
| w184 | 10111000 | +0.5707 − 0.7662i |
| w185 | 10111001 | +0.1088 − 0.9530i |
| w186 | 10111010 | +0.4294 − 0.6363i |
| w187 | 10111011 | +0.1091 − 0.7656i |
| w188 | 10111100 | +0.4490 − 0.8461i |
| w189 | 10111101 | +0.2464 − 0.9270i |

| w index | bit label | Constellation point |
|---|---|---|
| w190 | 10111110 | +0.3744 − 0.6744i |
| w191 | 10111111 | +0.1699 − 0.7537i |
| w192 | 11000000 | −1.0382 − 0.8623i |
| w193 | 11000001 | −1.3225 − 0.1320i |
| w194 | 11000010 | −0.3734 − 0.2560i |
| w195 | 11000011 | −0.4582 − 0.1123i |
| w196 | 11000100 | −1.1794 − 0.6376i |
| w197 | 11000101 | −1.2742 − 0.3922i |
| w198 | 11000110 | −0.3799 − 0.2517i |
| w199 | 11000111 | −0.4545 − 0.1251i |
| w200 | 11001000 | +1.0382 − 0.8623i |
| w201 | 11001001 | +1.3225 − 0.1320i |
| w202 | 11001010 | +0.3734 − 0.2560i |
| w203 | 11001011 | +0.4582 − 0.1123i |
| w204 | 11001100 | +1.1794 − 0.6376i |
| w205 | 11001101 | +1.2742 − 0.3922i |
| w206 | 11001110 | +0.3799 − 0.2517i |
| w207 | 11001111 | +0.4545 − 0.1251i |
| w208 | 11010000 | −0.8504 − 0.7217i |
| w209 | 11010001 | −1.0854 − 0.1139i |
| w210 | 11010010 | −0.4968 − 0.3947i |
| w211 | 11010011 | −0.6473 − 0.1138i |
| w212 | 11010100 | −0.9638 − 0.5407i |
| w213 | 11010101 | −1.0441 − 0.3296i |
| w214 | 11010110 | −0.5231 − 0.3644i |
| w215 | 11010111 | −0.6339 − 0.1702i |
| w216 | 11011000 | +0.8504 − 0.7217i |
| w217 | 11011001 | +1.0854 − 0.1139i |
| w218 | 11011010 | +0.4968 − 0.3947i |
| w219 | 11011011 | +0.6473 − 0.1138i |
| w220 | 11011100 | +0.9638 − 0.5407i |
| w221 | 11011101 | +1.0441 − 0.3296i |
| w222 | 11011110 | +0.5231 − 0.3644i |
| w223 | 11011111 | +0.6339 − 0.1702i |
| w224 | 11100000 | −0.8555 − 1.0542i |
| w225 | 11100001 | −0.1322 − 1.3631i |
| w226 | 11100010 | −0.1938 − 0.3621i |
| w227 | 11100011 | −0.0928 − 0.3970i |
| w228 | 11100100 | −0.6363 − 1.2064i |
| w229 | 11100101 | −0.3929 − 1.3102i |
| w230 | 11100110 | −0.1909 − 0.3627i |
| w231 | 11100111 | −0.0937 − 0.3973i |
| w232 | 11101000 | +0.8555 − 1.0542i |
| w233 | 11101001 | +0.1322 − 1.3631i |
| w234 | 11101010 | +0.1938 − 0.3621i |
| w235 | 11101011 | +0.0928 − 0.3970i |
| w236 | 11101100 | +0.6363 − 1.2064i |
| w237 | 11101101 | +0.3929 − 1.3102i |
| w238 | 11101110 | +0.1909 − 0.3627i |
| w239 | 11101111 | +0.0937 − 0.3973i |
| w240 | 11110000 | −0.6961 − 0.8850i |
| w241 | 11110001 | −0.1124 − 1.1327i |
| w242 | 11110010 | −0.3224 − 0.5236i |
| w243 | 11110011 | −0.1054 − 0.5979i |
| w244 | 11110100 | −0.5229 − 1.0037i |
| w245 | 11110101 | −0.3160 − 1.0913i |
| w246 | 11110110 | −0.3016 − 0.5347i |
| w247 | 11110111 | −0.1230 − 0.5949i |
| w248 | 11111000 | +0.6961 − 0.8850i |
| w249 | 11111001 | +0.1124 − 1.1327i |
| w250 | 11111010 | +0.3224 − 0.5236i |
| w251 | 11111011 | +0.1054 − 0.5979i |
| w252 | 11111100 | +0.5229 − 1.0037i |
| w253 | 11111101 | +0.3160 − 1.0913i |
| w254 | 11111110 | +0.3016 − 0.5347i |
| w255 | 11111111 | +0.1230 − 0.5949i | for R=5/8 (or R=1/2, 3/4 or 13/16):

| w index | bit label | Constellation point |
|---|---|---|
| w0 | 0000000 | −1.2639 + 1.0084i |
| w1 | 0000000 | −0.7380 + 0.6059i |
| w2 | 0000001 | −1.0456 + 1.2415i |
| w3 | 0000001 | −0.6190 + 0.7456i |
| w4 | 0000010 | −1.2639 − 1.0084i |
| w5 | 0000010 | −0.7380 − 0.6059i |
| w6 | 0000011 | −1.0466 − 1.2415i |
| w7 | 0000011 | −0.6190 − 0.7456i |
| w8 | 0000100 | −1.4263 + 0.7399i |
| w9 | 0000100 | −0.8292 + 0.4496i |
| w10 | 0000101 | −0.7829 + 1.4275i |
| w11 | 0000101 | −0.4707 + 0.8613i |
| w12 | 0000110 | −1.4263 − 0.7399i |
| w13 | 0000110 | −0.8292 − 0.4496i |
| w14 | 0000111 | −0.7829 − 1.4275i |
| w15 | 0000111 | −0.4707 − 0.8613i |
| w16 | 0001000 | −1.0529 + 0.8398i |
| w17 | 0001000 | −0.8839 + 0.7116i |
| w18 | 0001001 | −0.8751 + 1.0349i |
| w19 | 0001001 | −0.7380 + 0.8761i |
| w20 | 0001010 | −1.0529 − 0.8398i |
| w21 | 0001010 | −0.8839 − 0.7116i |
| w22 | 0001011 | −0.8751 − 1.0349i |
| w23 | 0001011 | −0.7380 − 0.8761i |
| w24 | 0001100 | −1.1857 + 0.6167i |
| w25 | 0001100 | −0.9935 + 0.5250i |
| w26 | 0001101 | −0.6570 + 1.1922i |
| w27 | 0001101 | −0.5568 + 1.0106i |
| w28 | 0001110 | −1.1857 − 0.6167i |
| w29 | 0001110 | −0.9935 − 0.5250i |
| w30 | 0001111 | −0.6570 − 1.1922i |
| w31 | 0001111 | −0.5568 − 1.0106i |
| w32 | 0010000 | +1.2639 + 1.0084i |
| w33 | 0010000 | +0.7380 + 0.6059i |
| w34 | 0010001 | +1.0466 + 1.2415i |
| w35 | 0010001 | +0.6190 + 0.7456i |
| w36 | 0010010 | +1.2639 − 1.0084i |
| w37 | 0010010 | +0.7380 − 0.6059i |
| w38 | 0010011 | +1.0466 − 1.2415i |
| w39 | 0010011 | +0.6190 − 0.7456i |
| w40 | 0010100 | +1.4263 + 0.7399i |
| w41 | 0010100 | +0.8292 + 0.4496i |
| w42 | 0010101 | +0.7829 + 1.4275i |
| w43 | 0010101 | +0.4707 + 0.8613i |
| w44 | 0010110 | +1.4263 − 0.7399i |
| w45 | 0010110 | +0.8292 − 0.4496i |
| w46 | 0010111 | +0.7829 − 1.4275i |
| w47 | 0010111 | +0.4707 − 0.8613i |
| w48 | 0011000 | +1.0529 + 0.8398i |
| w49 | 0011000 | +0.8839 + 0.7116i |
| w50 | 0011001 | +0.8751 + 1.0349i |
| w51 | 0011001 | +0.7380 + 0.8761i |
| w52 | 0011010 | +1.0529 − 0.8398i |
| w53 | 0011010 | +0.8839 − 0.7116i |
| w54 | 0011011 | +0.8751 − 1.0349i |
| w55 | 0011011 | +0.7380 − 0.8761i |
| w56 | 0011100 | +1.1857 + 0.6167i |
| w57 | 0011100 | +0.9935 + 0.5250i |
| w58 | 0011101 | +0.6570 + 1.1922i |
| w59 | 0011101 | +0.5568 + 1.0106i |
| w60 | 0011110 | +1.1857 − 0.6167i |
| w61 | 0011110 | +0.9935 − 0.5250i |
| w62 | 0011111 | +0.6570 − 1.1922i |
| w63 | 0011111 | +0.5568 − 1.0106i |
| w64 | 01000000 | −0.2459 + 0.2059i |
| w65 | 01000001 | −0.6025 + 0.5077i |
| w66 | 01000010 | −0.0949 + 0.2552i |
| w67 | 01000011 | −0.5005 + 0.6310i |
| w68 | 01000100 | −0.2459 − 0.2059i |
| w69 | 01000101 | −0.6025 − 0.5077i |
| w70 | 01000110 | −0.0949 − 0.2552i |
| w71 | 01000111 | −0.5005 − 0.6310i |
| w72 | 01001000 | −0.2508 + 0.2016i |
| w73 | 01001001 | −0.6756 + 0.3836i |
| w74 | 01001010 | −0.0912 + 0.2556i |
| w75 | 01001011 | −0.3899 + 0.7222i |
| w76 | 01001100 | −0.2508 − 0.2016i |
| w77 | 01001101 | −0.6756 − 0.3836i |
| w78 | 01001110 | −0.0912 − 0.2556i |
| w79 | 01001111 | −0.3899 − 0.7222i |
| w80 | 01010000 | −0.3507 + 0.3002i |

| w index | bit label | Constellation point |
| --- | --- | --- |
| w81 | 01010001 | −0.4734 + 0.4072i |
| w82 | 01010010 | −0.2035 + 0.4116i |
| w83 | 01010011 | −0.3688 + 0.5265i |
| w84 | 01010100 | −0.3507 − 0.3002i |
| w85 | 01010101 | −0.4734 − 0.4072i |
| w86 | 01010110 | −0.2035 − 0.4116i |
| w87 | 01010111 | −0.3688 − 0.5265i |
| w88 | 01011000 | −0.3739 + 0.2698i |
| w89 | 01011001 | −0.5263 + 0.3281i |
| w90 | 01011010 | −0.1890 + 0.4220i |
| w91 | 01011011 | −0.3094 + 0.5791i |
| w92 | 01011100 | −0.3739 − 0.2698i |
| w93 | 01011101 | −0.5263 − 0.3281i |
| w94 | 01011110 | −0.1890 − 0.4220i |
| w95 | 01011111 | −0.3094 − 0.5791i |
| w96 | 01100000 | +0.2459 + 0.2059i |
| w97 | 01100001 | +0.6025 + 0.5077i |
| w98 | 01100010 | +0.0949 + 0.2552i |
| w99 | 01100011 | +0.5005 + 0.6310i |
| w100 | 01100100 | +0.2459 − 0.2059i |
| w101 | 01100101 | +0.6025 − 0.5077i |
| w102 | 01100110 | +0.0949 − 0.2552i |
| w103 | 01100111 | +0.5005 − 0.6310i |
| w104 | 01101000 | +0.2508 + 0.2016i |
| w105 | 01101001 | +0.6756 + 0.3836i |
| w106 | 01101010 | +0.0912 + 0.2556i |
| w107 | 01101011 | +0.3899 + 0.7222i |
| w108 | 01101100 | +0.2508 − 0.2016i |
| w109 | 01101101 | +0.6756 − 0.3836i |
| w110 | 01101110 | +0.0912 − 0.2556i |
| w111 | 01101111 | +0.3899 − 0.7222i |
| w112 | 01110000 | +0.3507 + 0.3002i |
| w113 | 01110001 | +0.4734 + 0.4072i |
| w114 | 01110010 | +0.2035 + 0.4116i |
| w115 | 01110011 | +0.3688 + 0.5265i |
| w116 | 01110100 | +0.3507 − 0.3002i |
| w117 | 01110101 | +0.4734 − 0.4072i |
| w118 | 01110110 | +0.2035 − 0.4116i |
| w119 | 01110111 | +0.3688 − 0.5265i |
| w120 | 01111000 | +0.3739 + 0.2698i |
| w121 | 01111001 | +0.5263 + 0.3281i |
| w122 | 01111010 | +0.1890 + 0.4220i |
| w123 | 01111011 | +0.3094 + 0.5791i |
| w124 | 01111100 | +0.3739 − 0.2698i |
| w125 | 01111101 | +0.5263 − 0.3281i |
| w126 | 01111110 | +0.1890 − 0.4220i |
| w127 | 01111111 | +0.3094 − 0.5791i |
| w128 | 10000000 | −1.5843 + 0.1512i |
| w129 | 10000001 | −0.9275 + 0.0940i |
| w130 | 10000010 | −0.1639 + 1.6237i |
| w131 | 10000011 | −0.1000 + 0.9905i |
| w132 | 10000100 | −1.5843 − 0.1512i |
| w133 | 10000101 | −0.9275 − 0.0940i |
| w134 | 10000110 | −0.1639 − 1.6237i |
| w135 | 10000111 | −0.1000 − 0.9905i |
| w136 | 10001000 | −1.5329 + 0.4508i |
| w137 | 10001001 | −0.8933 + 0.2781i |
| w138 | 10001010 | −0.4843 + 1.5571i |
| w139 | 10001011 | −0.2959 + 0.9454i |
| w140 | 10001100 | −1.5329 − 0.4508i |
| w141 | 10001101 | −0.8933 − 0.2781i |
| w142 | 10001110 | −0.4843 − 1.5571i |
| w143 | 10001111 | −0.2959 − 0.9454i |
| w144 | 10010000 | −1.3147 + 0.1263i |
| w145 | 10010001 | −1.1029 + 0.1084i |
| w146 | 10010010 | −0.1381 + 1.3595i |
| w147 | 10010011 | −0.1179 + 1.1562i |
| w148 | 10010100 | −1.3147 − 0.1263i |
| w149 | 10010101 | −1.1029 − 0.1084i |
| w150 | 10010110 | −0.1381 − 1.3595i |
| w151 | 10010111 | −0.1179 − 1.1562i |
| w152 | 10011000 | −1.2724 + 0.3763i |
| w153 | 10011001 | −1.0662 + 0.3220i |
| w154 | 10011010 | −0.4077 + 1.3024i |
| w155 | 10011011 | −0.3470 + 1.1060i |
| w156 | 10011100 | −1.2724 − 0.3763i |
| w157 | 10011101 | −1.0662 − 0.3220i |
| w158 | 10011110 | −0.4077 − 1.3024i |
| w159 | 10011111 | −0.3470 − 1.1060i |
| w160 | 10100000 | +1.5843 + 0.1512i |
| w161 | 10100001 | +0.9275 + 0.0940i |
| w162 | 10100010 | +0.1639 + 1.6237i |
| w163 | 10100011 | +0.1000 + 0.9905i |
| w164 | 10100100 | +1.5843 − 0.1512i |
| w165 | 10100101 | +0.9275 − 0.0940i |
| w166 | 10100110 | +0.1639 − 1.6237i |
| w167 | 10100111 | +0.1000 − 0.9905i |
| w168 | 10101000 | +1.5329 + 0.4508i |
| w169 | 10101001 | +0.8933 + 0.2781i |
| w170 | 10101010 | +0.4843 + 1.5571i |
| w171 | 10101011 | +0.2959 + 0.9454i |
| w172 | 10101100 | +1.5329 − 0.4508i |
| w173 | 10101101 | +0.8933 − 0.2781i |
| w174 | 10101110 | +0.4843 − 1.5571i |
| w175 | 10101111 | +0.2959 − 0.9454i |
| w176 | 10110000 | +1.3147 + 0.1263i |
| w177 | 10110001 | +1.1029 + 0.1084i |
| w178 | 10110010 | +0.1381 + 1.3595i |
| w179 | 10110011 | +0.1179 + 1.1562i |
| w180 | 10110100 | +1.3147 − 0.1263i |
| w181 | 10110101 | +1.1029 − 0.1084i |
| w182 | 10110110 | +0.1381 − 1.3595i |
| w183 | 10110111 | +0.1179 − 1.1562i |
| w184 | 10111000 | +1.2724 + 0.3763i |
| w185 | 10111001 | +1.0662 + 0.3220i |
| w186 | 10111010 | +0.4077 + 1.3024i |
| w187 | 10111011 | +0.3470 + 1.1060i |
| w188 | 10111100 | +1.2724 − 0.3763i |
| w189 | 10111101 | +1.0662 − 0.3220i |
| w190 | 10111110 | +0.4077 − 1.3024i |
| w191 | 10111111 | +0.3470 − 1.1060i |
| w192 | 11000000 | −0.2552 + 0.0725i |
| w193 | 11000001 | −0.7681 + 0.0832i |
| w194 | 11000010 | −0.0726 + 0.0865i |
| w195 | 11000011 | −0.0867 + 0.8378i |
| w196 | 11000100 | −0.2552 − 0.0725i |
| w197 | 11000101 | −0.7681 − 0.0832i |
| w198 | 11000110 | −0.0726 − 0.0865i |
| w199 | 11000111 | −0.0867 − 0.8378i |
| w200 | 11001000 | −0.2567 + 0.0753i |
| w201 | 11001001 | −0.7371 + 0.2323i |
| w202 | 11001010 | −0.0722 + 0.0866i |
| w203 | 11001011 | −0.2417 + 0.8000i |
| w204 | 11001100 | −0.2567 − 0.0753i |
| w205 | 11001101 | −0.7371 − 0.2323i |
| w206 | 11001110 | −0.0722 − 0.0866i |
| w207 | 11001111 | −0.2417 − 0.8000i |
| w208 | 11010000 | −0.4495 + 0.0766i |
| w209 | 11010001 | −0.6140 + 0.0811i |
| w210 | 11010010 | −0.0717 + 0.5169i |
| w211 | 11010011 | −0.0837 + 0.6868i |
| w212 | 11010100 | −0.4495 − 0.0766i |
| w213 | 11010101 | −0.6140 − 0.0811i |
| w214 | 11010110 | −0.0717 − 0.5169i |
| w215 | 11010111 | −0.0837 − 0.6868i |
| w216 | 11011000 | −0.4423 + 0.1097i |
| w217 | 11011001 | −0.5925 + 0.1765i |
| w218 | 11011010 | −0.0883 + 0.5092i |
| w219 | 11011011 | −0.1746 + 0.6612i |
| w220 | 11011100 | −0.4423 − 0.1097i |
| w221 | 11011101 | −0.5925 − 0.1765i |
| w222 | 11011110 | −0.0883 − 0.5092i |
| w223 | 11011111 | −0.1746 − 0.6612i |
| w224 | 11100000 | +0.2552 + 0.0725i |
| w225 | 11100001 | +0.7681 + 0.0832i |
| w226 | 11100010 | +0.0726 + 0.0865i |
| w227 | 11100011 | +0.0867 + 0.8378i |
| w228 | 11100100 | +0.2552 − 0.0725i |
| w229 | 11100101 | +0.7681 − 0.0832i |
| w230 | 11100110 | +0.0726 − 0.0865i |
| w231 | 11100111 | +0.0867 − 0.8378i |
| w232 | 11101000 | +0.2567 + 0.0753i |
| w233 | 11101001 | +0.7371 + 0.2323i |
| w234 | 11101010 | +0.0722 + 0.0866i |

-continued

| w index | bit label | Constellation point |
|---|---|---|
| w235 | 11101011 | +0.2417 + 0.8000i |
| w236 | 11101100 | +0.2567 − 0.0753i |
| w237 | 11101101 | +0.7371 − 0.2323i |
| w238 | 11101110 | +0.0722 − 0.0866i |
| w239 | 11101111 | +0.2417 + 0.8000i |
| w240 | 11110000 | +0.4495 + 0.0766i |
| w241 | 11110001 | +0.6140 + 0.0811i |
| w242 | 11110010 | +0.0717 + 0.5169i |
| w243 | 11110011 | +0.0837 + 0.6868i |
| w244 | 11110100 | +0.4495 − 0.0766i |
| w245 | 11110101 | +0.6140 − 0.0811i |
| w246 | 11110110 | +0.0717 − 0.5169i |
| w247 | 11110111 | +0.0837 − 0.6868i |
| w248 | 11111000 | +0.4423 + 0.1097i |
| w249 | 11111001 | +0.5925 + 0.1765i |
| w250 | 11111010 | +0.0883 + 0.5092i |
| w251 | 11111011 | +0.1745 + 0.6612i |
| w252 | 11111100 | +0.4423 − 0.1097i |
| w253 | 11111101 | +0.5925 − 0.1765i |
| w254 | 11111110 | +0.0883 − 0.5092i |
| w255 | 11111111 | +0.1746 − 0.6612i | for R=3/4 (or R=1/2, 5/8 or 13/16):

| w index | bit label | Constellation point |
|---|---|---|
| w0 | 0000000 | −0.5207 + 1.2132i |
| w1 | 0000000 | −0.3103 + 1.2359i |
| w2 | 0000001 | −1.1610 + 1.1297i |
| w3 | 0000001 | −0.1051 + 1.2649i |
| w4 | 0000010 | −0.6193 + 0.6523i |
| w5 | 0000010 | −0.4533 + 0.6225i |
| w6 | 0000011 | −1.2194 + 0.5861i |
| w7 | 0000011 | −0.0684 + 0.5460i |
| w8 | 0000100 | +0.5207 + 1.2132i |
| w9 | 0000100 | +0.3103 + 1.2359i |
| w10 | 0000101 | +1.1610 + 1.1297i |
| w11 | 0000101 | +0.1051 + 1.2649i |
| w12 | 0000110 | +0.6193 + 0.6523i |
| w13 | 0000110 | +0.4633 + 0.6225i |
| w14 | 0000111 | +1.2194 + 0.5861i |
| w15 | 0000111 | +0.0684 + 0.5460i |
| w16 | 0001000 | −0.6089 + 1.4273i |
| w17 | 0001000 | −0.3588 + 1.4545i |
| w18 | 0001001 | −0.8292 + 1.2973i |
| w19 | 0001001 | −0.1197 + 1.4960i |
| w20 | 0001010 | −0.7956 + 0.6768i |
| w21 | 0001010 | −0.3209 + 0.5978i |
| w22 | 0001011 | −1.0079 + 0.6851i |
| w23 | 0001011 | −0.1960 + 0.5676i |
| w24 | 0001100 | +0.6089 + 1.4273i |
| w25 | 0001100 | +0.3588 + 1.4645i |
| w26 | 0001101 | +0.8292 + 1.2973i |
| w27 | 0001101 | +0.1197 + 1.4960i |
| w28 | 0001110 | +0.7956 + 0.6768i |
| w29 | 0001110 | +0.3209 + 0.5978i |
| w30 | 0001111 | +1.0079 + 0.6851i |
| w31 | 0001111 | +0.1960 + 0.5676i |
| w32 | 0010000 | −0.5207 − 1.2132i |
| w33 | 0010000 | −0.3103 − 1.2359i |
| w34 | 0010001 | −1.1610 − 1.1297i |
| w35 | 0010001 | −0.1051 − 1.2649i |
| w36 | 0010010 | −0.6193 − 0.6523i |
| w37 | 0010010 | −0.4633 − 0.6225i |
| w38 | 0010011 | −1.2194 − 0.5861i |
| w39 | 0010011 | −0.0684 − 0.5460i |
| w40 | 0010100 | +0.5207 − 1.2132i |
| w41 | 0010100 | +0.3103 − 1.2359i |
| w42 | 0010101 | +1.1610 − 1.1297i |
| w43 | 0010101 | +0.1051 − 1.2649i |
| w44 | 0010110 | +0.6193 − 0.6523i |
| w45 | 0010110 | +0.4533 − 0.6225i |
| w46 | 0010111 | +1.2194 − 0.5861i |
| w47 | 0010111 | +0.0684 − 0.5460i |
| w48 | 0011000 | −0.6089 − 1.4273i |
| w49 | 0011000 | −0.3588 − 1.4545i |
| w50 | 0011001 | −0.8292 − 1.2973i |
| w51 | 0011001 | −0.1197 − 1.4960i |
| w52 | 0011010 | −0.7956 − 0.6768i |
| w53 | 0011010 | −0.3209 − 0.5978i |
| w54 | 0011011 | −1.0079 − 0.6851i |
| w55 | 0011011 | −0.1960 − 0.5676i |
| w56 | 0011100 | +0.6089 − 1.4273i |
| w57 | 0011100 | +0.3588 − 1.4645i |
| w58 | 0011101 | +0.8292 − 1.2973i |
| w59 | 0011101 | +0.1197 − 1.4960i |
| w60 | 0011110 | +0.7956 − 0.6768i |
| w61 | 0011110 | +0.3209 − 0.5978i |
| w62 | 0011111 | +1.0079 − 0.6851i |
| w63 | 0011111 | +0.1960 − 0.5676i |
| w64 | 01000000 | −0.4992 + 1.0060i |
| w65 | 01000001 | −0.3097 + 1.0437i |
| w66 | 01000010 | −1.2435 + 0.8749i |
| w67 | 01000011 | −0.0961 + 1.0730i |
| w68 | 01000100 | −0.5761 + 0.8259i |
| w69 | 01000101 | −0.4319 + 0.7814i |
| w70 | 01000110 | −1.4344 + 0.6815i |
| w71 | 01000111 | −0.0548 + 0.6842i |
| w72 | 01001000 | +0.4992 + 1.0060i |
| w73 | 01001001 | +0.3097 + 1.0437i |
| w74 | 01001010 | +1.2435 + 0.8749i |
| w75 | 01001011 | +0.0961 + 1.0730i |
| w76 | 01001100 | +0.5761 + 0.8259i |
| w77 | 01001101 | +0.4319 + 0.7814i |
| w78 | 01001110 | +1.4344 + 0.6815i |
| w79 | 01001111 | +0.0548 + 0.6842i |
| w80 | 01010000 | −0.6956 + 1.0381i |
| w81 | 01010001 | −0.2552 + 0.9082i |
| w82 | 01010010 | −0.8938 + 1.0757i |
| w83 | 01010011 | −0.0867 + 0.8997i |
| w84 | 01010100 | −0.7562 + 0.8504i |
| w85 | 01010101 | −0.2903 + 0.7608i |
| w86 | 01010110 | −0.9633 + 0.8762i |
| w87 | 01010111 | −0.1482 + 0.7338i |
| w88 | 01011000 | +0.6956 + 1.0381i |
| w89 | 01011001 | +0.2552 + 0.9082i |
| w90 | 01011010 | +0.8938 + 1.0757i |
| w91 | 01011011 | +0.0867 + 0.8997i |
| w92 | 01011100 | +0.7562 + 0.8504i |
| w93 | 01011101 | +0.2903 + 0.7608i |
| w94 | 01011110 | +0.9633 + 0.8762i |
| w95 | 01011111 | +0.1482 + 0.7338i |
| w96 | 01100000 | −0.4992 − 1.0060i |
| w97 | 01100001 | −0.3097 − 1.0437i |
| w98 | 01100010 | −1.2435 − 0.8749i |
| w99 | 01100011 | −0.0961 − 1.0730i |
| w100 | 01100100 | −0.5761 − 0.8259i |
| w101 | 01100101 | −0.4319 − 0.7814i |
| w102 | 01100110 | −1.4344 − 0.6815i |
| w103 | 01100111 | −0.0548 − 0.6842i |
| w104 | 01101000 | +0.4992 − 1.0060i |
| w105 | 01101001 | +0.3097 − 1.0437i |
| w106 | 01101010 | +1.2435 − 0.8749i |
| w107 | 01101011 | +0.0961 − 1.0730i |
| w108 | 01101100 | +0.5761 − 0.8259i |
| w109 | 01101101 | +0.4319 − 0.7814i |
| w110 | 01101110 | +1.4344 − 0.6815i |
| w111 | 01101111 | +0.0548 − 0.6842i |
| w112 | 01110000 | −0.6956 − 1.0381i |
| w113 | 01110001 | −0.2552 − 0.9082i |
| w114 | 01110010 | −0.8938 − 1.0757i |
| w115 | 01110011 | −0.0867 − 0.8997i |
| w116 | 01110100 | −0.7562 − 0.8504i |
| w117 | 01110101 | −0.2903 − 0.7608i |
| w118 | 01110110 | −0.9633 − 0.8762i |
| w119 | 01110111 | −0.1482 − 0.7338i |
| w120 | 01111000 | +0.6956 − 1.0381i |
| w121 | 01111001 | +0.2552 − 0.9082i |
| w122 | 01111010 | +0.8938 − 1.0757i |
| w123 | 01111011 | +0.0867 − 0.8997i |
| w124 | 01111100 | +0.7562 − 0.8504i |
| w125 | 01111101 | +0.2903 − 0.7608i |

-continued

| w index | bit label | Constellation point |
| --- | --- | --- |
| w126 | 01111110 | +0.9633 − 0.8762i |
| w127 | 01111111 | +0.1482 − 0.7338i |
| w128 | 10000000 | −0.6538 − 0.0691i |
| w129 | 10000001 | −0.5051 + 0.0654i |
| w130 | 10000010 | −1.4515 + 0.1246i |
| w131 | 10000011 | −0.0720 + 0.0589i |
| w132 | 10000100 | −0.6396 + 0.4933i |
| w133 | 10000101 | −0.4850 + 0.4726i |
| w134 | 10000110 | −1.4339 + 0.3828i |
| w135 | 10000111 | −0.0708 + 0.4166i |
| w136 | 10001000 | +0.6538 + 0.0691i |
| w137 | 10001001 | +0.5051 + 0.0654i |
| w138 | 10001010 | +1.4515 + 0.1246i |
| w139 | 10001011 | +0.0720 + 0.0589i |
| w140 | 10001100 | +0.6396 + 0.4933i |
| w141 | 10001101 | +0.4850 + 0.4726i |
| w142 | 10001110 | +1.4339 + 0.3828i |
| w143 | 10001111 | +0.0708 + 0.4166i |
| w144 | 10010000 | −0.8080 + 0.0721i |
| w145 | 10010001 | −0.3603 + 0.0619i |
| w146 | 10010010 | −0.9770 + 0.0640i |
| w147 | 10010011 | −0.2162 + 0.0599i |
| w148 | 10010100 | −0.8066 + 0.5082i |
| w149 | 10010101 | −0.3436 + 0.4483i |
| w150 | 10010110 | −0.9839 + 0.5111i |
| w151 | 10010111 | −0.2091 + 0.4280i |
| w152 | 10011000 | +0.8080 + 0.0721i |
| w153 | 10011001 | +0.3603 + 0.0619i |
| w154 | 10011010 | +0.9770 + 0.0640i |
| w155 | 10011011 | +0.2162 + 0.0599i |
| w156 | 10011100 | +0.8066 + 0.5082i |
| w157 | 10011101 | +0.3436 + 0.4483i |
| w158 | 10011110 | +0.9839 + 0.5111i |
| w159 | 10011111 | +0.2091 + 0.4280i |
| w160 | 10100000 | −0.6538 − 0.0691i |
| w161 | 10100001 | −0.5051 − 0.0654i |
| w162 | 10100010 | −1.4515 − 0.1246i |
| w163 | 10100011 | −0.0720 − 0.0589i |
| w164 | 10100100 | −0.6396 − 0.4933i |
| w165 | 10100101 | −0.4850 − 0.4726i |
| w166 | 10100110 | −1.4339 − 0.3828i |
| w167 | 10100111 | −0.0708 − 0.4166i |
| w168 | 10101000 | +0.6538 − 0.0691i |
| w169 | 10101001 | +0.5051 − 0.0654i |
| w170 | 10101010 | +1.4515 − 0.1246i |
| w171 | 10101011 | +0.0720 − 0.0589i |
| w172 | 10101100 | +0.6396 − 0.4933i |
| w173 | 10101101 | +0.4850 − 0.4726i |
| w174 | 10101110 | +1.4339 − 0.3828i |
| w175 | 10101111 | +0.0708 − 0.4166i |
| w176 | 10110000 | −0.8080 − 0.0721i |
| w177 | 10110001 | −0.3603 − 0.0619i |
| w178 | 10110010 | −0.9770 − 0.0640i |
| w179 | 10110011 | −0.2162 − 0.0599i |
| w180 | 10110100 | −0.8066 − 0.5082i |
| w181 | 10110101 | −0.3436 − 0.4483i |
| w182 | 10110110 | −0.9839 − 0.5111i |
| w183 | 10110111 | −0.2091 − 0.4280i |
| w184 | 10111000 | +0.8080 − 0.0721i |
| w185 | 10111001 | +0.3603 − 0.0619i |
| w186 | 10111010 | +0.9770 − 0.0640i |
| w187 | 10111011 | +0.2162 − 0.0599i |
| w188 | 10111100 | +0.8066 − 0.5082i |
| w189 | 10111101 | +0.3436 − 0.4483i |
| w190 | 10111110 | +0.9839 − 0.5111i |
| w191 | 10111111 | +0.2091 − 0.4280i |
| w192 | 11000000 | −0.6518 + 0.2064i |
| w193 | 11000001 | −0.5023 + 0.1959i |
| w194 | 11000010 | −1.2169 + 0.1086i |
| w195 | 11000011 | −0.0716 + 0.1743i |
| w196 | 11000100 | −0.6490 + 0.3456i |
| w197 | 11000101 | −0.4967 + 0.3308i |
| w198 | 11000110 | −1.2175 + 0.3244i |
| w199 | 11000111 | −0.0713 + 0.2951i |
| w200 | 11001000 | +0.6513 + 0.206i |
| w201 | 11001001 | +0.5023 + 0.1959i |
| w202 | 11001010 | +1.2169 + 0.1085i |
| w203 | 11001011 | +0.0716 + 0.1743i |
| w204 | 11001100 | +0.6490 + 0.3456i |
| w205 | 11001101 | +0.4967 + 0.3308i |
| w206 | 11001110 | +1.2175 + 0.3244i |
| w207 | 11001111 | +0.0713 + 0.2951i |
| w208 | 11010000 | −0.8177 + 0.2121i |
| w209 | 11010001 | −0.3587 + 0.1857i |
| w210 | 11010010 | −1.0126 + 0.1946i |
| w211 | 11010011 | −0.2150 + 0.1782i |
| w212 | 11010100 | −0.8136 + 0.3517i |
| w213 | 11010101 | −0.3540 + 0.3139i |
| w214 | 11010110 | −1.0159 + 0.3531i |
| w215 | 11010111 | −0.2130 + 0.3012i |
| w216 | 11011000 | +0.8177 + 0.2121i |
| w217 | 11011001 | +0.3587 + 0.1857i |
| w218 | 11011010 | +1.0126 + 0.1946i |
| w219 | 11011011 | +0.2150 + 0.1782i |
| w220 | 11011100 | +0.8136 + 0.3517i |
| w221 | 11011101 | +0.3540 + 0.3139i |
| w222 | 11011110 | +1.0159 + 0.3531i |
| w223 | 11011111 | +0.2130 + 0.3012i |
| w224 | 11100000 | −0.6518 − 0.2064i |
| w225 | 11100001 | −0.5023 − 0.1959i |
| w226 | 11100010 | −1.2169 − 0.1086i |
| w227 | 11100011 | −0.0716 − 0.1743i |
| w228 | 11100100 | −0.6490 − 0.3456i |
| w229 | 11100101 | −0.4967 − 0.3308i |
| w230 | 11100110 | −1.2175 − 0.3244i |
| w231 | 11100111 | −0.0713 − 0.2951i |
| w232 | 11101000 | +0.6518 − 0.2064i |
| w233 | 11101001 | +0.5023 − 0.1959i |
| w234 | 11101010 | +1.2169 − 0.1086i |
| w235 | 11101011 | +0.0716 − 0.1743i |
| w236 | 11101100 | +0.6490 − 0.3456i |
| w237 | 11101101 | +0.4967 − 0.3308i |
| w238 | 11101110 | +1.2175 − 0.3244i |
| w239 | 11101111 | +0.0713 − 0.2951i |
| w240 | 11110000 | −0.8177 − 0.2121i |
| w241 | 11110001 | −0.3587 − 0.1357i |
| w242 | 11110010 | −1.0126 − 0.1946i |
| w243 | 11110011 | −0.2150 − 0.1782i |
| w244 | 11110100 | −0.8136 − 0.3517i |
| w245 | 11110101 | −0.3540 − 0.3139i |
| w246 | 11110110 | −1.0159 − 0.3531i |
| w247 | 11110111 | −0.2130 − 0.3012i |
| w248 | 11111000 | +0.8177 − 0.2121i |
| w249 | 11111001 | +0.3587 − 0.1857i |
| w250 | 11111010 | +1.0126 − 0.1946i |
| w251 | 11111011 | +0.2150 − 0.1782i |
| w252 | 11111100 | +0.8186 − 0.3517i |
| w253 | 11111101 | +0.3540 − 0.3139i |
| w254 | 11111110 | +1.0159 − 0.3531i |
| w255 | 11111111 | +0.2130 − 0.3012i | for R=13/16 (or R=1/2, 5/8 or 3/4):

| w index | bit label | Constellation point |
| --- | --- | --- |
| w0 | 0000000 | −0.4976 + 1.2018i |
| w1 | 0000000 | +0.4976 + 1.2018i |
| w2 | 0000001 | −0.4976 − 1.2018i |
| w3 | 0000001 | +0.4976 − 1.2018i |
| w4 | 0000010 | −0.4821 + 1.0103i |
| w5 | 0000010 | +0.4821 + 1.0103i |
| w6 | 0000011 | −0.4821 − 1.0103i |
| w7 | 0000011 | +0.4821 − 1.0103i |
| w8 | 0000100 | −1.1616 + 1.0595i |
| w9 | 0000100 | +1.1616 + 1.0595i |
| w10 | 0000101 | −1.1616 − 1.0595i |
| w11 | 0000101 | +1.1616 − 1.0595i |
| w12 | 0000110 | −1.2384 + 0.8218i |
| w13 | 0000110 | +1.2384 + 0.8218i |
| w14 | 0000111 | −1.2384 − 0.8218i |
| w15 | 0000111 | +1.2384 − 0.8218i |
| w16 | 0001000 | −0.6618 + 0.0721i |

| w index | bit label | Constellation point |
|---|---|---|
| w17 | 0001000 | +0.6618 + 0.0721i |
| w18 | 0001001 | −0.6618 − 0.0721i |
| w19 | 0001001 | +0.6618 − 0.0721i |
| w20 | 0001010 | −0.6653 + 0.2161i |
| w21 | 0001010 | +0.6653 + 0.2161i |
| w22 | 0001011 | −0.6653 − 0.2161i |
| w23 | 0001011 | +0.6653 − 0.2161i |
| w24 | 0001100 | −1.4070 + 0.1153i |
| w25 | 0001100 | +1.4070 + 0.1153i |
| w26 | 0001101 | −1.4070 − 0.1153i |
| w27 | 0001101 | +1.4070 − 0.1153i |
| w28 | 0001110 | −1.1945 + 0.1045i |
| w29 | 0001110 | +1.1945 + 0.1045i |
| w30 | 0001111 | −1.1945 − 0.1045i |
| w31 | 0001111 | +1.1945 − 0.1045i |
| w32 | 0010000 | −0.2993 + 1.2594i |
| w33 | 0010000 | +0.2993 + 1.2594i |
| w34 | 0010001 | −0.2993 − 1.2594i |
| w35 | 0010001 | +0.2993 − 1.2594i |
| w36 | 0010010 | −0.2906 + 1.0772i |
| w37 | 0010010 | +0.2906 + 1.0772i |
| w38 | 0010011 | −0.2906 − 1.0772i |
| w39 | 0010011 | +0.2906 − 1.0772i |
| w40 | 0010100 | −0.0985 + 1.2520i |
| w41 | 0010100 | +0.0985 + 1.2520i |
| w42 | 0010101 | −0.0985 − 1.2520i |
| w43 | 0010101 | +0.0985 − 1.2520i |
| w44 | 0010110 | −0.0938 + 1.0710i |
| w45 | 0010110 | +0.0938 + 1.0710i |
| w46 | 0010111 | −0.0938 − 1.0710i |
| w47 | 0010111 | +0.0938 − 1.0710i |
| w48 | 0011000 | −0.5134 + 0.0686i |
| w49 | 0011000 | +0.5134 + 0.0686i |
| w50 | 0011001 | −0.5134 − 0.0686i |
| w51 | 0011001 | +0.5134 − 0.0686i |
| w52 | 0011010 | −0.5133 + 0.2063i |
| w53 | 0011010 | +0.5133 + 0.2063i |
| w54 | 0011011 | −0.5133 − 0.2063i |
| w55 | 0011011 | +0.5133 − 0.2063i |
| w56 | 0011100 | −0.0735 + 0.0614i |
| w57 | 0011100 | +0.0735 + 0.0614i |
| w58 | 0011101 | −0.0735 − 0.0614i |
| w59 | 0011101 | +0.0735 − 0.0614i |
| w60 | 0011110 | −0.0734 + 0.1846i |
| w61 | 0011110 | +0.0734 + 0.1846i |
| w62 | 0011111 | −0.0734 − 0.1846i |
| w63 | 0011111 | +0.0734 − 0.1846i |
| w64 | 01000000 | −0.5648 + 1.4016i |
| w65 | 01000001 | +0.5648 + 1.4016i |
| w66 | 01000010 | −0.5648 − 1.4016i |
| w67 | 01000011 | +0.5648 − 1.4016i |
| w68 | 01000100 | −0.6826 + 1.0558i |
| w69 | 01000101 | +0.6826 + 1.0558i |
| w70 | 01000110 | −0.6826 − 1.0558i |
| w71 | 01000111 | +0.6826 − 1.0558i |
| w72 | 01001000 | −0.7696 + 1.2863i |
| w73 | 01001001 | +0.7696 + 1.2863i |
| w74 | 01001010 | −0.7696 − 1.2863i |
| w75 | 01001011 | +0.7696 − 1.2863i |
| w76 | 01001100 | −0.8965 + 1.0947i |
| w77 | 01001101 | +0.8965 + 1.0947i |
| w78 | 01001110 | −0.8965 − 1.0947i |
| w79 | 01001111 | +0.8965 − 1.0947i |
| w80 | 01010000 | −0.8148 + 0.0743i |
| w81 | 01010001 | +0.8148 + 0.0743i |
| w82 | 01010010 | −0.8148 − 0.0743i |
| w83 | 01010011 | +0.8148 − 0.0743i |
| w84 | 01010100 | −0.8285 + 0.2219i |
| w85 | 01010101 | +0.8285 + 0.2219i |
| w86 | 01010110 | −0.8285 − 0.2219i |
| w87 | 01010111 | +0.8285 − 0.2219i |
| w88 | 01011000 | −0.9784 + 0.0686i |
| w89 | 01011001 | +0.9784 + 0.0686i |
| w90 | 01011010 | −0.9784 − 0.0686i |
| w91 | 01011011 | +0.9784 − 0.0686i |
| w92 | 01011100 | −1.0093 + 0.2102i |
| w93 | 01011101 | +1.0093 + 0.2102i |
| w94 | 01011110 | −1.0093 − 0.2102i |
| w95 | 01011111 | +1.0093 − 0.2102i |
| w96 | 01100000 | −0.3403 + 1.4586i |
| w97 | 01100001 | +0.3403 + 1.4586i |
| w98 | 01100010 | −0.3403 − 1.4586i |
| w99 | 01100011 | +0.3403 − 1.4586i |
| w100 | 01100100 | −0.2690 + 0.9234i |
| w101 | 01100101 | +0.2690 + 0.9234i |
| w102 | 01100110 | −0.2690 − 0.9234i |
| w103 | 01100111 | +0.2690 − 0.9234i |
| w104 | 01101000 | −0.1114 + 1.4628i |
| w105 | 01101001 | +0.1114 + 1.4628i |
| w106 | 01101010 | −0.1114 − 1.4628i |
| w107 | 01101011 | +0.1114 − 1.4628i |
| w108 | 01101100 | −0.0905 + 0.9054i |
| w109 | 01101101 | +0.0905 + 0.9054i |
| w110 | 01101110 | −0.0905 − 0.9054i |
| w111 | 01101111 | +0.0905 − 0.9054i |
| w112 | 01110000 | −0.3668 + 0.0653i |
| w113 | 01110001 | +0.3668 + 0.0653i |
| w114 | 01110010 | −0.3668 − 0.0653i |
| w115 | 01110011 | +0.3668 − 0.0653i |
| w116 | 01110100 | −0.3660 + 0.1965i |
| w117 | 01110101 | +0.3660 + 0.1965i |
| w115 | 01110110 | −0.3660 − 0.1965i |
| w119 | 01110111 | +0.3660 − 0.1965i |
| w120 | 01111000 | −0.2204 + 0.0628i |
| w121 | 01111001 | +0.2204 + 0.0628i |
| w122 | 01111010 | −0.2204 − 0.0628i |
| w123 | 01111011 | +0.2204 − 0.0628i |
| w124 | 01111100 | −0.2198 + 0.1888i |
| w125 | 01111101 | +0.2198 + 0.1888i |
| w126 | 01111110 | −0.2198 − 0.1888i |
| w127 | 01111111 | +0.2198 − 0.1888i |
| w128 | 10000000 | −0.6404 + 0.6801i |
| w129 | 10000001 | +0.6404 + 0.6801i |
| w130 | 10000010 | −0.6404 − 0.6801i |
| w131 | 10000011 | +0.6404 − 0.6801i |
| w132 | 10000100 | −0.5954 + 0.8500i |
| w133 | 10000101 | +0.5954 + 0.8500i |
| w134 | 10000110 | −0.5954 − 0.8500i |
| w135 | 10000111 | +0.5954 − 0.8500i |
| w136 | 10001000 | −1.1989 + 0.5582i |
| w137 | 10001001 | +1.1989 + 0.5582i |
| w138 | 10001010 | −1.1989 − 0.5582i |
| w139 | 10001011 | +1.1989 − 0.5582i |
| w140 | 10001100 | −1.4012 + 0.6249i |
| w141 | 10001101 | +1.4012 + 0.6249i |
| w142 | 10001110 | −1.4012 − 0.6249i |
| w143 | 10001111 | +1.4012 − 0.6249i |
| w144 | 10010000 | −0.6524 + 0.5156i |
| w145 | 10010001 | +0.6524 + 0.5156i |
| w146 | 10010010 | −0.6524 − 0.5156i |
| w147 | 10010011 | +0.6524 − 0.5156i |
| w148 | 10010100 | −0.6640 + 0.3620i |
| w149 | 10010101 | +0.6640 + 0.3620i |
| w150 | 10010110 | −0.6640 − 0.3620i |
| w151 | 10010111 | +0.6640 − 0.3620i |
| w152 | 10011000 | −1.4123 + 0.3539i |
| w153 | 10011001 | +1.4123 + 0.3539i |
| w154 | 10011010 | −1.4123 − 0.3539i |
| w155 | 10011011 | +1.4123 − 0.3539i |
| w156 | 10011100 | −1.2076 + 0.3137i |
| w157 | 10011101 | +1.2076 + 0.3137i |
| w158 | 10011110 | −1.2076 − 0.3137i |
| w159 | 10011111 | +1.2076 − 0.3137i |
| w160 | 10100000 | −0.4846 + 0.6443i |
| w161 | 10100001 | +0.4846 + 0.6443i |
| w162 | 10100010 | −0.4846 − 0.6443i |
| w163 | 10100011 | +0.4846 − 0.6443i |
| w164 | 10100100 | −0.4495 + 0.7999i |
| w165 | 10100101 | +0.4495 + 0.7999i |
| w166 | 10100110 | −0.4495 − 0.7999i |
| w167 | 10100111 | +0.4495 − 0.7999i |
| w168 | 10101000 | −0.0693 + 0.5689i |
| w169 | 10101001 | +0.0693 + 0.5689i |
| w170 | 10101010 | −0.0693 − 0.5689i |

| w index | bit label | Constellation point |
|---|---|---|
| w171 | 10101011 | +0.0693 − 0.5689i |
| w172 | 10101100 | −0.0563 + 0.7102i |
| w173 | 10101101 | +0.0563 + 0.7102i |
| w174 | 10101110 | −0.0563 − 0.7102i |
| w175 | 10101111 | +0.0563 − 0.7102i |
| w176 | 10110000 | −0.5011 + 0.4924i |
| w177 | 10110001 | +0.5011 + 0.4924i |
| w178 | 10110010 | −0.5011 − 0.4924i |
| w179 | 10110011 | +0.5011 − 0.4924i |
| w180 | 10110100 | −0.5105 + 0.3465i |
| w181 | 10110101 | +0.5105 + 0.3465i |
| w182 | 10110110 | −0.5105 − 0.3465i |
| w183 | 10110111 | +0.5105 − 0.3465i |
| w184 | 10111000 | −0.0720 + 0.4369i |
| w185 | 10111001 | +0.0720 + 0.4369i |
| w186 | 10111010 | −0.0720 − 0.4369i |
| w187 | 10111011 | +0.0720 − 0.4369i |
| w188 | 10111100 | −0.0730 + 0.3094i |
| w189 | 10111101 | +0.0730 + 0.3094i |
| w190 | 10111110 | −0.0730 − 0.3094i |
| w191 | 10111111 | +0.0730 − 0.3094i |
| w192 | 11000000 | −0.8128 + 0.7021i |
| w193 | 11000001 | +0.8128 + 0.7021i |
| w194 | 11000010 | −0.8128 − 0.7021i |
| w195 | 11000011 | +0.8128 − 0.7021i |
| w196 | 11000100 | −0.7699 + 0.8797i |
| w197 | 11000101 | +0.7699 + 0.8797i |
| w198 | 11000110 | −0.7699 − 0.8797i |
| w199 | 11000111 | +0.7699 − 0.8797i |
| w200 | 11001000 | −1.0129 + 0.6976i |
| w201 | 11001001 | +1.0129 + 0.6976i |
| w202 | 11001010 | −1.0129 − 0.6976i |
| w203 | 11001011 | +1.0129 − 0.6976i |
| w204 | 11001100 | −0.9657 + 0.8860i |
| w205 | 11001101 | +0.9657 + 0.8860i |
| w206 | 11001110 | −0.9657 − 0.8860i |
| w207 | 11001111 | +0.9657 − 0.8860i |
| w208 | 11010000 | −0.8099 + 0.5313i |
| w209 | 11010001 | +0.8099 + 0.5313i |
| w210 | 11010010 | −0.8099 − 0.5313i |
| w211 | 11010011 | +0.8099 − 0.5313i |
| w212 | 11010100 | −0.8291 + 0.3705i |
| w213 | 11010101 | +0.8291 + 0.3705i |
| w214 | 11010110 | −0.8291 − 0.3705i |
| w215 | 11010111 | +0.8291 − 0.3705i |
| w216 | 11011000 | −0.9768 + 0.5294i |
| w217 | 11011001 | +0.9768 + 0.5294i |
| w218 | 11011010 | −0.9768 − 0.5294i |
| w219 | 11011011 | +0.9768 − 0.5294i |
| w220 | 11011100 | −1.0171 + 0.3701i |
| w221 | 11011101 | +1.0171 + 0.3701i |
| w222 | 11011110 | −1.0171 − 0.3701i |
| w223 | 11011111 | +1.0171 − 0.3701i |
| w224 | 11100000 | −0.3381 + 0.6175i |
| w225 | 11100001 | +0.3381 + 0.6175i |
| w226 | 11100010 | −0.3381 − 0.6175i |
| w227 | 11100011 | +0.3381 − 0.6175i |
| w228 | 11100100 | −0.3079 + 0.7726i |
| w229 | 11100101 | +0.3079 + 0.7726i |
| w230 | 11100110 | −0.3079 − 0.7726i |
| w231 | 11100111 | +0.3079 − 0.7726i |
| w232 | 11101000 | −0.2034 + 0.5915i |
| w233 | 11101001 | +0.2034 + 0.5915i |
| w234 | 11101010 | −0.2034 − 0.5915i |
| w235 | 11101011 | +0.2034 − 0.5915i |
| w236 | 11101100 | −0.1695 + 0.7506i |
| w237 | 11101101 | +0.1695 + 0.7506i |
| w238 | 11101110 | −0.1695 − 0.7506i |
| w239 | 11101111 | +0.1695 − 0.7506i |
| w240 | 11110000 | −0.3558 + 0.4698i |
| w241 | 11110001 | +0.3558 + 0.4698i |
| w242 | 11110010 | −0.3558 − 0.4698i |
| w243 | 11110011 | +0.3558 − 0.4698i |
| w244 | 11110100 | −0.3634 + 0.3304i |
| w245 | 11110101 | +0.3634 + 0.3304i |
| w246 | 11110110 | −0.3634 − 0.3304i |
| w247 | 11110111 | +0.3634 − 0.3304i |
| w248 | 11111000 | −0.2145 + 0.4495i |
| w249 | 11111001 | +0.2145 + 0.4495i |
| w250 | 11111010 | −0.2145 − 0.4495i |
| w251 | 11111011 | +0.2145 − 0.4495i |
| w252 | 11111100 | −0.2184 + 0.3170i |
| w253 | 11111101 | +0.2184 + 0.3170i |
| w254 | 11111110 | −0.2184 − 0.3170i |
| w255 | 11111111 | +0.2184 − 0.3170i |

Still further, a non-uniform constellation obtained from a constellation from anyone of groups A or B through rotation by an angle around the origin, through inversion of bit labels for all constellation points, through interchanging of bit positions, through mirroring on any line in the complex plane and/or through predistortion for the constellation points may be used by the modulator. Further, the bit labeling indicated in groups A to B may alternatively be inverted for one or more bit labels.

Figure 6:
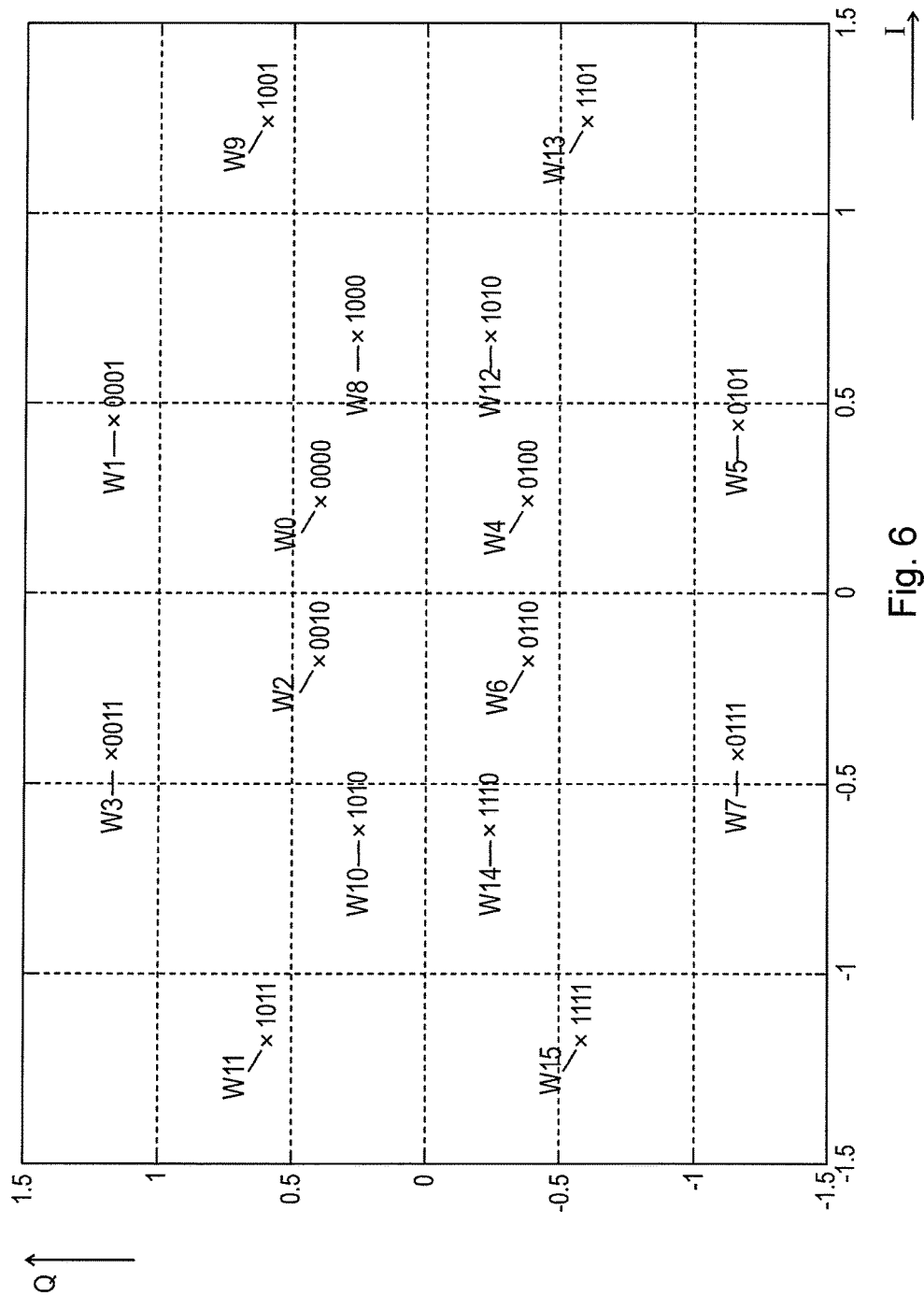
FIG. 6 shows a diagram of an exemplary two-dimensional non-uniform constellation for 16-QAM according to the present disclosure.

As shown above, two-dimensional NUCs are proposed including constellation points and bit labelling. The constellation points, i.e., coordinates in the complex plane, use the notation according to which a first column defines the w vector and the second column describes the bit labelling of the constellation points in the following columns (for different MCS indices). An exemplary diagram showing a constellation for a two-dimensional NUC for 16-QAM is depicted in FIG. 6 for modulation order M=16 and coderate R=5/8 (MCS=11) and SC as PHY mode. The corresponding constellation point vector is w=(+0.2173+0.4189i, +0.4326+1.1445i, −0.2173+0.4189i, −0.4326+1.1445i, +0.2173−0.4189i, +0.4326−1.1445i, −0.2173−0.4189i, −0.4326−1.1445i, +0.6578+0.2571i, +1.2088+0.5659i, −0.6578+0.2571i, −1.2088+0.5659i, +0.6578−0.2571i, +1.2088−0.5659i, −0.6578−0.2571i, −1.2088−0.5659i) for the bit labels from 0000 to 1111, wherein i=sqrt(−1) is the imaginary unit.

It shall be noted that the same NUCs may be used for different MCS indices (e.g. the constellation points defined for MCS 10 might be used for both MCS 10 and MCS 11 to reduce the overall number of NUCs), in particular for different code rates R. Hence, it is indicated in the tables for the NUCs for which MCS indices (representing a code rate R, a modulation order M and PHY mode) or for which code rates R the respective constellations points and bit labels are used. If there are two or more MCS indices or code rates R indicated, it may be predetermined for which MCS index/code rate R the constellations points and bit labels shall be used by a particular communication system or by particular devices. Further, it shall be noted that bit positions might be inverted, i.e. the bits of any bit position of the bit labeling might be flipped, resulting in the same performance.

The bit labelling, (i.e. which bit combination is assigned to which constellation point) is preferably optimized to fit in a best possible way into the existing IEEE 802.11ad or IEEE 802.11ay architecture, yielding minimum error rates after FEC decoding. I.e. in an embodiment mainly the QAM mapper (modulator) 12 is changed compared to the known layout. In an embodiment the existing interleaving may be used as provided in known systems. Typically, in an optimization of the BICM, first the channel coding (FEC) is designed. In a next step the QAM (NUC) is optimized for the target SNR of the FEC. Here, the bit labelling of the NUC was optimized to optimally match the existing FEC and newly proposed NUC without adding an optimized interleaving between FEC and QAM.

For the bit labelling optimization, for a given FEC code, the error protection of the bits might be unequal (e.g. for irregular LDPC). The LLR values after demapping have different protection levels as well (given by the bit labelling). If the strongest code bits would be matched to the strongest LLR positions, the weak code bits are difficult to decode. A matching of the weakest code bits to the strongest LLR positions is also suboptimal. A optimum bit labelling balances the matching of different LLR robustness levels to code bits with different protection levels.

Obviously, numerous modifications and variations of the present disclosure are possible in light of the above teachings. It is therefore to be understood that within the scope of the appended claims, the disclosure may be practiced otherwise than as specifically described herein (e.g., if the NUC position vectors are rounded to a smaller number of digits).

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Further, such a software may also be distributed in other forms, such as via the Internet or other wired or wireless telecommunication systems.

The elements of the disclosed devices, apparatus and systems may be implemented by corresponding hardware and/or software elements, for instance appropriated circuits. A circuit is a structural assemblage of electronic components including conventional circuit elements, integrated circuits including application specific integrated circuits, standard integrated circuits, application specific standard products, and field programmable gate arrays. Further a circuit includes central processing units, graphics processing units, and microprocessors which are programmed or configured according to software code. A circuit does not include pure software, although a circuit includes the above-described hardware executing software.

It follows a list of further embodiments of the disclosed subject matter:

1. A coding and modulation apparatus comprising
    an encoder configured to encode input data into cell words according to a low density parity check code, LDPC, and
    a modulator configured to modulate said cell words into constellation values of a non-uniform constellation and to assign bit combinations to constellation values of the used non-uniform constellation,
wherein said modulating is configured to use, based on the PHY mode, the total number M of constellation points of the constellation and the code rate, a non-uniform constellation and bit labeling from one of the groups A or B as disclosed herein or a non-uniform constellation obtained from a constellation from anyone of groups A or B through rotation by an angle around the origin, through inversion of bit labels for all constellation points, through interchanging of bit positions, through mirroring on any line in the complex plane and/or through predistortion for the constellation points.

2. A coding and modulation apparatus as defined in embodiment 1,
further comprising a selection unit configured to select the total number M of constellation points of the constellation and the code rate based on channel conditions between a transmission apparatus including said coding and modulation apparatus and a receiving apparatus with which said transmission apparatus seeks to communicate.

3. A coding and modulation apparatus as defined in embodiment 2,
wherein said selection unit is configured to select a constellation with a higher number of M and/or a higher code rate the better the channel conditions are.

4. A coding and modulation apparatus as defined in one of embodiments 1 to 3,
wherein said coding and modulation apparatus is configured for use in a transmission apparatus according to IEEE 802.11.

5. A coding and modulation method comprising
    encoding input data into cell words according to a low density parity check code, LDPC, and
    modulating said cell words into constellation values of a non-uniform constellation and to assign bit combinations to constellation values of the used non-uniform constellation,
wherein said modulating is configured to use, based on the PHY mode, the total number M of constellation points of the constellation and the code rate, a non-uniform constellation and bit labeling from one of the groups A or B as disclosed herein or a non-uniform constellation obtained from a constellation from anyone of groups A or B through rotation by an angle around the origin, through inversion of bit labels for all constellation points, through interchanging of bit positions, through mirroring on any line in the complex plane and/or through predistortion for the constellation points.

6. A transmission apparatus comprising:
    a coding and modulation apparatus as defined in embodiment 1 configured to encode and modulate input data into constellation values,
    a converter configured to convert said constellation values into one or more transmission streams to be transmitted, and
    a transmitter configured to transmit said one or more transmission streams.

7. A transmission apparatus as defined in embodiment 6, further comprising a signalling unit configured to embed signalling information into the one or more transmission streams, said signalling information including information about the PHY mode, the total number M of constellation points of the constellation, the location of the constellation points and the code rate.

8. A transmission apparatus as defined in embodiment 6 or 7,
wherein said signalling unit is configured to embed signalling information into the one or more transmission streams, said signalling information including a modulation and coding, MCS, index information including information about the PHY mode, the total number M of constellation points of the constellation and the code rate.

9. A transmission apparatus as defined in one of embodiments 6 to 8,
wherein said modulation unit is configured to select using a uniform constellation instead of one of said non-uniform constellations for modulating said cell words into constellation values, and
wherein said signalling unit is configured to embed signalling information into the one or more transmission streams, said signalling information including constellation information indicating if a non-uniform constellation or a uniform constellation has been used for modulation.

10. A transmission apparatus as defined in one of embodiments 7 to 9,
wherein said signalling unit is configured to embed said signalling information at the beginning of frames, in particular of each frame, of a plurality of frames used for transmission of the one or more transmission streams.

11. A transmission apparatus as defined in one of embodiments 7 to 9,
wherein said signalling unit is configured to embed said signalling information into a Header field.

12. A transmission method comprising:
a coding and modulation method as defined in embodiment 5 that encodes and modulates input data into constellation values,
converting said constellation values into one or more transmission streams to be transmitted, and
transmitting said one or more transmission streams.

13. A demodulation and decoding apparatus comprising:
a demodulator configured to demodulate constellation values of a non-uniform constellation into cell words and to assign bit combinations to constellation values of the used non-uniform constellation, and
a decoder configured to decode cell words into output data according to a low density parity check code, LDPC,
wherein said demodulating is configured to use, based on signalling information indicating the PHY mode, the total number M of constellation points of the constellation and the code rate, a non-uniform constellation and bit labeling from one of the groups A or B as disclosed herein or a non-uniform constellation obtained from a constellation from anyone of groups A or B through rotation by an angle around the origin, through inversion of bit labels for all constellation points, through interchanging of bit positions, through mirroring on any line in the complex plane and/or through predistortion for the constellation points.

14. A demodulation and decoding method comprising:
demodulating constellation values of a non-uniform constellation into cell words and assigning bit combinations to constellation values of the used non-uniform constellation, and
decoding cell words into output data according to a low density parity check code, LDPC,
wherein said demodulating is configured to use, based on signalling information indicating the PHY mode, the total number M of constellation points of the constellation and the code rate, a non-uniform constellation and bit labeling from one of the groups A or B as disclosed herein or a non-uniform constellation obtained from a constellation from anyone of groups A or B through rotation by an angle around the origin, through inversion of bit labels for all constellation points, through interchanging of bit positions, through mirroring on any line in the complex plane and/or through predistortion for the constellation points.

15. Receiving apparatus comprising:
a receiver configured to receive one or more transmission streams,
a deconverter configured to deconvert one or more transmission streams into said constellation values, and
a demodulation and decoding apparatus as defined in embodiment 13 configured to demodulate and decode said constellation values into output data.

16. Receiving method comprising:
receiving one or more transmission streams,
deconverting one or more transmission streams into said constellation values, and
demodulating and decoding said constellation values into output data according to a method as defined in embodiment 14.

17. A non-transitory computer-readable recording medium that stores therein a computer program product, which, when executed by a processor, causes the method according to embodiment 5 or 14 to be performed.

18. A communications system comprising one or more transmission apparatus as defined in embodiment 1 and one or more receiving apparatus as defined in embodiment 15.

19. A computer program comprising program code means for causing a computer to perform the steps of said method according to embodiment 5 or 14 when said computer program is carried out on a computer.

The invention claimed is:

1. A coding and modulation apparatus comprising:
an encoder configured to encode input data into cell words according to a low density parity check code, LDPC, and
a modulator configured to modulate said cell words into constellation values of a non-uniform constellation and to assign bit combinations to constellation values of the used non-uniform constellation,
wherein said modulator is configured to use, based on the PHY mode, the total number M of constellation points of the constellation and the code rate,
i) a non-uniform constellation and bit labeling from a group A, if the PHY mode is OFDM mode and if M=16, 64, 128 or 256, the group A comprising constellations as defined in
sub-group A1 for 16-QAM with M=16 and code rates of 1/2, 5/8, 3/4 or 13/16,
sub-group A2 for 64-QAM with M=64 and code rates of 5/8, 3/4 or 13/16,
sub-group A3 for 128-QAM with M=128 and code rates of 1/2, 5/8, 3/4 or 13/16, and
sub-group A4 for 256-QAM with M=256 and code rates of 1/2, 5/8, 3/4 or 13/16,
or
ii) a non-uniform constellation and bit labeling from a group B, if the PHY mode is single carrier mode and if M=16, 32, 64, 128 or 256, the group B comprising constellations as defined in
sub-group B1 for 16-QAM with M=16 and code rates of 1/2, 5/8 or 3/4,
sub-group B2 for 32-QAM with M=32 and code rates of 1/2, 5/8, 3/4 or 13/16,
sub-group B3 for 64-QAM with M=64 and code rates of 1/2, 5/8, 3/4 or 13/16, sub-group B4 for 128-QAM with M=128 and code rates of 1/2, 5/8, 3/4 or 13/16, and
sub-group B5 for 256-QAM with M=256 and code rates of 1/2, 5/8, 3/4 or 13/16,
or
iii) a non-uniform constellation obtained from a constellation from anyone of groups A or B through rotation by an angle around the origin, through inversion of bit labels for all constellation points, through interchanging of bit positions, through mirroring on any line in the complex plane and/or through predistortion for the constellation points, wherein the constellation points are defined by a constellation position vector $w_0 \ldots w_{M-1}$, and wherein the constellation position vectors of the different constellations of the groups A or B of constellations are defined as follows:

A) M-QAM non-uniform constellations of group A for OFDM as PHY mode:

A1) 16-QAM NUC

| w | bit label | R = 1/2 (MCS = 18) (or R = 5/8, 3/4 or 13/16) | R = 5/8 (MCS = 19) (or R = 1/2, 3/4 or 13/16) | R = 3/4 (MCS = 20) (or R = 5/8, 1/2 or 13/16) | R = 13/16 (MCS = 21) (or R = 1/2, 5/8 or 3/4) |
|---|---|---|---|---|---|
| w0  | 0000 | +0.4925 + 1.2040i | +0.2173 + 0.4189i | +0.2976 − 0.2976i | +0.3018 − 0.3018i |
| w1  | 0001 | +0.2530 + 0.4936i | +0.6578 + 0.2571i | +0.2976 − 0.9547i | −0.3018 − 0.3018i |
| w2  | 0010 | +0.4925 − 1.2040i | +0.4326 + 1.1445i | −0.2976 − 0.2976i | +0.3018 − 0.9534i |
| w3  | 0011 | +0.2530 − 0.4936i | +1.2088 + 0.5659i | −0.2976 − 0.9547i | −0.3018 − 0.9534i |
| w4  | 0100 | +1.2040 + 0.4925i | +0.2173 − 0.4189i | +0.9547 − 0.2976i | +0.3018 + 0.3018i |
| w5  | 0101 | +0.4936 + 0.2530i | +0.6578 − 0.2571i | +0.9547 − 0.9547i | −0.3018 + 0.3018i |
| w6  | 0110 | +1.2040 − 0.4925i | +0.4326 − 1.1445i | −0.9547 − 0.2976i | +0.3018 + 0.9534i |
| w7  | 0111 | +0.4936 − 0.2530i | +1.2088 − 0.5659i | −0.9547 − 0.9547i | −0.3018 + 0.9534i |
| w8  | 1000 | −0.4925 + 1.2040i | −0.2173 + 0.4189i | +0.2976 + 0.2976i | +0.9534 − 0.3018i |
| w9  | 1001 | −0.2530 + 0.4936i | −0.6578 + 0.2571i | +0.2976 + 0.9547i | −0.9534 − 0.3018i |
| w10 | 1010 | −0.4925 − 1.2040i | −0.4326 + 1.1445i | −0.2976 + 0.2976i | +0.9534 − 0.9534i |
| w11 | 1011 | −0.2530 − 0.4936i | −1.2088 + 0.5659i | −0.2976 + 0.9547i | −0.9534 − 0.9534i |
| w12 | 1100 | −1.2040 + 0.4925i | −0.2173 − 0.4189i | +0.9547 + 0.2976i | +0.9534 + 0.3018i |
| w13 | 1101 | −0.4936 + 0.2530i | −0.6578 − 0.2571i | +0.9547 + 0.9547i | −0.9534 + 0.3018i |
| w14 | 1110 | −1.2040 − 0.4925i | −0.4326 − 1.1445i | −0.9547 + 0.2976i | +0.9534 + 0.9534i |
| w15 | 1111 | −0.4936 − 0.2530i | −1.2088 − 0.5659i | −0.9547 + 0.9547i | −0.9534 + 0.9534i |

A2) 64-QAM NUC

| w/MCS index | bit label | R = 5/8 (MCS = 22) (or R = 3/4 or 13/16) | R = 3/4 (MCS = 23) (or R = 5/8 or 13/16) | R = 13/16 (MCS = 24) (or R = 5/8 or 3/4) |
|---|---|---|---|---|
| w0  | 000000 | +1.4730 + 0.3019i | +1.0501 − 0.1676i | +1.0414 − 0.1712i |
| w1  | 000001 | +1.2124 + 0.8333i | +1.4380 − 0.2294i | −1.0414 − 0.1712i |
| w2  | 000010 | −1.4730 + 0.3019i | +0.7233 − 0.1496i | +1.0414 + 0.1712i |
| w3  | 000011 | −1.2124 + 0.8333i | +0.6220 − 1.1896i | −1.0414 + 0.1712i |
| w4  | 000100 | +1.4730 − 0.3019i | −1.0501 − 0.1676i | +1.4058 − 0.2115i |
| w5  | 000101 | +1.2124 − 0.8333i | −1.4380 − 0.2294i | −1.4058 − 0.2115i |
| w6  | 000110 | −1.4730 − 0.3019i | −0.7233 − 0.1496i | +1.4058 + 0.2115i |
| w7  | 000111 | −1.2124 − 0.8333i | −0.6220 − 1.1896i | −1.4058 + 0.2115i |
| w8  | 001000 | +1.0895 + 0.2172i | +0.1398 − 0.1309i | +0.1414 − 0.1379i |
| w9  | 001001 | +0.8988 + 0.5768i | +0.1680 − 1.0338i | −0.1414 − 0.1379i |
| w10 | 001010 | −1.0895 + 0.2172i | +0.4246 − 0.1370i | +0.1414 + 0.1379i |
| w11 | 001011 | −0.8988 + 0.5768i | +0.2326 − 1.3986i | −0.1414 + 0.1379i |
| w12 | 001100 | +1.0895 − 0.2172i | −0.1398 − 0.1309i | +0.1695 − 1.0298i |
| w13 | 001101 | +0.8988 − 0.5768i | −0.1680 − 1.0338i | −0.1695 − 1.0298i |
| w14 | 001110 | −1.0895 − 0.2172i | −0.4246 − 0.1370i | +0.1695 + 1.0298i |
| w15 | 001111 | −0.8988 − 0.5768i | −0.2326 − 1.3986i | −0.1695 + 1.0298i |
| w16 | 010000 | +0.2775 + 1.4188i | +1.0501 + 0.1676i | +0.7230 − 0.1517i |
| w17 | 010001 | +0.7921 + 1.2096i | +1.4380 + 0.2294i | −0.7230 − 0.1517i |
| w18 | 010010 | −0.2775 + 1.4188i | +0.7233 + 0.1496i | +0.7230 + 0.1517i |
| w19 | 010011 | −0.7921 + 1.2096i | +0.6220 + 1.1896i | −0.7230 + 0.1517i |
| w20 | 010100 | +0.2775 − 1.4188i | −1.0501 + 0.1676i | +0.5981 − 1.1597i |
| w21 | 010101 | +0.7921 − 1.2096i | −1.4380 + 0.2294i | −0.5981 − 1.1597i |
| w22 | 010110 | −0.2775 − 1.4188i | −0.7233 + 0.1496i | +0.5981 + 1.1597i |
| w23 | 010111 | −0.7921 − 1.2096i | −0.6220 + 1.1896i | −0.5981 + 1.1597i |
| w24 | 011000 | +0.2177 + 1.0243i | +0.1398 + 0.1309i | +0.4272 − 0.1421i |
| w25 | 011001 | +0.6056 + 0.8481i | +0.1680 + 1.0338i | −0.4272 − 0.1421i |
| w26 | 011010 | −0.2177 + 1.0243i | +0.4246 + 0.1370i | +0.4272 + 0.1421i |
| w27 | 011011 | −0.6056 + 0.8481i | +0.2326 + 1.3986i | −0.4272 + 0.1421i |
| w28 | 011100 | +0.2177 − 1.0243i | −0.1398 + 0.1309i | +0.2236 − 1.3784i |
| w29 | 011101 | +0.6056 − 0.8481i | −0.1680 + 1.0338i | −0.2236 − 1.3784i |
| w30 | 011110 | −0.2177 − 1.0243i | −0.4246 + 0.1370i | +0.2236 + 1.3784i |
| w31 | 011111 | −0.6056 − 0.8481i | −0.2326 + 1.3986i | −0.2236 + 1.3784i |
| w32 | 100000 | +0.1419 + 0.1122i | +1.0725 − 0.5328i | +1.0997 − 0.5419i |
| w33 | 100001 | +0.3733 + 0.1498i | +1.0771 − 0.9315i | −1.0997 − 0.5419i |
| w34 | 100010 | −0.1419 + 0.1122i | +0.7267 − 0.4592i | +1.0997 + 0.5419i |
| w35 | 100011 | −0.3733 + 0.1498i | +0.6956 − 0.8095i | −1.0997 + 0.5419i |

-continued

| w/MCS index | bit label | R = ⅝ (MCS = 22) (or R = ¾ or ¹³/₁₆) | R = ¾ (MCS = 23) (or R = ⅝ or ¹³/₁₆) | R = ¹³/₁₆ (MCS = 24) (or R = ⅝ or ¾) |
|---|---|---|---|---|
| w36 | 100100 | +0.1419 − 0.1122i | −1.0725 − 0.5328i | +1.0691 − 0.9443i |
| w37 | 100101 | +0.3733 − 0.1498i | −1.0771 − 0.9315i | −1.0691 − 0.9443i |
| w38 | 100110 | −0.1419 − 0.1122i | −0.7267 − 0.4592i | +1.0691 + 0.9443i |
| w39 | 100111 | −0.3733 − 0.1498i | −0.6956 − 0.8095i | −1.0691 + 0.9443i |
| w40 | 101000 | +0.7863 + 0.1337i | +0.1361 − 0.4023i | +0.1440 − 0.4167i |
| w41 | 101001 | +0.6394 + 0.3211i | +0.1373 − 0.7043i | −0.1440 − 0.4167i |
| w42 | 101010 | −0.7863 + 0.1337i | +0.4198 − 0.4151i | +0.1440 + 0.4167i |
| w43 | 101011 | −0.6394 + 0.3211i | +0.4114 − 0.7109i | −0.1440 + 0.4167i |
| w44 | 101100 | +0.7863 − 0.1337i | −0.1361 − 0.4023i | +0.1426 − 0.7102i |
| w45 | 101101 | +0.6394 − 0.3211i | −0.1373 − 0.7043i | −0.1426 − 0.7102i |
| w46 | 101110 | −0.7863 − 0.1337i | −0.4198 − 0.4151i | +0.1426 + 0.7102i |
| w47 | 101111 | −0.6304 − 0.3211i | −0.4114 − 0.7109i | −0.1426 + 0.7102i |
| w48 | 110000 | +0.1138 + 0.3999i | +1.0725 + 0.5328i | +0.7484 − 0.4663i |
| w49 | 110001 | +0.2891 + 0.3910i | +1.0771 + 0.9315i | −0.7484 − 0.4663i |
| w50 | 110010 | −0.1138 + 0.3999i | +0.7267 + 0.4592i | +0.7484 + 0.4663i |
| w51 | 110011 | −0.2891 + 0.3910i | +0.6956 + 0.8095i | −0.7484 + 0.4663i |
| w52 | 110100 | +0.1138 − 0.3999i | −1.0725 + 0.5328i | +0.7360 − 0.8042i |
| w53 | 110101 | +0.2891 − 0.3910i | −1.0771 + 0.9315i | −0.7360 − 0.8042i |
| w54 | 110110 | −0.1138 − 0.3999i | −0.7267 + 0.4592i | +0.7360 + 0.8042i |
| w55 | 110111 | −0.2891 − 0.3910i | −0.6956 + 0.8095i | −0.7360 + 0.8042i |
| w56 | 111000 | +0.1487 + 0.7260i | +0.1361 + 0.4023i | +0.4369 − 0.4317i |
| w57 | 111001 | +0.4397 + 0.5853i | +0.1373 + 0.7043i | −0.4369 − 0.4317i |
| w58 | 111010 | −0.1487 + 0.7260i | +0.4198 + 0.4151i | +0.4369 + 0.4317i |
| w59 | 111011 | −0.4397 + 0.5853i | +0.4114 + 0.7109i | −0.4369 + 0.4317i |
| w60 | 111100 | +0.1487 − 0.7260i | −0.1361 + 0.4023i | +0.4351 − 0.7394i |
| w61 | 111101 | +0.4397 − 0.5853i | −0.1373 + 0.7043i | −0.4351 − 0.7394i |
| w62 | 111110 | −0.1487 − 0.7260i | −0.4198 + 0.4151i | +0.4351 + 0.7394i |
| w63 | 111111 | −0.4397 − 0.5853i | −0.4114 + 0.7109i | −0.4351 + 0.7394i |

A3) 128-QAM NUC for R=1/2 (or R=5/8, 3/4 or 13/16):

| w index | bit label | Constellation point |
|---|---|---|
| w0 | 0000000 | +0.7383 − 1.3947i |
| w1 | 0000000 | +0.2726 − 1.6070i |
| w2 | 0000001 | +0.7383 + 1.3947i |
| w3 | 0000001 | +0.2726 + 1.6070i |
| w4 | 0000010 | +1.5779 − 0.2230i |
| w5 | 0000010 | +1.2114 − 0.1662i |
| w6 | 0000011 | +1.5779 + 0.2230i |
| w7 | 0000011 | +1.2114 + 0.1662i |
| w8 | 0000100 | +0.5286 − 1.0997i |
| w9 | 0000100 | +0.1915 − 1.2689i |
| w10 | 0000101 | +0.5286 + 1.0997i |
| w11 | 0000101 | +0.1915 + 1.2689i |
| w12 | 0000110 | +0.7620 − 0.1121i |
| w13 | 0000110 | +0.9103 − 0.1272i |
| w14 | 0000111 | +0.7620 + 0.1121i |
| w15 | 0000111 | +0.9103 + 0.1272i |
| w16 | 0001000 | +1.0680 − 1.0753i |
| w17 | 0001000 | +1.0389 − 0.7336i |
| w18 | 0001001 | +1.0680 + 1.0753i |
| w19 | 0001001 | +1.0389 + 0.7336i |
| w20 | 0001010 | +1.4915 − 0.6927i |
| w21 | 0001010 | +1.1447 − 0.4719i |
| w22 | 0001011 | +1.4915 + 0.6927i |
| w23 | 0001011 | +1.1447 + 0.4719i |
| w24 | 0001100 | +0.6878 − 0.8578i |
| w25 | 0001100 | +0.7725 − 0.6723i |
| w26 | 0001101 | +0.6878 + 0.8578i |
| w27 | 0001101 | +0.7725 + 0.6723i |
| w28 | 0001110 | +0.7359 − 0.3230i |
| w29 | 0001110 | +0.8236 − 0.3936i |
| w30 | 0001111 | +0.7359 + 0.3230i |
| w31 | 0001111 | +0.8236 + 0.3936i |
| w32 | 0010000 | −0.7383 − 1.3947i |
| w33 | 0011100 | −0.2726 − 1.6070i |
| w34 | 0011001 | −0.7383 + 1.3947i |
| w35 | 0010001 | −0.2726 + 1.6070i |
| w36 | 0010010 | −1.5779 − 0.2230i |
| w37 | 0010010 | −1.2114 − 0.1662i |
| w38 | 0011011 | −1.5779 + 0.2230i |
| w39 | 0010011 | −1.2114 + 0.1662i |
| w40 | 0010100 | −0.5286 − 1.0997i |
| w41 | 0010100 | −0.1915 − 1.2689i |
| w42 | 0010101 | −0.5286 + 1.0997i |
| w43 | 0010101 | −0.1915 + 1.2689i |
| w44 | 0010110 | −0.7620 − 0.1121i |
| w45 | 0010110 | −0.9103 − 0.1272i |
| w46 | 0010111 | −0.7620 + 0.1121i |
| w47 | 0010111 | −0.9103 + 0.1272i |
| w48 | 0011100 | −1.0680 − 1.0753i |
| w49 | 0011000 | −1.0389 − 0.7336i |
| w50 | 0011001 | −1.0680 + 1.0753i |
| w51 | 0011001 | −1.0389 + 0.7336i |
| w52 | 0011010 | −1.4915 − 0.6927i |
| w53 | 0011010 | −1.1447 − 0.4719i |
| w54 | 0011011 | −1.4915 + 0.6927i |
| w55 | 0011011 | −1.1447 + 0.4719i |
| w56 | 1011100 | −0.6878 − 0.8578i |
| w57 | 0011100 | −0.7725 − 0.6723i |
| w58 | 0011101 | −0.6878 + 0.8578i |
| w59 | 0011101 | −0.7725 + 0.6723i |
| w60 | 1011110 | −0.7359 − 0.3230i |
| w61 | 1011110 | −0.8236 − 0.3936i |
| w62 | 0011111 | −0.7359 + 0.3230i |
| w63 | 0011111 | −0.8236 + 0.3936i |
| w64 | 01000000 | +0.1315 − 0.7332i |
| w65 | 01000001 | +0.1038 − 0.7607i |
| w66 | 01000010 | +0.1315 + 0.7332i |
| w67 | 01000011 | +0.1038 + 0.7607i |
| w68 | 01000100 | +0.1461 − 0.1146i |
| w69 | 01000101 | +0.1573 − 0.1142i |
| w70 | 01000110 | +0.1461 + 0.1146i |
| w71 | 01000111 | +0.1573 + 0.1142i |
| w72 | 01001000 | +0.3255 − 0.9067i |
| w73 | 01001001 | +0.1588 − 1.0122i |
| w74 | 01001010 | +0.3255 + 0.9067i |
| w75 | 01001011 | +0.1588 + 1.0122i |
| w76 | 01001100 | +0.4774 − 0.1074i |
| w77 | 01001101 | +0.4323 − 0.1096i |
| w78 | 01001110 | +0.4774 + 0.1074i |
| w79 | 01001111 | +0.4323 + 0.1096i |

-continued

| w index | bit label | Constellation point |
|---|---|---|
| w80 | 01010000 | +0.1647 − 0.5388i |
| w81 | 01010001 | +0.1629 − 0.5296i |
| w82 | 01010010 | +0.1647 + 0.5388i |
| w83 | 01010011 | +0.1629 + 0.5296i |
| w84 | 01010100 | +0.1535 − 0.3082i |
| w85 | 01010101 | +0.1629 − 0.3084i |
| w86 | 01010110 | +0.1535 + 0.3082i |
| w87 | 01010111 | +0.1629 + 0.3084i |
| w88 | 01011000 | +0.4535 − 0.6452i |
| w89 | 01011001 | +0.4645 − 0.5898i |
| w90 | 01011010 | +0.4535 + 0.6452i |
| w91 | 01011011 | +0.4645 + 0.5898i |
| w92 | 01011100 | +0.4853 − 0.3237i |
| w93 | 01011101 | +0.4637 − 0.3425i |
| w94 | 01011110 | +0.4853 + 0.3237i |
| w95 | 01011111 | +0.4637 + 0.3425i |
| w96 | 01100000 | −0.1315 − 0.7332i |
| w97 | 01100001 | −0.1038 − 0.7607i |
| w98 | 01100010 | −0.1315 + 0.7332i |
| w99 | 01100011 | −0.1038 + 0.7607i |
| w100 | 01100100 | −0.1461 − 0.1146i |
| w101 | 01100101 | −0.1573 − 0.1142i |
| w102 | 01100110 | −0.1461 + 0.1146i |
| w103 | 01100111 | −0.1573 + 0.1142i |
| w104 | 01101000 | −0.3255 − 0.9067i |
| w105 | 01101001 | −0.1588 − 1.0122i |
| w106 | 01101010 | −0.3255 + 0.9067i |
| w107 | 01101011 | −0.1588 + 1.0122i |
| w108 | 01101100 | −0.4774 − 0.1074i |
| w109 | 01101101 | −0.4323 − 0.1096i |
| w110 | 01101110 | −0.4774 + 0.1074i |
| w111 | 01101111 | −0.4323 + 0.1096i |
| w112 | 01110000 | −0.1647 − 0.5388i |
| w113 | 01110001 | −0.1629 − 0.5296i |
| w114 | 01110010 | −0.1647 + 0.5388i |
| w115 | 01110011 | −0.1629 + 0.5296i |
| w116 | 01110100 | −0.1535 − 0.3082i |
| w117 | 01110101 | −0.1629 − 0.3084i |
| w118 | 01110110 | −0.1535 + 0.3082i |
| w119 | 01110111 | −0.1629 + 0.3084i |
| w120 | 01111000 | −0.4535 − 0.6452i |
| w121 | 01111001 | −0.4645 − 0.5898i |
| w122 | 01111010 | −0.4535 + 0.6452i |
| w123 | 01111011 | −0.4645 + 0.5898i |
| w124 | 01111100 | −0.4853 − 0.3237i |
| w125 | 01111101 | −0.4637 − 0.3425i |
| w126 | 01111110 | −0.4853 + 0.3237i |
| w127 | 01111111 | −0.4637 + 0.3425i | for R=5/8 (or R=1/2, 3/4 or 13/16):

| w index | bit label | Constellation point |
|---|---|---|
| w0 | 0000000 | +1.1470 + 0.4332i |
| w1 | 0000000 | +0.5553 + 0.4183i |
| w2 | 0000001 | +1.1804 + 0.7965i |
| w3 | 0000001 | +0.5406 + 0.6294i |
| w4 | 0000010 | +1.1470 − 0.4332i |
| w5 | 0000010 | +0.5553 − 0.4183i |
| w6 | 0000011 | +1.1804 − 0.7965i |
| w7 | 0000011 | +0.5406 − 0.6294i |
| w8 | 0000100 | −1.1470 + 0.4332i |
| w9 | 0000100 | −0.5553 + 0.4183i |
| w10 | 0000101 | −1.1804 + 0.7965i |
| w11 | 0000101 | −0.5406 + 0.6294i |
| w12 | 0000110 | −1.1470 − 0.4332i |
| w13 | 0000110 | −0.5553 − 0.4183i |
| w14 | 0000111 | −1.1804 − 0.7965i |
| w15 | 0000111 | −0.5406 − 0.6294i |
| w16 | 0001000 | +0.1029 + 0.4847i |
| w17 | 0001000 | +0.3416 + 0.4299i |
| w18 | 0001001 | +0.1167 + 0.6847i |
| w19 | 0001001 | +0.3403 + 0.6639i |
| w20 | 0001010 | +0.1029 − 0.4847i |
| w21 | 0001010 | +0.3416 − 0.4299i |
| w22 | 0001011 | +0.1167 − 0.6847i |
| w23 | 0001011 | +0.3403 − 0.6639i |
| w24 | 0001100 | −0.1029 + 0.4847i |
| w25 | 0001100 | −0.3416 + 0.4294i |
| w26 | 0001101 | −0.1167 + 0.6847i |
| w27 | 0001101 | −0.3403 + 0.6639i |
| w28 | 0001110 | −0.1029 − 0.4847i |
| w29 | 0001110 | −0.3416 − 0.4299i |
| w30 | 0001111 | −0.1167 − 0.6847i |
| w31 | 0001111 | −0.3403 − 0.6639i |
| w32 | 0010000 | +1.1636 + 0.1437i |
| w33 | 0010000 | +0.5673 + 0.1212i |
| w34 | 0010001 | +1.4805 + 0.1788i |
| w35 | 0010001 | +0.9781 + 1.1963i |
| w36 | 0010010 | +1.1636 − 0.1437i |
| w37 | 0010010 | +0.5673 − 0.1212i |
| w38 | 0010011 | +1.4805 − 0.1788i |
| w39 | 0010011 | +0.9781 − 1.1963i |
| w40 | 0010100 | −1.1636 + 0.1437i |
| w41 | 0010100 | −0.5673 + 0.1212i |
| w42 | 0010101 | −1.4805 + 0.1788i |
| w43 | 0010101 | −0.9781 + 1.1963i |
| w44 | 0010110 | −1.1636 − 0.1437i |
| w45 | 0010110 | −0.5673 − 0.1212i |
| w46 | 0010111 | −1.4805 − 0.1788i |
| w47 | 0010111 | −0.9781 − 1.1963i |
| w48 | 0011000 | +0.1058 + 0.0889i |
| w49 | 0011000 | +0.3723 + 0.1109i |
| w50 | 0011001 | +0.1939 + 1.4903i |
| w51 | 0011001 | +0.5867 + 1.4162i |
| w52 | 0011010 | +0.1058 − 0.0889i |
| w53 | 0011010 | +0.3723 − 0.1109i |
| w54 | 0011011 | +0.1939 − 1.4908i |
| w55 | 0011011 | +0.5867 − 1.4162i |
| w56 | 0011100 | −0.1058 + 0.0889i |
| w57 | 0011100 | −0.3723 + 0.1109i |
| w58 | 0011101 | −0.1939 + 1.4903i |
| w59 | 1011101 | −0.5867 + 1.4162i |
| w60 | 0011110 | −0.1058 − 0.0889i |
| w61 | 1011110 | −0.3723 − 0.1109i |
| w62 | 0011111 | −0.1939 − 1.4903i |
| w63 | 1011111 | −0.5867 − 1.4162i |
| w64 | 01000000 | +0.9015 + 0.4159i |
| w65 | 01000001 | +0.6908 + 0.3786i |
| w66 | 01000010 | +0.8996 + 0.6935i |
| w67 | 01000011 | +0.6580 + 0.7616i |
| w68 | 01000100 | +0.9015 − 0.4159i |
| w69 | 01000101 | +0.6908 − 0.3786i |
| w70 | 01000110 | +0.8996 − 0.6935i |
| w71 | 01000111 | +0.6580 − 0.7616i |
| w72 | 01001000 | −0.9015 + 0.4159i |
| w73 | 01001001 | −0.6908 + 0.3786i |
| w74 | 01001010 | −0.8996 + 0.6935i |
| w75 | 01001011 | −0.6580 + 0.7616i |
| w76 | 01001100 | −0.9015 − 0.4159i |
| w77 | 01001101 | −0.6908 − 0.3786i |
| w78 | 01001110 | −0.8996 − 0.6935i |
| w79 | 01001111 | −0.6580 − 0.7616i |
| w80 | 01010000 | +0.1029 + 0.3518i |
| w81 | 01010001 | +0.2989 + 0.3450i |
| w82 | 01010010 | +0.1222 + 0.9046i |
| w83 | 01010011 | +0.3701 + 0.8771i |
| w84 | 01010100 | +0.1029 − 0.3518i |
| w85 | 01010101 | +0.2989 − 0.3450i |
| w86 | 01010110 | +0.1222 − 0.9046i |
| w87 | 01010111 | +0.3701 − 0.8771i |
| w88 | 01011000 | −0.1029 + 0.3518i |
| w89 | 01011001 | −0.2989 + 0.3450i |
| w90 | 01011010 | −0.1222 + 0.9046i |
| w91 | 01011011 | −0.3701 + 0.8771i |
| w92 | 01011100 | −0.1029 − 0.3518i |
| w93 | 01011101 | −0.2989 − 0.3450i |
| w94 | 01011110 | −0.1222 − 0.9046i |
| w95 | 01011111 | −0.3701 − 0.8771i |
| w96 | 01100000 | +0.9136 + 0.1312i |
| w97 | 01100001 | +0.6911 + 0.1387i |
| w98 | 01100010 | +1.5526 + 0.5600i |

| w index | bit label | Constellation point |
|---|---|---|
| w99 | 01100011 | +0.7165 + 1.0174i |
| w100 | 01100100 | +0.9136 − 0.1312i |
| w101 | 01100101 | +0.6911 − 0.1387i |
| w102 | 01100110 | +1.5526 − 0.5600i |
| w103 | 01100111 | +0.7165 − 1.0174i |
| w104 | 01101000 | −0.9136 + 0.1312i |
| w105 | 01101001 | −0.6911 + 0.1387i |
| w106 | 01101010 | −1.5526 + 0.5600i |
| w107 | 01101011 | −0.7165 + 1.0174i |
| w108 | 01101100 | −0.9136 − 0.1312i |
| w109 | 01101101 | −0.6911 − 0.1387i |
| w110 | 01101110 | −1.5526 − 0.5600i |
| w111 | 01101111 | −0.7165 − 1.0174i |
| w112 | 01110000 | +0.1130 + 0.1512i |
| w113 | 01110001 | +0.3195 + 0.1563i |
| w114 | 01110010 | +0.1450 + 1.1700i |
| w115 | 01110011 | +0.4379 + 1.1192i |
| w116 | 01110100 | +0.1130 − 0.1512i |
| w117 | 01110101 | +0.3195 − 0.1563i |
| w118 | 01110110 | +0.1450 − 1.1700i |
| w119 | 01110111 | +0.4379 − 1.1192i |
| w120 | 01111000 | −0.1130 + 0.1512i |
| w121 | 01111101 | −0.3195 + 0.1563i |
| w122 | 01111010 | −0.1450 + 1.1700i |
| w123 | 01111011 | −0.4379 + 1.1192i |
| w124 | 01111100 | −0.1130 − 0.1512i |
| w125 | 01111101 | −0.3195 − 0.1563i |
| w126 | 01111110 | −0.1450 − 1.1700i |
| w127 | 01111111 | −0.4379 − 1.1192i | for R=3/4 (or R=1/2, 5/8 or 13/16):

| w index | bit label | Constellation point |
|---|---|---|
| w0 | 0000000 | +1.0484 + 0.3435i |
| w1 | 0000000 | +1.1392 + 0.5908i |
| w2 | 0000001 | −1.0484 + 0.3435i |
| w3 | 0000001 | −1.1392 + 0.5908i |
| w4 | 0000010 | +1.0205 + 0.1130i |
| w5 | 0000010 | +1.3137 + 0.1401i |
| w6 | 0000011 | −1.0205 + 0.1130i |
| w7 | 0000011 | −1.3137 + 0.1401i |
| w8 | 0000100 | +0.8050 + 0.3736i |
| w9 | 0000100 | +0.8767 + 0.6075i |
| w10 | 0000101 | −0.8050 + 0.3736i |
| w11 | 0000101 | −0.8767 + 0.6075i |
| w12 | 0000110 | +0.7794 + 0.1239i |
| w13 | 0000110 | +1.4466 + 0.4199i |
| w14 | 0000111 | −0.7794 + 0.1239i |
| w15 | 0000111 | −1.4466 + 0.4199i |
| w16 | 0001000 | +0.5512 + 0.5784i |
| w17 | 0001000 | +0.5926 + 0.7787i |
| w18 | 0001001 | −0.5512 + 0.5784i |
| w19 | 0001001 | −0.5926 + 0.7787i |
| w20 | 0001010 | +0.4970 + 0.0732i |
| w21 | 0001010 | +1.1801 + 0.9322i |
| w22 | 0001011 | −0.4970 + 0.0732i |
| w23 | 0001011 | −1.1801 + 0.9322i |
| w24 | 0001100 | +0.5773 + 0.3945i |
| w25 | 0001100 | +0.8273 + 0.8515i |
| w26 | 0001101 | −0.5773 + 0.3945i |
| w27 | 0001101 | −0.8273 + 0.8515i |
| w28 | 0001110 | +0.5611 + 0.2103i |
| w29 | 0001110 | +0.9097 + 1.1442i |
| w30 | 0001111 | −0.5611 + 0.2103i |
| w31 | 0001111 | −0.9097 + 1.1442i |
| w32 | 0010000 | +0.1137 + 0.6007i |
| w33 | 0010000 | +0.1177 + 0.7939i |
| w34 | 0010001 | −0.1137 + 0.6007i |
| w35 | 0010001 | −0.1177 + 0.7939i |
| w36 | 0010010 | +0.0988 + 0.0864i |
| w37 | 0010010 | +0.1761 + 1.5225i |
| w38 | 0010011 | −0.0988 + 0.0864i |
| w39 | 0010011 | −0.1761 + 1.5225i |
| w40 | 0010100 | +0.1075 + 0.4242i |

| w index | bit label | Constellation point |
|---|---|---|
| w41 | 0010100 | +0.1232 + 1.0065i |
| w42 | 0010101 | −0.1075 + 0.4242i |
| w43 | 0010101 | −0.1232 + 1.0065i |
| w44 | 0010110 | +0.1016 + 0.2562i |
| w45 | 0010110 | +0.1403 + 1.2447i |
| w46 | 0010111 | −0.1016 + 0.2562i |
| w47 | 0010111 | −0.1403 + 1.2447i |
| w48 | 0011000 | +0.3358 + 0.5918i |
| w49 | 0011000 | +0.3537 + 0.7995i |
| w50 | 0011001 | −0.3358 + 0.5918i |
| w51 | 0011001 | −0.3537 + 0.7995i |
| w52 | 0011010 | +0.2966 + 0.0872i |
| w53 | 0011010 | +0.4861 + 1.3847i |
| w54 | 0011011 | −0.2966 + 0.0872i |
| w55 | 0011011 | −0.4861 + 1.3847i |
| w56 | 0011100 | +0.3322 + 0.4087i |
| w57 | 0011100 | +0.3791 + 1.0277i |
| w58 | 0011101 | −0.3322 + 0.4087i |
| w59 | 0011101 | −0.3791 + 1.0277i |
| w60 | 0011110 | +0.3142 + 0.2509i |
| w61 | 0011110 | +0.6160 + 1.1277i |
| w62 | 0011111 | −0.3142 + 0.2509i |
| w63 | 0011111 | −0.6160 + 1.1277i |
| w64 | 01000000 | +1.0484 − 0.3435i |
| w65 | 01000001 | +1.1392 − 0.5908i |
| w66 | 01000010 | −1.0484 − 0.3435i |
| w67 | 01000011 | −1.1392 − 0.5908i |
| w68 | 01000100 | +1.0205 − 0.1130i |
| w69 | 01000101 | +1.3137 − 0.1401i |
| w70 | 01000110 | −1.0205 − 0.1130i |
| w71 | 01000111 | −1.3137 − 0.1401i |
| w72 | 01001000 | +0.8050 − 0.3736i |
| w73 | 01001001 | +0.8767 − 0.6075i |
| w74 | 01001010 | −0.8050 − 0.3736i |
| w75 | 01001011 | −0.8767 − 0.6075i |
| w76 | 01001100 | +0.7794 − 0.1239i |
| w77 | 01001101 | +1.4466 − 0.4199i |
| w78 | 01001110 | −0.7794 − 0.1239i |
| w79 | 01001111 | −1.4466 − 0.4199i |
| w80 | 01010000 | +0.5512 − 0.5784i |
| w81 | 01010001 | +0.5926 − 0.7787i |
| w82 | 01010010 | −0.5512 − 0.5784i |
| w83 | 01010011 | −0.5926 − 0.7787i |
| w84 | 01010100 | +0.4970 − 0.0732i |
| w85 | 01010101 | +1.1801 − 0.9322i |
| w86 | 01010110 | −0.4970 − 0.0732i |
| w87 | 01010111 | −1.1801 − 0.9322i |
| w88 | 01011000 | +0.5773 − 0.3945i |
| w89 | 01011001 | +0.8273 − 0.8515i |
| w90 | 01011010 | −0.5773 − 0.3945i |
| w91 | 01011011 | −0.8273 − 0.8515i |
| w92 | 01011100 | +0.5611 − 0.2103i |
| w93 | 01011101 | +0.9097 − 1.1442i |
| w94 | 01011110 | −0.5611 − 0.2103i |
| w95 | 01011111 | −0.9097 − 1.1442i |
| w96 | 01100000 | +0.1137 − 0.6007i |
| w97 | 01100001 | +0.1177 − 0.7939i |
| w98 | 01100010 | −0.1137 − 0.6007i |
| w99 | 01100011 | −0.1177 − 0.7939i |
| w100 | 01100100 | +0.0988 − 0.0864i |
| w101 | 01100101 | +0.1761 − 1.5225i |
| w102 | 01100110 | −0.0988 − 0.0864i |
| w103 | 01100111 | −0.1761 − 1.5225i |
| w104 | 01101000 | +0.1075 − 0.4242i |
| w105 | 01101001 | +0.1232 − 1.0065i |
| w106 | 01101010 | −0.1075 − 0.4242i |
| w107 | 01101011 | −0.1232 − 1.0065i |
| w108 | 01101100 | +0.1016 − 0.2562i |
| w109 | 01101101 | +0.1403 − 1.2447i |
| w110 | 01101110 | −0.1016 − 0.2562i |
| w111 | 01101111 | −0.1403 − 1.2447i |
| w112 | 01110000 | +0.3358 − 0.5918i |
| w113 | 01110001 | +0.3537 − 0.7995i |
| w114 | 01110010 | −0.3358 − 0.5918i |
| w115 | 01110011 | −0.3537 − 0.7995i |
| w116 | 01110100 | +0.2966 − 0.0872i |
| w117 | 01110101 | +0.4861 − 1.3847i |

| w index | bit label | Constellation point |
| --- | --- | --- |
| w118 | 01110110 | −0.2966 − 0.0872i |
| w119 | 01110111 | −0.4861 − 1.3847i |
| w120 | 01111000 | +0.3322 − 0.4087i |
| w121 | 01111001 | +0.3791 − 1.0277i |
| w122 | 01111010 | −0.3322 − 0.4087i |
| w123 | 01111011 | −0.3791 − 1.0277i |
| w124 | 01111100 | +0.3142 − 0.2509i |
| w125 | 01111101 | +0.6160 − 1.1277i |
| w126 | 01111110 | −0.3142 − 0.2509i |
| w127 | 01111111 | −0.6160 − 1.1277i | for R=13/16 (or R=1/2, 5/8 or 3/4):

| w index | bit label | Constellation point |
| --- | --- | --- |
| w0 | 0000000 | +1.0422 + 0.3376i |
| w1 | 0000000 | +1.0422 − 0.3376i |
| w2 | 0000001 | −1.0422 + 0.3376i |
| w3 | 0000001 | −1.0422 − 0.3376i |
| w4 | 0000010 | +0.7966 + 0.3496i |
| w5 | 0000010 | +0.7966 − 0.3496i |
| w6 | 0000011 | −0.7966 + 0.3496i |
| w7 | 0000011 | −0.7966 − 0.3496i |
| w8 | 0000100 | +1.1154 + 0.5839i |
| w9 | 0000100 | +1.1154 − 0.5839i |
| w10 | 0000101 | −1.1154 + 0.5839i |
| w11 | 0000101 | −1.1154 − 0.5839i |
| w12 | 0000110 | +0.8563 + 0.5705i |
| w13 | 0000110 | +0.8563 − 0.5705i |
| w14 | 0000111 | −0.8563 + 0.5705i |
| w15 | 0000111 | −0.8563 − 0.5705i |
| w16 | 0001000 | +1.0010 + 0.1105i |
| w17 | 0001000 | +1.0010 − 0.1105i |
| w18 | 0001001 | −1.0010 + 0.1105i |
| w19 | 0001001 | −1.0010 − 0.1105i |
| w20 | 0001010 | +0.7613 + 0.1187i |
| w21 | 0001010 | +0.7613 − 0.1187i |
| w22 | 0001011 | −0.7613 + 0.1187i |
| w23 | 0001011 | −0.7613 − 0.1187i |
| w24 | 0001100 | +1.2844 + 0.1345i |
| w25 | 0001100 | +1.2844 − 0.1345i |
| w26 | 0001101 | −1.2844 + 0.1345i |
| w27 | 0001101 | −1.2844 − 0.1345i |
| w28 | 0001110 | +1.4001 + 0.4092i |
| w29 | 0001110 | +1.4001 − 0.4092i |
| w30 | 0001111 | −1.4001 + 0.4092i |
| w31 | 0001111 | −1.4001 − 0.4092i |
| w32 | 0010000 | +0.1125 + 0.6269i |
| w33 | 0010000 | +0.1125 − 0.6269i |
| w34 | 0010001 | −0.1125 + 0.6269i |
| w35 | 0010001 | −0.1125 − 0.6269i |
| w36 | 0010010 | +0.1109 + 0.4454i |
| w37 | 0010010 | +0.1109 − 0.4454i |
| w38 | 0010011 | −0.1109 + 0.4454i |
| w39 | 0010011 | −0.1109 − 0.4454i |
| w40 | 0010100 | +0.1155 + 0.8217i |
| w41 | 0010100 | +0.1155 − 0.8217i |
| w42 | 0010101 | −0.1155 + 0.8217i |
| w43 | 0010101 | −0.1155 − 0.8217i |
| w44 | 0010110 | +0.1239 + 1.0311i |
| w45 | 0010110 | +0.1239 − 1.0311i |
| w46 | 0010111 | −0.1239 + 1.0311i |
| w47 | 0010111 | −0.1239 − 1.0311i |
| w48 | 0011000 | +0.0978 + 0.0913i |
| w49 | 0011000 | +0.0978 − 0.0913i |
| w50 | 0011001 | −0.0978 + 0.0913i |
| w51 | 0011001 | −0.0978 − 0.0913i |
| w52 | 0011010 | +0.1038 + 0.2705i |
| w53 | 0011010 | +0.1038 − 0.2705i |
| w54 | 0011011 | −0.1038 + 0.2705i |
| w55 | 0011011 | −0.1038 − 0.2705i |
| w56 | 0011100 | +0.1646 + 1.5274i |
| w57 | 0011100 | +0.1646 − 1.5274i |
| w58 | 0011101 | −0.1646 + 1.5274i |
| w59 | 0011101 | −0.1646 − 1.5274i |
| w60 | 0011110 | +0.1345 + 1.2611i |
| w61 | 0011110 | +0.1345 − 1.2611i |
| w62 | 0011111 | −0.1345 + 1.2611i |
| w63 | 0011111 | −0.1345 − 1.2611i |
| w64 | 01000000 | +0.5556 + 0.6306i |
| w65 | 01000001 | +0.5556 − 0.6306i |
| w66 | 01000010 | −0.5556 + 0.6306i |
| w67 | 01000011 | −0.5556 − 0.6306i |
| w68 | 01000100 | +0.5761 + 0.4286i |
| w69 | 01000101 | +0.5761 − 0.4286i |
| w70 | 01000110 | −0.5761 + 0.4286i |
| w71 | 01000111 | −0.5761 − 0.4286i |
| w72 | 01001000 | +0.5970 + 0.8482i |
| w73 | 01001001 | +0.5970 − 0.8482i |
| w74 | 01001010 | −0.5970 + 0.8482i |
| w75 | 01001011 | −0.5970 − 0.8482i |
| w76 | 01001100 | +0.8378 + 0.8041i |
| w77 | 01001101 | +0.8378 − 0.8041i |
| w78 | 01001110 | −0.8378 + 0.8041i |
| w79 | 01001111 | −0.8378 − 0.8041i |
| w80 | 01010000 | +0.4942 + 0.0780i |
| w81 | 01010001 | +0.4942 − 0.0780i |
| w82 | 01010010 | −0.4942 + 0.0780i |
| w83 | 01010011 | −0.4942 − 0.0780i |
| w84 | 01010100 | +0.5456 + 0.2367i |
| w85 | 01010101 | +0.5456 − 0.2367i |
| w86 | 01010110 | −0.5456 + 0.2367i |
| w87 | 01010111 | −0.5456 − 0.2367i |
| w88 | 01011000 | +1.1670 + 0.8997i |
| w89 | 01011001 | +1.1670 − 0.8997i |
| w90 | 01011010 | −1.1670 + 0.8997i |
| w91 | 01011011 | −1.1670 − 0.8997i |
| w92 | 01011100 | +0.9031 + 1.0698i |
| w93 | 01011101 | +0.9031 − 1.0698i |
| w94 | 01011110 | −0.9031 + 1.0698i |
| w95 | 01011111 | −0.9031 − 1.0698i |
| w96 | 01100000 | +0.3351 + 0.6308i |
| w97 | 01100001 | +0.3351 − 0.6308i |
| w98 | 01100010 | −0.3351 + 0.6308i |
| w99 | 01100011 | −0.3351 − 0.6308i |
| w100 | 01100100 | +0.3383 + 0.4404i |
| w101 | 01100101 | +0.3383 − 0.4404i |
| w102 | 01100110 | −0.3383 + 0.4404i |
| w103 | 01100111 | −0.3383 − 0.4404i |
| w104 | 01101000 | +0.3510 + 0.8405i |
| w105 | 01101001 | +0.3510 − 0.8405i |
| w106 | 01101010 | −0.3510 + 0.8405i |
| w107 | 01101011 | −0.3510 − 0.8405i |
| w108 | 01101100 | +0.3850 + 1.0724i |
| w109 | 01101101 | +0.3850 − 1.0724i |
| w110 | 01101110 | −0.3850 + 1.0724i |
| w111 | 01101111 | −0.3850 − 1.0724i |
| w112 | 01110000 | +0.2935 + 0.0906i |
| w113 | 01110001 | +0.2935 − 0.0906i |
| w114 | 01110010 | −0.2935 + 0.0906i |
| w115 | 01110011 | −0.2935 − 0.0906i |
| w116 | 01110100 | +0.3172 + 0.2666i |
| w117 | 01110101 | +0.3172 − 0.2666i |
| w118 | 01110110 | −0.3172 + 0.2666i |
| w119 | 01110111 | −0.3172 − 0.2666i |
| w120 | 01111000 | +0.4543 + 1.3933i |
| w121 | 01111001 | +0.4543 − 1.3933i |
| w122 | 01111010 | −0.4543 + 1.3933i |
| w123 | 01111011 | −0.4543 − 1.3933i |
| w124 | 01111100 | +0.6436 + 1.1770i |
| w125 | 01111101 | +0.6436 − 1.1770i |
| w126 | 01111110 | −0.6436 + 1.1770i |
| w127 | 01111111 | −0.6436 − 1.1770i |

A4) 256-QAM NUC
for R=1/2 (or R=5/8, 3/4 or 13/16):

| w index | bit label | Constellation point |
|---|---|---|
| w0 | 0000000 | −1.2901 + 1.0495i |
| w1 | 0000000 | −0.7273 + 0.6160i |
| w2 | 0000001 | −1.0646 + 1.2876i |
| w3 | 0000001 | −0.5707 + 0.7662i |
| w4 | 0000010 | +1.2901 + 1.0495i |
| w5 | 0000010 | +0.7273 + 0.6160i |
| w6 | 0000011 | −1.0646 + 1.2876i |
| w7 | 0000011 | +0.5707 + 0.7662i |
| w8 | 0000100 | −1.4625 + 0.7740i |
| w9 | 0000100 | −0.8177 + 0.4841i |
| w10 | 0000101 | −0.7949 + 1.4772i |
| w11 | 0000101 | −0.4490 + 0.8461i |
| w12 | 0000110 | +1.4625 + 0.7740i |
| w13 | 0000110 | +0.8177 + 0.4841i |
| w14 | 0000111 | +0.7949 + 1.4772i |
| w15 | 0000111 | +0.4490 + 0.8461i |
| w16 | 0001000 | −0.2844 + 0.1296i |
| w17 | 0001000 | −0.5902 + 0.4857i |
| w18 | 0001001 | −0.1053 + 0.1494i |
| w19 | 0001001 | −0.4294 + 0.6363i |
| w20 | 0001010 | +0.2844 + 0.1296i |
| w21 | 0001010 | +0.5902 + 0.4857i |
| w22 | 0001011 | +0.1053 + 0.1494i |
| w23 | 0001011 | +0.4294 + 0.6363i |
| w24 | 0001100 | −0.2853 + 0.1309i |
| w25 | 0001100 | −0.6355 + 0.4185i |
| w26 | 0001101 | −0.1052 + 0.1495i |
| w27 | 0001101 | −0.3744 + 0.6744i |
| w28 | 0001110 | +0.2853 + 0.1309i |
| w29 | 0001110 | +0.6355 + 0.4185i |
| w30 | 0001111 | +0.1052 + 0.1495i |
| w31 | 0001111 | +0.3744 + 0.6744i |
| w32 | 0010000 | −1.6350 + 0.1593i |
| w33 | 0010000 | −0.9430 + 0.1100i |
| w34 | 0010001 | −0.1658 + 1.6747i |
| w35 | 0010001 | −0.1088 + 0.9530i |
| w36 | 0010010 | +1.6350 + 0.1593i |
| w37 | 0010010 | +0.9430 + 0.1100i |
| w38 | 0010011 | +0.1658 + 1.6747i |
| w39 | 0010011 | +0.1088 + 0.9530i |
| w40 | 0010100 | −1.5776 + 0.4735i |
| w41 | 0010100 | −0.9069 + 0.2829i |
| w42 | 0010101 | −0.4907 + 1.6084i |
| w43 | 0010101 | −0.2464 + 0.9270i |
| w44 | 0010110 | +1.5776 + 0.4735i |
| w45 | 0010110 | +0.9069 + 0.2829i |
| w46 | 0010111 | +0.4907 + 1.6084i |
| w47 | 0010111 | +0.2464 + 0.9270i |
| w48 | 0011000 | −0.3237 + 0.0849i |
| w49 | 0011000 | −0.7502 + 0.1138i |
| w50 | 0011001 | −0.0872 + 0.1390i |
| w51 | 0011001 | −0.1091 + 0.7656i |
| w52 | 0011010 | +0.3237 + 0.0849i |
| w53 | 0011010 | +0.7502 + 0.1138i |
| w54 | 0011011 | +0.0872 + 0.1390i |
| w55 | 0011011 | +0.1091 + 0.7656i |
| w56 | 0011100 | −0.3228 + 0.0867i |
| w57 | 0011100 | −0.7325 + 0.2088i |
| w58 | 0011101 | −0.0871 + 0.1392i |
| w59 | 0011101 | −0.1699 + 0.7537i |
| w60 | 0011110 | +0.3228 + 0.0867i |
| w61 | 0011110 | +0.7325 + 0.2088i |
| w62 | 0011111 | +0.0871 + 0.1392i |
| w63 | 0011111 | +0.1699 + 0.7537i |
| w64 | 01000000 | −1.2901 − 1.0495i |
| w65 | 01000001 | −0.7273 − 0.6160i |
| w66 | 01000010 | −1.0646 − 1.2876i |
| w67 | 01000011 | −0.5707 − 0.7662i |
| w68 | 01000100 | +1.2901 − 1.0495i |
| w69 | 01000101 | +0.7273 − 0.6160i |
| w70 | 01000110 | +1.0646 − 1.2876i |
| w71 | 01000111 | +0.5707 − 0.7662i |
| w72 | 01001000 | −1.4625 − 0.7740i |
| w73 | 01001001 | −0.8177 − 0.4841i |
| w74 | 01001010 | −0.7949 − 1.4772i |
| w75 | 01001011 | −0.4490 − 0.8461i |
| w76 | 01001100 | +1.4625 − 0.7740i |
| w77 | 01001101 | +0.8177 − 0.4841i |
| w78 | 01001110 | +0.7949 − 1.4772i |
| w79 | 01001111 | +0.4490 − 0.8461i |
| w80 | 01010000 | −0.2844 − 0.1296i |
| w81 | 01010001 | −0.5902 − 0.4857i |
| w82 | 01010010 | −0.1053 − 0.1494i |
| w83 | 01010011 | −0.4294 − 0.6363i |
| w84 | 01010100 | +0.2844 − 0.1296i |
| w85 | 01010101 | +0.5902 − 0.4857i |
| w86 | 01010110 | +0.1053 − 0.1494i |
| w87 | 01010111 | +0.4294 − 0.6363i |
| w88 | 01011000 | −0.2853 − 0.1309i |
| w89 | 01011001 | −0.6355 − 0.4185i |
| w90 | 01011010 | −0.1052 − 0.1495i |
| w91 | 01011011 | −0.3744 − 0.6744i |
| w92 | 01011100 | +0.2853 − 0.1309i |
| w93 | 01011101 | +0.6355 − 0.4185i |
| w94 | 01011110 | +0.1052 − 0.1495i |
| w95 | 01011111 | +0.3744 − 0.6744i |
| w96 | 01100000 | −1.6350 − 0.1593i |
| w97 | 01100001 | −0.9430 − 0.1100i |
| w98 | 01100010 | −0.1658 − 1.6747i |
| w99 | 01100011 | −0.1088 − 0.9530i |
| w100 | 01100100 | +1.6350 − 0.1593i |
| w101 | 01100101 | +0.9430 − 0.1100i |
| w102 | 01100110 | +0.1658 − 1.6747i |
| w103 | 01100111 | +0.1088 − 0.9530i |
| w104 | 01101000 | −1.5776 − 0.4735i |
| w105 | 01101001 | −0.9069 − 0.2829i |
| w106 | 01101010 | −0.4907 − 1.6084i |
| w107 | 01101011 | −0.2464 − 0.9270i |
| w108 | 01101100 | +1.5776 − 0.4735i |
| w109 | 01101101 | +0.9069 − 0.2829i |
| w110 | 01101110 | +0.4907 − 1.6084i |
| w111 | 01101111 | +0.2464 − 0.9270i |
| w112 | 01110000 | −0.3237 − 0.0849i |
| w113 | 01110001 | −0.7502 − 0.1138i |
| w114 | 01110010 | −0.0872 − 0.1390i |
| w115 | 01110011 | −0.1091 − 0.7656i |
| w116 | 01110100 | +0.3237 − 0.0849i |
| w117 | 01110101 | +0.7502 − 0.1138i |
| w118 | 01110110 | +0.0872 − 0.1390i |
| w119 | 01110111 | +0.1091 − 0.7656i |
| w120 | 01111000 | −0.3228 − 0.0867i |
| w121 | 01111001 | −0.7325 − 0.2088i |
| w122 | 01111010 | −0.0871 − 0.1392i |
| w123 | 01111011 | −0.1699 − 0.7537i |
| w124 | 01111100 | +0.3228 − 0.0867i |
| w125 | 01111101 | +0.7325 − 0.2088i |
| w126 | 01111110 | +0.0871 − 0.1392i |
| w127 | 01111111 | +0.1699 − 0.7537i |
| w128 | 10000000 | −1.0382 + 0.8623i |
| w129 | 10000001 | −0.8504 + 0.7217i |
| w130 | 10000010 | −0.8555 + 1.0542i |
| w131 | 10000011 | −0.6961 + 0.8850i |
| w132 | 10000100 | +1.0382 + 0.8623i |
| w133 | 10000101 | +0.8504 + 0.7217i |
| w134 | 10000110 | +0.8555 + 1.0542i |
| w135 | 10000111 | +0.6961 + 0.8850i |
| w136 | 10001000 | −1.1794 + 0.6376i |
| w137 | 10001001 | −0.9638 + 0.5407i |
| w138 | 10001010 | −0.6363 + 1.2064i |
| w139 | 10001011 | −0.5229 + 1.0037i |
| w140 | 10001100 | +1.1794 + 0.6376i |
| w141 | 10001101 | +0.9638 + 0.5407i |
| w142 | 10001110 | +0.6363 + 1.2064i |
| w143 | 10001111 | +0.5229 + 1.0037i |
| w144 | 10010000 | −0.3734 + 0.2560i |
| w145 | 10010001 | −0.4968 + 0.3947i |
| w146 | 10010010 | −0.1938 + 0.3621i |
| w147 | 10010011 | −0.3224 + 0.5236i |
| w148 | 10010100 | +0.3734 + 0.2560i |
| w149 | 10010101 | +0.4968 + 0.3947i |
| w150 | 10010110 | +0.0938 + 0.3621i |
| w151 | 10010111 | +0.3224 + 0.5236i |

-continued

| w index | bit label | Constellation point |
|---|---|---|
| w152 | 10011000 | −0.3799 + 0.2517i |
| w153 | 10011001 | −0.5231 + 0.3644i |
| w154 | 10011010 | −0.1909 + 0.3627i |
| w155 | 10011011 | −0.3016 + 0.5347i |
| w156 | 10011100 | +0.3799 + 0.2517i |
| w157 | 10011101 | +0.5231 + 0.3644i |
| w158 | 10011110 | +0.1909 + 0.3627i |
| w159 | 10011111 | +0.3016 + 0.5347i |
| w160 | 10100000 | −1.3225 + 0.1320i |
| w161 | 10100001 | −1.0854 + 0.1139i |
| w162 | 10100010 | −0.1322 + 1.3631i |
| w163 | 10100011 | −0.1124 + 1.1327i |
| w164 | 10100100 | +1.3225 + 0.1320i |
| w165 | 10100101 | +1.0854 + 0.1139i |
| w165 | 10100110 | +0.1322 + 1.3631i |
| w167 | 10100111 | +0.1124 + 1.1327i |
| w168 | 10101000 | −1.2742 + 0.3922i |
| w169 | 10101001 | −1.0041 + 0.3296i |
| w170 | 10101010 | −0.3929 + 1.3102i |
| w171 | 10101011 | −0.3160 + 1.0913i |
| w172 | 10101100 | +1.2742 + 0.3922i |
| w173 | 10101101 | +1.0441 + 0.3296i |
| w174 | 10101110 | +0.3929 + 1.3102i |
| w175 | 10101111 | +0.3160 + 1.0913i |
| w176 | 10110000 | −0.4582 + 0.1123i |
| w177 | 10110001 | −0.6473 + 0.1138i |
| w178 | 10110010 | −0.0928 + 0.3970i |
| w179 | 10110011 | −0.1054 + 0.5979i |
| w180 | 10110100 | +0.4582 + 0.1123i |
| w181 | 10110101 | +0.6473 + 0.1138i |
| w182 | 10110110 | +0.0928 + 0.3970i |
| w183 | 10110111 | +0.1054 + 0.5979i |
| w184 | 10111000 | −0.4545 + 0.1251i |
| w185 | 10111001 | −0.6339 + 0.1702i |
| w186 | 10111010 | −0.0937 + 0.3973i |
| w187 | 10111011 | −0.1230 + 0.5949i |
| w188 | 10111100 | +0.4545 + 0.1251i |
| w189 | 10111101 | +0.6339 + 0.1702i |
| w190 | 10111110 | +0.0937 + 0.3973i |
| w191 | 10111111 | +0.1230 + 0.5949i |
| w192 | 11000000 | −1.0382 − 0.8623i |
| w193 | 11000001 | −0.8504 − 0.7217i |
| w194 | 11000010 | −0.8555 − 1.0542i |
| w195 | 11000011 | −0.6961 − 0.8850i |
| w196 | 11000100 | +1.0382 − 0.8623i |
| w197 | 11000101 | +0.8504 − 0.7217i |
| w198 | 11000110 | +0.8555 − 1.0542i |
| w199 | 11000111 | +0.6961 − 0.8850i |
| w200 | 11001000 | −1.1794 − 0.6376i |
| w201 | 11001001 | −0.9638 − 0.5407i |
| w202 | 11001010 | −0.6363 − 1.2064i |
| w203 | 11001011 | −0.5229 − 1.0037i |
| w204 | 11001100 | +1.1794 − 0.6376i |
| w205 | 11001101 | +0.9638 − 0.5407i |
| w205 | 11001110 | +0.6363 − 1.2064i |
| w207 | 11001111 | +05.229 − 1.0037i |
| w208 | 11010000 | −0.3734 − 0.2560i |
| w209 | 11010001 | −0.4968 − 0.3947i |
| w210 | 11010010 | −0.1938 − 0.3621i |
| w211 | 11010011 | −0.3224 − 0.5236i |
| w212 | 11010100 | +0.3734 − 0.2560i |
| w213 | 11010101 | +0.4968 − 0.3947i |
| w214 | 11010110 | +0.1938 − 0.3621i |
| w215 | 11010111 | +0.3224 − 0.5236i |
| w216 | 11011000 | −0.3799 − 0.2517i |
| w217 | 11011001 | −0.5231 − 0.3644i |
| w218 | 11011010 | −0.1909 − 0.3627i |
| w219 | 11011011 | −0.3016 − 0.5347i |
| w220 | 11011100 | +0.3799 − 0.2517i |
| w221 | 11011101 | +0.5231 − 0.3644i |
| w222 | 11011110 | +0.1909 − 0.3627i |
| w223 | 11011111 | +0.3016 − 0.5347i |
| w224 | 11100000 | −1.3225 − 0.1320i |
| w225 | 11100001 | −1.0854 − 0.1139i |
| w226 | 11100010 | −0.1322 − 1.3631i |
| w227 | 11100011 | −0.1124 − 1.1327i |
| w228 | 11100100 | +1.3225 − 0.1320i |
| w229 | 11100101 | +1.0854 − 0.1139i |
| w230 | 11100110 | +0.1322 − 1.3631i |
| w231 | 11100111 | +0.1124 − 1.1327i |
| w232 | 11101000 | −1.2742 − 0.3922i |
| w233 | 11101001 | −1.0441 − 0.3296i |
| w234 | 11101010 | −0.3929 − 1.3102i |
| w235 | 11101011 | −0.3160 − 1.0913i |
| w236 | 11101100 | +1.2742 − 0.3922i |
| w237 | 11101101 | +1.0441 − 0.3296i |
| w238 | 11101110 | +0.3929 − 1.3102i |
| w239 | 11101111 | +0.3160 − 1.0913i |
| w240 | 11110000 | −0.4582 − 0.1123i |
| w241 | 11110001 | −0.6473 − 0.1138i |
| w242 | 11110010 | −0.0928 − 0.3970i |
| w243 | 11110011 | −0.1054 − 0.5979i |
| w244 | 11110100 | +0.4582 − 0.1123i |
| w245 | 11110101 | +0.6473 − 0.1138i |
| w246 | 11110110 | +0.0928 − 0.3970i |
| w247 | 11110111 | +0.1054 − 0.5979i |
| w248 | 11111000 | −0.4545 − 0.1251i |
| w249 | 11111001 | −0.6339 − 0.1702i |
| w250 | 11111010 | −0.0937 − 0.3973i |
| w251 | 11111011 | −0.1230 − 0.5949i |
| w252 | 11111100 | +0.4545 − 0.1251i |
| w253 | 11111101 | +0.6339 − 0.1702i |
| w254 | 11111110 | +0.0937 − 0.3973i |
| w255 | 11111111 | +0.1230 − 0.5949i | for R=5/8 (or R=1/2, 3/4 or 13/16):

| w index | bit label | Constellation point |
|---|---|---|
| w0 | 0000000 | −1.2537 + 1.0045i |
| w1 | 0000000 | −0.2443 + 0.2114i |
| w2 | 0000001 | −0.7404 + 0.6074i |
| w3 | 0000001 | −0.6039 + 0.5118i |
| w4 | 0000010 | −1.5761 + 0.1512i |
| w5 | 0000010 | −0.2545 + 0.0723i |
| w6 | 0000011 | −0.9317 + 0.0939i |
| w7 | 0000011 | −0.7729 + 0.0813i |
| w8 | 0000100 | +1.2537 + 1.0045i |
| w9 | 0000100 | +0.2443 + 0.2114i |
| w10 | 0000101 | +0.7404 + 0.6074i |
| w11 | 0000101 | +0.6039 + 0.5118i |
| w12 | 0000110 | +1.5761 + 0.1512i |
| w13 | 0000110 | +0.2545 + 0.0723i |
| w14 | 0000111 | +0.9317 + 0.0939i |
| w15 | 0000111 | +0.7729 + 0.0813i |
| w16 | 0001000 | −1.2537 − 1.0045i |
| w17 | 0001000 | −0.2443 − 0.2114i |
| w18 | 0001001 | −0.7404 − 0.6074i |
| w19 | 0001001 | −0.6039 − 0.5118i |
| w20 | 0001010 | −1.5761 − 0.1512i |
| w21 | 0001010 | −0.2545 − 0.0723i |
| w22 | 0001011 | −0.9317 − 0.0939i |
| w23 | 0001011 | −0.7729 − 0.0813i |
| w24 | 0001100 | +1.2537 − 1.0045i |
| w25 | 0001100 | +0.2443 − 0.2114i |
| w26 | 0001101 | +0.7404 − 0.6074i |
| w27 | 0001101 | +0.6039 − 0.5118i |
| w28 | 0001110 | +1.5761 − 0.1512i |
| w29 | 0001110 | +0.2545 − 0.0723i |
| w30 | 0001111 | +0.9317 − 0.0939i |
| w31 | 0001111 | +0.7729 − 0.0813i |
| w32 | 0010000 | −1.0376 + 1.2347i |
| w33 | 0010000 | −0.0940 + 0.2611i |
| w34 | 0010001 | −0.6205 + 0.7476i |
| w35 | 0010001 | −0.5048 + 0.6321i |
| w36 | 0010010 | −0.1632 + 1.6163i |
| w37 | 0010010 | −0.0734 + 0.0858i |
| w38 | 0010011 | −0.1006 + 0.9948i |
| w39 | 0010011 | −0.0848 + 0.8427i |
| w40 | 0010100 | +1.0376 + 1.2347i |
| w41 | 0010100 | +0.0940 + 0.2611i |
| w42 | 0010101 | +0.6205 + 0.7476i |

-continued

| w index | bit label | Constellation point |
|---|---|---|
| w43 | 0010101 | +0.5048 + 0.6321i |
| w44 | 0010110 | +0.1632 + 1.6163i |
| w45 | 0010110 | +0.0734 + 0.0858i |
| w46 | 0010111 | +0.1006 + 0.9948i |
| w47 | 0010111 | +0.0848 + 0.8427i |
| w48 | 0011000 | −1.0376 − 1.2347i |
| w49 | 0011000 | −0.0940 − 0.2611i |
| w50 | 0011001 | −0.6205 − 0.7476i |
| w51 | 0011001 | −0.5048 − 0.6321i |
| w52 | 0011010 | −0.1632 − 1.6163i |
| w53 | 0011010 | −0.0734 − 0.0858i |
| w54 | 0011011 | −0.1006 − 0.9948i |
| w55 | 0011011 | −0.0848 − 0.8427i |
| w56 | 0011100 | +1.0376 − 1.2347i |
| w57 | 0011100 | +0.0940 − 0.2611i |
| w58 | 0011101 | +0.6205 − 0.7476i |
| w59 | 0011101 | +0.5048 − 0.6321i |
| w60 | 0011110 | +0.1632 − 1.6163i |
| w61 | 0011110 | +0.0734 − 0.0858i |
| w62 | 0011111 | +0.1006 − 0.9948i |
| w63 | 0011111 | +0.0848 − 0.8427i |
| w64 | 01000000 | −1.4164 + 0.7386i |
| w65 | 01000001 | −0.2508 + 0.2043i |
| w66 | 01000010 | −0.8324 + 0.4499i |
| w67 | 01000011 | −0.6808 + 0.3821i |
| w68 | 01000100 | −1.5251 + 0.4510i |
| w69 | 01000101 | −0.2566 + 0.0761i |
| w70 | 01000110 | −0.8975 + 0.2781i |
| w71 | 01000111 | −0.7412 + 0.2345i |
| w72 | 01001000 | +1.4164 + 0.7386i |
| w73 | 01001001 | +0.2508 + 0.2043i |
| w74 | 01001010 | +0.8324 + 0.4499i |
| w75 | 01001011 | +0.6808 + 0.3821i |
| w76 | 01001100 | +1.5251 + 0.4510i |
| w77 | 01001101 | +0.2566 + 0.0761i |
| w78 | 01001110 | +0.8975 + 0.2781i |
| w79 | 01001111 | +0.7412 + 0.2345i |
| w80 | 01010030 | −1.4164 − 0.7386i |
| w81 | 01010001 | −0.2508 − 0.2043i |
| w82 | 01010010 | −0.8324 − 0.4499i |
| w83 | 01010011 | −0.6808 − 0.3821i |
| w84 | 01010100 | −1.5251 − 0.4510i |
| w85 | 01010101 | −0.2566 − 0.0761i |
| w86 | 01010110 | −0.8975 − 0.2781i |
| w87 | 01010111 | −0.7412 − 0.2345i |
| w88 | 01011000 | +1.4164 − 0.7386i |
| w89 | 01011001 | +0.2508 − 0.2043i |
| w90 | 01011010 | +0.8324 − 0.4499i |
| w91 | 01011011 | +0.6808 − 0.3821i |
| w92 | 01011100 | +1.5251 − 0.4510i |
| w93 | 01011101 | +0.2566 − 0.0761i |
| w94 | 01011110 | +0.8975 − 0.2781i |
| w95 | 01011111 | +0.7412 − 0.2345i |
| w96 | 01100000 | −0.7769 + 1.4193i |
| w97 | 01100001 | −0.0898 + 0.2628i |
| w98 | 01100010 | −0.4711 + 0.8645i |
| w99 | 01100011 | −0.3892 + 0.7279i |
| w100 | 01100100 | −0.4813 + 1.5486i |
| w101 | 01100101 | −0.0722 + 0.0860i |
| w102 | 01100110 | −0.2955 + 0.9492i |
| w103 | 01100111 | −0.2443 + 0.8036i |
| w104 | 01101000 | +0.7769 + 1.4193i |
| w105 | 01101001 | +0.0898 + 0.2628i |
| w106 | 01101010 | +0.4711 + 0.8645i |
| w107 | 01101011 | +0.3892 + 0.7279i |
| w108 | 01101100 | +0.4813 + 1.5486i |
| w109 | 01101101 | +0.0722 + 0.0860i |
| w110 | 01101110 | +0.2955 + 0.9492i |
| w111 | 01101111 | +0.2443 + 0.8036i |
| w112 | 01110000 | −0.7769 − 1.4193i |
| w113 | 01110001 | −0.0898 − 0.2628i |
| w114 | 01110010 | −0.4711 − 0.8645i |
| w115 | 01110011 | −0.3892 − 0.7279i |
| w116 | 01110100 | −0.4813 − 1.5486i |
| w117 | 01110101 | −0.0722 − 0.0860i |
| w118 | 01110110 | −0.2955 − 0.9492i |
| w119 | 01110111 | −0.2443 − 0.8036i |
| w120 | 01111000 | +0.7769 − 1.4193i |
| w121 | 01111001 | +0.0898 − 0.2628i |
| w122 | 01111010 | +0.4711 − 0.8645i |
| w123 | 01111011 | +0.3892 − 0.7279i |
| w124 | 01111100 | +0.4813 − 1.5486i |
| w125 | 01111101 | +0.0722 − 0.0860i |
| w126 | 01111110 | +0.2955 − 0.9492i |
| w127 | 01111111 | +0.2443 − 0.8036i |
| w128 | 10000000 | −1.0508 + 0.8392i |
| w129 | 10000001 | −0.3516 + 0.3079i |
| w130 | 10000010 | −0.8852 + 0.7128i |
| w131 | 10000011 | −0.4734 + 0.4145i |
| w132 | 10000100 | −1.3158 + 0.1269i |
| w133 | 10000101 | −0.4512 + 0.0729i |
| w134 | 10000110 | −1.1073 + 0.1093i |
| w135 | 10000111 | −0.6187 + 0.0756i |
| w136 | 10001000 | +1.0508 + 0.8392i |
| w137 | 10001001 | +0.3516 + 0.3079i |
| w138 | 10001010 | +0.8852 + 0.7128i |
| w139 | 10001011 | +0.4734 + 0.4145i |
| w140 | 10001100 | +1.3158 + 0.1269i |
| w141 | 10001101 | +0.4512 + 0.0729i |
| w142 | 10001110 | +1.1073 + 0.1093i |
| w143 | 10001111 | +0.6187 + 0.0756i |
| w144 | 10010000 | −1.0508 − 0.8392i |
| w145 | 10010001 | −0.3516 − 0.3079i |
| w146 | 10010010 | −0.8852 − 0.7128i |
| w147 | 10010011 | −0.4734 − 0.4145i |
| w148 | 10010100 | −1.3158 − 0.1269i |
| w149 | 10010101 | −0.4512 − 0.0729i |
| w150 | 10010110 | −1.1073 − 0.1093i |
| w151 | 10010111 | −0.6187 − 0.0756i |
| w152 | 10011000 | +1.0508 − 0.8392i |
| w153 | 10011001 | +0.3516 − 0.3079i |
| w154 | 10011010 | +0.8852 − 0.7128i |
| w155 | 10011011 | +0.4734 − 0.4145i |
| w156 | 10011100 | +1.3158 − 0.1269i |
| w157 | 10011101 | +0.4512 − 0.0729i |
| w158 | 10011110 | +1.1073 − 0.1093i |
| w159 | 10011111 | +0.6187 − 0.0756i |
| w160 | 10100000 | −0.8734 + 1.0335i |
| w161 | 10100001 | −0.2145 + 0.4159i |
| w162 | 10100010 | −0.7384 + 0.8777i |
| w163 | 10100011 | −0.3752 + 0.5265i |
| w164 | 10100100 | −0.1381 + 1.3596i |
| w165 | 10100101 | −0.0693 + 0.5212i |
| w166 | 10100110 | −0.1180 + 1.1596i |
| w167 | 10100111 | −0.0788 + 0.6933i |
| w168 | 10101000 | +0.8734 + 1.0335i |
| w169 | 10101001 | +0.2145 + 0.4159i |
| w170 | 10101010 | +0.7384 + 0.8777i |
| w171 | 10101011 | +0.3752 + 0.5265i |
| w172 | 10101100 | +0.1381 + 1.3596i |
| w173 | 10101101 | +0.0693 + 0.5212i |
| w174 | 10101110 | +0.1180 + 1.1596i |
| w175 | 10101111 | +0.0788 + 0.6933i |
| w176 | 10110000 | −0.8734 − 1.0335i |
| w177 | 10110001 | −0.2145 − 0.4159i |
| w178 | 10110010 | −0.7384 − 0.8777i |
| w179 | 10110011 | −0.3752 − 0.5265i |
| w180 | 10110100 | −0.1381 − 1.3596i |
| w181 | 10110101 | −0.0693 − 0.5212i |
| w182 | 10110110 | −0.1180 − 1.1596i |
| w183 | 10110111 | −0.0788 − 0.6933i |
| w184 | 10111000 | +0.8734 − 1.0335i |
| w185 | 10111001 | +0.2145 − 0.4159i |
| w186 | 10111010 | +0.7384 − 0.8777i |
| w187 | 10111011 | +0.3752 − 0.5265i |
| w188 | 10111100 | +0.1381 − 1.3596i |
| w189 | 10111101 | +0.0693 − 0.5212i |
| w190 | 10111110 | +0.1180 − 1.1596i |
| w191 | 10111111 | +0.0788 − 0.6933i |
| w192 | 11000000 | −1.1844 + 0.6172i |
| w193 | 11000001 | −0.3812 + 0.2673i |
| w194 | 11000010 | −0.9957 + 0.5259i |
| w195 | 11000011 | −0.5340 + 0.3230i |
| w196 | 11000100 | −1.2728 + 0.3773i |

-continued

| w index | bit label | Constellation point |
|---|---|---|
| w197 | 11000101 | −0.4434 + 0.1145i |
| w198 | 11000110 | −1.0701 + 0.3230i |
| w199 | 11000111 | −0.5945 + 0.1815i |
| w200 | 11001000 | +1.1844 + 0.6172i |
| w201 | 11001001 | +0.3812 + 0.2673i |
| w202 | 11001010 | +0.9957 + 0.5259i |
| w203 | 11001011 | +0.5340 + 0.3230i |
| w204 | 11001100 | +1.2728 + 0.3773i |
| w205 | 11001101 | +0.4434 + 0.1145i |
| w206 | 11001110 | +1.0701 + 0.3230i |
| w207 | 11001111 | +0.5945 + 0.1815i |
| w208 | 11010000 | −1.1844 − 0.6172i |
| w209 | 11010001 | −0.3812 − 0.2673i |
| w210 | 11010010 | −0.9957 − 0.5259i |
| w211 | 11010011 | −0.5340 − 0.3230i |
| w212 | 11010100 | −1.2728 − 0.3773i |
| w213 | 11010101 | −0.4434 − 0.1145i |
| w214 | 11010110 | −1.0701 − 0.3230i |
| w215 | 11010111 | −0.5946 − 0.1815i |
| w216 | 11011000 | +1.1844 − 0.6172i |
| w217 | 11011001 | +0.3812 − 0.2673i |
| w218 | 11011010 | +0.9957 − 0.5259i |
| w219 | 11011011 | +0.5340 − 0.3230i |
| w220 | 11011100 | +1.2728 − 0.3773i |
| w221 | 11011101 | +0.4434 − 0.1145i |
| w222 | 11011110 | +1.0701 − 0.3230i |
| w223 | 11011111 | +0.5946 − 0.1815i |
| w224 | 11100000 | −0.6562 + 1.1905i |
| w225 | 11100001 | −0.1928 + 0.4287i |
| w226 | 11100010 | −0.5570 + 1.0128i |
| w227 | 11100011 | −0.3076 + 0.5885i |
| w228 | 11100100 | −0.4076 + 1.3018i |
| w229 | 11100101 | −0.0896 + 0.5118i |
| w230 | 11100110 | −0.3468 + 1.1091i |
| w231 | 11100111 | −0.1793 + 0.6649i |
| w232 | 11101000 | +0.6562 + 1.1905i |
| w233 | 11101001 | +0.1928 + 0.4287i |
| w234 | 11101010 | +0.5570 + 1.0128i |
| w235 | 11101011 | +0.3076 + 0.5885i |
| w236 | 11101100 | +0.4076 + 1.3018i |
| w237 | 11101101 | +0.0896 + 0.5118i |
| w238 | 11101110 | +0.3468 + 1.1091i |
| w239 | 11101111 | +0.1793 + 0.6649i |
| w240 | 11110000 | −0.6562 − 1.1905i |
| w241 | 11110001 | −0.1928 − 0.4287i |
| w242 | 11110010 | −0.5570 − 1.0128i |
| w243 | 11110011 | −0.3076 − 0.5885i |
| w244 | 11110100 | −0.4076 − 1.3018i |
| w245 | 11110101 | −0.0896 − 0.5118i |
| w246 | 11110110 | −0.3468 − 1.1091i |
| w247 | 11110111 | −0.1793 − 0.6649i |
| w248 | 11111000 | +0.6562 − 1.1905i |
| w249 | 11111001 | +0.1928 − 0.4287i |
| w250 | 11111010 | +0.5570 − 1.0128i |
| w251 | 11111011 | +0.3076 − 0.5885i |
| w252 | 11111100 | +0.4076 − 1.3018i |
| w253 | 11111101 | +0.0896 − 0.5118i |
| w254 | 11111110 | +0.3468 − 1.1091i |
| w255 | 11111111 | +0.1793 − 0.6649i | for R=3/4 (or R=1/2, 5/8 or 13/16):

| w index | bit label | Constellation point |
|---|---|---|
| w0 | 0000000 | −0.5115 + 1.2063i |
| w1 | 0000000 | −0.5115 − 1.2063i |
| w2 | 0000001 | −0.3049 + 1.2378i |
| w3 | 0000001 | −0.3049 − 1.2378i |
| w4 | 0000010 | +0.5115 + 1.2063i |
| w5 | 0000010 | +0.5115 − 1.2063i |
| w6 | 0000011 | +0.3049 + 1.2378i |
| w7 | 0000011 | +0.3049 − 1.2378i |
| w8 | 0000103 | −0.4952 + 1.0059i |
| w9 | 0000103 | −0.4952 − 1.0059i |
| w10 | 0000101 | −0.3032 + 1.0518i |

-continued

| w index | bit label | Constellation point |
|---|---|---|
| w11 | 0000101 | −0.3032 − 1.0518i |
| w12 | 0000110 | +0.4952 + 1.0059i |
| w13 | 0000110 | +0.4952 − 1.0059i |
| w14 | 0000111 | +0.3032 + 1.0518i |
| w15 | 0000111 | +0.3032 − 1.0518i |
| w16 | 0001000 | −1.1670 + 1.1014i |
| w17 | 0001000 | −1.1670 − 1.1014i |
| w18 | 0001001 | −0.1010 + 1.2545i |
| w19 | 0001001 | −0.1010 − 1.2545i |
| w20 | 0001010 | +1.1670 + 1.1014i |
| w21 | 0001010 | +1.1670 − 1.1014i |
| w22 | 0001011 | +0.1010 + 1.2545i |
| w23 | 0001011 | +0.1010 − 1.2545i |
| w24 | 0001100 | −1.2421 + 0.8557i |
| w25 | 0001100 | −1.2421 − 0.8557i |
| w26 | 0001101 | −0.0956 + 1.0676i |
| w27 | 0001101 | −0.0956 − 1.0676i |
| w28 | 0001110 | +1.2421 + 0.8557i |
| w29 | 0001110 | +1.2421 − 0.8557i |
| w30 | 0001111 | +0.0956 + 1.0676i |
| w31 | 0001111 | +0.0956 − 1.0676i |
| w32 | 0010000 | −0.6286 + 0.6639i |
| w33 | 0010000 | −0.6286 − 0.6639i |
| w34 | 0010001 | −0.4729 + 0.6321i |
| w35 | 0010001 | −0.4729 − 0.6321i |
| w36 | 0010010 | +0.6286 + 0.6639i |
| w37 | 0010010 | +0.6286 − 0.6639i |
| w38 | 0010011 | +0.4729 + 0.6321i |
| w39 | 0010011 | +0.4729 − 0.6321i |
| w40 | 0010100 | −0.5851 + 0.8353i |
| w41 | 0010100 | −0.5851 − 0.8353i |
| w42 | 0010101 | −0.4392 + 0.7880i |
| w43 | 0010101 | −0.4392 − 0.7880i |
| w44 | 0010110 | +0.5851 + 0.8353i |
| w45 | 0010110 | +0.5851 − 0.8353i |
| w46 | 0010111 | +0.4392 + 0.7880i |
| w47 | 0010111 | +0.4392 − 0.7880i |
| w48 | 0011000 | −1.2110 + 0.5795i |
| w49 | 0011000 | −1.2110 − 0.5795i |
| w50 | 0011001 | −0.0690 + 0.5518i |
| w51 | 0011001 | −0.0690 − 0.5518i |
| w52 | 0011010 | +1.2110 + 0.5795i |
| w53 | 0011010 | +1.2110 − 0.5795l |
| w54 | 0011011 | +0.0690 + 0.5518i |
| w55 | 0011011 | +0.0690 − 0.5518i |
| w56 | 0011100 | −1.4215 + 0.6637i |
| w57 | 0011100 | −1.4215 − 0.6637i |
| w58 | 0011101 | −0.0552 + 0.6903i |
| w59 | 0011101 | −0.0552 − 0.6903i |
| w60 | 0011110 | +1.4215 + 0.6637i |
| w61 | 0011110 | +1.4215 − 0.6637i |
| w62 | 0011111 | +0.0552 + 0.6903i |
| w63 | 0011111 | +0.0552 − 0.6903i |
| w64 | 01000000 | −0.6596 + 0.0715i |
| w65 | 01000001 | −0.6596 − 0.0715i |
| w66 | 01000010 | −0.5124 + 0.0667i |
| w67 | 01000011 | −0.5124 − 0.0667i |
| w68 | 01000100 | +0.6596 + 0.0715i |
| w69 | 01000101 | +0.6596 − 0.0715i |
| w70 | 01000110 | +0.5124 + 0.0667i |
| w71 | 01000111 | +0.5124 − 0.0667i |
| w72 | 01001030 | −0.6597 + 0.2116i |
| w73 | 01001001 | −0.6597 − 0.2116i |
| w74 | 01001010 | −0.5095 + 0.2008i |
| w75 | 01001011 | −0.5095 − 0.2008i |
| w76 | 01001100 | +0.6597 + 0.2116i |
| w77 | 01001101 | +0.6597 − 0.2116i |
| w78 | 01001110 | +0.5095 + 0.2008i |
| w79 | 01001111 | +0.5095 − 0.2008i |
| w80 | 01010030 | −1.4366 + 0.1213i |
| w81 | 01010001 | −1.4366 − 0.1213i |
| w82 | 01010010 | −0.0739 + 0.0596i |
| w83 | 01010011 | −0.0739 − 0.0596i |
| w84 | 01010100 | +1.4366 + 0.1213i |
| w85 | 01010101 | +1.4366 − 0.1213i |
| w86 | 01010110 | +0.0739 + 0.0596i |
| w87 | 01010111 | +0.0739 − 0.0596i |

-continued

| w index | bit label | Constellation point |
| --- | --- | --- |
| w88 | 01011000 | −1.2098 + 0.1077i |
| w89 | 01011001 | −1.2098 − 0.1077i |
| w90 | 01011010 | −0.0731 + 0.1767i |
| w91 | 01011011 | −0.0731 − 0.1767i |
| w92 | 01011100 | +1.2098 + 0.1077i |
| w93 | 01011101 | +1.2098 − 0.1077i |
| w94 | 01011110 | +0.0731 + 0.1767i |
| w95 | 01011111 | +0.0731 − 0.1767i |
| w96 | 01100000 | −0.6467 + 0.5036i |
| w97 | 01100001 | −0.6467 − 0.5036i |
| w98 | 01100010 | −0.4946 + 0.4818i |
| w99 | 01100011 | −0.4946 − 0.4818i |
| w100 | 01100100 | +0.6467 + 0.5036i |
| w101 | 01100101 | +0.6467 − 0.5036i |
| w102 | 01100110 | +0.4946 + 0.4818i |
| w103 | 01100111 | +0.4946 − 0.4818i |
| w104 | 01101000 | −0.6572 + 0.3526i |
| w105 | 01101001 | −0.6572 − 0.3526i |
| w106 | 01101010 | −0.5050 + 0.3380i |
| w107 | 01101011 | −0.5050 − 0.3380i |
| w108 | 01101100 | +0.6572 + 0.3526i |
| w109 | 01101101 | +0.6572 − 0.3526i |
| w110 | 01101110 | +0.5050 + 0.3380i |
| w111 | 01101111 | +0.5050 − 0.3380i |
| w112 | 01110000 | −1.4264 + 0.3764i |
| w113 | 01110001 | −1.4264 − 0.3764i |
| w114 | 01110010 | −0.0715 + 0.4218i |
| w115 | 01110011 | −0.0715 − 0.4218i |
| w116 | 01110100 | +1.4264 + 0.3764i |
| w117 | 01110101 | +1.4264 − 0.3764i |
| w118 | 01110110 | +0.0715 + 0.4218i |
| w119 | 01110111 | +0.0715 − 0.4218i |
| w120 | 01111000 | −1.2130 + 0.3237i |
| w121 | 01111001 | −1.2130 − 0.3237i |
| w122 | 01111010 | −0.0725 + 0.2978i |
| w123 | 01111011 | −0.0725 − 0.2978i |
| w124 | 01111100 | +1.2130 + 0.3237i |
| w125 | 01111101 | +1.2130 − 0.3237i |
| w126 | 01111110 | +0.0725 + 0.2978i |
| w127 | 01111111 | +0.0725 − 0.2978i |
| w128 | 10000000 | −0.5901 + 1.4171i |
| w129 | 10000001 | −0.5901 − 1.4171i |
| w130 | 10000010 | −0.3511 + 1.4584i |
| w131 | 10000011 | −0.3511 − 1.4584i |
| w132 | 10000100 | +0.5901 + 1.4171i |
| w133 | 10000101 | +0.5901 − 1.4171i |
| w134 | 10000110 | +0.3511 + 1.4584i |
| w135 | 10000111 | +0.3511 − 1.4584i |
| w136 | 10001000 | −0.6935 + 1.0456i |
| w137 | 10001001 | −0.6935 − 1.0466i |
| w138 | 10001010 | −0.2603 + 0.9107i |
| w139 | 10001011 | −0.2603 − 0.9107i |
| w140 | 10001100 | +0.6935 + 1.0466i |
| w141 | 10001101 | +0.6935 − 1.0466i |
| w142 | 10001110 | +0.2603 + 0.9107i |
| w143 | 10001111 | +0.2603 − 0.9107i |
| w144 | 10010000 | −0.8039 + 1.2957i |
| w146 | 10010001 | −0.8039 − 1.2957i |
| w145 | 10010010 | −0.1167 + 1.4782i |
| w147 | 10010011 | −0.1167 − 1.4782i |
| w148 | 10010100 | +0.8039 + 1.2957i |
| w149 | 10010101 | +0.8039 − 1.2957i |
| w150 | 10010110 | +0.1167 + 1.4782i |
| w151 | 10010111 | +0.1167 − 1.4782i |
| w152 | 10011000 | −0.8956 + 1.0881i |
| w153 | 10011001 | −0.8956 − 1.0881i |
| w154 | 10011010 | −0.0882 + 0.8981i |
| w155 | 10011011 | −0.0882 − 0.8981i |
| w156 | 10011100 | +0.8956 + 1.0881i |
| w157 | 10011101 | +0.8956 − 1.0881i |
| w158 | 10011110 | +0.0882 + 0.8981i |
| w159 | 10011111 | +0.0882 − 0.8981i |
| w160 | 10100000 | −0.8022 + 0.6879i |
| w161 | 10100001 | −0.8022 − 0.6879i |
| w162 | 10100010 | −0.3274 + 0.6045i |
| w163 | 10100011 | −0.3274 − 0.6045i |
| w164 | 10100100 | +0.8022 + 0.6879i |
| w165 | 10100101 | +0.8022 − 0.6879i |
| w166 | 10100110 | +0.3274 + 0.6045i |
| w167 | 10100111 | +0.3274 − 0.6045i |
| w168 | 10101000 | −0.7622 + 0.8634i |
| w169 | 10101001 | −0.7622 − 0.8634i |
| w170 | 10101010 | −0.2965 + 0.7629i |
| w171 | 10101011 | −0.2965 − 0.7629i |
| w172 | 10101100 | +0.7622 + 0.8634i |
| w173 | 10101101 | +0.7622 − 0.8634i |
| w174 | 10101110 | +0.2965 + 0.7629i |
| w175 | 10101111 | +0.2965 − 0.7629i |
| w176 | 10110000 | −1.0082 + 0.6930i |
| w177 | 10110001 | −1.0082 − 0.6930i |
| w178 | 10110010 | −0.1987 + 0.5742i |
| w179 | 10110011 | −0.1987 − 0.5742i |
| w180 | 10110100 | +1.0082 + 0.6930i |
| w181 | 10110101 | +1.0082 − 0.6930i |
| w182 | 10110110 | +0.1987 + 0.5742i |
| w183 | 10110111 | +0.1987 − 0.5742i |
| w184 | 10111000 | −0.9647 + 0.8849i |
| w185 | 10111001 | −0.9647 − 0.8849i |
| w186 | 10111010 | −0.1564 + 0.7374i |
| w187 | 10111011 | −0.1564 − 0.7374i |
| w188 | 10111100 | +0.9647 + 0.8849i |
| w189 | 10111101 | +0.9647 − 0.8849i |
| w190 | 10111110 | +0.1564 + 0.7374i |
| w191 | 10111111 | +0.1564 − 0.7374i |
| w192 | 11000000 | −0.8131 + 0.0729i |
| w193 | 11000001 | −0.8131 − 0.0729i |
| w194 | 11000010 | −0.3658 + 0.0625i |
| w195 | 11000011 | −0.3658 − 0.0625i |
| w196 | 11000100 | +0.8131 + 0.0729i |
| w197 | 11000101 | +0.8131 − 0.0729i |
| w198 | 11000110 | +0.3658 + 0.0625i |
| w199 | 11000111 | +0.3658 − 0.0625i |
| w200 | 11001000 | −0.8246 + 0.2158i |
| w201 | 11001001 | −0.8246 − 0.2158i |
| w202 | 11001010 | −0.3642 + 0.1899i |
| w203 | 11001011 | −0.3642 − 0.1899i |
| w204 | 11001100 | +0.8245 + 0.2158i |
| w205 | 11001101 | +0.8246 − 0.2158i |
| w206 | 11001110 | +0.3642 + 0.1899i |
| w207 | 11001111 | +0.3642 − 0.1899i |
| w208 | 11010000 | −0.9801 + 0.0651i |
| w209 | 11010001 | −0.9801 − 0.0651i |
| w210 | 11010010 | −0.2198 + 0.0612i |
| w211 | 11010011 | −0.2198 − 0.0612i |
| w212 | 11010100 | +0.9801 + 0.0651i |
| w213 | 11010101 | +0.9801 − 0.0651i |
| w214 | 11010110 | +0.2198 + 0.0612i |
| w215 | 11010111 | +0.2198 − 0.0612i |
| w216 | 11011000 | −1.0115 + 0.2009i |
| w217 | 11011001 | −1.0115 − 0.2009i |
| w218 | 11011010 | −0.2192 + 0.1815i |
| w219 | 11011011 | −0.2192 − 0.1815i |
| w220 | 11011100 | +1.0115 + 0.2009i |
| w221 | 11011101 | +1.0115 − 0.2009i |
| w222 | 11011110 | +0.2192 + 0.1815i |
| w223 | 11011111 | +0.2192 − 0.1815i |
| w224 | 11100000 | −0.8086 + 0.5185i |
| w225 | 11100001 | −0.8086 − 0.5185i |
| w226 | 11100010 | −0.3499 + 0.4571i |
| w227 | 11100011 | −0.3499 − 0.4571i |
| w228 | 11100100 | +0.8086 + 0.5185i |
| w229 | 11100101 | +0.8086 − 0.5185i |
| w230 | 11100110 | +0.3499 + 0.4571i |
| w231 | 11100111 | +0.3499 − 0.4571i |
| w232 | 11101000 | −0.8245 + 0.3593i |
| w233 | 11101001 | −0.8245 − 0.3593i |
| w234 | 11101010 | −0.3599 + 0.3216i |
| w235 | 11101011 | −0.3599 − 0.3216i |
| w236 | 11101100 | +0.8245 + 0.3593i |
| w237 | 11101101 | +0.8245 − 0.3593i |
| w238 | 11101110 | +0.3599 + 0.3216i |
| w239 | 11101111 | +0.3599 − 0.3216i |
| w240 | 11110000 | −0.9814 + 0.5205i |
| w241 | 11110001 | −0.9814 − 0.5205i |

-continued

| w index | bit label | Constellation point |
|---|---|---|
| w242 | 11110010 | −0.2115 + 0.4337i |
| w243 | 11110011 | −0.2115 − 0.4337i |
| w244 | 11110100 | +0.9814 + 0.5205i |
| w245 | 11110101 | +0.9814 − 0.5205i |
| w246 | 11110110 | +0.2115 + 0.4337i |
| w247 | 11110111 | +0.2115 − 0.4337i |
| w248 | 11111000 | −1.0163 + 0.3615i |
| w249 | 11111001 | −1.0163 − 0.3615i |
| w250 | 11111010 | −0.2167 + 0.3057i |
| w251 | 11111011 | −0.2167 − 0.3057i |
| w252 | 11111100 | +1.0163 + 0.3615i |
| w253 | 11111101 | +1.0163 − 0.3615i |
| w254 | 11111110 | +0.2167 + 0.3057i |
| w255 | 11111111 | +0.2167 − 0.3057i | for R=13/16 (or R=1/2, 5/8 or 3/4):

| w index | bit label | Constellation point |
|---|---|---|
| w0 | 0000000 | −0.4934 + 1.1976i |
| w1 | 0000000 | −0.6474 + 0.6881i |
| w2 | 0000001 | −0.6614 + 0.0730i |
| w3 | 0000001 | −0.6545 + 0.5220i |
| w4 | 0000010 | −0.4787 + 1.0113i |
| w5 | 0000010 | −0.6010 + 0.8566i |
| w6 | 0000011 | −0.6676 + 0.2192i |
| w7 | 0000011 | −0.6674 + 0.3672i |
| w8 | 0000100 | −1.1592 + 1.0404i |
| w9 | 0000100 | −1.1898 + 0.5538i |
| w10 | 0000101 | −1.3908 + 0.1102i |
| w11 | 0000101 | −1.4081 + 0.3370i |
| w12 | 0000110 | −1.2410 + 0.8061i |
| w13 | 0000110 | −1.3911 + 0.5975i |
| w14 | 0000111 | −1.1855 + 0.1041i |
| w15 | 0000111 | −1.2043 + 0.3138i |
| w16 | 0001000 | −0.2985 + 1.2655i |
| w17 | 0001000 | −0.4920 + 0.6512i |
| w18 | 0001001 | −0.5130 + 0.0697i |
| w19 | 0001001 | −0.5045 + 0.4981i |
| w20 | 0001010 | −0.2876 + 1.0856i |
| w21 | 0001010 | −0.4556 + 0.8064i |
| w22 | 0001011 | −0.5147 + 0.2097i |
| w23 | 0001011 | −0.5132 + 0.3515i |
| w24 | 0001100 | −0.0980 + 1.2511i |
| w25 | 0001100 | −0.0701 + 0.5794i |
| w26 | 0001101 | −0.0734 + 0.0629i |
| w27 | 0001101 | −0.0724 + 0.4460i |
| w28 | 0001110 | −0.0934 + 1.0735i |
| w29 | 0001110 | −0.0582 + 0.7203i |
| w30 | 0001111 | −0.0734 + 0.1890i |
| w31 | 0001111 | −0.0731 + 0.3164i |
| w32 | 0010000 | −0.5534 + 1.3936i |
| w33 | 0010000 | −0.8188 + 0.7082i |
| w34 | 0010001 | −0.8139 + 0.0752i |
| w35 | 0010001 | −0.8096 + 0.5376i |
| w36 | 0010010 | −0.6787 + 1.0583i |
| w37 | 0010010 | −0.7729 + 0.8860i |
| w38 | 0010011 | −0.8305 + 0.2250i |
| w39 | 0010011 | −0.8315 + 0.3759i |
| w40 | 0010100 | −0.7567 + 1.2803i |
| w41 | 0010100 | −1.0161 + 0.7012i |
| w42 | 0010101 | −0.9757 + 0.0702i |
| w43 | 0010101 | −0.9739 + 0.5345i |
| w44 | 0010110 | −0.8952 + 1.0953i |
| w45 | 0010110 | −0.9646 + 0.8865i |
| w46 | 0010111 | −1.0091 + 0.2141i |
| w47 | 0010111 | −1.0164 + 0.3745i |
| w48 | 0011000 | −0.3350 + 1.4701i |
| w49 | 0011000 | −0.3446 + 0.6254i |
| w50 | 0011001 | −0.3664 + 0.0666i |
| w51 | 0011001 | −0.3586 + 0.4775i |
| w52 | 0011010 | −0.2713 + 0.9300i |
| w53 | 0011010 | −0.3149 + 0.7791i |
| w54 | 0011011 | −0.3666 + 0.2005i |
| w55 | 0011011 | −0.3649 + 0.3365i |
| w56 | 0011100 | −0.1095 + 1.4559i |
| w57 | 0011100 | −0.2067 + 0.6018i |
| w58 | 0011101 | −0.2200 + 0.0642i |
| w59 | 0011101 | −0.2160 + 0.4587i |
| w60 | 0011110 | −0.0910 + 0.9104i |
| w61 | 0011110 | −0.1761 + 0.7590i |
| w62 | 0011111 | −0.2199 + 0.1932i |
| w63 | 0011111 | −0.2191 + 0.3239i |
| w64 | 01000000 | −0.4934 − 1.1976i |
| w65 | 01000001 | −0.6474 − 0.6881i |
| w66 | 01000010 | −0.6614 − 0.0730i |
| w67 | 01000011 | −0.6545 − 0.5220i |
| w68 | 01000100 | −0.4787 − 1.0113i |
| w69 | 01000101 | −0.6010 − 0.8566i |
| w70 | 01000110 | −0.6676 − 0.2192i |
| w71 | 01000111 | −0.6674 − 0.3672i |
| w72 | 01001000 | −1.1592 − 1.0404i |
| w73 | 01001001 | −1.1898 − 0.5538i |
| w74 | 01001010 | −1.3908 − 0.1102i |
| w75 | 01001011 | −1.4081 − 0.3370i |
| w76 | 01001100 | −1.2410 − 0.8061i |
| w77 | 01001101 | −1.3911 − 0.5975i |
| w78 | 01001110 | −1.1855 − 0.1041i |
| w79 | 01001111 | −1.2043 − 0.3138i |
| w80 | 01010000 | −0.2985 − 1.2655i |
| w81 | 01010001 | −0.4920 − 0.6512i |
| w82 | 01010010 | −0.5130 − 0.0697i |
| w83 | 01010011 | −0.5045 − 0.4981i |
| w84 | 01010100 | −0.2876 − 1.0856i |
| w85 | 01010101 | −0.4556 − 0.8064i |
| w86 | 01010110 | −0.5147 − 0.2097i |
| w87 | 01010111 | −0.5132 − 0.3515i |
| w88 | 01011000 | −0.0980 − 1.2511i |
| w89 | 01011001 | −0.0701 − 0.5794i |
| w90 | 01011010 | −0.0734 − 0.0629i |
| w91 | 01011011 | −0.0724 − 0.4460i |
| w92 | 01011100 | −0.0934 − 1.0735i |
| w93 | 01011101 | −0.0582 − 0.7208i |
| w94 | 01011110 | −0.0734 − 0.1890i |
| w95 | 01011111 | −0.0731 − 0.3164i |
| w96 | 01100000 | −0.5534 − 1.3936i |
| w97 | 01100001 | −0.8188 − 0.7032i |
| w98 | 01100010 | −0.8139 − 0.0752i |
| w99 | 01100011 | −0.8096 − 0.5376i |
| w100 | 01100100 | −0.6787 − 1.0583i |
| w101 | 01100101 | −0.7729 − 0.8860i |
| w102 | 01100110 | −0.8305 − 0.2250i |
| w103 | 01100111 | −0.8315 − 0.3759i |
| w104 | 01101000 | −0.7567 − 1.2808i |
| w105 | 01101001 | −1.0161 − 0.7012i |
| w106 | 01101010 | −0.9757 − 0.0702i |
| w107 | 01101011 | −0.9739 − 0.5345i |
| w108 | 01101100 | −0.8952 − 1.0953i |
| w109 | 01101101 | −0.9646 − 0.8865i |
| w110 | 01101110 | −1.0091 − 0.2141i |
| w111 | 01101111 | −1.0164 − 0.3745i |
| w112 | 01110000 | −0.3350 − 1.4701i |
| w113 | 01110001 | −0.3446 − 0.6254i |
| w114 | 01110010 | −0.3664 − 0.0666i |
| w115 | 01110011 | −0.3586 − 0.4775i |
| w116 | 01110100 | −0.2713 − 0.9300i |
| w117 | 01110101 | −0.3149 − 0.7791i |
| w118 | 01110110 | −0.3666 − 0.2005i |
| w119 | 01110111 | −0.3649 − 0.3365i |
| w120 | 01111000 | −0.1095 − 1.4559i |
| w121 | 01111001 | −0.2067 − 0.6018i |
| w122 | 01111010 | −0.2200 − 0.0642i |
| w123 | 01111011 | −0.2160 − 0.4587i |
| w124 | 01111100 | −0.0910 − 0.9104i |
| w125 | 01111101 | −0.1761 − 0.7590i |
| w126 | 01111110 | −0.2199 − 0.1932i |
| w127 | 01111111 | −0.2191 − 0.3239i |

-continued

| w index | bit label | Constellation point |
|---|---|---|
| w128 | 10000000 | +0.4934 + 1.1976i |
| w129 | 10000001 | +0.6474 + 0.6881i |
| w130 | 10000010 | +0.6614 + 0.0730i |
| w131 | 10000011 | +0.6545 + 0.5220i |
| w132 | 10000100 | +0.4787 + 1.0113i |
| w133 | 10000101 | +0.6010 + 0.8566i |
| w134 | 10000110 | +0.6676 + 0.2192i |
| w135 | 10000111 | +0.6674 + 0.3672i |
| w136 | 10001000 | +1.1592 + 1.0404i |
| w137 | 10001001 | +1.1898 + 0.5538i |
| w138 | 10001010 | +1.3908 + 0.1102i |
| w139 | 10001011 | +1.4081 + 0.3370i |
| w140 | 10001100 | +1.2410 + 0.8061i |
| w141 | 10001101 | +1.3911 + 0.5975i |
| w142 | 10001110 | +1.1855 + 0.1041i |
| w143 | 10001111 | +1.2043 + 0.3138i |
| w144 | 10010000 | +0.2985 + 1.2655i |
| w145 | 10010001 | +0.4920 + 0.6512i |
| w146 | 10010010 | +0.5130 + 0.0697i |
| w147 | 10010011 | +0.5045 + 0.4981i |
| w148 | 10010100 | +0.2876 + 1.0856i |
| w149 | 10010101 | +0.4556 + 0.8064i |
| w150 | 10010110 | +0.5147 + 0.2097i |
| w151 | 10010111 | +0.5132 + 0.3515i |
| w152 | 10011000 | +0.0980 + 1.2511i |
| w153 | 10011001 | +0.0701 + 0.5794i |
| w154 | 10011010 | +0.0734 + 0.0629i |
| w155 | 10011011 | +0.0724 + 0.4460i |
| w156 | 10011100 | +0.0934 + 1.0735i |
| w157 | 10011101 | +0.0582 + 0.7208i |
| w158 | 10011110 | +0.0734 + 0.1890i |
| w159 | 10011111 | +0.0731 + 0.3164i |
| w160 | 10100000 | +0.5534 + 1.3936i |
| w161 | 10100001 | +0.8188 + 0.7082i |
| w162 | 10100010 | +0.8139 + 0.0752i |
| w163 | 10100011 | +0.8096 + 0.5376i |
| w164 | 10100100 | +0.6787 + 1.0583i |
| w165 | 10100101 | +0.7729 + 0.8860i |
| w166 | 10100110 | +0.8305 + 0.2250i |
| w167 | 10100111 | +0.8315 + 0.3759i |
| w168 | 10101000 | +0.7567 + 1.2808i |
| w169 | 10101001 | +1.0161 + 0.7012i |
| w170 | 10101010 | +0.9757 + 0.0702i |
| w171 | 10101011 | +0.9739 + 0.5345i |
| w172 | 10101100 | +0.8952 + 1.0953i |
| w173 | 10101101 | +0.9646 + 0.5865i |
| w174 | 10101110 | +1.0091 + 0.2141i |
| w175 | 10101111 | +1.0164 + 0.3745i |
| w176 | 10110000 | +0.3350 + 1.4701i |
| w177 | 10110001 | +0.3446 + 0.6254i |
| w178 | 10110010 | +0.3664 + 0.0666i |
| w179 | 10110011 | +0.3586 + 0.4775i |
| w180 | 10110100 | +0.2713 + 0.9300i |
| w181 | 10110101 | +0.3149 + 0.7791i |
| w182 | 10110110 | +0.3666 + 0.2005i |
| w183 | 10110111 | +0.3649 + 0.3365i |
| w184 | 10111000 | +0.1095 + 1.4559i |
| w185 | 10111001 | +0.2067 + 0.6018i |
| w186 | 10111010 | +0.2200 + 0.0642i |
| w187 | 10111011 | +0.2160 + 0.4587i |
| w188 | 10111100 | +0.0910 + 0.9104i |
| w189 | 10111101 | +0.1761 + 0.7590i |
| w190 | 10111110 | +0.2199 + 0.1932i |
| w191 | 10111111 | +0.2191 + 0.3239i |
| w192 | 11000000 | +0.4934 − 1.1976i |
| w193 | 11000001 | +0.6474 − 0.6881i |
| w194 | 11000010 | +0.6614 − 0.0730i |
| w195 | 11000011 | +0.6545 − 0.5220i |
| w196 | 11000100 | +0.4787 − 1.0113i |
| w197 | 11000101 | +0.6010 − 0.8566i |
| w198 | 11000110 | +0.6676 − 0.2192i |
| w199 | 11000111 | +0.6674 − 0.3672i |
| w200 | 11001000 | +1.1592 − 1.0404i |
| w201 | 11001001 | +1.1898 − 0.5538i |
| w202 | 11001010 | +1.3908 − 0.1102i |
| w203 | 11001011 | +1.4081 − 0.3370i |
| w204 | 11001100 | +1.2410 − 0.8061i |
| w205 | 11001101 | +1.3911 − 0.5975i |
| w206 | 11001110 | +1.1855 − 0.1041i |
| w207 | 11001111 | +1.2043 − 0.3138i |
| w208 | 11010000 | +0.2985 − 1.2655i |
| w209 | 11010001 | +0.4920 − 0.6512i |
| w210 | 11010010 | +0.5130 − 0.0697i |
| w211 | 11010011 | +0.5045 − 0.4981i |
| w212 | 11010100 | +0.2876 − 1.0856i |
| w213 | 11010101 | +0.4556 − 0.8064i |
| w214 | 11010110 | +0.5147 − 0.2097i |
| w215 | 11010111 | +0.5132 − 0.3515i |
| w216 | 11011000 | +0.0980 − 1.2511i |
| w217 | 11011001 | +0.0701 − 0.5794i |
| w218 | 11011010 | +0.0734 − 0.0629i |
| w219 | 11011011 | +0.0724 − 0.4460i |
| w220 | 11011100 | +0.0934 − 1.0735i |
| w221 | 11011101 | +0.0582 − 0.7208i |
| w222 | 11011110 | +0.0734 − 0.1890i |
| w223 | 11011111 | +0.0731 − 0.3164i |
| w224 | 11100000 | +0.5534 − 1.3936i |
| w225 | 11100001 | +0.8188 − 0.7082i |
| w226 | 11100010 | +0.8139 − 0.0752i |
| w227 | 11100011 | +0.8096 − 0.5376i |
| w228 | 11100100 | +0.6787 − 1.0583i |
| w229 | 11100101 | +0.7729 − 0.8860i |
| w230 | 11100110 | +0.8305 − 0.2250i |
| w231 | 11100111 | +0.8315 − 0.3759i |
| w232 | 11101000 | +0.7567 − 1.2808i |
| w233 | 11101001 | +1.0161 − 0.7012i |
| w234 | 11101010 | +0.9757 − 0.0702i |
| w235 | 11101011 | +0.9739 − 0.5345i |
| w236 | 11101100 | +0.8952 − 1.0953i |
| w237 | 11101101 | +0.9646 − 0.8865i |
| w238 | 11101110 | +1.0091 − 0.2141i |
| w239 | 11101111 | +1.0164 − 0.3745i |
| w240 | 11110000 | +0.3350 − 1.4701i |
| w241 | 11110001 | +0.3446 − 0.6254i |
| w242 | 11110010 | +0.3664 − 0.0666i |
| w243 | 11110011 | +0.3586 − 0.4775i |
| w244 | 11110100 | +0.2713 − 0.9300i |
| w245 | 11110101 | +0.3149 − 0.7791i |
| w246 | 11110110 | +0.3666 − 0.2005i |
| w247 | 11110111 | +0.3649 − 0.3365i |
| w248 | 11111000 | +0.1095 − 1.4559i |
| w249 | 11111001 | +0.2067 − 0.6018i |
| w250 | 11111010 | +0.2200 − 0.0642i |
| w251 | 11111011 | +0.2160 − 0.4587i |
| w252 | 11111100 | +0.0910 − 0.9104i |
| w253 | 11111101 | +0.1761 − 0.7590i |
| w254 | 11111110 | +0.2199 − 0.1932i |
| w255 | 11111111 | +0.2191 − 0.3239i |

B) M-QAM non-uniform constellations of group B for single carrier mode as PHY mode:

B1) 16-QAM NUC

| w | bit label | R = ½ (MCS = 10) (or R = ⅝ or ¾) | R = ⅝ (MCS = 11) (or R = ½ or ¾) | R = ¾ (MCS = 12) (or R = ½ or ⅝) |
|---|---|---|---|---|
| w0  | 0000 | +0.4925 + 1.2040i | +0.2173 + 0.4189i | +0.2949 − 0.2949i |
| w1  | 0001 | +0.4925 − 1.2040i | +0.4326 + 1.1445i | +0.9555 − 0.2949i |
| w2  | 0010 | +0.2530 + 0.4936i | −0.2173 + 0.4189i | −0.2949 − 0.2949i |
| w3  | 0011 | +0.2530 − 0.4936i | −0.4326 + 1.1445i | −0.9555 − 0.2949i |
| w4  | 0100 | −0.4925 + 1.2040i | +0.2173 − 0.4189i | +0.2949 − 0.9555i |
| w5  | 0101 | −0.4925 − 1.2040i | +0.4326 − 1.1445i | +0.9555 − 0.9555i |
| w6  | 0110 | −0.2530 + 0.4936i | −0.2173 − 0.4189i | −0.2949 − 0.9555i |
| w7  | 0111 | −0.2530 − 0.4936i | −0.4326 − 1.1445i | −0.9555 − 0.9555i |
| w8  | 1000 | +1.2040 + 0.4925i | +0.6578 + 0.2571i | +0.2949 + 0.2949i |
| w9  | 1001 | +1.2040 − 0.4925i | +1.2088 + 0.5659i | +0.9555 + 0.2949i |
| w10 | 1010 | +0.4936 + 0.2530i | −0.6578 + 0.2571i | −0.2949 + 0.2949i |
| w11 | 1011 | +0.4936 − 0.2530i | −1.2088 + 0.5659i | −0.9555 + 0.2949i |
| w12 | 1100 | −1.2040 + 0.4925i | +0.6578 − 0.2571i | +0.2949 + 0.9555i |
| w13 | 1101 | −1.2040 − 0.4925i | +1.2088 − 0.5659i | +0.9555 + 0.9555i |
| w14 | 1110 | −0.4936 + 0.2530i | −0.6578 − 0.2571i | −0.2949 + 0.9555i |
| w15 | 1111 | −0.4936 − 0.2530i | −1.2088 − 0.5659i | −0.9555 + 0.9555i |

B2) 32-QAM NUC

| w/MCS index | bit label | R = ½ (or R = ⅝, ¾ or ¹³⁄₁₆) | R = ⅝ (or R = ½, ¾ or ¹³⁄₁₆) | R = ¾ (or R = ½, ⅝ or ¹³⁄₁₆) | R = ¹³⁄₁₆ (or R = ½, ⅝ or ¾) |
|---|---|---|---|---|---|
| w0  | 00000 | +0.1929 + 0.1744i | +0.2187 + 0.1559i | +0.2113 + 0.1819i | +0.2082 + 0.1996i |
| w1  | 00001 | +0.2283 + 0.5036i | +0.2225 + 0.5103i | +0.6163 + 1.2930i | +0.6964 + 1.2272i |
| w2  | 00010 | +0.6963 + 0.1782i | +0.2187 − 0.1559i | +0.2113 − 0.1819i | +0.2041 + 0.6147i |
| w3  | 00011 | +0.6364 + 0.4437i | +0.2225 − 0.5103i | +0.6163 − 1.2930i | +0.2297 + 1.0778i |
| w4  | 00100 | +0.1929 − 0.1744i | −0.2187 + 0.1559i | +0.6590 + 0.1934i | +0.6409 + 0.2027i |
| w5  | 00101 | +0.2283 − 0.5036i | −0.2225 + 0.5103i | +1.1691 + 0.2524i | +1.1236 + 0.2383i |
| w6  | 00110 | +0.6963 − 0.1782i | −0.2187 − 0.1559i | +0.6590 − 0.1934i | +0.6262 + 0.6234i |
| w7  | 00111 | +0.6364 − 0.4437i | −0.2225 − 0.5103i | +1.1691 − 0.2524i | +1.0921 + 0.7399i |
| w8  | 01000 | +0.3541 + 1.4168i | +0.7211 + 0.1755i | −0.2113 + 0.1819i | +0.2082 − 0.1996i |
| w9  | 01001 | +0.2627 + 0.9170i | +0.6446 + 0.5183i | −0.6163 + 1.2930i | +0.6964 − 1.2272i |
| w10 | 01010 | +1.3162 + 0.3270i | +0.7211 − 0.1755i | −0.2113 − 0.1819i | +0.2041 − 0.6147i |
| w11 | 01011 | +0.9382 + 0.8637i | +0.6446 − 0.5183i | −0.6163 − 1.2930i | +0.2297 − 1.0778i |
| w12 | 01100 | +0.3541 − 1.4168i | −0.7211 + 0.1755i | −0.6590 + 0.1934i | +0.6409 − 0.2027i |
| w13 | 01101 | +0.2627 − 0.9170i | −0.6446 + 0.5183i | −1.1691 + 0.2524i | +1.1236 − 0.2383i |
| w14 | 01110 | +1.3162 − 0.3270i | −0.7211 − 0.1755i | −0.6590 − 0.1934i | +0.6262 − 0.6234i |
| w15 | 01111 | +0.9382 − 0.8637i | −0.6446 − 0.5183i | −1.1691 − 0.2524i | +1.0921 − 0.7399i |
| w16 | 10000 | −0.1929 + 0.1744i | +0.3459 + 1.3987i | +0.2042 + 0.5736i | −0.2082 + 0.1996i |
| w17 | 10001 | −0.2283 + 0.5036i | +0.2415 + 0.9207i | +0.2154 + 1.0277i | −0.6964 + 1.2272i |
| w18 | 10010 | −0.6963 + 0.1782i | +0.3459 − 1.3987i | +0.2042 − 0.5736i | −0.2041 + 0.6147i |
| w19 | 10011 | −0.6364 + 0.4437i | +0.2415 − 0.9207i | +0.2154 − 1.0277i | −0.2297 + 1.0778i |
| w20 | 10100 | −0.1929 − 0.1744i | −0.3459 + 1.3987i | +0.6214 + 0.5984i | −0.6409 + 0.2027i |
| w21 | 10101 | −0.2283 − 0.5036i | −0.2415 + 0.9207i | +1.0670 + 0.7825i | −1.1236 + 0.2383i |
| w22 | 10110 | −0.6963 − 0.1782i | −0.3459 − 1.3987i | +0.6214 − 0.5984i | −0.6262 + 0.6234i |
| w23 | 10111 | −0.6364 − 0.4437i | −0.2415 − 0.9207i | +1.0670 − 0.7825i | −1.0921 + 0.7399i |
| w24 | 11000 | −0.3541 + 1.4168i | +1.2734 + 0.3186i | −0.2042 + 0.5736i | −0.2082 − 0.1996i |
| w25 | 11001 | −0.2627 + 0.9170i | +0.9258 + 0.9059i | −0.2154 + 1.0277i | −0.6964 − 1.2272i |
| w26 | 11010 | −1.3162 + 0.3270i | +1.2734 − 0.3186i | −0.2042 − 0.5736i | −0.2041 − 0.6147i |
| w27 | 11011 | −0.9382 + 0.8637i | +0.9258 − 0.9059i | −0.2154 − 1.0277i | −0.2297 − 1.0778i |
| w28 | 11100 | −0.3541 − 1.4168i | −1.2734 + 0.3186i | −0.6214 + 0.5984i | −0.6409 − 0.2027i |
| w29 | 11101 | −0.2627 − 0.9170i | −0.9258 + 0.9059i | −1.0670 + 0.7825i | −1.1236 − 0.2383i |
| w30 | 11110 | −1.3162 − 0.3270i | −1.2734 − 0.3186i | −0.6214 − 0.5984i | −0.6262 − 0.6234i |
| w31 | 11111 | −0.9382 − 0.8637i | −0.9258 − 0.9059i | −1.0670 − 0.7825i | −1.0921 − 0.7399i |

B3) 64-QAM NUC

| w/MCS index | bit label | R = ½ (or R = ⅝, ¾ or ¹³⁄₁₆) | R = ⅝ (or R = ½, ¾ or ¹³⁄₁₆) | R = ¾ (or R = ½, ⅝ or ¹³⁄₁₆) | R = ¹³⁄₁₆ (or R = ½, ⅝ or ¾) |
|---|---|---|---|---|---|
| w0 | 000000 | +1.4732 + 0.2920i | +1.4730 + 0.3019i | +1.0501 − 0.1676i | +1.0414 − 0.1712i |
| w1 | 000001 | +1.2487 + 0.8348i | −1.4730 + 0.3019i | +1.4380 − 0.2294i | +0.7230 − 0.1517i |
| w2 | 000010 | +1.4732 − 0.2920i | +1.0895 + 0.2172i | +0.1398 − 0.1309i | +1.0997 − 0.5419i |
| w3 | 000011 | +1.2487 − 0.8348i | −1.0895 + 0.2172i | +0.1680 − 1.0338i | +0.7484 − 0.4663i |
| w4 | 000100 | +1.0283 + 0.2071i | +0.1419 + 0.1122i | +1.0725 − 0.5328i | −1.0414 − 0.1712i |
| w5 | 000101 | +0.8760 + 0.5811i | −0.1419 + 0.1122i | +1.0771 − 0.9315i | −0.7230 − 0.1517i |

-continued

| w/MCS index | bit label | R = ½ (or R = ⅝, ¾ or ¹³⁄₁₆) | R = ⅝ (or R = ½, ¾ or ¹³⁄₁₆) | R = ¾ (or R = ½, ⅝ or ¹³⁄₁₆) | R = ¹³⁄₁₆ (or R = ½, ⅝ or ¾) |
|---|---|---|---|---|---|
| w6 | 000110 | +1.0283 − 0.2071i | +0.7863 + 0.1337i | +0.1361 − 0.4023i | −1.0997 − 0.5419i |
| w7 | 000111 | +0.8760 − 0.5811i | −0.7863 + 0.1337i | +0.1373 − 0.7043i | −0.7484 − 0.4663i |
| w8 | 001000 | −1.4732 + 0.2920i | +1.4730 − 0.3019i | +1.0501 + 0.1676i | +1.0414 + 0.1712i |
| w9 | 001001 | −1.2487 + 0.8348i | −1.4730 − 0.3019i | +1.4380 + 0.2294i | +0.7230 + 0.1517i |
| w10 | 001010 | −1.4732 − 0.2920i | +1.0895 − 0.2172i | +0.1398 + 0.1309i | +1.0997 + 0.5419i |
| w11 | 001011 | −1.2487 − 0.8348i | −1.0895 − 0.2172i | +0.1680 + 1.0338i | +0.7484 + 0.4663i |
| w12 | 001100 | −1.0283 + 0.2071i | +0.1419 − 0.1122i | +1.0725 + 0.5328i | −1.0414 + 0.1712i |
| w13 | 001101 | −0.8760 + 0.5811i | −0.1419 − 0.1122i | +1.0771 + 0.9315i | −0.7230 + 0.1517i |
| w14 | 001110 | −1.0283 − 0.2071i | +0.1361 − 0.4023i | −1.0997 − 0.5419i | |
| w14 | 001110 | −1.0283 − 0.2071i | +0.7863 + 0.1337i | +0.1361 − 0.4023i | −1.0997 − 0.5419i |
| w15 | 001111 | −0.8760 − 0.5811i | −0.7863 + 0.1337i | +0.1373 + 0.7043i | −0.7484 − 0.4663i |
| w16 | 010000 | +0.2920 + 1.4732i | +1.2124 + 0.8333i | +0.7233 − 0.1496i | +0.1414 − 0.1379i |
| w17 | 010001 | +0.8348 + 1.2487i | −1.2124 + 0.8333i | +0.6220 − 1.1896i | +0.4272 − 0.1421i |
| w18 | 010010 | +0.2920 − 1.4732i | +0.8988 + 0.5768i | +0.4246 − 0.1370i | +0.1440 − 0.4167i |
| w19 | 010011 | +0.8348 − 1.2487i | −0.8988 + 0.5768i | +0.2326 − 1.3986i | +0.4369 − 0.4317i |
| w20 | 010100 | +0.2071 + 1.0283i | +0.3733 + 0.1498i | +0.7267 − 0.4592i | −0.1414 − 0.1379i |
| w21 | 010101 | +0.5811 + 0.8760i | −0.3733 + 0.1498i | +0.6956 − 0.8095i | −0.4272 − 0.1421i |
| w22 | 010110 | +0.2071 − 1.0283i | +0.6394 + 0.3211i | +0.4198 − 0.4151i | −0.1440 − 0.4167i |
| w23 | 010111 | +0.5811 − 0.8760i | −0.6394 + 0.3211i | +0.4114 − 0.7109i | −0.4369 − 0.4317i |
| w24 | 011000 | −0.2920 + 1.4732i | +1.2124 − 0.8333i | +0.7233 + 0.1496i | +0.1414 + 0.1379i |
| w25 | 011001 | −0.8348 + 1.2487i | −1.2124 − 0.8333i | +0.6220 + 1.1896i | +0.4272 + 0.1421i |
| w26 | 011010 | −0.2920 − 1.4732i | +0.8988 − 0.5768i | +0.4246 + 0.1370i | +0.1440 + 0.4167i |
| w27 | 011011 | −0.8348 − 1.2487i | −0.8988 − 0.5768i | +0.2326 + 1.3986i | +0.4369 + 0.4317i |
| w28 | 011100 | −0.2071 + 1.0283i | +0.3733 − 0.1498i | +0.7267 + 0.4592i | −0.1414 + 0.1379i |
| w29 | 011101 | −0.5811 + 0.8760i | −0.3733 − 0.1498i | +0.6956 + 0.8095i | −0.4272 + 0.1421i |
| w30 | 011110 | −0.2071 − 1.0283i | +0.6394 − 0.3211i | +0.4198 + 0.4151i | −0.1440 + 0.4167i |
| w31 | 011111 | −0.5811 − 0.8760i | −0.6394 − 0.3211i | +0.4114 + 0.7109i | −0.4369 + 0.4317i |
| w32 | 100000 | +0.3138 + 0.1393i | +0.2775 + 1.4188i | −1.0501 − 0.1676i | +1.4058 − 0.2115i |
| w33 | 100001 | +0.3094 + 0.1671i | −0.2775 + 1.4188i | −1.4380 − 0.2294i | +0.5981 − 1.1597i |
| w34 | 100010 | +0.3138 − 0.1393i | +0.2177 + 1.0243i | −0.1398 − 0.1309i | +1.0691 − 0.9443i |
| w35 | 100011 | +0.3094 − 0.1671i | −0.2177 + 1.0243i | −0.1680 − 1.0338i | +0.7360 − 0.8042i |
| w36 | 100100 | +0.7004 + 0.1720i | +0.1138 + 0.3999i | −1.0725 − 0.5328i | −1.4058 − 0.2115i |
| w37 | 100101 | +0.6174 + 0.3741i | −0.1138 + 0.3999i | −1.0771 − 0.9315i | −0.5981 − 1.1597i |
| w38 | 100110 | +0.7004 − 0.1720i | +0.1487 + 0.7260i | −0.1361 − 0.4023i | −1.0691 − 0.9443i |
| w39 | 100111 | +0.6174 − 0.3741i | −0.1487 + 0.7260i | −0.1373 + 0.7043i | −0.7360 − 0.8042i |
| w40 | 101000 | −0.3138 + 0.1393i | +0.2775 − 1.4188i | −1.0501 + 0.1676i | +1.4058 + 0.2115i |
| w41 | 101001 | −0.3094 + 0.1671i | −0.2775 − 1.4188i | −1.4380 + 0.2294i | +0.5981 + 1.1597i |
| w42 | 101010 | −0.3138 − 0.1393i | +0.2177 − 1.0243i | −0.1398 + 0.1309i | +1.0691 + 0.9443i |
| w43 | 101011 | −0.3094 − 0.1671i | −0.2177 − 1.0243i | −0.1680 + 1.0338i | +0.7360 + 0.8042i |
| w44 | 101100 | −0.7004 + 0.1720i | +0.1138 − 0.3999i | −1.0725 + 0.5328i | −1.4058 + 0.2115i |
| w45 | 101101 | −0.6174 + 0.3741i | −0.1138 − 0.3999i | −1.0771 + 0.9315i | −0.5981 + 1.1597i |
| w46 | 101110 | −0.7004 − 0.1720i | +0.1487 − 0.7260i | −0.1361 + 0.4023i | −1.0691 + 0.9443i |
| w47 | 101111 | −0.6174 − 0.3741i | −0.1487 − 0.7260i | −0.1373 + 0.7043i | −0.7360 + 0.8042i |
| w48 | 110000 | +0.1393 + 0.3138i | +0.7921 + 1.2096i | −0.7233 − 0.1496i | +0.1695 − 1.0298i |
| w49 | 110001 | +0.1671 + 0.3094i | −0.7921 + 1.2096i | −0.6220 − 1.1896i | +0.2236 − 1.3784i |
| w50 | 110010 | +0.1393 − 0.3138i | +0.6056 + 0.8481i | −0.4246 − 0.1370i | +0.1426 − 0.7102i |
| w51 | 110011 | +0.1671 − 0.3094i | −0.6056 + 0.8481i | −0.2326 − 1.3986i | +0.4351 − 0.7394i |
| w52 | 110100 | +0.1720 + 0.7004i | +0.2891 + 0.3910i | −0.7267 − 0.4592i | −0.1695 − 1.0298i |
| w53 | 110101 | +0.3741 + 0.6174i | −0.2891 + 0.3910i | −0.6956 − 0.8095i | −0.2236 − 1.3784i |
| w54 | 110110 | +0.1720 − 0.7004i | +0.4397 + 0.5853i | −0.4198 − 0.4151i | −0.1426 − 0.7102i |
| w55 | 110111 | +0.3741 − 0.6174i | −0.4397 + 0.5853i | −0.4114 − 0.7109i | −0.4351 − 0.7394i |
| w56 | 111000 | −0.1393 + 0.3138i | +0.7921 − 1.2096i | −0.7233 + 0.1496i | +0.1695 + 1.0298i |
| w57 | 111001 | −0.1671 + 0.3094i | −0.7921 − 1.2096i | −0.6220 + 1.1896i | +0.2236 + 1.3784i |
| w58 | 111010 | −0.1393 − 0.3138i | +0.6056 − 0.8481i | −0.4246 + 0.1370i | +0.1426 + 0.7102i |
| w59 | 111011 | −0.1671 − 0.3094i | −0.6056 − 0.8481i | −0.2326 + 1.3986i | +0.4351 + 0.7394i |
| w60 | 111100 | −0.1720 + 0.7004i | +0.2891 − 0.3910i | −0.7267 + 0.4592i | −0.1695 + 1.0298i |
| w61 | 111101 | −0.3741 + 0.6174i | −0.2891 − 0.3910i | −0.6956 + 0.8095i | −0.2236 + 1.3784i |
| w62 | 111110 | −0.1720 − 0.7004i | +0.4397 − 0.5853i | −0.4198 + 0.4151i | −0.1426 + 0.7102i |
| w63 | 111111 | −0.3741 − 0.6174i | −0.4397 − 0.5853i | −0.4114 + 0.7109i | −0.4351 + 0.7394i |

B4) 128-QAM NUC for R=1/2 (or R=5/8, 3/4 or 13/16):

| w index | bit label | Constellation point |
|---|---|---|
| w0 | 0000000 | +0.7383 − 1.3947i |
| w1 | 0000000 | +0.2726 − 1.6070i |
| w2 | 0000001 | +0.7383 + 1.3947i |
| w3 | 0000001 | +0.2726 + 1.6070i |
| w4 | 0000010 | −0.7383 − 1.3947i |
| w5 | 0000010 | −0.2726 − 1.6070i |
| w6 | 0000011 | −0.7383 + 1.3947i |
| w7 | 0000011 | −0.2726 + 1.6070i |
| w8 | 0000100 | +1.0680 − 1.0753i |
| w9 | 0000100 | +1.0389 − 0.7336i |
| w10 | 0000101 | +1.0680 + 1.0753i |
| w11 | 0000101 | +1.0389 + 0.7336i |
| w12 | 0000110 | −1.0680 − 1.0753i |
| w13 | 0000110 | −1.0389 − 0.7336i |
| w14 | 0000111 | −1.0680 + 1.0753i |
| w15 | 0000111 | −1.0389 + 0.7336i |
| w16 | 0001000 | +0.5286 − 1.0997i |
| w17 | 0001000 | +0.1915 − 1.2689i |

| w index | bit label | Constellation point |
| --- | --- | --- |
| w18 | 0001001 | +0.5286 + 1.0997i |
| w19 | 0001001 | +0.1915 + 1.2689i |
| w20 | 0001010 | −0.5286 − 1.0997i |
| w21 | 0001010 | −0.1915 − 1.2689i |
| w22 | 0001011 | −0.5286 + 1.0997i |
| w23 | 0001011 | −0.1915 + 1.2689i |
| w24 | 0001100 | +0.6878 + 0.8578i |
| w25 | 0001100 | +0.7725 − 0.6723i |
| w26 | 0001101 | +0.6878 + 0.5578i |
| w27 | 0001101 | +0.7725 + 0.6723i |
| w28 | 0001110 | −0.6878 − 0.8578i |
| w29 | 0001110 | −0.7725 − 0.6723i |
| w30 | 0001111 | −0.6878 + 0.8578i |
| w31 | 0001111 | −0.7725 + 0.6723i |
| w32 | 0010000 | +0.1315 − 0.7332i |
| w33 | 0010000 | +0.1038 − 0.7607i |
| w34 | 0010001 | +0.1315 + 0.7332i |
| w35 | 0010001 | +0.1038 + 0.7607i |
| w36 | 0010010 | −0.1315 − 0.7332i |
| w37 | 0010010 | −0.1038 − 0.7607i |
| w38 | 0010011 | −0.1315 + 0.7332i |
| w39 | 0010011 | −0.1038 + 0.7607i |
| w40 | 0010100 | +0.1647 − 0.5388i |
| w41 | 0010100 | +0.1629 − 0.5296i |
| w42 | 0010101 | +0.1647 + 0.5388i |
| w43 | 0010101 | +0.1629 + 0.5296i |
| w44 | 0010110 | −0.1647 − 0.5388i |
| w45 | 0010110 | −0.1629 − 0.5296i |
| w46 | 0010111 | −0.1647 + 0.5388i |
| w47 | 0010111 | −0.1629 + 0.5296i |
| w48 | 0011000 | +0.3255 − 0.9067i |
| w49 | 0011000 | +0.1588 − 1.0122i |
| w50 | 0011001 | +0.3255 + 0.9067i |
| w51 | 0011001 | +0.1588 + 1.0122i |
| w52 | 0011010 | −0.3255 − 0.9067i |
| w53 | 0011010 | −0.1588 − 1.0122i |
| w54 | 0011011 | −0.3255 + 0.9067i |
| w55 | 0011011 | −0.1588 + 1.0122i |
| w56 | 0011100 | +0.4535 − 0.6452i |
| w57 | 0011100 | +0.4645 − 0.5898i |
| w58 | 0011101 | +0.4535 + 0.6452i |
| w59 | 0011101 | +0.4645 + 0.5898i |
| w60 | 0011110 | −0.4535 − 0.6452i |
| w61 | 0011110 | −0.4645 − 0.5898i |
| w62 | 0011111 | −0.4535 + 0.6452i |
| w63 | 0011111 | −0.6545 + 0.5898i |
| w64 | 01000000 | +1.5779 − 0.2230i |
| w65 | 01000001 | +1.2114 − 0.1662i |
| w66 | 01000010 | +1.5779 + 0.2230i |
| w67 | 01000011 | +1.2114 + 0.1662i |
| w68 | 01000100 | −1.5779 − 0.2230i |
| w69 | 01000101 | −1.2114 − 0.1662i |
| w70 | 01000110 | −1.5779 + 0.2230i |
| w71 | 01000111 | −1.2114 + 0.1662i |
| w72 | 01001000 | +1.4915 − 0.6927i |
| w73 | 01001001 | +1.1447 − 0.4719i |
| w74 | 01001010 | +1.4915 + 0.6927i |
| w75 | 01001011 | +1.1447 + 0.4719i |
| w76 | 01001100 | −1.4915 − 0.6927i |
| w77 | 01001101 | −1.1447 − 0.4719i |
| w78 | 01001110 | −1.4915 + 0.6927i |
| w79 | 01001111 | −1.1447 + 0.4719i |
| w80 | 01010000 | +0.7620 − 0.1121i |
| w81 | 01010001 | +0.9103 − 0.1272i |
| w82 | 01010010 | +0.7620 + 0.1121i |
| w83 | 01010011 | +0.9103 + 0.1272i |
| w84 | 01010100 | −0.7620 − 0.1121i |
| w85 | 01010101 | −0.9103 − 0.1272i |
| w86 | 01010110 | −0.7620 + 0.1121i |
| w87 | 01010111 | −0.9103 + 0.1272i |
| w88 | 01011000 | +0.7359 − 0.3230i |
| w89 | 01011001 | +0.8236 − 0.3936i |
| w90 | 01011010 | +0.7359 + 0.3230i |
| w91 | 01011011 | +0.8236 + 0.3936i |
| w92 | 01011100 | −0.7359 − 0.3230i |
| w93 | 01011101 | −0.8236 − 0.3936i |
| w94 | 01011110 | −0.7359 + 0.3230i |
| w95 | 01011111 | −0.8236 + 0.3936i |
| w96 | 01100000 | +0.1461 − 0.1146i |
| w97 | 01100001 | +0.1573 − 0.1142i |
| w98 | 01100010 | +0.1461 + 0.1146i |
| w99 | 01100011 | +0.1573 + 0.1142i |
| w100 | 01100100 | −0.1461 − 0.1146i |
| w101 | 01100101 | −0.1573 − 0.1142i |
| w102 | 01100110 | −0.1461 + 0.1146i |
| w103 | 01100111 | −0.0573 + 0.1142i |
| w104 | 01101000 | +0.1535 − 0.3082i |
| w105 | 01101001 | +0.1629 − 0.3084i |
| w106 | 01101010 | +0.1535 + 0.3082i |
| w107 | 01101011 | +0.1629 + 0.3084i |
| w108 | 01101100 | −0.1535 − 0.3082i |
| w109 | 01101101 | −0.1629 − 0.3084i |
| w110 | 01101110 | −0.1535 + 0.3082i |
| w111 | 01101111 | −0.1629 + 0.3084i |
| w112 | 01110000 | +0.4774 − 0.1074i |
| w113 | 01110001 | +0.4323 − 0.1096i |
| w114 | 01110010 | +0.4774 + 0.1074i |
| w115 | 01110011 | +0.4323 + 0.1096i |
| w116 | 01110100 | −0.4774 − 0.1074i |
| w117 | 01110101 | −0.4323 − 0.1096i |
| w118 | 01110110 | −0.4774 + 0.1074i |
| w119 | 01110111 | −0.4323 + 0.1096i |
| w120 | 01111000 | +0.4853 − 0.3237i |
| w121 | 01111001 | +0.4637 − 0.3425i |
| w122 | 01111010 | +0.4853 + 0.3237i |
| w123 | 01111011 | +0.4637 + 0.3425i |
| w124 | 01111100 | −0.4853 − 0.3237i |
| w125 | 01111101 | −0.4637 − 0.3425i |
| w126 | 01111110 | −0.4853 + 0.3237i |
| w127 | 01111111 | −0.4637 + 0.3425i | for R=5/8 (or R=1/2, 3/4 or 13/16):

| w index | bit label | Constellation point |
| --- | --- | --- |
| w0 | 0000000 | +1.1438 + 0.4323i |
| w1 | 0000000 | +0.1045 + 0.4578i |
| w2 | 0000000 | −1.1438 + 0.4323i |
| w3 | 0000001 | −0.1045 + 0.4578i |
| w4 | 0000010 | +0.9006 + 0.4173i |
| w5 | 0000010 | +0.1067 + 0.3515i |
| w6 | 0000011 | −0.9006 + 0.4173i |
| w7 | 0000011 | −0.1067 + 0.3515i |
| w8 | 0000100 | +1.1598 + 0.1437i |
| w9 | 0000100 | +0.1075 + 0.0988i |
| w10 | 0000101 | −1.1598 + 0.1437i |
| w11 | 0000101 | −0.1075 + 0.0988i |
| w12 | 0000110 | +0.9102 + 0.1324i |
| w13 | 0000110 | +0.1136 + 0.1402i |
| w14 | 0000111 | −0.9102 + 0.1324i |
| w15 | 0000111 | −0.1136 + 0.1402i |
| w16 | 0001000 | +0.5578 + 0.4216i |
| w17 | 0001000 | +0.3411 + 0.4189i |
| w18 | 0001001 | −0.5578 + 0.4216i |
| w19 | 0001001 | −0.3411 + 0.4189i |
| w20 | 0001010 | +0.6797 + 0.3850i |
| w21 | 0001010 | +0.3088 + 0.3456i |
| w22 | 0001011 | −0.6797 + 0.3850i |
| w23 | 0001011 | −0.3088 + 0.3456i |
| w24 | 0001100 | +0.5755 + 0.1222i |
| w25 | 0001100 | +0.3700 + 0.1151i |
| w26 | 0001101 | −0.5755 + 0.1222i |
| w27 | 0001101 | −0.3700 + 0.1151i |
| w28 | 0001110 | +0.6787 + 0.1401i |
| w29 | 0001110 | +0.3294 + 0.1448i |
| w30 | 0001111 | −0.6787 + 0.1401i |
| w31 | 0001111 | −0.3294 + 0.1448i |
| w32 | 0010000 | +1.1837 + 0.8001i |
| w33 | 0010000 | +0.1121 + 0.6749i |
| w34 | 0010001 | −1.1837 + 0.8001i |
| w35 | 0010001 | −0.1121 + 0.6749i |
| w36 | 0010010 | +0.9008 + 0.6972i |

-continued

| w index | bit label | Constellation point |
|---|---|---|
| w37 | 0010010 | +0.1179 + 0.8955i |
| w38 | 0010011 | −0.9008 + 0.6972i |
| w39 | 0010011 | −0.1179 + 0.8955i |
| w40 | 0010100 | +1.4855 + 0.1793i |
| w41 | 0010100 | +0.1933 + 1.4991i |
| w42 | 0010101 | −1.4855 + 0.1793i |
| w43 | 0010101 | −0.1933 + 1.4991i |
| w44 | 0010110 | +1.5681 + 0.5636i |
| w45 | 0010110 | +0.1440 + 1.1691i |
| w46 | 0010111 | −1.5681 + 0.5636i |
| w47 | 0010111 | −0.1440 + 1.1691i |
| w48 | 0011000 | +0.5354 + 0.6351i |
| w49 | 0011000 | +0.3342 + 0.6628i |
| w50 | 0011001 | −0.5354 + 0.6351i |
| w51 | 0011001 | −0.3342 + 0.6628i |
| w52 | 0011010 | +0.6549 + 0.7546i |
| w53 | 0011010 | +0.3585 + 0.8699i |
| w54 | 0011011 | −0.6549 + 0.7546i |
| w55 | 0011011 | −0.3585 + 0.8699i |
| w56 | 0011100 | +0.9727 + 1.2109i |
| w57 | 0011100 | +0.5835 + 1.4250i |
| w58 | 0011101 | −0.9727 + 1.2109i |
| w59 | 0011101 | −0.5835 + 1.4250i |
| w60 | 0011110 | +0.7102 + 1.0171i |
| w61 | 0011110 | +0.4344 + 1.1140i |
| w62 | 0011111 | −0.7102 + 1.0171i |
| w63 | 0011111 | −0.4344 + 1.1140i |
| w64 | 01000000 | +1.1438 − 0.4323i |
| w65 | 01000001 | +0.1045 − 0.4578i |
| w66 | 01000010 | −1.1438 − 0.4323i |
| w67 | 01000011 | −0.1045 − 0.4578i |
| w68 | 01000100 | +0.9006 − 0.4173i |
| w69 | 01000101 | +0.1067 − 0.3515i |
| w70 | 01000110 | −0.9006 − 0.4173i |
| w71 | 01000111 | −0.1067 − 0.3515i |
| w72 | 01001000 | +1.1598 − 0.1437i |
| w73 | 01001001 | +0.1075 − 0.0988i |
| w74 | 01001010 | −1.1598 − 0.1437i |
| w75 | 01001011 | −0.1075 − 0.0988i |
| w76 | 01001100 | +0.9102 − 0.1324i |
| w77 | 01001101 | +0.1136 − 0.1402i |
| w78 | 01001110 | −0.9102 − 0.1324i |
| w79 | 01001111 | −0.1136 − 0.1402i |
| w80 | 01010000 | +0.5578 − 0.4216i |
| w81 | 01010001 | +0.3411 − 0.4189i |
| w82 | 01010010 | −0.5578 − 0.4216i |
| w83 | 01010011 | −0.3411 − 0.4189i |
| w84 | 01010100 | +0.6797 − 0.3850i |
| w85 | 01010101 | +0.3088 − 0.3456i |
| w86 | 01010110 | −0.6797 − 0.3850i |
| w87 | 01010111 | −0.3088 − 0.3456i |
| w88 | 01011000 | +0.5755 − 0.1222i |
| w89 | 01011001 | +0.3700 − 0.1151i |
| w90 | 01011010 | −0.5755 − 0.1222i |
| w91 | 01011011 | −0.3700 − 0.1151i |
| w92 | 01011100 | +0.6787 − 0.1401i |
| w93 | 01011101 | +0.3294 − 0.1448i |
| w94 | 01011110 | −0.6787 − 0.1401i |
| w95 | 01011111 | −0.3294 − 0.1448i |
| w96 | 01100000 | +1.1837 − 0.8001i |
| w97 | 01100001 | +0.1121 − 0.6749i |
| w98 | 01100010 | −1.1837 − 0.8001i |
| w99 | 01100011 | −0.1121 − 0.6749i |
| w100 | 01100100 | +0.9008 − 0.6972i |
| w101 | 01100101 | +0.1179 − 0.8955i |
| w102 | 01100110 | −0.9008 − 0.6972i |
| w103 | 01100111 | −0.1179 − 0.8955i |
| w104 | 01101000 | +1.4855 − 0.1793i |
| w105 | 01101001 | +0.1933 − 1.4991i |
| w106 | 01101010 | −1.4855 − 0.1793i |
| w107 | 01101011 | −0.1933 − 1.4991i |
| w108 | 01101100 | +1.5681 − 0.5636i |
| w109 | 01101101 | +0.1440 − 1.1691i |
| w110 | 01101110 | −1.5681 − 0.5636i |
| w111 | 01101111 | −0.1440 − 1.1691i |
| w112 | 01110000 | +0.5354 − 0.6351i |
| w113 | 01110001 | +0.3342 − 0.6628i |
| w114 | 01110010 | −0.5354 − 0.6351i |
| w115 | 01110011 | −0.3342 − 0.6628i |
| w116 | 01110100 | +0.6549 − 0.7546i |
| w117 | 01110101 | +0.3585 − 0.8699i |
| w118 | 01110110 | −0.6549 − 0.7546i |
| w119 | 01110111 | −0.3585 − 0.8699i |
| w120 | 01111000 | +0.9727 − 1.2109i |
| w121 | 01111001 | +0.5835 − 1.4250i |
| w122 | 01111010 | −0.9727 − 1.2109i |
| w123 | 01111011 | −0.5835 − 1.4250i |
| w124 | 01111100 | +0.7102 − 1.0171i |
| w125 | 01111101 | +0.4344 − 1.1140i |
| w126 | 01111110 | −0.7102 − 1.0171i |
| w127 | 01111111 | −0.4344 − 1.1140i | for R=3/4 (or R=1/2, 5/8 or 13/16):

| w index | bit label | Constellation point |
|---|---|---|
| w0 | 0000000 | +1.0837 + 0.3878i |
| w1 | 0000000 | +0.5568 + 0.5351i |
| w2 | 0000001 | +1.0837 − 0.3878i |
| w3 | 0000001 | +0.5568 − 0.5351i |
| w4 | 0000010 | +0.8372 + 0.4015i |
| w5 | 0000010 | +0.5992 + 0.3732i |
| w6 | 0000011 | +0.8372 − 0.4015i |
| w7 | 0000011 | +0.5992 − 0.3732i |
| w8 | 0000100 | +1.1795 + 0.6737i |
| w9 | 0000100 | +0.5823 + 0.7120i |
| w10 | 0000101 | +1.1795 − 0.6737i |
| w11 | 0000101 | +0.5823 − 0.7120i |
| w12 | 0000110 | +0.8934 + 0.6718i |
| w13 | 0000110 | +0.7091 + 0.8942i |
| w14 | 0000111 | +0.8934 − 0.6718i |
| w15 | 0000111 | +0.7091 − 0.8942i |
| w16 | 0001000 | +0.1125 + 0.5652i |
| w17 | 0001000 | +0.3356 + 0.5485i |
| w18 | 0001001 | +0.1125 − 0.5652i |
| w19 | 0001001 | +0.3356 − 0.5485i |
| w20 | 0001010 | +0.1063 + 0.3959i |
| w21 | 0001010 | +0.3354 + 0.3801i |
| w22 | 0001011 | +0.1063 − 0.3959i |
| w23 | 0001011 | +0.3354 − 0.3801i |
| w24 | 0001100 | +0.1174 + 0.7565i |
| w25 | 0001100 | +0.3498 + 0.7450i |
| w26 | 0001101 | +0.1174 − 0.7565i |
| w27 | 0001101 | +0.3498 − 0.7450i |
| w28 | 0001110 | +0.1285 + 0.9672i |
| w29 | 0001110 | +0.3973 + 0.9520i |
| w30 | 0001111 | +0.1285 − 0.9672i |
| w31 | 0001111 | +0.3973 − 0.9520i |
| w32 | 0010000 | −1.0837 + 0.3878i |
| w33 | 0010000 | −0.5568 + 0.5351i |
| w34 | 0010001 | −1.0837 − 0.3878i |
| w35 | 0010001 | −0.5568 − 0.5351i |
| w36 | 0010010 | −0.8372 + 0.4015i |
| w37 | 0010010 | −0.5992 + 0.3732i |
| w38 | 0010011 | −0.8372 − 0.4015i |
| w39 | 0010011 | −0.5992 − 0.3732i |
| w40 | 0010100 | −1.1795 + 0.6737i |
| w41 | 0010100 | −0.5823 + 0.7120i |
| w42 | 0010101 | −1.1795 − 0.6737i |
| w43 | 0010101 | −0.5823 − 0.7120i |
| w44 | 0010110 | −0.8934 + 0.6718i |
| w45 | 0010110 | −0.7091 + 0.8942i |
| w46 | 0010111 | −0.8934 − 0.6718i |
| w47 | 0010111 | −0.7091 − 0.8942i |
| w48 | 0011000 | −0.1125 + 0.5652i |
| w49 | 0011000 | −0.3356 + 0.5485i |
| w50 | 0011001 | −0.1125 − 0.5652i |
| w51 | 0011001 | −0.3356 − 0.5485i |
| w52 | 0011010 | −0.1063 + 0.3959i |
| w53 | 0011010 | −0.3354 + 0.3801i |
| w54 | 0011011 | −0.1063 − 0.3959i |
| w55 | 0011011 | −0.3354 − 0.3801i |

| w index | bit label | Constellation point |
|---|---|---|
| w56 | 0011100 | −0.1174 + 0.7565i |
| w57 | 0011100 | −0.3498 + 0.7450i |
| w58 | 0011101 | −0.1174 + 0.7565i |
| w59 | 0011101 | −0.3498 − 0.7450i |
| w60 | 0011110 | −0.1285 + 0.9672i |
| w61 | 0011110 | −0.3973 + 0.9520i |
| w62 | 0011111 | −0.1285 − 0.9672i |
| w63 | 0011111 | −0.3973 − 0.9520i |
| w64 | 01000000 | +1.0605 + 0.1271i |
| w65 | 01000001 | +0.5216 + 0.0747i |
| w66 | 01000010 | +1.0605 − 0.1271i |
| w67 | 01000011 | +0.5216 − 0.0747i |
| w68 | 01000100 | +0.8209 + 0.1292i |
| w69 | 01000101 | +0.6018 + 0.1929i |
| w70 | 01000110 | +0.8209 − 0.1292i |
| w71 | 01000111 | +0.6018 − 0.1929i |
| w72 | 01001000 | +1.3525 + 0.1471i |
| w73 | 01001001 | +1.0702 + 1.0357i |
| w74 | 01001010 | +1.3525 − 0.1471i |
| w75 | 01001011 | +1.0702 − 1.0357i |
| w76 | 01001100 | +1.4799 + 0.4422i |
| w77 | 01001101 | +0.7653 + 1.1720i |
| w78 | 01001110 | +1.4799 − 0.4422i |
| w79 | 01001111 | +0.7653 − 1.1720i |
| w80 | 01010000 | +0.1054 + 0.0790i |
| w81 | 01010001 | +0.3169 + 0.0841i |
| w82 | 01010010 | +0.1054 − 0.0790i |
| w83 | 01010011 | +0.3169 − 0.0841i |
| w84 | 01010100 | +0.1042 + 0.2345i |
| w85 | 01010101 | +0.3223 + 0.2346i |
| w86 | 01010110 | +0.1042 − 0.2345i |
| w87 | 01010111 | +0.3223 − 0.2346i |
| w88 | 01011000 | +0.1687 + 1.4929i |
| w89 | 01011001 | +0.5173 + 1.4708i |
| w90 | 01011010 | +0.1687 − 1.4929i |
| w91 | 01011011 | +0.5173 − 1.4708i |
| w92 | 01011100 | +0.1455 + 1.2047i |
| w93 | 01011101 | +0.4442 + 1.1814i |
| w94 | 01011110 | +0.1455 − 1.2047i |
| w95 | 01011111 | +0.4442 − 1.1814i |
| w96 | 01100000 | −1.0605 + 0.1271i |
| w97 | 01100001 | −0.5216 + 0.0747i |
| w98 | 01100010 | −1.0605 − 0.1271i |
| w99 | 01100011 | −0.5216 − 0.0747i |
| w100 | 01100100 | −0.8209 + 0.1292i |
| w101 | 01100101 | −0.6018 + 0.1929i |
| w102 | 01100110 | −0.8209 − 0.1292i |
| w103 | 01100111 | −0.6018 − 0.1929i |
| w104 | 01101000 | −1.3525 + 0.1471i |
| w105 | 01101001 | −1.0702 + 1.0357i |
| w106 | 01101010 | −1.3525 − 0.1471i |
| w107 | 01101011 | −1.0702 − 1.0357i |
| w108 | 01101100 | −1.4799 + 0.4422i |
| w109 | 01101101 | −0.7653 + 1.1720i |
| w110 | 01101110 | −1.4799 − 0.4422i |
| w111 | 01101111 | −0.7653 − 1.1720i |
| w112 | 01110000 | −0.1054 + 0.0790i |
| w113 | 01110001 | −0.3169 + 0.0841i |
| w114 | 01110010 | −0.1054 − 0.0790i |
| w115 | 01110011 | −0.3169 − 0.0841i |
| w116 | 01110100 | −0.1042 + 0.2345i |
| w117 | 01110101 | −0.3223 + 0.2346i |
| w118 | 01110110 | −0.1042 − 0.2345i |
| w119 | 01110111 | −0.3223 − 0.2346i |
| w120 | 01111000 | −0.1687 + 1.4929i |
| w121 | 01111001 | −0.5173 + 1.4708i |
| w122 | 01111010 | −0.1687 − 1.4929i |
| w123 | 01111011 | −0.5173 − 1.4708i |
| w124 | 01111100 | −0.1455 + 1.2047i |
| w125 | 01111101 | −0.4442 + 1.1814i |
| w126 | 01111110 | −0.1455 − 1.2047i |
| w127 | 01111111 | −0.4442 − 1.1814i | for R=13/16 (or R=1/2, 5/8 or 3/4):

| w index | bit label | Constellation point |
|---|---|---|
| w0 | 0000000 | +1.0422 + 0.3376i |
| w1 | 0000000 | −1.0422 + 0.3376i |
| w2 | 0000001 | +1.0422 − 0.3376i |
| w3 | 0000001 | −1.0422 − 0.3376i |
| w4 | 0000010 | +0.1125 + 0.6269i |
| w5 | 0000010 | −0.1125 + 0.6269i |
| w6 | 0000011 | +0.1125 − 0.6269i |
| w7 | 0000011 | −0.1125 − 0.6269i |
| w8 | 0000100 | +1.0010 + 0.1105i |
| w9 | 0000100 | −1.0010 + 0.1105i |
| w10 | 0000101 | +1.0010 − 0.1105i |
| w11 | 0000101 | −1.0010 − 0.1105i |
| w12 | 0000110 | +0.0978 + 0.0913i |
| w13 | 0000110 | −0.0978 + 0.0913i |
| w14 | 0000111 | +0.0978 − 0.0913i |
| w15 | 0000111 | −0.0978 − 0.0913i |
| w16 | 0001000 | +0.7966 + 0.3496i |
| w17 | 0001000 | −0.7966 + 0.3496i |
| w18 | 0001001 | +0.7966 − 0.3496i |
| w19 | 0001001 | −0.7966 − 0.3496i |
| w20 | 0001010 | +0.1109 + 0.4454i |
| w21 | 0001010 | −0.1109 + 0.4454i |
| w22 | 0001011 | +0.1109 − 0.4454i |
| w23 | 0001011 | −0.1109 − 0.4454i |
| w24 | 0001100 | +0.7613 + 0.1187i |
| w25 | 0001100 | −0.7613 + 0.1187i |
| w26 | 0001101 | +0.7613 − 0.1187i |
| w27 | 0001101 | −0.7613 − 0.1187i |
| w28 | 0001110 | +0.1038 + 0.2705i |
| w29 | 0001110 | −0.1038 + 0.2705i |
| w30 | 0001111 | +0.1038 − 0.2705i |
| w31 | 0001111 | −0.1038 − 0.2705i |
| w32 | 0010000 | +0.5556 + 0.6306i |
| w33 | 0010000 | −0.5556 + 0.6306i |
| w34 | 0010001 | +0.5556 − 0.6306i |
| w35 | 0010001 | −0.5556 − 0.6306i |
| w36 | 0010010 | +0.3351 + 0.6308i |
| w37 | 0010010 | −0.3351 + 0.6308i |
| w38 | 0010011 | +0.3351 − 0.6308i |
| w39 | 0010011 | −0.3351 − 0.6308i |
| w40 | 0010100 | +0.4942 + 0.0780i |
| w41 | 0010100 | −0.4942 + 0.0780i |
| w42 | 0010101 | +0.4942 − 0.0780i |
| w43 | 0010101 | −0.4942 − 0.0780i |
| w44 | 0010110 | +0.2935 + 0.0906i |
| w45 | 0010110 | −0.2935 + 0.0906i |
| w46 | 0010111 | +0.2935 − 0.0906i |
| w47 | 0010111 | −0.2935 − 0.0906i |
| w48 | 0011000 | +0.5761 + 0.4286i |
| w49 | 0011000 | −0.5761 + 0.4286i |
| w50 | 0011001 | +0.5761 − 0.4286i |
| w51 | 0011001 | −0.5761 − 0.4286i |
| w52 | 0011010 | +0.3383 + 0.4404i |
| w53 | 0011010 | −0.3383 + 0.4404i |
| w54 | 0011011 | +0.3383 − 0.4404i |
| w55 | 0011011 | −0.3383 − 0.4044i |
| w56 | 0011100 | +0.5456 + 0.2367i |
| w57 | 0011100 | −0.5456 + 0.2367i |
| w58 | 0011101 | +0.5456 − 0.2367i |
| w59 | 0011101 | −0.5456 − 0.2367i |
| w60 | 0011110 | +0.3172 + 0.2666i |
| w61 | 0011110 | −0.3172 + 0.2666i |
| w62 | 0011111 | +0.3172 − 0.2666i |
| w63 | 0011111 | −0.3172 − 0.2666i |
| w64 | 01000000 | +1.1154 + 0.5839i |
| w65 | 01000001 | −1.1154 + 0.5839i |
| w66 | 01000010 | +1.1154 − 0.5839i |
| w67 | 01000011 | −1.1154 − 0.5839i |
| w68 | 01000100 | +0.1155 + 0.8217i |
| w69 | 01000101 | −0.1155 + 0.8217i |
| w70 | 01000110 | +0.1155 − 0.8217i |
| w71 | 01000111 | −0.1155 − 0.8217i |
| w72 | 01001000 | +1.2844 + 0.1345i |
| w73 | 01001001 | −1.2844 + 0.1345i |
| w74 | 01001010 | +1.2844 − 0.1345i |
| w75 | 01001011 | −1.2844 − 0.1345i |

-continued

| w index | bit label | Constellation point |
|---|---|---|
| w76 | 01001100 | +0.1646 + 1.5274i |
| w77 | 01001101 | −0.1646 + 1.5274i |
| w78 | 01001110 | +0.1646 − 1.5274i |
| w79 | 01001111 | −0.1646 − 1.5274i |
| w80 | 01010000 | +0.8563 + 0.5705i |
| w81 | 01010001 | −0.8563 + 0.5705i |
| w82 | 01010010 | +0.8563 − 0.5705i |
| w83 | 01010011 | −0.8563 − 0.5705i |
| w84 | 01010100 | +0.1239 + 1.0311i |
| w85 | 01010101 | −0.1239 + 1.0311i |
| w86 | 01010110 | +0.1239 − 1.0311i |
| w87 | 01010111 | −0.1239 − 1.0311i |
| w88 | 01011000 | +1.4001 + 0.4092i |
| w89 | 01011001 | −1.4001 + 0.4092i |
| w90 | 01011010 | +1.4001 − 0.4092i |
| w91 | 01011011 | −1.4001 − 0.4092i |
| w92 | 01011100 | +0.1345 + 1.2611i |
| w93 | 01011101 | −0.1345 + 1.2611i |
| w94 | 01011110 | +0.1345 − 1.2611i |
| w95 | 01011111 | −0.1345 − 1.2611i |
| w96 | 01100000 | +0.5970 + 0.8482i |
| w97 | 01100001 | −0.5970 + 0.8482i |
| w98 | 01100010 | +0.5970 − 0.8482i |
| w99 | 01100011 | −0.5970 − 0.8482i |
| w100 | 01100100 | +0.3510 + 0.8405i |
| w101 | 01100101 | −0.3510 + 0.8405i |
| w102 | 01100110 | +0.3510 − 0.8405i |
| w103 | 01100111 | −0.3510 − 0.8405i |
| w104 | 01101000 | +1.1670 + 0.8997i |
| w105 | 01101001 | −1.1670 + 0.8997i |
| w106 | 01101010 | +1.1670 − 0.8997i |
| w107 | 01101011 | −1.1670 − 0.8997i |
| w108 | 01101100 | +0.4543 + 1.3933i |
| w109 | 01101101 | −0.4543 + 1.3933i |
| w110 | 01101110 | +0.4543 − 1.3933i |
| w111 | 01101111 | −0.4543 − 1.3933i |
| w112 | 01110000 | +0.8378 + 0.8041i |
| w113 | 01110001 | −0.8378 + 0.8041i |
| w114 | 01110010 | +0.8378 − 0.8041i |
| w115 | 01110011 | −0.8378 − 0.8041i |
| w116 | 01110100 | +0.3850 + 1.0724i |
| w117 | 01110101 | −0.3850 + 1.0724i |
| w118 | 01110110 | +0.3850 − 1.0724i |
| w119 | 01110111 | −0.3850 − 1.0724i |
| w120 | 01111000 | +0.9031 + 1.0698i |
| w121 | 01111001 | −0.9031 + 1.0698i |
| w122 | 01111010 | +0.9031 − 1.0698i |
| w123 | 01111011 | −0.9031 − 1.0698i |
| w124 | 01111100 | +0.6436 + 1.1770i |
| w125 | 01111101 | −0.6436 + 1.1770i |
| w126 | 01111110 | +0.6436 − 1.1770i |
| w127 | 01111111 | −0.6436 − 1.1770i |

B5) 256-QAM NUC for R=1/2 (or R=5/8, 3/4 or 13/16):

| w index | bit label | Constellation point |
|---|---|---|
| w0 | 0000000 | −1.2901 + 1.0495i |
| w1 | 0000000 | −1.6350 + 0.1593i |
| w2 | 0000001 | −0.2844 + 0.1296i |
| w3 | 0000001 | −0.3237 + 0.0849i |
| w4 | 0000010 | −1.4625 + 0.7740i |
| w5 | 0000010 | −1.5776 + 0.4735i |
| w6 | 0000011 | −0.2853 + 0.1309i |
| w7 | 0000011 | −0.3228 + 0.0867i |
| w8 | 0000100 | +1.2901 + 1.0495i |
| w9 | 0000100 | +1.6350 + 0.1593i |
| w10 | 0000101 | +0.2844 + 0.1296i |
| w11 | 0000101 | +0.3237 + 0.0849i |
| w12 | 0000110 | +1.4625 + 0.7740i |
| w13 | 0000110 | +1.5776 + 0.4735i |
| w14 | 0000111 | +0.2853 + 0.1309i |
| w15 | 0000111 | +0.3228 + 0.0867i |
| w16 | 0001000 | −0.7273 + 0.6160i |
| w17 | 0001000 | −0.9430 + 0.1100i |
| w18 | 0001001 | −0.5902 + 0.4857i |
| w19 | 0001001 | −0.7502 + 0.1138i |
| w20 | 0001010 | −0.8177 + 0.4841i |
| w21 | 0001010 | −0.9069 + 0.2829i |
| w22 | 0001011 | −0.6355 + 0.4185i |
| w23 | 0001011 | −0.7325 + 0.2088i |
| w24 | 0001100 | +0.7273 + 0.6160i |
| w25 | 0001100 | +0.9430 + 0.1100i |
| w26 | 0001101 | +0.5902 + 0.4857i |
| w27 | 0001101 | +0.7502 + 0.1138i |
| w28 | 0001110 | +0.8177 + 0.4841i |
| w29 | 0001110 | +0.9069 + 0.2829i |
| w30 | 0001111 | +0.6355 + 0.4185i |
| w31 | 0001111 | +0.7325 + 0.2088i |
| w32 | 0010000 | −1.0646 + 1.2876i |
| w33 | 0010000 | −0.1658 + 1.6747i |
| w34 | 0010001 | −0.1053 + 0.1494i |
| w35 | 0010001 | −0.0872 + 0.1390i |
| w36 | 0010010 | −0.7949 + 1.4772i |
| w37 | 0010010 | −0.4907 + 1.6084i |
| w38 | 0010011 | −0.1052 + 0.1495i |
| w39 | 0010011 | −0.0871 + 0.1392i |
| w40 | 0010100 | +1.0645 + 1.2876i |
| w41 | 0010100 | +0.1658 + 1.6747i |
| w42 | 0010101 | +0.1053 + 0.1494i |
| w43 | 0010101 | +0.0872 + 0.1390i |
| w44 | 0010110 | +0.7949 + 1.4772i |
| w45 | 0010110 | +0.4907 + 1.6084i |
| w46 | 0010111 | +0.1052 + 0.1495i |
| w47 | 0010111 | +0.0871 + 0.1392i |
| w48 | 0011000 | −0.5707 + 0.7662i |
| w49 | 0011000 | −0.1088 + 0.9530i |
| w50 | 0011001 | −0.4294 + 0.6363i |
| w51 | 0011001 | −0.1091 + 0.7656i |
| w52 | 0011010 | −0.4490 + 0.8461i |
| w53 | 0011010 | −0.2464 + 0.9270i |
| w54 | 0011011 | −0.3744 + 0.6744i |
| w55 | 0011011 | −0.1699 + 0.7537i |
| w56 | 0011100 | +0.5707 + 0.7662i |
| w57 | 0011100 | +0.1088 + 0.9530i |
| w58 | 0011101 | +0.4294 + 0.6363i |
| w59 | 0011101 | +0.1091 + 0.7656i |
| w60 | 0011110 | +0.4490 + 0.8461i |
| w61 | 0011110 | +0.2464 + 0.9270i |
| w62 | 0011111 | +0.3744 + 0.6744i |
| w63 | 0011111 | +0.1699 + 0.7537i |
| w64 | 01000000 | −1.0382 + 0.8623i |
| w65 | 01000001 | −1.3225 + 0.1320i |
| w66 | 01000010 | −0.3734 + 0.2560i |
| w67 | 01000011 | −0.4582 + 0.1123i |
| w68 | 01000100 | −1.1794 + 0.6376i |
| w69 | 01000101 | −1.2742 + 0.3922i |
| w70 | 01000110 | −0.3799 + 0.2517i |
| w71 | 01000111 | −0.4545 + 0.1251i |
| w72 | 01001000 | +1.0382 + 0.8623i |
| w73 | 01001001 | +1.3225 + 0.1320i |
| w74 | 01001010 | +0.3734 + 0.2560i |
| w75 | 01001011 | +0.4582 + 0.1123i |
| w76 | 01001100 | +1.1794 + 0.6376i |
| w77 | 01001101 | +1.2742 + 0.3922i |
| w78 | 01001110 | +0.3799 + 0.2517i |
| w79 | 01001111 | +0.4545 + 0.1251i |
| w80 | 01010000 | −0.8504 + 0.7217i |
| w81 | 01010001 | −1.0854 + 0.1139i |
| w82 | 01010010 | −0.4968 + 0.3947i |
| w83 | 01010011 | −0.6473 + 0.1138i |
| w84 | 01010100 | −0.9638 + 0.5407i |
| w85 | 01010101 | −1.0441 + 0.3296i |
| w86 | 01010110 | −0.5231 + 0.3644i |
| w87 | 01010111 | −0.6339 + 0.1702i |
| w88 | 01011000 | +0.8504 + 0.7217i |
| w89 | 01011001 | +1.0854 + 0.1139i |
| w90 | 01011010 | +0.4968 + 0.3947i |
| w91 | 01011011 | +0.6473 + 0.1138i |
| w92 | 01011100 | +0.9638 + 0.5407i |
| w93 | 01011101 | +1.0441 + 0.3296i |

| w index | bit label | Constellation point |
|---|---|---|
| w94 | 01011110 | +0.5231 + 0.3644i |
| w95 | 01011111 | +0.6339 + 0.1702i |
| w96 | 01100000 | −0.8555 + 1.0542i |
| w97 | 01100001 | −0.1322 + 1.3631i |
| w98 | 01100010 | −0.1938 + 0.3621i |
| w99 | 01100011 | −0.0928 + 0.3970i |
| w100 | 01100100 | −0.6363 + 1.2064i |
| w101 | 01100101 | −0.3929 + 1.3102i |
| w102 | 01100110 | −0.1909 + 0.3627i |
| w103 | 01100111 | −0.0937 + 0.3973i |
| w104 | 01101000 | +0.8555 + 1.0542i |
| w105 | 01101001 | +0.1322 + 1.3531i |
| w106 | 01101010 | +0.1938 + 0.3621i |
| w107 | 01101011 | +0.0928 + 0.3970i |
| w108 | 01101100 | +0.6363 + 1.2064i |
| w109 | 01101101 | +0.3929 + 1.3102i |
| w110 | 01101110 | +0.1909 + 0.3627i |
| w111 | 01101111 | +0.0937 + 0.3973i |
| w112 | 01110000 | −0.6961 + 0.8850i |
| w113 | 01110001 | −0.1124 + 1.1327i |
| w114 | 01110010 | −0.3224 + 0.5236i |
| w115 | 01110011 | −0.1054 + 0.5979i |
| w116 | 01110100 | −0.5229 + 1.0037i |
| w117 | 01110101 | −0.3160 + 1.0913i |
| w118 | 01110110 | −0.3016 + 0.5347i |
| w119 | 01110111 | −0.1230 + 0.5949i |
| w120 | 01111000 | +0.6961 + 0.8850i |
| w121 | 01111001 | +0.1124 + 1.1327i |
| w122 | 01111010 | +0.3224 + 0.5236i |
| w123 | 01111011 | +0.1054 + 0.5979i |
| w124 | 01111100 | +0.5229 + 1.0337i |
| w125 | 01111101 | +0.3160 + 1.0913i |
| w126 | 01111110 | +0.3016 + 0.5347i |
| w127 | 01111111 | +0.1230 + 0.5949i |
| w128 | 10000000 | −1.2901 − 1.0495i |
| w129 | 10000001 | −1.6350 − 0.1593i |
| w130 | 10000010 | −0.2844 − 0.1296i |
| w131 | 10000011 | −0.3237 − 0.0849i |
| w132 | 10000100 | −1.4625 − 0.7740i |
| w133 | 10000101 | −1.5776 − 0.4735i |
| w134 | 10000110 | −0.2853 − 0.1309i |
| w135 | 10000111 | −0.3228 − 0.0867i |
| w136 | 10001000 | +1.2901 − 1.0495i |
| w137 | 10001001 | +1.6350 − 0.1593i |
| w138 | 10001010 | +0.2844 − 0.1296i |
| w139 | 10001011 | +0.3237 − 0.0849i |
| w140 | 10001100 | +1.4625 − 0.7740i |
| w141 | 10001101 | +1.5776 − 0.4735i |
| w142 | 10001110 | +0.2853 − 0.1309i |
| w143 | 10001111 | +0.3228 − 0.0867i |
| w144 | 10010000 | −0.7273 − 0.6160i |
| w145 | 10010001 | −0.9430 − 0.1100i |
| w146 | 10010010 | −0.5902 − 0.4857i |
| w147 | 10010011 | −0.7502 − 0.1138i |
| w148 | 10010100 | −0.8177 − 0.4841i |
| w149 | 10010101 | −0.9069 − 0.2829i |
| w150 | 10010110 | −0.6355 − 0.4185i |
| w151 | 10010111 | −0.7325 − 0.2088i |
| w152 | 10011000 | +0.7273 − 0.6160i |
| w153 | 10011001 | +0.9430 − 0.1100i |
| w154 | 10011010 | +0.5902 − 0.4857i |
| w155 | 10011011 | +0.7502 − 0.1138i |
| w156 | 10011100 | +0.8177 − 0.4841i |
| w157 | 10011101 | +0.9069 − 0.2829i |
| w158 | 10011110 | +0.6355 − 0.4185i |
| w159 | 10011111 | +0.7325 − 0.2088i |
| w160 | 10100000 | −1.0646 − 1.2876i |
| w161 | 10100001 | −0.1658 − 1.6747i |
| w162 | 10100010 | −0.1053 − 0.1494i |
| w163 | 10100011 | −0.0872 − 0.1390i |
| w164 | 10100100 | −0.7949 − 1.4772i |
| w165 | 10100101 | −0.4907 − 1.6084i |
| w166 | 10100110 | −0.1052 − 0.1495i |
| w167 | 10100111 | −0.0871 − 0.1392i |
| w168 | 10101000 | +1.0646 − 1.2876i |
| w169 | 10101001 | +0.1658 − 1.6747i |
| w170 | 10101010 | +0.1053 − 0.1494i |
| w171 | 10101011 | +0.0872 − 0.1390i |
| w172 | 10101100 | +0.7949 − 1.4772i |
| w173 | 10101101 | +0.4907 − 1.6084i |
| w174 | 10101110 | +0.1052 − 0.1495i |
| w175 | 10101111 | +0.0871 − 0.1392i |
| w176 | 10110000 | −0.5707 − 0.7662i |
| w177 | 10110001 | −0.1088 − 0.9530i |
| w178 | 10110010 | −0.4294 − 0.6363i |
| w179 | 10110011 | −0.1091 − 0.7656i |
| w180 | 10110100 | −0.4490 − 0.8461i |
| w181 | 10110101 | −0.2454 − 0.9270i |
| w182 | 10110110 | −0.3744 − 0.6744i |
| w183 | 10110111 | −0.1699 − 0.7537i |
| w184 | 10111000 | +0.5707 − 0.7662i |
| w185 | 10111001 | +0.1088 − 0.9530i |
| w186 | 10111010 | +0.4294 − 0.6363i |
| w187 | 10111011 | +0.1091 − 0.7656i |
| w188 | 10111100 | +0.4490 − 0.8461i |
| w189 | 10111101 | +0.2464 − 0.9270i |
| w190 | 10111110 | +0.3744 − 0.6744i |
| w191 | 10111111 | +0.1699 − 0.7537i |
| w192 | 11000000 | −1.0382 − 0.8623i |
| w193 | 11000001 | −1.3225 − 0.1320i |
| w194 | 11000010 | −0.3734 − 0.2560i |
| w195 | 11000011 | −0.4582 − 0.1123i |
| w196 | 11000100 | −1.1794 − 0.6376i |
| w197 | 11000101 | −1.2742 − 0.3922i |
| w198 | 11000110 | −0.3799 − 0.2517i |
| w199 | 11000111 | −0.4545 − 0.1251i |
| w200 | 11001000 | +1.0382 − 0.8623i |
| w201 | 11001001 | +1.3225 − 0.1320i |
| w202 | 11001010 | +0.3734 − 0.2560i |
| w203 | 11001011 | +0.4582 − 0.1123i |
| w204 | 11001100 | +1.1794 − 0.6376i |
| w205 | 11001101 | +1.2742 − 0.3922i |
| w206 | 11001110 | +0.3799 − 0.2517i |
| w207 | 11001111 | +0.4545 − 0.1251i |
| w208 | 11010000 | −0.8504 − 0.7217i |
| w209 | 11010001 | −1.0854 − 0.1139i |
| w210 | 11010010 | −0.4968 − 0.3947i |
| w211 | 11010011 | −0.6473 − 0.1138i |
| w212 | 11010100 | −0.9638 − 0.5407i |
| w213 | 11010101 | −1.0441 − 0.3296i |
| w214 | 11010110 | −0.5231 − 0.3644i |
| w215 | 11010111 | −0.6339 − 0.1702i |
| w216 | 11011000 | +0.8504 − 0.7217i |
| w217 | 11011001 | +1.0854 − 0.1139i |
| w218 | 11011010 | +0.4968 − 0.3947i |
| w219 | 11011011 | +0.6473 − 0.1138i |
| w220 | 11011100 | +0.9638 − 0.5407i |
| w221 | 11011101 | +1.0441 − 0.3296i |
| w222 | 11011110 | +0.5231 − 0.3644i |
| w223 | 11011111 | +0.6339 − 0.1702i |
| w224 | 11100000 | −0.8555 − 1.0542i |
| w225 | 11100001 | −0.1322 − 1.3631i |
| w226 | 11100010 | −0.1938 − 0.3621i |
| w227 | 11100011 | −0.0928 − 0.3970i |
| w228 | 11100100 | −0.6363 − 1.2064i |
| w229 | 11100101 | −0.3929 − 1.3102i |
| w230 | 11100110 | −0.1909 − 0.3627i |
| w231 | 11100111 | −0.0937 − 0.3973i |
| w232 | 11101000 | +0.8555 − 1.0542i |
| w233 | 11101001 | +0.1322 − 1.3631i |
| w234 | 11101010 | +0.1938 − 0.3621i |
| w235 | 11101011 | +0.0928 − 0.3970i |
| w236 | 11101100 | +0.6363 − 1.2064i |
| w237 | 11101101 | +0.3929 − 1.3102i |
| w238 | 11101110 | +0.1909 − 0.3627i |
| w239 | 11101111 | +0.0937 − 0.3973i |
| w240 | 11110000 | −0.6961 − 0.8850i |
| w241 | 11110001 | −0.1124 − 1.1327i |
| w242 | 11110010 | −0.3224 − 0.5236i |
| w243 | 11110011 | −0.1054 − 0.5979i |
| w244 | 11110100 | −0.5229 − 1.0037i |
| w245 | 11110101 | −0.3160 − 1.0913i |
| w246 | 11110110 | −0.3016 − 0.5347i |
| w247 | 11110111 | −0.1230 − 0.5949i |

-continued

| w index | bit label | Constellation point |
| --- | --- | --- |
| w248 | 11111000 | +0.6961 − 0.8850i |
| w249 | 11111001 | +0.1124 − 1.1327i |
| w250 | 11111010 | +0.3224 − 0.5236i |
| w251 | 11111011 | +0.1054 − 0.5979i |
| w252 | 11111100 | +0.5229 − 1.0037i |
| w253 | 11111101 | +0.3160 − 1.0913i |
| w254 | 11111110 | +0.3016 − 0.5347i |
| w255 | 11111111 | +0.1230 − 0.5949i | for R=5/8 (or R=1/2, 3/4 or 13/16):

| w index | bit label | Constellation point |
| --- | --- | --- |
| w0 | 0000000 | −1.2639 − 1.0084i |
| w1 | 0000000 | −0.7380 + 0.6059i |
| w2 | 0000001 | −1.0466 − 1.2415i |
| w3 | 0000001 | −0.6190 + 0.7456i |
| w4 | 0000010 | −1.2639 − 1.0084i |
| w5 | 0000010 | −0.7380 + 0.6059i |
| w6 | 0000011 | −1.0466 − 1.2415i |
| w7 | 0000011 | −0.6190 + 0.7456i |
| w8 | 0000100 | −1.4263 + 0.7399i |
| w9 | 0000100 | −0.8292 + 0.4496i |
| w10 | 0000101 | −0.7829 + 1.4275i |
| w11 | 0000101 | −0.4707 + 0.8613i |
| w12 | 0000110 | −1.4263 + 0.7399i |
| w13 | 0000110 | −0.8292 + 0.4496i |
| w14 | 0000111 | −0.7829 + 1.4275i |
| w15 | 0000111 | −0.4707 + 0.8613i |
| w16 | 0001000 | −1.0529 + 0.8398i |
| w17 | 0001000 | −0.8839 + 0.7116i |
| w18 | 0001001 | −0.8751 + 1.0349i |
| w19 | 0001001 | −0.7380 + 0.8761i |
| w20 | 0001010 | −1.0529 + 0.8398i |
| w21 | 0001010 | −0.8839 + 0.7116i |
| w22 | 0001011 | −0.8751 + 1.0349i |
| w23 | 0001011 | −0.7380 + 0.8761i |
| w24 | 0001100 | −1.1857 + 0.6167i |
| w25 | 0001100 | −0.9935 + 0.5250i |
| w26 | 0001101 | −0.6570 + 1.1922i |
| w27 | 0001101 | −0.5568 + 1.0106i |
| w28 | 0001110 | −1.1857 − 0.6167i |
| w29 | 0001110 | −0.9935 − 0.5250i |
| w30 | 0001111 | −0.6570 − 1.1922i |
| w31 | 0001111 | −0.5568 − 1.0106i |
| w32 | 0010000 | +1.2639 + 1.0084i |
| w33 | 0010000 | +0.7380 + 0.6059i |
| w34 | 0010001 | +1.0466 + 1.2415i |
| w35 | 0010001 | +0.6190 + 0.7456i |
| w36 | 0010010 | +1.2639 − 1.0084i |
| w37 | 0010010 | +0.7380 − 0.6059i |
| w38 | 0010011 | +1.0466 + 1.2415i |
| w39 | 0010011 | +0.6190 + 0.7456i |
| w40 | 0010100 | +1.4263 + 0.7399i |
| w41 | 0010100 | +0.8292 + 0.4496i |
| w42 | 0010101 | +0.7829 + 1.4275i |
| w43 | 0010101 | +0.4707 + 0.8613i |
| w44 | 0010110 | +1.4263 − 0.7399i |
| w45 | 0010110 | +0.8292 + 0.4496i |
| w46 | 0010111 | +0.7829 − 1.4275i |
| w47 | 0010111 | +0.4707 + 0.8613i |
| w48 | 0011000 | +1.0529 + 0.8398i |
| w49 | 0011000 | +0.8839 + 0.7116i |
| w50 | 0011001 | +0.8751 + 1.0349i |
| w51 | 0011001 | +0.7380 + 0.8761i |
| w52 | 0011010 | +1.0529 − 0.8398i |
| w53 | 0011010 | +0.8839 − 0.7116i |
| w54 | 0011011 | +0.8751 − 1.0349i |
| w55 | 0011011 | +0.7380 − 0.8761i |
| w56 | 0011100 | +1.1857 + 0.6167i |
| w57 | 0011100 | +0.9935 + 0.5250i |
| w58 | 0011101 | +0.6570 + 1.1922i |
| w59 | 0011101 | +0.5568 + 1.0106i |
| w60 | 0011110 | +1.1857 − 0.6167i |
| w61 | 0011110 | +0.9935 − 0.5250i |
| w62 | 0011111 | +0.6570 − 1.1922i |
| w63 | 0011111 | +0.5568 − 1.0106i |
| w64 | 01000000 | −0.2459 + 0.2059i |
| w65 | 01000001 | −0.6025 + 0.5077i |
| w66 | 01000010 | −0.0949 + 0.2552i |
| w67 | 01000011 | −0.5005 + 0.6310i |
| w68 | 01000100 | −0.2459 − 0.2059i |
| w69 | 01000101 | −0.6025 − 0.5077i |
| w70 | 01000110 | −0.0949 − 0.2552i |
| w71 | 01000111 | −0.5005 − 0.6310i |
| w72 | 01001000 | −0.2508 + 0.2016i |
| w73 | 01001001 | −0.6756 + 0.3836i |
| w74 | 01001010 | −0.0912 + 0.2556i |
| w75 | 01001011 | −0.3899 + 0.7222i |
| w76 | 01001100 | −0.2508 + 0.2016i |
| w77 | 01001101 | −0.6756 − 0.3836i |
| w78 | 01001110 | −0.0912 − 0.2556i |
| w79 | 01001111 | −0.3899 − 0.7222i |
| w80 | 01010000 | −0.3507 + 0.3002i |
| w81 | 01010001 | −0.4734 + 0.4072i |
| w82 | 01010010 | −0.2035 + 0.4116i |
| w83 | 01010011 | −0.3688 + 0.5265i |
| w84 | 01010100 | −0.3507 − 0.3032i |
| w85 | 01010101 | −0.4734 − 0.4072i |
| w86 | 01010110 | −0.2035 − 0.4116i |
| w87 | 01010111 | −0.3688 − 0.5265i |
| w88 | 01011000 | −0.3739 + 0.2698i |
| w89 | 01011001 | −0.5263 + 0.3281i |
| w90 | 01011010 | −0.1890 + 0.4220i |
| w91 | 01011011 | −0.3094 + 0.5791i |
| w92 | 01011100 | −0.3739 − 0.2698i |
| w93 | 01011101 | −0.5263 − 0.3281i |
| w94 | 01011110 | −0.1890 − 0.4220i |
| w95 | 01011111 | −0.3094 − 0.5791i |
| w96 | 01100000 | +0.2459 + 0.2059i |
| w97 | 01100001 | +0.6025 + 0.5077i |
| w98 | 01100010 | +0.0949 + 0.2552i |
| w99 | 01100011 | +0.5005 + 0.6310i |
| w100 | 01100100 | +0.2459 − 0.2059i |
| w101 | 01100101 | +0.6025 − 0.5077i |
| w102 | 01100110 | +0.0949 − 0.2552i |
| w103 | 01100111 | +0.5005 − 0.6310i |
| w104 | 01101000 | +0.2508 + 0.2016i |
| w105 | 01101001 | +0.6756 + 0.3836i |
| w106 | 01101010 | +0.0912 + 0.2556i |
| w107 | 01101011 | +0.3899 + 0.7222i |
| w108 | 01101100 | +0.2508 − 0.2016i |
| w109 | 01101101 | +0.6756 − 0.3836i |
| w110 | 01101110 | +0.0912 − 0.2556i |
| w111 | 01101111 | +0.3899 − 0.7222i |
| w112 | 01110000 | +0.3507 + 0.3002i |
| w113 | 01110001 | +0.4734 + 0.4072i |
| w114 | 01110010 | +0.2035 + 0.4116i |
| w115 | 01110011 | +0.3688 + 0.5265i |
| w116 | 01110100 | +0.3507 − 0.3002i |
| w117 | 01110101 | +0.4734 − 0.4072i |
| w118 | 01110110 | +0.2035 − 0.4116i |
| w119 | 01110111 | +0.3688 − 0.5265i |
| w120 | 01111000 | +0.3739 + 0.2698i |
| w121 | 01111001 | +0.5263 + 0.3281i |
| w122 | 01111010 | +0.1890 + 0.4220i |
| w123 | 01111011 | +0.3094 + 0.5791i |
| w124 | 01111100 | +0.3739 − 0.2698i |
| w125 | 01111101 | +0.5263 − 0.3281i |
| w126 | 01111110 | +0.1890 − 0.4220i |
| w127 | 01111111 | +0.3094 − 0.5791i |
| w128 | 10000000 | −1.5843 + 0.1512i |
| w129 | 10000001 | −0.9275 + 0.0940i |
| w130 | 10000010 | −0.1639 + 1.6237i |
| w131 | 10000011 | −0.1000 + 0.9905i |
| w132 | 10000100 | −1.5843 − 0.1512i |
| w133 | 10000101 | −0.9275 − 0.0940i |
| w134 | 10000110 | −0.1639 − 1.6237i |
| w135 | 10000111 | −0.1000 − 0.9905i |
| w136 | 10001000 | −1.5329 + 0.4508i |
| w137 | 10001001 | −0.8933 + 0.2781i |
| w138 | 10001010 | −0.4843 + 1.5571i |

-continued

| w index | bit label | Constellation point |
| --- | --- | --- |
| w139 | 10001011 | −0.2959 + 0.9454i |
| w140 | 10001100 | −1.5329 − 0.4508i |
| w141 | 10001101 | −0.8933 − 0.2781i |
| w142 | 10001110 | −0.4843 − 1.5571i |
| w143 | 10001111 | −0.2959 − 0.9454i |
| w144 | 10010000 | −1.3147 + 0.1263i |
| w145 | 10010001 | −1.1029 + 0.1084i |
| w146 | 10010010 | −0.1381 + 1.3595i |
| w147 | 10010011 | −0.1179 + 1.1562i |
| w148 | 10010100 | −1.3147 − 0.1263i |
| w149 | 10010101 | −1.1029 − 0.1084i |
| w150 | 10010110 | −0.1381 − 1.3595i |
| w151 | 10010111 | −0.1179 − 1.1562i |
| w152 | 10011000 | −1.2724 + 0.3763i |
| w153 | 10011001 | −1.0662 + 0.3220i |
| w154 | 10011010 | −0.4077 + 1.3024i |
| w155 | 10011011 | −0.3470 + 1.1060i |
| w156 | 10011100 | −1.2724 − 0.3763i |
| w157 | 10011101 | −1.0662 − 0.3220i |
| w158 | 10011110 | −0.4077 − 1.3024i |
| w159 | 10011111 | −0.3470 − 1.1060i |
| w160 | 10100000 | +1.5843 + 0.1512i |
| w161 | 10100001 | +0.9275 + 0.0940i |
| w162 | 10100010 | +0.1639 + 1.6237i |
| w163 | 10100011 | +0.1000 + 0.9905i |
| w164 | 10100100 | +1.5843 − 0.1512i |
| w165 | 10100101 | +0.9275 − 0.0940i |
| w166 | 10100110 | +0.1639 − 1.6237i |
| w167 | 10100111 | +0.1000 − 0.9905i |
| w168 | 10101000 | +1.5329 + 0.4508i |
| w169 | 10101001 | +0.8933 + 0.2781i |
| w170 | 10101010 | +0.4843 + 1.5571i |
| w171 | 10101011 | +0.2959 + 0.9454i |
| w172 | 10101100 | +1.5329 − 0.4508i |
| w173 | 10101101 | +0.8933 − 0.2781i |
| w174 | 10101110 | +0.4843 − 1.5571i |
| w175 | 10101111 | +0.2959 − 0.9454i |
| w176 | 10110000 | +1.3147 + 0.1263i |
| w177 | 10110001 | +1.1029 + 0.1084i |
| w178 | 10110010 | +0.1381 + 1.3595i |
| w179 | 10110011 | +0.1179 + 1.1562i |
| w180 | 10110100 | +1.3147 − 0.1263i |
| w181 | 10110101 | +1.1029 − 0.1084i |
| w182 | 10110110 | +0.1381 − 1.3595i |
| w183 | 10110111 | +0.1179 − 1.1562i |
| w184 | 10111000 | +1.2724 + 0.3763i |
| w185 | 10111001 | +1.0662 + 0.3220i |
| w186 | 10111010 | +0.4077 + 1.3024i |
| w187 | 10111011 | +0.3470 + 1.1060i |
| w188 | 10111100 | +1.2724 − 0.3763i |
| w189 | 10111101 | +1.0662 − 0.3220i |
| w190 | 10111110 | +0.4077 − 1.3024i |
| w191 | 10111111 | +0.3470 − 1.1060i |
| w192 | 11000000 | −0.2552 + 0.0725i |
| w193 | 11000001 | −0.7681 + 0.0832i |
| w194 | 11000010 | −0.0726 + 0.0865i |
| w195 | 11000011 | −0.0867 + 0.8378i |
| w196 | 11000100 | −0.2552 − 0.0725i |
| w197 | 11000101 | −0.7681 − 0.0832i |
| w198 | 11000110 | −0.0726 − 0.0865i |
| w199 | 11000111 | −0.0867 − 0.8378i |
| w200 | 11001000 | −0.2567 + 0.0753i |
| w201 | 11001001 | −0.7371 + 0.2323i |
| w202 | 11001010 | −0.0722 + 0.0866i |
| w203 | 11001011 | −0.2417 + 0.8000i |
| w204 | 11001100 | −0.2567 − 0.0753i |
| w205 | 11001101 | −0.7371 − 0.2323i |
| w206 | 11001110 | −0.0722 − 0.0866i |
| w207 | 11001111 | −0.2417 − 0.8000i |
| w208 | 11010000 | −0.4495 + 0.0766i |
| w203 | 11010001 | −0.6140 + 0.0811i |
| w210 | 11010010 | −0.0717 + 0.5169i |
| w211 | 11010011 | −0.0837 + 0.6868i |
| w212 | 11010100 | −0.4495 − 0.0766i |
| w213 | 11010101 | −0.6140 − 0.0811i |
| w214 | 11010110 | −0.0717 − 0.5169i |
| w205 | 11010111 | −0.0837 − 0.6868i |
| w216 | 11011000 | −0.4423 + 0.1097i |
| w217 | 11011001 | −0.5925 + 0.1765i |
| w218 | 11011010 | −0.0883 + 0.5092i |
| w219 | 11011011 | −0.1746 + 0.6612i |
| w220 | 11011100 | −0.4423 − 0.1097i |
| w221 | 11011101 | −0.5925 − 0.1765i |
| w222 | 11011110 | −0.0883 − 0.5092i |
| w223 | 11011111 | −0.1746 − 0.6612i |
| w224 | 11100000 | +0.2552 + 0.0725i |
| w225 | 11100001 | +0.7681 + 0.0832i |
| w226 | 11100010 | +0.0726 + 0.0865i |
| w227 | 11100011 | +0.0867 + 0.8378i |
| w228 | 11100100 | +0.2552 − 0.0725i |
| w229 | 11100101 | +0.7681 − 0.0832i |
| w230 | 11100110 | +0.0726 − 0.0865i |
| w231 | 11100111 | +0.0867 − 0.8378i |
| w232 | 11101000 | +0.2567 + 0.0753i |
| w233 | 11101001 | +0.7371 + 0.2323i |
| w234 | 11101010 | +0.0722 + 0.0866i |
| w235 | 11101011 | +0.2417 + 0.8000i |
| w236 | 11101100 | +0.2567 − 0.0753i |
| w237 | 11101101 | +0.7371 − 0.2323i |
| w238 | 11101110 | +0.0722 − 0.0866i |
| w239 | 11101111 | +0.2417 − 0.8000i |
| w240 | 11110000 | +0.4495 + 0.0766i |
| w241 | 11110001 | +0.6140 + 0.0811i |
| w242 | 11110010 | +0.0717 + 0.5169i |
| w243 | 11110011 | +0.0837 + 0.6868i |
| w244 | 11110100 | +0.4495 − 0.0766i |
| w245 | 11110101 | +0.6140 − 0.0811i |
| w246 | 11110110 | +0.0717 − 0.5169i |
| w247 | 11110111 | +0.0837 − 0.6868i |
| w248 | 11111000 | +0.4423 + 0.1097i |
| w249 | 11111001 | +0.5925 + 0.1765i |
| w250 | 11111010 | +0.0883 + 0.5092i |
| w251 | 11111011 | +0.1746 + 0.6612i |
| w252 | 11111100 | +0.4423 − 0.1097i |
| w253 | 11111101 | +0.5925 − 0.1765i |
| w254 | 11111110 | +0.0883 − 0.5092i |
| w255 | 11111111 | +0.1746 − 0.6612i | for R=3/4 (or R=1/2, 5/8 or 13/16):

| w index | bit label | Constellation point |
| --- | --- | --- |
| w0 | 0000000 | −0.5207 + 1.2132i |
| w1 | 0000000 | −0.3103 + 1.2359i |
| w2 | 0000001 | −1.1610 + 1.1297i |
| w3 | 0000001 | −0.1051 + 1.2649i |
| w4 | 0000010 | −0.6193 + 0.6523i |
| w5 | 0000010 | −0.4633 + 0.6225i |
| w6 | 0000011 | −1.2194 + 0.5861i |
| w7 | 0000011 | −0.0684 + 0.5460i |
| w8 | 0000100 | +0.5207 + 1.2132i |
| w9 | 0000100 | +0.3103 + 1.2359i |
| w10 | 0000101 | +1.1610 + 1.1297i |
| w11 | 0000101 | +0.1051 + 1.2649i |
| w12 | 0000110 | +0.6193 + 0.6523i |
| w13 | 0000110 | +0.4633 + 0.6225i |
| w14 | 0000111 | +1.2194 + 0.5861i |
| w15 | 0000111 | +0.0684 + 0.5460i |
| w16 | 0001000 | −0.6089 + 1.4273i |
| w17 | 0001000 | −0.3588 + 1.4645i |
| w18 | 0001001 | −0.8292 + 1.2973i |
| w19 | 0001001 | −0.1197 + 1.4960i |
| w20 | 0001010 | −0.7956 + 0.6768i |
| w21 | 0001010 | −0.3209 + 0.5978i |
| w22 | 0001011 | −1.0079 + 0.6851i |
| w23 | 0001011 | −0.1960 + 0.5676i |
| w24 | 0001100 | +0.6089 + 1.4273i |
| w25 | 0001100 | +0.3588 + 1.4645i |
| w26 | 0001101 | +0.8292 + 1.2973i |
| w27 | 0001101 | +0.1197 + 1.4960i |
| w28 | 0001110 | +0.7956 + 0.6768i |
| w29 | 0001110 | +0.3209 + 0.5978i |

-continued

| w index | bit label | Constellation point |
|---|---|---|
| w30 | 0001111 | +1.0079 + 0.6851i |
| w31 | 0001111 | +0.1960 + 0.5676i |
| w32 | 0010000 | −0.5207 − 1.2132i |
| w33 | 0010000 | −0.3103 − 1.2359i |
| w34 | 0010001 | −1.1610 − 1.1297i |
| w35 | 0010001 | −0.1051 − 1.2649i |
| w36 | 0010010 | −0.6193 − 0.6523i |
| w37 | 0010010 | −0.4533 − 0.6225i |
| w38 | 0010011 | −1.2194 − 0.5861i |
| w39 | 0010011 | −0.0684 − 0.5460i |
| w40 | 0010100 | +0.5207 − 1.2132i |
| w41 | 0010100 | +0.3103 − 1.2359i |
| w42 | 0010101 | +1.1610 − 1.1297i |
| w43 | 0010101 | +0.1051 − 1.2649i |
| w44 | 0010110 | +0.6193 − 0.6523i |
| w45 | 0010110 | +0.4633 − 0.6225i |
| w46 | 0010111 | +1.2194 − 0.5861i |
| w47 | 0010111 | +0.0684 − 0.5460i |
| w48 | 0011000 | −0.6089 − 1.4273i |
| w49 | 0011000 | −0.3588 − 1.4645i |
| w50 | 0011001 | −0.8292 − 1.2973i |
| w51 | 0011001 | −0.1197 − 1.4960i |
| w52 | 0011010 | −0.7956 − 0.6768i |
| w53 | 0011010 | −0.3209 − 0.5978i |
| w54 | 0011011 | −1.0079 − 0.6851i |
| w55 | 0011011 | −0.1960 − 0.5676i |
| w56 | 0011100 | +0.6089 − 1.4273i |
| w57 | 0011100 | +0.3588 − 1.4645i |
| w58 | 0011101 | +0.8292 − 1.2973i |
| w59 | 0011101 | +0.1197 − 1.4960i |
| w60 | 0011110 | +0.7956 − 0.6768i |
| w61 | 0011110 | +0.3209 − 0.5978i |
| w62 | 0011111 | +1.0079 − 0.6851i |
| w63 | 0011111 | +0.1960 − 0.5676i |
| w64 | 01000000 | −0.4992 + 1.0060i |
| w65 | 01000001 | −0.3097 + 1.0437i |
| w66 | 01000010 | −1.2435 + 0.8749i |
| w67 | 01000011 | −0.0961 + 1.0730i |
| w68 | 01000100 | −0.5761 + 0.8259i |
| w69 | 01000101 | −0.4319 + 0.7814i |
| w70 | 01000110 | −1.4344 + 0.6815i |
| w71 | 01000111 | −0.0548 + 0.6842i |
| w72 | 01001000 | +0.4992 + 1.0060i |
| w73 | 01001001 | +0.3097 + 1.0437i |
| w74 | 01001010 | +1.2435 + 0.8749i |
| w75 | 01001011 | +0.0961 + 1.0730i |
| w76 | 01001100 | +0.5761 + 0.8259i |
| w77 | 01001101 | +0.4319 + 0.7814i |
| w78 | 01001110 | +1.4344 + 0.6815i |
| w79 | 01001111 | +0.0548 + 0.6842i |
| w80 | 01010000 | −0.6956 + 1.0381i |
| w81 | 01010001 | −0.2552 + 0.9082i |
| w82 | 01010010 | −0.8938 + 1.0757i |
| w83 | 01010011 | −0.0867 + 0.8997i |
| w84 | 01010100 | −0.7562 + 0.8504i |
| w85 | 01010101 | −0.2903 + 0.7608i |
| w86 | 01010110 | −0.9633 + 0.8762i |
| w87 | 01010111 | −0.1482 + 0.7338i |
| w88 | 01011000 | +0.6956 + 1.0381i |
| w89 | 01011001 | +0.2552 + 0.9082i |
| w90 | 01011010 | +0.8938 + 1.0757i |
| w91 | 01011011 | +0.0867 + 0.8997i |
| w92 | 01011100 | +0.7562 + 0.8504i |
| w93 | 01011101 | +0.2903 + 0.7608i |
| w94 | 01011110 | +0.9633 + 0.8762i |
| w95 | 01011111 | +0.1482 + 0.7338i |
| w96 | 01100000 | −0.4992 − 1.0060i |
| w97 | 01100001 | −0.3097 − 1.0437i |
| w98 | 01100010 | −1.2435 − 0.8749i |
| w99 | 01100011 | −0.0961 − 1.0730i |
| w100 | 01100100 | −0.5761 − 0.8259i |
| w101 | 01100101 | −0.4319 − 0.7814i |
| w102 | 01100110 | −1.4344 − 0.6815i |
| w103 | 01100111 | −0.0548 − 0.6842i |
| w104 | 01101000 | +0.4992 − 1.0060i |
| w105 | 01101001 | +0.3097 − 1.0437i |
| w106 | 01101010 | +1.2435 − 0.8749i |
| w107 | 01101011 | +0.0961 − 1.0730i |
| w108 | 01101100 | +0.5761 − 0.8259i |
| w109 | 01101101 | +0.4319 − 0.7814i |
| w110 | 01101110 | +1.4344 − 0.6815i |
| w111 | 01101111 | +0.0548 − 0.6842i |
| w112 | 01110000 | −0.6956 − 1.0381i |
| w113 | 01110001 | −0.2552 − 0.9082i |
| w114 | 01110010 | −0.8938 − 1.0757i |
| w115 | 01110011 | −0.0867 − 0.8997i |
| w116 | 01110100 | −0.7562 − 0.8504i |
| w117 | 01110101 | −0.2903 − 0.7608i |
| w118 | 01110110 | −0.9633 − 0.8762i |
| w119 | 01110111 | −0.1482 − 0.7338i |
| w120 | 01111000 | +0.6956 − 1.0381i |
| w121 | 01111001 | +0.2552 − 0.9082i |
| w122 | 01111010 | +0.8938 − 1.0757i |
| w123 | 01111011 | +0.0867 − 0.8997i |
| w124 | 01111100 | +0.7562 − 0.8504i |
| w125 | 01111101 | +0.2903 − 0.7608i |
| w126 | 01111110 | +0.9633 − 0.8762i |
| w127 | 01111111 | +0.1482 − 0.7338i |
| w128 | 10000000 | −0.6538 + 0.0691i |
| w129 | 10000001 | −0.5051 + 0.0654i |
| w130 | 10000010 | −1.4515 + 0.1246i |
| w131 | 10000011 | −0.0720 + 0.0589i |
| w132 | 10000100 | −0.6396 + 0.4933i |
| w133 | 10000101 | −0.4850 + 0.4726i |
| w134 | 10000110 | −1.4339 + 0.3828i |
| w135 | 10000111 | −0.0708 + 0.4166i |
| w136 | 10001000 | +0.6538 + 0.0691i |
| w137 | 10001001 | +0.5051 + 0.0654i |
| w138 | 10001010 | +1.4515 + 0.1246i |
| w139 | 10001011 | +0.0720 + 0.0589i |
| w140 | 10001100 | +0.6396 + 0.4933i |
| w141 | 10001101 | +0.4850 + 0.4726i |
| w142 | 10001110 | +1.4339 + 0.3828i |
| w143 | 10001111 | +0.0708 + 0.4166i |
| w144 | 10010000 | −0.8080 + 0.0721i |
| w145 | 10010001 | −0.3603 + 0.0619i |
| w146 | 10010010 | −0.9770 + 0.0640i |
| w147 | 10010011 | −0.2162 + 0.0599i |
| w148 | 10010100 | −0.8066 + 0.5082i |
| w149 | 10010101 | −0.3436 + 0.4483i |
| w150 | 10010110 | −0.9839 + 0.5111i |
| w151 | 10010111 | −0.2091 + 0.4280i |
| w152 | 10011000 | +0.8080 + 0.0721i |
| w153 | 10011001 | +0.3603 + 0.0619i |
| w154 | 10011010 | +0.9770 + 0.0640i |
| w155 | 10011011 | +0.2162 + 0.0599i |
| w156 | 10011100 | +0.8066 + 0.5082i |
| w157 | 10011101 | +0.3436 + 0.4483i |
| w158 | 10011110 | +0.9839 + 0.5111i |
| w159 | 10011111 | +0.2091 + 0.4280i |
| w160 | 10100000 | −0.6538 − 0.0691i |
| w161 | 10100001 | −0.5051 − 0.0654i |
| w162 | 10100010 | −1.4515 − 0.1246i |
| w163 | 10100011 | −0.0720 − 0.0589i |
| w164 | 10100100 | −0.6396 − 0.4933i |
| w165 | 10100101 | −0.4850 − 0.4726i |
| w166 | 10100110 | −1.4339 − 0.3828i |
| w167 | 10100111 | −0.0708 − 0.4166i |
| w168 | 10101000 | +0.6538 − 0.0691i |
| w169 | 10101001 | +0.5051 − 0.0654i |
| w170 | 10101010 | +1.4515 − 0.1246i |
| w171 | 10101011 | +0.0720 − 0.0589i |
| w172 | 10101100 | +0.6396 − 0.4933i |
| w173 | 10101101 | +0.4850 − 0.4726i |
| w174 | 10101110 | +1.4339 − 0.3828i |
| w175 | 10101111 | +0.0708 − 0.4166i |
| w176 | 10110000 | −0.8080 − 0.0721i |
| w177 | 10110001 | −0.3603 − 0.0619i |
| w178 | 10110010 | −0.9770 − 0.0640i |
| w179 | 10110011 | −0.2162 − 0.0599i |
| w180 | 10110100 | −0.8066 − 0.5082i |
| w181 | 10110101 | −0.3436 − 0.4483i |
| w182 | 10110110 | −0.9839 − 0.5111i |
| w183 | 10110111 | −0.2091 − 0.4280i |

-continued

| w index | bit label | Constellation point |
|---|---|---|
| w184 | 10111000 | +0.8080 − 0.0721i |
| w185 | 10111001 | +0.3603 − 0.0619i |
| w186 | 10111010 | +0.9770 − 0.0640i |
| w187 | 10111011 | +0.2162 − 0.0599i |
| w188 | 10111100 | +0.8066 − 0.5082i |
| w189 | 10111101 | +0.3436 − 0.4483i |
| w190 | 10111110 | +0.9839 − 0.5111i |
| w191 | 10111111 | +0.2091 − 0.4280i |
| w192 | 11000000 | −0.6518 + 0.2064i |
| w193 | 11000001 | −0.5023 + 0.1959i |
| w194 | 11000010 | −1.2169 + 0.1086i |
| w195 | 11000011 | −0.0716 + 0.1743i |
| w196 | 11000100 | −0.6490 + 0.3456i |
| w197 | 11000101 | −0.4967 + 0.3308i |
| w198 | 11000110 | −1.2175 + 0.3244i |
| w199 | 11000111 | −0.0713 + 0.2951i |
| w200 | 11001000 | +0.6518 + 0.2064i |
| w201 | 11001001 | +0.5023 + 0.1959i |
| w202 | 11001010 | +1.2169 + 0.1086i |
| w203 | 11001011 | +0.0716 + 0.1743i |
| w204 | 11001100 | +0.6490 + 0.3456i |
| w205 | 11001101 | +0.4967 + 0.3308i |
| w206 | 11001110 | +1.2175 + 0.3244i |
| w207 | 11001111 | +0.0713 + 0.2951i |
| w208 | 11010000 | −0.8177 + 0.2121i |
| w209 | 11010001 | −0.3587 + 0.1857i |
| w210 | 11010010 | −1.0126 + 0.1946i |
| w211 | 11010011 | −0.2150 + 0.1782i |
| w212 | 11010100 | −0.8186 + 0.3517i |
| w213 | 11010101 | −0.3540 + 0.3139i |
| w214 | 11010110 | −1.0159 + 0.3531i |
| w215 | 11010111 | −0.2130 + 0.3012i |
| w216 | 11011000 | +0.8177 + 0.2121i |
| w217 | 11011001 | +0.3587 + 0.1857i |
| w218 | 11011010 | +1.0126 + 0.1946i |
| w219 | 11011011 | +0.2150 + 0.1782i |
| w220 | 11011100 | +0.8186 + 0.3517i |
| w221 | 11011101 | +0.3540 + 0.3139i |
| w222 | 11011110 | +1.0159 + 0.3531i |
| w223 | 11011111 | +0.2130 + 0.3012i |
| w224 | 11100000 | −0.6518 − 0.2064i |
| w225 | 11100001 | −0.5023 − 0.1959i |
| w226 | 11100010 | −1.2169 − 0.1086i |
| w227 | 11100011 | −0.0716 − 0.1743i |
| w228 | 11100100 | −0.6490 − 0.3456i |
| w229 | 11100101 | −0.4967 − 0.3308i |
| w230 | 11100110 | −1.2175 − 0.3244i |
| w231 | 11100111 | −0.0713 − 0.2951i |
| w232 | 11101000 | +0.6518 − 0.2064i |
| w233 | 11101001 | +0.5023 − 0.1959i |
| w234 | 11101010 | +1.2169 − 0.1086i |
| w235 | 11101011 | +0.0716 − 0.1743i |
| w236 | 11101100 | +0.6490 − 0.3456i |
| w237 | 11101101 | +0.4967 − 0.3308i |
| w238 | 11101110 | +1.2175 − 0.3244i |
| w239 | 11101111 | +0.0713 − 0.2951i |
| w240 | 11110000 | −0.8177 − 0.2121i |
| w241 | 11110001 | −0.3587 − 0.1857i |
| w242 | 11110010 | −1.0126 − 0.1946i |
| w243 | 11110011 | −0.2150 − 0.1782i |
| w244 | 11110100 | −0.8186 − 0.3517i |
| w245 | 11110101 | −0.3540 − 0.3139i |
| w246 | 11110110 | −1.0159 − 0.3531i |
| w247 | 11110111 | −0.2130 − 0.3012i |
| w248 | 11111000 | +0.8177 − 0.2121i |
| w249 | 11111001 | +0.3587 − 0.1857i |
| w250 | 11111010 | +1.0126 − 0.1946i |
| w251 | 11111011 | +0.2150 − 0.1782i |
| w252 | 11111100 | +0.8186 − 0.3517i |
| w253 | 11111101 | +0.3540 − 0.3139i |
| w254 | 11111110 | +1.0159 − 0.3531i |
| w255 | 11111111 | +0.2130 − 0.3012i | for R=13/16 (or R=1/2, 5/8 or 3/4):

| w index | bit label | Constellation point |
|---|---|---|
| w0 | 0000000 | −0.4976 + 1.2018i |
| w1 | 0000000 | +0.4976 + 1.2018i |
| w2 | 0000001 | −0.4976 − 1.2018i |
| w3 | 0000001 | +0.4976 − 1.2018i |
| w4 | 0000010 | −0.4821 + 1.0103i |
| w5 | 0000010 | +0.4821 + 1.0103i |
| w6 | 0000011 | −0.4821 − 1.0103i |
| w7 | 0000011 | +0.4821 − 1.0103i |
| w8 | 0000100 | −1.1616 + 1.0595i |
| w9 | 0000100 | +1.1616 + 1.0595i |
| w10 | 0000101 | −1.1616 − 1.0595i |
| w11 | 0000101 | +1.1616 − 1.0595i |
| w12 | 0000110 | −1.2384 + 0.8218i |
| w13 | 0000110 | +1.2384 + 0.8218i |
| w14 | 0000111 | −1.2384 − 0.8218i |
| w15 | 0000111 | +1.2384 − 0.8218i |
| w16 | 0001000 | −0.6618 + 0.0721i |
| w17 | 0001000 | +0.6618 + 0.0721i |
| w18 | 0001001 | −0.6618 − 0.0721i |
| w19 | 0001001 | +0.6618 − 0.0721i |
| w20 | 0001010 | −0.6653 + 0.2161i |
| w21 | 0001010 | +0.6653 + 0.2161i |
| w22 | 0001011 | −0.6653 − 0.2161i |
| w23 | 0001011 | +0.6653 − 0.2161i |
| w24 | 0001100 | −1.4070 + 0.1153i |
| w25 | 0001100 | +1.4070 + 0.1153i |
| w26 | 0001101 | −1.4070 − 0.1153i |
| w27 | 0001101 | +1.4070 − 0.1153i |
| w28 | 0001110 | −1.1945 + 0.1045i |
| w29 | 0001110 | +1.1945 + 0.1045i |
| w30 | 0001111 | −1.1945 − 0.1045i |
| w31 | 0001111 | +1.1945 − 0.1045i |
| w32 | 0010000 | −0.2993 + 1.2594i |
| w33 | 0010000 | +0.2993 + 1.2594i |
| w34 | 0010001 | −0.2993 − 1.2594i |
| w35 | 0010001 | +0.2993 − 1.2594i |
| w36 | 0010010 | −0.2906 + 1.0772i |
| w37 | 0010010 | +0.2906 + 1.0772i |
| w38 | 0010011 | −0.2906 − 1.0772i |
| w39 | 0010011 | +0.2906 − 1.0772i |
| w40 | 0010100 | −0.0985 + 1.2520i |
| w41 | 0010100 | +0.0985 + 1.2520i |
| w42 | 0010101 | −0.0985 − 1.2520i |
| w43 | 0010101 | +0.0985 − 1.2520i |
| w44 | 0010110 | −0.0938 + 1.0710i |
| w45 | 0010110 | +0.0938 + 1.0710i |
| w46 | 0010111 | −0.0938 − 1.0710i |
| w47 | 0010111 | +0.0938 − 1.0710i |
| w48 | 0011000 | −0.5134 + 0.0686i |
| w49 | 0011000 | +0.5134 + 0.0686i |
| w50 | 0011001 | −0.5134 − 0.0686i |
| w51 | 0011001 | +0.5134 − 0.0686i |
| w52 | 0011010 | −0.5133 + 0.2063i |
| w53 | 0011010 | +0.5133 + 0.2063i |
| w54 | 0011011 | −0.5133 − 0.2063i |
| w55 | 0011011 | +0.5133 − 0.2063i |
| w56 | 0011100 | −0.0735 + 0.0614i |
| w57 | 0011100 | +0.0735 + 0.0614i |
| w58 | 0011101 | −0.0735 − 0.0614i |
| w59 | 0011101 | +0.0735 − 0.0614i |
| w60 | 0011110 | −0.0734 + 0.1846i |
| w61 | 0011110 | +0.0734 + 0.1846i |
| w62 | 0011111 | −0.0734 − 0.1846i |
| w63 | 0011111 | +0.0734 − 0.1846i |
| w64 | 01000000 | −0.5648 + 1.4016i |
| w65 | 01000001 | +0.5648 + 1.4016i |
| w66 | 01000010 | −0.5648 − 1.4016i |
| w67 | 01000011 | +0.5648 − 1.4016i |
| w68 | 01000100 | −0.6826 + 1.0558i |
| w69 | 01000101 | +0.6826 + 1.0558i |
| w70 | 01000110 | −0.6826 − 1.0558i |
| w71 | 01000111 | +0.6826 − 1.0558i |
| w72 | 01001000 | −0.7696 + 1.2863i |
| w73 | 01001001 | +0.7696 + 1.2863i |
| w74 | 01001010 | −0.7696 − 1.2863i |
| w75 | 01001011 | +0.7696 − 1.2863i |

-continued

| w index | bit label | Constellation point |
|---|---|---|
| w76 | 01001100 | −0.8965 + 1.0947i |
| w77 | 01001101 | +0.8965 + 1.0947i |
| w78 | 01001110 | −0.8965 − 1.0947i |
| w79 | 01001111 | +0.8965 − 1.0947i |
| w80 | 01010000 | −0.8148 + 0.0743i |
| w81 | 01010001 | +0.8148 + 0.0743i |
| w82 | 01010010 | −0.8148 − 0.0743i |
| w83 | 01010011 | +0.8148 − 0.0743i |
| w84 | 01010100 | −0.8285 + 0.2219i |
| w85 | 01010101 | +0.8285 + 0.2219i |
| w86 | 01010110 | −0.8285 − 0.2219i |
| w87 | 01010111 | +0.8285 − 0.2219i |
| w88 | 01011000 | −0.9784 + 0.0686i |
| w89 | 01011001 | +0.9784 + 0.0686i |
| w90 | 01011010 | −0.9784 − 0.0686i |
| w91 | 01011011 | +0.9784 − 0.0686i |
| w92 | 01011100 | −1.0093 + 0.2102i |
| w93 | 01011101 | +1.0093 + 0.2102i |
| w94 | 01011110 | −1.0093 − 0.2102i |
| w95 | 01011111 | +1.0093 − 0.2102i |
| w96 | 01100000 | −0.3403 + 1.4686i |
| w97 | 01100001 | +0.3403 + 1.4686i |
| w98 | 01100010 | −0.3403 − 1.4686i |
| w99 | 01100011 | +0.3403 − 1.4686i |
| w100 | 01100100 | −0.2690 + 0.9234i |
| w101 | 01100101 | +0.2690 + 0.9234i |
| w102 | 01100110 | −0.2690 − 0.9234i |
| w103 | 01100111 | +0.2690 − 0.9234i |
| w104 | 01101000 | −0.1114 + 1.4628i |
| w105 | 01101001 | +0.1114 + 1.4628i |
| w106 | 01101010 | −0.1114 − 1.4628i |
| w107 | 01101011 | +0.1114 − 1.4628i |
| w108 | 01101100 | −0.0905 + 0.9054i |
| w109 | 01101101 | +0.0905 + 0.9054i |
| w110 | 01101110 | −0.0905 − 0.9054i |
| w111 | 01101111 | +0.0905 − 0.9054i |
| w112 | 01110000 | −0.3668 + 0.0653i |
| w113 | 01110001 | +0.3668 + 0.0653i |
| w114 | 01110010 | −0.3668 − 0.0653i |
| w115 | 01110011 | +0.3668 − 0.0653i |
| w116 | 01110100 | −0.3660 + 0.1965i |
| w117 | 01110101 | +0.3660 + 0.1965i |
| w118 | 01110110 | −0.3660 − 0.1965i |
| w119 | 01110111 | +0.3660 − 0.1965i |
| w120 | 01111000 | −0.2204 + 0.0628i |
| w121 | 01111001 | +0.2204 + 0.0628i |
| w122 | 01111010 | −0.2204 − 0.0628i |
| w123 | 01111011 | +0.2204 − 0.0628i |
| w124 | 01111100 | −0.2198 + 0.1888i |
| w125 | 01111101 | +0.2198 + 0.1888i |
| w126 | 01111110 | −0.2198 − 0.1888i |
| w127 | 01111111 | +0.2198 − 0.1888i |
| w128 | 10000000 | −0.6404 + 0.6801i |
| w129 | 10000001 | +0.6404 + 0.6801i |
| w130 | 10000010 | −0.6404 − 0.6801i |
| w131 | 10000011 | +0.6404 − 0.6801i |
| w132 | 10000100 | −0.5954 + 0.8500i |
| w133 | 10000101 | +0.5954 + 0.8500i |
| w134 | 10000110 | −0.5954 − 0.8500i |
| w135 | 10000111 | +0.5954 − 0.8500i |
| w136 | 10001000 | −1.1989 + 0.5582i |
| w137 | 10001001 | +1.1989 + 0.5582i |
| w138 | 10001010 | −1.1989 − 0.5582i |
| w139 | 10001011 | +1.1989 − 0.5582i |
| w140 | 10001100 | −1.4012 + 0.6249i |
| w141 | 10001101 | +1.4012 + 0.6249i |
| w142 | 10001110 | −1.4012 − 0.6249i |
| w143 | 10001111 | +1.4012 − 0.6249i |
| w144 | 10010000 | −0.6524 + 0.5156i |
| w145 | 10010001 | +0.6524 + 0.5156i |
| w146 | 10010010 | −0.6524 − 0.5156i |
| w147 | 10010011 | +0.6524 − 0.5156i |
| w148 | 10010100 | −0.6640 + 0.3620i |
| w149 | 10010101 | +0.6640 + 0.3620i |
| w150 | 10010110 | −0.6640 − 0.3620i |
| w151 | 10010111 | +0.6640 − 0.3620i |
| w152 | 10011000 | −1.4123 + 0.3539i |
| w153 | 10011001 | +1.4123 + 0.3539i |
| w154 | 10011010 | −1.4123 − 0.3539i |
| w155 | 10011011 | +1.4123 − 0.3539i |
| w156 | 10011100 | −1.2076 + 0.3137i |
| w157 | 10011101 | +1.2076 + 0.3137i |
| w158 | 10011110 | −1.2076 − 0.3137i |
| w159 | 10011111 | +1.2076 − 0.3137i |
| w160 | 10100000 | −0.4846 + 0.6443i |
| w161 | 10100001 | +0.4846 + 0.6443i |
| w162 | 10100010 | −0.4846 − 0.6443i |
| w163 | 10100011 | +0.4846 − 0.6443i |
| w164 | 10100100 | −0.4495 + 0.7999i |
| w165 | 10100101 | +0.4495 + 0.7999i |
| w166 | 10100110 | −0.4495 − 0.7999i |
| w167 | 10100111 | +0.4495 − 0.7999i |
| w168 | 10101000 | −0.0693 + 0.5689i |
| w169 | 10101001 | +0.0693 + 0.5689i |
| w170 | 10101010 | −0.0693 − 0.5689i |
| w171 | 10101011 | +0.0693 − 0.5689i |
| w172 | 10101100 | −0.0563 + 0.7102i |
| w173 | 10101101 | +0.0563 + 0.7102i |
| w174 | 10101110 | −0.0563 − 0.7102i |
| w175 | 10101111 | +0.0563 − 0.7102i |
| w176 | 10110000 | −0.5011 + 0.4924i |
| w177 | 10110001 | +0.5011 + 0.4924i |
| w178 | 10110010 | −0.5011 − 0.4924i |
| w179 | 10110011 | +0.5011 − 0.4924i |
| w180 | 10110100 | −0.5105 + 0.3465i |
| w181 | 10110101 | +0.5105 + 0.3465i |
| w182 | 10110110 | −0.5105 − 0.3465i |
| w183 | 10110111 | +0.5105 − 0.3465i |
| w184 | 10111000 | −0.0720 + 0.4369i |
| w185 | 10111001 | +0.0720 + 0.4369i |
| w186 | 10111010 | −0.0720 − 0.4369i |
| w187 | 10111011 | +0.0720 − 0.4369i |
| w188 | 10111100 | −0.0730 + 0.3094i |
| w189 | 10111101 | +0.0730 + 0.3094i |
| w190 | 10111110 | −0.0730 − 0.3094i |
| w191 | 10111111 | +0.0730 − 0.3094i |
| w192 | 11000000 | −0.8128 + 0.7021i |
| w193 | 11000001 | +0.8128 + 0.7021i |
| w194 | 11000010 | −0.8128 − 0.7021i |
| w195 | 11000011 | +0.8128 − 0.7021i |
| w196 | 11000100 | −0.7699 + 0.8797i |
| w197 | 11000101 | +0.7699 + 0.8797i |
| w198 | 11000110 | −0.7699 − 0.8797i |
| w199 | 11000111 | +0.7699 − 0.8797i |
| w200 | 11001000 | −1.0129 + 0.6976i |
| w201 | 11001001 | +1.0129 + 0.6976i |
| w202 | 11001010 | −1.0129 − 0.6976i |
| w203 | 11001011 | +1.0129 − 0.6976i |
| w204 | 11001100 | −0.9657 + 0.8860i |
| w205 | 11001101 | +0.9657 + 0.8860i |
| w206 | 11001110 | −0.9657 − 0.8860i |
| w207 | 11001111 | +0.9657 − 0.8860i |
| w208 | 11010000 | −0.8099 + 0.5313i |
| w209 | 11010001 | +0.8099 + 0.5313i |
| w210 | 11010010 | −0.8099 − 0.5313i |
| w211 | 11010011 | +0.8099 − 0.5313i |
| w212 | 11010100 | −0.8291 + 0.3705i |
| w213 | 11010101 | +0.8291 + 0.3705i |
| w214 | 11010110 | −0.8291 − 0.3705i |
| w215 | 11010111 | +0.8291 − 0.3705i |
| w216 | 11011000 | −0.9768 + 0.5294i |
| w217 | 11011001 | +0.9768 + 0.5294i |
| w218 | 11011010 | −0.9768 − 0.5294i |
| w219 | 11011011 | +0.9768 − 0.5294i |
| w220 | 11011100 | −1.0171 + 0.3701i |
| w221 | 11011101 | +1.0171 + 0.3701i |
| w222 | 11011110 | −1.0171 − 0.3701i |
| w223 | 11011111 | +1.0171 − 0.3701i |
| w224 | 11100000 | −0.3381 + 0.6175i |
| w225 | 11100001 | +0.3381 + 0.6175i |
| w226 | 11100010 | −0.3381 − 0.6175i |
| w227 | 11100011 | +0.3381 − 0.6175i |
| w228 | 11100100 | −0.3079 + 0.7726i |
| w229 | 11100101 | +0.3079 + 0.7726i |

| w index | bit label | Constellation point |
|---|---|---|
| w230 | 11100110 | −0.3079 − 0.7726i |
| w231 | 11100111 | +0.3079 − 0.7726i |
| w232 | 11101000 | −0.2034 + 0.5915i |
| w233 | 11101001 | +0.2034 + 0.5915i |
| w234 | 11101010 | −0.2034 − 0.5915i |
| w235 | 11101011 | +0.2034 − 0.5915i |
| w236 | 11101100 | −0.1695 + 0.7506i |
| w237 | 11101101 | +0.1695 + 0.7506i |
| w238 | 11101110 | −0.1695 − 0.7506i |
| w239 | 11101111 | +0.1695 − 0.7506i |
| w240 | 11110000 | −0.3558 + 0.4698i |
| w241 | 11110001 | +0.3558 + 0.4698i |
| w242 | 11110010 | −0.3558 − 0.4698i |
| w243 | 11110011 | +0.3558 − 0.4698i |
| w244 | 11110100 | −0.3634 + 0.3304i |
| w245 | 11110101 | +0.3634 + 0.3304i |
| w246 | 11110110 | −0.3634 − 0.3304i |
| w247 | 11110111 | +0.3634 − 0.3304i |
| w248 | 11111000 | −0.2145 + 0.4495i |
| w249 | 11111001 | +0.2145 + 0.4495i |
| w250 | 11111010 | −0.2145 − 0.4495i |
| w251 | 11111011 | +0.2145 − 0.4495i |
| w252 | 11111100 | −0.2184 + 0.3170i |
| w253 | 11111101 | +0.2184 + 0.3170i |
| w254 | 11111110 | −0.2184 − 0.3170i |
| w255 | 11111111 | +0.2184 − 0.3170i | wherein the bit labeling indicated in groups A and B may alternatively be inverted for one or more bit labels.

2. The coding and modulation apparatus as claimed in claim 1, further comprising a selection unit configured to select the total number M of constellation points of the constellation and the code rate based on channel conditions between a transmission apparatus including said coding and modulation apparatus and a receiving apparatus with which said transmission apparatus seeks to communicate.

3. The coding and modulation apparatus as claimed in claim 2, wherein said selection unit is configured to select a constellation with a higher number of M and/or a higher code rate the better the channel conditions are.

4. The coding and modulation apparatus as claimed in claim 1, wherein said coding and modulation apparatus is configured for use in a transmission apparatus according to IEEE 802.11.

5. A transmission apparatus comprising:
a coding and modulation apparatus as claimed in claim 1 configured to encode and modulate input data into constellation values,
a converter configured to convert said constellation values into one or more transmission streams to be transmitted, and
a transmitter configured to transmit said one or more transmission streams.

6. The transmission apparatus as claimed in claim 5, further comprising a signalling unit configured to embed signalling information into the one or more transmission streams, said signalling information including information about the PHY mode, the total number M of constellation points of the constellation, the location of the constellation points and the code rate.

7. The transmission apparatus as claimed in claim 6, wherein said signalling unit is configured to embed said signalling information at the beginning of frames, in particular of each frame, of a plurality of frames used for transmission of the one or more transmission streams.

8. The transmission apparatus as claimed in claim 6, wherein said signalling unit is configured to embed said signalling information into a Header field.

9. The transmission apparatus as claimed in claim 5, wherein said signalling unit is configured to embed signalling information into the one or more transmission streams, said signalling information including a modulation and coding, MCS, index information including information about the PHY mode, the total number M of constellation points of the constellation and the code rate.

10. The transmission apparatus as claimed in claim 5, wherein said modulation unit is configured to select using a uniform constellation instead of one of said non-uniform constellations for modulating said cell words into constellation values, and
wherein said signalling unit is configured to embed signalling information into the one or more transmission streams, said signalling information including constellation information indicating if a non-uniform constellation or a uniform constellation has been used for modulation.

11. A communications system comprising one or more transmission apparatus as claimed in claim 1.

12. A coding and modulation method comprising:
encoding input data into cell words according to a low density parity check code, LDPC, and
modulating said cell words into constellation values of a non-uniform constellation and to assign bit combinations to constellation values of the used non-uniform constellation,
wherein said modulating is configured to use, based on the PHY mode, the total number M of constellation points of the constellation and the code rate,
i) a non-uniform constellation and bit labeling from a group A, if the PHY mode is OFDM mode and if M=16, 64, 128 or 256, the group A comprising constellations as defined in
sub-group A1 for 16-QAM with M=16 and code rates of 1/2, 5/8, 3/4 or 13/16,
sub-group A2 for 64-QAM with M=64 and code rates of 5/8, 3/4 or 13/16,
sub-group A3 for 128-QAM with M=128 and code rates of 1/2, 5/8, 3/4 or 13/16, and
sub-group A4 for 256-QAM with M=256 and code rates of 1/2, 5/8, 3/4 or 13/16,
or
ii) a non-uniform constellation and bit labeling from a group B, if the PHY mode is single carrier mode and if M=16, 32, 64, 128 or 256, the group B comprising constellations as defined in
sub-group B1 for 16-QAM with M=16 and code rates of 1/2, 5/8 or 3/4,
sub-group B2 for 32-QAM with M=32 and code rates of 1/2, 5/8, 3/4 or 13/16,
sub-group B3 for 64-QAM with M=64 and code rates of 1/2, 5/8, 3/4 or 13/16,
sub-group B4 for 128-QAM with M=128 and code rates of 1/2, 5/8, 3/4 or 13/16, and
sub-group B5 for 256-QAM with M=256 and code rates of 1/2, 5/8, 3/4 or 13/16,
or
iii) a non-uniform constellation obtained from a constellation from anyone of groups A or B through rotation by an angle around the origin, through inversion of bit labels for all constellation points, through interchanging of bit positions, through mirroring on any line in the complex plane and/or through predistortion for the constellation points,
wherein the constellation points are defined by a constellation position vector $w_0 \ldots w_{M-1}$, and wherein the constellation position vectors of the different constellations of the groups A or B of constellations are defined as follows:

A) M-QAM non-uniform constellations of group A for OFDM as PHY mode:

A1) 16-QAM NUC

| w | bit label | R = ½ (MCS = 18) (or R = ⅝, ¾ or ¹³⁄₁₆) | R = ⅝ (MCS = 19) (or R = ½, ¾ or ¹³⁄₁₆) | R = ¾ (MCS = 20) (or R = ⅝, ½ or ¹³⁄₁₆) | R = ¹³⁄₁₆ (MCS = 21) (or R = ½, ⅝ or ¾) |
|---|---|---|---|---|---|
| w0  | 0000 | +0.4925 + 1.2040i | +0.2173 + 0.4189i | +0.2976 − 0.2976i | +0.3018 − 0.3018i |
| w1  | 0001 | +0.2530 + 0.4936i | +0.6578 + 0.2571i | +0.2976 − 0.9547i | −0.3018 − 0.3018i |
| w2  | 0010 | +0.4925 − 1.2040i | +0.4326 + 1.1445i | −0.2976 − 0.2976i | +0.3018 − 0.9534i |
| w3  | 0011 | +0.2530 − 0.4936i | +1.2088 + 0.5659i | −0.2976 − 0.9547i | −0.3018 − 0.9534i |
| w4  | 0100 | +1.2040 + 0.4925i | +0.2173 − 0.4189i | +0.9547 − 0.2976i | +0.3018 + 0.3018i |
| w5  | 0101 | +0.4936 + 0.2530i | +0.6578 − 0.2571i | +0.9547 − 0.9547i | −0.3018 + 0.3018i |
| w6  | 0110 | +1.2040 − 0.4925i | +0.4326 − 1.1445i | −0.9547 − 0.2976i | +0.3018 + 0.9534i |
| w7  | 0111 | +0.4936 − 0.2530i | +1.2088 − 0.5659i | −0.9547 − 0.9547i | −0.3018 + 0.9534i |
| w8  | 1000 | −0.4925 + 1.2040i | −0.2173 + 0.4189i | +0.2976 + 0.2976i | +0.9534 − 0.3018i |
| w9  | 1001 | −0.2530 + 0.4936i | −0.6578 + 0.2571i | +0.2976 + 0.9547i | −0.9534 − 0.3018i |
| w10 | 1010 | −0.4925 − 1.2040i | −0.4326 + 1.1445i | −0.2976 + 0.2976i | +0.9534 − 0.9534i |
| w11 | 1011 | −0.2530 − 0.4936i | −1.2088 + 0.5659i | −0.2976 + 0.9547i | −0.9534 − 0.9534i |
| w12 | 1100 | −1.2040 + 0.4925i | −0.2173 − 0.4189i | +0.9547 + 0.2976i | +0.9534 + 0.3018i |
| w13 | 1101 | −0.4936 + 0.2530i | −0.6578 − 0.2571i | +0.9547 + 0.9547i | −0.9534 + 0.3018i |
| w14 | 1110 | −1.2040 − 0.4925i | −0.4326 − 1.1445i | −0.9547 + 0.2976i | +0.9534 + 0.9534i |
| w15 | 1111 | −0.4936 − 0.2530i | −1.2088 − 0.5659i | −0.9547 + 0.9547i | −0.9534 + 0.9534i |

A2) 64-QAM NUC

| w/MCS index | bit label | R = ⅝ (MCS = 22) (or R = ¾ or ¹³⁄₁₆) | R = ¾ (MCS = 23) (or R = ⅝ or ¹³⁄₁₆) | R = ¹³⁄₁₆ (MCS = 24) (or R = ⅝ or ¾) |
|---|---|---|---|---|
| w0  | 000000 | +1.4730 + 03019i  | +1.0501 − 0.1676i | +1.0414 − 0.1712i |
| w1  | 000001 | +1.2124 + 0.8333i | +1.4380 − 0.2294i | −1.0414 − 0.1712i |
| w2  | 000010 | −1.4730 + 0.3019i | +0.7233 − 0.1496i | +1.0414 + 0.1712i |
| w3  | 000011 | −1.2124 + 0.8333i | +0.6220 − 1.1896i | −1.0414 − 0.1712i |
| w4  | 000100 | +1.4730 − 0.3019i | −1.0501 − 0.1676i | +1.4058 − 0.2115i |
| w5  | 000101 | +1.2124 + 0.8333i | −1.4380 − 0.2294i | −1.4058 − 0.2115i |
| w6  | 000110 | −1.4730 − 0.3019i | −0.7233 − 0.1496i | +1.4058 + 0.2115i |
| w7  | 000111 | −1.2124 + 0.8333i | −0.6220 − 1.1896i | −1.4058 − 0.2115i |
| w8  | 001000 | +1.0895 + 0.2172i | +0.1398 − 0.1309i | +0.1414 − 0.1379i |
| w9  | 001001 | +0.8988 + 0.5768i | +0.1680 − 1.0338i | −0.1414 − 0.1379i |
| w10 | 001010 | −1.0895 + 0.2172i | +0.4246 − 0.1370i | +0.1414 + 0.1379i |
| w11 | 001011 | −0.8988 + 0.5768i | +0.2326 − 1.3986i | −0.1414 − 0.1379i |
| w12 | 001100 | +1.0895 − 0.2172i | −0.1398 − 0.1309i | +0.1695 − 1.0298i |
| w13 | 001101 | +0.8988 − 0.5768i | −0.1680 − 1.0338i | −0.1695 − 1.0298i |
| w14 | 001110 | −1.0895 − 0.2172i | −0.4246 − 0.1370i | +0.1695 + 1.0298i |
| w15 | 001111 | −0.8988 − 0.5768i | −0.2326 − 1.3986i | −0.1695 + 1.0298i |
| w16 | 010000 | +0.2775 + 1.4188i | +1.0501 + 0.1676i | +0.7230 − 0.1517i |
| w17 | 010001 | +0.7921 + 1.2096i | +1.4380 + 0.2294i | −0.7230 − 0.1517i |
| w18 | 010010 | −0.2775 + 1.4188i | +0.7233 + 0.1496i | +0.7230 + 0.1517i |
| w19 | 010011 | −0.7921 + 1.2096i | +0.6220 + 1.1896i | −0.7230 − 0.1517i |
| w20 | 010100 | +0.2775 − 1.4188i | −1.0501 + 0.1676i | +0.5981 − 1.1597i |
| w21 | 010101 | +0.7921 − 1.2096i | −1.4380 + 0.2294i | −0.5981 − 1.1597i |
| w22 | 010110 | −0.2775 − 1.4188i | −0.7233 + 0.1496i | +0.5981 + 1.1597i |
| w23 | 010111 | −0.7921 − 1.2096i | −0.6220 + 1.1896i | −0.5981 + 1.1597i |
| w24 | 011000 | +0.2177 + 1.0243i | +0.1398 + 0.1309i | +0.4272 − 0.1421i |
| w25 | 011001 | +0.6056 + 0.8481i | +0.1680 + 1.0338i | −0.4272 − 0.1421i |
| w26 | 011010 | −0.2177 + 1.0243i | +0.4246 + 0.1370i | +0.4272 + 0.1421i |
| w27 | 011011 | −0.6056 + 0.8481i | +0.2326 + 1.3986i | −0.4272 − 0.1421i |
| w28 | 011100 | +0.2177 − 1.0243i | −0.1398 + 0.1309i | +0.2236 − 1.3784i |
| w29 | 011101 | +0.6056 − 0.8481i | −0.1680 + 1.0338i | −0.2236 − 1.3784i |
| w30 | 011110 | −0.2177 − 1.0243i | −0.4246 + 0.1370i | +0.2236 + 1.3784i |
| w31 | 011111 | −0.6056 − 0.8481i | −0.2326 + 1.3986i | −0.2236 + 1.3784i |
| w32 | 100000 | +0.1419 + 0.1122i | +1.0725 − 0.5328i | +1.0997 − 0.5419i |
| w33 | 100001 | +0.3733 + 0.1498i | +1.0771 − 0.9315i | −1.0997 − 0.5419i |
| w34 | 100010 | −0.1419 + 0.1122i | +0.7267 − 0.4592i | +1.0997 + 0.5419i |
| w35 | 100011 | −0.3733 + 0.1498i | +0.6956 − 0.8095i | −1.0997 + 0.5419i |
| w36 | 100100 | +0.1419 − 0.1122i | −1.0725 − 0.5328i | +1.0691 − 0.9443i |
| w37 | 100101 | +0.3733 − 0.1498i | −1.0771 − 0.9315i | −1.0691 − 0.9443i |
| w38 | 100110 | −0.1419 − 0.1122i | −0.7267 − 0.4592i | +1.0691 + 0.9443i |
| w39 | 100111 | −0.3733 − 0.1498i | −0.6956 − 0.8095i | −1.0691 + 0.9443i |
| w40 | 101000 | +0.7863 + 0.1337i | +0.1361 − 0.4023i | +0.1440 − 0.4167i |
| w41 | 101001 | +0.6394 + 0.3211i | +0.1373 − 0.7043i | −0.1440 − 0.4167i |
| w42 | 101010 | −0.7863 + 0.1337i | +0.4198 − 0.4151i | +0.1440 + 0.4167i |
| w43 | 101011 | −0.6394 + 0.3211i | +0.4114 − 0.7109i | −0.1440 − 0.4167i |
| w44 | 101100 | +0.7863 − 0.1337i | −0.1361 − 0.4023i | +0.1426 − 0.7102i |
| w45 | 101101 | +0.6394 − 0.3211i | −0.1373 − 0.7043i | −0.1426 − 0.7102i |
| w46 | 101110 | −0.7863 − 0.1337i | −0.4198 − 0.4151i | +0.1426 + 0.7102i |
| w47 | 101111 | −0.6394 − 0.3211i | −0.4114 − 0.7109i | −0.1426 + 0.7102i |

-continued

| w/MCS index | bit label | R = 5/8 (MCS = 22) (or R = 3/4 or 13/16) | R = 3/4 (MCS = 23) (or R = 5/8 or 13/16) | R = 13/16 (MCS = 24) (or R = 5/8 or 3/4) |
|---|---|---|---|---|
| w48 | 110000 | +0.1138 + 0.3999i | +1.0725 + 0.5328i | +0.7484 − 0.4663i |
| w49 | 110001 | +0.2891 + 0.3910i | +1.0771 + 0.9315i | −0.7484 − 0.4663i |
| w50 | 110010 | −0.1138 + 0.3999i | +0.7267 + 0.4592i | +0.7484 + 0.4663i |
| w51 | 110011 | −0.2891 + 0.3910i | +0.6956 + 0.8095i | −0.7484 + 0.4663i |
| w52 | 110100 | +0.1138 − 0.3999i | −1.0725 + 0.5328i | +0.7360 − 0.8042i |
| w53 | 110101 | +0.2891 − 0.3910i | −1.0771 + 0.9315i | −0.7360 − 0.8042i |
| w54 | 110110 | −0.1138 − 0.3999i | −0.7267 + 0.4592i | +0.7360 + 0.8042i |
| w55 | 110111 | −0.2891 − 0.3910i | −0.6955 + 0.8095i | −0.7360 + 0.8042i |
| w56 | 111000 | +0.1487 + 0.7260i | +0.1361 + 0.4023i | +0.4369 − 0.4317i |
| w57 | 111001 | +0.4397 + 0.5853i | +0.1373 + 0.7043i | −0.4369 − 0.4317i |
| w58 | 111010 | −0.1487 + 0.7260i | +0.4198 + 0.4151i | +0.4369 + 0.4317i |
| w59 | 111011 | −0.4397 + 0.5853i | +0.4114 + 0.7109i | −0.4369 + 0.4317i |
| w60 | 111100 | +0.1487 − 0.7260i | −0.1361 + 0.4023i | +0.4351 − 0.7394i |
| w61 | 111101 | +0.4397 − 0.5853i | −0.1373 + 0.7043i | −0.4351 − 0.7394i |
| w62 | 111110 | −0.1487 − 0.7260i | −0.4198 + 0.4151i | +0.4351 + 0.7394i |
| w63 | 111111 | −0.4397 − 0.5853i | −0.4114 + 0.7109i | −0.4351 + 0.7394i |

A3) 128-QAM NUC
for R=1/2 (or R=5/8, 3/4 or 13/16):

| w index | bit label | Constellation point |
|---|---|---|
| w0 | 0000000 | +0.7383 − 1.3947i |
| w1 | 0000000 | +0.2726 − 1.6070i |
| w2 | 0000001 | +0.7383 + 1.3947i |
| w3 | 0000001 | +0.2726 + 1.6070i |
| w4 | 0000010 | +1.5779 − 0.2230i |
| w5 | 0000010 | +1.2114 − 0.1662i |
| w6 | 0000011 | +1.5779 + 0.2230i |
| w7 | 0000011 | +1.2114 + 0.1662i |
| w8 | 0000100 | +0.5286 − 1.0997i |
| w9 | 0000100 | +0.1915 − 1.2689i |
| w10 | 0000101 | +0.5286 + 1.0997i |
| w11 | 0000101 | +0.1915 + 1.2689i |
| w12 | 0000110 | +0.7620 − 0.1121i |
| w13 | 0000110 | +0.9103 − 0.1272i |
| w14 | 0000111 | +0.7620 + 0.1121i |
| w15 | 0000111 | +0.9103 + 0.1272i |
| w16 | 0001000 | +1.0680 − 1.0753i |
| w17 | 0001000 | +1.0389 − 0.7336i |
| w18 | 0001001 | +1.0680 + 1.0753i |
| w19 | 0001001 | +1.0389 + 0.7336i |
| w20 | 0001010 | +1.4915 − 0.6927i |
| w21 | 0001010 | +1.1447 − 0.4719i |
| w22 | 0001011 | +1.4915 + 0.6927i |
| w23 | 0001011 | +1.1447 + 0.4719i |
| w24 | 0001100 | +0.6878 − 0.8578i |
| w25 | 0001100 | +0.7725 − 0.6723i |
| w26 | 0001101 | + 0.6878 + 0.8578i |
| w27 | 0001101 | +0.7725 + 0.6723i |
| w28 | 0001110 | +0.7359 − 0.3230i |
| w29 | 0001110 | +0.8236 − 0.3936i |
| w30 | 0001111 | +0.7359 + 0.3230i |
| w31 | 0001111 | +0.8236 + 0.3936i |
| w32 | 0010000 | −0.7383 − 1.3947i |
| w33 | 0010000 | −0.2726 − 1.6070i |
| w34 | 0010001 | −0.7383 + 1.3947i |
| w35 | 0010001 | −0.2726 + 1.6070i |
| w36 | 0010010 | −1.5779 − 0.2230i |
| w37 | 0010010 | −1.2114 − 0.1662i |
| w38 | 0010011 | −1.5779 + 0.2230i |
| w39 | 0010011 | −1.2114 + 0.1662i |
| w40 | 0010100 | −0.5286 − 1.0997i |
| w41 | 0010100 | −0.1915 − 1.2689i |
| w42 | 0010101 | −0.5286 + 1.0997i |
| w43 | 0010101 | −0.1915 + 1.2689i |
| w44 | 0010110 | −0.7620 − 0.1121i |
| w45 | 0010110 | −0.9103 − 0.1272i |
| w46 | 0010111 | −0.7620 + 0.1121i |
| w47 | 0010111 | −0.9103 + 0.1272i |
| w48 | 0011000 | −1.0680 − 1.0753i |
| w49 | 0011000 | −1.0389 − 0.7336i |
| w50 | 0011001 | −1.0680 + 1.0753i |
| w51 | 0011001 | −1.0389 + 0.7336i |
| w52 | 0011010 | −1.4915 − 0.6927i |
| w53 | 0011010 | −1.1447 − 0.4719i |
| w54 | 0011011 | −1.4915 + 0.6927i |
| w55 | 0011011 | −1.1447 + 0.4719i |
| w56 | 0011100 | −0.6878 − 0.8578i |
| w57 | 0011100 | −0.7725 − 0.6723i |
| w58 | 0011101 | −0.6878 + 0.8578i |
| w59 | 0011101 | −0.7725 + 0.6723i |
| w60 | 0011110 | −0.7359 − 0.3230i |
| w61 | 0011110 | −0.8236 − 0.3936i |
| w62 | 0011111 | −0.7359 + 0.3230i |
| w63 | 0011111 | −0.8236 + 0.3936i |
| w64 | 0100000 | +0.1315 − 0.7332i |
| w65 | 0100001 | +0.1038 − 0.7607i |
| w66 | 0100010 | +0.1315 + 0.7332i |
| w67 | 0100011 | +0.1038 + 0.7607i |
| w68 | 0100100 | +0.1461 − 0.1146i |
| w69 | 0100101 | +0.1573 − 0.1142i |
| w70 | 0100110 | +0.1461 + 0.1146i |
| w71 | 0100111 | +0.1573 + 0.1142i |
| w72 | 0101000 | +0.3255 − 0.9067i |
| w73 | 0101001 | +0.1588 − 1.0122i |
| w74 | 0101010 | +0.3255 + 0.9067i |
| w75 | 0101011 | +0.1588 + 1.0122i |
| w76 | 0101100 | +0.4774 − 0.1074i |
| w77 | 0101101 | +0.4323 − 0.1096i |
| w78 | 0101110 | +0.4774 + 0.1074i |
| w79 | 0101111 | +0.4323 + 0.1096i |
| w80 | 0101000 | +0.1647 − 0.5388i |
| w81 | 0101001 | +0.1629 − 0.5296i |
| w82 | 0101010 | +0.1647 + 0.5388i |
| w83 | 0101011 | +0.1629 + 0.5296i |
| w84 | 0101100 | +0.1535 − 0.3082i |
| w85 | 0101101 | +0.1629 − 0.3084i |
| w86 | 0101110 | +0.1535 + 0.3082i |
| w87 | 0101111 | +0.1629 + 0.3084i |
| w88 | 0101000 | +0.4535 − 0.6452i |
| w89 | 0101001 | +0.4645 − 0.5898i |
| w90 | 0101010 | +0.4535 + 0.6452i |
| w91 | 0101011 | +0.4645 + 0.5898i |
| w92 | 0101100 | +0.4853 − 0.3237i |
| w93 | 0101101 | +0.4637 − 0.3425i |
| w94 | 0101110 | +0.4853 + 0.3237i |
| w95 | 0101111 | +0.4637 + 0.3425i |
| w96 | 0110000 | −0.1315 − 0.7332i |
| w97 | 0110001 | −0.1038 − 0.7607i |
| w98 | 0110010 | −0.1315 + 0.7332i |
| w99 | 0110011 | −0.1038 + 0.7607i |
| w100 | 0110100 | −0.1461 − 0.1146i |
| w101 | 0110101 | −0.1573 − 0.1142i |
| w102 | 0110110 | −0.1461 + 0.1146i |
| w103 | 0110111 | −0.1573 + 0.1142i |

115

-continued

| w index | bit label | Constellation point |
| --- | --- | --- |
| w104 | 01101000 | −0.3255 − 0.9067i |
| w105 | 01101001 | −0.1588 − 1.0122i |
| w106 | 01101010 | −0.3255 + 0.9067i |
| w107 | 01101011 | −0.1588 + 1.0122i |
| w108 | 01101100 | −0.4774 − 0.1074i |
| w109 | 01101101 | −0.4323 − 0.1096i |
| w110 | 01101110 | −0.4774 + 0.1074i |
| w111 | 01101111 | −0.4323 + 0.1096i |
| w112 | 01110000 | −0.1647 − 0.5388i |
| w113 | 01110001 | −0.1629 − 0.5296i |
| w114 | 01110010 | −0.1647 + 0.5388i |
| w115 | 01110011 | −0.1629 + 0.5296i |
| w116 | 01110100 | −0.1535 − 0.3082i |
| w117 | 01110101 | −0.1629 − 0.3084i |
| w118 | 01110110 | −0.1535 + 0.3082i |
| w119 | 01110111 | −0.1629 + 0.3084i |
| w120 | 01111000 | −0.4535 − 0.6452i |
| w121 | 01111001 | −0.4645 − 0.5898i |
| w122 | 01111010 | −0.4535 + 0.6452i |
| w123 | 01111011 | −0.4645 + 0.5898i |
| w124 | 01111100 | −0.4853 − 0.3237i |
| w125 | 01111101 | −0.4637 − 0.3425i |
| w126 | 01111110 | −0.4853 + 0.3237i |
| w127 | 01111111 | −0.4637 + 0.3425i | for R=5/8 (or R=1/2, 3/4 or 13/16):

| w index | bit label | Constellation point |
| --- | --- | --- |
| w0 | 0000000 | +1.1470 + 0.4332i |
| w1 | 0000000 | +0.5553 + 0.4183i |
| w2 | 0000001 | +1.1804 + 0.7965i |
| w3 | 0000001 | +0.5406 + 0.6294i |
| w4 | 0000010 | +1.1470 − 0.4332i |
| w5 | 0000010 | +0.5553 − 0.4183i |
| w6 | 0000011 | +1.1804 − 0.7965i |
| w7 | 0000011 | +0.5406 − 0.6294i |
| w8 | 0000100 | −1.1470 + 0.4332i |
| w9 | 0000100 | −0.5553 + 0.4183i |
| w10 | 0000101 | −1.1804 + 0.7965i |
| w11 | 0000101 | −0.5406 + 0.6294i |
| w12 | 0000110 | −1.1470 − 0.4332i |
| w13 | 0000110 | −0.5553 − 0.4183i |
| w14 | 0000111 | −1.1804 − 0.7965i |
| w15 | 0000111 | −0.5406 − 0.6294i |
| w16 | 0001000 | +0.1029 + 0.4847i |
| w17 | 0001000 | +0.3416 + 0.4299i |
| w18 | 0001001 | +0.1167 + 0.6847i |
| w19 | 0001001 | +0.3403 + 0.6639i |
| w20 | 0001010 | +0.1029 − 0.4847i |
| w21 | 0001010 | +0.3416 − 0.4299i |
| w22 | 0001011 | +0.1167 − 0.6847i |
| w23 | 0001011 | +0.3403 − 0.6639i |
| w24 | 0001100 | −0.1029 + 0.4847i |
| w25 | 0001100 | −0.3416 + 0.4299i |
| w26 | 0001101 | −0.1167 + 0.6847i |
| w27 | 0001101 | −0.3403 + 0.6639i |
| w28 | 0001110 | −0.1029 − 0.4847i |
| w29 | 0001110 | −0.3416 − 0.4299i |
| w30 | 0001111 | −0.1167 − 0.6847i |
| w31 | 0001111 | −0.3403 − 0.6639i |
| w32 | 0010000 | +1.1636 + 0.1437i |
| w33 | 0010000 | +0.5673 + 0.1212i |
| w34 | 0010001 | +1.4805 + 0.1788i |
| w35 | 0010001 | +0.9781 + 1.1963i |
| w36 | 0010010 | +1.1636 − 0.1437i |
| w37 | 0010010 | +0.5673 − 0.1212i |
| w38 | 0010011 | +1.4805 − 0.1788i |
| w39 | 0010011 | +0.9781 − 1.1963i |
| w40 | 0010100 | −1.1636 + 0.1437i |
| w41 | 0010100 | −0.5673 + 0.1212i |
| w42 | 0010101 | −1.4805 + 0.1788i |
| w43 | 0010101 | −0.9781 + 1.1963i |
| w44 | 0010110 | −1.1636 − 0.1437i |
| w45 | 0010110 | −0.5673 − 0.1212i |

116

-continued

| w index | bit label | Constellation point |
| --- | --- | --- |
| w46 | 0010111 | −1.4805 − 0.1788i |
| w47 | 0010111 | −0.9781 − 1.1963i |
| w48 | 0011000 | +0.1058 + 0.0889i |
| w49 | 0011000 | +0.3723 + 0.1109i |
| w50 | 0011001 | +0.1939 + 1.4903i |
| w51 | 0011001 | +0.5867 + 1.4162i |
| w52 | 0011010 | +0.1058 − 0.0889i |
| w53 | 0011010 | +0.3723 − 0.1109i |
| w54 | 0011011 | +0.1939 − 1.4903i |
| w55 | 0011011 | +0.5867 − 1.4162i |
| w56 | 0011100 | −0.1058 + 0.0889i |
| w57 | 0011100 | −0.3723 + 0.1109i |
| w58 | 0011101 | −0.1939 + 1.4903i |
| w59 | 0011101 | −0.5867 + 1.4162i |
| w60 | 0011110 | −0.1058 − 0.0889i |
| w61 | 0011110 | −0.3723 − 0.1109i |
| w62 | 0011111 | −0.1939 − 1.4903i |
| w63 | 0011111 | −0.5867 − 1.4162i |
| w64 | 01000000 | +0.9015 + 0.4159i |
| w65 | 01000001 | +0.6908 + 0.3786i |
| w66 | 01000010 | +0.8996 + 0.6935i |
| w67 | 01000011 | +0.6580 + 0.7616i |
| w68 | 01000100 | +0.9015 − 0.4159i |
| w69 | 01000101 | +0.6908 − 0.3786i |
| w70 | 01000110 | +0.8996 − 0.6935i |
| w71 | 01000111 | +0.6580 − 0.7616i |
| w72 | 01001000 | −0.9015 + 0.4159i |
| w73 | 01001001 | −0.6908 + 0.3786i |
| w74 | 01001010 | −0.8996 + 0.6935i |
| w75 | 01001011 | −0.6580 + 0.7616i |
| w76 | 01001100 | −0.9015 − 0.4159i |
| w77 | 01001101 | −0.6908 − 0.3786i |
| w78 | 01001110 | −0.8996 − 0.6935i |
| w79 | 01001111 | −0.6580 − 0.7616i |
| w80 | 01010000 | +0.1029 + 0.3518i |
| w81 | 01010001 | +0.2989 + 0.3450i |
| w82 | 01010010 | +0.1222 + 0.9046i |
| w83 | 01010011 | +0.3701 + 0.8771i |
| w84 | 01010100 | +0.1029 − 0.3518i |
| w85 | 01010101 | +0.2989 − 0.3450i |
| w86 | 01010110 | +0.1222 − 0.9046i |
| w87 | 01010111 | +0.3701 − 0.8771i |
| w88 | 01011000 | −0.1029 + 0.3518i |
| w89 | 01011001 | −0.2989 + 0.3450i |
| w90 | 01011010 | −0.1222 + 0.9046i |
| w91 | 01011011 | −0.3701 + 0.8771i |
| w92 | 01011100 | −0.1029 − 0.3518i |
| w93 | 01011101 | −0.2989 − 0.3450i |
| w94 | 01011110 | −0.1222 − 0.9046i |
| w95 | 01011111 | −0.3701 − 0.8771i |
| w96 | 01100000 | +0.9136 + 0.1312i |
| w97 | 01100001 | +0.6911 + 0.1387i |
| w98 | 01100010 | +1.5526 + 0.5600i |
| w99 | 01100011 | +0.7165 + 1.0174i |
| w100 | 01100100 | +0.9136 − 0.1312i |
| w101 | 01100101 | +0.6911 − 0.1387i |
| w102 | 01100110 | +1.5526 − 0.5600i |
| w103 | 01100111 | +0.7165 − 1.0174i |
| w104 | 01101000 | −0.9136 + 0.1312i |
| w105 | 01101001 | −0.6911 + 0.1387i |
| w106 | 01101010 | −1.5526 + 0.5600i |
| w107 | 01101011 | −0.7165 + 1.0174i |
| w108 | 01101100 | −0.9136 − 0.1312i |
| w109 | 01101101 | −0.6911 − 0.1387i |
| w110 | 01101110 | −1.5526 − 0.5600i |
| w111 | 01101111 | −0.7165 − 1.0174i |
| w112 | 01110000 | +0.1130 + 0.1512i |
| w113 | 01110001 | +0.3195 + 0.1563i |
| w114 | 01110010 | +0.1450 + 1.1700i |
| w115 | 01110011 | +0.4379 + 1.1192i |
| w116 | 01110100 | +0.1130 − 0.1512i |
| w117 | 01110101 | +0.3195 − 0.1563i |
| w118 | 01110110 | +0.1450 − 1.1700i |
| w119 | 01110111 | +0.4379 − 1.1192i |
| w120 | 01111000 | −0.1130 + 0.1512i |
| w121 | 01111001 | −0.3195 + 0.1563i |
| w122 | 01111010 | −0.1450 + 1.1700i |

-continued

| w index | bit label | Constellation point |
|---|---|---|
| w123 | 01111011 | −0.4379 + 1.1192i |
| w124 | 01111100 | −0.1130 − 0.1512i |
| w125 | 01111101 | −0.3195 − 0.1563i |
| w126 | 01111110 | −0.1450 − 1.1700i |
| w127 | 01111111 | −0.4379 − 1.1192i | for R=3/4 (or R=1/2, 5/8 or 13/16):

| w index | bit label | Constellation point |
|---|---|---|
| w0 | 0000000 | +1.0484 + 0.3435i |
| w1 | 0000000 | +1.1392 + 0.5908i |
| w2 | 0000001 | −1.0484 + 0.3435i |
| w3 | 0000001 | −1.1392 + 0.5908i |
| w4 | 0000010 | +1.0205 + 0.1130i |
| w5 | 0000010 | +1.3137 + 0.1401i |
| w6 | 0000011 | −1.0205 + 0.1130i |
| w7 | 0000011 | −1.3137 + 0.1401i |
| w8 | 0000100 | +0.8050 + 0.3736i |
| w9 | 0000100 | +0.8767 + 0.6075i |
| w10 | 0000101 | −0.8050 + 0.3736i |
| w11 | 0000101 | −0.8767 + 0.6075i |
| w12 | 0000110 | +0.7794 + 0.1239i |
| w13 | 0000110 | +1.4466 + 0.4199i |
| w14 | 0000111 | −0.7794 + 0.1239i |
| w15 | 0000111 | −1.4466 + 0.4199i |
| w16 | 0001000 | +0.5512 + 0.5784i |
| w17 | 0001000 | +0.5926 + 0.7787i |
| w18 | 0001001 | −0.5512 + 0.5784i |
| w19 | 0001001 | −0.5926 + 0.7787i |
| w20 | 0001010 | +0.4970 + 0.0732i |
| w21 | 0001010 | +1.1801 + 0.9322i |
| w22 | 0001011 | −0.4970 + 0.0732i |
| w23 | 0001011 | −1.1801 + 0.9322i |
| w24 | 0001100 | +0.5773 + 0.3945i |
| w25 | 0001100 | +0.8273 + 0.8515i |
| w26 | 0001101 | −0.5773 + 0.3945i |
| w27 | 0001101 | −0.8273 + 0.8515i |
| w28 | 0001110 | +0.5611 + 0.2103i |
| w29 | 0001110 | +0.9097 + 1.1442i |
| w30 | 0001111 | −0.5611 + 0.2103i |
| w31 | 0001111 | −0.9097 + 1.1442i |
| w32 | 0010000 | +0.1137 + 0.6007i |
| w33 | 0010000 | +0.1177 + 0.7939i |
| w34 | 0010001 | −0.1137 + 0.6007i |
| w35 | 0010001 | −0.1177 + 0.7939i |
| w36 | 0010010 | +0.0988 + 0.0864i |
| w37 | 0010010 | +0.1761 + 1.5225i |
| w38 | 0010011 | −0.0988 + 0.0864i |
| w39 | 0010011 | −0.1761 + 1.5225i |
| w40 | 0010100 | +0.1075 + 0.4242i |
| w41 | 0010100 | +0.1232 + 1.0065i |
| w42 | 0010101 | −0.1075 + 0.4242i |
| w43 | 0010101 | −0.1232 + 1.0065i |
| w44 | 0010110 | +0.1016 + 0.2562i |
| w45 | 0010110 | +0.1403 + 1.2447i |
| w46 | 0010111 | −0.1016 + 0.2562i |
| w47 | 0010111 | −0.1403 + 1.2447i |
| w48 | 0011000 | +0.3358 + 0.5918i |
| w49 | 0011000 | +0.3537 + 0.7995i |
| w50 | 0011001 | −0.3358 + 0.5918i |
| w51 | 0011001 | −0.3537 + 0.7995i |
| w52 | 0011010 | +0.2966 + 0.0872i |
| w53 | 0011010 | +0.4861 + 1.3847i |
| w54 | 0011011 | −0.2966 + 0.0872i |
| w55 | 0011011 | −0.4861 + 1.3847i |
| w56 | 0011100 | +0.3322 + 0.4087i |
| w57 | 0011100 | +0.3791 + 1.0277i |
| w58 | 0011101 | −0.3322 + 0.4087i |
| w59 | 0011101 | −0.3791 + 1.0277i |
| w60 | 0011110 | +0.3142 + 0.2509i |
| w61 | 0011110 | +0.6160 + 1.1277i |
| w62 | 0011111 | −0.3142 + 0.2509i |
| w63 | 0011111 | −0.6160 + 1.1277i |
| w64 | 01000000 | +1.0484 − 0.3435i |
| w65 | 01000001 | +1.1392 − 0.5908i |
| w66 | 01000010 | −1.0484 − 0.3435i |
| w67 | 01000011 | −1.1392 − 0.5908i |
| w68 | 01000100 | +1.0205 − 0.1130i |
| w69 | 01000101 | +1.3137 − 0.1401i |
| w70 | 01000110 | −1.0205 − 0.1130i |
| w71 | 01000111 | −1.3137 − 0.1401i |
| w72 | 01001000 | +0.8050 − 0.3736i |
| w73 | 01001001 | +0.8767 − 0.6075i |
| w74 | 01001010 | −0.8050 − 0.3736i |
| w75 | 01001011 | −0.8767 − 0.6075i |
| w76 | 01001100 | +0.7794 − 0.1239i |
| w77 | 01001101 | +1.4466 − 0.4199i |
| w78 | 01001110 | −0.7794 − 0.1239i |
| w79 | 01001111 | −1.4466 − 0.4199i |
| w80 | 01010000 | +0.5512 − 0.5784i |
| w81 | 01010001 | +0.5926 − 0.7787i |
| w82 | 01010010 | −0.5512 − 0.5784i |
| w83 | 01010011 | −0.5926 − 0.7787i |
| w84 | 01010100 | +0.4970 − 0.0732i |
| w85 | 01010101 | +1.1801 − 0.9322i |
| w86 | 01010110 | −0.4970 − 0.0732i |
| w87 | 01010111 | −1.1801 − 0.9322i |
| w88 | 01011000 | +0.5773 − 0.3945i |
| w89 | 01011001 | +0.8273 − 0.8515i |
| w90 | 01011010 | −0.5773 − 0.3945i |
| w91 | 01011011 | −0.8273 − 0.8515i |
| w92 | 01011100 | +0.5611 − 0.2103i |
| w93 | 01011101 | +0.9097 − 1.1442i |
| w94 | 01011110 | −0.5611 − 0.2103i |
| w95 | 01011111 | −0.9097 − 1.1442i |
| w96 | 01100000 | +0.1137 − 0.6007i |
| w97 | 01100001 | +0.1177 − 0.7939i |
| w98 | 01100010 | −0.1137 − 0.6007i |
| w99 | 01100011 | −0.1177 − 0.7939i |
| w100 | 01100100 | +0.0988 − 0.0864i |
| w101 | 01100101 | +0.1761 − 1.5225i |
| w102 | 01100110 | −0.0988 − 0.0864i |
| w103 | 01100111 | −0.1761 − 1.5225i |
| w104 | 01101000 | +0.1075 − 0.4242i |
| w105 | 01101001 | +0.1232 − 1.0065i |
| w106 | 01101010 | −0.1075 − 0.4242i |
| w107 | 01101011 | −0.1232 − 1.0065i |
| w108 | 01101100 | +0.1016 − 0.2562i |
| w109 | 01101101 | +0.1403 − 1.2447i |
| w110 | 01101110 | −0.1016 − 0.2562i |
| w111 | 01101111 | −0.1403 − 1.2447i |
| w112 | 01110000 | +0.3358 − 0.5918i |
| w113 | 01110001 | +0.3537 − 0.7995i |
| w114 | 01110010 | −0.3358 − 0.5918i |
| w115 | 01110011 | −0.3537 − 0.7995i |
| w116 | 01110100 | +0.2966 − 0.0872i |
| w117 | 01110101 | +0.4861 − 1.3847i |
| w118 | 01110110 | −0.2966 − 0.0872i |
| w119 | 01110111 | −0.4861 − 1.3847i |
| w120 | 01111000 | +0.3322 − 0.4087i |
| w121 | 01111001 | +0.3791 − 1.0277i |
| w122 | 01111010 | −0.3322 − 0.4087i |
| w123 | 01111011 | −0.3791 − 1.0277i |
| w124 | 01111100 | +0.3142 − 0.2509i |
| w125 | 01111101 | +0.6160 − 1.1277i |
| w126 | 01111110 | −0.3142 − 0.2509i |
| w127 | 01111111 | −0.6160 − 1.1277i | for R=13/16 (or R=1/2, 5/8 or 3/4):

| w index | bit label | Constellation point |
|---|---|---|
| w0 | 0000000 | +1.0422 + 0.3376i |
| w1 | 0000000 | +1.0422 + 0.3376i |
| w2 | 0000001 | −1.0422 + 0.3376i |
| w3 | 0000001 | −1.0422 + 0.3376i |
| w4 | 0000010 | +0.7966 + 0.3496i |
| w5 | 0000010 | +0.7966 − 0.3496i |
| w6 | 0000011 | −0.7966 + 0.3496i |

-continued

| w index | bit label | Constellation point |
|---|---|---|
| w7 | 0000011 | −0.7966 − 0.3496i |
| w8 | 0000100 | +1.1154 + 0.5839i |
| w9 | 0000100 | +1.1154 − 0.5839i |
| w10 | 0000101 | −1.1154 + 0.5839i |
| w11 | 0000101 | −1.1154 − 0.5839i |
| w12 | 0000110 | +0.8563 + 0.5705i |
| w13 | 0000110 | +0.8563 − 0.5705i |
| w14 | 0000111 | −0.8563 + 0.5705i |
| w15 | 0000111 | −0.8563 − 0.5705i |
| w16 | 0001000 | +1.0010 + 0.1105i |
| w17 | 0001000 | +1.0010 − 0.1105i |
| w18 | 0001001 | −1.0010 + 0.1105i |
| w19 | 0001001 | −1.0010 − 0.1105i |
| w20 | 0001010 | +0.7613 + 0.1187i |
| w21 | 0001010 | +0.7613 − 0.1187i |
| w22 | 0001011 | −0.7613 + 0.1187i |
| w23 | 0001011 | −0.7613 − 0.1187i |
| w24 | 0001100 | +1.2844 + 0.1345i |
| w25 | 0001100 | +1.2844 − 0.1345i |
| w26 | 0001101 | −1.2844 + 0.1345i |
| w27 | 0001101 | −1.2844 − 0.1345i |
| w28 | 0001110 | +1.4001 + 0.4092i |
| w29 | 0001110 | +1.4001 − 0.4092i |
| w30 | 0001111 | −1.4001 + 0.4092i |
| w31 | 0001111 | −1.4001 − 0.4092i |
| w32 | 0010000 | +0.1125 + 0.6269i |
| w33 | 0010000 | +0.1125 − 0.6269i |
| w34 | 0010001 | −0.1125 + 0.6269i |
| w35 | 0010001 | −0.1125 − 0.6269i |
| w36 | 0010010 | +0.1109 + 0.4454i |
| w37 | 0010010 | +0.1109 − 0.4454i |
| w38 | 0010011 | −0.1109 + 0.4454i |
| w39 | 0010011 | −0.1109 − 0.4454i |
| w40 | 0010100 | +0.1155 + 0.8217i |
| w41 | 0010100 | +0.1155 − 0.8217i |
| w42 | 0010101 | −0.1155 + 0.8217i |
| w43 | 0010101 | −0.1155 − 0.8217i |
| w44 | 0010110 | +0.1239 + 1.0311i |
| w45 | 0010110 | +0.1239 − 1.0311i |
| w46 | 0010111 | −0.1239 + 1.0311i |
| w47 | 0010111 | −0.1239 − 1.0311i |
| w48 | 0011000 | +0.0978 + 0.0913i |
| w49 | 0011000 | +0.0978 − 0.0913i |
| w50 | 0011001 | −0.0978 + 0.0913i |
| w51 | 0011001 | −0.0978 − 0.0913i |
| w52 | 0011010 | +0.1038 + 0.2705i |
| w53 | 0011010 | +0.1038 − 0.2705i |
| w54 | 0011011 | −0.1038 + 0.2705i |
| w55 | 0011011 | −0.1038 − 0.2705i |
| w56 | 0011100 | +0.1646 + 1.5274i |
| w57 | 0011100 | +0.1646 − 1.5274i |
| w58 | 0011101 | −0.1646 + 1.5274i |
| w59 | 0011101 | −0.1646 − 1.5274i |
| w60 | 0011110 | +0.1345 + 1.2611i |
| w61 | 0011110 | +0.1345 − 1.2611i |
| w62 | 0011111 | −0.1345 + 1.2611i |
| w63 | 0011111 | −0.1345 − 1.2611i |
| w64 | 01000000 | +0.5556 + 0.6306i |
| w65 | 01000001 | +0.5556 − 0.6306i |
| w66 | 01000010 | −0.5556 + 0.6306i |
| w67 | 01000011 | −0.5556 − 0.6306i |
| w68 | 01000100 | +0.5761 + 0.4286i |
| w69 | 01000101 | +0.5761 − 0.4286i |
| w70 | 01000110 | −0.5761 + 0.4286i |
| w71 | 01000111 | −0.5761 − 0.4286i |
| w72 | 01001000 | +0.5970 + 0.8482i |
| w73 | 01001001 | +0.5970 − 0.5482i |
| w74 | 01001010 | −0.5970 + 0.8482i |
| w75 | 01001011 | −0.5970 − 0.8482i |
| w76 | 01001100 | +0.8378 + 0.8041i |
| w77 | 01001101 | +0.8378 − 0.8041i |
| w78 | 01001110 | −0.8378 + 0.8041i |
| w79 | 01001111 | −0.8378 − 0.8041i |
| w80 | 01010000 | +0.4942 + 0.0780i |
| w81 | 01010001 | +0.4942 − 0.0780i |
| w82 | 01010010 | −0.4942 + 0.0780i |
| w83 | 01010011 | −0.4942 − 0.0780i |

-continued

| w index | bit label | Constellation point |
|---|---|---|
| w84 | 01010100 | +0.5456 + 0.2367i |
| w85 | 01010101 | +0.5456 − 0.2367i |
| w86 | 01010110 | −0.5456 + 0.2367i |
| w87 | 01010111 | −0.5456 − 0.2367i |
| w88 | 01011000 | +1.1670 + 0.8997i |
| w89 | 01011001 | +1.1670 − 0.8997i |
| w90 | 01011010 | −1.1670 + 0.8997i |
| w91 | 01011011 | −1.1670 − 0.8997i |
| w92 | 01011100 | +0.9031 + 1.0698i |
| w93 | 01011101 | +0.9031 − 1.0698i |
| w94 | 01011110 | −0.9031 + 1.0698i |
| w95 | 01011111 | −0.9031 − 1.0698i |
| w96 | 01100000 | +0.3351 + 0.6308i |
| w97 | 01100001 | +0.3351 − 0.6308i |
| w98 | 01100010 | −0.3351 + 0.6308i |
| w99 | 01100011 | −0.3351 − 0.6308i |
| w100 | 01100100 | +0.3383 + 0.4404i |
| w101 | 01100101 | +0.3383 − 0.4404i |
| w102 | 01100110 | −0.3383 + 0.4404i |
| w103 | 01100111 | −0.3383 − 0.4404i |
| w104 | 01101000 | +0.3510 + 0.8405i |
| w105 | 01101001 | +0.3510 − 0.8405i |
| w106 | 01101010 | −0.3510 + 0.8405i |
| w107 | 01101011 | −0.3510 − 0.8405i |
| w108 | 01101100 | +0.3850 + 1.0724i |
| w109 | 01101101 | +0.3850 − 1.0724i |
| w110 | 01101110 | −0.3850 + 1.0724i |
| w111 | 01101111 | −0.3850 − 1.0724i |
| w112 | 01110000 | +0.2935 + 0.0906i |
| w113 | 01110001 | +0.2935 − 0.0906i |
| w114 | 01110010 | −0.2935 + 0.0906i |
| w115 | 01110011 | −0.2935 − 0.0906i |
| w116 | 01110100 | +0.3172 + 0.2665i |
| w117 | 01110101 | +0.3172 − 0.2666i |
| w118 | 01110110 | −0.3172 + 0.2666i |
| w119 | 01110111 | −0.3172 − 0.2666i |
| w120 | 01111000 | +0.4543 + 1.3933i |
| w121 | 01111001 | +0.4543 − 1.3933i |
| w122 | 01111010 | −0.4543 + 1.3933i |
| w123 | 01111011 | −0.4543 − 1.3933i |
| w124 | 01111100 | +0.6436 + 1.1770i |
| w125 | 01111101 | +0.6436 − 1.1770i |
| w126 | 01111110 | −0.6436 + 1.1770i |
| w127 | 01111111 | −0.6436 − 1.1770i |

A4) 256-QAM NUC
for R=1/2 (or R=5/8, 3/4 or 13/16):

| w index | bit label | Constellation point |
|---|---|---|
| w0 | 0000000 | −1.2901 + 1.0495i |
| w1 | 0000000 | −0.7273 + 0.6160i |
| w2 | 0000001 | −1.0646 + 1.2876i |
| w3 | 0000001 | −0.5707 + 0.7662i |
| w4 | 0000010 | +1.2901 + 1.0495i |
| w5 | 0000010 | +0.7273 + 0.6160i |
| w6 | 0000011 | +1.0646 + 1.2876i |
| w7 | 0000011 | +0.5707 + 0.7662i |
| w8 | 0000100 | −1.4625 + 0.7740i |
| w9 | 0000100 | −0.8177 + 0.4841i |
| w10 | 0000101 | −0.7949 + 1.4772i |
| w11 | 0000101 | −0.4490 + 0.8461i |
| w12 | 0000110 | +1.4625 + 0.7740i |
| w13 | 0000110 | +0.8177 + 0.4841i |
| w14 | 0000111 | +0.7949 + 1.4772i |
| w15 | 0000111 | +0.4490 + 0.8461i |
| w16 | 0001000 | −0.2844 + 0.1296i |
| w17 | 0001000 | −0.5902 + 0.4857i |
| w18 | 0001001 | −0.1053 + 0.1494i |
| w19 | 0001001 | −0.4294 + 0.6363i |
| w20 | 0001010 | +0.2844 + 0.1296i |
| w21 | 0001010 | +0.5902 + 0.4857i |
| w22 | 0001011 | +0.1053 + 0.1494i |
| w23 | 0001011 | +0.4294 + 0.6363i |
| w24 | 0001100 | −0.2853 + 0.1309i |

-continued

| w index | bit label | Constellation point |
|---|---|---|
| w25 | 0001100 | −0.6355 + 0.4185i |
| w26 | 0001101 | −0.1052 + 0.1495i |
| w27 | 0001101 | −0.3744 + 0.6744i |
| w28 | 0001110 | +0.2853 + 0.1309i |
| w29 | 0001110 | +0.6355 + 0.4185i |
| w30 | 0001111 | +0.1052 + 0.1495i |
| w31 | 0001111 | +0.3744 + 0.6744i |
| w32 | 0010000 | −1.6350 + 0.1593i |
| w33 | 0010000 | −0.9430 + 0.1100i |
| w34 | 0010001 | −0.1658 + 1.6747i |
| w35 | 0010001 | −0.1088 + 0.9530i |
| w36 | 0010010 | +1.6350 + 0.1593i |
| w37 | 0010010 | +0.9430 + 0.1100i |
| w38 | 0010011 | +0.1658 + 1.6747i |
| w39 | 0010011 | +0.1088 + 0.9530i |
| w40 | 0010100 | −1.5776 + 0.4735i |
| w41 | 0010100 | −0.9069 + 0.2829i |
| w42 | 0010101 | −0.4907 + 1.6084i |
| w43 | 0010101 | −0.2464 + 0.9270i |
| w44 | 0010110 | +1.5776 + 0.4735i |
| w45 | 0010110 | +0.9069 + 0.2829i |
| w46 | 0010111 | +0.4907 + 1.6084i |
| w47 | 0010111 | +0.2464 + 0.9270i |
| w48 | 0011000 | −0.3237 + 0.0849i |
| w49 | 0011000 | −0.7502 + 0.1138i |
| w50 | 0011001 | −0.0872 + 0.1390i |
| w51 | 0011001 | −0.1091 + 0.7656i |
| w52 | 0011010 | +0.3237 + 0.0849i |
| w53 | 0011010 | +0.7502 + 0.1138i |
| w54 | 0011011 | +0.0872 + 0.1390i |
| w55 | 0011011 | +0.1091 + 0.7656i |
| w56 | 0011100 | −0.3228 + 0.0867i |
| w57 | 0011100 | −0.7325 + 0.2088i |
| w58 | 0011101 | −0.0871 + 0.1392i |
| w59 | 0011101 | −0.1699 + 0.7537i |
| w60 | 0011110 | +0.3228 + 0.0867i |
| w61 | 0011110 | +0.7325 + 0.2088i |
| w62 | 0011111 | +0.0871 + 0.1392i |
| w63 | 0011111 | +0.1699 + 0.7537i |
| w64 | 01000000 | −1.2901 − 1.0495i |
| w65 | 01000001 | −0.7273 − 0.6160i |
| w66 | 01000010 | −1.0646 − 1.2876i |
| w67 | 01000011 | −0.5707 − 0.7662i |
| w68 | 01000100 | +1.2901 − 1.0495i |
| w69 | 01000101 | +0.7273 − 0.6160i |
| w70 | 01000110 | +1.0646 − 1.2876i |
| w71 | 01000111 | +0.5707 − 0.7662i |
| w72 | 01001000 | −1.4625 − 0.7740i |
| w73 | 01001001 | −0.8177 − 0.4841i |
| w74 | 01001010 | −0.7949 − 1.4772i |
| w75 | 01001011 | −0.4490 − 0.8461i |
| w76 | 01001100 | +1.4625 − 0.7740i |
| w77 | 01001101 | +0.8177 − 0.4841i |
| w78 | 01001110 | +0.7949 − 1.4772i |
| w79 | 01001111 | +0.4490 − 0.8461i |
| w80 | 01010000 | −0.2844 − 0.1296i |
| w81 | 01010001 | −0.5902 − 0.4857i |
| w82 | 01010010 | −0.1053 − 0.1494i |
| w83 | 01010011 | −0.4294 − 0.6363i |
| w84 | 01010100 | +0.2844 − 0.1296i |
| w85 | 01010101 | +0.5902 − 0.4857i |
| w86 | 01010110 | +0.1053 − 0.1494i |
| w87 | 01010111 | +0.4294 − 0.6363i |
| w88 | 01011000 | −0.2853 − 0.1309i |
| w89 | 01011001 | −0.6355 − 0.4185i |
| w90 | 01011010 | −0.1052 − 0.1495i |
| w91 | 01011011 | −0.3744 − 0.6744i |
| w92 | 01011100 | +0.2853 − 0.1309i |
| w93 | 01011101 | +0.6355 − 0.4185i |
| w94 | 01011110 | +0.1052 − 0.1495i |
| w95 | 01011111 | +0.3744 − 0.6744i |
| w96 | 01100000 | −1.6350 − 0.1593i |
| w97 | 01100001 | −0.9430 − 0.1100i |
| w98 | 01100010 | −0.1658 − 1.6747i |
| w99 | 01100011 | −0.1088 − 0.9530i |
| w100 | 01100100 | +1.6350 − 0.1593i |
| w101 | 01100101 | +0.9430 − 0.1100i |
| w102 | 01100110 | +0.1658 − 1.6747i |
| w103 | 01100111 | +0.1088 − 0.9530i |
| w104 | 01101000 | −1.5776 − 0.4735i |
| w105 | 01101001 | −0.9069 − 0.2829i |
| w106 | 01101010 | −0.4907 − 1.6084i |
| w107 | 01101011 | −0.2464 − 0.9270i |
| w108 | 01101100 | +1.5776 − 0.4735i |
| w109 | 01101101 | +0.9069 − 0.2829i |
| w110 | 01101110 | +0.4907 − 1.6084i |
| w111 | 01101111 | +0.2464 − 0.9270i |
| w112 | 01110000 | −0.3237 − 0.0849i |
| w113 | 01110001 | −0.7502 − 0.1138i |
| w114 | 01110010 | −0.0872 − 0.1390i |
| w115 | 01110011 | −0.1091 − 0.7656i |
| w116 | 01110100 | +0.3237 − 0.0849i |
| w117 | 01110101 | +0.7502 − 0.1138i |
| w118 | 01110110 | +0.0872 − 0.1390i |
| w119 | 01110111 | +0.1091 − 0.7656i |
| w120 | 01111000 | −0.3228 − 0.0867i |
| w121 | 01111001 | −0.7325 − 0.2088i |
| w122 | 01111010 | −0.0871 − 0.1392i |
| w123 | 01111011 | −0.1699 − 0.7537i |
| w124 | 01111100 | +0.3228 − 0.0867i |
| w125 | 01111101 | +0.7325 − 0.2088i |
| w126 | 01111110 | +0.0871 − 0.1392i |
| w127 | 01111111 | +0.1699 − 0.7537i |
| w128 | 10000000 | −1.0382 + 0.8623i |
| w129 | 10000001 | −0.8504 + 0.7217i |
| w130 | 10000010 | −0.8555 + 1.0542i |
| w131 | 10000011 | −0.6961 + 0.8850i |
| w132 | 10000100 | +1.0382 + 0.8623i |
| w133 | 10000101 | +0.8504 + 0.7217i |
| w134 | 10000110 | +0.8555 + 1.0542i |
| w135 | 10000111 | +0.6961 + 0.8850i |
| w136 | 10001000 | −1.1794 + 0.6376i |
| w137 | 10001001 | −0.9638 + 0.5407i |
| w138 | 10001010 | −0.6363 + 1.2064i |
| w139 | 10001011 | −0.5229 + 1.0037i |
| w140 | 10001100 | +1.1794 + 0.6376i |
| w141 | 10001101 | +0.9638 + 0.5407i |
| w142 | 10001110 | +0.6363 + 1.2064i |
| w143 | 10001111 | +0.5229 + 1.0037i |
| w144 | 10010000 | −0.3734 + 0.2560i |
| w145 | 10010001 | −0.4968 + 0.3947i |
| w146 | 10010010 | −0.1938 + 0.3621i |
| w147 | 10010011 | −0.3224 + 0.5236i |
| w148 | 10010100 | +0.3734 + 0.2560i |
| w149 | 10010101 | +0.4968 + 0.3947i |
| w150 | 10010110 | +0.1938 + 0.3621i |
| w151 | 10010111 | +0.3224 + 0.5236i |
| w152 | 10011000 | −0.3799 + 0.2517i |
| w153 | 10011001 | −0.5231 + 0.3644i |
| w154 | 10011010 | −0.1909 + 0.3627i |
| w155 | 10011011 | −0.3016 + 0.5347i |
| w156 | 10011100 | +0.3799 + 0.2517i |
| w157 | 10011101 | +0.5231 + 0.3644i |
| w158 | 10011110 | +0.1909 + 0.3627i |
| w159 | 10011111 | +0.3016 + 0.5347i |
| w160 | 10100000 | −1.3225 + 0.1320i |
| w161 | 10100001 | −1.0854 + 0.1139i |
| w162 | 10100010 | −0.1322 + 1.3631i |
| w163 | 10100011 | −0.1124 + 1.1327i |
| w164 | 10100100 | +1.3225 + 0.1320i |
| w165 | 10100101 | +1.0854 + 0.1139i |
| w166 | 10100110 | +0.1322 + 1.3631i |
| w167 | 10100111 | +0.1124 + 1.1327i |
| w168 | 10101000 | −1.2742 + 0.3922i |
| w169 | 10101001 | −1.0441 + 0.3296i |
| w170 | 10101010 | −0.3929 + 1.3102i |
| w171 | 10101011 | −0.3160 + 1.0913i |
| w172 | 10101100 | +1.2742 + 0.3922i |
| w173 | 10101101 | +1.0441 + 0.3296i |
| w174 | 10101110 | +0.3929 + 1.3102i |
| w175 | 10101111 | +0.3160 + 1.0913i |
| w176 | 10110000 | −0.4582 + 0.1123i |
| w177 | 10110001 | −0.6473 + 0.1138i |
| w178 | 10110010 | −0.0928 + 0.3970i |

| w index | bit label | Constellation point |
| --- | --- | --- |
| w179 | 10110011 | −0.1054 + 0.5979i |
| w180 | 10110100 | +0.4582 + 0.1123i |
| w181 | 10110101 | +0.6473 + 0.1138i |
| w182 | 10110110 | +0.0928 + 0.3970i |
| w183 | 10110111 | +0.1054 + 0.5979i |
| w184 | 10111000 | −0.4545 + 0.1251i |
| w185 | 10111001 | −0.6339 + 0.1702i |
| w186 | 10111010 | −0.0937 + 0.3973i |
| w187 | 10111011 | −0.1230 + 0.5949i |
| w188 | 10111100 | +0.4545 + 0.1251i |
| w189 | 10111101 | +0.6339 + 0.1702i |
| w190 | 10111110 | +0.0937 + 0.3973i |
| w191 | 10111111 | +0.1230 + 0.5949i |
| w192 | 11000000 | −1.0382 − 0.8623i |
| w193 | 11000001 | −0.8504 − 0.7217i |
| w194 | 11000010 | −0.8555 − 1.0542i |
| w195 | 11000011 | −0.6961 − 0.8850i |
| w196 | 11000100 | +1.0382 − 0.8623i |
| w197 | 11000101 | +0.8504 − 0.7217i |
| w198 | 11000110 | +0.8555 − 1.0542i |
| w199 | 11000111 | +0.6961 − 0.8850i |
| w200 | 11001000 | −1.1794 − 0.6376i |
| w201 | 11001001 | −0.9638 − 0.5407i |
| w202 | 11001010 | −0.6363 − 1.2064i |
| w203 | 11001011 | −0.5229 − 1.0037i |
| w204 | 11001100 | +1.1794 − 0.6376i |
| w205 | 11001101 | +0.9638 − 0.5407i |
| w206 | 11001110 | +0.6363 − 1.2064i |
| w207 | 11001111 | +0.5229 − 1.0037i |
| w208 | 11010000 | −0.3734 − 0.2560i |
| w209 | 11010001 | −0.4968 − 0.3947i |
| w210 | 11010010 | −0.1938 − 0.3621i |
| w211 | 11010011 | −0.3224 − 0.5236i |
| w212 | 11010100 | +0.3734 − 0.2560i |
| w213 | 11010101 | +0.4968 − 0.3947i |
| w214 | 11010110 | +0.1938 − 0.3621i |
| w215 | 11010111 | +0.3224 − 0.5236i |
| w216 | 11011000 | −0.3799 − 0.2517i |
| w217 | 11011001 | −0.5231 − 0.3644i |
| w218 | 11011010 | −0.1909 − 0.3627i |
| w219 | 11011011 | −0.3016 − 0.5347i |
| w220 | 11011100 | +0.3799 − 0.2517i |
| w221 | 11011101 | +0.5231 − 0.3644i |
| w222 | 11011110 | +0.1909 − 0.3627i |
| w223 | 11011111 | +0.3016 − 0.5347i |
| w224 | 11100000 | −1.3225 − 0.1320i |
| w225 | 11100001 | −1.0854 − 0.1139i |
| w226 | 11100010 | −0.1322 − 1.3631i |
| w227 | 11100011 | −0.1124 − 1.1327i |
| w228 | 11100100 | +1.3225 − 0.1320i |
| w229 | 11100101 | +1.0854 − 0.1139i |
| w230 | 11100110 | +0.1322 − 1.3631i |
| w231 | 11100111 | +0.1124 − 1.1327i |
| w232 | 11101000 | −1.2742 − 0.3922i |
| w233 | 11101001 | −1.0441 − 0.3296i |
| w234 | 11101010 | −0.3929 − 1.3102i |
| w235 | 11101011 | −0.3160 − 1.0913i |
| w236 | 11101100 | +1.2742 − 0.3922i |
| w237 | 11101101 | +1.0441 − 0.3296i |
| w238 | 11101110 | +0.3929 − 1.3102i |
| w239 | 11101111 | +0.3160 − 1.0913i |
| w240 | 11110000 | −0.4582 − 0.1123i |
| w241 | 11110001 | −0.6473 − 0.1138i |
| w242 | 11110010 | −0.0928 − 0.3970i |
| w243 | 11110011 | −0.1054 − 0.5979i |
| w244 | 11110100 | +0.4582 − 0.1123i |
| w245 | 11110101 | +0.6473 − 0.1138i |
| w246 | 11110110 | +0.0928 − 0.3970i |
| w247 | 11110111 | +0.1054 − 0.5979i |
| w248 | 11111000 | −0.4545 − 0.1251i |
| w249 | 11111001 | −0.6339 − 0.1702i |
| w250 | 11111010 | −0.0937 − 0.3973i |
| w251 | 11111011 | −0.1230 − 0.5949i |
| w252 | 11111100 | +0.4545 − 0.1251i |
| w253 | 11111101 | +0.6339 − 0.1702i |
| w254 | 11111110 | +0.0937 − 0.3973i |
| w255 | 11111111 | +0.1230 − 0.5949i | for R=5/8 (or R=1/2, 3/4 or 13/16):

| w index | bit label | Constellation point |
| --- | --- | --- |
| w0 | 0000000 | −1.2537 + 1.0045i |
| w1 | 0000000 | −0.2443 + 0.2114i |
| w2 | 0000001 | −0.7404 + 0.6074i |
| w3 | 0000001 | −0.6039 + 0.5118i |
| w4 | 0000010 | −1.5761 + 0.1512i |
| w5 | 0000010 | −0.2545 + 0.0723i |
| w6 | 0000011 | −0.9317 + 0.0939i |
| w7 | 0000011 | −0.7729 + 0.0813i |
| w8 | 0000100 | +1.2537 + 1.0045i |
| w9 | 0000100 | +0.2443 + 0.2114i |
| w10 | 0000101 | +0.7404 + 0.6074i |
| w11 | 0000101 | +0.6039 + 0.5118i |
| w12 | 0000110 | +1.5761 + 0.1512i |
| w13 | 0000110 | +0.2545 + 0.0723i |
| w14 | 0000111 | +0.9317 + 0.0939i |
| w15 | 0000111 | +0.7729 + 0.0813i |
| w16 | 0001000 | −1.2537 − 1.0045i |
| w17 | 0001000 | −0.2443 − 0.2114i |
| w18 | 0001001 | −0.7404 − 0.6074i |
| w19 | 0001001 | −0.6039 − 0.5118i |
| w20 | 0001010 | −1.5761 − 0.1512i |
| w21 | 0001010 | −0.2545 − 0.0723i |
| w22 | 0001011 | −0.9317 − 0.0939i |
| w23 | 0001011 | −0.7729 − 0.0813i |
| w24 | 0001100 | +1.2537 − 1.0045i |
| w25 | 0001100 | +0.2443 − 0.2114i |
| w26 | 0001101 | +0.7404 − 0.6074i |
| w27 | 0001101 | +0.6039 − 0.5118i |
| w28 | 0001110 | +1.5761 − 0.1512i |
| w29 | 0001110 | +0.2545 − 0.0723i |
| w30 | 0001111 | +0.9317 − 0.0939i |
| w31 | 0001111 | +0.7729 − 0.0813i |
| w32 | 0010000 | −1.0376 + 1.2347i |
| w33 | 0010000 | −0.0940 + 0.2611i |
| w34 | 0010001 | −0.6205 + 0.7476i |
| w35 | 0010001 | −0.5048 + 0.6321i |
| w36 | 0010010 | −0.1632 + 1.6163i |
| w37 | 0010010 | −0.0734 + 0.0858i |
| w38 | 0010011 | −0.1006 + 0.9948i |
| w39 | 0010011 | −0.0848 + 0.8427i |
| w40 | 0010100 | +1.0376 + 1.2347i |
| w41 | 0010100 | +0.0940 + 0.2611i |
| w42 | 0010101 | +0.6205 + 0.7476i |
| w43 | 0010101 | +0.5048 + 0.6321i |
| w44 | 0010110 | +0.1632 + 1.6163i |
| w45 | 0010110 | +0.0734 + 0.0858i |
| w46 | 0010111 | +0.1006 + 0.9948i |
| w47 | 0010111 | +0.0848 + 0.8427i |
| w48 | 0011000 | −1.0376 − 1.2347i |
| w49 | 0011000 | −0.0940 − 0.2611i |
| w50 | 0011001 | −0.6205 − 0.7476i |
| w51 | 0011001 | −0.5048 − 0.6321i |
| w52 | 0011010 | −0.1632 − 1.6163i |
| w53 | 0011010 | −0.0734 − 0.0858i |
| w54 | 0011011 | −0.1006 − 0.9948i |
| w55 | 0011011 | −0.0848 − 0.8427i |
| w56 | 0011100 | +1.0376 − 1.2347i |
| w57 | 0011100 | +0.0940 − 0.2611i |
| w58 | 0011101 | +0.6205 − 0.7476i |
| w59 | 0011101 | +0.5048 − 0.6321i |
| w60 | 0011110 | +0.1632 − 1.6163i |
| w61 | 0011110 | +0.0734 − 0.0858i |
| w62 | 0011111 | +0.1006 − 0.9948i |
| w63 | 0011111 | +0.0848 − 0.8427i |
| w64 | 01000000 | −1.4164 + 0.7386i |
| w65 | 01000001 | −0.2508 + 0.2043i |
| w66 | 01000010 | −0.8324 + 0.4499i |
| w67 | 01000011 | −0.6808 + 0.3821i |

| w index | bit label | Constellation point |
| --- | --- | --- |
| w68 | 01000100 | −1.5251 + 0.4510i |
| w69 | 01000101 | −0.2566 + 0.0761i |
| w70 | 01000110 | −0.8975 + 0.2781i |
| w71 | 01000111 | −0.7412 + 0.2345i |
| w72 | 01001000 | +1.4164 + 0.7386i |
| w73 | 01001001 | +0.2508 + 0.2043i |
| w74 | 01001010 | +0.8324 + 0.4499i |
| w75 | 01001011 | +0.6808 + 0.3821i |
| w76 | 01001100 | +1.5251 + 0.4510i |
| w77 | 01001101 | +0.2566 + 0.0761i |
| w78 | 01001110 | +0.8975 + 0.2781i |
| w79 | 01001111 | +0.7412 + 0.2345i |
| w80 | 01010000 | −1.4164 − 0.7386i |
| w81 | 01010001 | −0.2508 − 0.2043i |
| w82 | 01010010 | −0.8324 − 0.4499i |
| w83 | 01010011 | −0.6808 − 0.3821i |
| w84 | 01010100 | −1.5251 − 0.4510i |
| w85 | 01010101 | −0.2566 − 0.0761i |
| w86 | 01010110 | −0.8975 − 0.2781i |
| w87 | 01010111 | −0.7412 − 0.2345i |
| w88 | 01011000 | +1.4164 − 0.7386i |
| w89 | 01011001 | +0.2508 − 0.2043i |
| w90 | 01011010 | +0.8324 − 0.4499i |
| w91 | 01011011 | +0.6808 − 0.3821i |
| w92 | 01011100 | +1.5251 − 0.4510i |
| w93 | 01011101 | +0.2566 − 0.0761i |
| w94 | 01011110 | +0.8975 − 0.2781i |
| w95 | 01011111 | +0.7412 − 0.2345i |
| w96 | 01100000 | −0.7769 + 1.4193i |
| w97 | 01100001 | −0.0898 + 0.2628i |
| w98 | 01100010 | −0.4711 + 0.8645i |
| w99 | 01100011 | −0.3892 + 0.7279i |
| w100 | 01100100 | −0.4813 + 1.5486i |
| w101 | 01100101 | −0.0722 + 0.0860i |
| w102 | 01100110 | −0.2955 + 0.9492i |
| w103 | 01100111 | −0.2443 + 0.8036i |
| w104 | 01101000 | +0.7769 + 1.4193i |
| w105 | 01101001 | +0.0898 + 0.2628i |
| w106 | 01101010 | +0.4711 + 0.8645i |
| w107 | 01101011 | +0.3892 + 0.7279i |
| w108 | 01101100 | +0.4813 + 1.5486i |
| w109 | 01101101 | +0.0722 + 0.0860i |
| w110 | 01101110 | +0.2955 + 0.9492i |
| w111 | 01101111 | +0.2443 + 0.8036i |
| w112 | 01110000 | −0.7769 − 1.4193i |
| w113 | 01110001 | −0.0898 − 0.2628i |
| w114 | 01110010 | −0.4711 − 0.8645i |
| w115 | 01110011 | −0.3892 − 0.7279i |
| w116 | 01110100 | −0.4813 − 1.5486i |
| w117 | 01110101 | −0.0722 − 0.0860i |
| w118 | 01110110 | −0.2955 − 0.9492i |
| w119 | 01110111 | −0.2443 − 0.8036i |
| w120 | 01111000 | +0.7769 − 1.4193i |
| w121 | 01111001 | +0.0898 − 0.2628i |
| w122 | 01111010 | +0.4711 − 0.8645i |
| w123 | 01111011 | +0.3892 − 0.7279i |
| w124 | 01111100 | +0.4813 − 1.5486i |
| w125 | 01111101 | +0.0722 − 0.0860i |
| w126 | 01111110 | +0.2955 − 0.9492i |
| w127 | 01111111 | +0.2443 − 0.8036i |
| w128 | 10000000 | −1.0508 + 0.8392i |
| w129 | 10000001 | −0.3516 + 0.3079i |
| w130 | 10000010 | −0.8852 + 0.7128i |
| w131 | 10000011 | −0.4734 + 0.4145i |
| w132 | 10000100 | −1.3158 + 0.1269i |
| w133 | 10000101 | −0.4512 + 0.0729i |
| w134 | 10000110 | −1.1073 + 0.1093i |
| w135 | 10000111 | −0.6187 + 0.0756i |
| w136 | 10001000 | +1.0508 + 0.8392i |
| w137 | 10001001 | +0.3516 + 0.3079i |
| w138 | 10001010 | +0.8852 + 0.7128i |
| w139 | 10001011 | +0.4734 + 0.4145i |
| w140 | 10001100 | +1.3158 + 0.1269i |
| w141 | 10001101 | +0.4512 + 0.0729i |
| w142 | 10001110 | +1.1073 + 0.1093i |
| w143 | 10001111 | +0.6187 + 0.0756i |
| w144 | 10010000 | −1.0508 − 0.8392i |
| w145 | 10010001 | −0.3516 − 0.3079i |
| w146 | 10010010 | −0.8852 − 0.7128i |
| w147 | 10010011 | −0.4734 − 0.4145i |
| w148 | 10010100 | −1.3158 − 0.1269i |
| w149 | 10010101 | −0.4512 − 0.0729i |
| w150 | 10010110 | −1.1073 − 0.1093i |
| w151 | 10010111 | −0.6187 − 0.0756i |
| w152 | 10011000 | +1.0508 − 0.8392i |
| w153 | 10011001 | +0.3516 − 0.3079i |
| w154 | 10011010 | +0.8852 − 0.7128i |
| w155 | 10011011 | +0.4734 − 0.4145i |
| w156 | 10011100 | +1.3158 − 0.1269i |
| w157 | 10011101 | +0.4512 − 0.0729i |
| w158 | 10011110 | +1.1073 − 0.1093i |
| w159 | 10011111 | +0.6187 − 0.0756i |
| w160 | 10100000 | −0.8734 + 1.0335i |
| w161 | 10100001 | −0.2145 + 0.4159i |
| w162 | 10100010 | −0.7384 + 0.8777i |
| w163 | 10100011 | −0.3752 + 0.5265i |
| w164 | 10100100 | −0.1381 + 1.3596i |
| w165 | 10100101 | −0.0693 + 0.5212i |
| w166 | 10100110 | −0.1180 + 1.1596i |
| w167 | 10100111 | −0.0788 + 0.6933i |
| w168 | 10101000 | +0.8734 + 1.0335i |
| w169 | 10101001 | +0.2145 + 0.4159i |
| w170 | 10101010 | +0.7384 + 0.8777i |
| w171 | 10101011 | +0.3752 + 0.5265i |
| w172 | 10101100 | +0.1381 + 1.3596i |
| w173 | 10101101 | +0.0693 + 0.5212i |
| w174 | 10101110 | +0.1180 + 1.1596i |
| w175 | 10101111 | +0.0788 + 0.6933i |
| w176 | 10110000 | −0.8734 − 1.0335i |
| w177 | 10110001 | −0.2145 − 0.4159i |
| w178 | 10110010 | −0.7384 − 0.8777i |
| w179 | 10110011 | −0.3752 − 0.5265i |
| w180 | 10110100 | −0.1381 − 1.3596i |
| w181 | 10110101 | −0.0693 − 0.5212i |
| w182 | 10110110 | −0.1180 − 1.1596i |
| w183 | 10110111 | −0.0788 − 0.6933i |
| w184 | 10111000 | +0.8734 − 1.0335i |
| w185 | 10111001 | +0.2145 − 0.4159i |
| w186 | 10111010 | +0.7384 − 0.8777i |
| w187 | 10111011 | +0.3752 − 0.5265i |
| w188 | 10111100 | +0.1381 − 1.3596i |
| w189 | 10111101 | +0.0693 − 0.5212i |
| w190 | 10111110 | +0.1180 − 1.1596i |
| w191 | 10111111 | +0.0788 − 0.6933i |
| w192 | 11000000 | −1.1844 + 0.6172i |
| w193 | 11000001 | −0.3812 + 0.2673i |
| w194 | 11000010 | −0.9957 + 0.5259i |
| w195 | 11000011 | −0.5340 + 0.3230i |
| w196 | 11000100 | −1.2728 + 0.3773i |
| w197 | 11000101 | −0.4434 + 0.1145i |
| w198 | 11000110 | −1.0701 + 0.3230i |
| w199 | 11000111 | −0.5946 + 0.1815i |
| w200 | 11001000 | +1.1844 + 0.6172i |
| w201 | 11001001 | +0.3812 + 0.2673i |
| w202 | 11001010 | +0.9957 + 0.5259i |
| w203 | 11001011 | +0.5340 + 0.3230i |
| w204 | 11001100 | +1.2728 + 0.3773i |
| w205 | 11001101 | +0.4434 + 0.1145i |
| w206 | 11001110 | +1.0701 + 0.3230i |
| w207 | 11001111 | +0.5946 + 0.1815i |
| w208 | 11010000 | −1.1844 − 0.6172i |
| w209 | 11010001 | −0.3812 − 0.2673i |
| w210 | 11010010 | −0.9957 − 0.5259i |
| w211 | 11010011 | −0.5340 − 0.3230i |
| w212 | 11010100 | −1.2728 − 0.3773i |
| w213 | 11010101 | −0.4434 − 0.1145i |
| w214 | 11010110 | −1.0701 − 0.3230i |
| w215 | 11010111 | −0.5946 − 0.1815i |
| w216 | 11011000 | +1.1844 − 0.6172i |
| w217 | 11011001 | +0.3812 − 0.2673i |
| w218 | 11011010 | +0.9957 − 0.5259i |
| w219 | 11011011 | +0.5340 − 0.3230i |
| w220 | 11011100 | +1.2728 − 0.3773i |
| w221 | 11011101 | +0.4434 − 0.1145i |

-continued

| w index | bit label | Constellation point |
|---|---|---|
| w222 | 11011110 | +1.0701 − 0.3230i |
| w223 | 11011111 | +0.5946 − 0.1815i |
| w224 | 11100000 | −0.6562 + 1.1905i |
| w225 | 11100001 | −0.1928 + 0.4287i |
| w226 | 11100010 | −0.5570 + 1.0128i |
| w227 | 11100011 | −0.3076 + 0.5885i |
| w228 | 11100100 | −0.4076 + 1.3018i |
| w229 | 11100101 | −0.0896 + 0.5118i |
| w230 | 11100110 | −0.3468 + 1.1091i |
| w231 | 11100111 | −0.1793 + 0.6649i |
| w232 | 11101000 | +0.6562 + 1.1905i |
| w233 | 11101001 | +0.1928 + 0.4287i |
| w234 | 11101010 | +0.5570 + 1.0128i |
| w235 | 11101011 | +0.3076 + 0.5885i |
| w236 | 11101100 | +0.4076 + 1.3018i |
| w237 | 11101101 | +0.0896 + 0.5118i |
| w238 | 11101110 | +0.3468 + 1.1091i |
| w239 | 11101111 | +0.1793 + 0.6649i |
| w240 | 11110000 | −0.6562 − 1.1905i |
| w241 | 11110001 | −0.1928 − 0.4287i |
| w242 | 11110010 | −0.5570 − 1.0128i |
| w243 | 11110011 | −0.3076 − 0.5885i |
| w244 | 11110100 | −0.4076 − 1.3018i |
| w245 | 11110101 | −0.0896 − 0.5118i |
| w246 | 11110110 | −0.3468 − 1.1091i |
| w247 | 11110111 | −0.1793 − 0.6649i |
| w248 | 11111000 | +0.6562 − 1.1905i |
| w249 | 11111001 | +0.1928 − 0.4287i |
| w250 | 11111010 | +0.5570 − 1.0128i |
| w251 | 11111011 | +0.3076 − 0.5885i |
| w252 | 11111100 | +0.4076 − 1.3018i |
| w253 | 11111101 | +0.0896 − 0.5118i |
| w254 | 11111110 | +0.3468 − 1.1091i |
| w255 | 11111111 | +0.1793 − 0.6649i | for R=3/4 (or R=1/2, 5/8 or 13/16):

| w index | bit label | Constellation point |
|---|---|---|
| w0 | 0000000 | −0.5115 + 1.2063i |
| w1 | 0000000 | −0.5115 − 1.2063i |
| w2 | 0000001 | −0.3049 + 1.2378i |
| w3 | 0000001 | −0.3049 − 1.2378i |
| w4 | 0000010 | +0.5115 + 1.2063i |
| w5 | 0000010 | +0.5115 − 1.2063i |
| w6 | 0000011 | +0.3049 + 1.2378i |
| w7 | 0000011 | +0.3049 − 1.2378i |
| w8 | 0000100 | −0.4952 + 1.0059i |
| w9 | 0000100 | −0.4952 − 1.0059i |
| w10 | 0000101 | −0.3032 + 1.0518i |
| w11 | 0000101 | −0.3032 − 1.0518i |
| w12 | 0000110 | +0.4952 + 1.0059i |
| w13 | 0000110 | +0.4952 − 1.0059i |
| w14 | 0000111 | +0.3032 + 1.0518i |
| w15 | 0000111 | +0.3032 − 1.0518i |
| w16 | 0001000 | −1.1670 + 1.1014i |
| w17 | 0001000 | −1.1670 − 1.1014i |
| w18 | 0001001 | −0.1010 + 1.2545i |
| w19 | 0001001 | −0.1010 − 1.2545i |
| w20 | 0001010 | +1.1670 + 1.1014i |
| w21 | 0001010 | +1.1670 − 1.1014i |
| w22 | 0001011 | +0.1010 + 1.2545i |
| w23 | 0001011 | +0.1010 − 1.2545i |
| w24 | 0001100 | −1.2421 + 0.8557i |
| w25 | 0001100 | −1.2421 − 0.8557i |
| w26 | 0001101 | −0.0956 + 1.0676i |
| w27 | 0001101 | −0.0956 − 1.0676i |
| w28 | 0001110 | +1.2421 + 0.8557i |
| w29 | 0001110 | +1.2421 − 0.8557i |
| w30 | 0001111 | +0.0956 + 1.0676i |
| w31 | 0001111 | +0.0956 − 1.0676i |
| w32 | 0010000 | −0.6286 + 0.6639i |
| w33 | 0010000 | −0.6286 − 0.6639i |
| w34 | 0010001 | −0.4729 + 0.6321i |
| w35 | 0010001 | −0.4729 − 0.6321i |

-continued

| w index | bit label | Constellation point |
|---|---|---|
| w36 | 0010010 | +0.6286 + 0.6639i |
| w37 | 0010010 | +0.6286 − 0.6639i |
| w38 | 0010011 | +0.4729 + 0.6321i |
| w39 | 0010011 | +0.4729 − 0.6321i |
| w40 | 0010100 | −0.5851 + 0.8353i |
| w41 | 0010100 | −0.5851 − 0.8353i |
| w42 | 0010101 | −0.4392 + 0.7880i |
| w43 | 0010101 | −0.4392 − 0.7880i |
| w44 | 0010110 | +0.5851 + 0.8353i |
| w45 | 0010110 | +0.5851 − 0.8353i |
| w46 | 0010111 | +0.4392 + 0.7880i |
| w47 | 0010111 | +0.4392 − 0.7880i |
| w48 | 0011000 | −1.2110 + 0.5795i |
| w49 | 0011000 | −1.2110 − 0.5795i |
| w50 | 0011001 | −0.0690 + 0.5518i |
| w51 | 0011001 | −0.0690 − 0.5518i |
| w52 | 0011010 | +1.2110 + 0.5795i |
| w53 | 0011010 | +1.2110 − 0.5795i |
| w54 | 0011011 | +0.0690 + 0.5518i |
| w55 | 0011011 | +0.0690 − 0.5518i |
| w56 | 0011100 | −1.4215 + 0.6637i |
| w57 | 0011100 | −1.4215 − 0.6637i |
| w58 | 0011101 | −0.0552 + 0.6903i |
| w59 | 0011101 | −0.0552 − 0.6903i |
| w60 | 0011110 | +1.4215 + 0.6637i |
| w61 | 0011110 | +1.4215 − 0.6637i |
| w62 | 0011111 | +0.0552 + 0.6903i |
| w63 | 0011111 | +0.0552 − 0.6903i |
| w64 | 01000000 | −0.6596 + 0.0715i |
| w65 | 01000001 | −0.6596 − 0.0715i |
| w66 | 01000010 | −0.5124 + 0.0667i |
| w67 | 01000011 | −0.5124 − 0.0667i |
| w68 | 01000100 | +0.6596 + 0.0715i |
| w69 | 01000101 | +0.6596 − 0.0715i |
| w70 | 01000110 | +0.5124 + 0.0667i |
| w71 | 01000111 | +0.5124 − 0.0667i |
| w72 | 01001000 | −0.6597 + 0.2116i |
| w73 | 01001001 | −0.6597 − 0.2116i |
| w74 | 01001010 | −0.5095 + 0.2008i |
| w75 | 01001011 | −0.5095 − 0.2008i |
| w76 | 01001100 | +0.6597 + 0.2116i |
| w77 | 01001101 | +0.6597 − 0.2116i |
| w78 | 01001110 | +0.5095 + 0.2008i |
| w79 | 01001111 | +0.5095 − 0.2008i |
| w80 | 01010000 | −1.4366 + 0.1213i |
| w81 | 01010001 | −1.4366 − 0.1213i |
| w82 | 01010010 | −0.0739 + 0.0596i |
| w83 | 01010011 | −0.0739 − 0.0596i |
| w84 | 01010100 | +1.4366 + 0.1213i |
| w85 | 01010101 | +1.4366 − 0.1213i |
| w86 | 01010110 | +0.0739 + 0.0596i |
| w87 | 01010111 | +0.0739 − 0.0596i |
| w88 | 01011000 | −1.2098 + 0.1077i |
| w89 | 01011001 | −1.2098 − 0.1077i |
| w90 | 01011010 | −0.0731 + 0.1767i |
| w91 | 01011011 | −0.0731 − 0.1767i |
| w92 | 01011100 | +1.2098 + 0.1077i |
| w93 | 01011101 | +1.2098 − 0.1077i |
| w94 | 01011110 | +0.0731 + 0.1767i |
| w95 | 01011111 | +0.0731 − 0.1767i |
| w96 | 01100000 | −0.6467 + 0.5036i |
| w97 | 01100001 | −0.6467 − 0.5036i |
| w98 | 01100010 | −0.4946 + 0.4818i |
| w99 | 01100011 | −0.4946 − 0.4818i |
| w100 | 01100100 | +0.6467 + 0.5036i |
| w101 | 01100101 | +0.6467 − 0.5036i |
| w102 | 01100110 | +0.4946 + 0.4818i |
| w103 | 01100111 | +0.4946 − 0.4818i |
| w104 | 01101000 | −0.6572 + 0.3526i |
| w105 | 01101001 | −0.6572 − 0.3526i |
| w106 | 01101010 | −0.5050 + 0.3380i |
| w107 | 01101011 | −0.5050 − 0.3380i |
| w108 | 01101100 | +0.6572 + 0.3526i |
| w109 | 01101101 | +0.6572 − 0.3526i |
| w110 | 01101110 | +0.5050 + 0.3380i |
| w111 | 01101111 | +0.5050 − 0.3380i |
| w112 | 01110000 | −1.4264 + 0.3764i |

-continued

| w index | bit label | Constellation point |
|---|---|---|
| w113 | 01110001 | −1.4264 − 0.3764i |
| w114 | 01110010 | −0.0715 + 0.4218i |
| w115 | 01110011 | −0.0715 − 0.4218i |
| w116 | 01110100 | +1.4264 + 0.3764i |
| w117 | 01110101 | +1.4264 − 0.3764i |
| w118 | 01110110 | +0.0715 + 0.4218i |
| w119 | 01110111 | +0.0715 − 0.4218i |
| w120 | 01111000 | −1.2130 + 0.3237i |
| w121 | 01111001 | −1.2130 − 0.3237i |
| w122 | 01111010 | −0.0725 + 0.2978i |
| w123 | 01111011 | −0.0725 − 0.2978i |
| w124 | 01111100 | +1.2130 + 0.3237i |
| w125 | 01111101 | +1.2130 − 0.3237i |
| w126 | 01111110 | +0.0725 + 0.2978i |
| w127 | 01111111 | +0.0725 − 0.2978i |
| w128 | 10000000 | −0.5901 + 1.4171i |
| w129 | 10000001 | −0.5901 − 1.4171i |
| w130 | 10000010 | −0.3511 + 1.4584i |
| w131 | 10000011 | −0.3511 − 1.4584i |
| w132 | 10000100 | +0.5901 + 1.4171i |
| w133 | 10000101 | +0.5901 − 1.4171i |
| w134 | 10000110 | +0.3511 + 1.4584i |
| w135 | 10000111 | +0.3511 − 1.4584i |
| w136 | 10001000 | −0.6935 + 1.0466i |
| w137 | 10001001 | −0.6935 − 1.0466i |
| w138 | 10001010 | −0.2603 + 0.9107i |
| w139 | 10001011 | −0.2603 − 0.9107i |
| w140 | 10001100 | +0.6935 + 1.0466i |
| w141 | 10001101 | +0.6935 − 1.0466i |
| w142 | 10001110 | +0.2603 + 0.9107i |
| w143 | 10001111 | +0.2603 − 0.9107i |
| w144 | 10010000 | −0.8039 + 1.2957i |
| w145 | 10010001 | −0.8039 − 1.2957i |
| w146 | 10010010 | −0.1167 + 1.4782i |
| w147 | 10010011 | −0.1167 − 1.4782i |
| w148 | 10010100 | +0.8039 + 1.2957i |
| w149 | 10010101 | +0.8039 − 1.2957i |
| w150 | 10010110 | +0.1167 + 1.4782i |
| w151 | 10010111 | +0.1167 − 1.4782i |
| w152 | 10011000 | −0.8956 + 1.0881i |
| w153 | 10011001 | −0.8956 − 1.0881i |
| w154 | 10011010 | −0.0882 + 0.8981i |
| w155 | 10011011 | −0.0882 − 0.8981i |
| w156 | 10011100 | +0.8956 + 1.0881i |
| w157 | 10011101 | +0.8956 − 1.0881i |
| w158 | 10011110 | +0.0882 + 0.8981i |
| w159 | 10011111 | +0.0882 − 0.8981i |
| w160 | 10100000 | −0.8022 + 0.6879i |
| w161 | 10100001 | −0.8022 − 0.6879i |
| w162 | 10100010 | −0.3274 + 0.6045i |
| w163 | 10100011 | −0.3274 − 0.6045i |
| w164 | 10100100 | +0.8022 + 0.6879i |
| w165 | 10100101 | +0.8022 − 0.6879i |
| w166 | 10100110 | +0.3274 + 0.6045i |
| w167 | 10100111 | +0.3274 − 0.6045i |
| w168 | 10101000 | −0.7622 + 0.8634i |
| w169 | 10101001 | −0.7622 − 0.8634i |
| w170 | 10101010 | −0.2965 + 0.7629i |
| w171 | 10101011 | −0.2965 − 0.7629i |
| w172 | 10101100 | +0.7622 + 0.8634i |
| w173 | 10101101 | +0.7622 − 0.8634i |
| w174 | 10101110 | +0.2965 + 0.7629i |
| w175 | 10101111 | +0.2965 − 0.7629i |
| w176 | 10110000 | −1.0082 + 0.6930i |
| w177 | 10110001 | −1.0082 − 0.6930i |
| w178 | 10110010 | −0.1987 + 0.5742i |
| w179 | 10110011 | −0.1987 − 0.5742i |
| w180 | 10110100 | +1.0082 + 0.6930i |
| w181 | 10110101 | +1.0082 − 0.6930i |
| w182 | 10110110 | +0.1987 + 0.5742i |
| w183 | 10110111 | +0.1987 − 0.5742i |
| w184 | 10111000 | −0.9647 + 0.8849i |
| w185 | 10111001 | −0.9647 − 0.8849i |
| w186 | 10111010 | −0.1564 + 0.7374i |
| w187 | 10111011 | −0.1564 − 0.7374i |
| w188 | 10111100 | +0.9647 + 0.8849i |
| w189 | 10111101 | +0.9647 − 0.8849i |
| w190 | 10111110 | +0.1564 + 0.7374i |
| w191 | 10111111 | +0.1564 − 0.7374i |
| w192 | 11000000 | −0.8131 + 0.0729i |
| w193 | 11000001 | −0.8131 − 0.0729i |
| w194 | 11000010 | −0.3658 + 0.0625i |
| w195 | 11000011 | −0.3658 − 0.0625i |
| w196 | 11000100 | +0.8131 + 0.0729i |
| w197 | 11000101 | +0.8131 − 0.0729i |
| w198 | 11000110 | +0.3658 + 0.0625i |
| w199 | 11000111 | +0.3658 − 0.0625i |
| w200 | 11001000 | −0.8246 + 0.2158i |
| w201 | 11001001 | −0.8246 − 0.2158i |
| w202 | 11001010 | −0.3642 + 0.1899i |
| w203 | 11001011 | −0.3642 − 0.1899i |
| w204 | 11001100 | +0.8246 + 0.2158i |
| w205 | 11001101 | +0.8246 − 0.2158i |
| w206 | 11001110 | +0.3642 + 0.1899i |
| w207 | 11001111 | +0.3642 − 0.1899i |
| w208 | 11010000 | −0.9801 + 0.0651i |
| w209 | 11010001 | −0.9801 − 0.0651i |
| w210 | 11010010 | −0.2198 + 0.0612i |
| w211 | 11010011 | −0.2198 − 0.0612i |
| w212 | 11010100 | +0.9801 + 0.0651i |
| w213 | 11010101 | +0.9801 − 0.0651i |
| w214 | 11010110 | +0.2198 + 0.0612i |
| w215 | 11010111 | +0.2198 − 0.0612i |
| w216 | 11011000 | −1.0115 + 0.2009i |
| w217 | 11011001 | −1.0115 − 0.2009i |
| w218 | 11011010 | −0.2192 + 0.1815i |
| w219 | 11011011 | −0.2192 − 0.1815i |
| w220 | 11011100 | +1.0115 + 0.2009i |
| w221 | 11011101 | +1.0115 − 0.2009i |
| w222 | 11011110 | +0.2192 + 0.1815i |
| w223 | 11011111 | +0.2192 − 0.1815i |
| w224 | 11100000 | −0.8086 + 0.5185i |
| w225 | 11100001 | −0.8086 − 0.5185i |
| w226 | 11100010 | −0.3499 + 0.4571i |
| w227 | 11100011 | −0.3499 − 0.4571i |
| w228 | 11100100 | +0.8086 + 0.5185i |
| w229 | 11100101 | +0.8086 − 0.5185i |
| w230 | 11100110 | +0.3499 + 0.4571i |
| w231 | 11100111 | +0.3499 − 0.4571i |
| w232 | 11101000 | −0.8245 + 0.3593i |
| w233 | 11101001 | −0.8245 − 0.3593i |
| w234 | 11101010 | −0.3599 + 0.3216i |
| w235 | 11101011 | −0.3599 − 0.3216i |
| w236 | 11101100 | +0.8245 + 0.3593i |
| w237 | 11101101 | +0.8245 − 0.3593i |
| w238 | 11101110 | +0.3599 + 0.3216i |
| w239 | 11101111 | +0.3599 − 0.3216i |
| w240 | 11110000 | −0.9814 + 0.5205i |
| w241 | 11110001 | −0.9814 − 0.5205i |
| w242 | 11110010 | −0.2115 + 0.4337i |
| w243 | 11110011 | −0.2115 − 0.4337i |
| w244 | 11110100 | +0.9814 + 0.5205i |
| w245 | 11110101 | +0.9814 − 0.5205i |
| w246 | 11110110 | +0.2115 + 0.4337i |
| w247 | 11110111 | +0.2115 − 0.4337i |
| w248 | 11111000 | −1.0163 + 0.3615i |
| w249 | 11111001 | −1.0163 − 0.3615i |
| w250 | 11111010 | −0.2167 + 0.3057i |
| w251 | 11111011 | −0.2167 − 0.3057i |
| w252 | 11111100 | +1.0163 + 0.3615i |
| w253 | 11111101 | +1.0163 − 0.3615i |
| w254 | 11111110 | +0.2167 + 0.3057i |
| w255 | 11111111 | +0.2167 − 0.3057i | for R=13/16 (or R=1/2, 5/8 or 3/4):

| w index | bit label | Constellation point |
|---|---|---|
| w0 | 0000000 | −0.4934 + 1.1976i |
| w1 | 0000000 | −0.6474 + 0.6881i |
| w2 | 0000001 | −0.6614 + 0.0730i |
| w3 | 0000001 | −0.6545 + 0.5220i |

-continued

| w index | bit label | Constellation point |
|---|---|---|
| w4 | 0000010 | −0.4787 + 1.0113i |
| w5 | 0000010 | −0.6010 + 0.8566i |
| w6 | 0000011 | −0.6676 + 0.2192i |
| w7 | 0000011 | −0.6674 + 0.3672i |
| w8 | 0000100 | −1.1592 + 1.0404i |
| w9 | 0000100 | −1.1898 + 0.5538i |
| w10 | 0000101 | −1.3908 + 0.1102i |
| w11 | 0000101 | −1.4081 + 0.3370i |
| w12 | 0000110 | −1.2410 + 0.8061i |
| w13 | 0000110 | −1.3911 + 0.5975i |
| w14 | 0000111 | −1.1855 + 0.1041i |
| w15 | 0000111 | −1.2043 + 0.3138i |
| w16 | 0001000 | −0.2985 + 1.2655i |
| w17 | 0001000 | −0.4920 + 0.6512i |
| w18 | 0001001 | −0.5130 + 0.0697i |
| w19 | 0001001 | −0.5045 + 0.4981i |
| w20 | 0001010 | −0.2876 + 1.0856i |
| w21 | 0001010 | −0.4556 + 0.8064i |
| w22 | 0001011 | −0.5147 + 0.2097i |
| w23 | 0001011 | −0.5132 + 0.3515i |
| w24 | 0001100 | −0.0980 + 1.2511i |
| w25 | 0001100 | −0.0701 + 0.5794i |
| w26 | 0001101 | −0.0734 + 0.0629i |
| w27 | 0001101 | −0.0724 + 0.4460i |
| w28 | 0001110 | −0.0934 + 1.0735i |
| w29 | 0001110 | −0.0582 + 0.7208i |
| w30 | 0001111 | −0.0734 + 0.1890i |
| w31 | 0001111 | −0.0731 + 0.3164i |
| w32 | 0010000 | −0.5534 + 1.3936i |
| w33 | 0010000 | −0.8188 + 0.7082i |
| w34 | 0010001 | −0.8139 + 0.0752i |
| w35 | 0010001 | −0.8096 + 0.5376i |
| w36 | 0010010 | −0.6787 + 1.0583i |
| w37 | 0010010 | −0.7729 + 0.8860i |
| w38 | 0010011 | −0.8305 + 0.2250i |
| w39 | 0010011 | −0.8315 + 0.3759i |
| w40 | 0010100 | −0.7567 + 1.2808i |
| w41 | 0010100 | −1.0161 + 0.7012i |
| w42 | 0010101 | −0.9757 + 0.0702i |
| w43 | 0010101 | −0.9739 + 0.5345i |
| w44 | 0010110 | −0.8952 + 1.0953i |
| w45 | 0010110 | −0.9646 + 0.8865i |
| w46 | 0010111 | −1.0091 + 0.2141i |
| w47 | 0010111 | −1.0164 + 0.3745i |
| w48 | 0011000 | −0.3350 + 1.4701i |
| w49 | 0011000 | −0.3446 + 0.6254i |
| w50 | 0011001 | −0.3664 + 0.0666i |
| w51 | 0011001 | −0.3586 + 0.4775i |
| w52 | 0011010 | −0.2713 + 0.9300i |
| w53 | 0011010 | −0.3149 + 0.7791i |
| w54 | 0011011 | −0.3666 + 0.2005i |
| w55 | 0011011 | −0.3649 + 0.3365i |
| w56 | 0011100 | −0.1095 + 1.4559i |
| w57 | 0011100 | −0.2067 + 0.6018i |
| w58 | 0011101 | −0.2200 + 0.0642i |
| w59 | 0011101 | −0.2160 + 0.4587i |
| w60 | 0011110 | −0.0910 + 0.9104i |
| w61 | 0011110 | −0.1761 + 0.7590i |
| w62 | 0011111 | −0.2199 + 0.1932i |
| w63 | 0011111 | −0.2191 + 0.3239i |
| w64 | 0100000 | −0.4934 − 1.1976i |
| w65 | 0100001 | −0.6474 − 0.6881i |
| w66 | 0100010 | −0.6614 − 0.0730i |
| w67 | 0100011 | −0.6545 − 0.5220i |
| w68 | 0100100 | −0.4787 − 1.0113i |
| w69 | 0100101 | −0.6010 − 0.8566i |
| w70 | 0100110 | −0.6676 − 0.2192i |
| w71 | 0100111 | −0.6674 − 0.3672i |
| w72 | 0101000 | −1.1592 − 1.0404i |
| w73 | 0101001 | −1.1898 − 0.5538i |
| w74 | 0101010 | −1.3908 − 0.1102i |
| w75 | 0101011 | −1.4081 − 0.3370i |
| w76 | 0101100 | −1.2410 − 0.8061i |
| w77 | 0101101 | −1.3911 − 0.5975i |
| w78 | 0101110 | −1.1855 − 0.1041i |
| w79 | 0101111 | −1.2043 − 0.3138i |
| w80 | 01010000 | −0.2985 − 1.2655i |
| w81 | 01010001 | −0.4920 − 0.6512i |
| w82 | 01010010 | −0.5130 − 0.0697i |
| w83 | 01010011 | −0.5045 − 0.4981i |
| w84 | 01010100 | −0.2876 − 1.0856i |
| w85 | 01010101 | −0.4556 − 0.8064i |
| w86 | 01010110 | −0.5147 − 0.2097i |
| w87 | 01010111 | −0.5132 − 0.3515i |
| w88 | 01011000 | −0.0980 − 1.2511i |
| w89 | 01011001 | −0.0701 − 0.5794i |
| w90 | 01011010 | −0.0734 − 0.0629i |
| w91 | 01011011 | −0.0724 − 0.4460i |
| w92 | 01011100 | −0.0934 − 1.0735i |
| w93 | 01011101 | −0.0582 − 0.7208i |
| w94 | 01011110 | −0.0734 − 0.1890i |
| w95 | 01011111 | −0.0731 − 0.3164i |
| w96 | 01100000 | −0.5534 − 1.3936i |
| w97 | 01100001 | −0.8188 − 0.7082i |
| w98 | 01100010 | −0.8139 − 0.0752i |
| w99 | 01100011 | −0.8096 − 0.5376i |
| w100 | 01100100 | −0.6787 − 1.0583i |
| w101 | 01100101 | −0.7729 − 0.8860i |
| w102 | 01100110 | −0.8305 − 0.2250i |
| w103 | 01100111 | −0.8315 − 0.3759i |
| w104 | 01101000 | −0.7567 − 1.2808i |
| w105 | 01101001 | −1.0161 − 0.7012i |
| w106 | 01101010 | −0.9757 − 0.0702i |
| w107 | 01101011 | −0.9739 − 0.5345i |
| w108 | 01101100 | −0.8952 − 1.0953i |
| w109 | 01101101 | −0.9646 − 0.8865i |
| w110 | 01101110 | −1.0091 − 0.2141i |
| w111 | 01101111 | −1.0164 − 0.3745i |
| w112 | 01110000 | −0.3350 − 1.4701i |
| w113 | 01110001 | −0.3446 − 0.6254i |
| w114 | 01110010 | −0.3664 − 0.0666i |
| w115 | 01110011 | −0.3586 − 0.4775i |
| w116 | 01110100 | −0.2713 − 0.9300i |
| w117 | 01110101 | −0.3149 − 0.7791i |
| w118 | 01110110 | −0.3666 − 0.2005i |
| w119 | 01110111 | −0.3649 − 0.3365i |
| w120 | 01111000 | −0.1095 − 1.4559i |
| w121 | 01111001 | −0.2067 − 0.6018i |
| w122 | 01111010 | −0.2200 − 0.0642i |
| w123 | 01111011 | −0.2160 − 0.4587i |
| w124 | 01111100 | −0.0910 − 0.9104i |
| w125 | 01111101 | −0.1761 − 0.7590i |
| w126 | 01111110 | −0.2199 − 0.1932i |
| w127 | 01111111 | −0.2191 − 0.3239i |
| w128 | 10000000 | +0.4934 + 1.1976i |
| w129 | 10000001 | +0.6474 + 0.6881i |
| w130 | 10000010 | +0.6614 + 0.0730i |
| w131 | 10000011 | +0.6545 + 0.5220i |
| w132 | 10000100 | +0.4787 + 1.0113i |
| w133 | 10000101 | +0.6010 + 0.8566i |
| w134 | 10000110 | +0.6676 + 0.2192i |
| w135 | 10000111 | +0.6674 + 0.3672i |
| w136 | 10001000 | +1.1592 + 1.0404i |
| w137 | 10001001 | +1.1898 + 0.5538i |
| w138 | 10001010 | +1.3908 + 0.1102i |
| w139 | 10001011 | +1.4081 + 0.3370i |
| w140 | 10001100 | +1.2410 + 0.8061i |
| w141 | 10001101 | +1.3911 + 0.5975i |
| w142 | 10001110 | +1.1855 + 0.1041i |
| w143 | 10001111 | +1.2043 + 0.3138i |
| w144 | 10010000 | +0.2985 + 1.2655i |
| w145 | 10010001 | +0.4920 + 0.6512i |
| w146 | 10010010 | +0.5130 + 0.0697i |
| w147 | 10010011 | +0.5045 + 0.4981i |
| w148 | 10010100 | +0.2876 + 1.0856i |
| w149 | 10010101 | +0.4556 + 0.8064i |
| w150 | 10010110 | +0.5147 + 0.2097i |
| w151 | 10010111 | +0.5132 + 0.3515i |
| w152 | 10011000 | +0.0980 + 1.2511i |
| w153 | 10011001 | +0.0701 + 0.5794i |
| w154 | 10011010 | +0.0734 + 0.0629i |
| w155 | 10011011 | +0.0724 + 0.4460i |
| w156 | 10011100 | +0.0934 + 1.0735i |
| w157 | 10011101 | +0.0582 + 0.7208i |

-continued

| w index | bit label | Constellation point |
|---|---|---|
| w158 | 10011110 | +0.0734 + 0.1890i |
| w159 | 10011111 | +0.0731 + 0.3164i |
| w160 | 10100000 | +0.5534 + 1.3936i |
| w161 | 10100001 | +0.8188 + 0.7082i |
| w162 | 10100010 | +0.8139 + 0.0752i |
| w163 | 10100011 | +0.8096 + 0.5376i |
| w164 | 10100100 | +0.6787 + 1.0583i |
| w165 | 10100101 | +0.7729 + 0.8860i |
| w166 | 10100110 | +0.8305 + 0.2250i |
| w167 | 10100111 | +0.8315 + 0.3759i |
| w168 | 10101000 | +0.7567 + 1.2808i |
| w169 | 10101001 | +1.0161 + 0.7012i |
| w170 | 10101010 | +0.9757 + 0.0702i |
| w171 | 10101011 | +0.9739 + 0.5345i |
| w172 | 10101100 | +0.8952 + 1.0953i |
| w173 | 10101101 | +0.9646 + 0.8865i |
| w174 | 10101110 | +1.0091 + 0.2141i |
| w175 | 10101111 | +1.0164 + 0.3745i |
| w176 | 10110000 | +0.3350 + 1.4701i |
| w177 | 10110001 | +0.3446 + 0.6254i |
| w178 | 10110010 | +0.3664 + 0.0666i |
| w179 | 10110011 | +0.3586 + 0.4775i |
| w180 | 10110100 | +0.2713 + 0.9300i |
| w181 | 10110101 | +0.3149 + 0.7791i |
| w182 | 10110110 | +0.3666 + 0.2005i |
| w183 | 10110111 | +0.3649 + 0.3365i |
| w184 | 10111000 | +0.1095 + 1.4559i |
| w185 | 10111001 | +0.2067 + 0.6018i |
| w186 | 10111010 | +0.2200 + 0.0642i |
| w187 | 10111011 | +0.2160 + 0.4587i |
| w188 | 10111100 | +0.0910 + 0.9104i |
| w189 | 10111101 | +0.1761 + 0.7590i |
| w190 | 10111110 | +0.2199 + 0.1932i |
| w191 | 10111111 | +0.2191 + 0.3239i |
| w192 | 11000000 | +0.4934 − 1.1976i |
| w193 | 11000001 | +0.6474 − 0.6881i |
| w194 | 11000010 | +0.6614 − 0.0730i |
| w195 | 11000011 | +0.6545 − 0.5220i |
| w196 | 11000100 | +0.4787 − 1.0113i |
| w197 | 11000101 | +0.6010 − 0.8566i |
| w198 | 11000110 | +0.6676 − 0.2192i |
| w199 | 11000111 | +0.6674 − 0.3672i |
| w200 | 11001000 | +1.1592 − 1.0404i |
| w201 | 11001001 | +1.1898 − 0.5538i |
| w202 | 11001010 | +1.3908 − 0.1102i |
| w203 | 11001011 | +1.4081 − 0.3370i |
| w204 | 11001100 | +1.2410 − 0.8061i |
| w205 | 11001101 | +1.3911 − 0.5975i |
| w206 | 11001110 | +1.1855 − 0.1041i |
| w207 | 11001111 | +1.2043 − 0.3138i |
| w208 | 11010000 | +0.2985 − 1.2655i |
| w209 | 11010001 | +0.4920 − 0.6512i |
| w210 | 11010010 | +0.5130 − 0.0697i |
| w211 | 11010011 | +0.5045 − 0.4981i |
| w212 | 11010100 | +0.2876 − 1.0856i |
| w213 | 11010101 | +0.4556 − 0.8064i |
| w214 | 11010110 | +0.5147 − 0.2097i |
| w215 | 11010111 | +0.5132 − 0.3515i |
| w216 | 11011000 | +0.0980 − 1.2511i |
| w217 | 11011001 | +0.0701 − 0.5794i |
| w218 | 11011010 | +0.0734 − 0.0629i |
| w219 | 11011011 | +0.0724 − 0.4460i |
| w220 | 11011100 | +0.0934 − 1.0735i |
| w221 | 11011101 | +0.0582 − 0.7208i |
| w222 | 11011110 | +0.0734 − 0.1890i |
| w223 | 11011111 | +0.0731 − 0.3164i |
| w224 | 11100000 | +0.5534 − 1.3936i |
| w225 | 11100001 | +0.8188 − 0.7082i |
| w226 | 11100010 | +0.8139 − 0.0752i |
| w227 | 11100011 | +0.8096 − 0.5376i |
| w228 | 11100100 | +0.6787 − 1.0583i |
| w229 | 11100101 | +0.7729 − 0.8860i |
| w230 | 11100110 | +0.8305 − 0.2250i |
| w231 | 11100111 | +0.8315 − 0.3759i |
| w232 | 11101000 | +0.7567 − 1.2808i |
| w233 | 11101001 | +1.0161 − 0.7012i |
| w234 | 11101010 | +0.9757 − 0.0702i |
| w235 | 11101011 | +0.9739 − 0.5345i |
| w236 | 11101100 | +0.8952 − 1.0953i |
| w237 | 11101101 | +0.9646 − 0.8865i |
| w238 | 11101110 | +1.0091 − 0.2141i |
| w239 | 11101111 | +1.0164 − 0.3745i |
| w240 | 11110000 | +0.3350 − 1.4701i |
| w241 | 11110001 | +0.3446 − 0.6254i |
| w242 | 11110010 | +0.3664 − 0.0666i |
| w243 | 11110011 | +0.3586 − 0.4775i |
| w244 | 11110100 | +0.2713 − 0.9300i |
| w245 | 11110101 | +0.3149 − 0.7791i |
| w246 | 11110110 | +0.3666 − 0.2005i |
| w247 | 11110111 | +0.3649 − 0.3365i |
| w248 | 11111000 | +0.1095 − 1.4559i |
| w249 | 11111001 | +0.2067 − 0.6018i |
| w250 | 11111010 | +0.2200 − 0.0642i |
| w251 | 11111011 | +0.2160 − 0.4587i |
| w252 | 11111100 | +0.0910 − 0.9104i |
| w253 | 11111101 | +0.1761 − 0.7590i |
| w254 | 11111110 | +0.2199 − 0.1932i |
| w255 | 11111111 | +0.2191 − 0.3239i |

B) M-QAM non-uniform constellations of group B for single carrier mode as PHY mode:
B1) 16-QAM NUC

| w | bit label | R = ½ (MCS = 10) (or R = ⅝ or ¾) | R = ⅝ (MCS = 11) (or R = ½ or ¾) | R = ¾ (MCS = 12) (or R = ½ or ⅝) |
|---|---|---|---|---|
| w0 | 0000 | +0.4925 + 1.2040i | +0.2173 + 0.4189i | +0.2949 − 0.2943i |
| w1 | 0001 | +0.4925 − 1.2040i | +0.4326 + 1.1445i | +0.9555 − 0.2949i |
| w2 | 0010 | +0.2530 + 0.4936i | −0.2173 + 0.4189i | −0.2949 − 0.2949i |
| w3 | 0011 | +0.2530 − 0.4936i | −0.4326 + 1.1445i | −0.9555 − 0.2949i |
| w4 | 0100 | −0.4925 + 1.2040i | +0.2173 − 0.4189i | +0.2949 − 0.9555i |
| w5 | 0101 | −0.4925 − 1.2040i | +0.4326 − 1.1445i | +0.9555 − 0.9555i |
| w6 | 0110 | −0.2530 + 0.4936i | −0.2173 − 0.4189i | −0.2949 − 0.9555i |
| w7 | 0111 | −0.2530 − 0.4936i | −0.4326 − 1.1445i | −0.9555 − 0.9555i |
| w8 | 1000 | +1.2040 + 0.4925i | +0.6578 + 0.2571i | +0.2949 + 0.2949i |
| w9 | 1001 | +1.2040 − 0.4925i | +1.2088 + 0.5659i | +0.9555 + 0.2949i |
| w10 | 1010 | +0.4936 + 0.2530i | −0.6578 + 0.2571i | −0.2949 + 0.2949i |
| w11 | 1011 | +0.4936 − 0.2530i | −1.2088 + 0.5659i | −0.9555 + 0.2949i |
| w12 | 1100 | −1.2040 + 0.4925i | +0.6578 − 0.2571i | +0.2949 + 0.9555i |
| w13 | 1101 | −1.2040 − 0.4925i | +1.2088 − 0.5659i | +0.9555 + 0.9555i |
| w14 | 1110 | −0.4936 + 0.2530i | −0.6578 − 0.2571i | −0.2949 + 0.9555i |
| w15 | 1111 | −0.4936 − 0.2530i | −1.2088 − 0.5659i | −0.9555 + 0.9555i |

B2) 32-QAM NUC

| w/MCS index | bit label | R = ½ (or R = ⅝, ¾ or ¹³⁄₁₆) | R = ⅝ (or R = ½, ¾ or ¹³⁄₁₆) | R = ¾ (or R = ½, ⅝ or ¹³⁄₁₆) | R = ¹³⁄₁₆ (or R = ½, ⅝ or ¾) |
|---|---|---|---|---|---|
| w0  | 00000 | +0.1929 + 0.1744i | +0.2187 + 0.1559i | +0.2113 + 0.1819i | +0.2082 + 0.1996i |
| w1  | 00001 | +0.2283 + 0.5036i | +0.2225 + 0.5103i | +0.6163 + 1.2930i | +0.6964 + 1.2272i |
| w2  | 00010 | +0.6363 + 0.1782i | +0.2187 − 1.1559i | +0.2113 − 0.1819i | +0.2041 + 0.6147i |
| w3  | 00011 | +0.6364 + 0.4437i | +0.2225 − 0.5103i | +0.6163 − 1.2930i | +0.2297 + 1.0778i |
| w4  | 00100 | +0.1929 − 0.1744i | −0.2187 + 0.1559i | +0.6590 + 0.1934i | +0.6409 + 0.2027i |
| w5  | 00101 | +0.2283 − 0.5036i | −0.2225 + 0.5103i | +1.1691 + 0.2524i | +1.1236 + 0.2383i |
| w6  | 00110 | +0.6363 − 0.1782i | −0.2187 − 0.1559i | +0.6590 − 0.1934i | +0.6262 + 0.6234i |
| w7  | 00111 | +0.6364 − 0.4437i | −0.2225 − 0.5103i | +1.1691 − 0.2524i | +1.0921 + 0.7399i |
| w8  | 01000 | +0.3541 + 1.4168i | +0.7211 + 0.1755i | −0.2113 + 0.1819i | +0.2082 − 0.1996i |
| w9  | 01001 | +0.2627 + 0.9170i | +0.6446 + 0.5183i | −0.6163 + 1.2930i | +0.6964 − 1.2272i |
| w10 | 01010 | +1.3162 + 0.3270i | +0.7211 − 0.1755i | −0.2113 − 0.1819i | +0.2041 − 0.6147i |
| w11 | 01011 | +0.9382 + 0.8637i | +0.6446 − 0.5183i | −0.6163 − 1.2930i | +0.2297 − 1.0778i |
| w12 | 01100 | +0.3541 − 1.4168i | −0.7211 + 0.1755i | −0.6590 + 0.1934i | +0.6409 − 0.2027i |
| w13 | 01101 | +0.2627 − 0.9170i | −0.6446 + 0.5183i | −1.1691 + 0.2524i | +1.1236 − 0.2383i |
| w14 | 01110 | +1.3162 − 0.3270i | −0.7211 − 0.1755i | −0.6590 − 0.1934i | +0.6262 − 0.6234i |
| w15 | 01111 | +0.9382 − 0.8637i | −0.6446 − 0.5183i | −1.1691 − 0.2524i | +1.0921 − 0.7399i |
| w16 | 10000 | −0.1929 + 0.1744i | +0.3459 + 1.3987i | +0.2042 + 0.5736i | −0.2082 + 0.1996i |
| w17 | 10001 | −0.2283 + 0.5036i | +0.2415 + 0.9207i | +0.2154 + 1.0277i | −0.6964 + 1.2272i |
| w18 | 10010 | −0.6963 + 0.1782i | +0.3459 − 1.3987i | +0.2042 − 0.5736i | −0.2041 + 0.6147i |
| w19 | 10011 | −0.6364 + 0.4437i | +0.2415 − 0.9207i | +0.2154 − 1.0277i | −0.2297 + 1.0778i |
| w20 | 10100 | −0.1929 − 0.1744i | −0.3459 + 1.3987i | +0.6214 + 0.5984i | −0.6409 + 0.2027i |
| w21 | 10101 | −0.2283 − 0.5036i | −0.2415 + 0.9207i | +1.0670 + 0.7825i | −1.1236 + 0.2383i |
| w22 | 10110 | −0.6963 − 0.1782i | −0.3459 − 1.3987i | +0.6214 − 0.5984i | −0.6262 + 0.6234i |
| w23 | 10111 | −0.6364 − 0.4437i | −0.2415 − 0.9207i | +1.0670 − 0.7825i | −1.0921 + 0.7399i |
| w24 | 11000 | −0.3541 + 1.4168i | +1.2734 + 0.3186i | −0.2042 + 0.5736i | −0.2082 − 0.1996i |
| w25 | 11001 | −0.2627 + 0.9170i | +0.9258 + 0.9059i | −0.2154 + 1.0277i | −0.6964 − 1.2272i |
| w26 | 11010 | −1.3162 + 0.3270i | +1.2734 − 0.3186i | −0.2042 − 0.5736i | −0.2041 − 0.6147i |
| w27 | 11011 | −0.9382 + 0.8637i | +0.9258 − 0.9059i | −0.2154 − 1.0277i | −0.2297 − 1.0778i |
| w28 | 11100 | −0.3541 − 1.4168i | −1.2734 + 0.3186i | −0.6214 + 0.5984i | −0.6409 − 0.2027i |
| w29 | 11101 | −0.2627 − 0.9170i | −0.9258 + 0.9059i | −1.0670 + 0.7825i | −1.1236 − 0.2383i |
| w30 | 11110 | −1.3162 − 0.3270i | −1.2734 − 0.3186i | −0.6214 − 0.5984i | −0.6262 − 0.6234i |
| w31 | 11111 | −0.9382 − 0.8637i | −0.9258 − 0.9059i | −1.0670 − 0.7825i | −1.0921 − 0.7399i |

B3) 64-QAM NUC

| w/MCS index | bit label | R = ½ (or R = ⅝, ¾ or ¹³⁄₁₆) | R = ⅝ (or R = ½, ¾ or ¹³⁄₁₆) | R = ¾ (or R = ½, ⅝ or ¹³⁄₁₆) | R = ¹³⁄₁₆ (or R = ½, ⅝ or ¾) |
|---|---|---|---|---|---|
| w0  | 000000 | +1.4732 + 0.2920i | +1.4730 + 0.3019i | +1.0501 − 0.1676i | +1.0414 − 0.1712i |
| w1  | 000001 | +1.2487 + 0.8348i | −1.4730 + 0.3019i | +1.4380 − 0.2294i | +0.7230 − 0.1517i |
| w2  | 000010 | +1.4732 − 0.2920i | +1.0895 + 0.2172i | +0.1398 − 0.1309i | +1.0997 − 0.5419i |
| w3  | 000011 | +1.2487 − 0.8348i | −1.0895 + 0.2172i | +0.1680 − 1.0338i | +0.7484 − 0.4663i |
| w4  | 000100 | +1.0283 + 0.2071i | +0.1419 + 0.1122i | +1.0725 − 0.5328i | −1.0414 − 0.1712i |
| w5  | 000101 | +0.8760 + 0.5811i | −0.1419 + 0.1122i | +1.0771 − 0.9315i | −0.7230 − 0.1517i |
| w6  | 000110 | +1.0283 − 0.2071i | +0.7863 + 0.1337i | +0.1361 − 0.4023i | −1.0997 − 0.5419i |
| w7  | 000111 | +0.8760 − 0.5811i | −0.7863 + 0.1337i | +0.1373 − 0.7043i | −0.7484 − 0.4663i |
| w8  | 001000 | −1.4732 + 0.2920i | +1.4730 − 0.3019i | +1.0501 + 0.1676i | +1.0414 + 0.1712i |
| w9  | 001001 | −1.2487 + 0.8348i | −1.4730 − 0.3019i | +1.4380 + 0.2294i | +0.7230 + 0.1517i |
| w10 | 001010 | −1.4732 − 0.2920i | +1.0895 − 0.2172i | +0.1398 + 0.1309i | +1.0997 + 0.5419i |
| w11 | 001011 | −1.2487 − 0.8348i | −1.0895 − 0.2172i | +0.1680 + 1.0338i | +0.7484 + 0.4663i |
| w12 | 001100 | −1.0283 + 0.2071i | +0.1419 − 0.1122i | +1.0725 + 0.5328i | −1.0414 + 0.1712i |
| w13 | 001101 | −0.8760 + 0.5811i | −0.1419 − 0.1122i | +1.0771 + 0.9315i | −0.7230 + 0.1517i |
| w14 | 001110 | −1.0283 − 0.2071i | +0.7863 − 0.1337i | +0.1361 + 0.4023i | −1.0997 + 0.5419i |
| w15 | 001111 | −0.8760 − 0.5811i | −0.7863 − 0.1337i | +0.1373 + 0.7043i | −0.7484 + 0.4663i |
| w16 | 010000 | +0.2920 + 1.4732i | +1.2124 + 0.8333i | +0.7233 − 0.1496i | +0.1414 − 0.1379i |
| w17 | 010001 | +0.8348 + 1.2487i | −1.2124 + 0.8333i | +0.6220 − 1.1896i | +0.4272 − 0.1421i |
| w18 | 010010 | +0.2920 − 1.4732i | +0.8988 + 0.5768i | +0.4246 − 0.1370i | +0.1440 − 0.4167i |
| w19 | 010011 | +0.8348 − 1.2487i | −0.8988 + 0.5768i | +0.2326 − 1.3986i | +0.4369 − 0.4317i |
| w20 | 010100 | +0.2071 + 1.0283i | +0.3733 + 0.1498i | +0.7267 − 0.4592i | −0.1414 − 0.1379i |
| w21 | 010101 | +0.5811 + 0.8760i | −0.3733 + 0.1498i | +0.6956 − 0.8095i | −0.4272 − 0.1421i |
| w22 | 010110 | +0.2071 − 1.0283i | +0.6394 + 0.3211i | +0.4198 − 0.4151i | −0.1440 − 0.4167i |
| w23 | 010111 | +0.5811 − 0.8760i | −0.6394 + 0.3211i | +0.4114 − 0.7109i | −0.4369 − 0.4317i |
| w24 | 011000 | −0.2920 + 1.4732i | +1.2124 − 0.8333i | +0.7233 + 0.1496i | +0.1414 + 0.1379i |
| w25 | 011001 | −0.8348 + 1.2487i | −1.2124 − 0.8333i | +0.6220 + 1.1896i | +0.4272 + 0.1421i |
| w26 | 011010 | −0.2920 − 1.4732i | +0.8988 − 0.5768i | +0.4246 + 0.1370i | +0.1440 + 0.4167i |
| w27 | 011011 | −0.8348 − 1.2487i | −0.8988 − 0.5768i | +0.2326 + 1.3986i | +0.4369 + 0.4317i |
| w28 | 011100 | −0.2071 + 1.0283i | +0.3733 − 0.1498i | +0.7267 + 0.4592i | −0.1414 + 0.1379i |
| w29 | 011101 | −0.5811 + 0.8760i | −0.3733 − 0.1498i | +0.6956 + 0.8095i | −0.4272 + 0.1421i |
| w30 | 011110 | −0.2071 − 1.0283i | +0.6394 − 0.3211i | +0.4198 + 0.4151i | −0.1440 + 0.4167i |
| w31 | 011111 | −0.5811 − 0.8760i | −0.6394 − 0.3211i | +0.4114 + 0.7109i | −0.4369 + 0.4317i |
| w32 | 100000 | +0.3138 + 0.1393i | +0.2775 + 1.4188i | −1.0501 − 0.1676i | +1.4058 − 0.2115i |

-continued

| w/MCS index | bit label | R = ½ (or R = ⅝, ¾ or ¹³/₁₆) | R = ⅝ (or R = ½, ¾ or ¹³/₁₆) | R = ¾ (or R = ½, ⅝ or ¹³/₁₆) | R = ¹³/₁₆ (or R = ½, ⅝ or ¾) |
|---|---|---|---|---|---|
| w33 | 100001 | +0.3094 + 0.1671i | −0.2775 + 1.4188i | −1.4380 − 0.2294i | +0.5981 − 1.1597i |
| w34 | 100010 | +0.3138 − 0.1393i | +0.2177 + 1.0243i | −0.1398 − 0.1309i | +1.0691 − 0.9443i |
| w35 | 100011 | +0.3094 − 0.1671i | −0.2177 + 1.0243i | −0.1680 − 1.0338i | +0.7360 − 0.8042i |
| w36 | 100100 | +0.7004 + 0.1720i | +0.1138 + 0.3999i | −1.0725 − 0.5328i | −1.4058 − 0.2115i |
| w37 | 100101 | +0.6174 + 0.3741i | −0.1138 + 0.3999i | −1.0771 − 0.9315i | −0.5981 − 1.1597i |
| w38 | 100110 | +0.7004 − 0.1720i | +0.1487 + 0.7260i | −0.1361 − 0.4023i | −1.0691 − 0.9443i |
| w39 | 100111 | +0.6174 − 0.3741i | −0.1487 + 0.7260i | −0.1373 − 0.7043i | −0.7360 − 0.8042i |
| w40 | 101000 | −0.3138 + 0.1393i | +0.2775 − 1.4188i | −1.0501 + 0.1676i | +1.4058 + 0.2115i |
| w41 | 101001 | −0.3094 + 0.1671i | −0.2775 − 1.4188i | −1.4380 + 0.2294i | +0.5981 + 1.1597i |
| w42 | 101010 | −0.3138 − 0.1393i | +0.2177 − 1.0243i | −0.1398 + 0.1309i | +1.0691 + 0.9443i |
| w43 | 101011 | −0.3094 − 0.1671i | −0.2177 − 1.0243i | −0.1680 + 1.0338i | +0.7360 + 0.8042i |
| w44 | 101100 | −0.7004 + 0.1720i | +0.1138 − 0.3999i | −1.0725 + 0.5328i | −1.4058 + 0.2115i |
| w45 | 101101 | −0.6174 + 0.3741i | −0.1138 − 0.3999i | −1.0771 + 0.9315i | −0.5981 + 1.1597i |
| w46 | 101110 | −0.7004 − 0.1720i | +0.1487 − 0.7260i | −0.1361 + 0.4023i | −1.0691 + 0.9443i |
| w47 | 101111 | −0.6174 − 0.3741i | −0.1487 − 0.7260i | −0.1373 + 0.7043i | −0.7360 + 0.8042i |
| w48 | 110000 | +0.1393 + 0.3138i | +0.7921 + 1.2096i | −0.7233 − 0.1496i | +0.1695 − 1.0298i |
| w49 | 110001 | +0.1671 + 0.3094i | −0.7921 + 1.2096i | −0.6220 − 1.1896i | +0.2236 − 1.3784i |
| w50 | 110010 | +0.1393 − 0.3138i | +0.6056 + 0.8481i | −0.4246 − 0.1370i | +0.1426 − 0.7102i |
| w51 | 110011 | +0.1671 − 0.3094i | −0.6056 + 0.8481i | −0.2326 − 1.3986i | +0.4351 − 0.7394i |
| w52 | 110100 | +0.1720 + 0.7004i | +0.2891 + 0.3910i | −0.7267 − 0.4592i | −0.1695 − 1.0298i |
| w53 | 110101 | +0.3741 + 0.6174i | −0.2891 + 0.3910i | −0.6956 − 0.8095i | −0.2236 − 1.3784i |
| w54 | 110110 | +0.1720 − 0.7004i | +0.4397 + 0.5853i | −0.4198 − 0.4151i | −0.1426 − 0.7102i |
| w55 | 110111 | +0.3741 − 0.6174i | −0.4397 + 0.5853i | −0.4114 − 0.7109i | −0.4351 − 0.7394i |
| w56 | 111000 | −0.1393 + 0.3138i | +0.7921 − 1.2096i | −0.7233 + 0.1496i | +0.1695 + 1.0298i |
| w57 | 111001 | −0.1671 + 0.3094i | −0.7921 − 1.2096i | −0.6220 + 1.1896i | +0.2236 + 1.3784i |
| w58 | 111010 | −0.1393 − 0.3138i | +0.6056 − 0.8481i | −0.4246 + 0.1370i | +0.1426 + 0.7102i |
| w59 | 111011 | −0.1671 − 0.3094i | −0.6056 − 0.8481i | −0.2326 + 1.3986i | +0.4351 + 0.7394i |
| w60 | 111100 | −0.1720 + 0.7004i | +0.2891 − 0.3910i | −0.7267 + 0.4592i | −0.1695 + 1.0298i |
| w61 | 111101 | −0.3741 + 0.6174i | −0.2891 − 0.3910i | −0.6956 + 0.8095i | −0.2236 + 1.3784i |
| w62 | 111110 | −0.1720 − 0.7004i | +0.4397 − 0.5853i | −0.4198 + 0.4151i | −0.1426 + 0.7102i |
| w63 | 111111 | −0.3741 − 0.6174i | −0.4397 − 0.5853i | −0.4114 + 0.7109i | −0.4351 + 0.7394i |

B4) 128-QAM NUC for R=1/2 (or R=5/8, 3/4 or 13/16):

| w index | bit label | Constellation point |
|---|---|---|
| w0 | 0000000 | +0.7383 − 1.3947i |
| w1 | 0000000 | +0.2726 − 1.6070i |
| w2 | 0000001 | +0.7383 + 1.3947i |
| w3 | 0000001 | +0.2726 + 1.6070i |
| w4 | 0000010 | −0.7383 − 1.3947i |
| w5 | 0000010 | −0.2726 − 1.6070i |
| w6 | 0000011 | −0.7383 + 1.3947i |
| w7 | 0000011 | −0.2726 + 1.6070i |
| w8 | 0000100 | +1.0680 − 1.0753i |
| w9 | 0000100 | +1.0389 − 0.7336i |
| w10 | 0000101 | +1.0680 + 1.0753i |
| w11 | 0000101 | +1.0389 + 0.7336i |
| w12 | 0000110 | −1.0680 − 1.0753i |
| w13 | 0000110 | −1.0389 − 0.7336i |
| w14 | 0000111 | −1.0680 + 1.0753i |
| w15 | 0000111 | −1.0389 + 0.7336i |
| w16 | 0001000 | +0.5286 − 1.0997i |
| w17 | 0001000 | +0.1915 − 1.2689i |
| w18 | 0001001 | +0.5286 + 1.0997i |
| w19 | 0001001 | +0.1915 + 1.2689i |
| w20 | 0001010 | −0.5286 − 1.0997i |
| w21 | 0001010 | −0.1915 − 1.2689i |
| w22 | 0001011 | −0.5286 + 1.0997i |
| w23 | 0001011 | −0.1915 + 1.2689i |
| w24 | 0001100 | +0.6878 − 0.8578i |
| w25 | 0001100 | +0.7725 − 0.6723i |
| w26 | 0001101 | +0.6878 + 0.8578i |
| w27 | 0001101 | +0.7725 + 0.6723i |
| w28 | 0001110 | −0.6878 − 0.8578i |
| w29 | 0001110 | −0.7725 − 0.6723i |
| w30 | 0001111 | −0.6878 + 0.8578i |
| w31 | 0001111 | −0.7725 + 0.6723i |
| w32 | 0010000 | +0.1315 − 0.7332i |
| w33 | 0010000 | +0.1038 − 0.7607i |
| w34 | 0010001 | +0.1315 + 0.7332i |
| w35 | 0010001 | +0.1038 + 0.7607i |
| w36 | 0010010 | −0.1315 − 0.7332i |
| w37 | 0010010 | −0.1038 − 0.7607i |
| w38 | 0010011 | −0.1315 + 0.7332i |
| w39 | 0010011 | −0.1038 + 0.7607i |
| w40 | 0010100 | +0.1647 − 0.5388i |
| w41 | 0010100 | +0.1629 − 0.5296i |
| w42 | 0010101 | +0.1647 + 0.5388i |
| w43 | 0010101 | +0.1629 + 0.5296i |
| w44 | 0010110 | −0.1647 − 0.5388i |
| w45 | 0010110 | −0.1629 − 0.5296i |
| w46 | 0010111 | −0.1647 + 0.5388i |
| w47 | 0010111 | −0.1629 + 0.5296i |
| w48 | 0011000 | +0.3255 − 0.9067i |
| w49 | 0011000 | +0.1588 − 1.0122i |
| w50 | 0011001 | +0.3255 + 0.9067i |
| w51 | 0011001 | +0.1588 + 1.0122i |
| w52 | 0011010 | −0.3255 − 0.9067i |
| w53 | 0011010 | −0.1588 − 1.0122i |
| w54 | 0011011 | −0.3255 + 0.9067i |
| w55 | 0011011 | −0.1588 + 1.0122i |
| w56 | 0011100 | +0.4535 − 0.6452i |
| w57 | 0011100 | +0.4645 − 0.5898i |
| w58 | 0011101 | +0.4535 + 0.6452i |
| w59 | 0011101 | +0.4645 + 0.5898i |
| w60 | 0011110 | −0.4535 − 0.6452i |
| w61 | 0011110 | −0.4645 − 0.5898i |
| w62 | 0011111 | −0.4535 + 0.6452i |
| w63 | 0011111 | −0.4645 + 0.5898i |
| w64 | 0100000 | +1.5779 − 0.2230i |
| w65 | 0100001 | +1.2114 − 0.1662i |
| w66 | 0100010 | +1.5779 + 0.2230i |
| w67 | 0100011 | +1.2114 + 0.1662i |
| w68 | 0100100 | −1.5779 − 0.2230i |
| w69 | 0100101 | −1.2114 − 0.1662i |
| w70 | 0100110 | −1.5779 + 0.2230i |
| w71 | 0100111 | −1.2114 + 0.1662i |

-continued

| w index | bit label | Constellation point |
|---|---|---|
| w72 | 01001000 | +1.4915 − 0.6927i |
| w73 | 01001001 | +1.1447 − 0.4719i |
| w74 | 01001010 | +1.4915 + 0.6927i |
| w75 | 01001011 | +1.1447 + 0.4719i |
| w76 | 01001100 | −1.4915 − 0.6927i |
| w77 | 01001101 | −1.1447 − 0.4719i |
| w78 | 01001110 | −1.4915 + 0.6927i |
| w79 | 01001111 | −1.1447 + 0.4719i |
| w80 | 01010000 | +0.7620 − 0.1121i |
| w81 | 01010001 | +0.9103 − 0.1272i |
| w82 | 01010010 | +0.7620 + 0.1121i |
| w83 | 01010011 | +0.9103 + 0.1272i |
| w84 | 01010100 | −0.7620 − 0.1121i |
| w85 | 01010101 | −0.9103 − 0.1272i |
| w86 | 01010110 | −0.7620 + 0.1121i |
| w87 | 01010111 | −0.9103 + 0.1272i |
| w88 | 01011000 | +0.7359 − 0.3230i |
| w89 | 01011001 | +0.8236 − 0.3936i |
| w90 | 01011010 | +0.7359 + 0.3230i |
| w91 | 01011011 | +0.8236 + 0.3936i |
| w92 | 01011100 | −0.7359 − 0.3230i |
| w93 | 01011101 | −0.8236 − 0.3936i |
| w94 | 01011110 | −0.7359 + 0.3230i |
| w95 | 01011111 | −0.8236 + 0.3936i |
| w96 | 01100000 | +0.1461 − 0.1146i |
| w97 | 01100001 | +0.1573 − 0.1142i |
| w98 | 01100010 | +0.1461 + 0.1146i |
| w99 | 01100011 | +0.1573 + 0.1142i |
| w100 | 01100100 | −0.1461 − 0.1146i |
| w101 | 01100101 | −0.1573 − 0.1142i |
| w102 | 01100110 | −0.1461 + 0.1146i |
| w103 | 01100111 | −0.1573 + 0.1142i |
| w104 | 01101000 | +0.1535 − 0.3082i |
| w105 | 01101001 | +0.1629 − 0.3084i |
| w106 | 01101010 | +0.1535 + 0.3082i |
| w107 | 01101011 | +0.1629 + 0.3084i |
| w108 | 01101100 | −0.1535 − 0.3082i |
| w109 | 01101101 | −0.1629 − 0.3084i |
| w110 | 01101110 | −0.1535 + 0.3082i |
| w111 | 01101111 | −0.1629 + 0.3084i |
| w112 | 01110000 | +0.4774 − 0.1074i |
| w113 | 01110001 | +0.4323 − 0.1096i |
| w114 | 01110010 | +0.4774 + 0.1074i |
| w115 | 01110011 | +0.4323 + 0.1096i |
| w116 | 01110100 | −0.4774 − 0.1074i |
| w117 | 01110101 | −0.4323 − 0.1096i |
| w118 | 01110110 | −0.4774 + 0.1074i |
| w119 | 01110111 | −0.4323 + 0.1096i |
| w120 | 01111000 | +0.4853 − 0.3237i |
| w121 | 01111001 | +0.4637 − 0.3425i |
| w122 | 01111010 | +0.4853 + 0.3237i |
| w123 | 01111011 | +0.4637 + 0.3425i |
| w124 | 01111100 | −0.4853 − 0.3237i |
| w125 | 01111101 | −0.4637 − 0.3425i |
| w126 | 01111110 | −0.4853 + 0.3237i |
| w127 | 01111111 | −0.4637 + 0.3425i | for R=5/8 (or R=1/2, 3/4 or 13/16):

| w index | bit label | Constellation point |
|---|---|---|
| w0 | 0000000 | +1.1438 + 0.4323i |
| w1 | 0000000 | +0.1045 + 0.4578i |
| w2 | 0000001 | −1.1438 + 0.4323i |
| w3 | 0000001 | −0.1045 + 0.4578i |
| w4 | 0000010 | +0.9006 + 0.4173i |
| w5 | 0000010 | +0.1067 + 0.3515i |
| w6 | 0000011 | −0.9006 + 0.4173i |
| w7 | 0000011 | −0.1067 + 0.3515i |
| w8 | 0000100 | +1.1598 + 0.1437i |
| w9 | 0000100 | +0.1075 + 0.0988i |
| w10 | 0000101 | −1.1598 + 0.1437i |
| w11 | 0000101 | −0.1075 + 0.0988i |
| w12 | 0000110 | +0.9102 + 0.1324i |
| w13 | 0000110 | +0.1136 + 0.1402i |

-continued

| w index | bit label | Constellation point |
|---|---|---|
| w14 | 0000111 | −0.9102 + 0.1324i |
| w15 | 0000111 | −0.1136 + 0.1402i |
| w16 | 0001000 | +0.5578 + 0.4216i |
| w17 | 0001000 | +0.3411 + 0.4189i |
| w18 | 0001001 | −0.5578 + 0.4216i |
| w19 | 0001001 | −0.3411 + 0.4189i |
| w20 | 0001010 | +0.6797 + 0.3850i |
| w21 | 0001010 | +0.3088 + 0.3456i |
| w22 | 0001011 | −0.6797 + 0.3850i |
| w23 | 0001011 | −0.3088 + 0.3456i |
| w24 | 0001100 | +0.5755 + 0.1222i |
| w25 | 0001100 | +0.3700 + 0.1151i |
| w26 | 0001101 | −0.5755 + 0.1222i |
| w27 | 0001101 | −0.3700 + 0.1151i |
| w28 | 0001110 | +0.6787 + 0.1401i |
| w29 | 0001110 | +0.3294 + 0.1448i |
| w30 | 0001111 | −0.6787 + 0.1401i |
| w31 | 0001111 | −0.3294 + 0.1448i |
| w32 | 0010000 | +1.1837 + 0.8001i |
| w33 | 0010000 | +0.1121 + 0.6749i |
| w34 | 0010001 | −1.1837 + 0.8001i |
| w35 | 0010001 | −0.1121 + 0.6749i |
| w36 | 0010010 | +0.9008 + 0.6972i |
| w37 | 0010010 | +0.1179 + 0.8955i |
| w38 | 0010011 | −0.9008 + 0.6972i |
| w39 | 0010011 | −0.1179 + 0.8955i |
| w40 | 0010100 | +1.4855 + 0.1793i |
| w41 | 0010100 | +0.1933 + 1.4991i |
| w42 | 0010101 | −1.4855 + 0.1793i |
| w43 | 0010101 | −0.1933 + 1.4991i |
| w44 | 0010110 | +1.5681 + 0.5636i |
| w45 | 0010110 | +0.1440 + 1.1691i |
| w46 | 0010111 | −1.5681 + 0.5636i |
| w47 | 0010111 | −0.1440 + 1.1691i |
| w48 | 0011000 | +0.5354 + 0.6351i |
| w49 | 0011000 | +0.3342 + 0.6628i |
| w50 | 0011001 | −0.5354 + 0.6351i |
| w51 | 0011001 | −0.3342 + 0.6628i |
| w52 | 0011010 | +0.6549 + 0.7546i |
| w53 | 0011010 | +0.3585 + 0.8699i |
| w54 | 0011011 | −0.6549 + 0.7546i |
| w55 | 0011011 | −0.3585 + 0.8699i |
| w56 | 0011100 | +0.9727 + 1.2109i |
| w57 | 0011100 | +0.5835 + 1.4250i |
| w58 | 0011101 | −0.9727 + 1.2109i |
| w59 | 0011101 | −0.5835 + 1.4250i |
| w60 | 0011110 | +0.7102 + 1.0171i |
| w61 | 0011110 | +0.4344 + 1.1140i |
| w62 | 0011111 | −0.7102 + 1.0171i |
| w63 | 0011111 | −0.4344 + 1.1140i |
| w64 | 01000000 | +1.1438 − 0.4323i |
| w65 | 01000001 | +0.1045 − 0.4578i |
| w66 | 01000010 | −1.1438 − 0.4323i |
| w67 | 01000011 | −0.1045 − 0.4578i |
| w68 | 01000100 | +0.9006 − 0.4173i |
| w69 | 01000101 | +0.1067 − 0.3515i |
| w70 | 01000110 | −0.9006 − 0.4173i |
| w71 | 01000111 | −0.1067 − 0.3515i |
| w72 | 01001000 | +1.1598 − 0.1437i |
| w73 | 01001001 | +0.1075 − 0.0988i |
| w74 | 01001010 | −1.1598 − 0.1437i |
| w75 | 01001011 | −0.1075 − 0.0988i |
| w76 | 01001100 | +0.9102 − 0.1324i |
| w77 | 01001101 | +0.1136 − 0.1402i |
| w78 | 01001110 | −0.9102 − 0.1324i |
| w79 | 01001111 | −0.1136 − 0.1402i |
| w80 | 01010000 | +0.5578 − 0.4216i |
| w81 | 01010001 | +0.3411 − 0.4189i |
| w82 | 01010010 | −0.5578 − 0.4216i |
| w83 | 01010011 | −0.3411 − 0.4189i |
| w84 | 01010100 | +0.6797 − 0.3850i |
| w85 | 01010101 | +0.3088 − 0.3456i |
| w86 | 01010110 | −0.6797 − 0.3850i |
| w87 | 01010111 | −0.3088 − 0.3456i |
| w88 | 01011000 | +0.5755 − 0.1222i |
| w89 | 01011001 | +0.3700 − 0.1151i |
| w90 | 01011010 | −0.5755 − 0.1222i |

-continued

| w index | bit label | Constellation point |
|---|---|---|
| w91 | 01011011 | −0.3700 − 0.1151i |
| w92 | 01011100 | +0.6787 − 0.1401i |
| w93 | 01011101 | +0.3294 − 0.1448i |
| w94 | 01011110 | −0.6787 − 0.1401i |
| w95 | 01011111 | −0.3294 − 0.1448i |
| w96 | 01100000 | +1.1837 − 0.8001i |
| w97 | 01100001 | +0.1121 − 0.6749i |
| w98 | 01100010 | −1.1837 − 0.8001i |
| w99 | 01100011 | −0.1121 − 0.6749i |
| w100 | 01100100 | +0.9008 − 0.6972i |
| w101 | 01100101 | +0.1179 − 0.8955i |
| w102 | 01100110 | −0.9008 − 0.6972i |
| w103 | 01100111 | −0.1179 − 0.8955i |
| w104 | 01101000 | +1.4855 − 0.1793i |
| w105 | 01101001 | +0.1933 − 1.4991i |
| w106 | 01101010 | −1.4855 − 0.1793i |
| w107 | 01101011 | −0.1933 − 1.4991i |
| w108 | 01101100 | +1.5681 − 0.5636i |
| w109 | 01101101 | +0.1440 − 1.1691i |
| w110 | 01101110 | −1.5681 − 0.5636i |
| w111 | 01101111 | −0.1440 − 1.1691i |
| w112 | 01110000 | +0.5354 − 0.6351i |
| w113 | 01110001 | +0.3342 − 0.6628i |
| w114 | 01110010 | −0.5354 − 0.6351i |
| w115 | 01110011 | −0.3342 − 0.6628i |
| w116 | 01110100 | +0.6549 − 0.7546i |
| w117 | 01110101 | +0.3585 − 0.8699i |
| w118 | 01110110 | −0.6549 − 0.7546i |
| w119 | 01110111 | −0.3585 − 0.8699i |
| w120 | 01111000 | +0.9727 − 1.2109i |
| w121 | 01111001 | +0.5835 − 1.4250i |
| w122 | 01111010 | −0.9727 − 1.2109i |
| w123 | 01111011 | −0.5835 − 1.4250i |
| w124 | 01111100 | +0.7102 − 1.0171i |
| w125 | 01111101 | +0.4344 − 1.1140i |
| w126 | 01111110 | −0.7102 − 1.0171i |
| w127 | 01111111 | −0.4344 − 1.1140i | for R=3/4 (or R=1/2, 5/8 or 13/16):

| w index | bit label | Constellation point |
|---|---|---|
| w0 | 0000000 | +1.0837 + 0.3878i |
| w1 | 0000000 | +0.5568 + 0.5351i |
| w2 | 0000001 | +1.0837 − 0.3878i |
| w3 | 0000001 | +0.5568 − 0.5351i |
| w4 | 0000010 | +0.8372 + 0.4015i |
| w5 | 0000010 | +0.5992 + 0.3732i |
| w6 | 0000011 | +0.8372 − 0.4015i |
| w7 | 0000011 | +0.5992 − 0.3732i |
| w8 | 0000100 | +1.1795 + 0.6737i |
| w9 | 0000100 | +0.5823 + 0.7120i |
| w10 | 0000101 | +1.1795 − 0.6737i |
| w11 | 0000101 | +0.5823 − 0.7120i |
| w12 | 0000110 | +0.8934 + 0.6718i |
| w13 | 0000110 | +0.7091 + 0.8942i |
| w14 | 0000111 | +0.8934 − 0.6718i |
| w15 | 0000111 | +0.7091 − 0.8942i |
| w16 | 0001000 | +0.1125 + 0.5652i |
| w17 | 0001000 | +0.3356 + 0.5485i |
| w18 | 0001001 | +0.1125 − 0.5652i |
| w19 | 0001001 | +0.3356 − 0.5485i |
| w20 | 0001010 | +0.1063 + 0.3959i |
| w21 | 0001010 | +0.3354 + 0.3801i |
| w22 | 0001011 | +0.1063 − 0.3959i |
| w23 | 0001011 | +0.3354 − 0.3801i |
| w24 | 0001100 | +0.1174 + 0.7565i |
| w25 | 0001100 | +0.3498 + 0.7450i |
| w26 | 0001101 | +0.1174 − 0.7565i |
| w27 | 0001101 | +0.3498 − 0.7450i |
| w28 | 0001110 | +0.1285 + 0.9672i |
| w29 | 0001110 | +0.3973 + 0.9520i |
| w30 | 0001111 | +0.1285 − 0.9672i |
| w31 | 0001111 | +0.3973 − 0.9520i |
| w32 | 0010000 | −1.0837 + 0.3878i |

-continued

| w index | bit label | Constellation point |
|---|---|---|
| w33 | 0010000 | −0.5568 + 0.5351i |
| w34 | 0010001 | −1.0837 − 0.3878i |
| w35 | 0010001 | −0.5568 − 0.5351i |
| w36 | 0010010 | −0.8372 + 0.4015i |
| w37 | 0010010 | −0.5992 + 0.3732i |
| w38 | 0010011 | −0.8372 − 0.4015i |
| w39 | 0010011 | −0.5992 − 0.3732i |
| w40 | 0010100 | −1.1795 + 0.6737i |
| w41 | 0010100 | −0.5823 + 0.7120i |
| w42 | 0010101 | −1.1795 − 0.6737i |
| w43 | 0010101 | −0.5823 − 0.7120i |
| w44 | 0010110 | −0.8934 + 0.6718i |
| w45 | 0010110 | −0.7091 + 0.8942i |
| w46 | 0010111 | −0.8934 − 0.6718i |
| w47 | 0010111 | −0.7091 − 0.8942i |
| w48 | 0011000 | −0.1125 + 0.5652i |
| w49 | 0011000 | −0.3356 + 0.5485i |
| w50 | 0011001 | −0.1125 − 0.5652i |
| w51 | 0011001 | −0.3356 − 0.5485i |
| w52 | 0011010 | −0.1063 + 0.3959i |
| w53 | 0011010 | −0.3354 + 0.3801i |
| w54 | 0011011 | −0.1063 − 0.3959i |
| w55 | 0011011 | −0.3354 − 0.3801i |
| w56 | 0011100 | −0.1174 + 0.7565i |
| w57 | 0011100 | −0.3498 + 0.7450i |
| w58 | 0011101 | −0.1174 − 0.7565i |
| w59 | 0011101 | −0.3498 − 0.7450i |
| w60 | 0011110 | −0.1285 + 0.9672i |
| w61 | 0011110 | −0.3973 + 0.9520i |
| w62 | 0011111 | −0.1285 − 0.9672i |
| w63 | 0011111 | −0.3973 − 0.9520i |
| w64 | 01000000 | +1.0605 + 0.1271i |
| w65 | 01000001 | +0.5216 + 0.0747i |
| w66 | 01000010 | +1.0605 − 0.1271i |
| w67 | 01000011 | +0.5216 − 0.0747i |
| w68 | 01000100 | +0.8209 + 0.1292i |
| w69 | 01000101 | +0.6018 + 0.1929i |
| w70 | 01000110 | +0.8209 − 0.1292i |
| w71 | 01000111 | +0.6018 − 0.1929i |
| w72 | 01001000 | +1.3525 + 0.1471i |
| w73 | 01001001 | +1.0702 + 1.0357i |
| w74 | 01001010 | +1.3525 − 0.1471i |
| w75 | 01001011 | +1.0702 − 1.0357i |
| w76 | 01001100 | +1.4799 + 0.4422i |
| w77 | 01001101 | +0.7653 + 1.1720i |
| w78 | 01001110 | +1.4799 − 0.4422i |
| w79 | 01001111 | +0.7653 − 1.1720i |
| w80 | 01010000 | +0.1054 + 0.0790i |
| w81 | 01010001 | +0.3169 + 0.0841i |
| w82 | 01010010 | +0.1054 − 0.0790i |
| w83 | 01010011 | +0.3169 − 0.0841i |
| w84 | 01010100 | +0.1042 + 0.2345i |
| w85 | 01010101 | +0.3223 + 0.2346i |
| w86 | 01010110 | +0.1042 − 0.2345i |
| w87 | 01010111 | +0.3223 − 0.2346i |
| w88 | 01011000 | +0.1687 + 1.4929i |
| w89 | 01011001 | +0.5173 + 1.4708i |
| w90 | 01011010 | +0.1687 − 1.4929i |
| w91 | 01011011 | +0.5173 − 1.4708i |
| w92 | 01011100 | +0.1455 + 1.2047i |
| w93 | 01011101 | +0.4442 + 1.1814i |
| w94 | 01011110 | +0.1455 − 1.2047i |
| w95 | 01011111 | +0.4442 − 1.1814i |
| w96 | 01100000 | −1.0605 + 0.1271i |
| w97 | 01100001 | −0.5216 + 0.0747i |
| w98 | 01100010 | −1.0605 − 0.1271i |
| w99 | 01100011 | −0.5216 − 0.0747i |
| w100 | 01100100 | −0.8209 + 0.1292i |
| w101 | 01100101 | −0.6018 + 0.1929i |
| w102 | 01100110 | −0.8209 − 0.1292i |
| w103 | 01100111 | −0.6018 − 0.1929i |
| w104 | 01101000 | −1.3525 + 0.1471i |
| w105 | 01101001 | −1.0702 + 1.0357i |
| w106 | 01101010 | −1.3525 − 0.1471i |
| w107 | 01101011 | −1.0702 − 1.0357i |
| w108 | 01101100 | −1.4799 + 0.4422i |
| w109 | 01101101 | −0.7653 + 1.1720i |

-continued

| w index | bit label | Constellation point |
| --- | --- | --- |
| w110 | 01101110 | −1.4799 − 0.4422i |
| w111 | 01101111 | −0.7653 − 1.1720i |
| w112 | 01110000 | −0.1054 + 0.0790i |
| w113 | 01110001 | −0.3169 + 0.0841i |
| w114 | 01110010 | −0.1054 − 0.0790i |
| w115 | 01110011 | −0.3169 − 0.0841i |
| w116 | 01110100 | −0.1042 + 0.2345i |
| w117 | 01110101 | −0.3223 + 0.2346i |
| w118 | 01110110 | −0.1042 − 0.2345i |
| w119 | 01110111 | −0.3223 − 0.2346i |
| w120 | 01111000 | −0.1687 + 1.4929i |
| w121 | 01111001 | −0.5173 + 1.4708i |
| w122 | 01111010 | −0.1687 − 1.4929i |
| w123 | 01111011 | −0.5173 − 1.4708i |
| w124 | 01111100 | −0.1455 + 1.2047i |
| w125 | 01111101 | −0.4442 + 1.1814i |
| w126 | 01111110 | −0.1455 − 1.2047i |
| w127 | 01111111 | −0.4442 − 1.1814i | for R=13/16 (or R=1/2, 5/8 or 3/4):

| w index | bit label | Constellation point |
| --- | --- | --- |
| w0 | 0000000 | +1.0422 + 0.3376i |
| w1 | 0000000 | −1.0422 + 0.3376i |
| w2 | 0000001 | +1.0422 − 0.3376i |
| w3 | 0000001 | −1.0422 − 0.3376i |
| w4 | 0000010 | +0.1125 + 0.6269i |
| w5 | 0000010 | −0.1125 + 0.6269i |
| w6 | 0000011 | +0.1125 − 0.6269i |
| w7 | 0000011 | −0.1125 − 0.6269i |
| w8 | 0000100 | +1.0010 + 0.1105i |
| w9 | 0000100 | −1.0010 + 0.1105i |
| w10 | 0000101 | +1.0010 − 0.1105i |
| w11 | 0000101 | −1.0010 − 0.1105i |
| w12 | 0000110 | +0.0978 + 0.0913i |
| w13 | 0000110 | −0.0978 + 0.0913i |
| w14 | 0000111 | +0.0978 − 0.0913i |
| w15 | 0000111 | −0.0978 − 0.0913i |
| w16 | 0001000 | +0.7966 + 0.3496i |
| w17 | 0001000 | −0.7966 + 0.3496i |
| w18 | 0001001 | +0.7966 − 0.3496i |
| w19 | 0001001 | −0.7966 − 0.3496i |
| w20 | 0001010 | +0.1109 + 0.4454i |
| w21 | 0001010 | −0.1109 + 0.4454i |
| w22 | 0001011 | +0.1109 − 0.4454i |
| w23 | 0001011 | −0.1109 − 0.4454i |
| w24 | 0001100 | +0.7613 + 0.1187i |
| w25 | 0001100 | −0.7613 + 0.1187i |
| w26 | 0001101 | +0.7613 − 0.1187i |
| w27 | 0001101 | −0.7613 − 0.1187i |
| w28 | 0001110 | +0.1038 + 0.2705i |
| w29 | 0001110 | −0.1038 + 0.2705i |
| w30 | 0001111 | +0.1038 − 0.2705i |
| w31 | 0001111 | −0.1038 − 0.2705i |
| w32 | 0010000 | +0.5556 + 0.6306i |
| w33 | 0010000 | −0.5556 + 0.6306i |
| w34 | 0010001 | +0.5556 − 0.6306i |
| w35 | 0010001 | −0.5556 − 0.6306i |
| w36 | 0010010 | +0.3351 + 0.6308i |
| w37 | 0010010 | −0.3351 + 0.6308i |
| w38 | 0010011 | +0.3351 − 0.6308i |
| w39 | 0010011 | −0.3351 − 0.6308i |
| w40 | 0010100 | +0.4942 + 0.0780i |
| w41 | 0010100 | −0.4942 + 0.0780i |
| w42 | 0010101 | +0.4942 − 0.0780i |
| w43 | 0010101 | −0.4942 − 0.0780i |
| w44 | 0010110 | +0.2935 + 0.0906i |
| w45 | 0010110 | −0.2935 + 0.0906i |
| w46 | 0010111 | +0.2935 − 0.0906i |
| w47 | 0010111 | −0.2935 − 0.0906i |
| w48 | 0011000 | +0.5761 + 0.4286i |
| w49 | 0011000 | −0.5761 + 0.4286i |
| w50 | 0011001 | +0.5761 − 0.4286i |
| w51 | 0011001 | −0.5761 − 0.4286i |
| w52 | 0011010 | +0.3383 + 0.4404i |
| w53 | 0011010 | −0.3383 + 0.4404i |
| w54 | 0011011 | +0.3383 − 0.4404i |
| w55 | 0011011 | −0.3383 − 0.4404i |
| w56 | 0011100 | +0.5456 + 0.2367i |
| w57 | 0011100 | −0.5456 + 0.2367i |
| w58 | 0011101 | +0.5456 − 0.2367i |
| w59 | 0011101 | −0.5456 − 0.2367i |
| w60 | 0011110 | +0.3172 + 0.2666i |
| w61 | 0011110 | −0.3172 + 0.2666i |
| w62 | 0011111 | +0.3172 − 0.2666i |
| w63 | 0011111 | −0.3172 − 0.2666i |
| w64 | 01000000 | +1.1154 + 0.5839i |
| w65 | 01000001 | −1.1154 + 0.5839i |
| w66 | 01000010 | +1.1154 − 0.5839i |
| w67 | 01000011 | −1.1154 − 0.5839i |
| w68 | 01000100 | +0.1155 + 0.8217i |
| w69 | 01000101 | −0.1155 + 0.8217i |
| w70 | 01000110 | +0.1155 − 0.8217i |
| w71 | 01000111 | −0.1155 − 0.8217i |
| w72 | 01001000 | +1.2844 + 0.1345i |
| w73 | 01001001 | −1.2844 + 0.1345i |
| w74 | 01001010 | +1.2844 − 0.1345i |
| w75 | 01001011 | −1.2844 − 0.1345i |
| w76 | 01001100 | +0.1646 + 1.5274i |
| w77 | 01001101 | −0.1646 + 1.5274i |
| w78 | 01001110 | +0.1646 − 1.5274i |
| w79 | 01001111 | −0.1646 − 1.5274i |
| w80 | 01010000 | +0.8563 + 0.5705i |
| w81 | 01010001 | −0.8563 + 0.5705i |
| w82 | 01010010 | +0.8563 − 0.5705i |
| w83 | 01010011 | −0.8563 − 0.5705i |
| w84 | 01010100 | +0.1239 + 1.0311i |
| w85 | 01010101 | −0.1239 + 1.0311i |
| w86 | 01010110 | +0.1239 − 1.0311i |
| w87 | 01010111 | −0.1239 − 1.0311i |
| w88 | 01011000 | +1.4001 + 0.4092i |
| w89 | 01011001 | −1.4001 + 0.4092i |
| w90 | 01011010 | +1.4001 − 0.4092i |
| w91 | 01011011 | −1.4001 − 0.4092i |
| w92 | 01011100 | +0.1345 + 1.2611i |
| w93 | 01011101 | −0.1345 + 1.2611i |
| w94 | 01011110 | +0.1345 − 1.2611i |
| w95 | 01011111 | −0.1345 − 1.2611i |
| w96 | 01100000 | +0.5970 + 0.8482i |
| w97 | 01100001 | −0.5970 + 0.8482i |
| w98 | 01100010 | +0.5970 − 0.8482i |
| w99 | 01100011 | −0.5970 − 0.8482i |
| w100 | 01100100 | +0.3510 + 0.8405i |
| w101 | 01100101 | −0.3510 + 0.8405i |
| w102 | 01100110 | +0.3510 − 0.8405i |
| w103 | 01100111 | −0.3510 − 0.8405i |
| w104 | 01101000 | +1.1670 + 0.8997i |
| w105 | 01101001 | −1.1670 + 0.8997i |
| w106 | 01101010 | +1.1670 − 0.8997i |
| w107 | 01101011 | −1.1670 − 0.8997i |
| w108 | 01101100 | +0.4543 + 1.3933i |
| w109 | 01101101 | −0.4543 + 1.3933i |
| w110 | 01101110 | +0.4543 − 1.3933i |
| w111 | 01101111 | −0.4543 − 1.3933i |
| w112 | 01110000 | +0.8378 + 0.8041i |
| w113 | 01110001 | −0.8378 + 0.8041i |
| w114 | 01110010 | +0.8378 − 0.8041i |
| w115 | 01110011 | −0.8378 − 0.8041i |
| w116 | 01110100 | +0.3850 + 1.0724i |
| w117 | 01110101 | −0.3850 + 1.0724i |
| w118 | 01110110 | +0.3850 − 1.0724i |
| w119 | 01110111 | −0.3850 − 1.0724i |
| w120 | 01111000 | +0.9031 + 1.0698i |
| w121 | 01111001 | −0.9031 + 1.0698i |
| w122 | 01111010 | +0.9031 − 1.0698i |
| w123 | 01111011 | −0.9031 − 1.0698i |
| w124 | 01111100 | +0.6436 + 1.1770i |
| w125 | 01111101 | −0.6436 + 1.1770i |
| w126 | 01111110 | +0.6436 − 1.1770i |
| w127 | 01111111 | −0.6436 − 1.1770i |

B5) 256-QAM NUC
for R=1/2 (or R=5/8, 3/4 or 13/16):

| w index | bit label | Constellation point |
| --- | --- | --- |
| w0 | 0000000 | −1.2901 + 1.0495i |
| w1 | 0000000 | −1.6350 + 0.1593i |
| w2 | 0000001 | −0.2844 + 0.1296i |
| w3 | 0000001 | −0.3237 + 0.0849i |
| w4 | 0000010 | −1.4625 + 0.7740i |
| w5 | 0000010 | −1.5776 + 0.4735i |
| w6 | 0000011 | −0.2853 + 0.1309i |
| w7 | 0000011 | −0.3228 + 0.0867i |
| w8 | 0000100 | +1.2901 + 1.0495i |
| w9 | 0000100 | +1.6350 + 0.1593i |
| w10 | 0000101 | +0.2844 + 0.1296i |
| w11 | 0000101 | +0.3237 + 0.0849i |
| w12 | 0000110 | +1.4625 + 0.7740i |
| w13 | 0000110 | +1.5776 + 0.4735i |
| w14 | 0000111 | +0.2853 + 0.1309i |
| w15 | 0000111 | +0.3228 + 0.0867i |
| w16 | 0001000 | −0.7273 + 0.6160i |
| w17 | 0001000 | −0.9430 + 0.1100i |
| w18 | 0001001 | −0.5902 + 0.4857i |
| w19 | 0001001 | −0.7502 + 0.1138i |
| w20 | 0001010 | −0.8177 + 0.4841i |
| w21 | 0001010 | −0.9069 + 0.2829i |
| w22 | 0001011 | −0.6355 + 0.4185i |
| w23 | 0001011 | −0.7325 + 0.2088i |
| w24 | 0001100 | +0.7273 + 0.6160i |
| w25 | 0001100 | +0.9430 + 0.1100i |
| w26 | 0001101 | +0.5902 + 0.4857i |
| w27 | 0001101 | +0.7502 + 0.1138i |
| w28 | 0001110 | +0.8177 + 0.4841i |
| w29 | 0001110 | +0.9069 + 0.2829i |
| w30 | 0001111 | +0.6355 + 0.4185i |
| w31 | 0001111 | +0.7325 + 0.2088i |
| w32 | 0010000 | −1.0646 + 1.2876i |
| w33 | 0010000 | −0.1658 + 1.6747i |
| w34 | 0010001 | −0.1053 + 0.1494i |
| w35 | 0010001 | −0.0872 + 0.1390i |
| w36 | 0010010 | −0.7949 + 1.4772i |
| w37 | 0010010 | −0.4907 + 1.6084i |
| w38 | 0010011 | −0.1052 + 0.1495i |
| w39 | 0010011 | −0.0871 + 0.1392i |
| w40 | 0010100 | +1.0646 + 1.2876i |
| w41 | 0010100 | +0.1658 + 1.6747i |
| w42 | 0010101 | +0.1053 + 0.1494i |
| w43 | 0010101 | +0.0872 + 0.1390i |
| w44 | 0010110 | +0.7949 + 1.4772i |
| w45 | 0010110 | +0.4907 + 1.6084i |
| w46 | 0010111 | +0.1052 + 0.1495i |
| w47 | 0010111 | +0.0871 + 0.1392i |
| w48 | 0011000 | −0.5707 + 0.7662i |
| w49 | 0011000 | −0.1088 + 0.9530i |
| w50 | 0011001 | −0.4294 + 0.6363i |
| w51 | 0011001 | −0.1091 + 0.7656i |
| w52 | 0011010 | −0.4490 + 0.8461i |
| w53 | 0011010 | −0.2464 + 0.9270i |
| w54 | 0011011 | −0.3744 + 0.6744i |
| w55 | 0011011 | −0.1699 + 0.7537i |
| w56 | 0011100 | +0.5707 + 0.7662i |
| w57 | 0011100 | +0.1088 + 0.9530i |
| w58 | 0011101 | +0.4294 + 0.6363i |
| w59 | 0011101 | +0.1091 + 0.7656i |
| w60 | 0011110 | +0.4490 + 0.8461i |
| w61 | 0011110 | +0.2464 + 0.9270i |
| w62 | 0011111 | +0.3744 + 0.6744i |
| w63 | 0011111 | +0.1699 + 0.7537i |
| w64 | 01000000 | −1.0382 + 0.8623i |
| w65 | 01000001 | −1.3225 + 0.1320i |
| w66 | 01000010 | −0.3734 + 0.2560i |
| w67 | 01000011 | −0.4582 + 0.1123i |
| w68 | 01000100 | −1.1794 + 0.6376i |
| w69 | 01000101 | −1.2742 + 0.3922i |
| w70 | 01000110 | −0.3799 + 0.2517i |
| w71 | 01000111 | −0.4545 + 0.1251i |
| w72 | 01001000 | +1.0382 + 0.8623i |
| w73 | 01001001 | +1.3225 + 0.1320i |
| w74 | 01001010 | +0.3734 + 0.2560i |
| w75 | 01001011 | +0.4582 + 0.1123i |
| w76 | 01001100 | +1.1794 + 0.6376i |
| w77 | 01001101 | +1.2742 + 0.3922i |
| w78 | 01001110 | +0.3799 + 0.2517i |
| w79 | 01001111 | +0.4545 + 0.1251i |
| w80 | 01010000 | −0.8504 + 0.7217i |
| w81 | 01010001 | −1.0854 + 0.1139i |
| w82 | 01010010 | −0.4968 + 0.3947i |
| w83 | 01010011 | −0.6473 + 0.1138i |
| w84 | 01010100 | −0.9638 + 0.5407i |
| w85 | 01010101 | −1.0441 + 0.3296i |
| w86 | 01010110 | −0.5231 + 0.3644i |
| w87 | 01010111 | −0.6339 + 0.1702i |
| w88 | 01011000 | +0.8504 + 0.7217i |
| w89 | 01011001 | +1.0854 + 0.1139i |
| w90 | 01011010 | +0.4968 + 0.3947i |
| w91 | 01011011 | +0.6473 + 0.1138i |
| w92 | 01011100 | +0.9638 + 0.5407i |
| w93 | 01011101 | +1.0441 + 0.3296i |
| w94 | 01011110 | +0.5231 + 0.3644i |
| w95 | 01011111 | +0.6339 + 0.1702i |
| w96 | 01100000 | −0.8555 + 1.0542i |
| w97 | 01100001 | −0.1322 + 1.3631i |
| w98 | 01100010 | −0.1938 + 0.3621i |
| w99 | 01100011 | −0.0928 + 0.3970i |
| w100 | 01100100 | −0.6363 + 1.2064i |
| w101 | 01100101 | −0.3929 + 1.3102i |
| w102 | 01100110 | −0.1909 + 0.3627i |
| w103 | 01100111 | −0.0937 + 0.3973i |
| w104 | 01101000 | +0.8555 + 1.0542i |
| w105 | 01101001 | +0.1322 + 1.3631i |
| w106 | 01101010 | +0.1938 + 0.3621i |
| w107 | 01101011 | +0.0928 + 0.3970i |
| w108 | 01101100 | +0.6363 + 1.2064i |
| w109 | 01101101 | +0.3929 + 1.3102i |
| w110 | 01101110 | +0.1909 + 0.3627i |
| w111 | 01101111 | +0.0937 + 0.3973i |
| w112 | 01110000 | −0.6961 + 0.8850i |
| w113 | 01110001 | −0.1124 + 1.1327i |
| w114 | 01110010 | −0.3224 + 0.5236i |
| w115 | 01110011 | −0.1054 + 0.5979i |
| w116 | 01110100 | −0.5229 + 1.0037i |
| w117 | 01110101 | −0.3160 + 1.0913i |
| w118 | 01110110 | −0.3016 + 0.5347i |
| w119 | 01110111 | −0.1230 + 0.5949i |
| w120 | 01111000 | +0.6961 + 0.8850i |
| w121 | 01111001 | +0.1124 + 1.1327i |
| w122 | 01111010 | +0.3224 + 0.5236i |
| w123 | 01111011 | +0.1054 + 0.5979i |
| w124 | 01111100 | +0.5229 + 1.0037i |
| w125 | 01111101 | +0.3160 + 1.0913i |
| w126 | 01111110 | +0.3016 + 0.5347i |
| w127 | 01111111 | +0.1230 + 0.5949i |
| w128 | 10000000 | −1.2901 − 1.0495i |
| w129 | 10000001 | −1.6350 − 0.1593i |
| w130 | 10000010 | −0.2844 − 0.1296i |
| w131 | 10000011 | −0.3237 − 0.0849i |
| w132 | 10000100 | −1.4625 − 0.7740i |
| w133 | 10000101 | −1.5776 − 0.4735i |
| w134 | 10000110 | −0.2853 − 0.1309i |
| w135 | 10000111 | −0.3228 − 0.0867i |
| w136 | 10001000 | +1.2901 − 1.0493i |
| w137 | 10001001 | +1.6350 − 0.1593i |
| w138 | 10001010 | +0.2844 − 0.1296i |
| w139 | 10001011 | +0.3237 − 0.0849i |
| w140 | 10001100 | +1.4625 − 0.7740i |
| w141 | 10001101 | +1.5776 − 0.4735i |
| w142 | 10001110 | +0.2853 − 0.1309i |
| w143 | 10001111 | +0.3228 − 0.0867i |
| w144 | 10010000 | −0.7273 − 0.6160i |
| w145 | 10010001 | −0.9430 − 0.1100i |
| w146 | 10010010 | −0.5902 − 0.4857i |
| w147 | 10010011 | −0.7502 − 0.1138i |
| w148 | 10010100 | −0.8177 − 0.4841i |
| w149 | 10010101 | −0.9069 − 0.2829i |
| w150 | 10010110 | −0.6355 − 0.4185i |
| w151 | 10010111 | −0.7325 − 0.2088i |

-continued

| w index | bit label | Constellation point |
|---|---|---|
| w152 | 10011000 | +0.7273 − 0.6160i |
| w153 | 10011001 | +0.9430 − 0.1100i |
| w154 | 10011010 | +0.5902 − 0.4857i |
| w155 | 10011011 | +0.7502 − 0.1138i |
| w156 | 10011100 | +0.8177 − 0.4841i |
| w157 | 10011101 | +0.9069 − 0.2829i |
| w158 | 10011110 | +0.6355 − 0.4185i |
| w159 | 10011111 | +0.7325 − 0.2088i |
| w160 | 10100000 | −1.0646 − 1.2876i |
| w161 | 10100001 | −0.1658 − 1.6747i |
| w162 | 10100010 | −0.1053 − 0.1494i |
| w163 | 10100011 | −0.0872 − 0.1390i |
| w164 | 10100100 | −0.7949 − 1.4772i |
| w165 | 10100101 | −0.4907 − 1.6084i |
| w166 | 10100110 | −0.1052 − 0.1495i |
| w167 | 10100111 | −0.0871 − 0.1392i |
| w168 | 10101000 | +1.0646 − 1.2876i |
| w169 | 10101001 | +0.1658 − 1.6747i |
| w170 | 10101010 | +0.1053 − 0.1494i |
| w171 | 10101011 | +0.0872 − 0.1390i |
| w172 | 10101100 | +0.7949 − 1.4772i |
| w173 | 10101101 | +0.4907 − 1.6084i |
| w174 | 10101110 | +0.1052 − 0.1495i |
| w175 | 10101111 | +0.0871 − 0.1392i |
| w176 | 10110000 | −0.5707 − 0.7662i |
| w177 | 10110001 | −0.1088 − 0.9530i |
| w178 | 10110010 | −0.4294 − 0.6363i |
| w179 | 10110011 | −0.1091 − 0.7656i |
| w180 | 10110100 | −0.4490 − 0.8461i |
| w181 | 10110101 | −0.2464 − 0.9270i |
| w182 | 10110110 | −0.3744 − 0.6744i |
| w183 | 10110111 | −0.1699 − 0.7537i |
| w184 | 10111000 | +0.5707 − 0.7662i |
| w185 | 10111001 | +0.1088 − 0.9530i |
| w186 | 10111010 | +0.4294 − 0.6363i |
| w187 | 10111011 | +0.1091 − 0.7656i |
| w188 | 10111100 | +0.4490 − 0.8461i |
| w189 | 10111101 | +0.2464 − 0.9270i |
| w190 | 10111110 | +0.3744 − 0.6744i |
| w191 | 10111111 | +0.1699 − 0.7537i |
| w192 | 11000000 | −1.0382 − 0.8623i |
| w193 | 11000001 | −1.3225 − 0.1320i |
| w194 | 11000010 | −0.3734 − 0.2560i |
| w195 | 11000011 | −0.4582 − 0.1123i |
| w196 | 11000100 | −1.1794 − 0.6376i |
| w197 | 11000101 | −1.2742 − 0.3922i |
| w198 | 11000110 | −0.3799 − 0.2517i |
| w199 | 11000111 | −0.4545 − 0.1251i |
| w200 | 11001000 | +1.0382 − 0.8623i |
| w201 | 11001001 | +1.3225 − 0.1320i |
| w202 | 11001010 | +0.3734 − 0.2560i |
| w203 | 11001011 | +0.4582 − 0.1123i |
| w204 | 11001100 | +1.1794 − 0.6376i |
| w205 | 11001101 | +1.2742 − 0.3922i |
| w206 | 11001110 | +0.3799 − 0.2517i |
| w207 | 11001111 | +0.4545 − 0.1251i |
| w208 | 11010000 | −0.8504 − 0.7217i |
| w209 | 11010001 | −1.0854 − 0.1139i |
| w210 | 11010010 | −0.4968 − 0.3947i |
| w211 | 11010011 | −0.6473 − 0.1138i |
| w212 | 11010100 | −0.9638 − 0.5407i |
| w213 | 11010101 | −1.0441 − 0.3296i |
| w214 | 11010110 | −0.5231 − 0.3644i |
| w215 | 11010111 | −0.6339 − 0.1702i |
| w216 | 11011000 | +0.8504 − 0.7217i |
| w217 | 11011001 | +1.0854 − 0.1139i |
| w218 | 11011010 | +0.4968 − 0.3947i |
| w219 | 11011011 | +0.6473 − 0.1138i |
| w220 | 11011100 | +0.9638 − 0.5407i |
| w221 | 11011101 | +1.0441 − 0.3296i |
| w222 | 11011110 | +0.5231 − 0.3644i |
| w223 | 11011111 | +0.6339 − 0.1702i |
| w224 | 11100000 | −0.8555 − 1.0542i |
| w225 | 11100001 | −0.1322 − 1.3631i |
| w226 | 11100010 | −0.1938 − 0.3621i |
| w227 | 11100011 | −0.0928 − 0.3970i |
| w228 | 11100100 | −0.6363 − 1.2064i |

-continued

| w index | bit label | Constellation point |
|---|---|---|
| w229 | 11100101 | −0.3929 − 1.3102i |
| w230 | 11100110 | −0.1909 − 0.3627i |
| w231 | 11100111 | −0.0937 − 0.3973i |
| w232 | 11101000 | +0.8555 − 1.0542i |
| w233 | 11101001 | +0.1322 − 1.3631i |
| w234 | 11101010 | +0.1938 − 0.3621i |
| w235 | 11101011 | +0.0928 − 0.3970i |
| w236 | 11101100 | +0.6363 − 1.2064i |
| w237 | 11101101 | +0.3929 − 1.3102i |
| w238 | 11101110 | +0.1909 − 0.3627i |
| w239 | 11101111 | +0.0937 − 0.3973i |
| w240 | 11110000 | −0.6961 − 0.8850i |
| w241 | 11110001 | −0.1124 − 1.1327i |
| w242 | 11110010 | −0.3224 − 0.5236i |
| w243 | 11110011 | −0.1054 − 0.5979i |
| w244 | 11110100 | −0.5229 − 1.0037i |
| w245 | 11110101 | −0.3160 − 1.0913i |
| w246 | 11110110 | −0.3016 − 0.5347i |
| w247 | 11110111 | −0.1230 − 0.5949i |
| w248 | 11111000 | +0.6961 − 0.8850i |
| w249 | 11111001 | +0.1124 − 1.1327i |
| w250 | 11111010 | +0.3224 − 0.5236i |
| w251 | 11111011 | +0.1054 − 0.5979i |
| w252 | 11111100 | +0.5229 − 1.0037i |
| w253 | 11111101 | +0.3160 − 1.0913i |
| w254 | 11111110 | +0.3016 − 0.5347i |
| w255 | 11111111 | +0.1230 − 0.5949i | for R=5/8 (or R=1/2, 3/4 or 13/16):

| w index | bit label | Constellation point |
|---|---|---|
| w0 | 0000000 | −1.2639 + 1.0084i |
| w1 | 0000000 | −0.7380 + 0.6059i |
| w2 | 0000001 | −1.0466 + 1.2415i |
| w3 | 0000001 | −0.6190 + 0.7456i |
| w4 | 0000010 | −1.2639 − 1.0084i |
| w5 | 0000010 | −0.7380 − 0.6059i |
| w6 | 0000011 | −1.0466 − 1.2415i |
| w7 | 0000011 | −0.6190 − 0.7456i |
| w8 | 0000100 | −1.4263 + 0.7399i |
| w9 | 0000100 | −0.8292 + 0.4496i |
| w10 | 0000101 | −0.7829 + 1.4275i |
| w11 | 0000101 | −0.4707 + 0.8613i |
| w12 | 0000110 | −1.4263 − 0.7399i |
| w13 | 0000110 | −0.8292 − 0.4496i |
| w14 | 0000111 | −0.7829 − 1.4275i |
| w15 | 0000111 | −0.4707 − 0.8613i |
| w16 | 0001000 | −1.0529 + 0.8398i |
| w17 | 0001000 | −0.8839 + 0.7116i |
| w18 | 0001001 | −0.8751 + 1.0349i |
| w19 | 0001001 | −0.7380 + 0.8761i |
| w20 | 0001010 | −1.0529 − 0.8398i |
| w21 | 0001010 | −0.8839 − 0.7116i |
| w22 | 0001011 | −0.8751 − 1.0349i |
| w23 | 0001011 | −0.7380 − 0.8761i |
| w24 | 0001100 | −1.1857 + 0.6167i |
| w25 | 0001100 | −0.9935 + 0.5250i |
| w26 | 0001101 | −0.6570 + 1.1922i |
| w27 | 0001101 | −0.5568 + 1.0106i |
| w28 | 0001110 | −1.1857 − 0.6167i |
| w29 | 0001110 | −0.9935 − 0.5250i |
| w30 | 0001111 | −0.6570 − 1.1922i |
| w31 | 0001111 | −0.5568 − 1.0106i |
| w32 | 0010000 | +1.2639 + 1.0084i |
| w33 | 0010000 | +0.7380 + 0.6059i |
| w34 | 0010001 | +1.0466 + 1.2415i |
| w35 | 0010001 | +0.6190 + 0.7456i |
| w36 | 0010010 | +1.2639 − 1.0084i |
| w37 | 0010010 | +0.7380 − 0.6059i |
| w38 | 0010011 | +1.0466 + 1.2415i |
| w39 | 0010011 | +0.6190 + 0.7456i |
| w40 | 0010100 | +1.4263 + 0.7399i |
| w41 | 0010100 | +0.8292 + 0.4496i |
| w42 | 0010101 | +0.7829 + 1.4275i |

-continued

| w index | bit label | Constellation point |
|---|---|---|
| w43 | 0010101 | +0.4707 + 0.8613i |
| w44 | 0010110 | +1.4263 − 0.7399i |
| w45 | 0010110 | +0.8292 − 0.4496i |
| w46 | 0010111 | +0.7829 − 1.4275i |
| w47 | 0010111 | +0.4707 − 0.8613i |
| w48 | 0011000 | +1.0529 + 0.8398i |
| w49 | 0011000 | +0.8839 + 0.7116i |
| w50 | 0011001 | +0.8751 + 1.0349i |
| w51 | 0011001 | +0.7380 + 0.8761i |
| w52 | 0011010 | +1.0529 − 0.8398i |
| w53 | 0011010 | +0.8839 − 0.7116i |
| w54 | 0011011 | +0.8751 − 1.0349i |
| w55 | 0011011 | +0.7380 − 0.8761i |
| w56 | 0011100 | +1.1857 + 0.6167i |
| w57 | 0011100 | +0.9935 + 0.5250i |
| w58 | 0011101 | +0.6570 + 1.1922i |
| w59 | 0011101 | +0.5568 + 1.0106i |
| w60 | 0011110 | +1.1857 − 0.6167i |
| w61 | 0011110 | +0.9935 − 0.5250i |
| w62 | 0011111 | +0.6570 − 1.1922i |
| w63 | 0011111 | +0.5568 − 1.0106i |
| w64 | 01000000 | −0.2459 + 0.2059i |
| w65 | 01000001 | −0.6025 + 0.5077i |
| w66 | 01000010 | −0.0949 + 0.2552i |
| w67 | 01000011 | −0.5005 + 0.6310i |
| w68 | 01000100 | −0.2459 − 0.2059i |
| w69 | 01000101 | −0.6025 − 0.5077i |
| w70 | 01000110 | −0.0949 − 0.2552i |
| w71 | 01000111 | −0.5005 − 0.6310i |
| w72 | 01001000 | −0.2508 + 0.2016i |
| w73 | 01001001 | −0.6756 + 0.3836i |
| w74 | 01001010 | −0.0912 + 0.2556i |
| w75 | 01001011 | −0.3899 + 0.7222i |
| w76 | 01001100 | −0.2508 − 0.2016i |
| w77 | 01001101 | −0.6756 − 0.3836i |
| w78 | 01001110 | −0.0912 − 0.2556i |
| w79 | 01001111 | −0.3899 − 0.7222i |
| w80 | 01010000 | −0.3507 + 0.3002i |
| w81 | 01010001 | −0.4734 + 0.4072i |
| w82 | 01010010 | −0.2035 + 0.4116i |
| w83 | 01010011 | −0.3688 + 0.5265i |
| w84 | 01010100 | −0.3507 − 0.3002i |
| w85 | 01010101 | −0.4734 − 0.4072i |
| w86 | 01010110 | −0.2035 − 0.4116i |
| w87 | 01010111 | −0.3688 − 0.5265i |
| w88 | 01011000 | −0.3739 + 0.2698i |
| w89 | 01011001 | −0.5263 + 0.3281i |
| w90 | 01011010 | −0.1890 + 0.4220i |
| w91 | 01011011 | −0.3094 + 0.5791i |
| w92 | 01011100 | −0.3739 − 0.2698i |
| w93 | 01011101 | −0.5263 − 0.3281i |
| w94 | 01011110 | −0.1890 − 0.4220i |
| w95 | 01011111 | −0.3094 − 0.5791i |
| w96 | 01100000 | +0.2459 + 0.2059i |
| w97 | 01100001 | +0.6025 + 0.5077i |
| w98 | 01100010 | +0.0949 + 0.2552i |
| w99 | 01100011 | +0.5005 + 0.6310i |
| w100 | 01100100 | +0.2459 − 0.2059i |
| w101 | 01100101 | +0.6025 − 0.5077i |
| w102 | 01100110 | +0.0949 − 0.2552i |
| w103 | 01100111 | +0.5005 − 0.6310i |
| w104 | 01101000 | +0.2508 + 0.2016i |
| w105 | 01101001 | +0.6756 + 0.3836i |
| w106 | 01101010 | +0.0912 + 0.2556i |
| w107 | 01101011 | +0.3899 + 0.7222i |
| w108 | 01101100 | +0.2508 − 0.2016i |
| w109 | 01101101 | +0.6756 − 0.3836i |
| w110 | 01101110 | +0.0912 − 0.2556i |
| w111 | 01101111 | +0.3899 − 0.7222i |
| w112 | 01110000 | +0.3507 + 0.3002i |
| w113 | 01110001 | +0.4734 + 0.4072i |
| w114 | 01110010 | +0.2035 + 0.4116i |
| w115 | 01110011 | +0.3688 + 0.5265i |
| w116 | 01110100 | +0.3507 − 0.3002i |
| w117 | 01110101 | +0.4734 − 0.4072i |
| w118 | 01110110 | +0.2035 − 0.4116i |
| w119 | 01110111 | +0.3688 − 0.5265i |
| w120 | 01111000 | +0.3739 + 0.2698i |
| w121 | 01111001 | +0.5263 + 0.3281i |
| w122 | 01111010 | +0.1890 + 0.4220i |
| w123 | 01111011 | +0.3094 + 0.5791i |
| w124 | 01111100 | +0.3739 − 0.2698i |
| w125 | 01111101 | +0.5263 − 0.3281i |
| w126 | 01111110 | +0.1890 − 0.4220i |
| w127 | 01111111 | +0.3094 − 0.5791i |
| w128 | 10000000 | −1.5843 + 0.1512i |
| w129 | 10000001 | −0.9275 + 0.0940i |
| w130 | 10000010 | −0.1639 + 1.6237i |
| w131 | 10000011 | −0.1000 + 0.9905i |
| w132 | 10000100 | −1.5843 − 0.1512i |
| w133 | 10000101 | −0.9275 − 0.0940i |
| w134 | 10000110 | −0.1639 − 1.6237i |
| w135 | 10000111 | −0.1000 − 0.9905i |
| w136 | 10001000 | −1.5329 + 0.4508i |
| w137 | 10001001 | −0.8933 + 0.2781i |
| w138 | 10001010 | −0.4843 + 1.5571i |
| w139 | 10001011 | −0.2959 + 0.9454i |
| w140 | 10001100 | −1.5329 − 0.4508i |
| w141 | 10001101 | −0.8933 − 0.2781i |
| w142 | 10001110 | −0.4843 − 1.5571i |
| w143 | 10001111 | −0.2959 − 0.9454i |
| w144 | 10010000 | −1.3147 + 0.1263i |
| w145 | 10010001 | −1.1029 + 0.1084i |
| w146 | 10010010 | −0.1381 + 1.3595i |
| w147 | 10010011 | −0.1179 + 1.1562i |
| w148 | 10010100 | −1.3147 − 0.1263i |
| w149 | 10010101 | −1.1029 − 0.1084i |
| w150 | 10010110 | −0.1381 − 1.3595i |
| w151 | 10010111 | −0.1179 − 1.1562i |
| w152 | 10011000 | −1.2724 + 0.3763i |
| w153 | 10011001 | −1.0662 + 0.3220i |
| w154 | 10011010 | −0.4077 + 1.3024i |
| w155 | 10011011 | −0.3470 + 1.1060i |
| w156 | 10011100 | −1.2724 − 0.3763i |
| w157 | 10011101 | −1.0662 − 0.3220i |
| w158 | 10011110 | −0.4077 − 1.3024i |
| w159 | 10011111 | −0.3470 − 1.1060i |
| w160 | 10100000 | +1.5843 + 0.1512i |
| w161 | 10100001 | +0.9275 + 0.0940i |
| w162 | 10100010 | +0.1639 + 1.6237i |
| w163 | 10100011 | +0.1000 + 0.9905i |
| w164 | 10100100 | +1.5843 − 0.1512i |
| w165 | 10100101 | +0.9275 − 0.0940i |
| w166 | 10100110 | +0.1639 − 1.6237i |
| w167 | 10100111 | +0.1000 − 0.9905i |
| w168 | 10101000 | +1.5329 + 0.4508i |
| w169 | 10101001 | +0.8933 + 0.2781i |
| w170 | 10101010 | +0.4843 + 1.5571i |
| w171 | 10101011 | +0.2959 + 0.9454i |
| w172 | 10101100 | +1.5329 − 0.4508i |
| w173 | 10101101 | +0.8933 − 0.2781i |
| w174 | 10101110 | +0.4843 − 1.5571i |
| w175 | 10101111 | +0.2959 − 0.9454i |
| w176 | 10110000 | +1.3147 + 0.1263i |
| w177 | 10110001 | +1.1029 + 0.1084i |
| w178 | 10110010 | +0.1381 + 1.3595i |
| w179 | 10110011 | +0.1179 + 1.1562i |
| w180 | 10110100 | +1.3147 − 0.1263i |
| w181 | 10110101 | +1.1029 − 0.1084i |
| w182 | 10110110 | +0.1381 − 1.3595i |
| w183 | 10110111 | +0.1179 − 1.1562i |
| w184 | 10111000 | +1.2724 + 0.3763i |
| w185 | 10111001 | +1.0662 + 0.3220i |
| w186 | 10111010 | +0.4077 + 1.3024i |
| w187 | 10111011 | +0.3470 + 1.1060i |
| w188 | 10111100 | +1.2724 − 0.3763i |
| w189 | 10111101 | +1.0662 − 0.3220i |
| w190 | 10111110 | +0.4077 − 1.3024i |
| w191 | 10111111 | +0.3470 − 1.1060i |
| w192 | 11000000 | −0.2552 + 0.0725i |
| w193 | 11000001 | −0.7681 + 0.0832i |
| w194 | 11000010 | −0.0726 + 0.0865i |
| w195 | 11000011 | −0.0867 + 0.8378i |
| w196 | 11000100 | −0.2552 − 0.0725i |

| w index | bit label | Constellation point |
| --- | --- | --- |
| w197 | 11000101 | −0.7681 − 0.0832i |
| w198 | 11000110 | −0.0726 − 0.0865i |
| w199 | 11000111 | −0.0867 − 0.8378i |
| w200 | 11001000 | −0.2567 + 0.0753i |
| w201 | 11001001 | −0.7371 + 0.2323i |
| w202 | 11001010 | −0.0722 + 0.0866i |
| w203 | 11001011 | −0.2417 + 0.8000i |
| w204 | 11001100 | −0.2567 − 0.0753i |
| w205 | 11001101 | −0.7371 − 0.2323i |
| w206 | 11001110 | −0.0722 − 0.0866i |
| w207 | 11001111 | −0.2417 − 0.8000i |
| w208 | 11010000 | −0.4495 + 0.0766i |
| w209 | 11010001 | −0.6140 + 0.0811i |
| w210 | 11010010 | −0.0717 + 0.5169i |
| w211 | 11010011 | −0.0837 + 0.6868i |
| w212 | 11010100 | −0.4495 − 0.0766i |
| w213 | 11010101 | −0.6140 − 0.0811i |
| w214 | 11010110 | −0.0717 − 0.5169i |
| w215 | 11010111 | −0.0837 − 0.6868i |
| w216 | 11011000 | −0.4423 + 0.1097i |
| w217 | 11011001 | −0.5925 + 0.1765i |
| w218 | 11011010 | −0.0883 + 0.5092i |
| w219 | 11011011 | −0.1746 + 0.6612i |
| w220 | 11011100 | −0.4423 − 0.1097i |
| w221 | 11011101 | −0.5925 − 0.1765i |
| w222 | 11011110 | −0.0883 − 0.5092i |
| w223 | 11011111 | −0.1746 − 0.6612i |
| w224 | 11100000 | +0.2552 + 0.0725i |
| w225 | 11100001 | +0.7681 + 0.0832i |
| w226 | 11100010 | +0.0726 + 0.0865i |
| w227 | 11100011 | +0.0867 + 0.8378i |
| w228 | 11100100 | +0.2552 − 0.0725i |
| w229 | 11100101 | +0.7681 − 0.0832i |
| w230 | 11100110 | +0.0726 − 0.0865i |
| w231 | 11100111 | +0.0867 − 0.8378i |
| w232 | 11101000 | +0.2567 + 0.0753i |
| w233 | 11101001 | +0.7371 + 0.2323i |
| w234 | 11101010 | +0.0722 + 0.0866i |
| w235 | 11101011 | +0.2417 + 0.8000i |
| w236 | 11101100 | +0.2567 − 0.0753i |
| w237 | 11101101 | +0.7371 − 0.2323i |
| w238 | 11101110 | +0.0722 − 0.0866i |
| w239 | 11101111 | +0.2417 − 0.8000i |
| w240 | 11110000 | +0.4495 + 0.0766i |
| w241 | 11110001 | +0.6140 + 0.0811i |
| w242 | 11110010 | +0.0717 + 0.5169i |
| w243 | 11110011 | +0.0837 + 0.6868i |
| w244 | 11110100 | +0.4495 − 0.0766i |
| w245 | 11110101 | +0.6140 − 0.0811i |
| w246 | 11110110 | +0.0717 − 0.5169i |
| w247 | 11110111 | +0.0837 − 0.6868i |
| w248 | 11111000 | +0.4423 + 0.1097i |
| w249 | 11111001 | +0.5925 + 0.1765i |
| w250 | 11111010 | +0.0883 + 0.5092i |
| w251 | 11111011 | +0.1746 + 0.6612i |
| w252 | 11111100 | +0.4423 − 0.1097i |
| w253 | 11111101 | +0.5925 − 0.1765i |
| w254 | 11111110 | +0.0883 − 0.5092i |
| w255 | 11111111 | +0.1746 − 0.6612i | for R=3/4 (or R=1/2, 5/8 or 13/16):

| w index | bit label | Constellation point |
| --- | --- | --- |
| w0 | 0000000 | −0.5207 + 1.2132i |
| w1 | 0000000 | −0.3103 + 1.2359i |
| w2 | 0000001 | −1.1610 + 1.1297i |
| w3 | 0000001 | −0.1051 + 1.2649i |
| w4 | 0000010 | −0.6193 + 0.6523i |
| w5 | 0000010 | −0.4633 + 0.6225i |
| w6 | 0000011 | −1.2194 + 0.5861i |
| w7 | 0000011 | −0.0684 + 0.5460i |
| w8 | 0000100 | +0.5207 + 1.2132i |
| w9 | 0000100 | +0.3103 + 1.2359i |
| w10 | 0000101 | +1.1610 + 1.1297i |
| w11 | 0000101 | +0.1051 + 1.2649i |
| w12 | 0000110 | +0.6193 + 0.6523i |
| w13 | 0000110 | +0.4633 + 0.6225i |
| w14 | 0000111 | +1.2194 + 0.5861i |
| w15 | 0000111 | +0.0684 + 0.5460i |
| w16 | 0001000 | −0.6089 + 1.4273i |
| w17 | 0001000 | −0.3588 + 1.4645i |
| w18 | 0001001 | −0.8292 + 1.2973i |
| w19 | 0001001 | −0.1197 + 1.4960i |
| w20 | 0001010 | −0.7956 + 0.6768i |
| w21 | 0001010 | −0.3209 + 0.5978i |
| w22 | 0001011 | −1.0079 + 0.6851i |
| w23 | 0001011 | −0.1960 + 0.5676i |
| w24 | 0001100 | +0.6089 + 1.4273i |
| w25 | 0001100 | +0.3588 + 1.4645i |
| w26 | 0001101 | +0.8292 + 1.2973i |
| w27 | 0001101 | +0.1197 + 1.4960i |
| w28 | 0001110 | +0.7956 + 0.6768i |
| w29 | 0001110 | +0.3209 + 0.5978i |
| w30 | 0001111 | +1.0079 + 0.6851i |
| w31 | 0001111 | +0.1960 + 0.5676i |
| w32 | 0010000 | −0.5207 − 1.2132i |
| w33 | 0010000 | −0.3103 − 1.2359i |
| w34 | 0010001 | −1.1610 − 1.1297i |
| w35 | 0010001 | −0.1051 − 1.2649i |
| w36 | 0010010 | −0.6193 − 0.6523i |
| w37 | 0010010 | −0.4533 − 0.6225i |
| w38 | 0010011 | −1.2194 − 0.5861i |
| w39 | 0010011 | −0.0684 − 0.5460i |
| w40 | 0010100 | +0.5207 − 1.2132i |
| w41 | 0010100 | +0.3103 − 1.2359i |
| w42 | 0010101 | +1.1610 − 1.1297i |
| w43 | 0010101 | +0.1051 − 1.2649i |
| w44 | 0010110 | +0.6193 − 0.6523i |
| w45 | 0010110 | +0.4633 − 0.6225i |
| w46 | 0010111 | +1.2194 − 0.5861i |
| w47 | 0010111 | +0.0684 − 0.5460i |
| w48 | 0011000 | −0.6089 − 1.4273i |
| w49 | 0011000 | −0.3588 − 1.4645i |
| w50 | 0011001 | −0.8292 − 1.2973i |
| w51 | 0011001 | −0.1197 − 1.4960i |
| w52 | 0011010 | −0.7956 − 0.6768i |
| w53 | 0011010 | −0.3209 − 0.5978i |
| w54 | 0011011 | −1.0079 − 0.6851i |
| w55 | 0011011 | −0.1960 − 0.5676i |
| w56 | 0011100 | +0.6089 − 1.4273i |
| w57 | 0011100 | +0.3588 − 1.4645i |
| w58 | 0011101 | +0.8292 − 1.2973i |
| w59 | 0011101 | +0.1197 − 1.4960i |
| w60 | 0011110 | +0.7956 − 0.6768i |
| w61 | 0011110 | +0.3209 − 0.5978i |
| w62 | 0011111 | +1.0079 − 0.6851i |
| w63 | 0011111 | +0.1960 − 0.5676i |
| w64 | 01000000 | −0.4992 + 1.0060i |
| w65 | 01000001 | −0.3097 + 1.0437i |
| w66 | 01000010 | −1.2435 + 0.8749i |
| w67 | 01000011 | −0.0961 + 1.0730i |
| w68 | 01000100 | −0.5761 + 0.8259i |
| w69 | 01000101 | −0.4319 + 0.7814i |
| w70 | 01000110 | −1.4344 + 0.6815i |
| w71 | 01000111 | −0.0548 + 0.6842i |
| w72 | 01001000 | +0.4992 + 1.0060i |
| w73 | 01001001 | +0.3097 + 1.0437i |
| w74 | 01001010 | +1.2435 + 0.8749i |
| w75 | 01001011 | +0.0961 + 1.0730i |
| w76 | 01001100 | +0.5761 + 0.8259i |
| w77 | 01001101 | +0.4319 + 0.7814i |
| w78 | 01001110 | +1.4344 + 0.6815i |
| w79 | 01001111 | +0.0548 + 0.6842i |
| w80 | 01010000 | −0.6956 + 1.0381i |
| w81 | 01010001 | −0.2552 + 0.9082i |
| w82 | 01010010 | −0.8938 + 1.0757i |
| w83 | 01010011 | −0.0867 + 0.8997i |
| w84 | 01010100 | −0.7562 + 0.8504i |
| w85 | 01010101 | −0.2903 + 0.7608i |
| w86 | 01010110 | −0.9633 + 0.8762i |
| w87 | 01010111 | −0.1482 + 0.7338i |

-continued

| w index | bit label | Constellation point |
|---|---|---|
| w88 | 01011000 | +0.6956 + 1.0381i |
| w89 | 01011001 | +0.2552 + 0.9082i |
| w90 | 01011010 | +0.8938 + 1.0757i |
| w91 | 01011011 | +0.0867 + 0.8997i |
| w92 | 01011100 | +0.7562 + 0.8504i |
| w93 | 01011101 | +0.2903 + 0.7608i |
| w94 | 01011110 | +0.9633 + 0.8762i |
| w95 | 01011111 | +0.1482 + 0.7338i |
| w96 | 01100000 | −0.4992 − 1.0060i |
| w97 | 01100001 | −0.3097 − 1.0437i |
| w98 | 01100010 | −1.2435 − 0.8749i |
| w99 | 01100011 | −0.0961 − 1.0730i |
| w100 | 01100100 | −0.5761 − 0.8259i |
| w101 | 01100101 | −0.4319 − 0.7814i |
| w102 | 01100110 | −1.4344 − 0.6815i |
| w103 | 01100111 | −0.0548 − 0.6842i |
| w104 | 01101000 | +0.4992 − 1.0060i |
| w105 | 01101001 | +0.3097 − 1.0437i |
| w106 | 01101010 | +1.2435 − 0.8749i |
| w107 | 01101011 | +0.0961 − 1.0730i |
| w108 | 01101100 | +0.5761 − 0.8259i |
| w109 | 01101101 | +0.4319 − 0.7814i |
| w110 | 01101110 | +1.4344 − 0.6815i |
| w111 | 01101111 | +0.0548 − 0.6842i |
| w112 | 01110000 | −0.6956 − 1.0381i |
| w113 | 01110001 | −0.2552 − 0.9082i |
| w114 | 01110010 | −0.8938 − 1.0757i |
| w115 | 01110011 | −0.0867 − 0.8997i |
| w116 | 01110100 | −0.7562 − 0.8504i |
| w117 | 01110101 | −0.2903 − 0.7608i |
| w118 | 01110110 | −0.9633 − 0.8762i |
| w119 | 01110111 | −0.1482 − 0.7338i |
| w120 | 01111000 | +0.6956 − 1.0381i |
| w121 | 01111001 | +0.2552 − 0.9082i |
| w122 | 01111010 | +0.8938 − 1.0757i |
| w123 | 01111011 | +0.0867 − 0.8997i |
| w124 | 01111100 | +0.7562 − 0.8504i |
| w125 | 01111101 | +0.2903 − 0.7608i |
| w126 | 01111110 | +0.9633 − 0.8762i |
| w127 | 01111111 | +0.1482 − 0.7338i |
| w128 | 10000000 | −0.6538 + 0.0691i |
| w129 | 10000001 | −0.5051 + 0.0654i |
| w130 | 10000010 | −1.4515 + 0.1246i |
| w131 | 10000011 | −0.0720 + 0.0589i |
| w132 | 10000100 | −0.6396 + 0.4933i |
| w133 | 10000101 | −0.4850 + 0.4726i |
| w134 | 10000110 | −1.4339 + 0.3828i |
| w135 | 10000111 | −0.0708 + 0.4166i |
| w136 | 10001000 | +0.6538 + 0.0691i |
| w137 | 10001001 | +0.5051 + 0.0654i |
| w138 | 10001010 | +1.4515 + 0.1246i |
| w139 | 10001011 | +0.0720 + 0.0589i |
| w140 | 10001100 | +0.6396 + 0.4933i |
| w141 | 10001101 | +0.4850 + 0.4726i |
| w142 | 10001110 | +1.4339 + 0.3828i |
| w143 | 10001111 | +0.0708 + 0.4166i |
| w144 | 10010000 | −0.8080 + 0.0721i |
| w145 | 10010001 | −0.3603 + 0.0619i |
| w146 | 10010010 | −0.9770 + 0.0640i |
| w147 | 10010011 | −0.2162 + 0.0599i |
| w148 | 10010100 | −0.8066 + 0.5082i |
| w149 | 10010101 | −0.3436 + 0.4483i |
| w150 | 10010110 | −0.9839 + 0.5111i |
| w151 | 10010111 | −0.2091 + 0.4280i |
| w152 | 10011000 | +0.8080 + 0.0721i |
| w153 | 10011001 | +0.3603 + 0.0619i |
| w154 | 10011010 | +0.9770 + 0.0640i |
| w155 | 10011011 | +0.2162 + 0.0599i |
| w156 | 10011100 | +0.8066 + 0.5082i |
| w157 | 10011101 | +0.3436 + 0.4483i |
| w158 | 10011110 | +0.9839 + 0.5111i |
| w159 | 10011111 | +0.2091 + 0.4280i |
| w160 | 10100000 | −0.6538 − 0.0691i |
| w161 | 10100001 | −0.5051 − 0.0654i |
| w162 | 10100010 | −1.4515 − 0.1246i |
| w163 | 10100011 | −0.0720 − 0.0589i |
| w164 | 10100100 | −0.6396 − 0.4933i |
| w165 | 10100101 | −0.4850 − 0.4726i |
| w166 | 10100110 | −1.4339 − 0.3828i |
| w167 | 10100111 | −0.0708 − 0.4166i |
| w168 | 10101000 | +0.6538 − 0.0691i |
| w169 | 10101001 | +0.5051 − 0.0654i |
| w170 | 10101010 | +1.4515 − 0.1246i |
| w171 | 10101011 | +0.0720 − 0.0589i |
| w172 | 10101100 | +0.6396 − 0.4933i |
| w173 | 10101101 | +0.4850 − 0.4726i |
| w174 | 10101110 | +1.4339 − 0.3828i |
| w175 | 10101111 | +0.0708 − 0.4166i |
| w176 | 10110000 | −0.8080 − 0.0721i |
| w177 | 10110001 | −0.3603 − 0.0619i |
| w178 | 10110010 | −0.9770 − 0.0640i |
| w179 | 10110011 | −0.2162 − 0.0599i |
| w180 | 10110100 | −0.8066 − 0.5082i |
| w181 | 10110101 | −0.3436 − 0.4483i |
| w182 | 10110110 | −0.9839 − 0.5111i |
| w183 | 10110111 | −0.2091 − 0.4280i |
| w184 | 10111000 | +0.8080 − 0.0721i |
| w185 | 10111001 | +0.3603 − 0.0619i |
| w186 | 10111010 | +0.9770 − 0.0640i |
| w187 | 10111011 | +0.2162 − 0.0599i |
| w188 | 10111100 | +0.8066 − 0.5082i |
| w189 | 10111101 | +0.3436 − 0.4483i |
| w190 | 10111110 | +0.9839 − 0.5111i |
| w191 | 10111111 | +0.2091 − 0.4280i |
| w192 | 11000000 | −0.6518 + 0.2064i |
| w193 | 11000001 | −0.5023 + 0.1959i |
| w194 | 11000010 | −1.2169 + 0.1086i |
| w195 | 11000011 | −0.0716 + 0.1743i |
| w196 | 11000100 | −0.6490 + 0.3456i |
| w197 | 11000101 | −0.4967 + 0.3308i |
| w198 | 11000110 | −1.2175 + 0.3244i |
| w199 | 11000111 | −0.0713 + 0.2951i |
| w200 | 11001000 | +0.6518 + 0.2064i |
| w201 | 11001001 | +0.5023 + 0.1959i |
| w202 | 11001010 | +1.2169 + 0.1086i |
| w203 | 11001011 | +0.0716 + 0.1743i |
| w204 | 11001100 | +0.6490 + 0.3456i |
| w205 | 11001101 | +0.4967 + 0.3308i |
| w206 | 11001110 | +1.2175 + 0.3244i |
| w207 | 11001111 | +0.0713 + 0.2951i |
| w208 | 11010000 | −0.8177 + 0.2121i |
| w209 | 11010001 | −0.3587 + 0.1857i |
| w210 | 11010010 | −1.0126 + 0.1946i |
| w211 | 11010011 | −0.2150 + 0.1782i |
| w212 | 11010100 | −0.8186 + 0.3517i |
| w213 | 11010101 | −0.3540 + 0.3139i |
| w214 | 11010110 | −1.0159 + 0.3531i |
| w215 | 11010111 | −0.2130 + 0.3012i |
| w216 | 11011000 | +0.8177 + 0.2121i |
| w217 | 11011001 | +0.3587 + 0.1857i |
| w218 | 11011010 | +1.0126 + 0.1946i |
| w219 | 11011011 | +0.2150 + 0.1782i |
| w220 | 11011100 | +0.8186 + 0.3517i |
| w221 | 11011101 | +0.3540 + 0.3139i |
| w222 | 11011110 | +1.0159 + 0.3531i |
| w223 | 11011111 | +0.2130 + 0.3012i |
| w224 | 11100000 | −0.6518 − 0.2064i |
| w225 | 11100001 | −0.5023 − 0.1959i |
| w226 | 11100010 | −1.2169 − 0.1086i |
| w227 | 11100011 | −0.0716 − 0.1743i |
| w228 | 11100100 | −0.6490 − 0.3456i |
| w229 | 11100101 | −0.4967 − 0.3308i |
| w230 | 11100110 | −1.2175 − 0.3244i |
| w231 | 11100111 | −0.0713 − 0.2951i |
| w232 | 11101000 | +0.6518 − 0.2064i |
| w233 | 11101001 | +0.5023 − 0.1959i |
| w234 | 11101010 | +1.2169 − 0.1086i |
| w235 | 11101011 | +0.0716 − 0.1743i |
| w236 | 11101100 | +0.6490 − 0.3456i |
| w237 | 11101101 | +0.4967 − 0.3308i |
| w238 | 11101110 | +1.2175 − 0.3244i |
| w239 | 11101111 | +0.0713 − 0.2951i |
| w240 | 11110000 | −0.8177 − 0.2121i |
| w241 | 11110001 | −0.3587 − 0.1857i |

-continued

| w index | bit label | Constellation point |
|---|---|---|
| w242 | 11110010 | −1.0126 − 0.1946i |
| w243 | 11110011 | −0.2150 − 0.1782i |
| w244 | 11110100 | −0.8186 − 0.3517i |
| w245 | 11110101 | −0.3540 − 0.3139i |
| w246 | 11110110 | −1.0159 − 0.3531i |
| w247 | 11110111 | −0.2130 − 0.3012i |
| w248 | 11111000 | +0.8177 − 0.2121i |
| w249 | 11111001 | +0.3587 − 0.1857i |
| w250 | 11111010 | +1.0126 − 0.1946i |
| w251 | 11111011 | +0.2150 − 0.1782i |
| w252 | 11111100 | +0.8186 − 0.3517i |
| w253 | 11111101 | +0.3540 − 0.3139i |
| w254 | 11111110 | +1.0159 − 0.3531i |
| w255 | 11111111 | +0.2130 − 0.3012i | for R=13/16 (or R=1/2, 5/8 or 3/4):

| w index | bit label | Constellation point |
|---|---|---|
| w0 | 0000000 | −0.4976 + 1.2018i |
| w1 | 0000000 | +0.4976 + 1.2018i |
| w2 | 0000001 | −0.4976 − 1.2018i |
| w3 | 0000001 | +0.4976 − 1.2018i |
| w4 | 0000010 | −0.4821 + 1.0103i |
| w5 | 0000010 | +0.4821 + 1.0103i |
| w6 | 0000011 | −0.4821 − 1.0103i |
| w7 | 0000011 | +0.4821 − 1.0103i |
| w8 | 0000100 | −1.1616 + 1.0595i |
| w9 | 0000100 | +1.1616 + 1.0595i |
| w10 | 0000101 | −1.1616 − 1.0595i |
| w11 | 0000101 | +1.1616 − 1.0595i |
| w12 | 0000110 | −1.2384 + 0.8218i |
| w13 | 0000110 | +1.2384 + 0.8218i |
| w14 | 0000111 | −1.2384 − 0.8218i |
| w15 | 0000111 | +1.2384 − 0.8218i |
| w16 | 0001000 | −0.6618 + 0.0721i |
| w17 | 0001000 | +0.6618 + 0.0721i |
| w18 | 0001001 | −0.6618 − 0.0721i |
| w19 | 0001001 | +0.6618 − 0.0721i |
| w20 | 0001010 | −0.6653 + 0.2161i |
| w21 | 0001010 | +0.6653 + 0.2161i |
| w22 | 0001011 | −0.6653 − 0.2161i |
| w23 | 0001011 | +0.6653 − 0.2161i |
| w24 | 0001100 | −1.4070 + 0.1153i |
| w25 | 0001100 | +1.4070 + 0.1153i |
| w26 | 0001101 | −1.4070 − 0.1153i |
| w27 | 0001101 | +1.4070 − 0.1153i |
| w28 | 0001110 | −1.1945 + 0.1045i |
| w29 | 0001110 | +1.1945 + 0.1045i |
| w30 | 0001111 | −1.1945 − 0.1045i |
| w31 | 0001111 | +1.1945 − 0.1045i |
| w32 | 0010000 | −0.2993 + 1.2594i |
| w33 | 0010000 | +0.2993 + 1.2594i |
| w34 | 0010001 | −0.2993 − 1.2594i |
| w35 | 0010001 | +0.2993 − 1.2594i |
| w36 | 0010010 | −0.2906 + 1.0772i |
| w37 | 0010010 | +0.2906 + 1.0772i |
| w38 | 0010011 | −0.2906 − 1.0772i |
| w39 | 0010011 | +0.2906 − 1.0772i |
| w40 | 0010100 | −0.0985 + 1.2520i |
| w41 | 0010100 | +0.0985 + 1.2520i |
| w42 | 0010101 | −0.0985 − 1.2520i |
| w43 | 0010101 | +0.0985 − 1.2520i |
| w44 | 0010110 | −0.0938 + 1.0710i |
| w45 | 0010110 | +0.0938 + 1.0710i |
| w46 | 0010111 | −0.0938 − 1.0710i |
| w47 | 0010111 | +0.0938 − 1.0710i |
| w48 | 0011000 | −0.5134 + 0.0686i |
| w49 | 0011000 | +0.5134 + 0.0686i |
| w50 | 0011001 | −0.5134 − 0.0686i |
| w51 | 0011001 | +0.5134 − 0.0686i |
| w52 | 0011010 | −0.5133 + 0.2063i |
| w53 | 0011010 | +0.5133 + 0.2063i |
| w54 | 0011011 | −0.5133 − 0.2063i |
| w55 | 0011011 | +0.5133 − 0.2063i |

-continued

| w index | bit label | Constellation point |
|---|---|---|
| w56 | 0011100 | −0.0735 + 0.0614i |
| w57 | 0011100 | +0.0735 + 0.0614i |
| w58 | 0011101 | −0.0735 − 0.0614i |
| w59 | 0011101 | +0.0735 − 0.0614i |
| w60 | 0011110 | −0.0734 + 0.1846i |
| w61 | 0011110 | +0.0734 + 0.1846i |
| w62 | 0011111 | −0.0734 − 0.1846i |
| w63 | 0011111 | +0.0734 − 0.1846i |
| w64 | 01000000 | −0.5648 + 1.4016i |
| w65 | 01000001 | +0.5648 + 1.4016i |
| w66 | 01000010 | −0.5648 − 1.4016i |
| w67 | 01000011 | +0.5648 − 1.4016i |
| w68 | 01000100 | −0.6826 + 1.0558i |
| w69 | 01000101 | +0.6826 + 1.0558i |
| w70 | 01000110 | −0.6826 − 1.0558i |
| w71 | 01000111 | +0.6826 − 1.0558i |
| w72 | 01001000 | −0.7696 + 1.2863i |
| w73 | 01001001 | +0.7696 + 1.2863i |
| w74 | 01001010 | −0.7696 − 1.2863i |
| w75 | 01001011 | +0.7696 − 1.2863i |
| w76 | 01001100 | −0.8965 + 1.0947i |
| w77 | 01001101 | +0.8965 + 1.0947i |
| w78 | 01001110 | −0.8965 − 1.0947i |
| w79 | 01001111 | +0.8965 − 1.0947i |
| w80 | 01010000 | −0.8148 + 0.0743i |
| w81 | 01010001 | +0.8148 + 0.0743i |
| w82 | 01010010 | −0.8148 − 0.0743i |
| w83 | 01010011 | +0.8148 − 0.0743i |
| w84 | 01010100 | −0.8285 + 0.2219i |
| w85 | 01010101 | +0.8285 + 0.2219i |
| w86 | 01010110 | −0.8285 − 0.2219i |
| w87 | 01010111 | +0.8285 − 0.2219i |
| w88 | 01011000 | −0.9784 + 0.0686i |
| w89 | 01011001 | +0.9784 + 0.0686i |
| w90 | 01011010 | −0.9784 − 0.0686i |
| w91 | 01011011 | +0.9784 − 0.0686i |
| w92 | 01011100 | −1.0093 + 0.2102i |
| w93 | 01011101 | +1.0093 + 0.2102i |
| w94 | 01011110 | −1.0093 − 0.2102i |
| w95 | 01011111 | +1.0093 − 0.2102i |
| w96 | 01100000 | −0.3403 + 1.4686i |
| w97 | 01100001 | +0.3403 + 1.4686i |
| w98 | 01100010 | −0.3403 − 1.4686i |
| w99 | 01100011 | +0.3403 − 1.4686i |
| w100 | 01100100 | −0.2690 + 0.9234i |
| w101 | 01100101 | +0.2690 + 0.9234i |
| w102 | 01100110 | −0.2690 − 0.9234i |
| w103 | 01100111 | +0.2690 − 0.9234i |
| w104 | 01101000 | −0.1114 + 1.4628i |
| w105 | 01101001 | +0.1114 + 1.4628i |
| w106 | 01101010 | −0.1114 − 1.4628i |
| w107 | 01101011 | +0.1114 − 1.4628i |
| w108 | 01101100 | −0.0905 + 0.9054i |
| w109 | 01101101 | +0.0905 + 0.9054i |
| w110 | 01101110 | −0.0905 − 0.9054i |
| w111 | 01101111 | +0.0905 − 0.9054i |
| w112 | 01110000 | −0.3668 + 0.0653i |
| w113 | 01110001 | +0.3668 + 0.0653i |
| w114 | 01110010 | −0.3668 − 0.0653i |
| w115 | 01110011 | +0.3668 − 0.0653i |
| w116 | 01110100 | −0.3660 + 0.1965i |
| w117 | 01110101 | +0.3660 + 0.1965i |
| w118 | 01110110 | −0.3660 − 0.1965i |
| w119 | 01110111 | +0.3660 − 0.1965i |
| w120 | 01111000 | −0.2204 + 0.0628i |
| w121 | 01111001 | +0.2204 + 0.0628i |
| w122 | 01111010 | −0.2204 − 0.0628i |
| w123 | 01111011 | +0.2204 − 0.0628i |
| w124 | 01111100 | −0.2198 + 0.1888i |
| w125 | 01111101 | +0.2198 + 0.1888i |
| w126 | 01111110 | −0.2198 − 0.1888i |
| w127 | 01111111 | +0.2198 − 0.1888i |
| w128 | 10000000 | −0.6404 + 0.6801i |
| w129 | 10000001 | +0.6404 + 0.6801i |
| w130 | 10000010 | −0.6404 − 0.6801i |
| w131 | 10000011 | +0.6404 − 0.6801i |
| w132 | 10000100 | −0.5954 + 0.8500i |

-continued

| w index | bit label | Constellation point |
|---|---|---|
| w133 | 10000101 | +0.5954 + 0.8500i |
| w134 | 10000110 | −0.5954 − 0.8500i |
| w135 | 10000111 | +0.5954 − 0.8500i |
| w136 | 10001000 | −1.1989 + 0.5582i |
| w137 | 10001001 | +1.1989 + 0.5582i |
| w138 | 10001010 | −1.1989 − 0.5582i |
| w139 | 10001011 | +1.1989 − 0.5582i |
| w140 | 10001100 | −1.4012 + 0.6249i |
| w141 | 10001101 | +1.4012 + 0.6249i |
| w142 | 10001110 | −1.4012 − 0.6249i |
| w143 | 10001111 | +1.4012 − 0.6249i |
| w144 | 10010000 | −0.6524 + 0.5156i |
| w145 | 10010001 | +0.6524 + 0.5156i |
| w146 | 10010010 | −0.6524 − 0.5156i |
| w147 | 10010011 | +0.6524 − 0.5156i |
| w148 | 10010100 | −0.6640 + 0.3620i |
| w149 | 10010101 | +0.6640 + 0.3620i |
| w150 | 10010110 | −0.6640 − 0.3620i |
| w151 | 10010111 | +0.6640 − 0.3620i |
| w152 | 10011000 | −1.4123 + 0.3539i |
| w153 | 10011001 | +1.4123 + 0.3539i |
| w154 | 10011010 | −1.4123 − 0.3539i |
| w155 | 10011011 | +1.4123 − 0.3539i |
| w156 | 10011100 | −1.2076 + 0.3137i |
| w157 | 10011101 | +1.2076 + 0.3137i |
| w158 | 10011110 | −1.2076 − 0.3137i |
| w159 | 10011111 | +1.2076 − 0.3137i |
| w160 | 10100000 | −0.4846 + 0.6443i |
| w161 | 10100001 | +0.4846 + 0.6443i |
| w162 | 10100010 | −0.4846 − 0.6443i |
| w163 | 10100011 | +0.4846 − 0.6443i |
| w164 | 10100100 | −0.4495 + 0.7999i |
| w165 | 10100101 | +0.4495 + 0.7999i |
| w166 | 10100110 | −0.4495 − 0.7999i |
| w167 | 10100111 | +0.4495 − 0.7999i |
| w168 | 10101000 | −0.0693 + 0.5689i |
| w169 | 10101001 | +0.0693 + 0.5689i |
| w170 | 10101010 | −0.0693 − 0.5689i |
| w171 | 10101011 | +0.0693 − 0.5689i |
| w172 | 10101100 | −0.0563 + 0.7102i |
| w173 | 10101101 | +0.0563 + 0.7102i |
| w174 | 10101110 | −0.0563 − 0.7102i |
| w175 | 10101111 | +0.0563 − 0.7102i |
| w176 | 10110000 | −0.5011 + 0.4924i |
| w177 | 10110001 | +0.5011 + 0.4924i |
| w178 | 10110010 | −0.5011 − 0.4924i |
| w179 | 10110011 | +0.5011 − 0.4924i |
| w180 | 10110100 | −0.5105 + 0.3465i |
| w181 | 10110101 | +0.5105 + 0.3465i |
| w182 | 10110110 | −0.5105 − 0.3465i |
| w183 | 10110111 | +0.5105 − 0.3465i |
| w184 | 10111000 | −0.0720 + 0.4369i |
| w185 | 10111001 | +0.0720 + 0.4369i |
| w186 | 10111010 | −0.0720 − 0.4369i |
| w187 | 10111011 | +0.0720 − 0.4369i |
| w188 | 10111100 | −0.0730 + 0.3094i |
| w189 | 10111101 | +0.0730 + 0.3094i |
| w190 | 10111110 | −0.0730 − 0.3094i |
| w191 | 10111111 | +0.0730 − 0.3094i |
| w192 | 11000000 | −0.8128 + 0.7021i |
| w193 | 11000001 | +0.8128 + 0.7021i |
| w194 | 11000010 | −0.8128 − 0.7021i |
| w195 | 11000011 | +0.8128 − 0.7021i |
| w196 | 11000100 | −0.7699 + 0.8797i |
| w197 | 11000101 | +0.7699 + 0.8797i |
| w198 | 11000110 | −0.7699 − 0.8797i |
| w199 | 11000111 | +0.7699 − 0.8797i |
| w200 | 11001000 | −1.0129 + 0.6976i |
| w201 | 11001001 | +1.0129 + 0.6976i |
| w202 | 11001010 | −1.0129 − 0.6976i |
| w203 | 11001011 | +1.0129 − 0.6976i |
| w204 | 11001100 | −0.9657 + 0.8860i |
| w205 | 11001101 | +0.9657 + 0.8860i |
| w206 | 11001110 | −0.9657 − 0.8860i |
| w207 | 11001111 | +0.9657 − 0.8860i |
| w208 | 11010000 | −0.8099 + 0.5313i |
| w209 | 11010001 | +0.8099 + 0.5313i |
| w210 | 11010010 | −0.8099 − 0.5313i |
| w211 | 11010011 | +0.8099 − 0.5313i |
| w212 | 11010100 | −0.8291 + 0.3705i |
| w213 | 11010101 | +0.8291 + 0.3705i |
| w214 | 11010110 | −0.8291 − 0.3705i |
| w215 | 11010111 | +0.8291 − 0.3705i |
| w216 | 11011000 | −0.9768 + 0.5294i |
| w217 | 11011001 | +0.9768 + 0.5294i |
| w218 | 11011010 | −0.9768 − 0.5294i |
| w219 | 11011011 | +0.9768 − 0.5294i |
| w220 | 11011100 | −1.0171 + 0.3701i |
| w221 | 11011101 | +1.0171 + 0.3701i |
| w222 | 11011110 | −1.0171 − 0.3701i |
| w223 | 11011111 | +1.0171 − 0.3701i |
| w224 | 11100000 | −0.3381 + 0.6175i |
| w225 | 11100001 | +0.3381 + 0.6175i |
| w226 | 11100010 | −0.3381 − 0.6175i |
| w227 | 11100011 | +0.3381 − 0.6175i |
| w228 | 11100100 | −0.3079 + 0.7726i |
| w229 | 11100101 | +0.3079 + 0.7726i |
| w230 | 11100110 | −0.3079 − 0.7726i |
| w231 | 11100111 | +0.3079 − 0.7726i |
| w232 | 11101000 | −0.2034 + 0.5915i |
| w233 | 11101001 | +0.2034 + 0.5915i |
| w234 | 11101010 | −0.2034 − 0.5915i |
| w235 | 11101011 | +0.2034 − 0.5915i |
| w236 | 11101100 | −0.1695 + 0.7506i |
| w237 | 11101101 | +0.1695 + 0.7506i |
| w238 | 11101110 | −0.1695 − 0.7506i |
| w239 | 11101111 | +0.1695 − 0.7506i |
| w240 | 11110000 | −0.3558 + 0.4698i |
| w241 | 11110001 | +0.3558 + 0.4698i |
| w242 | 11110010 | −0.3558 − 0.4698i |
| w243 | 11110011 | +0.3558 − 0.4698i |
| w244 | 11110100 | −0.3634 + 0.3304i |
| w245 | 11110101 | +0.3634 + 0.3304i |
| w246 | 11110110 | −0.3634 − 0.3304i |
| w247 | 11110111 | +0.3634 − 0.3304i |
| w248 | 11111000 | −0.2145 + 0.4495i |
| w249 | 11111001 | +0.2145 + 0.4495i |
| w250 | 11111010 | −0.2145 − 0.4495i |
| w251 | 11111011 | +0.2145 − 0.4495i |
| w252 | 11111100 | −0.2184 + 0.3170i |
| w253 | 11111101 | +0.2184 + 0.3170i |
| w254 | 11111110 | −0.2184 − 0.3170i |
| w255 | 11111111 | +0.2184 − 0.3170i | wherein the bit labeling indicated in groups A and B may alternatively be inverted for one or more bit labels.

13. A transmission method comprising:
a coding and modulation method as claimed in claim 12 that encodes and modulates input data into constellation values,
converting said constellation values into one or more transmission streams to be transmitted, and
transmitting said one or more transmission streams.

14. A non-transitory computer-readable recording medium that stores therein a computer program product, which, when executed by a processor, causes the method according to claim 12 to be performed.

15. A demodulation and decoding apparatus comprising:
a demodulator configured to demodulate constellation values of a non-uniform constellation into cell words and to assign bit combinations to constellation values of the used non-uniform constellation, and
a decoder configured to decode cell words into output data according to a low density parity check code, LDPC,
wherein said demodulator is configured to use, based on signalling information indicating the PHY mode, the total number M of constellation points of the constellation and the code rate, i) a non-uniform constellation and bit labeling from a group A, if the PHY mode is OFDM mode and if M=16, 64, 128 or 256, the group A comprising constellations as defined in
sub-group A1 for 16-QAM with M=16 and code rates of 1/2, 5/8, 3/4 or 13/16,
sub-group A2 for 64-QAM with M=64 and code rates of 5/8, 3/4 or 13/16,
sub-group A3 for 128-QAM with M=128 and code rates of 1/2, 5/8, 3/4 or 13/16, and
sub-group A4 for 256-QAM with M=256 and code rates of 1/2, 5/8, 3/4 or 13/16, or ii) a non-uniform constellation and bit labeling from a group B, if the PHY mode is single carrier mode and if M=16, 32, 64, 128 or 256, the group B comprising constellations as defined in
sub-group B1 for 16-QAM with M=16 and code rates of 1/2, 5/8 or 3/4,
sub-group B2 for 32-QAM with M=32 and code rates of 1/2, 5/8, 3/4 or 13/16,
sub-group B3 for 64-QAM with M=64 and code rates of 1/2, 5/8, 3/4 or 13/16,
sub-group B4 for 128-QAM with M=128 and code rates of 1/2, 5/8, 3/4 or 13/16, and
sub-group B5 for 256-QAM with M=256 and code rates of 1/2, 5/8, 3/4 or 13/16, or iii) a non-uniform constellation obtained from a constellation from anyone of groups A or B through rotation by an angle around the origin, through inversion of bit labels for all constellation points, through interchanging of bit positions, through mirroring on any line in the complex plane and/or through predistortion for the constellation points, wherein the constellation points are defined by a constellation position vector $w_0 \ldots w_{M-1}$, and wherein the constellation position vectors of the different constellations of the groups A or B of constellations are defined as follows:

A) M-QAM non-uniform constellations of group A for OFDM as PHY mode:

A1) 16-QAM NUC

| w | bit label | $R = 1/2$ (MCS = 18) (or $R = 5/8$, $3/4$ or $13/16$) | $R = 5/8$ (MCS = 19) (or $R = 1/2$, $3/4$ or $13/16$) | $R = 3/4$ (MCS = 20) (or $R = 5/8$, $1/2$ or $13/16$) | $R = 13/16$ (MCS = 21) (or $R = 1/2$, $5/8$ or $3/4$) |
|---|---|---|---|---|---|
| w0 | 0000 | +0.4925 + 1.2040i | +0.2173 + 0.4189i | +0.2976 − 0.2976i | +0.3018 − 0.3018i |
| w1 | 0001 | +0.2530 + 0.4936i | +0.6578 + 0.2571i | +0.2976 − 0.9547i | −0.3018 − 0.3018i |
| w2 | 0010 | +0.4925 − 1.2040i | +0.4326 + 1.1445i | −0.2976 − 0.2976i | +0.3018 − 0.9534i |
| w3 | 0011 | +0.2530 − 0.4936i | +1.2088 + 0.5659i | −0.2976 − 0.9547i | −0.3018 − 0.9534i |
| w4 | 0100 | +1.2040 + 0.4925i | +0.2173 − 0.4189i | +0.9547 − 0.2976i | +0.3018 + 0.3018i |
| w5 | 0101 | +0.4936 + 0.2530i | +0.6578 − 0.2571i | +0.9547 − 0.9547i | −0.3018 + 0.3018i |
| w6 | 0110 | +1.2040 − 0.4925i | +0.4326 − 1.1445i | −0.9547 − 0.2976i | +0.3018 + 0.9534i |
| w7 | 0111 | +0.4936 − 0.2530i | +1.2088 − 0.5659i | −0.9547 − 0.9547i | −0.3018 + 0.9534i |
| w8 | 1000 | −0.4925 + 1.2040i | −0.2173 + 0.4189i | +0.2976 + 0.2976i | +0.9534 − 0.3018i |
| w9 | 1001 | −0.2530 + 0.4936i | −0.6578 + 0.2571i | +0.2976 + 0.9547i | −0.9534 − 0.3018i |
| w10 | 1010 | −0.4925 − 1.2040i | −0.4326 + 1.1445i | −0.2976 + 0.2976i | +0.9534 − 0.9534i |
| w11 | 1011 | −0.2530 − 0.4936i | −1.2088 + 0.5659i | −0.2976 + 0.9547i | −0.9534 − 0.9534i |
| w12 | 1100 | −1.2040 + 0.4925i | −0.2173 − 0.4189i | +0.9547 + 0.2976i | +0.9534 + 0.3018i |
| w13 | 1101 | −0.4936 + 0.2530i | −0.6578 − 0.2571i | +0.9547 + 0.9547i | −0.9534 + 0.3018i |
| w14 | 1110 | −1.2040 − 0.4925i | −0.4326 − 1.1445i | −0.9547 + 0.2976i | +0.9534 + 0.9534i |
| w15 | 1111 | −0.4936 − 0.2530i | −1.2088 − 0.5659i | −0.9547 + 0.9547i | −0.9534 + 0.9534i |

A2) 64-QAM NUC

| w/MCS index | bit label | $R = 5/8$ (MCS = 22) (or $R = 3/4$ or $13/16$) | $R = 3/4$ (MCS = 23) (or $R = 5/8$ or $13/16$) | $R = 13/16$ (MCS = 24) (or $R = 5/8$ or $3/4$) |
|---|---|---|---|---|
| w0 | 000000 | +1.4730 + 0.3019i | +1.0501 − 0.1676i | +1.0414 − 0.1712i |
| w1 | 000001 | +1.2124 + 0.8333i | +1.4380 − 0.2294i | −1.0414 − 0.1712i |
| w2 | 000010 | −1.4730 + 0.3019i | +0.7233 − 0.1496i | +1.0414 + 0.1712i |
| w3 | 000011 | −1.2124 + 0.8333i | +0.6220 − 1.1896i | −1.0414 + 0.1712i |
| w4 | 000100 | +1.4730 − 0.3019i | −1.0501 − 0.1676i | +1.4058 − 0.2115i |
| w5 | 000101 | +1.2124 − 0.8333i | −1.4380 − 0.2294i | −1.4058 − 0.2115i |
| w6 | 000110 | −1.4730 − 0.3019i | −0.7233 − 0.1496i | +1.4058 + 0.2115i |
| w7 | 000111 | −1.2124 − 0.8333i | −0.6220 − 1.1896i | −1.4058 + 0.2115i |
| w8 | 001000 | +1.0895 + 0.2172i | +0.1398 − 0.1309i | +0.1414 − 0.1379i |
| w9 | 001001 | +0.8988 + 0.5768i | +0.1680 − 1.0338i | −0.1414 − 0.1379i |
| w10 | 001010 | −1.0895 + 0.2172i | +0.4246 − 0.1370i | +0.1414 + 0.1379i |
| w11 | 001011 | −0.8988 + 0.5768i | +0.2326 − 1.3986i | −0.1414 + 0.1379i |
| w12 | 001100 | +1.0895 − 0.2172i | −0.1398 − 0.1309i | +0.1695 − 1.0298i |
| w13 | 001101 | +0.8988 − 0.5768i | −0.1680 − 1.0338i | −0.1695 − 1.0298i |
| w14 | 001110 | −1.0895 − 0.2172i | −0.4246 − 0.1370i | +0.1695 + 1.0298i |
| w15 | 001111 | −0.8988 − 0.5768i | −0.2326 − 1.3986i | −0.1695 + 1.0298i |
| w16 | 010000 | +0.2775 + 1.4188i | +1.0501 + 0.1676i | +0.7230 − 0.1517i |
| w17 | 010001 | +0.7921 + 1.2096i | +1.4380 + 0.2294i | −0.7230 − 0.1517i |
| w18 | 010010 | −0.2775 + 1.4188i | +0.7233 + 0.1496i | +0.7230 + 0.1517i |
| w19 | 010011 | −0.7921 + 1.2096i | +0.6220 + 1.1896i | −0.7230 + 0.1517i |
| w20 | 010100 | +0.2775 − 1.4188i | −1.0501 + 0.1676i | +0.5981 − 1.1597i |
| w21 | 010101 | +0.7921 − 1.2096i | −1.4380 + 0.2294i | −0.5981 − 1.1597i |
| w22 | 010110 | −0.2775 − 1.4188i | −0.7233 + 0.1496i | +0.5981 + 1.1597i |
| w23 | 010111 | −0.7921 − 1.2096i | −0.6220 + 1.1896i | −0.5981 + 1.1597i |

-continued

| w/MCS index | bit label | R = 5/8 (MCS = 22) (or R = 3/4 or 13/16) | R = 3/4 (MCS = 23) (or R = 5/8 or 13/16) | R = 13/16 (MCS = 24) (or R = 5/8 or 3/4) |
|---|---|---|---|---|
| w24 | 011000 | +0.2177 + 1.0243i | +0.1398 + 0.1309i | +0.4272 − 0.1421i |
| w25 | 011001 | +0.6056 + 0.8481i | +0.1680 + 1.0338i | −0.4272 − 0.1421i |
| w26 | 011010 | −0.2177 + 1.0243i | +0.4246 + 0.1370i | +0.4272 + 0.1421i |
| w27 | 011011 | −0.6056 + 0.8481i | +0.2326 + 1.3986i | −0.4272 + 0.1421i |
| w28 | 011100 | +0.2177 − 1.0243i | −0.1398 + 0.1309i | +0.2236 − 1.3784i |
| w29 | 011101 | +0.6056 − 0.8481i | −0.1680 + 1.0338i | −0.2236 − 1.3784i |
| w30 | 011110 | −0.2177 − 1.0243i | −0.4246 + 0.1370i | +0.2236 + 1.3784i |
| w31 | 011111 | −0.6056 − 0.8481i | −0.2326 + 1.3986i | −0.2236 + 1.3784i |
| w32 | 100000 | +0.1419 + 0.1122i | +1.0725 − 0.5328i | +1.0997 − 0.5419i |
| w33 | 100001 | +0.3733 + 0.1498i | +1.0771 − 0.9315i | −1.0997 − 0.5419i |
| w34 | 100010 | −0.1419 + 0.1122i | +0.7267 − 0.4592i | +1.0997 + 0.5419i |
| w35 | 100011 | −0.3733 + 0.1498i | +0.6956 − 0.8095i | −1.0997 + 0.5419i |
| w36 | 100100 | +0.1419 − 0.1122i | −1.0725 − 0.5328i | +1.0691 − 0.9443i |
| w37 | 100101 | +0.3733 − 0.1498i | −1.0771 − 0.9315i | −1.0691 − 0.9443i |
| w38 | 100110 | −0.1419 − 0.1122i | −0.7267 − 0.4592i | +1.0691 + 0.9443i |
| w39 | 100111 | −0.3733 − 0.1498i | −0.6956 − 0.8095i | −1.0691 + 0.9443i |
| w40 | 101000 | +0.7863 + 0.1337i | +0.1361 − 0.4023i | +0.1440 − 0.4167i |
| w41 | 101001 | +0.6394 + 0.3211i | +0.1373 − 0.7043i | −0.1440 − 0.4167i |
| w42 | 101010 | −0.7863 + 0.1337i | +0.4198 − 0.4151i | +0.1440 + 0.4167i |
| w43 | 101011 | −0.6394 + 0.3211i | +0.4114 − 0.7109i | −0.1440 + 0.4167i |
| w44 | 101100 | +0.7863 − 0.1337i | −0.1361 − 0.4023i | +0.1426 − 0.7102i |
| w45 | 101101 | +0.6394 − 0.3211i | −0.1373 − 0.7043i | −0.1426 − 0.7102i |
| w46 | 101110 | −0.7863 − 0.1337i | −0.4198 − 0.4151i | +0.1426 + 0.7102i |
| w47 | 101111 | −0.6394 − 0.3211i | −0.4114 − 0.7109i | −0.1426 + 0.7102i |
| w48 | 110000 | +0.1138 + 0.3999i | +1.0725 + 0.5328i | +0.7484 − 0.4663i |
| w49 | 110001 | +0.2891 + 0.3910i | +1.0771 + 0.9315i | −0.7484 − 0.4663i |
| w50 | 110010 | −0.1138 + 0.3999i | +0.7267 + 0.4592i | +0.7484 + 0.4663i |
| w51 | 110011 | −0.2891 + 0.3910i | +0.6956 + 0.8095i | −0.7484 + 0.4663i |
| w52 | 110100 | +0.1138 − 0.3999i | −1.0725 + 0.5328i | +0.7360 − 0.8042i |
| w53 | 110101 | +0.2891 − 0.3910i | −1.0771 + 0.9315i | −0.7360 − 0.8042i |
| w54 | 110110 | −0.1138 − 0.3999i | −0.7267 + 0.4592i | +0.7360 + 0.8042i |
| w55 | 110111 | −0.2891 − 0.3910i | −0.6956 + 0.8095i | −0.7360 + 0.8042i |
| w56 | 111000 | +0.1487 + 0.7260i | +0.1361 + 0.4023i | +0.4369 − 0.4317i |
| w57 | 111001 | +0.4397 + 0.5853i | +0.1373 + 0.7043i | −0.4369 − 0.4317i |
| w58 | 111010 | −0.1487 + 0.7260i | +0.4198 + 0.4151i | +0.4369 + 0.4317i |
| w59 | 111011 | −0.4397 + 0.5853i | +0.4114 + 0.7109i | −0.4369 + 0.4317i |
| w60 | 111100 | +0.1487 − 0.7260i | −0.1361 + 0.4023i | +0.4351 − 0.7394i |
| w61 | 111101 | +0.4397 − 0.5853i | −0.1373 + 0.7043i | −0.4351 − 0.7394i |
| w62 | 111110 | −0.1487 − 0.7260i | −0.4198 + 0.4151i | +0.4351 + 0.7394i |
| w63 | 111111 | −0.4397 − 0.5853i | −0.4114 + 0.7109i | −0.4351 + 0.7394i |

A3) 128-QAM NUC for R=1/2 (or R=5/8, 3/4 or 13/16):

| w index | bit label | Constellation point |
|---|---|---|
| w0 | 0000000 | +0.7383 − 1.3947i |
| w1 | 0000000 | +0.2726 − 1.6070i |
| w2 | 0000001 | +0.7383 + 1.3947i |
| w3 | 0000001 | +0.2726 + 1.6070i |
| w4 | 0000010 | +1.5779 − 0.2230i |
| w5 | 0000010 | +1.2114 − 0.1662i |
| w6 | 0000011 | +1.5779 + 0.2230i |
| w7 | 0000011 | +1.2114 + 0.1662i |
| w8 | 0000100 | +0.5286 − 1.0997i |
| w9 | 0000100 | +0.1915 − 1.2689i |
| w10 | 0000101 | +0.5286 + 1.0997i |
| w11 | 0000101 | +0.1915 + 1.2689i |
| w12 | 0000110 | +0.7620 − 0.1121i |
| w13 | 0000110 | +0.9103 − 0.1272i |
| w14 | 0000111 | +0.7620 + 0.1121i |
| w15 | 0000111 | +0.9103 + 0.1272i |
| w16 | 0001000 | +1.0680 − 1.0753i |
| w17 | 0001000 | +1.0389 − 0.7336i |
| w18 | 0001001 | +1.0680 + 1.0753i |
| w19 | 0001001 | +1.0389 + 0.7336i |
| w20 | 0001010 | +1.4915 − 0.6927i |
| w21 | 0001010 | +1.1447 − 0.4719i |
| w22 | 0001011 | +1.4915 + 0.6927i |
| w23 | 0001011 | +1.1447 + 0.4719i |
| w24 | 0001100 | +0.6878 − 0.8578i |
| w25 | 0001100 | +0.7725 − 0.6723i |
| w26 | 0001101 | +0.6878 + 0.8578i |
| w27 | 0001101 | +0.7725 + 0.6723i |
| w28 | 0001110 | +0.7359 − 0.3230i |
| w29 | 0001110 | +0.8236 − 0.3936i |
| w30 | 0001111 | +0.7359 + 0.3230i |
| w31 | 0001111 | +0.8236 + 0.3936i |
| w32 | 0010000 | −0.7383 − 1.3947i |
| w33 | 0010000 | −0.2726 − 1.6070i |
| w34 | 0010001 | −0.7383 + 1.3947i |
| w35 | 0010001 | −0.2726 + 1.6070i |
| w36 | 0010010 | −1.5779 − 0.2230i |
| w37 | 0010010 | −1.2114 − 0.1662i |
| w38 | 0010011 | −1.5779 + 0.2230i |
| w39 | 0010011 | −1.2114 + 0.1662i |
| w40 | 0010100 | −0.5286 − 1.0997i |
| w41 | 0010100 | −0.1915 − 1.2689i |
| w42 | 0010101 | −0.5286 + 1.0997i |
| w43 | 0010101 | −0.1915 + 1.2689i |
| w44 | 0010110 | −0.7620 − 0.1121i |
| w45 | 0010110 | −0.9103 − 0.1272i |
| w46 | 0010111 | −0.7620 + 0.1121i |
| w47 | 0010111 | −0.9103 + 0.1272i |
| w48 | 0011000 | −1.0680 − 1.0753i |
| w49 | 0011000 | −1.0389 − 0.7336i |
| w50 | 0011001 | −1.0680 + 1.0753i |
| w51 | 0011001 | −1.0389 + 0.7336i |
| w52 | 0011010 | −1.4915 − 0.6927i |
| w53 | 0011010 | −1.1447 − 0.4719i |
| w54 | 0011011 | −1.4915 + 0.6927i |
| w55 | 0011011 | −1.1447 + 0.4719i |

-continued

| w index | bit label | Constellation point |
|---|---|---|
| w56 | 0011100 | −0.6878 − 0.8578i |
| w57 | 0011100 | −0.7725 − 0.6723i |
| w58 | 0011101 | −0.6878 + 0.8578i |
| w59 | 0011101 | −0.7725 + 0.6723i |
| w60 | 0011110 | −0.7359 − 0.3230i |
| w61 | 0011110 | −0.8236 − 0.3936i |
| w62 | 0011111 | −0.7359 + 0.3230i |
| w63 | 0011111 | −0.8236 + 0.3936i |
| w64 | 01000000 | +0.1315 − 0.7332i |
| w65 | 01000001 | +0.1038 − 0.7607i |
| w66 | 01000010 | +0.1315 + 0.7332i |
| w67 | 01000011 | +0.1038 + 0.7607i |
| w68 | 01000100 | +0.1461 − 0.1146i |
| w69 | 01000101 | +0.1573 − 0.1142i |
| w70 | 01000110 | +0.1461 + 0.1146i |
| w71 | 01000111 | +0.1573 + 0.1142i |
| w72 | 01001000 | +0.3255 − 0.9067i |
| w73 | 01001001 | +0.1588 − 1.0122i |
| w74 | 01001010 | +0.3255 + 0.9067i |
| w75 | 01001011 | +0.1588 + 1.0122i |
| w76 | 01001100 | +0.4774 − 0.1074i |
| w77 | 01001101 | +0.4323 − 0.1096i |
| w78 | 01001110 | +0.4774 + 0.1074i |
| w79 | 01001111 | +0.4323 + 0.1096i |
| w80 | 01010000 | +0.1647 − 0.5388i |
| w81 | 01010001 | +0.1629 − 0.5296i |
| w82 | 01010010 | +0.1647 + 0.5388i |
| w83 | 01010011 | +0.1629 + 0.5296i |
| w84 | 01010100 | +0.1535 − 0.3082i |
| w85 | 01010101 | +0.1629 − 0.3084i |
| w86 | 01010110 | +0.1535 + 0.3082i |
| w87 | 01010111 | +0.1629 + 0.3084i |
| w88 | 01011000 | +0.4535 − 0.6452i |
| w89 | 01011001 | +0.4645 − 0.5898i |
| w90 | 01011010 | +0.4535 + 0.6452i |
| w91 | 01011011 | +0.4645 + 0.5898i |
| w92 | 01011100 | +0.4853 − 0.3237i |
| w93 | 01011101 | +0.4637 − 0.3425i |
| w94 | 01011110 | +0.4853 + 0.3237i |
| w95 | 01011111 | +0.4637 + 0.3425i |
| w96 | 01100000 | −0.1315 − 0.7332i |
| w97 | 01100001 | −0.1038 − 0.7607i |
| w98 | 01100010 | −0.1315 + 0.7332i |
| w99 | 01100011 | −0.1038 + 0.7607i |
| w100 | 01100100 | −0.1461 − 0.1146i |
| w101 | 01100101 | −0.1573 − 0.1142i |
| w102 | 01100110 | −0.1461 + 0.1146i |
| w103 | 01100111 | −0.1573 + 0.1142i |
| w104 | 01101000 | −0.3255 − 0.9067i |
| w105 | 01101001 | −0.1588 − 1.0122i |
| w106 | 01101010 | −0.3255 + 0.9067i |
| w107 | 01101011 | −0.1588 + 1.0122i |
| w108 | 01101100 | −0.4774 − 0.1074i |
| w109 | 01101101 | −0.4323 − 0.1096i |
| w110 | 01101110 | −0.4774 + 0.1074i |
| w111 | 01101111 | −0.4323 + 0.1096i |
| w112 | 01110000 | −0.1647 − 0.5388i |
| w113 | 01110001 | −0.1629 − 0.5296i |
| w114 | 01110010 | −0.1647 + 0.5388i |
| w115 | 01110011 | −0.1629 + 0.5296i |
| w116 | 01110100 | −0.1535 − 0.3082i |
| w117 | 01110101 | −0.1629 − 0.3084i |
| w118 | 01100110 | −0.1535 + 0.3082i |
| w119 | 01110111 | −0.1629 + 0.3084i |
| w120 | 01111000 | −0.4535 − 0.6452i |
| w121 | 01111001 | −0.4645 − 0.5898i |
| w122 | 01111010 | −0.4535 + 0.6452i |
| w123 | 01111011 | −0.4645 + 0.5898i |
| w124 | 01111100 | −0.4853 − 0.3237i |
| w125 | 01111101 | −0.4637 − 0.3425i |
| w126 | 01111110 | −0.4853 + 0.3237i |
| w127 | 01111111 | −0.4637 + 0.3425i | for R=5/8 (or R=1/2, 3/4 or 13/16):

| w index | bit label | Constellation point |
|---|---|---|
| w0 | 0000000 | +1.1470 + 0.4332i |
| w1 | 0000000 | +0.5553 + 0.4183i |
| w2 | 0000001 | +1.1804 + 0.7965i |
| w3 | 0000001 | +0.5406 + 0.6294i |
| w4 | 0000010 | +1.1470 − 0.4332i |
| w5 | 0000010 | +0.5553 − 0.4183i |
| w6 | 0000011 | +1.1804 − 0.7965i |
| w7 | 0000011 | +0.5406 − 0.6294i |
| w8 | 0000100 | −1.1470 + 0.4332i |
| w9 | 0000100 | −0.5553 + 0.4183i |
| w10 | 0000101 | −1.1804 + 0.7965i |
| w11 | 0000101 | −0.5406 + 0.6294i |
| w12 | 0000110 | −1.1470 − 0.4332i |
| w13 | 0000110 | −0.5553 − 0.4183i |
| w14 | 0000111 | −1.1804 − 0.7965i |
| w15 | 0000111 | −0.5406 − 0.6294i |
| w16 | 0001000 | +0.1029 + 0.4847i |
| w17 | 0001000 | +0.3416 + 0.4299i |
| w18 | 0001001 | +0.1167 + 0.6847i |
| w19 | 0001001 | +0.3403 + 0.6639i |
| w20 | 0001010 | +0.1029 − 0.4847i |
| w21 | 0001010 | +0.3416 − 0.4299i |
| w22 | 0001011 | +0.1167 − 0.6847i |
| w23 | 0001011 | +0.3403 − 0.6639i |
| w24 | 0001100 | −0.1029 + 0.4847i |
| w25 | 0001100 | −0.3416 + 0.4299i |
| w26 | 0001101 | −0.1167 + 0.6847i |
| w27 | 0001101 | −0.3403 + 0.6639i |
| w28 | 0001110 | −0.1029 − 0.4847i |
| w29 | 0001110 | −0.3416 − 0.4299i |
| w30 | 0001111 | −0.1167 − 0.6847i |
| w31 | 0001111 | −0.3403 − 0.6639i |
| w32 | 0010000 | +1.1636 + 0.1437i |
| w33 | 0010000 | +0.5673 + 0.1212i |
| w34 | 0010001 | +1.4805 + 0.1788i |
| w35 | 0010001 | +0.9781 + 1.1963i |
| w36 | 0010010 | +1.1636 − 0.1437i |
| w37 | 0010010 | +0.5673 − 0.1212i |
| w38 | 0010011 | +1.4805 − 0.1788i |
| w39 | 0010011 | +0.9781 − 1.1963i |
| w40 | 0010100 | −1.1636 + 0.1437i |
| w41 | 0010100 | −0.5673 + 0.1212i |
| w42 | 0010101 | −1.4805 + 0.1788i |
| w43 | 0010101 | −0.9781 + 1.1963i |
| w44 | 0010110 | −1.1636 − 0.1437i |
| w45 | 0010110 | −0.5673 − 0.1212i |
| w46 | 0010111 | −1.4805 − 0.1788i |
| w47 | 0010111 | −0.9781 − 1.1963i |
| w48 | 0011000 | +0.1058 + 0.0889i |
| w49 | 0011000 | +0.3723 + 0.1109i |
| w50 | 0011001 | +0.1939 + 1.4903i |
| w51 | 0011001 | +0.5867 + 1.4162i |
| w52 | 0011010 | +0.1058 − 0.0889i |
| w53 | 0011010 | +0.3723 − 0.1109i |
| w54 | 0011011 | +0.1939 − 1.4903i |
| w55 | 0011011 | +0.5867 − 1.4162i |
| w56 | 0011100 | −0.1058 + 0.0889i |
| w57 | 0011100 | −0.3723 + 0.1109i |
| w58 | 0011101 | −0.1939 + 1.4903i |
| w59 | 0011101 | −0.5867 + 1.4162i |
| w60 | 0011110 | −0.1058 − 0.0889i |
| w61 | 0011110 | −0.3723 − 0.1109i |
| w62 | 0011111 | −0.1939 − 1.4903i |
| w63 | 0011111 | −0.5867 − 1.4162i |
| w64 | 01000000 | +0.9015 + 0.4159i |
| w65 | 01000001 | +0.6908 + 0.3786i |
| w66 | 01000010 | +0.8996 + 0.6935i |
| w67 | 01000011 | +0.6580 + 0.7616i |
| w68 | 01000100 | +0.9015 − 0.4159i |
| w69 | 01000101 | +0.6908 − 0.3786i |
| w70 | 01000110 | +0.8996 − 0.6935i |
| w71 | 01000111 | +0.6580 − 0.7616i |
| w72 | 01001000 | −0.9015 + 0.4159i |
| w73 | 01001001 | −0.6908 + 0.3786i |
| w74 | 01001010 | −0.8996 + 0.6935i |
| w75 | 01001011 | −0.6580 + 0.7616i |

-continued

| w index | bit label | Constellation point |
| --- | --- | --- |
| w76 | 01001100 | −0.9015 − 0.4159i |
| w77 | 01001101 | −0.6908 − 0.3786i |
| w78 | 01001110 | −0.8996 − 0.6935i |
| w79 | 01001111 | −0.6580 − 0.7616i |
| w80 | 01010000 | +0.1029 + 0.3518i |
| w81 | 01010001 | +0.2989 + 0.3450i |
| w82 | 01010010 | +0.1222 + 0.9046i |
| w83 | 01010011 | +0.3701 + 0.8771i |
| w84 | 01010100 | +0.1029 − 0.3518i |
| w85 | 01010101 | +0.2989 − 0.3450i |
| w86 | 01010110 | +0.1222 − 0.9046i |
| w87 | 01010111 | +0.3701 − 0.8771i |
| w88 | 01011000 | −0.1029 + 0.3518i |
| w89 | 01011001 | −0.2989 + 0.3450i |
| w90 | 01011010 | −0.1222 + 0.9046i |
| w91 | 01011011 | −0.3701 + 0.8771i |
| w92 | 01011100 | −0.1029 − 0.3518i |
| w93 | 01011101 | −0.2989 − 0.3450i |
| w94 | 01011110 | −0.1222 − 0.9046i |
| w95 | 01011111 | −0.3701 − 0.8771i |
| w96 | 01100000 | +0.9136 + 0.1312i |
| w97 | 01100001 | +0.6911 + 0.1387i |
| w98 | 01100010 | +1.5526 + 0.5600i |
| w99 | 01100011 | +0.7165 + 1.0174i |
| w100 | 01100100 | +0.9136 − 0.1312i |
| w101 | 01100101 | +0.6911 − 0.1387i |
| w102 | 01100110 | +1.5526 − 0.5600i |
| w103 | 01100111 | +0.7165 − 1.0174i |
| w104 | 01101000 | −0.9136 + 0.1312i |
| w105 | 01101001 | −0.6911 + 0.1387i |
| w106 | 01101010 | −1.5526 + 0.5600i |
| w107 | 01101011 | −0.7165 + 1.0174i |
| w108 | 01101100 | −0.9136 − 0.1312i |
| w109 | 01101101 | −0.6911 − 0.1387i |
| w110 | 01101110 | −1.5526 − 0.5600i |
| w111 | 01101111 | −0.7165 − 1.0174i |
| w112 | 01110000 | +0.1130 + 0.1512i |
| w113 | 01110001 | +0.3195 + 0.1563i |
| w114 | 01110010 | +0.1450 + 1.1700i |
| w115 | 01110011 | +0.4379 + 1.1192i |
| w116 | 01110100 | +0.1130 − 0.1512i |
| w117 | 01110101 | +0.3195 − 0.1563i |
| w118 | 01110110 | +0.1450 − 1.1700i |
| w119 | 01110111 | +0.4379 − 1.1192i |
| w120 | 01111000 | −0.1130 + 0.1512i |
| w121 | 01111001 | −0.3195 + 0.1563i |
| w122 | 01111010 | −0.1450 + 1.1700i |
| w123 | 01111011 | −0.4379 + 1.1192i |
| w124 | 01111100 | −0.1130 − 0.1512i |
| w125 | 01111101 | −0.3195 − 0.1563i |
| w126 | 01111110 | −0.1450 − 1.1700i |
| w127 | 01111111 | −0.4379 − 1.1192i | for R=3/4 (or R=1/2, 5/8 or 13/16):

| w index | bit label | Constellation point |
| --- | --- | --- |
| w0 | 0000000 | +1.0484 + 0.3435i |
| w1 | 0000000 | +1.1392 + 0.5908i |
| w2 | 0000001 | −1.0484 + 0.3435i |
| w3 | 0000001 | −1.1392 + 0.5908i |
| w4 | 0000010 | +1.0205 + 0.1130i |
| w5 | 0000010 | +1.3137 + 0.1401i |
| w6 | 0000011 | −1.0205 + 0.1130i |
| w7 | 0000011 | −1.3137 + 0.1401i |
| w8 | 0000100 | +0.8050 + 0.3736i |
| w9 | 0000100 | +0.8767 + 0.6075i |
| w10 | 0000101 | −0.8050 + 0.3736i |
| w11 | 0000101 | −0.8767 + 0.6075i |
| w12 | 0000110 | +0.7794 + 0.1239i |
| w13 | 0000110 | +1.4466 + 0.4199i |
| w14 | 0000111 | −0.7794 + 0.1239i |
| w15 | 0000111 | −1.4466 + 0.4199i |
| w16 | 0001000 | +0.5512 + 0.5784i |
| w17 | 0001000 | +0.5926 + 0.7787i |

-continued

| w index | bit label | Constellation point |
| --- | --- | --- |
| w18 | 0001001 | −0.5512 + 0.5784i |
| w19 | 0001001 | −0.5926 + 0.7787i |
| w20 | 0001010 | +0.4970 + 0.0732i |
| w21 | 0001010 | +1.1801 + 0.9322i |
| w22 | 0001011 | −0.4970 + 0.0732i |
| w23 | 0001011 | −1.1801 + 0.9322i |
| w24 | 0001100 | +0.5773 + 0.3945i |
| w25 | 0001100 | +0.8273 + 0.8515i |
| w26 | 0001101 | −0.5773 + 0.3945i |
| w27 | 0001101 | −0.8273 + 0.8515i |
| w28 | 0001110 | +0.5611 + 0.2103i |
| w29 | 0001110 | +0.9097 + 1.1442i |
| w30 | 0001111 | −0.5611 + 0.2103i |
| w31 | 0001111 | −0.9097 + 1.1442i |
| w32 | 0010000 | +0.1137 + 0.6007i |
| w33 | 0010000 | +0.1177 + 0.7939i |
| w34 | 0010001 | −0.1137 + 0.6007i |
| w35 | 0010001 | −0.1177 + 0.7939i |
| w36 | 0010010 | +0.0988 + 0.0864i |
| w37 | 0010010 | +0.1761 + 1.5225i |
| w38 | 0010011 | −0.0988 + 0.0864i |
| w39 | 0010011 | −0.1761 + 1.5225i |
| w40 | 0010100 | +0.1075 + 0.4242i |
| w41 | 0010100 | +0.1232 + 1.0065i |
| w42 | 0010101 | −0.1075 + 0.4242i |
| w43 | 0010101 | −0.1232 + 1.0065i |
| w44 | 0010110 | +0.1016 + 0.2562i |
| w45 | 0010110 | +0.1403 + 1.2447i |
| w46 | 0010111 | −0.1016 + 0.2562i |
| w47 | 0010111 | −0.1403 + 1.2447i |
| w48 | 0011000 | +0.3358 + 0.5918i |
| w49 | 0011000 | +0.3537 + 0.7995i |
| w50 | 0011001 | −0.3358 + 0.5918i |
| w51 | 0011001 | −0.3537 + 0.7995i |
| w52 | 0011010 | +0.2966 + 0.0872i |
| w53 | 0011010 | +0.4861 + 1.3847i |
| w54 | 0011011 | −0.2966 + 0.0872i |
| w55 | 0011011 | −0.4861 + 1.3847i |
| w56 | 0011100 | +0.3322 + 0.4087i |
| w57 | 0011100 | +0.3791 + 1.0277i |
| w58 | 0011101 | −0.3322 + 0.4087i |
| w59 | 0011101 | −0.3791 + 1.0277i |
| w60 | 0011110 | +0.3142 + 0.2509i |
| w61 | 0011110 | +0.6160 + 1.1277i |
| w62 | 0011111 | −0.3142 + 0.2509i |
| w63 | 0011111 | −0.6160 + 1.1277i |
| w64 | 01000000 | +1.0484 − 0.3435i |
| w65 | 01000001 | +1.1392 − 0.5908i |
| w66 | 01000010 | −1.0484 − 0.3435i |
| w67 | 01000011 | −1.1392 − 0.5908i |
| w68 | 01000100 | +1.0205 − 0.1130i |
| w69 | 01000101 | +1.3137 − 0.1401i |
| w70 | 01000110 | −1.0205 − 0.1130i |
| w71 | 01000111 | −1.3137 − 0.1401i |
| w72 | 01001000 | +0.8050 − 0.3736i |
| w73 | 01001001 | +0.8767 − 0.6075i |
| w74 | 01001010 | −0.8050 − 0.3736i |
| w75 | 01001011 | −0.8767 − 0.6075i |
| w76 | 01001100 | +0.7794 − 0.1239i |
| w77 | 01001101 | +1.4466 − 0.4199i |
| w78 | 01001110 | −0.7794 − 0.1239i |
| w79 | 01001111 | −1.4466 − 0.4199i |
| w80 | 01010000 | +0.5512 − 0.5784i |
| w81 | 01010001 | +0.5926 − 0.7787i |
| w82 | 01010010 | −0.5512 − 0.5784i |
| w83 | 01010011 | −0.5926 − 0.7787i |
| w84 | 01010100 | +0.4970 − 0.0732i |
| w85 | 01010101 | +1.1801 − 0.9322i |
| w86 | 01010110 | −0.4970 − 0.0732i |
| w87 | 01010111 | −1.1801 − 0.9322i |
| w88 | 01011000 | +0.5773 − 0.3945i |
| w89 | 01011001 | +0.8273 − 0.8515i |
| w90 | 01011010 | −0.5773 − 0.3945i |
| w91 | 01011011 | −0.8273 − 0.8515i |
| w92 | 01011100 | +0.5611 − 0.2103i |
| w93 | 01011101 | +0.9097 − 1.1442i |
| w94 | 01011110 | −0.5611 − 0.2103i |

-continued

| w index | bit label | Constellation point |
|---|---|---|
| w95 | 01011111 | −0.9097 − 1.1442i |
| w96 | 01100000 | +0.1137 − 0.6007i |
| w97 | 01100001 | +0.1177 − 0.7939i |
| w98 | 01100010 | −0.1137 − 0.6007i |
| w99 | 01100011 | −0.1177 − 0.7939i |
| w100 | 01100100 | +0.0988 − 0.0864i |
| w101 | 01100101 | +0.1761 − 1.5225i |
| w102 | 01100110 | −0.0988 − 0.0864i |
| w103 | 01100111 | −0.1761 − 1.5225i |
| w104 | 01101000 | +0.1075 − 0.4242i |
| w105 | 01101001 | +0.1232 − 1.0065i |
| w106 | 01101010 | −0.1075 − 0.4242i |
| w107 | 01101011 | −0.1232 − 1.0065i |
| w108 | 01101100 | +0.1016 − 0.2562i |
| w109 | 01101101 | +0.1403 − 1.2447i |
| w110 | 01101110 | −0.1016 − 0.2562i |
| w111 | 01101111 | −0.1403 − 1.2447i |
| w112 | 01110000 | +0.3358 − 0.5918i |
| w113 | 01110001 | +0.3537 − 0.7995i |
| w114 | 01110010 | −0.3358 − 0.5918i |
| w115 | 01110011 | −0.3537 − 0.7995i |
| w116 | 01110100 | +0.2966 − 0.0872i |
| w117 | 01110101 | +0.4861 − 1.3847i |
| w118 | 01110110 | −0.2966 − 0.0872i |
| w119 | 01110111 | −0.4861 − 1.3847i |
| w120 | 01111000 | +0.3322 − 0.4087i |
| w121 | 01111001 | +0.3791 − 1.0277i |
| w122 | 01111010 | −0.3322 − 0.4087i |
| w123 | 01111011 | −0.3791 − 1.0277i |
| w124 | 01111100 | +0.3142 − 0.2509i |
| w125 | 01111101 | +0.6160 − 1.1277i |
| w126 | 01111110 | −0.3142 − 0.2509i |
| w127 | 01111111 | −0.6160 − 1.1277i | for R=13/16 (or R=1/2, 5/8 or 3/4):

| w index | bit label | Constellation point |
|---|---|---|
| w0 | 0000000 | +1.0422 + 0.3376i |
| w1 | 0000000 | +1.0422 − 0.3376i |
| w2 | 0000001 | −1.0422 + 0.3376i |
| w3 | 0000001 | −1.0422 − 0.3376i |
| w4 | 0000010 | +0.7966 + 0.3496i |
| w5 | 0000010 | +0.7966 − 0.3496i |
| w6 | 0000011 | −0.7966 + 0.3496i |
| w7 | 0000011 | −0.7966 − 0.3496i |
| w8 | 0000100 | +1.1154 + 0.5839i |
| w9 | 0000100 | +1.1154 − 0.5839i |
| w10 | 0000101 | −1.1154 + 0.5839i |
| w11 | 0000101 | −1.1154 − 0.5839i |
| w12 | 0000110 | +0.8563 + 0.5705i |
| w13 | 0000110 | +0.8563 − 0.5705i |
| w14 | 0000111 | −0.8563 + 0.5705i |
| w15 | 0000111 | −0.8563 − 0.5705i |
| w16 | 0001000 | +1.0010 + 0.1105i |
| w17 | 0001000 | +1.0010 − 0.1105i |
| w18 | 0001001 | −1.0010 + 0.1105i |
| w19 | 0001001 | −1.0010 − 0.1105i |
| w20 | 0001010 | +0.7613 + 0.1187i |
| w21 | 0001010 | +0.7613 − 0.1187i |
| w22 | 0001011 | −0.7613 + 0.1187i |
| w23 | 0001011 | −0.7613 − 0.1187i |
| w24 | 0001100 | +1.2844 + 0.1345i |
| w25 | 0001100 | +1.2844 − 0.1345i |
| w26 | 0001101 | −1.2844 + 0.1345i |
| w27 | 0001101 | −1.2844 − 0.1345i |
| w28 | 0001110 | +1.4001 + 0.4092i |
| w29 | 0001110 | +1.4001 − 0.4092i |
| w30 | 0001111 | −1.4001 + 0.4092i |
| w31 | 0001111 | −1.4001 − 0.4092i |
| w32 | 0010000 | +0.1125 + 0.6269i |
| w33 | 0010000 | +0.1125 − 0.6269i |
| w34 | 0010001 | −0.1125 + 0.6269i |
| w35 | 0010001 | −0.1125 − 0.6269i |
| w36 | 0010010 | +0.1109 + 0.4454i |
| w37 | 0010010 | +0.1109 − 0.4454i |
| w38 | 0010011 | −0.1109 + 0.4454i |
| w39 | 0010011 | −0.1109 − 0.4454i |
| w40 | 0010100 | +0.1155 + 0.8217i |
| w41 | 0010100 | +0.1155 − 0.8217i |
| w42 | 0010101 | −0.1155 + 0.8217i |
| w43 | 0010101 | −0.1155 − 0.8217i |
| w44 | 0010110 | +0.1239 + 1.0311i |
| w45 | 0010110 | +0.1239 − 1.0311i |
| w46 | 0010111 | −0.1239 + 1.0311i |
| w47 | 0010111 | −0.1239 − 1.0311i |
| w48 | 0011000 | +0.0978 + 0.0913i |
| w49 | 0011000 | +0.0978 − 0.0913i |
| w50 | 0011001 | −0.0978 + 0.0913i |
| w51 | 0011001 | −0.0978 − 0.0913i |
| w52 | 0011010 | +0.1038 + 0.2705i |
| w53 | 0011010 | +0.1038 − 0.2705i |
| w54 | 0011011 | −0.1038 + 0.2705i |
| w55 | 0011011 | −0.1038 − 0.2705i |
| w56 | 0011100 | +0.1646 + 1.5274i |
| w57 | 0011100 | +0.1646 − 1.5274i |
| w58 | 0011101 | −0.1646 + 1.5274i |
| w59 | 0011101 | −0.1646 − 1.5274i |
| w60 | 0011110 | +0.1345 + 1.2611i |
| w61 | 0011110 | +0.1345 − 1.2611i |
| w62 | 0011111 | −0.1345 + 1.2611i |
| w63 | 0011111 | −0.1345 − 1.2611i |
| w64 | 01000000 | +0.5556 + 0.6306i |
| w65 | 01000001 | +0.5556 − 0.6306i |
| w66 | 01000010 | −0.5556 + 0.6306i |
| w67 | 01000011 | −0.5556 − 0.6306i |
| w68 | 01000100 | +0.5761 + 0.4286i |
| w69 | 01000101 | +0.5761 − 0.4286i |
| w70 | 01000110 | −0.5761 + 0.4286i |
| w71 | 01000111 | −0.5761 − 0.4286i |
| w72 | 01001000 | +0.5970 + 0.8482i |
| w73 | 01001001 | +0.5970 − 0.8482i |
| w74 | 01001010 | −0.5970 + 0.8482i |
| w75 | 01001011 | −0.5970 − 0.8482i |
| w76 | 01001100 | +0.8378 + 0.8041i |
| w77 | 01001101 | +0.8378 − 0.8041i |
| w78 | 01001110 | −0.8378 + 0.8041i |
| w79 | 01001111 | −0.8378 − 0.8041i |
| w80 | 01010000 | +0.4942 + 0.0780i |
| w81 | 01010001 | +0.4942 − 0.0780i |
| w82 | 01010010 | −0.4942 + 0.0780i |
| w83 | 01010011 | −0.4942 − 0.0780i |
| w84 | 01010100 | +0.5456 + 0.2367i |
| w85 | 01010101 | +0.5456 − 0.2367i |
| w86 | 01010110 | −0.5456 + 0.2367i |
| w87 | 01010111 | −0.5456 − 0.2367i |
| w88 | 01011000 | +1.1670 + 0.8997i |
| w89 | 01011001 | +1.1670 − 0.8997i |
| w90 | 01011010 | −1.1670 + 0.8997i |
| w91 | 01011011 | −1.1670 − 0.8997i |
| w92 | 01011100 | +0.9031 + 1.0698i |
| w93 | 01011101 | +0.9031 − 1.0698i |
| w94 | 01011110 | −0.9031 + 1.0698i |
| w95 | 01011111 | −0.9031 − 1.0698i |
| w96 | 01100000 | +0.3351 + 0.6308i |
| w97 | 01100001 | +0.3351 − 0.6308i |
| w98 | 01100010 | −0.3351 + 0.6308i |
| w99 | 01100011 | −0.3351 − 0.6308i |
| w100 | 01100100 | +0.3383 + 0.4404i |
| w101 | 01100101 | +0.3383 − 0.4404i |
| w102 | 01100110 | −0.3383 + 0.4404i |
| w103 | 01100111 | −0.3383 − 0.4404i |
| w104 | 01101000 | +0.3510 + 0.8405i |
| w105 | 01101001 | +0.3510 − 0.8405i |
| w106 | 01101010 | −0.3510 + 0.8405i |
| w107 | 01101011 | −0.3510 − 0.5405i |
| w108 | 01101100 | +0.3850 + 1.0724i |
| w109 | 01101101 | +0.3850 − 1.0724i |
| w110 | 01101110 | −0.3850 + 1.0724i |
| w111 | 01101111 | −0.3850 − 1.0724i |
| w112 | 01110000 | +0.2935 + 0.0906i |
| w113 | 01110001 | +0.2935 − 0.0906i |

-continued

| w index | bit label | Constellation point |
|---|---|---|
| w114 | 01110010 | −0.2935 + 0.0906i |
| w115 | 01110011 | −0.2935 − 0.0906i |
| w116 | 01110100 | +0.3172 + 0.2666i |
| w117 | 01110101 | +0.3172 − 0.2666i |
| w118 | 01110110 | −0.3172 + 0.2666i |
| w119 | 01110111 | −0.3172 − 0.2666i |
| w120 | 01111000 | +0.4543 + 1.3933i |
| w121 | 01111001 | +0.4543 − 1.3933i |
| w122 | 01111010 | −0.4543 + 1.3933i |
| w123 | 01111011 | −0.4543 − 1.3933i |
| w124 | 01111100 | +0.6436 + 1.1770i |
| w125 | 01111101 | +0.6436 − 1.1770i |
| w126 | 01111110 | −0.6436 + 1.1770i |
| w127 | 01111111 | −0.6436 − 1.1770i |

A4) 256-QAM NUC
for R=1/2 (or R=5/8, 3/4 or 13/16):

| w index | bit label | Constellation point |
|---|---|---|
| w0 | 0000000 | −1.2901 + 1.0495i |
| w1 | 0000000 | −0.7273 + 0.6160i |
| w2 | 0000001 | −1.0646 + 1.2876i |
| w3 | 0000001 | −0.5707 + 0.7662i |
| w4 | 0000010 | +1.2901 + 1.0495i |
| w5 | 0000010 | +0.7273 + 0.6160i |
| w6 | 0000011 | +1.0646 + 1.2876i |
| w7 | 0000011 | +0.5707 + 0.7662i |
| w8 | 0000100 | −1.4625 + 0.7740i |
| w9 | 0000100 | −0.8177 + 0.4841i |
| w10 | 0000101 | −0.7949 + 1.4772i |
| w11 | 0000101 | −0.4490 + 0.8461i |
| w12 | 0000110 | +1.4625 + 0.7740i |
| w13 | 0000110 | +0.8177 + 0.4841i |
| w14 | 0000111 | +0.7949 + 1.4772i |
| w15 | 0000111 | +0.4490 + 0.8461i |
| w16 | 0001000 | −0.2844 + 0.1296i |
| w17 | 0001000 | −0.5902 + 0.4857i |
| w18 | 0001001 | −0.1053 + 0.1494i |
| w19 | 0001001 | −0.4294 + 0.6363i |
| w20 | 0001010 | +0.2844 + 0.1296i |
| w21 | 0001010 | +0.5902 + 0.4857i |
| w22 | 0001011 | +0.1053 + 0.1494i |
| w23 | 0001011 | +0.4294 + 0.6363i |
| w24 | 0001100 | −0.2853 + 0.1309i |
| w25 | 0001100 | −0.6355 + 0.4185i |
| w26 | 0001101 | −0.1052 + 0.1495i |
| w27 | 0001101 | −0.3744 + 0.6744i |
| w28 | 0001110 | +0.2853 + 0.1309i |
| w29 | 0001110 | +0.6355 + 0.4185i |
| w30 | 0001111 | +0.1052 + 0.1495i |
| w31 | 0001111 | +0.3744 + 0.6744i |
| w32 | 0010000 | −1.6350 + 0.1593i |
| w33 | 0010000 | −0.9430 + 0.1100i |
| w34 | 0010001 | −0.1658 + 1.6747i |
| w35 | 0010001 | −0.1088 + 0.9530i |
| w36 | 0010010 | +1.6350 + 0.1593i |
| w37 | 0010010 | +0.9430 + 0.1100i |
| w38 | 0010011 | +0.1658 + 1.6747i |
| w39 | 0010011 | +0.1088 + 0.9530i |
| w40 | 0010100 | −1.5776 + 0.4735i |
| w41 | 0010100 | −0.9069 + 0.2829i |
| w42 | 0010101 | −0.4907 + 1.6084i |
| w43 | 0010101 | −0.2464 + 0.9270i |
| w44 | 0010110 | +1.5776 + 0.4735i |
| w45 | 0010110 | +0.9069 + 0.2829i |
| w46 | 0010111 | +0.4907 + 1.6084i |
| w47 | 0010111 | +0.2464 + 0.9270i |
| w48 | 0011000 | −0.3237 + 0.0849i |
| w49 | 0011000 | −0.7502 + 0.1138i |
| w50 | 0011001 | −0.0872 + 0.1390i |
| w51 | 0011001 | −0.1091 + 0.7656i |
| w52 | 0011010 | +0.3237 + 0.0849i |
| w53 | 0011010 | +0.7502 + 0.1138i |
| w54 | 0011011 | +0.0872 + 0.1390i |

-continued

| w index | bit label | Constellation point |
|---|---|---|
| w55 | 0011011 | +0.1091 + 0.7656i |
| w56 | 0011100 | −0.3228 + 0.0867i |
| w57 | 0011100 | −0.7325 + 0.2088i |
| w58 | 0011101 | −0.0871 + 0.1392i |
| w59 | 0011101 | −0.1699 + 0.7537i |
| w60 | 0011110 | +0.3228 + 0.0867i |
| w61 | 0011110 | +0.7325 + 0.2088i |
| w62 | 0011111 | +0.0871 + 0.1392i |
| w63 | 0011111 | +0.1699 + 0.7537i |
| w64 | 01000000 | −1.2901 − 1.0495i |
| w65 | 01000001 | −0.7273 − 0.6160i |
| w66 | 01000010 | −1.0646 − 1.2876i |
| w67 | 01000011 | −0.5707 − 0.7662i |
| w68 | 01000100 | +1.2901 − 1.0495i |
| w69 | 01000101 | +0.7273 − 0.6160i |
| w70 | 01000110 | +1.0646 − 1.2876i |
| w71 | 01000111 | +0.5707 − 0.7662i |
| w72 | 01001000 | −1.4625 − 0.7740i |
| w73 | 01001001 | −0.8177 − 0.4841i |
| w74 | 01001010 | −0.7949 − 1.4772i |
| w75 | 01001011 | −0.4490 − 0.8461i |
| w76 | 01001100 | +1.4625 − 0.7740i |
| w77 | 01001101 | +0.8177 − 0.4841i |
| w78 | 01001110 | +0.7949 − 1.4772i |
| w79 | 01001111 | +0.4490 − 0.8461i |
| w80 | 01010000 | −0.2844 − 0.1296i |
| w81 | 01010001 | −0.5902 − 0.4857i |
| w82 | 01010010 | −0.1053 − 0.1494i |
| w83 | 01010011 | −0.4294 − 0.6363i |
| w84 | 01010100 | +0.2844 − 0.1296i |
| w85 | 01010101 | +0.5902 − 0.4857i |
| w86 | 01010110 | +0.1053 − 0.1494i |
| w87 | 01010111 | +0.4294 − 0.6363i |
| w88 | 01011000 | −0.2853 − 0.1309i |
| w89 | 01011001 | −0.6355 − 0.4185i |
| w90 | 01011010 | −0.1052 − 0.1495i |
| w91 | 01011011 | −0.3744 − 0.6744i |
| w92 | 01011100 | +0.2853 − 0.1309i |
| w93 | 01011101 | +0.6355 − 0.4185i |
| w94 | 01011110 | +0.1052 − 0.1495i |
| w95 | 01011111 | +0.3744 − 0.6744i |
| w96 | 01100000 | −1.6350 − 0.1593i |
| w97 | 01100001 | −0.9430 − 0.1100i |
| w98 | 01100010 | −0.1658 − 1.6747i |
| w99 | 01100011 | −0.1088 − 0.9530i |
| w100 | 01100100 | +1.6350 − 0.1593i |
| w101 | 01100101 | +0.9430 − 0.1100i |
| w102 | 01100110 | +0.1658 − 1.6747i |
| w103 | 01100111 | +0.1088 − 0.9530i |
| w104 | 01101000 | −1.5776 − 0.4735i |
| w105 | 01101001 | −0.9069 − 0.2829i |
| w106 | 01101010 | −0.4907 − 1.6084i |
| w107 | 01101011 | −0.2464 − 0.9270i |
| w108 | 01101100 | +1.5776 − 0.4735i |
| w109 | 01101101 | +0.9069 − 0.2829i |
| w110 | 01101110 | +0.4907 − 1.6084i |
| w111 | 01101111 | +0.2464 − 0.9270i |
| w112 | 01110000 | −0.3237 − 0.0849i |
| w113 | 01110001 | −0.7502 − 0.1138i |
| w114 | 01110010 | −0.0872 − 0.1390i |
| w115 | 01110011 | −0.1091 − 0.7656i |
| w116 | 01110100 | +0.3237 − 0.0849i |
| w117 | 01110101 | +0.7502 − 0.1138i |
| w118 | 01110110 | +0.0872 − 0.1390i |
| w119 | 01110111 | +0.1091 − 0.7656i |
| w120 | 01111000 | −0.3228 − 0.0867i |
| w121 | 01111001 | −0.7325 − 0.2088i |
| w122 | 01111010 | −0.0871 − 0.1392i |
| w123 | 01111011 | −0.1699 − 0.7537i |
| w124 | 01111100 | +0.3228 − 0.0867i |
| w125 | 01111101 | +0.7325 − 0.2088i |
| w126 | 01111110 | +0.0871 − 0.1392i |
| w127 | 01111111 | +0.1699 − 0.7537i |
| w128 | 10000000 | −1.0382 + 0.8623i |
| w129 | 10000001 | −0.8504 + 0.7217i |
| w130 | 10000010 | −0.8555 + 1.0542i |
| w131 | 10000011 | −0.6961 + 0.8850i |

-continued

| w index | bit label | Constellation point |
|---|---|---|
| w132 | 10000100 | +1.0382 + 0.8623i |
| w133 | 10000101 | +0.8504 + 0.7217i |
| w134 | 10000110 | +0.8555 + 1.0542i |
| w135 | 10000111 | +0.6961 + 0.8850i |
| w136 | 10001000 | −1.1794 + 0.6376i |
| w137 | 10001001 | −0.9638 + 0.5407i |
| w138 | 10001010 | −0.6363 + 1.2064i |
| w139 | 10001011 | −0.5229 + 1.0037i |
| w140 | 10001100 | +1.1794 + 0.6376i |
| w141 | 10001101 | +0.9638 + 0.5407i |
| w142 | 10001110 | +0.6363 + 1.2064i |
| w143 | 10001111 | +0.5229 + 1.0037i |
| w144 | 10010000 | −0.3734 + 0.2560i |
| w145 | 10010001 | −0.4968 + 0.3947i |
| w146 | 10010010 | −0.1938 + 0.3621i |
| w147 | 10010011 | −0.3224 + 0.5236i |
| w148 | 10010100 | +0.3734 + 0.2560i |
| w149 | 10010101 | +0.4968 + 0.3947i |
| w150 | 10010110 | +0.1938 + 0.3621i |
| w151 | 10010111 | +0.3224 + 0.5236i |
| w152 | 10011000 | −0.3799 + 0.2517i |
| w153 | 10011001 | −0.5231 + 0.3644i |
| w154 | 10011010 | −0.1909 + 0.3627i |
| w155 | 10011011 | −0.3016 + 0.5347i |
| w156 | 10011100 | +0.3799 + 0.2517i |
| w157 | 10011101 | +0.5231 + 0.3644i |
| w158 | 10011110 | +0.1909 + 0.3627i |
| w159 | 10011111 | +0.3016 + 0.5347i |
| w160 | 10100000 | −1.3225 + 0.1320i |
| w161 | 10100001 | −1.0854 + 0.1139i |
| w162 | 10100010 | −0.1322 + 1.3631i |
| w163 | 10100011 | −0.1124 + 1.1327i |
| w164 | 10100100 | +1.3225 + 0.1320i |
| w165 | 10100101 | +1.0854 + 0.1139i |
| w166 | 10100110 | +0.1322 + 1.3631i |
| w167 | 10100111 | +0.1124 + 1.1327i |
| w168 | 10101000 | −1.2742 + 0.3922i |
| w169 | 10101001 | −1.0441 + 0.3296i |
| w170 | 10101010 | −0.3929 + 1.3102i |
| w171 | 10101011 | −0.3160 + 1.0913i |
| w172 | 10101100 | +1.2742 + 0.3922i |
| w173 | 10101101 | +1.0441 + 0.3296i |
| w174 | 10101110 | +0.3929 + 1.3102i |
| w175 | 10101111 | +0.3160 + 1.0913i |
| w176 | 10110000 | −0.4582 + 0.1123i |
| w177 | 10110001 | −0.6473 + 0.1138i |
| w178 | 10110010 | −0.0928 + 0.3970i |
| w179 | 10110011 | −0.1054 + 0.5979i |
| w180 | 10110100 | +0.4582 + 0.1123i |
| w181 | 10110101 | +0.6473 + 0.1138i |
| w182 | 10110110 | +0.0928 + 0.3970i |
| w183 | 10110111 | +0.1054 + 0.5979i |
| w184 | 10111000 | −0.4545 + 0.1251i |
| w185 | 10111001 | −0.6339 + 0.1702i |
| w186 | 10111010 | −0.0937 + 0.3973i |
| w187 | 10111011 | −0.1230 + 0.5949i |
| w188 | 10111100 | +0.4545 + 0.1251i |
| w189 | 10111101 | +0.6339 + 0.1702i |
| w190 | 10111110 | +0.0937 + 0.3973i |
| w191 | 10111111 | +0.1230 + 0.5949i |
| w192 | 11000000 | −1.0382 − 0.8623i |
| w193 | 11000001 | −0.8504 − 0.7217i |
| w194 | 11000010 | −0.8555 − 1.0542i |
| w195 | 11000011 | −0.6961 − 0.8850i |
| w196 | 11000100 | +1.0382 − 0.8623i |
| w197 | 11000101 | +0.8504 − 0.7217i |
| w198 | 11000110 | +0.8555 − 1.0542i |
| w199 | 11000111 | +0.6961 − 0.8850i |
| w200 | 11001000 | −1.1794 − 0.6376i |
| w201 | 11001001 | −0.9638 − 0.5407i |
| w202 | 11001010 | −0.6363 − 1.2064i |
| w203 | 11001011 | −0.5229 − 1.0037i |
| w204 | 11001100 | +1.1794 − 0.6376i |
| w205 | 11001101 | +0.9638 − 0.5407i |
| w206 | 11001110 | +0.6363 − 1.2064i |
| w207 | 11001111 | +0.5229 − 1.0037i |
| w208 | 11010000 | −0.3734 − 0.2560i |

-continued

| w index | bit label | Constellation point |
|---|---|---|
| w209 | 11010001 | −0.4968 − 0.3947i |
| w210 | 11010010 | −0.1938 − 0.3621i |
| w211 | 11010011 | −0.3224 − 0.5236i |
| w212 | 11010100 | +0.3734 − 0.2560i |
| w213 | 11010101 | +0.4968 − 0.3947i |
| w214 | 11010110 | +0.1938 − 0.3621i |
| w215 | 11010111 | +0.3224 − 0.5236i |
| w216 | 11011000 | −0.3799 − 0.2517i |
| w217 | 11011001 | −0.5231 − 0.3644i |
| w218 | 11011010 | −0.1909 − 0.3627i |
| w219 | 11011011 | −0.3016 − 0.5347i |
| w220 | 11011100 | +0.3799 − 0.2517i |
| w221 | 11011101 | +0.5231 − 0.3644i |
| w222 | 11011110 | +0.1909 − 0.3627i |
| w223 | 11011111 | +0.3016 − 0.5347i |
| w224 | 11100000 | −1.3225 − 0.1320i |
| w225 | 11100001 | −1.0854 − 0.1139i |
| w226 | 11100010 | −0.1322 − 1.3631i |
| w227 | 11100011 | −0.1124 − 1.1327i |
| w228 | 11100100 | +1.3225 − 0.1320i |
| w229 | 11100101 | +1.0854 − 0.1139i |
| w230 | 11100110 | +0.1322 − 1.3631i |
| w231 | 11100111 | +0.1124 − 1.1327i |
| w232 | 11101000 | −1.2742 − 0.3922i |
| w233 | 11101001 | −1.0441 − 0.3296i |
| w234 | 11101010 | −0.3929 − 1.3102i |
| w235 | 11101011 | −0.3160 − 1.0913i |
| w236 | 11101100 | +1.2742 − 0.3922i |
| w237 | 11101101 | +1.0441 − 0.3296i |
| w238 | 11101110 | +0.3929 − 1.3102i |
| w239 | 11101111 | +0.3160 − 1.0913i |
| w240 | 11110000 | −0.4582 − 0.1123i |
| w241 | 11110001 | −0.6473 − 0.1138i |
| w242 | 11110010 | −0.0928 − 0.3970i |
| w243 | 11110011 | −0.1054 − 0.5979i |
| w244 | 11110100 | +0.4582 − 0.1123i |
| w245 | 11110101 | +0.6473 − 0.1138i |
| w246 | 11110110 | +0.0928 − 0.3970i |
| w247 | 11110111 | +0.1054 − 0.5979i |
| w248 | 11111000 | −0.4545 − 0.1251i |
| w249 | 11111001 | −0.6339 − 0.1702i |
| w250 | 11111010 | −0.0937 − 0.3973i |
| w251 | 11111011 | −0.1230 − 0.5949i |
| w252 | 11111100 | +0.4545 − 0.1251i |
| w253 | 11111101 | +0.6339 − 0.1702i |
| w254 | 11111110 | +0.0937 − 0.3973i |
| w255 | 11111111 | +0.1230 − 0.5949i | for R=5/8 (or R=1/2, 3/4 or 13/16):

| w index | bit label | Constellation point |
|---|---|---|
| w0 | 0000000 | −1.2537 + 1.0045i |
| w1 | 0000000 | −0.2443 + 0.2114i |
| w2 | 0000001 | −0.7404 + 0.6074i |
| w3 | 0000001 | −0.6039 + 0.5118i |
| w4 | 0000010 | −1.5761 + 0.1512i |
| w5 | 0000010 | −0.2545 + 0.0723i |
| w6 | 0000011 | −0.9317 + 0.0939i |
| w7 | 0000011 | −0.7729 + 0.0813i |
| w8 | 0000100 | +1.2537 + 1.0045i |
| w9 | 0000100 | +0.2443 + 0.2114i |
| w10 | 0000101 | +0.7404 + 0.6074i |
| w11 | 0000101 | +0.6039 + 0.5118i |
| w12 | 0000110 | +1.5761 + 0.1512i |
| w13 | 0000110 | +0.2545 + 0.0723i |
| w14 | 0000111 | +0.9317 + 0.0939i |
| w15 | 0000111 | +0.7729 + 0.0813i |
| w16 | 0001000 | −1.2537 − 1.0045i |
| w17 | 0001000 | −0.2443 − 0.2114i |
| w18 | 0001001 | −0.7404 − 0.6074i |
| w19 | 0001001 | −0.6039 − 0.5118i |
| w20 | 0001010 | −1.5761 − 0.1512i |
| w21 | 0001010 | −0.2545 − 0.0723i |
| w22 | 0001011 | −0.9317 − 0.0939i |

| w index | bit label | Constellation point |
|---|---|---|
| w23 | 0001011 | −0.7729 − 0.0813i |
| w24 | 0001100 | +1.2537 − 1.0045i |
| w25 | 0001100 | +0.2443 − 0.2114i |
| w26 | 0001101 | +0.7404 − 0.6074i |
| w27 | 0001101 | +0.6039 − 0.5118i |
| w28 | 0001110 | +1.5761 − 0.1512i |
| w29 | 0001110 | +0.2545 − 0.0723i |
| w30 | 0001111 | +0.9317 − 0.0939i |
| w31 | 0001111 | +0.7729 − 0.0813i |
| w32 | 0010000 | −1.0376 + 1.2347i |
| w33 | 0010000 | −0.0940 + 0.2611i |
| w34 | 0010001 | −0.6205 + 0.7476i |
| w35 | 0010001 | −0.5048 + 0.6321i |
| w36 | 0010010 | −0.1632 + 1.6163i |
| w37 | 0010010 | −0.0734 + 0.0858i |
| w38 | 0010011 | −0.1006 + 0.9948i |
| w39 | 0010011 | −0.0848 + 0.8427i |
| w40 | 0010100 | +1.0376 + 1.2347i |
| w41 | 0010100 | +0.0940 + 0.2611i |
| w42 | 0010101 | +0.6205 + 0.7476i |
| w43 | 0010101 | +0.5048 + 0.6321i |
| w44 | 0010110 | +0.1632 + 1.6163i |
| w45 | 0010110 | +0.0734 + 0.0858i |
| w46 | 0010111 | +0.1006 + 0.9948i |
| w47 | 0010111 | +0.0848 + 0.8427i |
| w48 | 0011000 | −1.0376 − 1.2347i |
| w49 | 0011000 | −0.0940 − 0.2611i |
| w50 | 0011001 | −0.6205 − 0.7476i |
| w51 | 0011001 | −0.5048 − 0.6321i |
| w52 | 0011010 | −0.1632 − 1.6163i |
| w53 | 0011010 | −0.0734 − 0.0858i |
| w54 | 0011011 | −0.1006 − 0.9948i |
| w55 | 0011011 | −0.0848 − 0.8427i |
| w56 | 0011100 | +1.0376 − 1.2347i |
| w57 | 0011100 | +0.0940 − 0.2611i |
| w58 | 0011101 | +0.6205 − 0.7476i |
| w59 | 0011101 | +0.5048 − 0.6321i |
| w60 | 0011110 | +0.1632 − 1.6163i |
| w61 | 0011110 | +0.0734 − 0.0858i |
| w62 | 0011111 | +0.1006 − 0.9948i |
| w63 | 0011111 | +0.0848 − 0.8427i |
| w64 | 01000000 | −1.4164 + 0.7386i |
| w65 | 01000001 | −0.2508 + 0.2043i |
| w66 | 01000010 | −0.8324 + 0.4499i |
| w67 | 01000011 | −0.6808 + 0.3821i |
| w68 | 01000100 | −1.5251 + 0.4510i |
| w69 | 01000101 | −0.2566 + 0.0761i |
| w70 | 01000110 | −0.8975 + 0.2781i |
| w71 | 01000111 | −0.7412 + 0.2345i |
| w72 | 01001000 | +1.4164 + 0.7386i |
| w73 | 01001001 | +0.2508 + 0.2043i |
| w74 | 01001010 | +0.8324 + 0.4499i |
| w75 | 01001011 | +0.6808 + 0.3821i |
| w76 | 01001100 | +1.5251 + 0.4510i |
| w77 | 01001101 | +0.2566 + 0.0761i |
| w78 | 01001110 | +0.8975 + 0.2781i |
| w79 | 01001111 | +0.7412 + 0.2345i |
| w80 | 01010000 | −1.4164 − 0.7386i |
| w81 | 01010001 | −0.2508 − 0.2043i |
| w82 | 01010010 | −0.8324 − 0.4499i |
| w83 | 01010011 | −0.6808 − 0.3821i |
| w84 | 01010100 | −1.5251 − 0.4510i |
| w85 | 01010101 | −0.2566 − 0.0761i |
| w86 | 01010110 | −0.8975 − 0.2781i |
| w87 | 01010111 | −0.7412 − 0.2345i |
| w88 | 01011000 | +1.4164 − 0.7386i |
| w89 | 01011001 | +0.2508 − 0.2043i |
| w90 | 01011010 | +0.8324 − 0.4499i |
| w91 | 01011011 | +0.6808 − 0.3821i |
| w92 | 01011100 | +1.5251 − 0.4510i |
| w93 | 01011101 | +0.2566 − 0.0761i |
| w94 | 01011110 | +0.8975 − 0.2781i |
| w95 | 01011111 | +0.7412 − 0.2345i |
| w96 | 01100000 | −0.7769 + 1.4193i |
| w97 | 01100001 | −0.0898 + 0.2628i |
| w98 | 01100010 | −0.4711 + 0.8645i |
| w99 | 01100011 | −0.3892 + 0.7279i |
| w100 | 01100100 | −0.4813 + 1.5486i |
| w101 | 01100101 | −0.0722 + 0.0860i |
| w102 | 01100110 | −0.2955 + 0.9492i |
| w103 | 01100111 | −0.2443 + 0.8036i |
| w104 | 01101000 | +0.7769 + 1.4193i |
| w105 | 01101001 | +0.0898 + 0.2628i |
| w106 | 01101010 | +0.4711 + 0.8645i |
| w107 | 01101011 | +0.3892 + 0.7279i |
| w108 | 01101100 | +0.4813 + 1.5486i |
| w109 | 01101101 | +0.0722 + 0.0860i |
| w110 | 01101110 | +0.2955 + 0.9492i |
| w111 | 01101111 | +0.2443 + 0.8036i |
| w112 | 01110000 | −0.7769 − 1.4193i |
| w113 | 01110001 | −0.0898 − 0.2628i |
| w114 | 01110010 | −0.4711 − 0.8645i |
| w115 | 01110011 | −0.3892 − 0.7279i |
| w116 | 01110100 | −0.4813 − 1.5486i |
| w117 | 01110101 | −0.0722 − 0.0860i |
| w118 | 01110110 | −0.2955 − 0.9492i |
| w119 | 01110111 | −0.2443 − 0.8036i |
| w120 | 01111000 | +0.7769 − 1.4193i |
| w121 | 01111001 | +0.0898 − 0.2628i |
| w122 | 01111010 | +0.4711 − 0.8645i |
| w123 | 01111011 | +0.3892 − 0.7279i |
| w124 | 01111100 | +0.4813 − 1.5486i |
| w125 | 01111101 | +0.0722 − 0.0860i |
| w126 | 01111110 | +0.2955 − 0.9492i |
| w127 | 01111111 | +0.2443 − 0.8036i |
| w128 | 10000000 | −1.0508 + 0.8392i |
| w129 | 10000001 | −0.3516 + 0.3079i |
| w130 | 10000010 | −0.8852 + 0.7128i |
| w131 | 10000011 | −0.4734 + 0.4145i |
| w132 | 10000100 | −1.3158 + 0.1269i |
| w133 | 10000101 | −0.4512 + 0.0729i |
| w134 | 10000110 | −1.1073 + 0.1093i |
| w135 | 10000111 | −0.6187 + 0.0756i |
| w136 | 10001000 | +1.0508 + 0.8392i |
| w137 | 10001001 | +0.3516 + 0.3079i |
| w138 | 10001010 | +0.8852 + 0.7128i |
| w139 | 10001011 | +0.4734 + 0.4145i |
| w140 | 10001100 | +1.3158 + 0.1269i |
| w141 | 10001101 | +0.4512 + 0.0729i |
| w142 | 10001110 | +1.1073 + 0.1093i |
| w143 | 10001111 | +0.6187 + 0.0756i |
| w144 | 10010000 | −1.0508 − 0.8392i |
| w145 | 10010001 | −0.3516 − 0.3079i |
| w146 | 10010010 | −0.8852 − 0.7128i |
| w147 | 10010011 | −0.4734 − 0.4145i |
| w148 | 10010100 | −1.3158 − 0.1269i |
| w149 | 10010101 | −0.4512 − 0.0729i |
| w150 | 10010110 | −1.1073 − 0.1093i |
| w151 | 10010111 | −0.6187 − 0.0756i |
| w152 | 10011000 | +1.0508 − 0.8392i |
| w153 | 10011001 | +0.3516 − 0.3079i |
| w154 | 10011010 | +0.8852 − 0.7128i |
| w155 | 10011011 | +0.4734 − 0.4145i |
| w156 | 10011100 | +1.3158 − 0.1269i |
| w157 | 10011101 | +0.4512 − 0.0729i |
| w158 | 10011110 | +1.1073 − 0.1093i |
| w159 | 10011111 | +0.6187 − 0.0756i |
| w160 | 10100000 | −0.8734 + 1.0335i |
| w161 | 10100001 | −0.2145 + 0.4159i |
| w162 | 10100010 | −0.7384 + 0.8777i |
| w163 | 10100011 | −0.3752 + 0.5265i |
| w164 | 10100100 | −0.1381 + 1.3596i |
| w165 | 10100101 | −0.0693 + 0.5212i |
| w166 | 10100110 | −0.1180 + 1.1596i |
| w167 | 10100111 | −0.0788 + 0.6933i |
| w168 | 10101000 | +0.8734 + 1.0335i |
| w169 | 10101001 | +0.2145 + 0.4159i |
| w170 | 10101010 | +0.7384 + 0.8777i |
| w171 | 10101011 | +0.3752 + 0.5265i |
| w172 | 10101100 | +0.1381 + 1.3596i |
| w173 | 10101101 | +0.0693 + 0.5212i |
| w174 | 10101110 | +0.1180 + 1.1596i |
| w175 | 10101111 | +0.0788 + 0.6933i |
| w176 | 10110000 | −0.8734 − 1.0335i |

-continued

| w index | bit label | Constellation point |
|---|---|---|
| w177 | 10110001 | −0.2145 − 0.4159i |
| w178 | 10110010 | −0.7384 − 0.8777i |
| w179 | 10110011 | −0.3752 − 0.5265i |
| w180 | 10110100 | −0.1381 − 1.3596i |
| w181 | 10110101 | −0.0693 − 0.5212i |
| w182 | 10110110 | −0.1180 − 1.1596i |
| w183 | 10110111 | −0.0788 − 0.6933i |
| w184 | 10111000 | +0.8734 − 1.0335i |
| w185 | 10111001 | +0.2145 − 0.4159i |
| w186 | 10111010 | +0.7384 − 0.8777i |
| w187 | 10111011 | +0.3752 − 0.5265i |
| w188 | 10111100 | +0.1381 − 1.3596i |
| w189 | 10111101 | +0.0693 − 0.5212i |
| w190 | 10111110 | +0.1180 − 1.1596i |
| w191 | 10111111 | +0.0788 − 0.6933i |
| w192 | 11000000 | −1.1844 + 0.6172i |
| w193 | 11000001 | −0.3812 + 0.2673i |
| w194 | 11000010 | −0.9957 + 0.5259i |
| w195 | 11000011 | −0.5340 + 0.3230i |
| w196 | 11000100 | −1.2728 + 0.3773i |
| w197 | 11000101 | −0.4434 + 0.1145i |
| w198 | 11000110 | −1.0701 + 0.3230i |
| w199 | 11000111 | −0.5946 + 0.1815i |
| w200 | 11001000 | +1.1844 + 0.6172i |
| w201 | 11001001 | +0.3812 + 0.2673i |
| w202 | 11001010 | +0.9957 + 0.5259i |
| w203 | 11001011 | +0.5340 + 0.3230i |
| w204 | 11001100 | +1.2728 + 0.3773i |
| w205 | 11001101 | +0.4434 + 0.1145i |
| w206 | 11001110 | +1.0701 + 0.3230i |
| w207 | 11001111 | +0.5946 + 0.1815i |
| w208 | 11010000 | −1.1844 − 0.6172i |
| w209 | 11010001 | −0.3812 − 0.2673i |
| w210 | 11010010 | −0.9957 − 0.5259i |
| w211 | 11010011 | −0.5340 − 0.3230i |
| w212 | 11010100 | −1.2728 − 0.3773i |
| w213 | 11010101 | −0.4434 − 0.1145i |
| w214 | 11010110 | −1.0701 − 0.3230i |
| w215 | 11010111 | −0.5946 − 0.1815i |
| w216 | 11011000 | +1.1844 − 0.6172i |
| w217 | 11011001 | +0.3812 − 0.2673i |
| w218 | 11011010 | +0.9957 − 0.5259i |
| w219 | 11011011 | +0.5340 − 0.3230i |
| w220 | 11011100 | +1.2728 − 0.3773i |
| w221 | 11011101 | +0.4434 − 0.1145i |
| w222 | 11011110 | +1.0701 − 0.3230i |
| w223 | 11011111 | +0.5946 − 0.1815i |
| w224 | 11100000 | −0.6562 + 1.1905i |
| w225 | 11100001 | −0.1928 + 0.4287i |
| w226 | 11100010 | −0.5570 + 1.0128i |
| w227 | 11100011 | −0.3076 + 0.5885i |
| w228 | 11100100 | −0.4076 + 1.3018i |
| w229 | 11100101 | −0.0896 + 0.5118i |
| w230 | 11100110 | −0.3468 + 1.1091i |
| w231 | 11100111 | −0.1793 + 0.6649i |
| w232 | 11101000 | +0.6562 + 1.1905i |
| w233 | 11101001 | +0.1928 + 0.4287i |
| w234 | 11101010 | +0.5570 + 1.0128i |
| w235 | 11101011 | +0.3076 + 0.5885i |
| w236 | 11101100 | +0.4076 + 1.3018i |
| w237 | 11101101 | +0.0896 + 0.5118i |
| w238 | 11101110 | +0.3468 + 1.1091i |
| w239 | 11101111 | +0.1793 + 0.6649i |
| w240 | 11110000 | −0.6562 − 1.1905i |
| w241 | 11110001 | −0.1928 − 0.4287i |
| w242 | 11110010 | −0.5570 − 1.0128i |
| w243 | 11110011 | −0.3076 − 0.5885i |
| w244 | 11110100 | −0.4076 − 1.3018i |
| w245 | 11110101 | −0.0896 − 0.5118i |
| w246 | 11110110 | −0.3468 − 1.1091i |
| w247 | 11110111 | −0.1793 − 0.6649i |
| w248 | 11111000 | +0.6562 − 1.1905i |
| w249 | 11111001 | +0.1928 − 0.4287i |
| w250 | 11111010 | +0.5570 − 1.0128i |
| w251 | 11111011 | +0.3076 − 0.5885i |
| w252 | 11111100 | +0.4076 − 1.3018i |
| w253 | 11111101 | +0.0896 − 0.5118i |
| w254 | 11111110 | +0.3468 − 1.1091i |
| w255 | 11111111 | +0.1793 − 0.6649i | for R=3/4 (or R=1/2, 5/8 or 13/16):

| w index | bit label | Constellation point |
|---|---|---|
| w0 | 0000000 | −0.5115 + 1.2063i |
| w1 | 0000000 | −0.5115 − 1.2063i |
| w2 | 0000001 | −0.3049 + 1.2378i |
| w3 | 0000001 | −0.3049 − 1.2378i |
| w4 | 0000010 | +0.5115 + 1.2063i |
| w5 | 0000010 | +0.5115 − 1.2063i |
| w6 | 0000011 | +0.3049 + 1.2378i |
| w7 | 0000011 | +0.3049 − 1.2378i |
| w8 | 0000100 | −0.4952 + 1.0059i |
| w9 | 0000100 | −0.4952 − 1.0059i |
| w10 | 0000101 | −0.3032 + 1.0518i |
| w11 | 0000101 | −0.3032 − 1.0518i |
| w12 | 0000110 | +0.4952 + 1.0059i |
| w13 | 0000110 | +0.4952 − 1.0059i |
| w14 | 0000111 | +0.3032 + 1.0518i |
| w15 | 0000111 | +0.3032 − 1.0518i |
| w16 | 0001000 | −1.1670 + 1.1014i |
| w17 | 0001000 | −1.1670 − 1.1014i |
| w18 | 0001001 | −0.1010 + 1.2545i |
| w19 | 0001001 | −0.1010 − 1.2545i |
| w20 | 0001010 | +1.1670 + 1.1014i |
| w21 | 0001010 | +1.1670 − 1.1014i |
| w22 | 0001011 | +0.1010 + 1.2545i |
| w23 | 0001011 | +0.1010 − 1.2545i |
| w24 | 0001100 | −1.2421 + 0.8557i |
| w25 | 0001100 | −1.2421 − 0.8557i |
| w26 | 0001101 | −0.0956 + 1.0676i |
| w27 | 0001101 | −0.0956 − 1.0676i |
| w28 | 0001110 | +1.2421 + 0.8557i |
| w29 | 0001110 | +1.2421 − 0.8557i |
| w30 | 0001111 | +0.0956 + 1.0676i |
| w31 | 0001111 | +0.0956 − 1.0676i |
| w32 | 0010000 | −0.6286 + 0.6639i |
| w33 | 0010000 | −0.6286 − 0.6639i |
| w34 | 0010001 | −0.4729 + 0.6321i |
| w35 | 0010001 | −0.4729 − 0.6321i |
| w36 | 0010010 | +0.6286 + 0.6639i |
| w37 | 0010010 | +0.6286 − 0.6639i |
| w38 | 0010011 | +0.4729 + 0.6321i |
| w39 | 0010011 | +0.4729 − 0.6321i |
| w40 | 0010100 | −0.5851 + 0.8353i |
| w41 | 0010100 | −0.5851 − 0.8353i |
| w42 | 0010101 | −0.4392 + 0.7880i |
| w43 | 0010101 | −0.4392 − 0.7880i |
| w44 | 0010110 | +0.5851 + 0.8353i |
| w45 | 0010110 | +0.5851 − 0.8353i |
| w46 | 0010111 | +0.4392 + 0.7880i |
| w47 | 0010111 | +0.4392 − 0.7880i |
| w48 | 0011000 | −1.2110 + 0.5795i |
| w49 | 0011000 | −1.2110 − 0.5795i |
| w50 | 0011001 | −0.0690 + 0.5518i |
| w51 | 0011001 | −0.0690 − 0.5518i |
| w52 | 0011010 | +1.2110 + 0.5795i |
| w53 | 0011010 | +1.2110 − 0.5795i |
| w54 | 0011011 | +0.0690 + 0.5518i |
| w55 | 0011011 | +0.0690 − 0.5518i |
| w56 | 0011100 | −1.4215 + 0.6637i |
| w57 | 0011100 | −1.4215 − 0.6637i |
| w58 | 0011101 | −0.0552 + 0.6903i |
| w59 | 0011101 | −0.0552 − 0.6903i |
| w60 | 0011110 | +1.4215 + 0.6637i |
| w61 | 0011110 | +1.4215 − 0.6637i |
| w62 | 0011111 | +0.0552 + 0.6903i |
| w63 | 0011111 | +0.0552 − 0.6903i |
| w64 | 01000000 | −0.6596 + 0.0715i |
| w65 | 01000001 | −0.6596 − 0.0715i |
| w66 | 01000010 | −0.5124 + 0.0667i |
| w67 | 01000011 | −0.5124 − 0.0667i |

-continued

| w index | bit label | Constellation point |
|---|---|---|
| w68 | 01000100 | +0.6596 + 0.0715i |
| w69 | 01000101 | +0.6596 − 0.0715i |
| w70 | 01000110 | +0.5124 + 0.0667i |
| w71 | 01000111 | +0.5124 − 0.0667i |
| w72 | 01001000 | −0.6597 + 0.2116i |
| w73 | 01001001 | −0.6597 − 0.2116i |
| w74 | 01001010 | −0.5095 + 0.2008i |
| w75 | 01001011 | −0.5095 − 0.2008i |
| w76 | 01001100 | +0.6597 + 0.2116i |
| w77 | 01001101 | +0.6597 − 0.2116i |
| w78 | 01001110 | +0.5095 + 0.2008i |
| w79 | 01001111 | +0.5095 − 0.2008i |
| w80 | 01010000 | −1.4366 + 0.1213i |
| w81 | 01010001 | −1.4366 − 0.1213i |
| w82 | 01010010 | −0.0739 + 0.0596i |
| w83 | 01010011 | −0.0739 − 0.0596i |
| w84 | 01010100 | +1.4366 + 0.1213i |
| w85 | 01010101 | +1.4366 − 0.1213i |
| w86 | 01010110 | +0.0739 + 0.0596i |
| w87 | 01010111 | +0.0739 − 0.0596i |
| w88 | 01011000 | −1.2098 + 0.1077i |
| w89 | 01011001 | −1.2098 − 0.1077i |
| w90 | 01011010 | −0.0731 + 0.1767i |
| w91 | 01011011 | −0.0731 − 0.1767i |
| w92 | 01011100 | +1.2098 + 0.1077i |
| w93 | 01011101 | +1.2098 − 0.1077i |
| w94 | 01011110 | +0.0731 + 0.1767i |
| w95 | 01011111 | +0.0731 − 0.1767i |
| w96 | 01100000 | −0.6467 + 0.5036i |
| w97 | 01100001 | −0.6467 − 0.5036i |
| w98 | 01100010 | −0.4946 + 0.4818i |
| w99 | 01100011 | −0.4946 − 0.4818i |
| w100 | 01100100 | +0.6467 + 0.5036i |
| w101 | 01100101 | +0.6467 − 0.5036i |
| w102 | 01100110 | +0.4946 + 0.4818i |
| w103 | 01100111 | +0.4946 − 0.4818i |
| w104 | 01101000 | −0.6572 + 0.3526i |
| w105 | 01101001 | −0.6572 − 0.3526i |
| w106 | 01101010 | −0.5050 + 0.3380i |
| w107 | 01101011 | −0.5050 − 0.3380i |
| w108 | 01101100 | +0.6572 + 0.3526i |
| w109 | 01101101 | +0.6572 − 0.3526i |
| w110 | 01101110 | +0.5050 + 0.3380i |
| w111 | 01101111 | +0.5050 − 0.3380i |
| w112 | 01110000 | −1.4264 + 0.3764i |
| w113 | 01110001 | −1.4264 − 0.3764i |
| w114 | 01110010 | −0.0715 + 0.4218i |
| w115 | 01110011 | −0.0715 − 0.4218i |
| w116 | 01110100 | +1.4264 + 0.3764i |
| w117 | 01110101 | +1.4264 − 0.3764i |
| w118 | 01110110 | +0.0715 + 0.4218i |
| w119 | 01110111 | +0.0715 − 0.4218i |
| w120 | 01111000 | −1.2130 + 0.3237i |
| w121 | 01111001 | −1.2130 − 0.3237i |
| w122 | 01111010 | −0.0725 + 0.2978i |
| w123 | 01111011 | −0.0725 − 0.2978i |
| w124 | 01111100 | +1.2130 + 0.3237i |
| w125 | 01111101 | +1.2130 − 0.3237i |
| w126 | 01111110 | +0.0725 + 0.2978i |
| w127 | 01111111 | +0.0725 − 0.2978i |
| w128 | 10000000 | −0.5901 + 1.4171i |
| w129 | 10000001 | −0.5901 − 1.4171i |
| w130 | 10000010 | −0.3511 + 1.4584i |
| w131 | 10000011 | −0.3511 − 1.4584i |
| w132 | 10000100 | +0.5901 + 1.4171i |
| w133 | 10000101 | +0.5901 − 1.4171i |
| w134 | 10000110 | +0.3511 + 1.4584i |
| w135 | 10000111 | +0.3511 − 1.4584i |
| w136 | 10001000 | −0.6935 + 1.0466i |
| w137 | 10001001 | −0.6935 − 1.0466i |
| w138 | 10001010 | −0.2603 + 0.9107i |
| w139 | 10001011 | −0.2603 − 0.9107i |
| w140 | 10001100 | +0.6935 + 1.0466i |
| w141 | 10001101 | +0.6935 − 1.0466i |
| w142 | 10001110 | +0.2603 + 0.9107i |
| w143 | 10001111 | +0.2603 − 0.9107i |
| w144 | 10010000 | −0.8039 + 1.2957i |
| w145 | 10010001 | −0.8039 − 1.2957i |
| w146 | 10010010 | −0.1167 + 1.4782i |
| w147 | 10010011 | −0.1167 − 1.4782i |
| w148 | 10010100 | +0.8039 + 1.2957i |
| w149 | 10010101 | +0.8039 − 1.2957i |
| w150 | 10010110 | +0.1167 + 1.4782i |
| w151 | 10010111 | +0.1167 − 1.4782i |
| w152 | 10011000 | −0.8956 + 1.0881i |
| w153 | 10011001 | −0.8956 − 1.0881i |
| w154 | 10011010 | −0.0882 + 0.8981i |
| w155 | 10011011 | −0.0882 − 0.8981i |
| w156 | 10011100 | +0.8956 + 1.0881i |
| w157 | 10011101 | +0.8956 − 1.0881i |
| w158 | 10011110 | +0.0882 + 0.8981i |
| w159 | 10011111 | +0.0882 − 0.8981i |
| w160 | 10100000 | −0.8022 + 0.6879i |
| w161 | 10100001 | −0.8022 − 0.6879i |
| w162 | 10100010 | −0.3274 + 0.6045i |
| w163 | 10100011 | −0.3274 − 0.6045i |
| w164 | 10100100 | +0.8022 + 0.6879i |
| w165 | 10100101 | +0.8022 − 0.6879i |
| w166 | 10100110 | +0.3274 + 0.6045i |
| w167 | 10100111 | +0.3274 − 0.6045i |
| w168 | 10101000 | −0.7622 + 0.8634i |
| w169 | 10101001 | −0.7622 − 0.8634i |
| w170 | 10101010 | −0.2965 + 0.7629i |
| w171 | 10101011 | −0.2965 − 0.7629i |
| w172 | 10101100 | +0.7622 + 0.8634i |
| w173 | 10101101 | +0.7622 − 0.8634i |
| w174 | 10101110 | +0.2965 + 0.7629i |
| w175 | 10101111 | +0.2965 − 0.7629i |
| w176 | 10110000 | −1.0082 + 0.6930i |
| w177 | 10110001 | −1.0082 − 0.6930i |
| w178 | 10110010 | −0.1987 + 0.5742i |
| w179 | 10110011 | −0.1987 − 0.5742i |
| w180 | 10110100 | +1.0082 + 0.6930i |
| w181 | 10110101 | +1.0082 − 0.6930i |
| w182 | 10110110 | +0.1987 + 0.5742i |
| w183 | 10110111 | +0.1987 − 0.5742i |
| w184 | 10111000 | −0.9647 + 0.8849i |
| w185 | 10111001 | −0.9647 − 0.8849i |
| w186 | 10111010 | −0.1564 + 0.7374i |
| w187 | 10111011 | −0.1564 − 0.7374i |
| w188 | 10111100 | +0.9647 + 0.8849i |
| w189 | 10111101 | +0.9647 − 0.8849i |
| w190 | 10111110 | +0.1564 + 0.7374i |
| w191 | 10111111 | +0.1564 − 0.7374i |
| w192 | 11000000 | −0.8131 + 0.0729i |
| w193 | 11000001 | −0.8131 − 0.0729i |
| w194 | 11000010 | −0.3658 + 0.0625i |
| w195 | 11000011 | −0.3658 − 0.0625i |
| w196 | 11000100 | +0.8131 + 0.0729i |
| w197 | 11000101 | +0.8131 − 0.0729i |
| w198 | 11000110 | +0.3658 + 0.0625i |
| w199 | 11000111 | +0.3658 − 0.0625i |
| w200 | 11001000 | −0.8246 + 0.2158i |
| w201 | 11001001 | −0.8246 − 0.2158i |
| w202 | 11001010 | −0.3642 + 0.1899i |
| w203 | 11001011 | −0.3642 − 0.1899i |
| w204 | 11001100 | +0.8246 + 0.2158i |
| w205 | 11001101 | +0.8246 − 0.2158i |
| w206 | 11001110 | +0.3642 + 0.1899i |
| w207 | 11001111 | +0.3642 − 0.1899i |
| w208 | 11010000 | −0.9801 + 0.0651i |
| w209 | 11010001 | −0.9801 − 0.0651i |
| w210 | 11010010 | −0.2198 + 0.0612i |
| w211 | 11010011 | −0.2198 − 0.0612i |
| w212 | 11010100 | +0.9801 + 0.0651i |
| w213 | 11010101 | +0.9801 − 0.0651i |
| w214 | 11010110 | +0.2198 + 0.0612i |
| w215 | 11010111 | +0.2198 − 0.0612i |
| w216 | 11011000 | −1.0115 + 0.2009i |
| w217 | 11011001 | −1.0115 − 0.2009i |
| w218 | 11011010 | −0.2192 + 0.1815i |
| w219 | 11011011 | −0.2192 − 0.1815i |
| w220 | 11011100 | +1.0115 + 0.2009i |
| w221 | 11011101 | +1.0115 − 0.2009i |

-continued

| w index | bit label | Constellation point |
|---|---|---|
| w222 | 11011110 | +0.2192 + 0.1815i |
| w223 | 11011111 | +0.2192 − 0.1815i |
| w224 | 11100000 | −0.8086 − 0.5185i |
| w225 | 11100001 | −0.8086 − 0.5185i |
| w226 | 11100010 | −0.3499 + 0.4571i |
| w227 | 11100011 | −0.3499 − 0.4571i |
| w228 | 11100100 | +0.8086 + 0.5185i |
| w229 | 11100101 | +0.8086 − 0.5185i |
| w230 | 11100110 | +0.3499 + 0.4571i |
| w231 | 11100111 | +0.3499 − 0.4571i |
| w232 | 11101000 | −0.8245 + 0.3593i |
| w233 | 11101001 | −0.8245 − 0.3593i |
| w234 | 11101010 | −0.3599 + 0.3216i |
| w235 | 11101011 | −0.3599 − 0.3216i |
| w236 | 11101100 | +0.8245 + 0.3593i |
| w237 | 11101101 | +0.8245 − 0.3593i |
| w238 | 11101110 | +0.3599 + 0.3216i |
| w239 | 11101111 | +0.3599 − 0.3216i |
| w240 | 11110000 | −0.9814 + 0.5205i |
| w241 | 11110001 | −0.9814 − 0.5205i |
| w242 | 11110010 | −0.2115 + 0.4337i |
| w243 | 11110011 | −0.2115 − 0.4337i |
| w244 | 11110100 | +0.9814 + 0.5205i |
| w245 | 11110101 | +0.9814 − 0.5205i |
| w246 | 11110110 | +0.2115 + 0.4337i |
| w247 | 11110111 | +0.2115 − 0.4337i |
| w248 | 11111000 | −1.0163 + 0.3615i |
| w249 | 11111001 | −1.0163 − 0.3615i |
| w250 | 11111010 | −0.2167 + 0.3057i |
| w251 | 11111011 | −0.2167 − 0.3057i |
| w252 | 11111100 | +1.0163 + 0.3615i |
| w253 | 11111101 | +1.0163 − 0.3615i |
| w254 | 11111110 | +0.2167 + 0.3057i |
| w255 | 11111111 | +0.2167 − 0.3057i | for R=13/16 (or R=1/2, 5/8 or 3/4):

| w index | bit label | Constellation point |
|---|---|---|
| w0 | 0000000 | −0.4934 + 1.1976i |
| w1 | 0000000 | −0.6474 + 0.6881i |
| w2 | 0000001 | −0.6614 + 0.0730i |
| w3 | 0000001 | −0.6545 + 0.5220i |
| w4 | 0000010 | −0.4787 + 1.0113i |
| w5 | 0000010 | −0.6010 + 0.8566i |
| w6 | 0000011 | −0.6676 + 0.2192i |
| w7 | 0000011 | −0.6674 + 0.3672i |
| w8 | 0000100 | −1.1592 + 1.0404i |
| w9 | 0000100 | −1.1898 + 0.5538i |
| w10 | 0000101 | −1.3908 + 0.1102i |
| w11 | 0000101 | −1.4081 + 0.3370i |
| w12 | 0000110 | −1.2410 + 0.8061i |
| w13 | 0000110 | −1.3911 + 0.5975i |
| w14 | 0000111 | −1.1855 + 0.1041i |
| w15 | 0000111 | −1.2043 + 0.3138i |
| w16 | 0001000 | −0.2985 + 1.2655i |
| w17 | 0001000 | −0.4920 + 0.6512i |
| w18 | 0001001 | −0.5130 + 0.0697i |
| w19 | 0001001 | −0.5045 + 0.4981i |
| w20 | 0001010 | −0.2876 + 1.0856i |
| w21 | 0001010 | −0.4556 + 0.8064i |
| w22 | 0001011 | −0.5147 + 0.2097i |
| w23 | 0001011 | −0.5132 + 0.3515i |
| w24 | 0001100 | −0.0980 + 1.2511i |
| w25 | 0001100 | −0.0701 + 0.5794i |
| w26 | 0001101 | −0.0734 + 0.0629i |
| w27 | 0001101 | −0.0724 + 0.4460i |
| w28 | 0001110 | −0.0934 + 1.0735i |
| w29 | 0001110 | −0.0582 + 0.7208i |
| w30 | 0001111 | −0.0734 + 0.1890i |
| w31 | 0001111 | −0.0731 + 0.3164i |
| w32 | 0010000 | −0.5534 + 1.3936i |
| w33 | 0010000 | −0.8188 + 0.7082i |
| w34 | 0010001 | −0.8139 + 0.0752i |
| w35 | 0010001 | −0.8096 + 0.5376i |

-continued

| w index | bit label | Constellation point |
|---|---|---|
| w36 | 0010010 | −0.6787 + 1.0583i |
| w37 | 0010010 | −0.7729 + 0.8860i |
| w38 | 0010011 | −0.8305 + 0.2250i |
| w39 | 0010011 | −0.8315 + 0.3759i |
| w40 | 0010100 | −0.7567 + 1.2808i |
| w41 | 0010100 | −1.0161 + 0.7012i |
| w42 | 0010101 | −0.9757 + 0.0702i |
| w43 | 0010101 | −0.9739 + 0.5345i |
| w44 | 0010110 | −0.8952 + 1.0953i |
| w45 | 0010110 | −0.9646 + 0.8865i |
| w46 | 0010111 | −1.0091 + 0.2141i |
| w47 | 0010111 | −1.0164 + 0.3745i |
| w48 | 0011000 | −0.3350 + 1.4701i |
| w49 | 0011000 | −0.3446 + 0.6254i |
| w50 | 0011001 | −0.3664 + 0.0666i |
| w51 | 0011001 | −0.3586 + 0.4775i |
| w52 | 0011010 | −0.2713 + 0.9300i |
| w53 | 0011010 | −0.3149 + 0.7791i |
| w54 | 0011011 | −0.3666 + 0.2005i |
| w55 | 0011011 | −0.3649 + 0.3365i |
| w56 | 0011100 | −0.1095 + 1.4559i |
| w57 | 0011100 | −0.2067 + 0.6018i |
| w58 | 0011101 | −0.2200 + 0.0642i |
| w59 | 0011101 | −0.2160 + 0.4587i |
| w60 | 0011110 | −0.0910 + 0.9104i |
| w61 | 0011110 | −0.1761 + 0.7590i |
| w62 | 0011111 | −0.2199 + 0.1932i |
| w63 | 0011111 | −0.2191 + 0.3239i |
| w64 | 01000000 | −0.4934 − 1.1976i |
| w65 | 01000001 | −0.6474 − 0.6881i |
| w66 | 01000010 | −0.6614 − 0.0730i |
| w67 | 01000011 | −0.6645 − 0.5220i |
| w68 | 01000100 | −0.4787 − 1.0113i |
| w69 | 01000101 | −0.6010 − 0.8556i |
| w70 | 01000110 | −0.6676 − 0.2192i |
| w71 | 01000111 | −0.6674 − 0.3672i |
| w72 | 01001000 | −1.1592 − 1.0404i |
| w73 | 01001001 | −1.1898 − 0.5538i |
| w74 | 01001010 | −1.3908 − 0.1102i |
| w75 | 01001011 | −1.4081 − 0.3370i |
| w76 | 01001100 | −1.2410 − 0.8061i |
| w77 | 01001101 | −1.3911 − 0.5975i |
| w78 | 01001110 | −1.1855 − 0.1041i |
| w79 | 01001111 | −1.2043 − 0.3138i |
| w80 | 01010000 | −0.2985 − 1.2655i |
| w81 | 01010001 | −0.4920 − 0.6512i |
| w82 | 01010010 | −0.5130 − 0.0697i |
| w83 | 01010011 | −0.5045 − 0.4981i |
| w84 | 01010100 | −0.2876 − 1.0856i |
| w85 | 01010101 | −0.4556 − 0.8064i |
| w86 | 01010110 | −0.5147 − 0.2097i |
| w87 | 01010111 | −0.5132 − 0.3515i |
| w88 | 01011000 | −0.0980 − 1.2511i |
| w89 | 01011001 | −0.0701 − 0.5794i |
| w90 | 01011010 | −0.0734 − 0.0629i |
| w91 | 01011011 | −0.0724 − 0.4460i |
| w92 | 01011100 | −0.0934 − 1.0735i |
| w93 | 01011101 | −0.0582 − 0.7208i |
| w94 | 01011110 | −0.0734 − 0.1890i |
| w95 | 01011111 | −0.0731 − 0.3164i |
| w96 | 01100000 | −0.5534 − 1.3936i |
| w97 | 01100001 | −0.8188 − 0.7082i |
| w98 | 01100010 | −0.8139 − 0.0752i |
| w99 | 01100011 | −0.8096 − 0.5376i |
| w100 | 01100100 | −0.6787 − 1.0583i |
| w101 | 01100101 | −0.7729 − 0.8860i |
| w102 | 01100110 | −0.8305 − 0.2250i |
| w103 | 01100111 | −0.8315 − 0.3759i |
| w104 | 01101000 | −0.7567 − 1.2808i |
| w105 | 01101001 | −1.0161 − 0.7012i |
| w106 | 01101010 | −0.9757 − 0.0702i |
| w107 | 01101011 | −0.9739 − 0.5345i |
| w108 | 01101100 | −0.8952 − 1.0953i |
| w109 | 01101101 | −0.9546 − 0.8865i |
| w110 | 01101110 | −1.0091 − 0.2141i |
| w111 | 01101111 | −1.0164 − 0.3745i |
| w112 | 01110000 | −0.3350 − 1.4701i |

-continued

| w index | bit label | Constellation point |
|---|---|---|
| w113 | 01110001 | −0.3446 − 0.6254i |
| w114 | 01110010 | −0.3664 − 0.0666i |
| w115 | 01110011 | −0.3586 − 0.4775i |
| w116 | 01110100 | −0.2713 − 0.9300i |
| w117 | 01110101 | −0.3149 − 0.7791i |
| w118 | 01110110 | −0.3666 − 0.2005i |
| w119 | 01110111 | −0.3649 − 0.3365i |
| w120 | 01111000 | −0.1095 − 1.4559i |
| w121 | 01111001 | −0.2067 − 0.6018i |
| w122 | 01111010 | −0.2200 − 0.0642i |
| w123 | 01111011 | −0.2160 − 0.4587i |
| w124 | 01111100 | −0.0910 − 0.9104i |
| w125 | 01111101 | −0.1761 − 0.7590i |
| w126 | 01111110 | −0.2199 − 0.1932i |
| w127 | 01111111 | −0.2191 − 0.3239i |
| w128 | 10000000 | +0.4934 + 1.1976i |
| w129 | 10000001 | +0.6474 + 0.6881i |
| w130 | 10000010 | +0.6614 + 0.0730i |
| w131 | 10000011 | +0.6545 + 0.5220i |
| w132 | 10000100 | +0.4787 + 1.0113i |
| w133 | 10000101 | +0.6010 + 0.8566i |
| w134 | 10000110 | +0.6676 + 0.2192i |
| w135 | 10000111 | +0.6674 + 0.3672i |
| w136 | 10001000 | +1.1592 + 1.0404i |
| w137 | 10001001 | +1.1898 + 0.5538i |
| w138 | 10001010 | +1.3908 + 0.1102i |
| w139 | 10001011 | +1.4081 + 0.3370i |
| w140 | 10001100 | +1.2410 + 0.8061i |
| w141 | 10001101 | +1.3911 + 0.5975i |
| w142 | 10001110 | +1.1855 + 0.1041i |
| w143 | 10001111 | +1.2043 + 0.3138i |
| w144 | 10010000 | +0.2985 + 1.2655i |
| w145 | 10010001 | +0.4920 + 0.6512i |
| w146 | 10010010 | +0.5130 + 0.0697i |
| w147 | 10010011 | +0.5045 + 0.4981i |
| w148 | 10010100 | +0.2876 + 1.0856i |
| w149 | 10010101 | +0.4556 + 0.8064i |
| w150 | 10010110 | +0.5147 + 0.2097i |
| w151 | 10010111 | +0.5132 + 0.3515i |
| w152 | 10011000 | +0.0980 + 1.2511i |
| w153 | 10011001 | +0.0701 + 0.5794i |
| w154 | 10011010 | +0.0734 + 0.0629i |
| w155 | 10011011 | +0.0724 + 0.4460i |
| w156 | 10011100 | +0.0934 + 1.0735i |
| w157 | 10011101 | +0.0582 + 0.7208i |
| w158 | 10011110 | +0.0734 + 0.1890i |
| w159 | 10011111 | +0.0731 + 0.3164i |
| w160 | 10100000 | +0.5534 + 1.3936i |
| w161 | 10100001 | +0.8188 + 0.7082i |
| w162 | 10100010 | +0.8139 + 0.0752i |
| w163 | 10100011 | +0.8096 + 0.5376i |
| w164 | 10100100 | +0.6787 + 1.0583i |
| w165 | 10100101 | +0.7729 + 0.8860i |
| w166 | 10100110 | +0.8305 + 0.2250i |
| w167 | 10100111 | +0.8315 + 0.3759i |
| w168 | 10101000 | +0.7567 + 1.2808i |
| w169 | 10101001 | +1.0161 + 0.7012i |
| w170 | 10101010 | +0.9757 + 0.0702i |
| w171 | 10101011 | +0.9739 + 0.5345i |
| w172 | 10101100 | +0.8952 + 1.0953i |
| w173 | 10101101 | +0.9645 + 0.8865i |
| w174 | 10101110 | +1.0091 + 0.2141i |
| w175 | 10101111 | +1.0164 + 0.3745i |
| w176 | 10110000 | +0.3350 + 1.4701i |
| w177 | 10110001 | +0.3446 + 0.6254i |
| w178 | 10110010 | +0.3664 + 0.0666i |
| w179 | 10110011 | +0.3586 + 0.4775i |
| w180 | 10110100 | +0.2713 + 0.9300i |
| w181 | 10110101 | +0.3149 + 0.7791i |
| w182 | 10110110 | +0.3666 + 0.2005i |
| w183 | 10110111 | +0.3649 + 0.3365i |
| w184 | 10111000 | +0.1095 + 1.4559i |
| w185 | 10111001 | +0.2067 + 0.6018i |
| w186 | 10111010 | +0.2200 + 0.0642i |
| w187 | 10111011 | +0.2160 + 0.4587i |
| w188 | 10111100 | +0.0910 + 0.9104i |
| w189 | 10111101 | +0.1761 + 0.7590i |
| w190 | 10111110 | +0.2199 + 0.1932i |
| w191 | 10111111 | +0.2191 + 0.3239i |
| w192 | 11000000 | +0.4934 − 1.1976i |
| w193 | 11000001 | +0.6474 − 0.6881i |
| w194 | 11000010 | +0.6614 − 0.0730i |
| w195 | 11000011 | +0.6545 − 0.5220i |
| w196 | 11000100 | +0.4787 − 1.0113i |
| w197 | 11000101 | +0.6010 − 0.8566i |
| w198 | 11000110 | +0.6676 − 0.2192i |
| w199 | 11000111 | +0.6674 − 0.3672i |
| w200 | 11001000 | +1.1592 − 1.0404i |
| w201 | 11001001 | +1.1898 − 0.5538i |
| w202 | 11001010 | +1.3908 − 0.1102i |
| w203 | 11001011 | +1.4081 − 0.3370i |
| w204 | 11001100 | +1.2410 − 0.8061i |
| w205 | 11001101 | +1.3911 − 0.5975i |
| w206 | 11001110 | +1.1855 − 0.1041i |
| w207 | 11001111 | +1.2043 − 0.3138i |
| w208 | 11010000 | +0.2985 − 1.2655i |
| w209 | 11010001 | +0.4920 − 0.6512i |
| w210 | 11010010 | +0.5130 − 0.0697i |
| w211 | 11010011 | +0.5045 − 0.4981i |
| w212 | 11010100 | +0.2876 − 1.0856i |
| w213 | 11010101 | +0.4556 − 0.8064i |
| w214 | 11010110 | +0.5147 − 0.2097i |
| w215 | 11010111 | +0.5132 − 0.3515i |
| w216 | 11011000 | +0.0980 − 1.2511i |
| w217 | 11011001 | +0.0701 − 0.5794i |
| w218 | 11011010 | +0.0734 − 0.0629i |
| w219 | 11011011 | +0.0724 − 0.4460i |
| w220 | 11011100 | +0.0934 − 1.0735i |
| w221 | 11011101 | +0.0582 − 0.7208i |
| w222 | 11011110 | +0.0734 − 0.1890i |
| w223 | 11011111 | +0.0731 − 0.3164i |
| w224 | 11100000 | +0.5534 − 1.3936i |
| w225 | 11100001 | +0.8188 − 0.7082i |
| w226 | 11100010 | +0.8139 − 0.0752i |
| w227 | 11100011 | +0.8096 − 0.5376i |
| w228 | 11100100 | +0.6787 − 1.0583i |
| w229 | 11100101 | +0.7729 − 0.8860i |
| w230 | 11100110 | +0.8305 − 0.2250i |
| w231 | 11100111 | +0.8315 − 0.3759i |
| w232 | 11101000 | +0.7567 − 1.2808i |
| w233 | 11101001 | +1.0161 − 0.7012i |
| w234 | 11101010 | +0.9757 − 0.0702i |
| w235 | 11101011 | +0.9739 − 0.5345i |
| w236 | 11101100 | +0.8952 − 1.0953i |
| w237 | 11101101 | +0.9646 − 0.8865i |
| w238 | 11101110 | +1.0091 − 0.2141i |
| w239 | 11101111 | +1.0164 − 0.3745i |
| w240 | 11110000 | +0.3350 − 1.4701i |
| w241 | 11110001 | +0.3446 − 0.6254i |
| w242 | 11110010 | +0.3664 − 0.0666i |
| w243 | 11110011 | +0.3586 − 0.4775i |
| w244 | 11110100 | +0.2713 − 0.9300i |
| w245 | 11110101 | +0.3149 − 0.7791i |
| w246 | 11110110 | +0.3666 − 0.2005i |
| w247 | 11110111 | +0.3649 − 0.3365i |
| w248 | 11111000 | +0.1095 − 1.4559i |
| w249 | 11111001 | +0.2067 − 0.6018i |
| w250 | 11111010 | +0.2200 − 0.0642i |
| w251 | 11111011 | +0.2160 − 0.4587i |
| w252 | 11111100 | +0.0910 − 0.9104i |
| w253 | 11111101 | +0.1761 − 0.7590i |
| w254 | 11111110 | +0.2199 − 0.1932i |
| w255 | 11111111 | +0.2191 − 0.3239i |

B) M-QAM non-uniform constellations of group B for single carrier mode as PHY mode:

B1) 16-QAM NUC

| w | bit label | R = ½ (MCS = 10) (or R = ⅝ or ¾) | R = ⅝ (MCS = 11) (or R = ½ or ¾) | R = ¾ (MCS = 12) (or R = ½ or ⅝) |
|---|---|---|---|---|
| w0 | 0000 | +0.4925 + 1.2040i | +0.2173 + 0.4189i | +0.2949 − 0.2949i |
| w1 | 0001 | +0.4925 − 1.2040i | +0.4326 + 1.1445i | +0.9555 − 0.2949i |
| w2 | 0010 | +0.2530 + 0.4936i | −0.2173 + 0.4189i | −0.2949 − 0.2949i |
| w3 | 0011 | +0.2530 − 0.4936i | −0.4326 + 1.1445i | −0.9555 − 0.2949i |
| w4 | 0100 | −0.4925 + 1.2040i | +0.2173 − 0.4189i | +0.2949 − 0.9555i |
| w5 | 0101 | −0.4925 − 1.2040i | +0.4326 − 1.1445i | +0.9555 − 0.9555i |
| w6 | 0110 | −0.2530 + 0.4936i | −0.2173 − 0.4189i | −0.2949 − 0.9555i |
| w7 | 0111 | −0.2530 − 0.4936i | −0.4326 − 1.1445i | −0.9555 − 0.9555i |
| w8 | 1000 | +1.2040 + 0.4925i | +0.6578 + 0.2571i | +0.2949 + 0.2949i |
| w9 | 1001 | +1.2040 − 0.4925i | +1.2088 + 0.5659i | +0.9555 + 0.2949i |
| w10 | 1010 | +0.4936 + 0.2530i | −0.6578 + 0.2571i | −0.2949 + 0.2949i |
| w11 | 1011 | +0.4936 − 0.2530i | −1.2088 + 0.5659i | −0.9555 + 0.2949i |
| w12 | 1100 | −1.2040 + 0.4925i | +0.6578 − 0.2571i | +0.2949 + 0.9555i |
| w13 | 1101 | −1.2040 − 0.4925i | +1.2088 − 0.5659i | +0.9555 + 0.9555i |
| w14 | 1110 | −0.4936 + 0.2530i | −0.6578 − 0.2571i | −0.2949 + 0.9555i |
| w15 | 1111 | −0.4936 − 0.2530i | −1.2088 − 0.5659i | −0.9555 + 0.9555i |

B2) 32-QAM NUC

| w/MCS index | bit label | R = ½ (or R = ⅝, ¾ or ¹³/₁₆) | R = ⅝ (or R = ½, ¾ or ¹³/₁₆) | R = ¾ (or R = ½, ⅝ or ¹³/₁₆) | R = ¹³/₁₆ (or R = ½, ⅝ or ¾) |
|---|---|---|---|---|---|
| w0 | 00000 | +0.1929 + 0.1744i | +0.2187 + 0.1559i | +0.2113 + 0.1819i | +0.2082 + 0.1996i |
| w1 | 00001 | +0.2283 + 0.5036i | +0.2225 + 0.5103i | +0.6163 + 1.2930i | +0.6964 + 1.2272i |
| w2 | 00010 | +0.6963 + 0.1782i | +0.2187 − 0.1559i | +0.2113 − 0.1819i | +0.2041 + 0.6147i |
| w3 | 00011 | +0.6364 + 0.4437i | +0.2225 − 0.5103i | +0.6163 − 1.2930i | +0.2297 + 1.0778i |
| w4 | 00100 | +0.1929 − 0.1744i | −0.2187 + 0.1559i | +0.6590 + 0.1934i | +0.6409 + 0.2027i |
| w5 | 00101 | +0.2283 − 0.5036i | −0.2225 + 0.5103i | +1.1691 + 0.2524i | +1.1236 + 0.2383i |
| w6 | 00110 | +0.6963 − 0.1782i | −0.2187 − 0.1559i | +0.6590 − 0.1934i | +0.6262 + 0.6234i |
| w7 | 00111 | +0.6364 − 0.4437i | −0.2225 − 0.5103i | +1.1691 − 0.2524i | +1.0921 + 0.7399i |
| w8 | 01000 | +0.3541 + 1.4168i | +0.7211 + 0.1755i | −0.2113 + 0.1819i | +0.2082 − 0.1996i |
| w9 | 01001 | +0.2627 + 0.9170i | +0.6446 + 0.5183i | −0.6163 + 1.2930i | +0.6964 − 1.2272i |
| w10 | 01010 | +1.3162 + 0.3270i | +0.7211 − 0.1755i | −0.2113 − 0.1819i | +0.2041 − 0.6147i |
| w11 | 01011 | +0.9382 + 0.8637i | +0.6446 − 0.5183i | −0.6163 − 1.2930i | +0.2297 − 1.0778i |
| w12 | 01100 | +0.3541 − 1.4168i | −0.7211 + 0.1755i | −0.6590 + 0.1934i | +0.6409 − 0.2027i |
| w13 | 01101 | +0.2627 − 0.9170i | −0.6446 + 0.5183i | −1.1691 + 0.2524i | +1.1236 − 0.2383i |
| w14 | 01110 | +1.3162 − 0.3270i | −0.7211 − 0.1755i | −0.6590 − 0.1934i | +0.6262 − 0.6234i |
| w15 | 01111 | +0.9382 − 0.8637i | −0.6446 − 0.5183i | −1.1691 − 0.2524i | +1.0921 − 0.7399i |
| w16 | 10000 | −0.1929 + 0.1744i | +0.3459 + 1.3987i | +0.2042 + 0.5736i | −0.2082 + 0.1996i |
| w17 | 10001 | −0.2283 + 0.5036i | +0.2415 + 0.9207i | +0.2154 + 1.0277i | −0.6964 + 1.2272i |
| w18 | 10010 | −0.6963 + 0.1782i | +0.3459 − 1.3987i | +0.2042 − 0.5736i | −0.2041 + 0.6147i |
| w19 | 10011 | −0.6364 + 0.4437i | +0.2415 − 0.9207i | +0.2154 − 1.0277i | −0.2297 + 1.0778i |
| w20 | 10100 | −0.1929 − 0.1744i | −0.3459 + 1.3987i | +0.6214 + 0.5984i | −0.6409 + 0.2027i |
| w21 | 10101 | −0.2283 − 0.5036i | −0.2415 + 0.9207i | +1.0670 + 0.7825i | −1.1236 + 0.2383i |
| w22 | 10110 | −0.6963 − 0.1782i | −0.3459 − 1.3987i | +0.6214 − 0.5984i | −0.6262 + 0.6234i |
| w23 | 10111 | −0.6364 − 0.4437i | −0.2415 − 0.9207i | +1.0670 − 0.7825i | −1.0921 + 0.7399i |
| w24 | 11000 | −0.3541 + 1.4168i | +1.2734 + 0.3186i | −0.2042 + 0.5736i | −0.2082 − 0.1996i |
| w25 | 11001 | −0.2627 + 0.9170i | +0.9258 + 0.9059i | −0.2154 + 1.0277i | −0.6964 − 1.2272i |
| w26 | 11010 | −1.3162 + 0.3270i | +1.2734 − 0.3186i | −0.2042 − 0.5736i | −0.2041 − 0.6147i |
| w27 | 11011 | −0.9382 + 0.8637i | +0.9258 − 0.9059i | −0.2154 − 1.0277i | −0.2297 − 1.0778i |
| w28 | 11100 | −0.3541 − 1.4168i | −1.2734 + 0.3186i | −0.6214 + 0.5984i | −0.6409 − 0.2027i |
| w29 | 11101 | −0.2627 − 0.9170i | −0.9258 + 0.9059i | −1.0670 + 0.7825i | −1.1236 − 0.2383i |
| w30 | 11110 | −1.3162 − 0.3270i | −1.2734 − 0.3186i | −0.6214 − 0.5984i | −0.6262 − 0.6234i |
| w31 | 11111 | −0.9382 − 0.8637i | −0.9258 − 0.9059i | −1.0670 − 0.7825i | −1.0921 − 0.7399i |

B3) 64-QAM NUC

| w/MCS index | bit label | R = ½ (or R = ⅝, ¾ or ¹³/₁₆) | R = ⅝ (or R = ½, ¾ or ¹³/₁₆) | R = ¾ (or R = ½, ⅝ or ¹³/₁₆) | R = ¹³/₁₆ (or R = ½, ⅝ or ¾) |
|---|---|---|---|---|---|
| w0 | 000000 | +1.4732 + 0.2920i | +1.4730 + 0.3019i | +1.0501 − 0.1676i | +1.0414 − 0.1712i |
| w1 | 000001 | +1.2487 + 0.8348i | −1.4730 + 0.3019i | +1.4380 − 0.2294i | +0.7230 − 0.1517i |
| w2 | 000010 | +1.4732 − 0.2920i | +1.0895 + 0.2172i | +0.1398 − 0.1309i | +1.0997 − 0.5419i |
| w3 | 000011 | +1.2487 − 0.8348i | −1.0895 + 0.2172i | +0.1680 − 1.0338i | +0.7484 − 0.4663i |
| w4 | 000100 | +1.0283 + 0.2071i | +0.1419 + 0.1122i | +1.0725 − 0.5328i | −1.0414 − 0.1712i |
| w5 | 000101 | +0.8760 + 0.5811i | −0.1419 + 0.1122i | +1.0771 − 0.9315i | −0.7230 − 0.1517i |

-continued

| w/MCS index | bit label | R = ½ (or R = ⅝, ¾ or ¹³⁄₁₆) | R = ⅝ (or R = ½, ¾ or ¹³⁄₁₆) | R = ¾ (or R = ½, ⅝ or ¹³⁄₁₆) | R = ¹³⁄₁₆ (or R= ½, ⅝ or ¾) |
|---|---|---|---|---|---|
| w6  | 000110 | +1.0283 − 0.2071i | +0.7863 + 0.1337i | +0.1361 − 0.4023i | −1.0997 − 0.5419i |
| w7  | 000111 | +0.8760 − 0.5811i | −0.7863 + 0.1337i | +0.1373 − 0.7043i | −0.7484 − 0.4663i |
| w8  | 001000 | −1.4732 + 0.2920i | +1.4730 − 0.3019i | +1.0501 + 0.1676i | +1.0414 + 0.1712i |
| w9  | 001001 | −1.2487 + 0.8348i | −1.4730 − 0.3019i | +1.4380 + 0.2294i | +0.7230 + 0.1517i |
| w10 | 001010 | −1.4732 − 0.2920i | +1.0895 − 0.2172i | +0.1398 + 0.1309i | +1.0997 + 0.5419i |
| w11 | 001011 | −1.2487 − 0.8348i | −1.0895 − 0.2172i | +0.1680 + 1.0338i | +0.7484 + 0.4663i |
| w12 | 001100 | −1.0283 + 0.2071i | +0.1419 − 0.1122i | +1.0725 + 0.5328i | −1.0414 + 0.1712i |
| w13 | 001101 | −0.8760 + 0.5811i | −0.1419 − 0.1122i | +1.0771 + 0.9315i | −0.7230 + 0.1517i |
| w14 | 001110 | −1.0283 − 0.2071i | +0.1361 − 0.4023i | −1.0997 − 0.5419i | |
| w15 | 001111 | −0.8760 − 0.5811i | −0.7863 − 0.1337i | +0.1373 + 0.7043i | −0.7484 − 0.4663i |
| w16 | 010000 | +0.2920 + 1.4732i | +1.2124 + 0.8333i | +0.7233 − 0.1496i | +0.1414 − 0.1379i |
| w17 | 010001 | +0.8348 + 1.2487i | −1.2124 + 0.8333i | +0.6220 − 1.1896i | +0.4272 − 0.1421i |
| w18 | 010010 | +0.2920 − 1.4732i | +0.8988 + 0.5768i | +0.4246 − 0.1370i | +0.1440 − 0.4167i |
| w19 | 010011 | +0.8348 − 1.2487i | −0.8988 + 0.5768i | +0.2326 − 1.3986i | +0.4369 − 0.4317i |
| w20 | 010100 | +0.2071 + 1.0283i | +0.3733 + 0.1498i | +0.7267 − 0.4592i | −0.1414 − 0.1379i |
| w21 | 010101 | +0.5811 + 0.8760i | −0.3733 + 0.1498i | +0.6956 − 0.8095i | −0.4272 − 0.1421i |
| w22 | 010110 | +0.2071 − 1.0283i | +0.6394 + 0.3211i | +0.4198 − 0.4151i | −0.1440 − 0.4167i |
| w23 | 010111 | +0.5811 − 0.8760i | −0.6394 + 0.3211i | +0.4114 − 0.7109i | −0.4369 − 0.4317i |
| w24 | 011000 | −0.2920 + 1.4732i | +1.2124 − 0.8333i | +0.7233 + 0.1496i | +0.1414 + 0.1379i |
| w25 | 011001 | −0.8348 + 1.2487i | −1.2124 − 0.8333i | +0.6220 + 1.1896i | +0.4272 + 0.1421i |
| w26 | 011010 | −0.2920 − 1.4732i | +0.8988 − 0.5768i | +0.4246 + 0.1370i | +0.1440 + 0.4167i |
| w27 | 011011 | −0.8348 − 1.2487i | −0.8988 − 0.5768i | +0.2326 + 1.3986i | +0.4369 + 0.4317i |
| w28 | 011100 | −0.2071 + 1.0283i | +0.3733 − 0.1498i | +0.7267 + 0.4592i | −0.1414 + 0.1379i |
| w29 | 011101 | −0.5811 + 0.8760i | −0.3733 − 0.1498i | +0.6956 + 0.8095i | −0.4272 + 0.1421i |
| w30 | 011110 | −0.2071 − 1.0283i | +0.6394 − 0.3211i | +0.4198 + 0.4151i | −0.1440 + 0.4167i |
| w31 | 011111 | −0.5811 − 0.8760i | −0.6394 − 0.3211i | +0.4114 + 0.7109i | −0.4369 + 0.4317i |
| w32 | 100000 | +0.3138 + 0.1393i | +0.2775 + 1.4188i | −1.0501 − 0.1676i | +1.4058 − 0.2115i |
| w33 | 100001 | +0.3094 + 0.1671i | −0.2775 + 1.4188i | −1.4380 − 0.2294i | +0.5981 − 1.1597i |
| w34 | 100010 | +0.3138 − 0.1393i | +0.2177 + 1.0243i | −0.1398 − 0.1309i | +1.0691 − 0.9443i |
| w35 | 100011 | +0.3094 − 0.1671i | −0.2177 + 1.0243i | −0.1680 − 1.0338i | +0.7360 − 0.8042i |
| w36 | 100100 | +0.7004 + 0.1720i | +0.1138 + 0.3999i | −1.0725 − 0.5328i | −1.4058 − 0.2115i |
| w37 | 100101 | +0.6174 + 0.3741i | −0.1138 + 0.3999i | −1.0771 − 0.9315i | −0.5981 − 1.1597i |
| w38 | 100110 | +0.7004 − 0.1720i | +0.1487 + 0.7260i | −0.1361 − 0.4023i | −1.0691 − 0.9443i |
| w39 | 100111 | +0.6174 − 0.3741i | −0.1487 + 0.7260i | −0.1373 − 0.7043i | −0.7360 − 0.8042i |
| w40 | 101000 | −0.3138 + 0.1393i | +0.2775 − 1.4188i | −1.0501 + 0.1676i | +1.4058 + 0.2115i |
| w41 | 101001 | −0.3094 + 0.1671i | −0.2775 − 1.4188i | −1.4380 + 0.2294i | +0.5981 + 1.1597i |
| w42 | 101010 | −0.3138 − 0.1393i | +0.2177 − 1.0243i | −0.1398 + 0.1309i | +1.0691 + 0.9443i |
| w43 | 101011 | −0.3094 − 0.1671i | −0.2177 − 1.0243i | −0.1680 + 1.0338i | +0.7360 + 0.8042i |
| w44 | 101100 | −0.7004 + 0.1720i | +0.1138 − 0.3999i | −1.0725 + 0.5328i | −1.4058 + 0.2115i |
| w45 | 101101 | −0.6174 + 0.3741i | −0.1138 − 0.3999i | −1.0771 + 0.9315i | −0.5981 + 1.1597i |
| w46 | 101110 | −0.7004 − 0.1720i | +0.1487 − 0.7260i | −0.1361 + 0.4023i | −1.0691 + 0.9443i |
| w47 | 101111 | −0.6174 − 0.3741i | −0.1487 − 0.7260i | −0.1373 + 0.7043i | −0.7360 + 0.8042i |
| w48 | 110000 | +0.1393 + 0.3138i | +0.7921 + 1.2096i | −0.7233 − 0.1496i | +0.1695 − 1.0298i |
| w49 | 110001 | +0.1671 + 0.3094i | −0.7921 + 1.2096i | −0.6220 − 1.1896i | +0.2236 − 1.3784i |
| w50 | 110010 | +0.1393 − 0.3138i | +0.6056 + 0.8481i | −0.4246 − 0.1370i | +0.1426 − 0.7102i |
| w51 | 110011 | +0.1671 − 0.3094i | −0.6056 + 0.8481i | −0.2326 − 1.3986i | +0.4351 − 0.7394i |
| w52 | 110100 | +0.1720 + 0.7004i | +0.2891 + 0.3910i | −0.7267 − 0.4592i | −0.1695 − 1.0298i |
| w53 | 110101 | +0.3741 + 0.6174i | −0.2891 + 0.3910i | −0.6956 − 0.8095i | −0.2236 − 1.3784i |
| w54 | 110110 | +0.1720 − 0.7004i | +0.4397 + 0.5853i | −0.4198 − 0.4151i | −0.1426 − 0.7102i |
| w55 | 110111 | +0.3741 − 0.6174i | −0.4397 + 0.5853i | −0.4114 − 0.7109i | −0.4351 − 0.7394i |
| w56 | 111000 | −0.1393 + 0.3138i | +0.7921 − 1.2096i | −0.7233 + 0.1496i | +0.1695 + 1.0298i |
| w57 | 111001 | −0.1671 + 0.3094i | −0.7921 − 1.2096i | −0.6220 + 1.1896i | +0.2236 + 1.3784i |
| w58 | 111010 | −0.1393 − 0.3138i | +0.6056 − 0.8481i | −0.4246 + 0.1370i | +0.1426 + 0.7102i |
| w59 | 111011 | −0.1671 − 0.3094i | −0.6056 − 0.8481i | −0.2326 + 1.3986i | +0.4351 + 0.7394i |
| w60 | 111100 | −0.1720 + 0.7004i | +0.2891 − 0.3910i | −0.7267 + 0.4592i | −0.1695 + 1.0298i |
| w61 | 111101 | −0.3741 + 0.6174i | −0.2891 − 0.3910i | −0.6956 + 0.8095i | −0.2236 + 1.3784i |
| w62 | 111110 | −0.1720 − 0.7004i | +0.4397 − 0.5853i | −0.4198 + 0.4151i | −0.1426 + 0.7102i |
| w63 | 111111 | −0.3741 − 0.6174i | −0.4397 − 0.5853i | −0.4114 + 0.7109i | −0.4351 + 0.7394i |

B4) 128-QAM NUC for R=1/2 (or R=5/8, 3/4 or 13/16):

| w index | bit label | Constellation point |
|---|---|---|
| w0  | 0000000 | +0.7383 − 1.3947i |
| w1  | 0000000 | +0.2726 − 1.6070i |
| w2  | 0000001 | +0.7383 + 1.3947i |
| w3  | 0000001 | +0.2726 + 1.6070i |
| w4  | 0000010 | −0.7383 − 1.3947i |
| w5  | 0000010 | −0.2726 − 1.6070i |
| w6  | 0000011 | −0.7383 + 1.3947i |
| w7  | 0000011 | −0.2726 + 1.6070i |
| w8  | 0000100 | +1.0680 − 1.0753i |
| w9  | 0000100 | +1.0389 − 0.7336i |
| w10 | 0000101 | +1.0680 + 1.0753i |
| w11 | 0000101 | +1.0389 + 0.7336i |
| w12 | 0000110 | −1.0680 − 1.0753i |
| w13 | 0000110 | −1.0389 − 0.7336i |
| w14 | 0000111 | −1.0680 + 1.0753i |
| w15 | 0000111 | −1.0389 + 0.7336i |
| w16 | 0001000 | +0.5286 − 1.0997i |
| w17 | 0001000 | +0.1915 − 1.2689i |

| w index | bit label | Constellation point |
|---|---|---|
| w18 | 0001001 | +0.5286 + 1.0997i |
| w19 | 0001001 | +0.1915 + 1.2689i |
| w20 | 0001010 | −0.5286 − 1.0997i |
| w21 | 0001010 | −0.1915 − 1.2689i |
| w22 | 0001011 | −0.5286 + 1.0997i |
| w23 | 0001011 | −0.1915 + 1.2689i |
| w24 | 0001100 | +0.6878 − 0.8578i |
| w25 | 0001100 | +0.7725 − 0.6723i |
| w26 | 0001101 | +0.6878 + 0.8578i |
| w27 | 0001101 | +0.7725 + 0.6723i |
| w28 | 0001110 | −0.6878 − 0.8578i |
| w29 | 0001110 | −0.7725 − 0.6723i |
| w30 | 0001111 | −0.6878 + 0.8578i |
| w31 | 0001111 | −0.7725 + 0.6723i |
| w32 | 0010000 | +0.1315 − 0.7332i |
| w33 | 0010000 | +0.1038 − 0.7607i |
| w34 | 0010001 | +0.1315 + 0.7332i |
| w35 | 0010001 | +0.1038 + 0.7607i |
| w36 | 0010010 | −0.1315 − 0.7332i |
| w37 | 0010010 | −0.1038 − 0.7607i |
| w38 | 0010011 | −0.1315 + 0.7332i |
| w39 | 0010011 | −0.1038 + 0.7607i |
| w40 | 0010100 | +0.1647 − 0.5388i |
| w41 | 0010100 | +0.1629 − 0.5296i |
| w42 | 0010101 | +0.1647 + 0.5388i |
| w43 | 0010101 | +0.1629 + 0.5296i |
| w44 | 0010110 | −0.1647 − 0.5388i |
| w45 | 0010110 | −0.1629 − 0.5296i |
| w46 | 0010111 | −0.1647 + 0.5388i |
| w47 | 0010111 | −0.1629 + 0.5296i |
| w48 | 0011000 | +0.3255 − 0.9067i |
| w49 | 0011000 | +0.1588 − 1.0122i |
| w50 | 0011001 | +0.3255 + 0.9067i |
| w51 | 0011001 | +0.1588 + 1.0122i |
| w52 | 0011010 | −0.3255 − 0.9067i |
| w53 | 0011010 | −0.1588 − 1.0122i |
| w54 | 0011011 | −0.3255 + 0.9067i |
| w55 | 0011011 | −0.1588 + 1.0122i |
| w56 | 0011100 | +0.4535 − 0.6452i |
| w57 | 0011100 | +0.4645 − 0.5898i |
| w58 | 0011101 | +0.4535 + 0.6452i |
| w59 | 0011101 | +0.4645 + 0.5898i |
| w60 | 0011110 | −0.4535 − 0.6452i |
| w61 | 0011110 | −0.4645 − 0.5898i |
| w62 | 0011111 | −0.4535 + 0.6452i |
| w63 | 0011111 | −0.4645 + 0.5898i |
| w64 | 01000000 | +1.5779 − 0.2230i |
| w65 | 01000001 | +1.2114 − 0.1662i |
| w66 | 01000010 | +1.5779 + 0.2230i |
| w67 | 01000011 | +1.2114 + 0.1662i |
| w68 | 01000100 | −1.5779 − 0.2230i |
| w69 | 01000101 | −1.2114 − 0.1662i |
| w70 | 01000110 | −1.5779 + 0.2230i |
| w71 | 01000111 | −1.2114 + 0.1662i |
| w72 | 01001000 | +1.4915 − 0.6927i |
| w73 | 01001001 | +1.1447 − 0.4719i |
| w74 | 01001010 | +1.4915 + 0.6927i |
| w75 | 01001011 | +1.1447 + 0.4719i |
| w76 | 01001100 | −1.4915 − 0.6927i |
| w77 | 01001101 | −1.1447 − 0.4719i |
| w78 | 01001110 | −1.4915 + 0.6927i |
| w79 | 01001111 | −1.1447 + 0.4719i |
| w80 | 01010000 | +0.7620 − 0.1121i |
| w81 | 01010001 | +0.9103 − 0.1272i |
| w82 | 01010010 | +0.7620 + 0.1121i |
| w83 | 01010011 | +0.9103 + 0.1272i |
| w84 | 01010100 | −0.7620 − 0.1121i |
| w85 | 01010101 | −0.9103 − 0.1272i |
| w86 | 01010110 | −0.7620 + 0.1121i |
| w87 | 01010111 | −0.9103 + 0.1272i |
| w88 | 01011000 | +0.7359 − 0.3230i |
| w89 | 01011001 | +0.8236 − 0.3936i |
| w90 | 01011010 | +0.7359 + 0.3230i |
| w91 | 01011011 | +0.8236 + 0.3936i |
| w92 | 01011100 | −0.7359 − 0.3230i |
| w93 | 01011101 | −0.8236 − 0.3936i |
| w94 | 01011110 | −0.7359 + 0.3230i |
| w95 | 01011111 | −0.8236 + 0.3936i |
| w96 | 01100000 | +0.1461 − 0.1146i |
| w97 | 01100001 | +0.1573 − 0.1142i |
| w98 | 01100010 | +0.1461 + 0.1146i |
| w99 | 01100011 | +0.1573 + 0.1142i |
| w100 | 01100100 | −0.1461 − 0.1146i |
| w101 | 01100101 | −0.0573 − 0.1142i |
| w102 | 01100110 | −0.1461 + 0.1146i |
| w103 | 01100111 | −0.0573 + 0.1142i |
| w104 | 01101000 | +0.1535 − 0.3082i |
| w105 | 01101001 | +0.1629 − 0.3084i |
| w106 | 01101010 | +0.1535 + 0.3082i |
| w107 | 01101011 | +0.1629 + 0.3084i |
| w108 | 01101100 | −0.1535 − 0.3082i |
| w109 | 01101101 | −0.1629 − 0.3084i |
| w110 | 01101110 | −0.1535 + 0.3082i |
| w111 | 01101111 | −0.1629 + 0.3084i |
| w112 | 01110000 | +0.4774 − 0.1074i |
| w113 | 01110001 | +0.4323 − 0.1096i |
| w114 | 01110010 | +0.4774 + 0.1074i |
| w115 | 01110011 | +0.4323 + 0.1096i |
| w116 | 01110100 | −0.4774 − 0.1074i |
| w117 | 01110101 | −0.4323 − 0.1096i |
| w118 | 01110110 | −0.4774 + 0.1074i |
| w119 | 01110111 | −0.4323 + 0.1096i |
| w120 | 01111000 | +0.4853 − 0.3237i |
| w121 | 01111001 | +0.4637 − 0.3425i |
| w122 | 01111010 | +0.4853 + 0.3237i |
| w123 | 01111011 | +0.4637 + 0.3425i |
| w124 | 01111100 | −0.4853 − 0.3237i |
| w125 | 01111101 | −0.4637 − 0.3425i |
| w126 | 01111110 | −0.4853 + 0.3237i |
| w127 | 01111111 | −0.4637 + 0.3425i | for R=5/8 (or R=1/2, 3/4 or 13/16):

| w index | bit label | Constellation point |
|---|---|---|
| w0 | 0000000 | +1.1438 + 0.4323i |
| w1 | 0000000 | +0.1045 + 0.4578i |
| w2 | 0000001 | −1.1438 − 0.4323i |
| w3 | 0000001 | −0.1045 + 0.4578i |
| w4 | 0000010 | +0.9006 + 0.4173i |
| w5 | 0000010 | +0.1067 + 0.3515i |
| w6 | 0000011 | −0.9006 + 0.4173i |
| w7 | 0000011 | −0.1067 + 0.3515i |
| w8 | 0000100 | +1.1598 + 0.1437i |
| w9 | 0000100 | +0.1075 + 0.0988i |
| w10 | 0000101 | −1.1598 + 0.1437i |
| w11 | 0000101 | −0.1075 + 0.0988i |
| w12 | 0000110 | +0.9102 + 0.1324i |
| w13 | 0000110 | +0.1136 + 0.1402i |
| w14 | 0000111 | −0.9102 + 0.1324i |
| w15 | 0000111 | −0.1136 + 0.1402i |
| w16 | 0001000 | +0.5578 + 0.4216i |
| w17 | 0001000 | +0.3411 + 0.4189i |
| w18 | 0001001 | −0.5578 + 0.4216i |
| w19 | 0001001 | −0.3411 + 0.4189i |
| w20 | 0001010 | +0.6797 + 0.3850i |
| w21 | 0001010 | +0.3088 + 0.3456i |
| w22 | 0001011 | −0.6797 + 0.3850i |
| w23 | 0001011 | −0.3088 + 0.3456i |
| w24 | 0001100 | +0.5755 + 0.1222i |
| w25 | 0001100 | +0.3700 + 0.1151i |
| w26 | 0001101 | −0.5755 + 0.1222i |
| w27 | 0001101 | −0.3700 + 0.1151i |
| w28 | 0001110 | +0.6787 + 0.1401i |
| w29 | 0001110 | +0.3294 + 0.1448i |
| w30 | 0001111 | −0.6787 + 0.1401i |
| w31 | 0001111 | −0.3294 + 0.1448i |
| w32 | 0010000 | +1.1837 + 0.8001i |
| w33 | 0010000 | +0.1121 + 0.6749i |
| w34 | 0010001 | −1.1837 + 0.8001i |
| w35 | 0010001 | −0.1121 + 0.6749i |
| w36 | 0010010 | +0.9008 + 0.6972i |

-continued

| w index | bit label | Constellation point |
|---|---|---|
| w37 | 0010010 | +0.1179 + 0.8955i |
| w38 | 0010011 | −0.9008 + 0.6972i |
| w39 | 0010011 | −0.1179 + 0.8955i |
| w40 | 0010100 | +1.4855 + 0.1793i |
| w41 | 0010100 | +0.1933 + 1.4991i |
| w42 | 0010101 | −1.4855 + 0.1793i |
| w43 | 0010101 | −0.1933 + 1.4991i |
| w44 | 0010110 | +1.5681 + 0.5636i |
| w45 | 0010110 | +0.1440 + 1.1691i |
| w46 | 0010111 | −1.5681 + 0.5636i |
| w47 | 0010111 | −0.1440 + 1.1691i |
| w48 | 0011000 | +0.5354 + 0.6351i |
| w49 | 0011000 | +0.3342 + 0.6628i |
| w50 | 0011001 | −0.5354 + 0.6351i |
| w51 | 0011001 | −0.3342 + 0.6628i |
| w52 | 0011010 | +0.6549 + 0.7546i |
| w53 | 0011010 | +0.3585 + 0.8699i |
| w54 | 0011011 | −0.6549 + 0.7546i |
| w55 | 0011011 | −0.3585 + 0.8699i |
| w56 | 0011100 | +0.9727 + 1.2109i |
| w57 | 0011100 | +0.5835 + 1.4250i |
| w58 | 0011101 | −0.9727 + 1.2109i |
| w59 | 0011101 | −0.5835 + 1.4250i |
| w60 | 0011110 | +0.7102 + 1.0171i |
| w61 | 0011110 | +0.4344 + 1.1140i |
| w62 | 0011111 | −0.7102 + 1.0171i |
| w63 | 0011111 | −0.4344 + 1.1140i |
| w64 | 01000000 | +1.1438 − 0.4323i |
| w65 | 01000001 | +0.1045 − 0.4578i |
| w66 | 01000010 | −1.1438 − 0.4323i |
| w67 | 01000011 | −0.1045 − 0.4578i |
| w68 | 01000100 | +0.9006 − 0.4173i |
| w69 | 01000101 | +0.1067 − 0.3515i |
| w70 | 01000110 | −0.9006 − 0.4173i |
| w71 | 01000111 | −0.1067 − 0.3515i |
| w72 | 01001000 | +1.1598 − 0.1437i |
| w73 | 01001001 | +0.1075 − 0.0988i |
| w74 | 01001010 | −1.1598 − 0.1437i |
| w75 | 01001011 | −0.1075 − 0.0988i |
| w76 | 01001100 | +0.9102 − 0.1324i |
| w77 | 01001101 | +0.1136 − 0.1402i |
| w78 | 01001110 | −0.9102 − 0.1324i |
| w79 | 01001111 | −0.1136 − 0.1402i |
| w80 | 01010000 | +0.5578 − 0.4216i |
| w81 | 01010001 | +0.3411 − 0.4189i |
| w82 | 01010010 | −0.5578 − 0.4216i |
| w83 | 01010011 | −0.3411 − 0.4189i |
| w84 | 01010100 | +0.6797 − 0.3850i |
| w85 | 01010101 | +0.3088 − 0.3456i |
| w86 | 01010110 | −0.6797 − 0.3850i |
| w87 | 01010111 | −0.3088 − 0.3456i |
| w88 | 01011000 | +0.5755 − 0.1222i |
| w89 | 01011001 | +0.3700 − 0.1151i |
| w90 | 01011010 | −0.5755 − 0.1222i |
| w91 | 01011011 | −0.3700 − 0.1151i |
| w92 | 01011100 | +0.6787 − 0.1401i |
| w93 | 01011101 | +0.3294 − 0.1448i |
| w94 | 01011110 | −0.6787 − 0.1401i |
| w95 | 01011111 | −0.3294 − 0.1448i |
| w96 | 01100000 | +1.1837 − 0.8001i |
| w97 | 01100001 | +0.1121 − 0.6749i |
| w98 | 01100010 | −1.1837 − 0.8001i |
| w99 | 01100011 | −0.1121 − 0.6749i |
| w100 | 01100100 | +0.9008 − 0.6972i |
| w101 | 01100101 | +0.1179 − 0.8955i |
| w102 | 01100110 | −0.9008 − 0.6972i |
| w103 | 01100111 | −0.1179 − 0.8955i |
| w104 | 01101000 | +1.4855 − 0.1793i |
| w105 | 01101001 | +0.1933 − 1.4991i |
| w106 | 01101010 | −1.4855 − 0.1793i |
| w107 | 01101011 | −0.1933 − 1.4991i |
| w108 | 01101100 | +1.5681 − 0.5636i |
| w109 | 01101101 | +0.1440 − 1.1691i |
| w110 | 01101110 | −1.5681 − 0.5636i |
| w111 | 01101111 | −0.1440 − 1.1691i |
| w112 | 01110000 | +0.5354 − 0.6351i |
| w113 | 01110001 | +0.3342 − 0.6628i |
| w114 | 01110010 | −0.5354 − 0.6351i |
| w115 | 01110011 | −0.3342 − 0.6628i |
| w116 | 01110100 | +0.6549 − 0.7546i |
| w117 | 01110101 | +0.3585 − 0.8699i |
| w118 | 01110110 | −0.6549 − 0.7546i |
| w119 | 01110111 | −0.3585 − 0.8699i |
| w120 | 01111000 | +0.9727 − 1.2109i |
| w121 | 01111001 | +0.5835 − 1.4250i |
| w122 | 01111010 | −0.9727 − 1.2109i |
| w123 | 01111011 | −0.5835 − 1.4250i |
| w124 | 01111100 | +0.7102 − 1.0171i |
| w125 | 01111101 | +0.4344 − 1.1140i |
| w126 | 01111110 | −0.7102 − 1.0171i |
| w127 | 01111111 | −0.4344 − 1.1140i | for R=3/4 (or R=1/2, 5/8 or 13/16):

| w index | bit label | Constellation point |
|---|---|---|
| w0 | 0000000 | +1.0837 + 0.3878i |
| w1 | 0000000 | +0.5568 + 0.5351i |
| w2 | 0000001 | +1.0837 − 0.3878i |
| w3 | 0000001 | +0.5568 − 0.5351i |
| w4 | 0000010 | +0.8372 + 0.4015i |
| w5 | 0000010 | +0.5992 + 0.3732i |
| w6 | 0000011 | +0.8372 − 0.4015i |
| w7 | 0000011 | +0.5992 − 0.3732i |
| w8 | 0000100 | +1.1795 + 0.6737i |
| w9 | 0000100 | +0.5823 + 0.7120i |
| w10 | 0000101 | +1.1795 − 0.6737i |
| w11 | 0000101 | +0.5823 − 0.7120i |
| w12 | 0000110 | +0.8934 + 0.6718i |
| w13 | 0000110 | +0.7091 + 0.8942i |
| w14 | 0000111 | +0.8934 − 0.6718i |
| w15 | 0000111 | +0.7091 − 0.8942i |
| w16 | 0001000 | +0.1125 + 0.5652i |
| w17 | 0001000 | +0.3356 + 0.5485i |
| w18 | 0001001 | +0.1125 − 0.5652i |
| w19 | 0001001 | +0.3356 − 0.5485i |
| w20 | 0001010 | +0.1063 + 0.3959i |
| w21 | 0001010 | +0.3354 + 0.3801i |
| w22 | 0001011 | +0.1063 − 0.3959i |
| w23 | 0001011 | +0.3354 − 0.3801i |
| w24 | 0001100 | +0.1174 + 0.7565i |
| w25 | 0001100 | +0.3498 + 0.7450i |
| w26 | 0001101 | +0.1174 − 0.7565i |
| w27 | 0001101 | +0.3498 − 0.7450i |
| w28 | 0001110 | +0.1285 + 0.9672i |
| w29 | 0001110 | +0.3973 + 0.9520i |
| w30 | 0001111 | +0.1285 − 0.9672i |
| w31 | 0001111 | +0.3973 − 0.9520i |
| w32 | 0010000 | −1.0837 + 0.3878i |
| w33 | 0010000 | −0.5568 + 0.5351i |
| w34 | 0010001 | −1.0837 − 0.3878i |
| w35 | 0010001 | −0.5568 − 0.5351i |
| w36 | 0010010 | −0.8372 + 0.4015i |
| w37 | 0010010 | −0.5992 + 0.3732i |
| w38 | 0010011 | −0.8372 − 0.4015i |
| w39 | 0010011 | −0.5992 − 0.3732i |
| w40 | 0010100 | −1.1795 + 0.6737i |
| w41 | 0010100 | −0.5823 + 0.7120i |
| w42 | 0010101 | −1.1795 − 0.6737i |
| w43 | 0010101 | −0.5823 − 0.7120i |
| w44 | 0010110 | −0.8934 + 0.6718i |
| w45 | 0010110 | −0.7091 + 0.8942i |
| w46 | 0010111 | −0.8934 − 0.6718i |
| w47 | 0010111 | −0.7091 − 0.8942i |
| w48 | 0011000 | −0.1125 + 0.5652i |
| w49 | 0011000 | −0.3356 + 0.5485i |
| w50 | 0011001 | −0.1125 − 0.5652i |
| w51 | 0011001 | −0.3356 − 0.5485i |
| w52 | 0011010 | −0.1063 + 0.3959i |
| w53 | 0011010 | −0.3354 + 0.3801i |
| w54 | 0011011 | −0.1063 − 0.3959i |
| w55 | 0011011 | −0.3354 − 0.3801i |

-continued

| w index | bit label | Constellation point |
|---|---|---|
| w56 | 0011100 | −0.1174 + 0.7565i |
| w57 | 0011100 | −0.3498 + 0.7450i |
| w58 | 0011101 | −0.1174 − 0.7565i |
| w59 | 0011101 | −0.3498 − 0.7450i |
| w60 | 0011110 | −0.1285 + 0.9672i |
| w61 | 0011110 | −0.3973 + 0.9520i |
| w62 | 0011111 | −0.1285 − 0.9672i |
| w63 | 0011111 | −0.3973 − 0.9520i |
| w64 | 01000000 | +1.0605 + 0.1271i |
| w65 | 01000001 | +0.5216 + 0.0747i |
| w66 | 01000010 | +1.0605 − 0.1271i |
| w67 | 01000011 | +0.5216 − 0.0747i |
| w68 | 01000100 | +0.8209 + 0.1292i |
| w69 | 01000101 | +0.6018 + 0.1929i |
| w70 | 01000110 | +0.8209 − 0.1292i |
| w71 | 01000111 | +0.6018 − 0.1929i |
| w72 | 01001000 | +1.3525 + 0.1471i |
| w73 | 01001001 | +1.0702 + 1.0357i |
| w74 | 01001010 | +1.3525 − 0.1471i |
| w75 | 01001011 | +1.0702 − 1.0357i |
| w76 | 01001100 | +1.4799 + 0.4422i |
| w77 | 01001101 | +0.7653 + 1.1720i |
| w78 | 01001110 | +1.4799 − 0.4422i |
| w79 | 01001111 | +0.7653 − 1.1720i |
| w80 | 01010000 | +0.1054 + 0.0790i |
| w81 | 01010001 | +0.3169 + 0.0841i |
| w82 | 01010010 | +0.1054 − 0.0790i |
| w83 | 01010011 | +0.3169 − 0.0841i |
| w84 | 01010100 | +0.1042 + 0.2345i |
| w85 | 01010101 | +0.3223 + 0.2346i |
| w86 | 01010110 | +0.1042 − 0.2345i |
| w87 | 01010111 | +0.3223 − 0.2346i |
| w88 | 01011000 | +0.1687 + 1.4929i |
| w89 | 01011001 | +0.5173 + 1.4708i |
| w90 | 01011010 | +0.1687 − 1.4929i |
| w91 | 01011011 | +0.5173 − 1.4708i |
| w92 | 01011100 | +0.1455 + 1.2047i |
| w93 | 01011101 | +0.4442 + 1.1814i |
| w94 | 01011110 | +0.1455 − 1.2047i |
| w95 | 01011111 | +0.4442 − 1.1814i |
| w96 | 01100000 | −1.0605 + 0.1271i |
| w97 | 01100001 | −0.5216 + 0.0747i |
| w98 | 01100010 | −1.0605 − 0.1271i |
| w99 | 01100011 | −0.5216 − 0.0747i |
| w100 | 01100100 | −0.8209 + 0.1292i |
| w101 | 01100101 | −0.6018 + 0.1929i |
| w102 | 01100110 | −0.8209 − 0.1292i |
| w103 | 01100111 | −0.6018 − 0.1929i |
| w104 | 01101000 | −1.3525 + 0.1471i |
| w105 | 01101001 | −1.0702 + 1.0357i |
| w106 | 01101010 | −1.3525 − 0.1471i |
| w107 | 01101011 | −1.0702 − 1.0357i |
| w108 | 01101100 | −1.4799 + 0.4422i |
| w109 | 01101101 | −0.7653 + 1.1720i |
| w110 | 01101110 | −1.4799 − 0.4422i |
| w111 | 01101111 | −0.7653 − 1.1720i |
| w112 | 01110000 | −0.1054 + 0.0790i |
| w113 | 01110001 | −0.3169 + 0.0841i |
| w114 | 01110010 | −0.1054 − 0.0790i |
| w115 | 01110011 | −0.3169 − 0.0841i |
| w116 | 01110100 | −0.1042 + 0.2345i |
| w117 | 01110101 | −0.3223 + 0.2346i |
| w118 | 01110110 | −0.1042 − 0.2345i |
| w119 | 01110111 | −0.3223 − 0.2346i |
| w120 | 01111000 | −0.1687 + 1.4929i |
| w121 | 01111001 | −0.5173 + 1.4708i |
| w122 | 01111010 | −0.1687 − 1.4929i |
| w123 | 01111011 | −0.5173 − 1.4708i |
| w124 | 01111100 | −0.1455 + 1.2047i |
| w125 | 01111101 | −0.4442 + 1.1814i |
| w126 | 01111110 | −0.1455 − 1.2047i |
| w127 | 01111111 | −0.4442 − 1.1814i | for R=13/16 (or R=1/2, 5/8 or 3/4):

| w index | bit label | Constellation point |
|---|---|---|
| w0 | 0000000 | +1.0422 + 0.3376i |
| w1 | 0000000 | −1.0422 + 0.3376i |
| w2 | 0000001 | +1.0422 − 0.3376i |
| w3 | 0000001 | −1.0422 − 0.3376i |
| w4 | 0000010 | +0.1125 + 0.6269i |
| w5 | 0000010 | −0.1125 + 0.6269i |
| w6 | 0000011 | +0.1125 − 0.6269i |
| w7 | 0000011 | −0.1125 − 0.6269i |
| w8 | 0000100 | +1.0010 + 0.1105i |
| w9 | 0000100 | −1.0010 + 0.1105i |
| w10 | 0000101 | +1.0010 − 0.1105i |
| w11 | 0000101 | −1.0010 − 0.1105i |
| w12 | 0000110 | +0.0978 + 0.0913i |
| w13 | 0000110 | −0.0978 + 0.0913i |
| w14 | 0000111 | +0.0978 − 0.0913i |
| w15 | 0000111 | −0.0978 − 0.0913i |
| w16 | 0001000 | +0.7966 + 0.3496i |
| w17 | 0001000 | −0.7966 + 0.3496i |
| w18 | 0001001 | +0.7966 − 0.3496i |
| w19 | 0001001 | −0.7966 − 0.3496i |
| w20 | 0001010 | +0.1109 + 0.4454i |
| w21 | 0001010 | −0.1109 + 0.4454i |
| w22 | 0001011 | +0.1109 − 0.4454i |
| w23 | 0001011 | −0.1109 − 0.4454i |
| w24 | 0001100 | +0.7613 + 0.1187i |
| w25 | 0001100 | −0.7613 + 0.1187i |
| w26 | 0001101 | +0.7613 − 0.1187i |
| w27 | 0001101 | −0.7613 − 0.1187i |
| w28 | 0001110 | +0.1038 + 0.2705i |
| w29 | 0001110 | −0.1038 + 0.2705i |
| w30 | 0001111 | +0.1038 − 0.2705i |
| w31 | 0001111 | −0.1038 − 0.2705i |
| w32 | 0010000 | +0.5556 + 0.6306i |
| w33 | 0010000 | −0.5556 + 0.6306i |
| w34 | 0010001 | +0.5556 − 0.6306i |
| w35 | 0010001 | −0.5556 − 0.6306i |
| w36 | 0010010 | +0.3351 + 0.6308i |
| w37 | 0010010 | −0.3351 + 0.6308i |
| w38 | 0010011 | +0.3351 − 0.6303i |
| w39 | 0010011 | −0.3351 − 0.6308i |
| w40 | 0010100 | +0.4942 + 0.0780i |
| w41 | 0010100 | −0.4942 + 0.0780i |
| w42 | 0010101 | +0.4942 − 0.0780i |
| w43 | 0010101 | −0.4942 − 0.0780i |
| w44 | 0010110 | +0.2935 + 0.0906i |
| w45 | 0010110 | −0.2935 + 0.0906i |
| w46 | 0010111 | +0.2935 − 0.0906i |
| w47 | 0010111 | −0.2935 − 0.0906i |
| w48 | 0011000 | +0.5761 + 0.4286i |
| w49 | 0011000 | −0.5761 + 0.4286i |
| w50 | 0011001 | +0.5761 − 0.4286i |
| w51 | 0011001 | −0.5761 − 0.4286i |
| w52 | 0011010 | +0.3383 + 0.4404i |
| w53 | 0011010 | −0.3383 + 0.4404i |
| w54 | 0011011 | +0.3383 − 0.4404i |
| w55 | 0011011 | −0.3383 − 0.4404i |
| w56 | 0011100 | +0.5456 + 0.2367i |
| w57 | 0011100 | −0.5456 + 0.2367i |
| w58 | 0011101 | +0.5456 − 0.2367i |
| w59 | 0011101 | −0.5456 − 0.2367i |
| w60 | 0011110 | +0.3172 + 0.2666i |
| w61 | 0011110 | −0.3172 + 0.2666i |
| w62 | 0011111 | +0.3172 − 0.2666i |
| w63 | 0011111 | −0.3172 − 0.2666i |
| w64 | 01000000 | +1.1154 + 0.5839i |
| w65 | 01000001 | −1.1154 + 0.5839i |
| w66 | 01000010 | +1.1154 − 0.5839i |
| w67 | 01000011 | −1.1154 − 0.5839i |
| w68 | 01000100 | +0.1155 + 0.8217i |
| w69 | 01000101 | −0.1155 + 0.8217i |
| w70 | 01000110 | +0.1155 − 0.8217i |
| w71 | 01000111 | −0.1155 − 0.8217i |
| w72 | 01001030 | +1.2844 + 0.1345i |
| w73 | 01001001 | −1.2844 + 0.1345i |
| w74 | 01001010 | +1.2844 − 0.1345i |
| w75 | 01001011 | −1.2844 − 0.1345i |

-continued

| w index | bit label | Constellation point |
|---|---|---|
| w76 | 01001100 | +0.1646 + 1.5274i |
| w77 | 01001101 | −0.1645 + 1.5274i |
| w78 | 01001110 | +0.1646 − 1.5274i |
| w79 | 01001111 | −0.1646 − 1.5274i |
| w80 | 01010000 | +0.8563 + 0.5705i |
| w81 | 01010001 | −0.8563 + 0.5705i |
| w82 | 01010010 | +0.8563 − 0.5705i |
| w83 | 01010011 | −0.8563 − 0.5705i |
| w84 | 01010100 | +0.1239 + 1.0311i |
| w85 | 01010101 | −0.1239 + 1.0311i |
| w86 | 01010110 | +0.1239 − 1.0311i |
| w87 | 01010111 | −0.1239 − 1.0311i |
| w88 | 01011000 | +1.4001 + 0.4092i |
| w89 | 01011001 | −1.4001 + 0.4092i |
| w90 | 01011010 | +1.4001 − 0.4092i |
| w91 | 01011011 | −1.4001 − 0.4092i |
| w92 | 01011100 | +0.1345 + 1.2611i |
| w93 | 01011101 | −0.1345 + 1.2611i |
| w94 | 01011110 | +0.1345 − 1.2611i |
| w95 | 01011111 | −0.1345 − 1.2611i |
| w96 | 01100000 | +0.5970 + 0.8482i |
| w97 | 01100001 | −0.5970 + 0.5482i |
| w98 | 01100010 | +0.5970 − 0.8482i |
| w99 | 01100011 | −0.5970 − 0.8482i |
| w100 | 01100100 | +0.3510 + 0.8405i |
| w101 | 01100101 | −0.3510 + 0.8405i |
| w102 | 01100110 | +0.3510 − 0.8405i |
| w103 | 01100111 | −0.3510 − 0.8405i |
| w104 | 01101000 | +1.1670 + 0.8997i |
| w105 | 01101001 | −1.1670 + 0.8997i |
| w106 | 01101010 | +1.1670 − 0.8997i |
| w107 | 01101011 | −1.1670 − 0.8997i |
| w108 | 01101100 | +0.4543 + 1.3933i |
| w109 | 01101101 | −0.4543 + 1.3933i |
| w110 | 01101110 | +0.4543 − 1.3933i |
| w111 | 01101111 | −0.4543 − 1.3933i |
| w112 | 01110000 | +0.8378 + 0.8041i |
| w113 | 01110001 | −0.8378 + 0.8041i |
| w114 | 01110010 | +0.8378 − 0.8041i |
| w115 | 01110011 | −0.8378 − 0.5041i |
| w116 | 01110100 | +0.3850 + 1.0724i |
| w117 | 01110101 | −0.3850 + 1.0724i |
| w118 | 01110110 | +0.3850 − 1.0724i |
| w119 | 01110111 | −0.3850 − 1.0724i |
| w120 | 01111000 | +0.9031 + 1.0698i |
| w121 | 01111001 | −0.9331 + 1.0698i |
| w122 | 01111010 | +0.9031 − 1.0698i |
| w123 | 01111011 | −0.9331 − 1.0698i |
| w124 | 01111100 | +0.6436 + 1.1770i |
| w125 | 01111101 | −0.6436 + 1.1770i |
| w126 | 01111110 | +0.6436 − 1.1770i |
| w127 | 01111111 | −0.6436 − 1.1770i |

B5) 256-QAM NUC
for R=1/2 (or R=5/8, 3/4 or 13/16):

| w index | bit label | Constellation point |
|---|---|---|
| w0 | 0000000 | −1.2901 + 1.0495i |
| w1 | 0000000 | −1.6350 + 0.1593i |
| w2 | 0000001 | −0.2844 + 0.1296i |
| w3 | 0000001 | −0.3237 + 0.0849i |
| w4 | 0000010 | −1.4625 + 0.7740i |
| w5 | 0000010 | −1.5776 + 0.4735i |
| w6 | 0000011 | −0.2853 + 0.1309i |
| w7 | 0000011 | −0.3228 + 0.0867i |
| w8 | 0000100 | +1.2901 + 1.0495i |
| w9 | 0000100 | +1.6350 + 0.1593i |
| w10 | 0000101 | +0.2844 + 0.1296i |
| w11 | 0000101 | +0.3237 + 0.0849i |
| w12 | 0000110 | +1.4625 + 0.7740i |
| w13 | 0000110 | +1.5776 + 0.4735i |
| w14 | 0000111 | +0.2853 + 0.1309i |
| w15 | 0000111 | +0.3228 + 0.0867i |
| w16 | 0001000 | −0.7273 + 0.6160i |
| w17 | 0001000 | −0.9430 + 0.1100i |
| w18 | 0001001 | −0.5902 + 0.4857i |
| w19 | 0001001 | −0.7502 + 0.1138i |
| w20 | 0001010 | −0.8177 + 0.4841i |
| w21 | 0001010 | −0.9069 + 0.2829i |
| w22 | 0001011 | −0.6355 + 0.4185i |
| w23 | 0001011 | −0.7325 + 0.2088i |
| w24 | 0001100 | +0.7273 + 0.6160i |
| w25 | 0001100 | +0.9430 + 0.1100i |
| w26 | 0001101 | +0.5902 + 0.4857i |
| w27 | 0001101 | +0.7502 + 0.1138i |
| w28 | 0001110 | +0.8177 + 0.4841i |
| w29 | 0001110 | +0.9069 + 0.2829i |
| w30 | 0001111 | +0.6355 + 0.4185i |
| w31 | 0001111 | +0.7325 + 0.2088i |
| w32 | 0010000 | −1.0646 + 1.2876i |
| w33 | 0010000 | −0.1658 + 1.6747i |
| w34 | 0010001 | −0.1053 + 0.1494i |
| w35 | 0010001 | −0.0872 + 0.1390i |
| w36 | 0010010 | −0.7949 + 1.4772i |
| w37 | 0010010 | −0.4907 + 1.6084i |
| w38 | 0010011 | −0.1052 + 0.1495i |
| w39 | 0010011 | −0.0871 + 0.1392i |
| w40 | 0010100 | +1.0646 + 1.2876i |
| w41 | 0010100 | +0.1658 + 1.6747i |
| w42 | 0010101 | +0.1053 + 0.1494i |
| w43 | 0010101 | +0.0872 + 0.1390i |
| w44 | 0010110 | +0.7949 + 1.4772i |
| w45 | 0010110 | +0.4907 + 1.6084i |
| w46 | 0010111 | +0.1052 + 0.1495i |
| w47 | 0010111 | +0.0871 + 0.1392i |
| w48 | 0011000 | −0.5707 + 0.7662i |
| w49 | 0011000 | −0.1088 + 0.9530i |
| w50 | 0011001 | −0.4294 + 0.6363i |
| w51 | 0011001 | −0.1091 + 0.7656i |
| w52 | 0011010 | −0.4490 + 0.8461i |
| w53 | 0011010 | −0.2464 + 0.9270i |
| w54 | 0011011 | −0.3744 + 0.6744i |
| w55 | 0011011 | −0.1699 + 0.7537i |
| w56 | 0011100 | +0.5707 + 0.7662i |
| w57 | 0011100 | +0.1088 + 0.9530i |
| w58 | 0011101 | +0.4294 + 0.6363i |
| w59 | 0011101 | +0.1091 + 0.7656i |
| w60 | 0011110 | +0.4490 + 0.8461i |
| w61 | 0011110 | +0.2464 + 0.9270i |
| w62 | 0011111 | +0.3744 + 0.6744i |
| w63 | 0011111 | +0.1699 + 0.7537i |
| w64 | 01000000 | −1.0382 + 0.8623i |
| w65 | 01000001 | −1.3225 + 0.1320i |
| w66 | 01000010 | −0.3734 + 0.2560i |
| w67 | 01000011 | −0.4582 + 0.1123i |
| w68 | 01000100 | −1.1794 + 0.6376i |
| w69 | 01000101 | −1.2742 + 0.3922i |
| w70 | 01000110 | −0.3799 + 0.2517i |
| w71 | 01000111 | −0.4545 + 0.1251i |
| w72 | 01001000 | +1.0382 + 0.8623i |
| w73 | 01001001 | +1.3225 + 0.1320i |
| w74 | 01001010 | +0.3734 + 0.2560i |
| w75 | 01001011 | +0.4582 + 0.1123i |
| w76 | 01001100 | +1.1794 + 0.6376i |
| w77 | 01001101 | +1.2742 + 0.3922i |
| w78 | 01001110 | +0.3799 + 0.2517i |
| w79 | 01001111 | +0.4545 + 0.1251i |
| w80 | 01010000 | −0.8504 + 0.7217i |
| w81 | 01010001 | −1.0854 + 0.1139i |
| w82 | 01010010 | −0.4968 + 0.3947i |
| w83 | 01010011 | −0.6473 + 0.1138i |
| w84 | 01010100 | −0.9638 + 0.5407i |
| w85 | 01010101 | −1.0441 + 0.3296i |
| w86 | 01010110 | −0.5231 + 0.3644i |
| w87 | 01010111 | −0.6339 + 0.1702i |
| w88 | 01011000 | +0.8504 + 0.7217i |
| w89 | 01011001 | +1.0854 + 0.1139i |
| w90 | 01011010 | +0.4968 + 0.3947i |
| w91 | 01011011 | +0.6473 + 0.1138i |
| w92 | 01011100 | +0.9638 + 0.5407i |
| w93 | 01011101 | +1.0441 + 0.3296i |

| w index | bit label | Constellation point |
|---|---|---|
| w94 | 01011110 | +0.5231 + 0.3644i |
| w95 | 01011111 | +0.6339 + 0.1702i |
| w96 | 01100000 | −0.8555 + 1.0542i |
| w97 | 01100001 | −0.1322 + 1.3631i |
| w98 | 01100010 | −0.1938 + 0.3621i |
| w99 | 01100011 | −0.0928 + 0.3970i |
| w100 | 01100100 | −0.6363 + 1.2064i |
| w101 | 01100101 | −0.3929 + 1.3102i |
| w102 | 01100110 | −0.1909 + 0.3627i |
| w103 | 01100111 | −0.0937 + 0.3973i |
| w104 | 01101000 | +0.8555 + 1.0542i |
| w105 | 01101001 | +0.1322 + 1.3631i |
| w106 | 01101010 | +0.1938 + 0.3521i |
| w107 | 01101011 | +0.0928 + 0.3970i |
| w108 | 01101100 | +0.6363 + 1.2064i |
| w109 | 01101101 | +0.3929 + 1.3102i |
| w110 | 01101110 | +0.1909 + 0.3627i |
| w111 | 01101111 | +0.0937 + 0.3973i |
| w112 | 01110000 | −0.6961 + 0.8850i |
| w113 | 01110001 | −0.1124 + 1.1327i |
| w114 | 01110010 | −0.3224 + 0.5236i |
| w115 | 01110011 | −0.1054 + 0.5979i |
| w116 | 01110100 | −0.5229 + 1.0037i |
| w117 | 01110101 | −0.3160 + 1.0913i |
| w118 | 01110110 | −0.3016 + 0.5347i |
| w119 | 01110111 | −0.1230 + 0.5949i |
| w120 | 01111000 | +0.6961 + 0.8850i |
| w121 | 01111001 | +0.1124 + 1.1327i |
| w122 | 01111010 | +0.3224 + 0.5236i |
| w123 | 01111011 | +0.1054 + 0.5979i |
| w124 | 01111100 | +0.5229 + 1.0037i |
| w125 | 01111101 | +0.3160 + 1.0913i |
| w126 | 01111110 | +0.3016 + 0.5347i |
| w127 | 01111111 | +0.1230 + 0.5949i |
| w128 | 10000000 | −1.2901 − 1.0495i |
| w129 | 10000001 | −1.6350 − 0.1593i |
| w130 | 10000010 | −0.2844 − 0.1296i |
| w131 | 10000011 | −0.3237 − 0.0849i |
| w132 | 10000100 | −1.4625 − 0.7740i |
| w133 | 10000101 | −1.5776 − 0.4735i |
| w134 | 10000110 | −0.2853 − 0.1309i |
| w135 | 10000111 | −0.3228 − 0.0867i |
| w136 | 10001000 | +1.2901 − 1.0495i |
| w137 | 10001001 | +1.6350 − 0.1593i |
| w138 | 10001010 | +0.2844 − 0.1296i |
| w139 | 10001011 | +0.3237 − 0.0849i |
| w140 | 10001100 | +1.4625 − 0.7740i |
| w141 | 10001101 | +1.5776 − 0.4735i |
| w142 | 10001110 | +0.2853 − 0.1309i |
| w143 | 10001111 | +0.3228 − 0.0867i |
| w144 | 10010000 | −0.7273 − 0.6160i |
| w145 | 10010001 | −0.9430 − 0.1100i |
| w146 | 10010010 | −0.5902 − 0.4857i |
| w147 | 10010011 | −0.7502 − 0.1138i |
| w148 | 10010100 | −0.8177 − 0.4841i |
| w149 | 10010101 | −0.9069 − 0.2829i |
| w150 | 10010110 | −0.6355 − 0.4185i |
| w151 | 10010111 | −0.7325 − 0.2088i |
| w152 | 10011000 | +0.7273 − 0.6160i |
| w153 | 10011001 | +0.9430 − 0.1100i |
| w154 | 10011010 | +0.5902 − 0.4857i |
| w155 | 10011011 | +0.7502 − 0.1138i |
| w156 | 10011100 | +0.8177 − 0.4841i |
| w157 | 10011101 | +0.9069 − 0.2829i |
| w158 | 10011110 | +0.6355 − 0.4185i |
| w159 | 10011111 | +0.7325 − 0.2088i |
| w160 | 10100000 | −1.0646 − 1.2876i |
| w161 | 10100001 | −0.1658 − 1.6747i |
| w162 | 10100010 | −0.1053 − 0.1494i |
| w163 | 10100011 | −0.0872 − 0.1390i |
| w164 | 10100100 | −0.7949 − 1.4772i |
| w165 | 10100101 | −0.4907 − 1.6084i |
| w166 | 10100110 | −0.1052 − 0.1495i |
| w167 | 10100111 | −0.0871 − 0.1392i |
| w168 | 10101000 | +1.0646 − 1.2876i |
| w169 | 10101001 | +0.1658 − 1.6747i |
| w170 | 10101010 | +0.1053 − 0.1494i |
| w171 | 10101011 | +0.0872 − 0.1390i |
| w172 | 10101100 | +0.7949 − 1.4772i |
| w173 | 10101101 | +0.4907 − 1.6084i |
| w174 | 10101110 | +0.1052 − 0.1495i |
| w175 | 10101111 | +0.0871 − 0.1392i |
| w176 | 10110000 | −0.5707 − 0.7662i |
| w177 | 10110001 | −0.1088 − 0.9530i |
| w178 | 10110010 | −0.4294 − 0.6363i |
| w179 | 10110011 | −0.1091 − 0.7656i |
| w180 | 10110100 | −0.4490 − 0.8461i |
| w181 | 10110101 | −0.2464 − 0.9270i |
| w182 | 10110110 | −0.3744 − 0.6744i |
| w183 | 10110111 | −0.1699 − 0.7537i |
| w184 | 10111000 | +0.5707 − 0.7662i |
| w185 | 10111001 | +0.1088 − 0.9530i |
| w186 | 10111010 | +0.4294 − 0.6363i |
| w187 | 10111011 | +0.1091 − 0.7656i |
| w188 | 10111100 | +0.4490 − 0.8461i |
| w189 | 10111101 | +0.2464 − 0.9270i |
| w190 | 10111110 | +0.3744 − 0.6744i |
| w191 | 10111111 | +0.1699 − 0.7537i |
| w192 | 11000000 | −1.0382 − 0.8623i |
| w193 | 11000001 | −1.3225 − 0.1320i |
| w194 | 11000010 | −0.3734 − 0.2560i |
| w195 | 11000011 | −0.4582 − 0.1123i |
| w196 | 11000100 | −1.1794 − 0.6376i |
| w197 | 11000101 | −1.2742 − 0.3922i |
| w198 | 11000110 | −0.3799 − 0.2517i |
| w199 | 11000111 | −0.4545 − 0.1251i |
| w200 | 11001000 | +1.0382 − 0.8623i |
| w201 | 11001001 | +1.3225 − 0.1320i |
| w202 | 11001010 | +0.3734 − 0.2560i |
| w203 | 11001011 | +0.4582 − 0.1123i |
| w204 | 11001100 | +1.1794 − 0.6376i |
| w205 | 11001101 | +1.2742 − 0.3922i |
| w206 | 11001110 | +0.3799 − 0.2517i |
| w207 | 11001111 | +0.4545 − 0.1251i |
| w208 | 11010000 | −0.8504 − 0.7217i |
| w209 | 11010001 | −1.0854 − 0.1139i |
| w210 | 11010010 | −0.4968 − 0.3947i |
| w211 | 11010011 | −0.6473 − 0.1138i |
| w212 | 11010100 | −0.9638 − 0.5407i |
| w213 | 11010101 | −1.0441 − 0.3296i |
| w214 | 11010110 | −0.5231 − 0.3644i |
| w215 | 11010111 | −0.6339 − 0.1702i |
| w216 | 11011000 | +0.8504 − 0.7217i |
| w217 | 11011001 | +1.0854 − 0.1139i |
| w218 | 11011010 | +0.4968 − 0.3947i |
| w219 | 11011011 | +0.6473 − 0.1138i |
| w220 | 11011100 | +0.9638 − 0.5407i |
| w221 | 11011101 | +1.0441 − 0.3296i |
| w222 | 11011110 | +0.5231 − 0.3644i |
| w223 | 11011111 | +0.6339 − 0.1702i |
| w224 | 11100000 | −0.8555 − 1.0542i |
| w225 | 11100001 | −0.1322 − 1.3631i |
| w226 | 11100010 | −0.1938 − 0.3621i |
| w227 | 11100011 | −0.0928 − 0.3970i |
| w228 | 11100100 | −0.6363 − 1.2064i |
| w229 | 11100101 | −0.3929 − 1.3102i |
| w230 | 11100110 | −0.1909 − 0.3627i |
| w231 | 11100111 | −0.0937 − 0.3973i |
| w232 | 11101000 | +0.8555 − 1.0542i |
| w233 | 11101001 | +0.1322 − 1.3631i |
| w234 | 11101010 | +0.1938 − 0.3621i |
| w235 | 11101011 | +0.0928 − 0.3970i |
| w236 | 11101100 | +0.6363 − 1.2064i |
| w237 | 11101101 | +0.3929 − 1.3102i |
| w238 | 11101110 | +0.1909 − 0.3627i |
| w239 | 11101111 | +0.0937 − 0.3973i |
| w240 | 11110000 | −0.6961 − 0.8850i |
| w241 | 11110001 | −0.1124 − 1.1327i |
| w242 | 11110010 | −0.3224 − 0.5236i |
| w243 | 11110011 | −0.1054 − 0.5979i |
| w244 | 11110100 | −0.5229 − 1.0037i |
| w245 | 11110101 | −0.3160 − 1.0913i |
| w246 | 11110110 | −0.3016 − 0.5347i |
| w247 | 11110111 | −0.1230 − 0.5949i |

-continued

| w index | bit label | Constellation point |
|---|---|---|
| w248 | 11111000 | +0.6961 − 0.8850i |
| w249 | 11111001 | +0.1124 − 1.1327i |
| w250 | 11111010 | +0.3224 − 0.5236i |
| w251 | 11111011 | +0.1054 − 0.5979i |
| w252 | 11111100 | +0.5229 − 1.0037i |
| w253 | 11111101 | +0.3160 − 1.0913i |
| w254 | 11111110 | +0.3016 − 0.5347i |
| w255 | 11111111 | +0.1230 − 0.5949i | for R=5/8 (or R=1/2, 3/4 or 13/16):

| w index | bit label | Constellation point |
|---|---|---|
| w0 | 0000000 | −1.2639 + 1.0084i |
| w1 | 0000000 | −0.7380 + 0.6059i |
| w2 | 0000001 | −1.0466 + 1.2415i |
| w3 | 0000001 | −0.6190 + 0.7456i |
| w4 | 0000010 | −1.2639 − 1.0084i |
| w5 | 0000010 | −0.7380 − 0.6059i |
| w6 | 0000011 | −1.0466 − 1.2415i |
| w7 | 0000011 | −0.6190 − 0.7456i |
| w8 | 0000100 | −1.4263 + 0.7399i |
| w9 | 0000100 | −0.8292 + 0.4496i |
| w10 | 0000101 | −0.7829 + 1.4275i |
| w11 | 0000101 | −0.4707 + 0.8613i |
| w12 | 0000110 | −1.4263 − 0.7399i |
| w13 | 0000110 | −0.8292 − 0.4496i |
| w14 | 0000111 | −0.7829 − 1.4275i |
| w15 | 0000111 | −0.4707 − 0.8613i |
| w16 | 0001000 | −1.0529 + 0.8398i |
| w17 | 0001000 | −0.8839 + 0.7116i |
| w18 | 0001001 | −0.8751 + 1.0349i |
| w19 | 0001001 | −0.7380 + 0.8761i |
| w20 | 0001010 | −1.0529 − 0.8398i |
| w21 | 0001010 | −0.8839 − 0.7116i |
| w22 | 0001011 | −0.8751 − 1.0349i |
| w23 | 0001011 | −0.7380 − 0.8761i |
| w24 | 0001100 | −1.1857 + 0.6167i |
| w25 | 0001100 | −0.9935 + 0.5250i |
| w26 | 0001101 | −0.6570 + 1.1922i |
| w27 | 0001101 | −0.5568 + 1.0106i |
| w28 | 0001110 | −1.1857 − 0.6167i |
| w29 | 0001110 | −0.9935 − 0.5250i |
| w30 | 0001111 | −0.6570 − 1.1922i |
| w31 | 0001111 | −0.5568 − 1.0106i |
| w32 | 0010000 | +1.2639 + 1.0084i |
| w33 | 0010000 | +0.7380 + 0.6059i |
| w34 | 0010001 | +1.0466 + 1.2415i |
| w35 | 0010001 | +0.6190 + 0.7456i |
| w36 | 0010010 | +1.2639 − 1.0084i |
| w37 | 0010010 | +0.7380 − 0.6059i |
| w38 | 0010011 | +1.0466 − 1.2415i |
| w39 | 0010011 | +0.6190 − 0.7456i |
| w40 | 0010100 | +1.4263 + 0.7399i |
| w41 | 0010100 | +0.8292 + 0.4496i |
| w42 | 0010101 | +0.7829 + 1.4275i |
| w43 | 0010101 | +0.4707 + 0.8613i |
| w44 | 0010110 | +1.4263 − 0.7399i |
| w45 | 0010110 | +0.8292 − 0.4496i |
| w46 | 0010111 | +0.7829 − 1.4275i |
| w47 | 0010111 | +0.4707 − 0.8613i |
| w48 | 0011000 | +1.0529 + 0.8398i |
| w49 | 0011000 | +0.8839 + 0.7116i |
| w50 | 0011001 | +0.8751 + 1.0349i |
| w51 | 0011001 | +0.7380 + 0.8761i |
| w52 | 0011010 | +1.0529 − 0.8398i |
| w53 | 0011010 | +0.8839 − 0.7116i |
| w54 | 0011011 | +0.8751 − 1.0349i |
| w55 | 0011011 | +0.7380 − 0.8761i |
| w56 | 0011100 | +1.1857 + 0.6167i |
| w57 | 0011100 | +0.9935 + 0.5250i |
| w58 | 0011101 | +0.6570 + 1.1922i |
| w59 | 0011101 | +0.5568 + 1.0106i |
| w60 | 0011110 | +1.1857 − 0.6167i |
| w61 | 0011110 | +0.9935 − 0.5250i |

-continued

| w index | bit label | Constellation point |
|---|---|---|
| w62 | 0011111 | +0.6570 − 1.1922i |
| w63 | 0011111 | +0.5568 − 1.0106i |
| w64 | 01000000 | −0.2459 + 0.2059i |
| w65 | 01000001 | −0.6025 + 0.5077i |
| w66 | 01000010 | −0.0949 + 0.2552i |
| w67 | 01000011 | −0.5005 + 0.6310i |
| w68 | 01000100 | −0.2459 − 0.2059i |
| w69 | 01000101 | −0.6025 − 0.5077i |
| w70 | 01000110 | −0.0949 − 0.2552i |
| w71 | 01000111 | −0.5005 − 0.6310i |
| w72 | 01001000 | −0.2508 + 0.2016i |
| w73 | 01001001 | −0.6756 + 0.3836i |
| w74 | 01001010 | −0.0912 + 0.2556i |
| w75 | 01001011 | −0.3899 + 0.7222i |
| w76 | 01001100 | −0.2508 − 0.2016i |
| w77 | 01001101 | −0.6756 − 0.3836i |
| w78 | 01001110 | −0.0912 − 0.2556i |
| w79 | 01001111 | −0.3899 − 0.7222i |
| w80 | 01010000 | −0.3507 + 0.3002i |
| w81 | 01010001 | −0.4734 + 0.4072i |
| w82 | 01010010 | −0.2035 + 0.4116i |
| w83 | 01010011 | −0.3688 + 0.5265i |
| w84 | 01010100 | −0.3507 − 0.3002i |
| w85 | 01010101 | −0.4734 − 0.4072i |
| w86 | 01010110 | −0.2035 − 0.4116i |
| w87 | 01010111 | −0.3688 − 0.5265i |
| w88 | 01011000 | −0.3739 + 0.2698i |
| w89 | 01011001 | −0.5263 + 0.3281i |
| w90 | 01011010 | −0.1890 + 0.4220i |
| w91 | 01011011 | −0.3094 + 0.5791i |
| w92 | 01011100 | −0.3739 − 0.2698i |
| w93 | 01011101 | −0.5263 − 0.3281i |
| w94 | 01011110 | −0.1890 − 0.4220i |
| w95 | 01011111 | −0.3094 − 0.5791i |
| w96 | 01100000 | +0.2459 + 0.2059i |
| w97 | 01100001 | +0.6025 + 0.5077i |
| w98 | 01100010 | +0.0949 + 0.2552i |
| w99 | 01100011 | +0.5005 + 0.6310i |
| w100 | 01100100 | +0.2459 − 0.2059i |
| w101 | 01100101 | +0.6025 − 0.5077i |
| w102 | 01100110 | +0.0949 − 0.2552i |
| w103 | 01100111 | +0.5005 − 0.6310i |
| w104 | 01101000 | +0.2508 + 0.2016i |
| w105 | 01101001 | +0.6756 + 0.3836i |
| w106 | 01101010 | +0.0912 + 0.2556i |
| w107 | 01101011 | +0.3899 + 0.7222i |
| w108 | 01101100 | +0.2508 − 0.2016i |
| w109 | 01101101 | +0.6756 − 0.3836i |
| w110 | 01101110 | +0.0912 − 0.2556i |
| w111 | 01101111 | +0.3899 − 0.7222i |
| w112 | 01110000 | +0.3507 + 0.3002i |
| w113 | 01110001 | +0.4734 + 0.4072i |
| w114 | 01110010 | +0.2035 + 0.4116i |
| w115 | 01110011 | +0.3688 + 0.5265i |
| w116 | 01110100 | +0.3507 − 0.3002i |
| w117 | 01110101 | +0.4734 − 0.4072i |
| w118 | 01110110 | +0.2035 − 0.4116i |
| w119 | 01110111 | +0.3688 − 0.5265i |
| w120 | 01111000 | +0.3739 + 0.2698i |
| w121 | 01111001 | +0.5263 + 0.3281i |
| w122 | 01111010 | +0.1890 + 0.4220i |
| w123 | 01111011 | +0.3094 + 0.5791i |
| w124 | 01111100 | +0.3739 − 0.2698i |
| w125 | 01111101 | +0.5263 − 0.3281i |
| w126 | 01111110 | +0.1890 − 0.4220i |
| w127 | 01111111 | +0.3094 − 0.5791i |
| w128 | 10000000 | −1.5843 + 0.1512i |
| w129 | 10000001 | −0.9275 + 0.0940i |
| w130 | 10000010 | −0.1639 + 1.6237i |
| w131 | 10000011 | −0.1000 + 0.9905i |
| w132 | 10000100 | −1.5843 − 0.1512i |
| w133 | 10000101 | −0.9275 − 0.0940i |
| w134 | 10000110 | −0.1639 − 1.6237i |
| w135 | 10000111 | −0.1000 − 0.9905i |
| w136 | 10001000 | −1.5329 + 0.4508i |
| w137 | 10001001 | −0.8933 + 0.2781i |
| w138 | 10001010 | −0.4843 + 1.5571i |

| w index | bit label | Constellation point |
|---|---|---|
| w139 | 10001011 | −0.2959 + 0.9454i |
| w140 | 10001100 | −1.5329 − 0.4508i |
| w141 | 10001101 | −0.8933 − 0.2781i |
| w142 | 10001110 | −0.4843 − 1.5571i |
| w143 | 10001111 | −0.2959 − 0.9454i |
| w144 | 10010000 | −1.3147 + 0.1263i |
| w145 | 10010001 | −1.1029 + 0.1084i |
| w146 | 10010010 | −0.1381 + 1.3595i |
| w147 | 10010011 | −0.1179 + 1.1562i |
| w148 | 10010100 | −1.3147 − 0.1263i |
| w149 | 10010101 | −1.1029 − 0.1084i |
| w150 | 10010110 | −0.1381 − 1.3595i |
| w151 | 10010111 | −0.1179 − 1.1562i |
| w152 | 10011000 | −1.2724 + 0.3763i |
| w153 | 10011001 | −1.0662 + 0.3220i |
| w154 | 10011010 | −0.4077 + 1.3024i |
| w155 | 10011011 | −0.3470 + 1.1060i |
| w156 | 10011100 | −1.2724 − 0.3763i |
| w157 | 10011101 | −1.0662 − 0.3220i |
| w158 | 10011110 | −0.4077 − 1.3024i |
| w159 | 10011111 | −0.3470 − 1.1060i |
| w160 | 10100000 | +1.5843 + 0.1512i |
| w161 | 10100001 | +0.9275 + 0.0940i |
| w162 | 10100010 | +0.1639 + 1.6237i |
| w163 | 10100011 | +0.1000 + 0.9905i |
| w164 | 10100100 | +1.5843 − 0.1512i |
| w165 | 10100101 | +0.9275 − 0.0940i |
| w166 | 10100110 | +0.1639 − 1.6237i |
| w167 | 10100111 | +0.1000 − 0.9905i |
| w168 | 10101000 | +1.5329 + 0.4508i |
| w169 | 10101001 | +0.8933 + 0.2781i |
| w170 | 10101010 | +0.4843 + 1.5571i |
| w171 | 10101011 | +0.2959 + 0.9454i |
| w172 | 10101100 | +1.5329 − 0.4508i |
| w173 | 10101101 | +0.8933 − 0.2781i |
| w174 | 10101110 | +0.4843 − 1.5571i |
| w175 | 10101111 | +0.2959 − 0.9454i |
| w176 | 10110000 | +1.3147 + 0.1263i |
| w177 | 10110001 | +1.1029 + 0.1084i |
| w178 | 10110010 | +0.1381 + 1.3595i |
| w179 | 10110011 | +0.1179 + 1.1562i |
| w180 | 10110100 | +1.3147 − 0.1263i |
| w181 | 10110101 | +1.1029 − 0.1084i |
| w182 | 10110110 | +0.1381 − 1.3595i |
| w183 | 10110111 | +0.1179 − 1.1562i |
| w184 | 10111000 | +1.2724 + 0.3763i |
| w185 | 10111001 | +1.0662 + 0.3220i |
| w186 | 10111010 | +0.4077 + 1.3024i |
| w187 | 10111011 | +0.3470 + 1.1060i |
| w188 | 10111100 | +1.2724 − 0.3763i |
| w189 | 10111101 | +1.0662 − 0.3220i |
| w190 | 10111110 | +0.4077 − 1.3024i |
| w191 | 10111111 | +0.3470 − 1.1060i |
| w192 | 11000000 | −0.2552 + 0.0725i |
| w193 | 11000001 | −0.7681 + 0.0832i |
| w194 | 11000010 | −0.0726 + 0.0865i |
| w195 | 11000011 | −0.0867 + 0.8378i |
| w196 | 11000100 | −0.2552 − 0.0725i |
| w197 | 11000101 | −0.7681 − 0.0832i |
| w198 | 11000110 | −0.0726 − 0.0865i |
| w199 | 11000111 | −0.0867 − 0.8378i |
| w200 | 11001000 | −0.2567 + 0.0753i |
| w201 | 11001001 | −0.7371 + 0.2323i |
| w202 | 11001010 | −0.0722 + 0.0866i |
| w203 | 11001011 | −0.2417 + 0.8000i |
| w204 | 11001100 | −0.2567 − 0.0753i |
| w205 | 11001101 | −0.7371 − 0.2323i |
| w206 | 11001110 | −0.0722 − 0.0866i |
| w207 | 11001111 | −0.2417 − 0.8000i |
| w208 | 11010000 | −0.4495 + 0.0766i |
| w209 | 11010001 | −0.6140 + 0.0811i |
| w210 | 11010010 | −0.0717 + 0.5169i |
| w211 | 11010011 | −0.0837 + 0.6868i |
| w212 | 11010100 | −0.4495 − 0.0766i |
| w213 | 11010101 | −0.6140 − 0.0811i |
| w214 | 11010110 | −0.0717 − 0.5169i |
| w215 | 11010111 | −0.0837 − 0.6868i |
| w216 | 11011000 | −0.4423 + 0.1097i |
| w217 | 11011001 | −0.5925 + 0.1765i |
| w218 | 11011010 | −0.0883 + 0.5092i |
| w219 | 11011011 | −0.1746 + 0.6612i |
| w220 | 11011100 | −0.4423 − 0.1097i |
| w221 | 11011101 | −0.5925 − 0.1765i |
| w222 | 11011110 | −0.0883 − 0.5092i |
| w223 | 11011111 | −0.1746 − 0.6612i |
| w224 | 11100000 | +0.2552 + 0.0725i |
| w225 | 11100001 | +0.7681 + 0.0832i |
| w226 | 11100010 | +0.0726 + 0.0865i |
| w227 | 11100011 | +0.0867 + 0.8378i |
| w228 | 11100100 | +0.2552 − 0.0725i |
| w229 | 11100101 | +0.7681 − 0.0832i |
| w230 | 11100110 | +0.0726 − 0.0865i |
| w231 | 11100111 | +0.0867 − 0.8378i |
| w232 | 11101000 | +0.2567 + 0.0753i |
| w233 | 11101001 | +0.7371 + 0.2323i |
| w234 | 11101010 | +0.0722 + 0.0866i |
| w235 | 11101011 | +0.2417 + 0.8000i |
| w236 | 11101100 | +0.2567 − 0.0753i |
| w237 | 11101101 | +0.7371 − 0.2323i |
| w238 | 11101110 | +0.0722 − 0.0866i |
| w239 | 11101111 | +0.2417 − 0.8000i |
| w240 | 11110000 | +0.4495 + 0.0766i |
| w241 | 11110001 | +0.6140 + 0.0811i |
| w242 | 11110010 | +0.0717 + 0.5169i |
| w243 | 11110011 | +0.0837 + 0.6868i |
| w244 | 11110100 | +0.4495 − 0.0766i |
| w245 | 11110101 | +0.6140 − 0.0811i |
| w246 | 11110110 | +0.0717 − 0.5169i |
| w247 | 11110111 | +0.0837 − 0.6868i |
| w248 | 11111000 | +0.4423 + 0.1097i |
| w249 | 11111001 | +0.5925 + 0.1765i |
| w250 | 11111010 | +0.0883 + 0.5092i |
| w251 | 11111011 | +0.1746 + 0.6612i |
| w252 | 11111100 | +0.4423 − 0.1097i |
| w253 | 11111101 | +0.5925 − 0.1765i |
| w254 | 11111110 | +0.0883 − 0.5092i |
| w255 | 11111111 | +0.1746 − 0.6612i | for R=3/4 (or R=1/2, 5/8 or 13/16):

| w index | bit label | Constellation point |
|---|---|---|
| w0 | 0000000 | −0.5207 + 1.2132i |
| w1 | 0000000 | −0.3103 + 1.2359i |
| w2 | 0000001 | −1.1610 + 1.1297i |
| w3 | 0000001 | −0.1051 + 1.2649i |
| w4 | 0000010 | −0.6193 + 0.6523i |
| w5 | 0000010 | −0.4633 + 0.6225i |
| w6 | 0000011 | −1.2194 + 0.5861i |
| w7 | 0000011 | −0.0684 + 0.5460i |
| w8 | 0000100 | +0.5207 + 1.2132i |
| w9 | 0000100 | +0.3103 + 1.2359i |
| w10 | 0000101 | +1.1610 + 1.1297i |
| w11 | 0000101 | +0.1051 + 1.2649i |
| w12 | 0000110 | +0.6193 + 0.6523i |
| w13 | 0000110 | +0.4633 + 0.6225i |
| w14 | 0000111 | +1.2194 + 0.5861i |
| w15 | 0000111 | +0.0684 + 0.5460i |
| w16 | 0001000 | −0.6089 + 1.4273i |
| w17 | 0001000 | −0.3588 + 1.4645i |
| w18 | 0001001 | −0.8292 + 1.2973i |
| w19 | 0001001 | −0.1197 + 1.4960i |
| w20 | 0001010 | −0.7956 + 0.6768i |
| w21 | 0001010 | −0.3209 + 0.5978i |
| w22 | 0001011 | −1.0079 + 0.6851i |
| w23 | 0001011 | −0.1960 + 0.5676i |
| w24 | 0001100 | +0.6089 + 1.4273i |
| w25 | 0001100 | +0.3588 + 1.4645i |
| w26 | 0001101 | +0.8292 + 1.2973i |
| w27 | 0001101 | +0.1197 + 1.4960i |
| w28 | 0001110 | +0.7956 + 0.6768i |
| w29 | 0001110 | +0.3209 + 0.5978i |

| w index | bit label | Constellation point |
| --- | --- | --- |
| w30 | 0001111 | +1.0079 + 0.6851i |
| w31 | 0001111 | +0.1960 + 0.5676i |
| w32 | 0010000 | −0.5207 − 1.2132i |
| w33 | 0010000 | −0.3103 − 1.2359i |
| w34 | 0010001 | −1.1610 − 1.1297i |
| w35 | 0010001 | −0.1051 − 1.2649i |
| w36 | 0010010 | −0.6193 − 0.6523i |
| w37 | 0010010 | −0.4633 − 0.6225i |
| w38 | 0010011 | −1.2194 − 0.5861i |
| w39 | 0010011 | −0.0684 − 0.5460i |
| w40 | 0010100 | +0.5207 − 1.2132i |
| w41 | 0010100 | +0.3103 − 1.2359i |
| w42 | 0010101 | +1.1610 − 1.1297i |
| w43 | 0010101 | +0.1051 − 1.2649i |
| w44 | 0010110 | +0.6193 − 0.6523i |
| w45 | 0010110 | +0.4633 − 0.6225i |
| w46 | 0010111 | +1.2194 + 0.5861i |
| w47 | 0010111 | +0.0684 + 0.5460i |
| w48 | 0011000 | −0.6089 − 1.4273i |
| w49 | 0011000 | −0.3588 − 1.4645i |
| w50 | 0011001 | −0.8292 − 1.2973i |
| w51 | 0011001 | −0.1197 − 1.4960i |
| w52 | 0011010 | −0.7956 − 0.6768i |
| w53 | 0011010 | −0.3209 − 0.5978i |
| w54 | 0011011 | −1.0079 − 0.6851i |
| w55 | 0011011 | −0.1960 − 0.5676i |
| w56 | 0011100 | +0.6089 − 1.4273i |
| w57 | 0011100 | +0.3588 − 1.4645i |
| w58 | 0011101 | +0.8292 − 1.2973i |
| w59 | 0011001 | +0.1197 − 1.4960i |
| w60 | 0011110 | +0.7956 − 0.6768i |
| w61 | 0011110 | +0.3209 − 0.5978i |
| w62 | 0011111 | +1.0079 − 0.6851i |
| w63 | 0011111 | +0.1960 − 0.5676i |
| w64 | 01000000 | −0.4992 + 1.0060i |
| w65 | 01000001 | −0.3097 + 1.0437i |
| w66 | 01000010 | −1.2435 + 0.8749i |
| w67 | 01000011 | −0.0961 + 1.0730i |
| w68 | 01000100 | −0.5761 + 0.8259i |
| w69 | 01000101 | −0.4319 + 0.7814i |
| w70 | 01000110 | −1.4344 + 0.6815i |
| w71 | 01000111 | −0.0548 + 0.6842i |
| w72 | 01001000 | +0.4992 + 1.0060i |
| w73 | 01001001 | +0.3097 + 1.0437i |
| w74 | 01001010 | +1.2435 + 0.8749i |
| w75 | 01001011 | +0.0961 + 1.0730i |
| w76 | 01001100 | +0.5761 + 0.8259i |
| w77 | 01001101 | +0.4319 + 0.7814i |
| w78 | 01001110 | +1.4344 + 0.6815i |
| w79 | 01001111 | +0.0548 + 0.6842i |
| w80 | 01010000 | −0.6956 + 1.0381i |
| w81 | 01010001 | −0.2552 + 0.9082i |
| w82 | 01010010 | −0.8938 + 1.0757i |
| w83 | 01010011 | −0.0867 + 0.8997i |
| w84 | 01010100 | −0.7562 + 0.8504i |
| w85 | 01010101 | −0.2903 + 0.7608i |
| w86 | 01010110 | −0.9633 + 0.8762i |
| w87 | 01010111 | −0.1482 + 0.7338i |
| w88 | 01011000 | +0.6956 + 1.0381i |
| w89 | 01011001 | +0.2552 + 0.9082i |
| w90 | 01011010 | +0.8938 + 1.0757i |
| w91 | 01011011 | +0.0867 + 0.8997i |
| w92 | 01011100 | +0.7562 + 0.8504i |
| w93 | 01011101 | +0.2903 + 0.7608i |
| w94 | 01011110 | +0.9633 + 0.8762i |
| w95 | 01011111 | +0.1482 + 0.7338i |
| w96 | 01100000 | −0.4992 − 1.0060i |
| w97 | 01100001 | −0.3097 − 1.0437i |
| w98 | 01100010 | −1.2435 − 0.8749i |
| w99 | 01100011 | −0.0961 − 1.0730i |
| w100 | 01100100 | −0.5761 − 0.8259i |
| w101 | 01100101 | −0.4319 − 0.7814i |
| w102 | 01100110 | −1.4344 − 0.6815i |
| w103 | 01100111 | −0.0548 − 0.6842i |
| w104 | 01101000 | +0.4992 − 1.0060i |
| w105 | 01101001 | +0.3097 − 1.0437i |
| w106 | 01101010 | +1.2435 − 0.8749i |
| w107 | 01101011 | +0.0961 − 1.0730i |
| w108 | 01101100 | +0.5761 − 0.8259i |
| w109 | 01101101 | +0.4319 − 0.7814i |
| w110 | 01101110 | +1.4344 − 0.6815i |
| w111 | 01101111 | +0.0548 − 0.6842i |
| w112 | 01110000 | −0.6956 − 1.0381i |
| w113 | 01110001 | −0.2552 − 0.9082i |
| w114 | 01110010 | −0.8938 − 1.0757i |
| w115 | 01110011 | −0.0867 − 0.8997i |
| w116 | 01110100 | −0.7562 − 0.8504i |
| w117 | 01110101 | −0.2903 − 0.7608i |
| w118 | 01110110 | −0.9633 − 0.8762i |
| w119 | 01110111 | −0.1482 − 0.7338i |
| w120 | 01111000 | +0.6956 − 1.0381i |
| w121 | 01111001 | +0.2552 − 0.9082i |
| w122 | 01111010 | +0.8938 − 1.0757i |
| w123 | 01111011 | +0.0867 − 0.8997i |
| w124 | 01111100 | +0.7562 − 0.8504i |
| w125 | 01111101 | +0.2903 − 0.7608i |
| w126 | 01111110 | +0.9633 − 0.8762i |
| w127 | 01111111 | +0.1482 − 0.7338i |
| w128 | 10000000 | −0.6538 + 0.0691i |
| w129 | 10000001 | −0.5051 + 0.0654i |
| w130 | 10000010 | −1.4515 + 0.1246i |
| w131 | 10000011 | −0.0720 + 0.0589i |
| w132 | 10000100 | −0.6396 + 0.4933i |
| w133 | 10000101 | −0.4850 + 0.4726i |
| w134 | 10000110 | −1.4339 + 0.3828i |
| w135 | 10000111 | −0.0708 + 0.4166i |
| w136 | 10001000 | +0.6538 + 0.0691i |
| w137 | 10001001 | +0.5051 + 0.0654i |
| w138 | 10001010 | +1.4515 + 0.1246i |
| w139 | 10001011 | +0.0720 + 0.0589i |
| w140 | 10001100 | +0.6396 + 0.4933i |
| w141 | 10001101 | +0.4850 + 0.4726i |
| w142 | 10001110 | +1.4339 + 0.3828i |
| w143 | 10001111 | +0.0708 + 0.4166i |
| w144 | 10010000 | −0.8080 + 0.0721i |
| w145 | 10010001 | −0.3603 + 0.0619i |
| w146 | 10010010 | −0.9770 + 0.0640i |
| w147 | 10010011 | −0.2162 + 0.0599i |
| w148 | 10010100 | −0.8066 + 0.5082i |
| w149 | 10010101 | −0.3436 + 0.4483i |
| w150 | 10010110 | −0.9839 + 0.5111i |
| w151 | 10010111 | −0.2091 + 0.4280i |
| w152 | 10011000 | +0.8080 + 0.0721i |
| w153 | 10011001 | +0.3603 + 0.0619i |
| w154 | 10011010 | +0.9770 + 0.0640i |
| w155 | 10011011 | +0.2162 + 0.0599i |
| w156 | 10011100 | +0.8066 + 0.5082i |
| w157 | 10011101 | +0.3436 + 0.4483i |
| w158 | 10011110 | +0.9839 + 0.5111i |
| w159 | 10011111 | +0.2091 + 0.4280i |
| w160 | 10100000 | −0.6538 − 0.0691i |
| w161 | 10100001 | −0.5051 − 0.0654i |
| w162 | 10100010 | −1.4515 − 0.1246i |
| w163 | 10100011 | −0.0720 − 0.0589i |
| w164 | 10100100 | −0.6396 − 0.4933i |
| w165 | 10100101 | −0.4850 − 0.4726i |
| w166 | 10100110 | −1.4339 − 0.3828i |
| w167 | 10100111 | −0.0708 − 0.4166i |
| w168 | 10101000 | +0.6538 − 0.0691i |
| w169 | 10101001 | +0.5051 − 0.0654i |
| w170 | 10101010 | +1.4515 − 0.1246i |
| w171 | 10101011 | +0.0720 − 0.0589i |
| w172 | 10101100 | +0.6396 − 0.4933i |
| w173 | 10101101 | +0.4850 − 0.4726i |
| w174 | 10101110 | +1.4339 − 0.3828i |
| w175 | 10101111 | +0.0708 − 0.4166i |
| w176 | 10110000 | −0.8080 − 0.0721i |
| w177 | 10110001 | −0.3603 − 0.0619i |
| w178 | 10110010 | −0.9770 − 0.0640i |
| w179 | 10110011 | −0.2162 − 0.0599i |
| w180 | 10110100 | −0.8066 − 0.5082i |
| w181 | 10110101 | −0.3436 − 0.4483i |
| w182 | 10110110 | −0.9839 − 0.5111i |
| w183 | 10110111 | −0.2091 − 0.4280i |

-continued

| w index | bit label | Constellation point |
|---|---|---|
| w184 | 10111000 | +0.8080 − 0.0721i |
| w185 | 10111001 | +0.3603 − 0.0619i |
| w186 | 10111010 | +0.9770 − 0.0640i |
| w187 | 10111011 | +0.2162 − 0.0599i |
| w188 | 10111100 | +0.8066 − 0.5082i |
| w189 | 10111101 | +0.3436 −0.4483i |
| w190 | 10111110 | +0.9839 − 0.5111i |
| w191 | 10111111 | +0.2091 − 0.4280i |
| w192 | 11000000 | −0.6518 + 0.2064i |
| w193 | 11000001 | −0.5023 + 0.1959i |
| w194 | 11000010 | −1.2169 + 0.1086i |
| w195 | 11000011 | −0.0716 + 0.1743i |
| w196 | 11000100 | −0.6490 + 0.3456i |
| w197 | 11000101 | −0.4967 + 0.3308i |
| w198 | 11000110 | −1.2175 + 0.3244i |
| w199 | 11000111 | −0.0713 + 0.2951i |
| w200 | 11001000 | +0.6518 + 0.2064i |
| w201 | 11001001 | +0.5023 + 0.1959i |
| w202 | 11001010 | +1.2169 + 0.1086i |
| w203 | 11001011 | +0.0716 + 0.1743i |
| w204 | 11001100 | +0.6490 + 0.3456i |
| w205 | 11001101 | +0.4967 + 0.3308i |
| w206 | 11001110 | +1.2175 + 0.3244i |
| w207 | 11001111 | +0.0713 + 0.2951i |
| w208 | 11010000 | −0.6177 + 0.2121i |
| w209 | 11010001 | −0.3587 + 0.1857i |
| w210 | 11010010 | −1.0126 + 0.1946i |
| w211 | 11010011 | −0.2150 + 0.1782i |
| w212 | 11010100 | −0.8186 + 0.3517i |
| w213 | 11010101 | −0.3540 + 0.3139i |
| w214 | 11010110 | −1.0159 + 0.3531i |
| w215 | 11010111 | −0.2130 + 0.3012i |
| w216 | 11011000 | +0.8177 + 0.2121i |
| w217 | 11011001 | +0.3587 + 0.1857i |
| w218 | 11011010 | +1.0126 + 0.1946i |
| w219 | 11011011 | +0.2150 + 0.1782i |
| w220 | 11011100 | +0.8186 + 0.3517i |
| w221 | 11011101 | +0.3540 + 0.3139i |
| w222 | 11011110 | +1.0159 + 0.3531i |
| w223 | 11011111 | +0.2130 + 0.3012i |
| w224 | 11100000 | −0.6518 − 0.2064i |
| w225 | 11100001 | −0.5023 − 0.1959i |
| w226 | 11100010 | −1.2169 − 0.1086i |
| w227 | 11100011 | −0.0716 − 0.1743i |
| w228 | 11100100 | −0.6490 − 0.3456i |
| w229 | 11100101 | −0.4967 − 0.3308i |
| w230 | 11100110 | −1.2175 − 0.3244i |
| w231 | 11100111 | −0.0713 − 0.2951i |
| w232 | 11101000 | +0.6518 − 0.2064i |
| w233 | 11101001 | +0.5023 − 0.1959i |
| w234 | 11101010 | +1.2169 − 0.1086i |
| w235 | 11101011 | +0.0716 − 0.1743i |
| w236 | 11101100 | +0.6490 − 0.3456i |
| w237 | 11101101 | +0.4967 − 0.3308i |
| w238 | 11101110 | +1.2175 − 0.3244i |
| w239 | 11101111 | +0.0713 − 0.2951i |
| w240 | 11110000 | −0.8177 − 0.2121i |
| w241 | 11110001 | −0.3587 − 0.1857i |
| w242 | 11110010 | −1.0126 − 0.1946i |
| w243 | 11110011 | −0.2150 − 0.1782i |
| w244 | 11110100 | −0.8186 − 0.3517i |
| w245 | 11110101 | −0.3540 − 0.3139i |
| w246 | 11110110 | −1.0159 − 0.3531i |
| w247 | 11110111 | −0.2130 − 0.3012i |
| w248 | 11111000 | +0.8177 − 0.2121i |
| w249 | 11111001 | +0.3587 − 0.1857i |
| w250 | 11111010 | +1.0126 − 0.1946i |
| w251 | 11111011 | +0.2150 − 0.1782i |
| w252 | 11111100 | +0.8186 − 0.3517i |
| w253 | 11111101 | +0.3540 − 0.3139i |
| w254 | 11111110 | +1.0159 − 0.3531i |
| w255 | 11111111 | +0.2130 − 0.3012i | for R=13/16 (or R=1/2, 5/8 or 3/4):

| w index | bit label | Constellation point |
|---|---|---|
| w0 | 0000000 | −0.4976 + 1.2018i |
| w1 | 0000000 | +0.4976 + 1.2018i |
| w2 | 0000001 | −0.4976 − 1.2018i |
| w3 | 0000001 | +0.4976 − 1.2018i |
| w4 | 0000010 | −0.4821 + 1.0103i |
| w5 | 0000010 | +0.4821 + 1.0103i |
| w6 | 0000011 | −0.4821 − 1.0103i |
| w7 | 0000011 | +0.4821 − 1.0103i |
| w8 | 0000100 | −1.1616 + 1.0595i |
| w9 | 0000100 | +1.1616 + 1.0595i |
| w10 | 0000101 | −1.1616 − 1.0595i |
| w11 | 0000101 | +1.1616 − 1.0595i |
| w12 | 0000110 | −1.2384 + 0.8218i |
| w13 | 0000110 | +1.2384 + 0.8218i |
| w14 | 0000111 | −1.2384 − 0.8218i |
| w15 | 0000111 | +1.2384 − 0.8218i |
| w16 | 0001000 | −0.6618 + 0.0721i |
| w17 | 0001000 | +0.6618 + 0.0721i |
| w18 | 0001001 | −0.6618 − 0.0721i |
| w19 | 0001001 | +0.6618 − 0.0721i |
| w20 | 0001010 | −0.6653 + 0.2161i |
| w21 | 0001010 | +0.6653 + 0.2161i |
| w22 | 0001011 | −0.6653 − 0.2161i |
| w23 | 0001011 | +0.6653 − 0.2161i |
| w24 | 0001100 | −1.4070 + 0.1153i |
| w25 | 0001100 | +1.4070 + 0.1153i |
| w26 | 0001101 | −1.4070 − 0.1153i |
| w27 | 0001101 | +1.4070 − 0.1153i |
| w28 | 0001110 | −1.1945 + 0.1045i |
| w29 | 0001110 | +1.1945 + 0.1045i |
| w30 | 0001111 | −1.1945 − 0.1045i |
| w31 | 0001111 | +1.1945 − 0.1045i |
| w32 | 0010000 | −0.2993 + 1.2594i |
| w33 | 0010000 | +0.2993 + 1.2594i |
| w34 | 0010001 | −0.2993 − 1.2594i |
| w35 | 0010001 | +0.2993 − 1.2594i |
| w36 | 0010010 | −0.2906 + 1.0772i |
| w37 | 0010010 | +0.2906 + 1.0772i |
| w38 | 0010011 | −0.2906 − 1.0772i |
| w39 | 0010011 | +0.2906 − 1.0772i |
| w40 | 0010100 | −0.0985 + 1.2520i |
| w41 | 0010100 | +0.0985 + 1.2520i |
| w42 | 0010101 | −0.0985 − 1.2520i |
| w43 | 0010101 | +0.0985 − 1.2520i |
| w44 | 0010110 | −0.0938 + 1.0710i |
| w45 | 0010110 | +0.0938 + 1.0710i |
| w46 | 0010111 | −0.0938 − 1.0710i |
| w47 | 0010111 | +0.0938 − 1.0710i |
| w48 | 0011000 | −0.5134 + 0.0686i |
| w49 | 0011000 | +0.5134 + 0.0686i |
| w50 | 0011001 | −0.5134 − 0.0686i |
| w51 | 0011001 | +0.5134 − 0.0686i |
| w52 | 0011010 | −0.5133 + 0.2063i |
| w53 | 0011010 | +0.5133 + 0.2063i |
| w54 | 0011011 | −0.5133 − 0.2063i |
| w55 | 0011011 | +0.5133 − 0.2063i |
| w56 | 0011100 | −0.0735 + 0.0614i |
| w57 | 0011100 | +0.0735 + 0.0614i |
| w58 | 0011101 | −0.0735 − 0.0614i |
| w59 | 0011101 | +0.0735 − 0.0614i |
| w60 | 0011110 | −0.0734 + 0.1846i |
| w61 | 0011110 | +0.0734 + 0.1846i |
| w62 | 0011111 | −0.0734 − 0.1846i |
| w63 | 0011111 | +0.0734 − 0.1846i |
| w64 | 01000000 | −0.5648 + 1.4016i |
| w65 | 01000001 | +0.5648 + 1.4016i |
| w66 | 01000010 | −0.5648 − 1.4016i |
| w67 | 01000011 | +0.5648 − 1.4016i |
| w68 | 01000100 | −0.6826 + 1.0558i |
| w69 | 01000101 | +0.6826 + 1.0558i |
| w70 | 01000110 | −0.6826 − 1.0558i |
| w71 | 01000111 | +0.6826 − 1.0558i |
| w72 | 01001000 | −0.7696 + 1.2863i |
| w73 | 01001001 | +0.7696 + 1.2863i |
| w74 | 01001010 | −0.7696 − 1.2863i |
| w75 | 01001011 | +0.7696 − 1.2863i |

| w index | bit label | Constellation point |
|---|---|---|
| w76 | 01001100 | −0.8965 + 1.0947i |
| w77 | 01001101 | +0.8965 + 1.0947i |
| w78 | 01001110 | −0.8965 − 1.0947i |
| w79 | 01001111 | +0.8965 − 1.0947i |
| w80 | 01010000 | −0.8148 + 0.0743i |
| w81 | 01010001 | +0.8148 + 0.0743i |
| w82 | 01010010 | −0.8148 − 0.0743i |
| w83 | 01010011 | +0.8148 − 0.07431 |
| w84 | 01010100 | −0.8285 + 0.2219i |
| w85 | 01010101 | +0.8285 + 0.2219i |
| w86 | 01010110 | −0.8285 − 0.2219i |
| w87 | 01010111 | +0.8285 − 0.2219i |
| w88 | 01011000 | −0.9784 + 0.0686i |
| w89 | 01011001 | +0.9784 + 0.0686i |
| w90 | 01011010 | −0.9784 − 0.0686i |
| w91 | 01011011 | +0.9784 − 0.0686i |
| w92 | 01011100 | −1.0093 + 0.2102i |
| w93 | 01011101 | +1.0093 + 0.2102i |
| w94 | 01011110 | −1.0093 − 0.2102i |
| w95 | 01011111 | +1.0093 − 0.2102i |
| w96 | 01100000 | −0.3403 + 1.4686i |
| w97 | 01100001 | +0.3403 + 1.4686i |
| w98 | 01100010 | −0.3403 − 1.4686i |
| w99 | 01100011 | +0.3403 − 1.4686i |
| w100 | 01100100 | −0.2690 + 0.9234i |
| w101 | 01100101 | +0.2690 + 0.9234i |
| w102 | 01100110 | −0.2690 − 0.9234i |
| w103 | 01100111 | +0.2690 − 0.9234i |
| w104 | 01101000 | −0.1114 + 1.4628i |
| w105 | 01101001 | +0.1114 + 1.4628i |
| w106 | 01101010 | −0.1114 − 1.4628i |
| w107 | 01101011 | +0.1114 − 1.4628i |
| w108 | 01101100 | −0.0905 + 0.9054i |
| w109 | 01101101 | +0.0905 + 0.9054i |
| w110 | 01101110 | −0.0905 − 0.9054i |
| w111 | 01101111 | +0.0905 − 0.9054i |
| w112 | 01110000 | −0.3668 + 0.0653i |
| w113 | 01110001 | +0.3668 + 0.0653i |
| w114 | 01110010 | −0.3668 − 0.0653i |
| w115 | 01110011 | +0.3668 − 0.0653i |
| w116 | 01110100 | −0.3660 + 0.1965i |
| w117 | 01110101 | +0.3660 + 0.1965i |
| w118 | 01110110 | −0.3660 − 0.1965i |
| w119 | 01110111 | +0.3660 − 0.1965i |
| w120 | 01111000 | −0.2204 + 0.0628i |
| w121 | 01111001 | +0.2204 + 0.0628i |
| w122 | 01111010 | −0.2204 − 0.0628i |
| w123 | 01111011 | +0.2204 − 0.0628i |
| w124 | 01111100 | −0.2198 + 0.1888i |
| w125 | 01111101 | +0.2198 + 0.1888i |
| w126 | 01111110 | −0.2198 − 0.1888i |
| w127 | 01111111 | +0.2198 − 0.1888i |
| w128 | 10000000 | −0.6404 + 0.6801i |
| w129 | 10000001 | +0.6404 + 0.6801i |
| w130 | 10000010 | −0.6404 − 0.6801i |
| w131 | 10000011 | +0.6404 − 0.6801i |
| w132 | 10000100 | −0.5954 + 0.8500i |
| w133 | 10000101 | +0.5954 + 0.8500i |
| w134 | 10000110 | −0.5954 − 0.8500i |
| w135 | 10000111 | +0.5954 − 0.8500i |
| w136 | 10001000 | −1.1989 + 0.5582i |
| w137 | 10001001 | +1.1989 + 0.5582i |
| w138 | 10001010 | −1.1989 − 0.5582i |
| w139 | 10001011 | +1.1989 − 0.5582i |
| w140 | 10001100 | −1.4012 + 0.6249i |
| w141 | 10001101 | +1.4012 + 0.6249i |
| w142 | 10001110 | −1.4012 − 0.6249i |
| w143 | 10001111 | +1.4012 − 0.6249i |
| w144 | 10010000 | −0.6524 + 0.5156i |
| w145 | 10010001 | +0.6524 + 0.5156i |
| w146 | 10010010 | −0.6524 − 0.5156i |
| w147 | 10010011 | +0.6524 − 0.5156i |
| w148 | 10010100 | −0.6640 + 0.3620i |
| w149 | 10010101 | +0.6640 + 0.3620i |
| w150 | 10010110 | −0.6640 − 0.3620i |
| w151 | 10010111 | +0.6640 − 0.3620i |
| w152 | 10011000 | −1.4123 + 0.3539i |
| w153 | 10011001 | +1.4123 + 0.3539i |
| w154 | 10011010 | −1.4123 − 0.3539i |
| w155 | 10011011 | +1.4123 − 0.3539i |
| w156 | 10011100 | −1.2076 + 0.3137i |
| w157 | 10011101 | +1.2076 + 0.3137i |
| w158 | 10011110 | −1.2076 − 0.3137i |
| w159 | 10011111 | +1.2076 − 0.3137i |
| w160 | 10100000 | −0.4846 + 0.6443i |
| w161 | 10100001 | +0.4846 + 0.6443i |
| w162 | 10100010 | −0.4846 − 0.6443i |
| w163 | 10100011 | +0.4846 − 0.6443i |
| w164 | 10100100 | −0.4495 + 0.7999i |
| w165 | 10100101 | +0.4495 + 0.7999i |
| w166 | 10100110 | −0.4495 − 0.7999i |
| w167 | 10100111 | +0.4495 − 0.7999i |
| w168 | 10101000 | −0.0693 + 0.5689i |
| w169 | 10101001 | +0.0693 + 0.5689i |
| w170 | 10101010 | −0.0693 − 0.5689i |
| w171 | 10101011 | +0.0693 − 0.5689i |
| w172 | 10101100 | −0.0563 + 0.7102i |
| w173 | 10101101 | +0.0563 + 0.7102i |
| w174 | 10101110 | −0.0563 − 0.7102i |
| w175 | 10101111 | +0.0563 − 0.7102i |
| w176 | 10110000 | −0.5011 + 0.4924i |
| w177 | 10110001 | +0.5011 + 0.4924i |
| w178 | 10110010 | −0.5011 − 0.4924i |
| w179 | 10110011 | +0.5011 − 0.4924i |
| w180 | 10110100 | −0.5105 + 0.3465i |
| w181 | 10110101 | +0.5105 + 0.3465i |
| w182 | 10110110 | −0.5105 − 0.3465i |
| w183 | 10110111 | +0.5105 − 0.3465i |
| w184 | 10111000 | −0.0720 + 0.4369i |
| w185 | 10111001 | +0.0720 + 0.4369i |
| w186 | 10111010 | −0.0720 − 0.4369i |
| w187 | 10111011 | +0.0720 − 0.4369i |
| w188 | 10111100 | −0.0730 + 0.3094i |
| w189 | 10111101 | +0.0730 + 0.3094i |
| w190 | 10111110 | −0.0730 − 0.3094i |
| w191 | 10111111 | +0.0730 − 0.3094i |
| w192 | 11000000 | −0.8128 + 0.7021i |
| w193 | 11000001 | +0.8128 + 0.7021i |
| w194 | 11000010 | −0.8128 − 0.7021i |
| w195 | 11000011 | +0.8128 − 0.7021i |
| w196 | 11000100 | −0.7699 + 0.8797i |
| w197 | 11000101 | +0.7699 + 0.8797i |
| w198 | 11000110 | −0.7699 − 0.8797i |
| w199 | 11000111 | +0.7699 − 0.8797i |
| w200 | 11001000 | −1.0129 + 0.6976i |
| w201 | 11001001 | +1.0129 + 0.6976i |
| w202 | 11001010 | −1.0129 − 0.6976i |
| w203 | 11001011 | +1.0129 − 0.6976i |
| w204 | 11001100 | −0.9657 + 0.8860i |
| w205 | 11001101 | +0.9657 + 0.8860i |
| w206 | 11001110 | −0.9657 − 0.8860i |
| w207 | 11001111 | +0.9657 − 0.8860i |
| w208 | 11010000 | −0.8099 + 0.5313i |
| w209 | 11010001 | +0.8099 + 0.5313i |
| w210 | 11010010 | −0.8099 − 0.5313i |
| w211 | 11010011 | +0.8099 − 0.5313i |
| w212 | 11010100 | −0.8291 + 0.3705i |
| w213 | 11010101 | +0.8291 + 0.3705i |
| w214 | 11010110 | −0.8291 − 0.3705i |
| w215 | 11010111 | +0.8291 − 0.3705i |
| w216 | 11011000 | −0.9768 + 0.5294i |
| w217 | 11011001 | +0.9768 + 0.5294i |
| w218 | 11011010 | −0.9768 − 0.5294i |
| w219 | 11011011 | +0.9768 − 0.5294i |
| w220 | 11011100 | −1.0171 + 0.3701i |
| w221 | 11011101 | +1.0171 + 0.3701i |
| w222 | 11011110 | −1.0171 − 0.3701i |
| w223 | 11011111 | +1.0171 − 0.3701i |
| w224 | 11100000 | −0.3381 + 0.6175i |
| w225 | 11100001 | +0.3381 + 0.6175i |
| w226 | 11100010 | −0.3381 − 0.6175i |
| w227 | 11100011 | +0.3381 − 0.6175i |
| w228 | 11100100 | −0.3079 + 0.7726i |
| w229 | 11100101 | +0.3079 + 0.7726i |

-continued

| w index | bit label | Constellation point |
|---|---|---|
| w230 | 11100110 | −0.3079 − 0.7726i |
| w231 | 11100111 | +0.3079 − 0.7726i |
| w232 | 11101000 | −0.2034 + 0.5915i |
| w233 | 11101001 | +0.2034 + 0.5915i |
| w234 | 11101010 | −0.2034 − 0.5915i |
| w235 | 11101011 | +0.2034 − 0.5915i |
| w236 | 11101100 | −0.1695 + 0.7506i |
| w237 | 11101101 | +0.1695 + 0.7506i |
| w238 | 11101110 | −0.1695 − 0.7506i |
| w239 | 11101111 | +0.1695 − 0.7506i |
| w240 | 11110000 | −0.3558 + 0.4698i |
| w241 | 11110001 | +0.3558 + 0.4698i |
| w242 | 11110010 | −0.3558 − 0.4698i |
| w243 | 11110011 | +0.3558 − 0.4698i |
| w244 | 11110100 | −0.3634 + 0.3304i |
| w245 | 11110101 | +0.3634 + 0.3304i |
| w246 | 11110110 | −0.3634 − 0.3304i |
| w247 | 11110111 | +0.3634 − 0.3304i |
| w248 | 11111000 | −0.2145 + 0.4495i |
| w249 | 11111001 | +0.2145 + 0.4495i |
| w250 | 11111010 | −0.2145 − 0.4495i |
| w251 | 11111011 | +0.2145 − 0.4495i |
| w252 | 11111100 | −0.2184 + 0.3170i |
| w253 | 11111101 | +0.2184 + 0.3170i |
| w254 | 11111110 | −0.2184 − 0.3170i |
| w255 | 11111111 | +0.2184 − 0.3170i | wherein the bit labeling indicated in groups A and B may alternatively be inverted for one or more bit labels.

16. A receiving apparatus comprising:
a receiver configured to receive one or more transmission streams,
a deconverter configured to deconvert one or more transmission streams into said constellation values, and
a demodulation and decoding apparatus as claimed in claim 15 configured to demodulate and decode said constellation values into output data.

17. A demodulation and decoding method comprising:
demodulating constellation values of a non-uniform constellation into cell words and assigning bit combinations to constellation values of the used non-uniform constellation, and
decoding cell words into output data according to a low density parity check code, LDPC,
wherein said demodulating is configured to use, based on signalling information indicating the PHY mode, the total number M of constellation points of the constellation and the code rate, i) a non-uniform constellation and bit labeling from a group A, if the PHY mode is OFDM mode and if M=16, 64, 128 or 256, the group A comprising constellations as defined in
sub-group A1 for 16-QAM with M=16 and code rates of 1/2, 5/8, 3/4 or 13/16,
sub-group A2 for 64-QAM with M=64 and code rates of 5/8, 3/4 or 13/16,
sub-group A3 for 128-QAM with M=128 and code rates of 1/2, 5/8, 3/4 or 13/16, and
sub-group A4 for 256-QAM with M=256 and code rates of 1/2, 5/8, 3/4 or 13/16, or ii) a non-uniform constellation and bit labeling from a group B, if the PHY mode is single carrier mode and if M=16, 32, 64, 128 or 256, the group B comprising constellations as defined in
sub-group B1 for 16-QAM with M=16 and code rates of 1/2, 5/8 or 3/4,
sub-group B2 for 32-QAM with M=32 and code rates of 1/2, 5/8, 3/4 or 13/16,
sub-group B3 for 64-QAM with M=64 and code rates of 1/2, 5/8, 3/4 or 13/16,
sub-group B4 for 128-QAM with M=128 and code rates of 1/2, 5/8, 3/4 or 13/16, and
sub-group B5 for 256-QAM with M=256 and code rates of 1/2, 5/8, 3/4 or 13/16, or iii) a non-uniform constellation obtained from a constellation from anyone of groups A or B through rotation by an angle around the origin, through inversion of bit labels for all constellation points, through interchanging of bit positions, through mirroring on any line in the complex plane and/or through predistortion for the constellation points, wherein the constellation points are defined by a constellation position vector $w_0 \ldots w_{M-1}$, and wherein the constellation position vectors of the different constellations of the groups A or B of constellations are defined as follows:

A) M-QAM non-uniform constellations of group A for OFDM as PHY mode:

A1) 16-QAM NUC

| w | bit label | R = 1/2 (MCS = 18) (or R = 5/8, 3/4 or 13/16) | R = 5/8 (MCS = 19) (or R = 1/2, 3/4 or 13/16) | R = 3/4 (MCS = 20) (or R = 5/8, 1/2 or 13/16) | R = 13/16 (MCS = 21) (or R = 1/2, 5/8 or 3/4) |
|---|---|---|---|---|---|
| w0 | 0000 | +0.4925 + 1.2040i | +0.2173 + 0.4189i | +0.2976 − 0.2976i | +0.3018 − 0.3018i |
| w1 | 0001 | +0.2530 + 0.4936i | +0.6578 + 0.2571i | +0.2976 − 0.9547i | −0.3018 − 0.3018i |
| w2 | 0010 | +0.4925 − 1.2040i | +0.4326 + 1.1445i | −0.2976 − 0.2976i | +0.3018 − 0.9534i |
| w3 | 0011 | +0.2530 − 0.4936i | +1.2088 + 0.5659i | −0.2976 − 0.9547i | −0.3018 − 0.9534i |
| w4 | 0100 | +1.2040 + 0.4925i | +0.2173 − 0.4189i | +0.9547 − 0.2976i | +0.3018 + 0.3018i |
| w5 | 0101 | +0.4936 + 0.2530i | +0.6578 − 0.2571i | +0.9547 − 0.9547i | −0.3018 + 0.3018i |
| w6 | 0110 | +1.2040 − 0.4925i | +0.4326 − 1.1445i | −0.9547 − 0.2976i | +0.3018 + 0.9534i |
| w7 | 0111 | +0.4936 − 0.2530i | +1.2088 − 0.5659i | −0.9547 − 0.9547i | −0.3018 + 0.9534i |
| w8 | 1000 | −0.4925 + 1.2040i | −0.2173 + 0.4189i | +0.2976 + 0.2976i | +0.9534 − 0.3018i |
| w9 | 1001 | −0.2530 + 0.4936i | −0.6578 + 0.2571i | +0.2976 + 0.9547i | −0.9534 − 0.3018i |
| w10 | 1010 | −0.4925 − 1.2040i | −0.4326 + 1.1445i | −0.2976 + 0.2976i | +0.9534 − 0.9534i |
| w11 | 1011 | −0.2530 − 0.4936i | −1.2088 + 0.5659i | −0.2976 + 0.9547i | −0.9534 − 0.9534i |
| w12 | 1100 | −1.2040 + 0.4925i | −0.2173 − 0.4189i | +0.9547 + 0.2976i | +0.9534 + 0.3018i |
| w13 | 1101 | −0.4936 + 0.2530i | −0.6578 − 0.2571i | +0.9547 + 0.9547i | −0.9534 + 0.3018i |
| w14 | 1110 | −1.2040 − 0.4925i | −0.4326 − 1.1445i | −0.9547 + 0.2976i | +0.9534 + 0.9534i |
| w15 | 1111 | −0.4936 − 0.2530i | −1.2088 − 0.5659i | −0.9547 + 0.9547i | −0.9534 + 0.9534i |

A2) 64-QAM NUC

| w/MCS index | bit label | R = 5/8 (MCS = 22) (or R = 3/4 or 13/16) | R = 3/4 (MCS = 23) (or R = 5/8 or 13/16) | R = 13/16 (MCS = 24) (or R = 5/8 or 3/4) |
|---|---|---|---|---|
| w0  | 000000 | +1.4730 + 0.3019i | +1.0501 − 0.1676i | +1.0414 − 0.1712i |
| w1  | 000001 | +1.2124 + 0.8333i | +1.4380 − 0.2294i | −1.0414 − 0.1712i |
| w2  | 000010 | −1.4730 + 0.3019i | +0.7233 − 0.1496i | +1.0414 + 0.1712i |
| w3  | 000011 | −1.2124 + 0.8333i | +0.6220 − 1.1896i | −1.0414 + 0.1712i |
| w4  | 000100 | +1.4730 − 0.3019i | −1.0501 − 0.1676i | +1.4058 − 0.2115i |
| w5  | 000101 | +1.2124 − 0.8333i | −1.4380 − 0.2294i | −1.4058 − 0.2115i |
| w6  | 000110 | −1.4730 − 0.3019i | −0.7233 − 0.1496i | +1.4058 + 0.2115i |
| w7  | 000111 | −1.2124 − 0.8333i | −0.6220 − 1.0896i | −1.4058 + 0.2115i |
| w8  | 001000 | +1.0895 + 0.2172i | +0.1398 − 0.1309i | +0.1414 − 0.1379i |
| w9  | 001001 | +0.8988 + 0.5768i | +0.1680 − 1.0338i | −0.1414 − 0.1379i |
| w10 | 001010 | −1.0895 + 0.2172i | +0.4246 − 0.1370i | +0.1414 + 0.1379i |
| w11 | 001011 | −0.8988 + 0.5768i | +0.2326 − 1.3986i | −0.1414 + 0.1379i |
| w12 | 001100 | +1.0895 − 0.2172i | −0.1398 − 0.1309i | +0.1695 − 1.0298i |
| w13 | 001101 | +0.8988 − 0.5768l | −0.1680 − 1.0338i | −0.1695 − 1.0298i |
| w14 | 001110 | −1.0895 − 0.2172i | −0.4246 − 0.1370i | +0.1695 + 1.0298i |
| w15 | 001111 | −0.8988 − 0.5768i | −0.2326 − 1.3986i | −0.1695 + 1.0298i |
| w16 | 010000 | +0.2775 + 1.4188i | +1.0501 + 0.1676i | +0.7230 − 0.1517i |
| w17 | 010001 | +0.7921 + 1.2096i | +1.4380 + 0.2294i | −0.7230 − 0.1517i |
| w18 | 010010 | −0.2775 + 1.4188i | +0.7233 + 0.1496i | +0.7230 + 0.1517i |
| w19 | 010011 | −0.7921 + 1.2096i | +0.6220 + 1.1896i | −0.7230 + 0.1517i |
| w20 | 010100 | +0.2775 − 1.4188i | −1.0501 − 0.1676i | +0.3981 − 1.0597i |
| w21 | 010101 | +0.7921 − 1.2096i | −1.4380 − 0.2294i | −0.5981 − 1.0597i |
| w22 | 010110 | −0.2775 − 1.4188i | −0.7233 + 0.1496i | +0.5981 + 1.1597i |
| w23 | 010111 | −0.7921 − 1.2096i | −0.6220 + 1.1896i | −0.5981 + 1.0597i |
| w24 | 011000 | +0.2177 + 1.0243i | +0.1398 + 0.1309i | +0.4272 − 0.1421i |
| w25 | 011001 | +0.6056 + 0.8481i | +0.1680 + 1.0338i | −0.4272 − 0.1421i |
| w26 | 011000 | −0.2177 + 1.0243i | +0.4246 + 0.1370i | +0.4272 + 0.1421i |
| w27 | 011011 | −0.6056 + 0.8481i | +0.2326 + 1.3986i | −0.4272 + 0.1421i |
| w28 | 011100 | +0.2177 − 1.0243i | −0.1398 + 0.1309i | +0.2236 − 1.3784i |
| w29 | 011101 | +0.6056 − 0.8481i | −0.1680 + 1.0338i | −0.2236 − 1.3784i |
| w30 | 011100 | −0.2177 − 1.0243i | −0.4246 + 0.1370i | +0.2236 + 1.3784i |
| w31 | 011111 | −0.6056 − 0.8481i | −0.2326 + 1.3986i | −0.2236 + 1.3784i |
| w32 | 100000 | +0.1419 + 0.1122i | +1.0725 − 0.5328i | +1.0997 − 0.5419i |
| w33 | 100001 | +0.3733 + 0.1498i | +1.0771 − 0.9315i | −1.0997 − 0.5419i |
| w34 | 100010 | −0.1419 + 0.1122i | +0.7267 − 0.4592i | +1.0997 + 0.5419i |
| w35 | 100011 | −0.3733 + 0.1498i | +0.6956 − 0.8095i | −1.0997 + 0.5419i |
| w36 | 100100 | +0.1419 − 0.1122i | −1.0725 − 0.5328i | +1.0691 − 0.9443i |
| w37 | 100101 | +0.3733 − 0.1498i | −1.0771 − 0.9315i | −1.0691 − 0.9443i |
| w38 | 100110 | −0.1419 − 0.1122i | −0.7267 − 0.4592i | +1.0691 + 0.9443i |
| w39 | 100111 | −0.3733 − 0.1498i | −0.6955 − 0.8095i | −1.0691 + 0.9443i |
| w10 | 101000 | +0.7863 + 0.1337i | +0.1361 − 0.4023i | +0.1440 − 0.4167i |
| w41 | 101001 | +0.6394 + 0.3211i | +0.1373 − 0.7043i | −0.1440 − 0.4167i |
| w42 | 101010 | −0.7863 + 0.1337i | +0.4198 − 0.4151i | +0.1440 + 0.4167i |
| w43 | 101011 | −0.6394 + 0.3211i | +0.4114 − 0.7109i | −0.1440 + 0.4167i |
| w44 | 101100 | +0.7863 − 0.1337i | −0.1361 − 0.4023i | +0.1426 − 0.7102i |
| w45 | 101101 | +0.6394 − 0.3211i | −0.1373 − 0.7043i | −0.1426 − 0.7102i |
| w46 | 101110 | −0.7863 − 0.1337i | −0.4198 − 0.4151i | +0.1426 + 0.7102i |
| w47 | 101111 | −0.6394 − 0.3210i | −0.4114 − 0.7109i | −0.1426 + 0.7102i |
| w48 | 110000 | +0.1138 + 0.3999i | +1.0725 + 0.5328i | +0.7484 − 0.4663i |
| w49 | 110001 | +0.2891 + 0.3910i | +1.0771 + 0.9305i | −0.7484 − 0.4663i |
| w50 | 110010 | −0.1138 + 0.3999i | +0.7267 + 0.4592i | +0.7484 + 0.4663i |
| w51 | 110011 | −0.2891 + 0.3910i | +0.6956 + 0.8035i | −0.7484 + 0.4663i |
| w52 | 110100 | +0.1138 − 0.3999i | −1.0725 + 0.5328i | +0.7360 − 0.8042i |
| w53 | 110101 | +0.2891 − 0.3910i | −1.0771 + 0.9315i | −0.7360 − 0.8042i |
| w54 | 110110 | −0.1138 − 0.3999i | −0.7267 + 0.4592i | +0.7360 + 0.8042i |
| w55 | 110111 | −0.2891 − 0.3910i | −0.6956 + 0.8095i | −0.7360 + 0.8042i |
| w56 | 111000 | +0.1487 + 0.7260i | +0.1361 + 0.4023i | +0.4369 − 0.4317i |
| w57 | 111001 | +0.4397 + 0.5853i | +0.1373 + 0.7043i | −0.4369 − 0.4317i |
| w58 | 111010 | −0.1487 + 0.7260i | +0.4198 + 0.4151i | +0.4369 + 0.4317i |
| w59 | 111011 | −0.4397 + 0.5853i | +0.4114 + 0.7109i | −0.4369 + 0.4317i |
| w60 | 111100 | +0.1487 − 0.7260i | −0.1361 + 0.4023i | +0.4351 − 0.7394i |
| w61 | 111101 | +0.4397 − 0.5853i | −0.1373 + 0.7043i | −0.4351 − 0.7394i |
| w62 | 111110 | −0.1487 − 0.7260i | −0.4198 + 0.4151i | +0.4351 + 0.7394i |
| w63 | 111111 | −0.4397 − 0.5853i | −0.4114 + 0.7109i | −0.4351 + 0.7394i |

A3) 128-QAM NUC
for R=1/2 (or R=5/8, 3/4 or 13/16):

| w index | bit label | Constellation point |
|---|---|---|
| w0 | 0000000 | +0.7383 − 1.3947i |
| w1 | 0000000 | +0.2726 − 1.6070i |
| w2 | 0000001 | +0.7383 + 1.3947i |
| w3 | 0000001 | +0.2726 + 1.6070i |
| w4 | 0000010 | +1.5779 − 0.2230i |
| w5 | 0000010 | +1.2114 − 0.1662i |

211
-continued

| w index | bit label | Constellation point |
|---|---|---|
| w6 | 0000011 | +1.5779 + 0.2230i |
| w7 | 0000011 | +1.2114 + 0.1662i |
| w8 | 0000000 | +0.5286 − 1.0997i |
| w9 | 0000000 | +0.1915 − 1.2689i |
| w10 | 0000001 | +0.5286 + 1.0997i |
| w11 | 0000101 | +0.1905 + 1.2689i |
| w12 | 0000110 | +0.7620 − 0.1121i |
| w13 | 0000110 | +0.9103 − 0.1272i |
| w14 | 0000111 | +0.7620 + 0.1121i |
| w15 | 0000111 | +0.9103 + 0.1272i |
| w16 | 0001000 | +1.0680 − 1.0753i |
| w17 | 0001000 | +1.0389 − 0.7336i |
| w18 | 0001001 | +1.0680 + 1.0753i |
| w19 | 0001001 | +1.0389 + 0.7336i |
| w20 | 0001010 | +1.4915 − 0.6927i |
| w21 | 0001010 | +1.1447 − 0.4719i |
| w22 | 0001011 | +1.4915 + 0.6927i |
| w23 | 0001011 | +1.1447 + 0.4719i |
| w24 | 0001100 | +0.6878 − 0.8578i |
| w25 | 0001101 | +0.7725 − 0.6723i |
| w26 | 0001101 | +0.6878 + 0.8578i |
| w27 | 0001101 | +0.7725 + 0.6723i |
| w28 | 0001110 | +0.7359 − 0.3230i |
| w29 | 0001110 | +0.8236 − 0.3936i |
| w30 | 0001111 | +0.7359 + 0.3230i |
| w31 | 0001111 | +0.8236 + 0.3936i |
| w32 | 0010000 | −0.7383 − 1.3947i |
| w33 | 0010000 | −0.2726 − 1.6070i |
| w34 | 0010001 | −0.7383 + 1.3947i |
| w35 | 0010001 | −0.2726 + 1.6070i |
| w36 | 0010010 | −1.5779 − 0.2230i |
| w37 | 0010010 | −1.2114 − 0.1662i |
| w38 | 0010011 | −1.5779 + 0.2230i |
| w39 | 0010011 | −1.2114 + 0.1662i |
| w40 | 0010100 | −0.5286 − 1.0997i |
| w41 | 0010100 | −0.1915 − 1.2689i |
| w42 | 0010101 | −0.5286 + 1.0997i |
| w43 | 0010101 | −0.1915 + 1.2689i |
| w44 | 0010110 | −0.7620 − 0.1121i |
| w45 | 0010110 | −0.9103 − 0.1272i |
| w46 | 0010111 | −0.7620 + 0.1121i |
| w47 | 0010111 | −0.9103 + 0.1272i |
| w48 | 0011000 | −1.0680 − 1.0753i |
| w49 | 0011000 | −1.0389 − 0.7336i |
| w50 | 0011001 | −1.0680 + 1.0753i |
| w51 | 0011001 | −1.0389 + 0.7336i |
| w52 | 0011010 | −1.4915 − 0.6927i |
| w53 | 0011010 | −1.1447 − 0.4719i |
| w54 | 0011011 | −1.4915 + 0.6927i |
| w55 | 0011011 | −1.1447 + 0.4719i |
| w56 | 0011100 | −0.6878 − 0.8578i |
| w57 | 0011100 | −0.7725 − 0.6723i |
| w58 | 0011101 | −0.6878 + 0.8578i |
| w59 | 0011101 | −0.7725 + 0.6723i |
| w60 | 0011110 | −0.7359 − 0.3230i |
| w61 | 0011110 | −0.8236 − 0.3936i |
| w62 | 0011111 | −0.7359 + 0.3230i |
| w63 | 0011111 | −0.5236 − 0.3936i |
| w64 | 01000000 | +0.1315 − 0.7332i |
| w65 | 01000001 | +0.1038 − 0.7607i |
| w66 | 01000010 | +0.1315 + 0.7332i |
| w67 | 01000011 | +0.1038 + 0.7607i |
| w68 | 01000000 | +0.1461 − 0.1146i |
| w69 | 01000001 | +0.0573 − 0.1142i |
| w70 | 01000110 | +0.1461 + 0.1146i |
| w71 | 01000111 | +0.1573 + 0.1142i |
| w72 | 01001000 | +0.3255 − 0.9067i |
| w73 | 01001001 | +0.0588 − 1.0122i |
| w74 | 01001010 | +0.3255 + 0.9067i |
| w75 | 01001011 | +0.0588 + 1.0122i |
| w76 | 01001100 | +0.4774 − 0.1074i |
| w77 | 01001001 | +0.4323 − 0.1096i |
| w78 | 01001110 | +0.4774 + 0.1074i |
| w79 | 01001111 | +0.4323 + 0.1096i |
| w80 | 01010000 | +0.1647 − 0.5388i |
| w81 | 01010031 | +0.1629 − 0.5296i |
| w82 | 01010010 | +0.1647 + 0.5388i |

212
-continued

| w index | bit label | Constellation point |
|---|---|---|
| w83 | 01010011 | +0.1629 + 0.5296i |
| w84 | 01010100 | +0.1535 − 0.3082i |
| w85 | 01010101 | +0.1629 − 0.3084i |
| w86 | 01010110 | +0.1535 + 0.3082i |
| w87 | 01010111 | +0.1629 + 0.3084i |
| w88 | 01011000 | +0.4535 − 0.6452i |
| w89 | 01011001 | +0.4645 − 0.5898i |
| w90 | 01011010 | +0.4535 + 0.6452i |
| w91 | 01011011 | +0.4645 + 0.5898i |
| w92 | 01011100 | +0.4853 − 0.3237i |
| w93 | 01011101 | +0.4537 − 0.3425i |
| w94 | 01011110 | +0.4853 + 0.3237i |
| w95 | 01011111 | +0.4537 + 0.3425i |
| w96 | 01100000 | −0.1315 − 0.7332i |
| w97 | 01100001 | −0.1038 − 0.7607i |
| w98 | 01100010 | −0.1315 + 0.7332i |
| w99 | 01100011 | −0.1038 + 0.7607I |
| w100 | 01100100 | −0.1461 − 0.1146i |
| w101 | 01100101 | −0.1573 − 0.1142i |
| w102 | 01100110 | −0.1461 + 0.1146i |
| w103 | 01100111 | −0.0573 + 0.1142i |
| w104 | 01101000 | −0.3255 − 0.9057i |
| w105 | 01101001 | −0.1588 − 1.0122i |
| w106 | 01101010 | −0.3255 + 0.9067i |
| w107 | 01101011 | −0.1588 + 1.0122i |
| w108 | 01101100 | −0.4774 − 0.1074i |
| w109 | 01101101 | −0.4323 − 0.1096i |
| w110 | 01101110 | −0.4774 + 0.1074i |
| w111 | 01101111 | −0.4323 + 0.1096i |
| w112 | 01110000 | −0.1647 − 0.5388i |
| w113 | 01110001 | −0.1629 − 0.5296i |
| w114 | 01110010 | −0.1647 + 0.5388i |
| w115 | 01110011 | −0.1629 + 0.5296i |
| w116 | 01110100 | −0.1535 − 0.3082i |
| w117 | 01110101 | −0.1629 − 0.3084i |
| w118 | 01110110 | −0.1535 + 0.3082i |
| w119 | 01110111 | −0.1629 + 0.3084i |
| w120 | 01111000 | −0.4535 − 0.6452i |
| w121 | 01111001 | −0.4545 − 0.5898i |
| w122 | 01111010 | −0.4535 + 0.6452i |
| w123 | 01111011 | −0.4545 + 0.5898i |
| w124 | 01111100 | −0.4853 − 0.3237i |
| w125 | 01111101 | −0.4537 − 0.3425i |
| w126 | 01111110 | −0.4853 + 0.3237i |
| w127 | 01111111 | −0.4537 + 0.3425i | for R=5/8 (or R=1/2, 3/4 or 13/16):

| w index | bit label | Constellation point |
|---|---|---|
| w0 | 0000000 | +1.1470 + 0.4332i |
| w1 | 0000000 | +0.5553 + 0.4183i |
| w2 | 0000001 | +1.1804 + 0.7965i |
| w3 | 0000001 | +0.5406 + 0.6294i |
| w4 | 0000010 | +1.1470 − 0.4332i |
| w5 | 0000010 | +0.5553 − 0.4183i |
| w6 | 0000011 | +1.1804 − 0.7965i |
| w7 | 0000011 | +0.5406 − 0.6294i |
| w8 | 0000100 | −1.1470 + 0.4332i |
| w9 | 0000100 | −0.5553 + 0.4183i |
| w10 | 0000101 | −1.1804 + 0.7965i |
| w11 | 0000101 | −0.5406 + 0.6294i |
| w12 | 0000110 | −1.1470 − 0.4332i |
| w13 | 0000110 | −0.5553 − 0.4183i |
| w14 | 0000111 | −1.1804 − 0.7965i |
| w15 | 0000111 | −0.5406 − 0.6294i |
| w16 | 0001000 | +0.1029 + 0.4847i |
| w17 | 0001000 | +0.3416 + 0.4299i |
| w18 | 0001001 | +0.1167 + 0.6847i |
| w19 | 0001001 | +0.3403 + 0.6639i |
| w20 | 0001010 | +0.1029 − 0.4847i |
| w21 | 0001010 | +0.3416 − 0.4299i |
| w22 | 0001011 | +0.1167 − 0.6847i |
| w23 | 0001011 | +0.3403 − 0.6639i |
| w24 | 0001100 | −0.1029 + 0.4847i |

| w index | bit label | Constellation point |
|---|---|---|
| w25 | 0001100 | −0.3416 + 0.4299i |
| w26 | 0001101 | −0.1167 + 0.6847i |
| w27 | 0001101 | −0.3403 + 0.6639i |
| w28 | 0001110 | −0.1029 − 0.4847i |
| w29 | 0001110 | −0.3416 + 0.4299i |
| w30 | 0001111 | −0.1167 + 0.6847i |
| w31 | 0001111 | −0.3403 + 0.6639i |
| w32 | 0010000 | +1.1636 + 0.1437i |
| w33 | 0010000 | +0.5673 + 0.1212i |
| w34 | 0010001 | +1.4805 + 0.1788i |
| w35 | 0010001 | +0.9781 + 1.1963i |
| w36 | 0010010 | +1.1636 − 0.1437i |
| w37 | 0010010 | +0.5673 − 0.1212i |
| w38 | 0010011 | +1.4805 − 0.1788i |
| w39 | 0010011 | +0.9781 − 1.1963i |
| w40 | 0010100 | −1.1636 + 0.1437i |
| w41 | 0010100 | −0.5673 + 0.1212i |
| w42 | 0010101 | −1.4805 + 0.1788i |
| w43 | 0010101 | −0.9781 + 1.1963i |
| w44 | 0010110 | −1.1636 − 0.1437i |
| w45 | 0010110 | −0.5673 − 0.1212i |
| w46 | 0010111 | −1.4805 − 0.1788i |
| w47 | 0010111 | −0.9781 − 1.1963i |
| w48 | 0011000 | +0.1058 + 0.0889i |
| w49 | 0011000 | +0.3723 + 0.1109i |
| w50 | 0011001 | +0.1939 + 1.4903i |
| w51 | 0011001 | +0.5867 + 1.4162i |
| w52 | 0011010 | +0.1058 − 0.0889i |
| w53 | 0011010 | +0.3723 − 0.1109i |
| w54 | 0011011 | +0.1939 − 1.4903i |
| w55 | 0011011 | +0.5867 − 1.4162i |
| w56 | 0011100 | −0.1058 + 0.0889i |
| w57 | 0011100 | −0.3723 + 0.1109i |
| w58 | 0011101 | −0.1939 + 1.4903i |
| w59 | 0011101 | −0.5867 + 1.4162i |
| w60 | 0011110 | −0.1058 − 0.0889i |
| w61 | 0011110 | −0.3723 − 0.1109i |
| w62 | 0011111 | −0.1939 − 1.4903i |
| w63 | 0011111 | −0.5867 − 1.4162i |
| w64 | 01000000 | +0.9015 + 0.4159i |
| w65 | 01000001 | +0.6908 + 0.3786i |
| w66 | 01000010 | +0.8996 + 0.6935i |
| w67 | 01000011 | +0.6580 + 0.7616i |
| w68 | 01000100 | +0.9015 − 0.4159i |
| w69 | 01000101 | +0.6908 − 0.3786i |
| w70 | 01000110 | +0.8996 − 0.6935i |
| w71 | 01000111 | +0.6580 − 0.7616i |
| w72 | 01001000 | −0.9015 + 0.4159i |
| w73 | 01001001 | −0.6908 + 0.3786i |
| w74 | 01001010 | −0.8996 + 0.6935i |
| w75 | 01001011 | −0.6580 + 0.7616i |
| w76 | 01001100 | −0.9015 − 0.4159i |
| w77 | 01001101 | −0.6908 − 0.3786i |
| w78 | 01001110 | −0.8996 − 0.6935i |
| w79 | 01001111 | −0.6580 − 0.7616i |
| w80 | 01010000 | +0.1029 + 0.3518i |
| w81 | 01010001 | +0.2989 + 0.3450i |
| w82 | 01010010 | +0.1222 + 0.9046i |
| w83 | 01010011 | +0.3701 + 0.8771i |
| w84 | 01010100 | +0.1029 − 0.3518i |
| w85 | 01010101 | +0.2989 − 0.3450i |
| w86 | 01010110 | +0.1222 − 0.9046i |
| w87 | 01010111 | +0.3701 − 0.8771i |
| w88 | 01011000 | −0.1029 + 0.3518i |
| w89 | 01011001 | −0.2989 + 0.3450i |
| w90 | 01011010 | −0.1222 + 0.9046i |
| w91 | 01011011 | −0.3701 + 0.8771i |
| w92 | 01011100 | −0.1029 − 0.3518i |
| w93 | 01011101 | −0.2989 − 0.3450i |
| w94 | 01011110 | −0.1222 − 0.9016i |
| w95 | 01011111 | −0.3701 − 0.8771i |
| w96 | 01100000 | +0.9136 + 0.1312i |
| w97 | 01100001 | +0.6911 + 0.1387i |
| w98 | 01100010 | +1.5526 + 0.5600i |
| w99 | 01100011 | +0.7165 + 1.0174i |
| w100 | 01100100 | +0.9136 − 0.1312i |
| w101 | 01100101 | +0.6911 − 0.1387i |
| w102 | 01100110 | +1.5526 − 0.5600i |
| w103 | 01100111 | +0.7165 − 1.0174i |
| w104 | 01101000 | −0.9136 + 0.1312i |
| w105 | 01101001 | −0.6911 + 0.1387i |
| w106 | 01101010 | −1.5526 + 0.5600i |
| w107 | 01101011 | −0.7165 + 1.0174i |
| w108 | 01101100 | −0.9136 − 0.1312i |
| w109 | 01101101 | −0.6911 − 0.1387i |
| w110 | 01101110 | −1.5526 − 0.5600i |
| w111 | 01101111 | −0.7165 − 1.0174i |
| w112 | 01110000 | +0.1130 + 0.0512i |
| w113 | 01110001 | +0.3195 + 0.1563i |
| w114 | 01110010 | +0.1450 + 1.1700i |
| w115 | 01110011 | +0.4379 + 1.1192i |
| w116 | 01110100 | +0.1130 − 0.1512i |
| w117 | 01110101 | +0.3195 − 0.1563i |
| w118 | 01110110 | +0.1450 − 1.1700i |
| w119 | 01110111 | +0.4379 − 1.1192i |
| w120 | 01111000 | −0.1130 + 0.1512i |
| w121 | 01111001 | −0.3195 + 0.1563i |
| w122 | 01111010 | −0.1450 + 1.1700i |
| w123 | 01111011 | −0.4379 + 1.1192i |
| w124 | 01111100 | −0.1130 − 0.1512i |
| w125 | 01111101 | −0.3195 − 0.1563i |
| w126 | 01111110 | −0.1450 − 1.1700i |
| w127 | 01111111 | −0.4379 − 1.1192i | for R=3/4 (or R=1/2, 5/8 or 13/16):

| w index | bit label | Constellation point |
|---|---|---|
| w0 | 0000000 | +1.0484 + 0.3435i |
| w1 | 0000000 | +1.1392 + 0.5908i |
| w2 | 0000001 | −1.0484 + 0.3435i |
| w3 | 0000001 | −1.1392 + 0.5908i |
| w4 | 0000010 | +1.0205 + 0.1130i |
| w5 | 0000010 | +1.3137 + 0.1401i |
| w6 | 0000011 | −1.0205 + 0.1130i |
| w7 | 0000011 | −1.3137 + 0.1401i |
| w8 | 0000100 | +0.8050 + 0.3736i |
| w9 | 0000100 | +0.8767 + 0.6075i |
| w10 | 0000101 | −0.8050 + 0.3736i |
| w11 | 0000101 | −0.8767 + 0.6075i |
| w12 | 0000110 | +0.7794 + 0.1239i |
| w13 | 0000110 | +1.4466 + 0.4199i |
| w14 | 0000111 | −0.7794 − 0.1239i |
| w15 | 0000111 | −1.4466 + 0.4199i |
| w16 | 0001000 | +0.5512 + 0.5784i |
| w17 | 0001000 | +0.5926 + 0.7787i |
| w18 | 0001001 | −0.5512 + 0.5784i |
| w19 | 0001001 | −0.5926 + 0.7787i |
| w20 | 0001010 | +0.4970 + 0.0732i |
| w21 | 0001010 | +1.1801 + 0.9322i |
| w22 | 0001011 | −0.4970 + 0.0732i |
| w23 | 0001011 | −1.1801 + 0.9322i |
| w24 | 0001100 | +0.5773 + 0.3945i |
| w25 | 0001100 | +0.8273 + 0.8515i |
| w26 | 0001101 | −0.5773 + 0.3945i |
| w27 | 0001101 | −0.8273 + 0.8515i |
| w28 | 0001110 | +0.5611 + 0.2103i |
| w29 | 0001110 | +0.9097 + 1.1442i |
| w30 | 0001111 | −0.5611 + 0.2103i |
| w31 | 0001111 | −0.9097 + 1.1442i |
| w32 | 0010000 | +0.1137 + 0.6007i |
| w33 | 0010000 | +0.1177 + 0.7939i |
| w34 | 0010001 | −0.1137 + 0.6007i |
| w35 | 0010001 | −0.1177 + 0.7939i |
| w36 | 0010010 | +0.0988 + 0.0864i |
| w37 | 0010010 | +0.1761 + 1.5225i |
| w38 | 0010011 | −0.0988 + 0.0864i |
| w39 | 0010011 | −0.1761 + 1.5225i |
| w40 | 0010100 | +0.1075 + 0.4242i |
| w41 | 0010100 | +0.1232 + 1.0065i |
| w42 | 0010101 | −0.1075 + 0.4242i |
| w43 | 0010101 | −0.1232 + 1.0065i |

-continued

| w index | bit label | Constellation point |
| --- | --- | --- |
| w44 | 0010110 | +0.1016 + 0.2562i |
| w45 | 0010110 | +0.1403 + 1.2447i |
| w45 | 0010111 | −0.1016 + 0.2562i |
| w47 | 0010111 | −0.1403 + 1.2447i |
| w48 | 0011000 | +0.3358 + 0.5918i |
| w49 | 0011000 | +0.3537 + 0.7995i |
| w50 | 0011001 | −0.3358 + 0.5918i |
| w51 | 0011001 | −0.3537 + 0.7995i |
| w52 | 0011010 | +0.2966 + 0.0872i |
| w53 | 0011010 | +0.4861 + 1.3847i |
| w54 | 0011011 | −0.2966 + 0.0872i |
| w55 | 0011011 | −0.4861 + 1.3847i |
| w56 | 0011100 | +0.3322 + 0.4087i |
| w57 | 0011100 | +0.3791 + 1.0277i |
| w58 | 0011101 | −0.3322 + 0.4087i |
| w59 | 0011101 | −0.3791 + 1.0277i |
| w60 | 0011110 | +0.3142 + 0.2509i |
| w61 | 0011110 | +0.6160 + 1.1277i |
| w62 | 0011111 | −0.3142 + 0.2509i |
| w63 | 0011111 | −0.6160 + 1.1277i |
| w64 | 01000000 | +1.0484 − 0.3435i |
| w65 | 01000001 | +1.1392 − 0.5908i |
| w66 | 01000010 | −1.0484 − 0.3435i |
| w67 | 01000011 | −1.1392 − 0.5908i |
| w68 | 01000100 | +1.0205 − 0.1130i |
| w69 | 01000101 | +1.3137 − 0.1401i |
| w70 | 01000110 | −1.0205 − 0.1130i |
| w71 | 01000111 | −1.3137 − 0.1401i |
| w72 | 01001000 | +0.8050 − 0.3736i |
| w73 | 01001001 | +0.8767 − 0.6075i |
| w74 | 01001010 | −0.8050 − 0.3736i |
| w75 | 01001011 | −0.8767 − 0.6075i |
| w76 | 01001100 | +0.7794 − 0.1239i |
| w77 | 01001101 | +1.4466 − 0.4199i |
| w78 | 01001110 | −0.7794 − 0.1239i |
| w79 | 01001111 | −1.4456 − 0.4099i |
| w80 | 01010000 | +0.5512 − 0.5784i |
| w81 | 01010001 | +0.5926 − 0.7787i |
| w82 | 01010010 | −0.5512 − 0.5784i |
| w83 | 01010011 | −0.5926 − 0.7787i |
| w84 | 01010100 | +0.4970 − 0.0732i |
| w85 | 01010101 | +1.1801 − 0.9322i |
| w86 | 01010110 | −0.4970 − 0.0732i |
| w87 | 01010111 | −1.1801 − 0.9322i |
| w88 | 01011000 | +0.5773 − 0.3945i |
| w89 | 01011001 | +0.8273 − 0.8515i |
| w90 | 01011010 | −0.5773 − 0.3945i |
| w91 | 01011011 | −0.8273 − 0.8515i |
| w92 | 01011100 | +0.5611 − 0.2103i |
| w93 | 01011101 | +0.9097 − 1.1442i |
| w94 | 01011110 | −0.5611 − 0.2103i |
| w95 | 01011111 | −0.9097 − 1.1442i |
| w96 | 01100000 | +0.1137 − 0.6007i |
| w97 | 01100001 | +0.1177 − 0.7939i |
| w98 | 01100010 | −0.1137 − 0.6037i |
| w99 | 01100011 | −0.1177 − 0.7939i |
| w100 | 01100100 | +0.0988 − 0.0864i |
| w101 | 01100101 | +0.1761 − 1.5225i |
| w102 | 01100110 | −0.0988 − 0.0864i |
| w103 | 01100111 | −0.1761 − 1.5225i |
| w104 | 01101000 | +0.1075 − 0.4242i |
| w105 | 01101001 | +0.1232 − 1.0065i |
| w106 | 01101010 | −0.1075 − 0.4242i |
| w107 | 01101011 | −0.1232 − 1.0065i |
| w108 | 01101100 | +0.1016 − 0.2562i |
| w109 | 01101101 | +0.1403 − 1.2447i |
| w110 | 01101110 | −0.1016 − 0.2562i |
| w111 | 01101111 | −0.1403 − 1.2447i |
| w112 | 01110000 | +0.3358 − 0.5918i |
| w113 | 01110001 | +0.3537 − 0.7995i |
| w114 | 01110010 | −0.3358 − 0.5918i |
| w115 | 01110011 | −0.3537 − 0.7995i |
| w116 | 01110100 | +0.2966 − 0.0872i |
| w117 | 01110101 | +0.4861 − 1.3847i |
| w118 | 01110110 | −0.2966 − 0.0872i |
| w119 | 01110111 | −0.4861 − 1.3847i |
| w120 | 01111000 | +0.3322 − 0.4087i |
| w121 | 01111001 | +0.3791 − 1.0277i |
| w122 | 01111010 | −0.3322 − 0.4087i |
| w123 | 01111011 | −0.3791 − 1.0277i |
| w124 | 01111100 | +0.3142 − 0.2509i |
| w125 | 01111101 | +0.6160 − 1.1277i |
| w126 | 01111110 | −0.3142 − 0.2509i |
| w127 | 01111111 | −0.6160 − 1.1277i | for R=13/16 (or R=1/2, 5/8 or 3/4):

| w index | bit label | Constellation point |
| --- | --- | --- |
| w0 | 0000000 | +1.0422 + 0.3376i |
| w1 | 0000000 | +1.0422 − 0.3376i |
| w2 | 0000001 | −1.0422 + 0.3376i |
| w3 | 0000001 | −1.0422 − 0.3376i |
| w4 | 0000010 | +0.7965 + 0.3496i |
| w5 | 0000010 | +0.7966 − 0.3496i |
| w6 | 0000011 | −0.7966 + 0.3496i |
| w7 | 0000011 | −0.7966 − 0.3496i |
| w8 | 0000100 | +1.1154 + 0.5839i |
| w9 | 0000100 | +1.1154 − 0.5839i |
| w10 | 0000101 | −1.1154 + 0.5839i |
| w11 | 0000101 | −1.1154 − 0.5839i |
| w12 | 0000110 | +0.8563 + 0.5705i |
| w13 | 0000110 | +0.8563 − 0.5705i |
| w14 | 0000111 | −0.8563 + 0.5705i |
| w15 | 0000111 | −0.8563 − 0.5705i |
| w16 | 0001000 | +1.0010 + 0.1105i |
| w17 | 0001000 | +1.0010 − 0.1105i |
| w18 | 0001001 | −1.0010 + 0.1105i |
| w19 | 0001001 | −1.0010 − 0.1105i |
| w20 | 0001010 | +0.7613 + 0.1187i |
| w21 | 0001010 | +0.7613 − 0.1187l |
| w22 | 0001011 | −0.7613 + 0.1187i |
| w23 | 0001011 | −0.7613 − 0.1187i |
| w24 | 0001100 | +1.2844 + 0.1345i |
| w25 | 0001100 | +1.2844 − 0.1345i |
| w26 | 0001101 | −1.2844 + 0.1345i |
| w27 | 0001101 | −1.2844 − 0.1345i |
| w28 | 0001110 | +1.4001 + 0.4092i |
| w29 | 0001110 | +1.4001 − 0.4092i |
| w30 | 0001111 | −1.4001 + 0.4092i |
| w31 | 0001111 | −1.4001 − 0.4092i |
| w32 | 0010000 | +0.1125 + 0.6269i |
| w33 | 0010000 | +0.1125 − 0.6269i |
| w34 | 0010001 | −0.1125 + 0.6269i |
| w35 | 0010001 | −0.1125 − 0.6269i |
| w36 | 0010010 | +0.1109 + 0.4454i |
| w37 | 0010010 | +0.1109 − 0.4454i |
| w38 | 0010011 | −0.1109 + 0.4454i |
| w39 | 0010011 | −0.1109 − 0.4454i |
| w40 | 0010100 | +0.1155 + 0.8217i |
| w41 | 0010100 | +0.1155 − 0.8217i |
| w42 | 0010101 | −0.1155 + 0.8217i |
| w43 | 0010101 | −0.1155 − 0.8217i |
| w44 | 0010110 | +0.1239 + 1.0311i |
| w45 | 0010110 | +0.1239 − 1.0311i |
| w46 | 0010111 | −0.1239 + 1.0311i |
| w47 | 0010111 | −0.1239 − 1.0311i |
| w48 | 0011000 | +0.0978 + 0.0913i |
| w49 | 0011000 | +0.0978 − 0.0913i |
| w50 | 0011001 | −0.0978 + 0.0913i |
| w51 | 0011001 | −0.0978 − 0.0913i |
| w52 | 0011010 | +0.1038 + 0.2705i |
| w53 | 0011010 | +0.1038 − 0.2705l |
| w54 | 0011011 | −0.1038 + 0.2705l |
| w55 | 0011011 | −0.1038 − 0.2705i |
| w56 | 0011100 | +0.1646 + 1.5274i |
| w57 | 0011100 | +0.1646 − 1.5274i |
| w58 | 0011101 | −0.1646 + 1.5274i |
| w59 | 0011101 | −0.1646 − 1.5274i |
| w60 | 0011110 | +0.1345 + 1.2611i |
| w61 | 0011110 | +0.1345 − 1.2611i |
| w62 | 0011111 | −0.1345 + 1.2611i |

| w index | bit label | Constellation point |
| --- | --- | --- |
| w63 | 0011111 | −0.1345 − 1.2611i |
| w64 | 01000000 | +0.5556 + 0.6306i |
| w65 | 01000001 | +0.5556 − 0.6306i |
| w66 | 01000010 | −0.5556 + 0.6306i |
| w67 | 01000011 | −0.5556 − 0.6306i |
| w68 | 01000100 | +0.5761 + 0.4286i |
| w69 | 01000101 | +0.5761 − 0.4286i |
| w70 | 01000110 | −0.5761 + 0.4286i |
| w71 | 01000111 | −0.5761 − 0.4286i |
| w72 | 01001000 | +0.5970 + 0.8482i |
| w73 | 01001001 | +0.5970 − 0.8482i |
| w74 | 01001010 | −0.5970 + 0.5482i |
| w75 | 01001011 | −0.5970 − 0.8482i |
| w76 | 01001100 | +0.8378 + 0.8041i |
| w77 | 01001101 | +0.8378 − 0.8041i |
| w78 | 01001110 | −0.8378 + 0.8041i |
| w79 | 01001111 | −0.8378 − 0.8041i |
| w80 | 01010000 | +0.4942 + 0.0780i |
| w81 | 01010001 | +0.4942 − 0.0780i |
| w82 | 01010010 | −0.4942 + 0.0780i |
| w83 | 01010011 | −0.4942 − 0.0780i |
| w84 | 01010100 | +0.5456 + 0.2367i |
| w85 | 01010101 | +0.5456 − 0.2367i |
| w86 | 01010110 | −0.5456 + 0.2367i |
| w87 | 01010111 | −0.5456 − 0.2367i |
| w88 | 01011000 | +1.1670 + 0.8997i |
| w89 | 01011001 | +1.1670 − 0.8997i |
| w90 | 01011010 | −1.1670 + 0.8997i |
| w91 | 01011011 | −1.1670 − 0.8997i |
| w92 | 01011100 | +0.9031 + 1.0698i |
| w93 | 01011101 | +0.9031 − 1.0698i |
| w94 | 01011110 | −0.9031 + 1.0698i |
| w95 | 01011111 | −0.9031 − 1.0698i |
| w96 | 01100000 | +0.3351 + 0.6308i |
| w97 | 01100001 | +0.3351 − 0.6308i |
| w98 | 01100010 | −0.3351 + 0.6308i |
| w99 | 01100011 | −0.3351 − 0.6308i |
| w100 | 01100100 | +0.3383 + 0.4404i |
| w101 | 01100101 | +0.3383 − 0.4404i |
| w102 | 01100110 | −0.3383 + 0.4404i |
| w103 | 01100111 | −0.3383 − 0.4404i |
| w104 | 01101000 | +0.3510 + 0.8405i |
| w105 | 01101001 | +0.3510 − 0.8405i |
| w106 | 01101010 | −0.3510 + 0.8405i |
| w107 | 01101011 | −0.3510 − 0.8405i |
| w108 | 01101100 | +0.3850 + 1.0724i |
| w109 | 01101101 | +0.3850 − 1.0724i |
| w110 | 01101110 | −0.3850 + 1.0724i |
| w111 | 01101111 | −0.3850 − 1.0724i |
| w112 | 01110000 | +0.2935 + 0.0906i |
| w113 | 01110001 | +0.2935 − 0.0906i |
| w114 | 01110010 | −0.2935 + 0.0906i |
| w115 | 01110011 | −0.2935 − 0.0906i |
| w116 | 01110100 | +0.3172 + 0.2665i |
| w117 | 01110101 | +0.3172 − 0.2666i |
| w118 | 01110110 | −0.3172 + 0.2656i |
| w119 | 01110111 | −0.3172 − 0.2666i |
| w120 | 01111000 | +0.4543 + 1.3933i |
| w121 | 01111001 | +0.4543 − 1.3933i |
| w122 | 01111010 | −0.4543 + 1.3933i |
| w123 | 01111011 | −0.4543 − 1.3933i |
| w124 | 01111100 | +0.6436 + 1.1770i |
| w125 | 01111101 | +0.6436 − 1.1770i |
| w126 | 01111110 | −0.5436 + 1.1770i |
| w127 | 01111111 | −0.6436 − 1.1770i |

A4) 256-QAM NUC
for R=1/2 (or R=5/8, 3/4 or 13/16):

| w index | bit label | Constellation point |
| --- | --- | --- |
| w0 | 0000000 | −1.2901 + 1.0495i |
| w1 | 0000000 | −0.7273 + 0.6160i |
| w2 | 0000001 | −1.0646 + 1.2876i |
| w3 | 0000001 | −0.5707 + 0.7662i |
| w4 | 0000010 | +1.2901 + 1.0495i |
| w5 | 0000010 | +0.7273 + 0.6160i |
| w6 | 0000011 | +1.0646 + 1.2876i |
| w7 | 0000011 | +0.5707 + 0.7662i |
| w8 | 0000100 | −1.4625 + 0.7740i |
| w9 | 0000100 | −0.8177 + 0.4841i |
| w10 | 0000101 | −0.7949 + 1.4772i |
| w11 | 0000101 | −0.4490 + 0.8461i |
| w12 | 0000110 | +1.4625 + 0.7740i |
| w13 | 0000110 | +0.8177 + 0.4841i |
| w14 | 0000111 | +0.7949 + 1.4772i |
| w15 | 0000111 | +0.4490 + 0.8461i |
| w16 | 0001000 | −0.2844 + 0.1296i |
| w17 | 0001000 | −0.5902 + 0.4857i |
| w18 | 0001001 | −0.1053 + 0.1494i |
| w19 | 0001001 | −0.4294 + 0.6363i |
| w20 | 0001010 | +0.2844 + 0.1296i |
| w21 | 0001010 | +0.5902 + 0.4857i |
| w22 | 0001011 | +0.1053 + 0.1494i |
| w23 | 0001011 | +0.4294 + 0.6363i |
| w24 | 0001100 | −0.2853 + 0.1309i |
| w25 | 0001100 | −0.6355 + 0.4185i |
| w26 | 0001101 | −0.1052 + 0.1495i |
| w27 | 0001101 | −0.3744 + 0.6744i |
| w28 | 0001110 | +0.2853 + 0.1309i |
| w29 | 0001110 | +0.6355 + 0.4185i |
| w30 | 0001111 | +0.1052 + 0.1495i |
| w31 | 0001111 | +0.3744 + 0.6744i |
| w32 | 0010000 | −1.6350 + 0.1593i |
| w33 | 0010000 | −0.9430 + 0.1100i |
| w34 | 0010001 | −0.1658 + 1.6747i |
| w35 | 0010001 | −0.1088 + 0.9530i |
| w36 | 0010010 | +1.6350 + 0.1593i |
| w37 | 0010010 | +0.9430 + 0.1100i |
| w38 | 0010011 | +0.1658 + 1.6747i |
| w39 | 0010011 | +0.1088 + 0.9530i |
| w40 | 0010100 | −1.5776 + 0.4735i |
| w41 | 0010100 | −0.9069 + 0.2829i |
| w42 | 0010101 | −0.4907 + 1.6084i |
| w43 | 0010101 | −0.2464 + 0.9270i |
| w44 | 0010110 | +1.5776 + 0.4735i |
| w45 | 0010110 | +0.9069 + 0.2829i |
| w46 | 0010111 | +0.4907 + 1.6084i |
| w47 | 0010111 | +0.2464 + 0.9270i |
| w48 | 0011000 | −0.3237 + 0.0849i |
| w49 | 0011000 | −0.7502 + 0.1138i |
| w50 | 0011001 | −0.0872 + 0.1390i |
| w51 | 0011001 | −0.1091 + 0.7656i |
| w52 | 0011010 | +0.3237 + 0.0849i |
| w53 | 0011010 | +0.7502 + 0.1138i |
| w54 | 0011011 | +0.0872 + 0.1390i |
| w55 | 0011011 | +0.1091 + 0.7656i |
| w56 | 0011100 | −0.3228 + 0.0867i |
| w57 | 0011100 | −0.7325 + 0.2088i |
| w58 | 0011101 | −0.0871 + 0.1392i |
| w59 | 0011101 | −0.1699 + 0.7537i |
| w60 | 0011110 | +0.3228 + 0.0867i |
| w61 | 0011110 | +0.7325 + 0.2088i |
| w62 | 0011111 | +0.0871 + 0.1392i |
| w63 | 0011111 | +0.1699 + 0.7537i |
| w64 | 01000000 | −1.2901 − 1.0495i |
| w65 | 01000001 | −0.7273 − 0.6160i |
| w66 | 01000010 | −1.0646 − 1.2876i |
| w67 | 01000011 | −0.5707 − 0.7662i |
| w68 | 01000100 | +1.2901 − 1.0495i |
| w69 | 01000101 | +0.7273 − 0.6160i |
| w70 | 01000110 | +1.0646 − 1.2876i |
| w71 | 01000111 | +0.5707 − 0.7662i |
| w72 | 01001000 | −1.4625 − 0.7740i |
| w73 | 01001001 | −0.8177 − 0.4841i |
| w74 | 01001010 | −0.7949 − 1.4772i |
| w75 | 01001011 | −0.4490 − 0.8461i |
| w76 | 01001100 | +1.4625 − 0.7740i |
| w77 | 01001101 | +0.8177 − 0.4841i |
| w78 | 01001110 | +0.7949 − 1.4772i |
| w79 | 01001111 | +0.4490 − 0.8461i |
| w80 | 01010000 | −0.2844 − 0.1296i |

-continued

| w index | bit label | Constellation point |
|---|---|---|
| w81 | 01010001 | −0.5902 − 0.4857i |
| w82 | 01010010 | −0.1053 − 0.1494i |
| w83 | 01010011 | −0.4294 − 0.6363i |
| w84 | 01010100 | +0.2844 − 0.1296i |
| w85 | 01010101 | +0.5902 − 0.4857i |
| w86 | 01010110 | +0.1053 − 0.1494i |
| w87 | 01010111 | +0.4294 − 0.6363i |
| w88 | 01011000 | −0.2853 − 0.1309i |
| w89 | 01011001 | −0.6355 − 0.4185i |
| w90 | 01011010 | −0.1052 − 0.1495i |
| w91 | 01011011 | −0.3744 − 0.6744i |
| w92 | 01011100 | +0.2853 − 0.1309i |
| w93 | 01011101 | +0.6355 − 0.4185i |
| w94 | 01011110 | +0.1052 − 0.1495i |
| w95 | 01011111 | +0.3744 − 0.6744i |
| w96 | 01100000 | −1.6350 − 0.1593i |
| w97 | 01100001 | −0.9430 − 0.1100i |
| w98 | 01100010 | −0.1658 − 1.6747i |
| w99 | 01100011 | −0.1088 − 0.9530i |
| w100 | 01100100 | +1.6350 − 0.1593i |
| w101 | 01100101 | +0.9430 − 0.1100i |
| w102 | 01100110 | +0.1658 − 1.6747i |
| w103 | 01100111 | +0.1088 − 0.9530i |
| w104 | 01101000 | −1.5776 − 0.4735i |
| w105 | 01101001 | −0.9069 − 0.2829i |
| w106 | 01101010 | −0.4907 − 1.6084i |
| w107 | 01101011 | −0.2464 − 0.9270i |
| w108 | 01101100 | +1.5776 − 0.4735i |
| w109 | 01101101 | +0.9069 − 0.2829i |
| w110 | 01101110 | +0.4907 − 1.6084i |
| w111 | 01101111 | +0.2464 − 0.9270i |
| w112 | 01110000 | −0.3237 − 0.0849i |
| w113 | 01110001 | −0.7502 − 0.1138i |
| w114 | 01110010 | −0.0872 − 0.1390i |
| w115 | 01110011 | −0.1091 − 0.7656i |
| w116 | 01110100 | +0.3237 − 0.0849i |
| w117 | 01110101 | +0.7502 − 0.1138i |
| w118 | 01110110 | +0.0872 − 0.1390i |
| w119 | 01110111 | +0.1091 − 0.7656i |
| w120 | 01111000 | −0.3228 − 0.0867i |
| w121 | 01111001 | −0.7325 − 0.2088i |
| w122 | 01111010 | −0.0871 − 0.1392i |
| w123 | 01111011 | −0.1699 − 0.7537i |
| w124 | 01111100 | +0.3228 − 0.0867i |
| w125 | 01111101 | +0.7325 − 0.2088i |
| w126 | 01111110 | +0.0871 − 0.1392i |
| w127 | 01111111 | +0.1699 − 0.7537i |
| w128 | 10000000 | −1.0382 + 0.8623i |
| w129 | 10000001 | −0.8504 + 0.7217i |
| w130 | 10000010 | −0.8555 + 1.0542i |
| w131 | 10000011 | −0.6961 + 0.8850i |
| w132 | 10000100 | +1.0382 + 0.8623i |
| w133 | 10000101 | +0.8504 + 0.7217i |
| w134 | 10000110 | +0.8555 + 1.0542i |
| w135 | 10000111 | +0.6961 + 0.8850i |
| w136 | 10001000 | −1.1794 + 0.6376i |
| w137 | 10001001 | −0.9638 + 0.5407i |
| w138 | 10001010 | −0.6363 + 1.2064i |
| w139 | 10001011 | −0.5229 + 1.0037i |
| w140 | 10001100 | +1.1794 + 0.6376i |
| w141 | 10001101 | +0.9638 + 0.5407i |
| w142 | 10001110 | +0.6363 + 1.2064i |
| w143 | 10001111 | +0.5229 + 1.0037i |
| w144 | 10010000 | −0.3734 + 0.2560i |
| w145 | 10010001 | −0.4968 + 0.3947i |
| w146 | 10010010 | −0.1938 + 0.3621i |
| w147 | 10010011 | −0.3224 + 0.5236i |
| w148 | 10010100 | +0.3734 + 0.2560i |
| w149 | 10010101 | +0.4968 + 0.3947i |
| w150 | 10010110 | +0.1938 + 0.3621i |
| w151 | 10010111 | +0.3224 + 0.5236i |
| w152 | 10011000 | −0.3799 + 0.2517i |
| w153 | 10011001 | −0.5231 + 0.3644i |
| w154 | 10011010 | −0.1909 + 0.3627i |
| w155 | 10011011 | −0.3016 + 0.5347i |
| w156 | 10011100 | +0.3799 + 0.2517i |
| w157 | 10011101 | +0.5231 + 0.3644i |
| w158 | 10011110 | +0.1909 + 0.3627i |
| w159 | 10011111 | +0.3016 + 0.5347i |
| w160 | 10100000 | −1.3225 + 0.1320i |
| w161 | 10100001 | −1.0854 + 0.1139i |
| w162 | 10100010 | −0.1322 + 1.3631i |
| w163 | 10100011 | −0.1124 + 1.1327i |
| w164 | 10100100 | +1.3225 + 0.1320i |
| w165 | 10100101 | +1.0854 + 0.1139i |
| w166 | 10100110 | +0.1322 + 1.3631i |
| w167 | 10100111 | +0.1124 + 1.1327i |
| w168 | 10101000 | −1.2742 + 0.3922i |
| w169 | 10101001 | −1.0441 + 0.3296i |
| w170 | 10101010 | −0.3929 + 1.3102i |
| w171 | 10101011 | −0.3160 + 1.0913i |
| w172 | 10101100 | +1.2742 + 0.3922i |
| w173 | 10101101 | +1.0441 + 0.3296i |
| w174 | 10101110 | +0.3929 + 1.3102i |
| w175 | 10101111 | +0.3160 + 1.0913i |
| w176 | 10110000 | −0.4582 + 0.1123i |
| w177 | 10110001 | −0.6473 + 0.1138i |
| w178 | 10110010 | −0.0928 + 0.3970i |
| w179 | 10110011 | −0.1054 + 0.5979i |
| w180 | 10110100 | +0.4582 + 0.1123i |
| w181 | 10110101 | +0.6473 + 0.1138i |
| w182 | 10110110 | +0.0928 + 0.3970i |
| w183 | 10110111 | +0.1054 + 0.5979i |
| w184 | 10111000 | −0.4545 + 0.1251i |
| w185 | 10111001 | −0.6339 + 0.1702i |
| w186 | 10111010 | −0.0937 + 0.3973i |
| w187 | 10111011 | −0.1230 + 0.5949i |
| w188 | 10111100 | +0.4545 + 0.1251i |
| w189 | 10111101 | +0.6339 + 0.1702i |
| w190 | 10111110 | +0.0937 + 0.3973i |
| w191 | 10111111 | +0.1230 + 0.5949i |
| w192 | 11000000 | −1.0382 − 0.862i3 |
| w193 | 11000001 | −0.8504 − 0.7217i |
| w194 | 11000010 | −0.8555 − 1.0542i |
| w195 | 11000011 | −0.6961 − 0.8850i |
| w196 | 11000100 | +1.0382 − 0.8623i |
| w197 | 11000101 | +0.8504 − 0.7217i |
| w198 | 11000110 | +0.8555 − 1.0542i |
| w199 | 11000111 | +0.6961 − 0.8850i |
| w200 | 11001000 | −1.1794 − 0.6376i |
| w201 | 11001001 | −0.9638 − 0.5407i |
| w202 | 11001010 | −0.6363 − 1.2064i |
| w203 | 11001011 | −0.5229 − 1.0037i |
| w204 | 11001100 | +1.1794 − 0.6376i |
| w205 | 11001101 | +0.9638 − 0.5407i |
| w206 | 11001110 | +0.6363 − 1.2064i |
| w207 | 11001111 | +0.5229 − 1.0037i |
| w208 | 11010000 | −0.3734 − 0.2560i |
| w209 | 11010001 | −0.4968 − 0.3947i |
| w210 | 11010010 | −0.1938 − 0.3621i |
| w211 | 11010011 | −0.3224 − 0.5236i |
| w212 | 11010100 | +0.3734 − 0.2560i |
| w213 | 11010101 | +0.4968 − 0.3947i |
| w214 | 11010110 | +0.1938 − 0.3621i |
| w215 | 11010111 | +0.3224 − 0.5236i |
| w216 | 11011000 | −0.3799 − 0.2517i |
| w217 | 11011001 | −0.5231 − 0.3644i |
| w218 | 11011010 | −0.1909 − 0.3627i |
| w219 | 11011011 | −0.3016 − 0.5347i |
| w220 | 11011100 | +0.3799 − 0.2517i |
| w221 | 11011101 | +0.5231 − 0.3644i |
| w222 | 11011110 | +0.1909 − 0.3627i |
| w223 | 11011111 | +0.3016 − 0.5347i |
| w224 | 11100000 | −1.3225 − 0.1320i |
| w225 | 11100001 | −1.0854 − 0.1139i |
| w226 | 11100010 | −0.1322 − 1.3631i |
| w227 | 11100011 | −0.1124 − 1.1327i |
| w228 | 11100100 | +1.3225 − 0.1320i |
| w229 | 11100101 | +1.0854 − 0.1139i |
| w230 | 11100110 | +0.1322 − 1.3631i |
| w231 | 11100111 | +0.1124 − 1.1327i |
| w232 | 11101000 | −1.2742 − 0.3922i |
| w233 | 11101001 | −1.0441 − 0.3296i |
| w234 | 11101010 | −0.3929 − 1.3102i |

221
-continued

| w index | bit label | Constellation point |
|---|---|---|
| w235 | 11101011 | −0.3160 − 1.0913i |
| w236 | 11101100 | +1.2742 − 0.3922i |
| w237 | 11101101 | +1.0441 − 0.3296i |
| w238 | 11101110 | +0.3929 − 1.3102i |
| w239 | 11101111 | +0.3160 − 1.0913i |
| w240 | 11110000 | −0.4582 − 0.1123i |
| w241 | 11110001 | −0.6473 − 0.1138i |
| w242 | 11110010 | −0.0928 − 0.3970i |
| w243 | 11110011 | −0.1054 − 0.5979i |
| w244 | 11110100 | +0.4582 − 0.1123i |
| w245 | 11110101 | +0.6473 − 0.1138i |
| w246 | 11110110 | +0.0928 − 0.3970i |
| w247 | 11110111 | +0.1054 − 0.5979i |
| w248 | 11111000 | −0.4545 − 0.1251i |
| w249 | 11111001 | −0.6339 − 0.1702i |
| w250 | 11111010 | −0.0937 − 0.3973i |
| w251 | 11111011 | −0.1230 − 0.5949i |
| w252 | 11111100 | +0.4545 − 0.1251i |
| w253 | 11111101 | +0.6339 − 0.1702i |
| w254 | 11111110 | +0.0937 − 0.3973i |
| w255 | 11111111 | +0.1230 − 0.5949i | for R=5/8 (or R=1/2, 3/4 or 13/16):

| w index | bit label | Constellation point |
|---|---|---|
| w0 | 0000000 | −1.2537 + 1.0045i |
| w1 | 0000000 | −0.2443 + 0.2114i |
| w2 | 0000001 | −0.7404 + 0.6074i |
| w3 | 0000001 | −0.6039 + 0.5118i |
| w4 | 0000010 | −1.5761 + 0.1512i |
| w5 | 0000010 | −0.2545 + 0.0723i |
| w6 | 0000011 | −0.9317 + 0.0939i |
| w7 | 0000011 | −0.7729 + 0.0813i |
| w8 | 0000100 | +1.2537 + 1.0045i |
| w9 | 0000100 | +0.2443 + 0.2114i |
| w10 | 0000101 | +0.7404 + 0.6074i |
| w11 | 0000101 | +0.6039 + 0.5118i |
| w12 | 0000110 | +1.5761 + 0.1512i |
| w13 | 0000110 | +0.2545 + 0.0723i |
| w14 | 0000111 | +0.9317 + 0.0939i |
| w15 | 0000111 | +0.7729 + 0.0813i |
| w16 | 0001000 | −1.2537 − 1.0045i |
| w17 | 0001000 | −0.2443 − 0.2114i |
| w18 | 0001001 | −0.7404 − 0.6074i |
| w19 | 0001001 | −0.6039 − 0.5118i |
| w20 | 0001010 | −1.5761 − 0.1512i |
| w21 | 0001010 | −0.2545 − 0.0723i |
| w22 | 0001011 | −0.9317 − 0.0939i |
| w23 | 0001011 | −0.7729 − 0.0813i |
| w24 | 0001100 | +1.2537 − 1.0045i |
| w25 | 0001100 | +0.2443 − 0.2114i |
| w26 | 0001101 | +0.7404 − 0.6074i |
| w27 | 0001101 | +0.6039 − 0.5118i |
| w28 | 0001110 | +1.5761 − 0.1512i |
| w29 | 0001110 | +0.2545 − 0.0723i |
| w30 | 0001111 | +0.9317 − 0.0939i |
| w31 | 0001111 | +0.7729 − 0.0813i |
| w32 | 0010000 | −1.0376 + 1.2347i |
| w33 | 0010000 | −0.0940 + 0.2611i |
| w34 | 0010001 | −0.6205 + 0.7476i |
| w35 | 0010001 | −0.5048 + 0.6321i |
| w36 | 0010010 | −0.1632 + 1.6163i |
| w37 | 0010010 | −0.0734 + 0.0858i |
| w38 | 0010011 | −0.1006 + 0.9948i |
| w39 | 0010011 | −0.0848 + 0.8427i |
| w40 | 0010100 | +1.0376 + 1.2347i |
| w41 | 0010100 | +0.0940 + 0.2611i |
| w42 | 0010101 | +0.6205 + 0.7476i |
| w43 | 0010101 | +0.5048 + 0.6321i |
| w44 | 0010110 | +0.1632 + 1.6163i |
| w45 | 0010110 | +0.0734 + 0.0858i |
| w46 | 0010111 | +0.1006 + 0.9948i |
| w47 | 0010111 | +0.0848 + 0.8427i |
| w48 | 0011000 | −1.0376 − 1.2347i |

222
-continued

| w index | bit label | Constellation point |
|---|---|---|
| w49 | 0011000 | −0.0940 − 0.2611i |
| w50 | 0011001 | −0.6205 − 0.7476i |
| w51 | 0011001 | −0.5048 − 0.6321i |
| w52 | 0011010 | −0.1632 − 1.6163i |
| w53 | 0011010 | −0.0734 − 0.0858i |
| w54 | 0011011 | −0.1006 − 0.9948i |
| w55 | 0011011 | −0.0848 − 0.8427i |
| w56 | 0011100 | +1.0376 − 1.2347i |
| w57 | 0011100 | +0.0940 − 0.2611i |
| w58 | 0011101 | +0.6205 − 0.7476i |
| w59 | 0011101 | +0.5048 − 0.6321i |
| w60 | 0011110 | +0.1632 − 1.6163i |
| w61 | 0011110 | +0.0734 − 0.0858i |
| w62 | 0011111 | +0.1006 − 0.9948i |
| w63 | 0011111 | +0.0848 − 0.8427i |
| w64 | 01000000 | −1.4164 + 0.7386i |
| w65 | 01000001 | −0.2508 + 0.2043i |
| w66 | 01000010 | −0.8324 + 0.4499i |
| w67 | 01000011 | −0.6808 + 0.3821i |
| w68 | 01000100 | −1.5251 + 0.4510i |
| w69 | 01000101 | −0.2566 + 0.0761i |
| w70 | 01000110 | −0.8975 + 0.2781i |
| w71 | 01000111 | −0.7412 + 0.2345i |
| w72 | 01001000 | +1.4164 + 0.7386i |
| w73 | 01001001 | +0.2508 + 0.2043i |
| w74 | 01001010 | +0.8324 + 0.4499i |
| w75 | 01001011 | +0.6808 + 0.3821i |
| w76 | 01001100 | +1.5251 + 0.4510i |
| w77 | 01001101 | +0.2566 + 0.0761i |
| w78 | 01001110 | +0.8975 + 0.2781i |
| w79 | 01001111 | +0.7412 + 0.2345i |
| w80 | 01010000 | −1.4164 − 0.7386i |
| w81 | 01010001 | −0.2508 − 0.2043i |
| w82 | 01010010 | −0.8324 − 0.4499i |
| w83 | 01010011 | −0.6808 − 0.3821i |
| w84 | 01010100 | −1.5251 − 0.4510i |
| w85 | 01010101 | −0.2566 − 0.0761i |
| w86 | 01010110 | −0.8975 − 0.2781i |
| w87 | 01010111 | −0.7412 − 0.2345i |
| w88 | 01011000 | +1.4164 − 0.7386i |
| w89 | 01011001 | +0.2508 − 0.2043i |
| w90 | 01011010 | +0.8324 − 0.4499i |
| w91 | 01011011 | +0.6808 − 0.3821i |
| w92 | 01011100 | +1.5251 − 0.4510i |
| w93 | 01011101 | +0.2566 − 0.0761i |
| w94 | 01011110 | +0.8975 − 0.2781i |
| w95 | 01011111 | +0.7412 − 0.2345i |
| w96 | 01100000 | −0.7769 + 1.4193i |
| w97 | 01100001 | −0.0898 + 0.2628i |
| w98 | 01100010 | −0.4711 + 0.8645i |
| w99 | 01100011 | −0.3892 + 0.7279i |
| w100 | 01100100 | −0.4313 + 1.5486i |
| w101 | 01100101 | −0.0722 + 0.0860i |
| w102 | 01100110 | −0.2955 + 0.9492i |
| w103 | 01100111 | −0.2443 + 0.8036i |
| w104 | 01101000 | +0.7769 + 1.4193i |
| w105 | 01101001 | +0.0898 + 0.2628i |
| w106 | 01101010 | +0.4711 + 0.8645i |
| w107 | 01101011 | +0.3892 + 0.7279i |
| w108 | 01101100 | +0.4813 + 1.5486i |
| w109 | 01101101 | +0.0722 + 0.0860i |
| w110 | 01101110 | +0.2955 + 0.9492i |
| w111 | 01101111 | +0.2443 + 0.8036i |
| w112 | 01110000 | −0.7769 − 1.4193i |
| w113 | 01110001 | −0.0898 − 0.2628i |
| w114 | 01110010 | −0.4711 − 0.8645i |
| w115 | 01110011 | −0.3892 − 0.7279i |
| w116 | 01110100 | −0.4813 − 1.5486i |
| w117 | 01110101 | −0.0722 − 0.0860i |
| w118 | 01110110 | −0.2955 − 0.9492i |
| w119 | 01110111 | −0.2443 − 0.8036i |
| w120 | 01111000 | +0.7769 − 1.4193i |
| w121 | 01111001 | +0.0898 − 0.2628i |
| w122 | 01111010 | +0.4711 − 0.8645i |
| w123 | 01111011 | +0.3892 − 0.7279i |
| w124 | 01111100 | +0.4813 − 1.5486i |
| w125 | 01111101 | +0.0722 − 0.0860i |

-continued

| w index | bit label | Constellation point |
|---|---|---|
| w126 | 01111110 | +0.2955 − 0.9492i |
| w127 | 01111111 | +0.2443 − 0.8036i |
| w128 | 10000000 | −1.0508 + 0.8392i |
| w129 | 10000001 | −0.3516 + 0.3079i |
| w130 | 10000010 | −0.8852 + 0.7128i |
| w131 | 10000011 | −0.4734 + 0.4145i |
| w132 | 10000100 | −1.3158 + 0.1269i |
| w133 | 10000101 | −0.4512 + 0.0729i |
| w134 | 10000110 | −1.1073 + 0.1033i |
| w135 | 10000111 | −0.6187 + 0.0756i |
| w136 | 10001000 | +1.0508 + 0.8392i |
| w137 | 10001001 | +0.3516 + 0.3079i |
| w138 | 10001010 | +0.8852 + 0.7128i |
| w139 | 10001011 | +0.4734 + 0.4145i |
| w140 | 10001100 | +1.3158 + 0.1269i |
| w141 | 10001101 | +0.4512 + 0.0729i |
| w142 | 10001110 | +1.1073 + 0.1093i |
| w143 | 10001111 | +0.6187 + 0.0756i |
| w144 | 10010000 | −1.0508 − 0.8392i |
| w145 | 10010001 | −0.3516 − 0.3079i |
| w146 | 10010010 | −0.8852 − 0.7128i |
| w147 | 10010011 | −0.4734 − 0.4145i |
| w148 | 10010100 | −1.3158 − 0.1269i |
| w149 | 10010101 | −0.4512 − 0.0729i |
| w150 | 10010110 | −1.1073 − 0.1093i |
| w151 | 10010111 | −0.6187 − 0.0756i |
| w152 | 10011000 | +1.0508 − 0.8392i |
| w153 | 10011001 | +0.3516 − 0.3079i |
| w154 | 10011010 | +0.8852 − 0.7128i |
| w155 | 10011011 | +0.4734 − 0.4145i |
| w156 | 10011100 | +1.3158 − 0.1269i |
| w157 | 10011101 | +0.4512 − 0.0729i |
| w158 | 10011110 | +1.1073 − 0.1093i |
| w159 | 10011111 | +0.6187 − 0.0756i |
| w160 | 10100000 | −0.8734 + 1.0335i |
| w161 | 10100001 | −0.2145 + 0.4159i |
| w162 | 10100010 | −0.7384 + 0.8777i |
| w163 | 10100011 | −0.3752 + 0.5265i |
| w164 | 10100100 | −0.1381 + 1.3596i |
| w165 | 10100101 | −0.0693 + 0.5212i |
| w166 | 10100110 | −0.1180 + 1.1596i |
| w167 | 10100111 | −0.0788 + 0.6933i |
| w168 | 10101000 | +0.8734 + 1.0335i |
| w169 | 10101001 | +0.2145 + 0.4159i |
| w170 | 10101010 | +0.7384 + 0.8777i |
| w171 | 10101011 | +0.3752 + 0.5265i |
| w172 | 10101100 | +0.1381 + 1.3596i |
| w173 | 10101101 | +0.0693 + 0.5212i |
| w174 | 10101110 | +0.1180 + 1.1596i |
| w175 | 10101111 | +0.0788 + 0.6933i |
| w176 | 10110000 | −0.8734 − 1.0335i |
| w177 | 10110001 | −0.2145 − 0.4159i |
| w178 | 10110010 | −0.7384 − 0.8777i |
| w179 | 10110011 | −0.3752 − 0.5265i |
| w180 | 10110100 | −0.1381 − 1.3596i |
| w181 | 10110101 | −0.0693 − 0.5212i |
| w182 | 10110110 | −0.1180 − 1.1596i |
| w183 | 10110111 | −0.0788 − 0.6933i |
| w184 | 10111000 | +0.8734 − 1.0335i |
| w185 | 10111001 | +0.2145 − 0.4159i |
| w186 | 10111010 | +0.7384 − 0.8777i |
| w187 | 10111011 | +0.3752 − 0.5265i |
| w188 | 10111100 | +0.1381 − 1.3596i |
| w189 | 10111101 | +0.0693 − 0.5212i |
| w190 | 10111110 | +0.1180 − 1.1596i |
| w191 | 10111111 | +0.0788 − 0.6933i |
| w192 | 11000000 | −1.1844 + 0.6172i |
| w193 | 11000001 | −0.3812 + 0.2673i |
| w194 | 11000010 | −0.9957 + 0.5259i |
| w195 | 11000011 | −0.5340 + 0.3230i |
| w196 | 11000100 | −1.2728 + 0.3773i |
| w197 | 11000101 | −0.4434 + 0.1145i |
| w198 | 11000110 | −1.0701 + 0.3230i |
| w199 | 11000111 | −0.5946 + 0.1815i |
| w200 | 11001000 | +1.1844 + 0.6172i |
| w201 | 11001001 | +0.3812 + 0.2673i |
| w202 | 11001010 | +0.9957 + 0.5259i |

-continued

| w index | bit label | Constellation point |
|---|---|---|
| w203 | 11001011 | +0.5340 + 0.3230i |
| w204 | 11001100 | +1.2728 + 0.3773i |
| w205 | 11001101 | +0.4434 + 0.1145i |
| w206 | 11001110 | +1.0701 + 0.3230i |
| w207 | 11001111 | +0.5946 + 0.1815i |
| w208 | 11010000 | −1.1844 − 0.6172i |
| w209 | 11010001 | −0.3812 − 0.2673i |
| w210 | 11010010 | −0.9957 − 0.5259i |
| w211 | 11010011 | −0.5340 − 0.3230i |
| w212 | 11010100 | −1.2728 − 0.3773i |
| w213 | 11010101 | −0.4434 − 0.1145i |
| w214 | 11010110 | −1.0701 − 0.3230i |
| w215 | 11010111 | −0.5946 − 0.1815i |
| w216 | 11011000 | +1.1844 − 0.6172i |
| w217 | 11011001 | +0.3812 − 0.2673i |
| w218 | 11011010 | +0.9957 − 0.5259i |
| w219 | 11011011 | +0.5340 − 0.3230i |
| w220 | 11011100 | +1.2728 − 0.3773i |
| w221 | 11011101 | +0.4434 − 0.1145i |
| w222 | 11011110 | +1.0701 − 0.3230i |
| w223 | 11011111 | +0.5946 − 0.1815i |
| w224 | 11100000 | −0.6562 + 1.1905i |
| w225 | 11100001 | −0.1928 + 0.4287i |
| w226 | 11100010 | −0.5570 + 1.0128i |
| w227 | 11100011 | −0.3076 + 0.5885i |
| w228 | 11100100 | −0.4076 + 1.3018i |
| w229 | 11100101 | −0.0896 + 0.5118i |
| w230 | 11100110 | −0.3468 + 1.1091i |
| w231 | 11100111 | −0.1793 + 0.6649i |
| w232 | 11101000 | +0.6562 + 1.1905i |
| w233 | 11101001 | +0.1928 + 0.4287i |
| w234 | 11101010 | +0.5570 + 1.0128i |
| w235 | 11101011 | +0.3076 + 0.5885i |
| w236 | 11101100 | +0.4076 + 1.3018i |
| w237 | 11101101 | +0.0896 + 0.5118i |
| w238 | 11101110 | +0.3468 + 1.1091i |
| w239 | 11101111 | +0.1793 + 0.6649i |
| w240 | 11110000 | −0.6562 − 1.1905i |
| w241 | 11110001 | −0.1928 − 0.4287i |
| w242 | 11110010 | −0.5570 − 1.0128i |
| w243 | 11110011 | −0.3076 − 0.5885i |
| w244 | 11110100 | −0.4076 − 1.3018i |
| w245 | 11110101 | −0.0896 − 0.5118i |
| w246 | 11110110 | −0.3468 − 1.1091i |
| w247 | 11110111 | −0.1793 − 0.6649i |
| w248 | 11111000 | +0.6562 − 1.1905i |
| w249 | 11111001 | +0.1928 − 0.4287i |
| w250 | 11111010 | +0.5570 − 1.0128i |
| w251 | 11111011 | +0.3076 − 0.5885i |
| w252 | 11111100 | +0.4076 − 1.3018i |
| w253 | 11111101 | +0.0896 − 0.5118i |
| w254 | 11111110 | +0.3468 − 1.1091i |
| w255 | 11111111 | +0.1793 − 0.6649i | for R=3/4 (or R=1/2, 5/8 or 13/16):

| w index | bit label | Constellation point |
|---|---|---|
| w0 | 0000000 | −0.5115 + 1.2063i |
| w1 | 0000000 | −0.5115 − 1.2063i |
| w2 | 0000001 | −0.3049 + 1.2378i |
| w3 | 0000001 | −0.3049 − 1.2378i |
| w4 | 0000010 | +0.5115 + 1.2063i |
| w5 | 0000010 | +0.5115 − 1.2063i |
| w6 | 0000011 | +0.3049 + 1.2378i |
| w7 | 0000011 | +0.3049 − 1.2378i |
| w8 | 0000100 | −0.4952 + 1.0059i |
| w9 | 0000100 | −0.4952 − 1.0059i |
| w10 | 0000101 | −0.3032 + 1.0518i |
| w11 | 0000101 | −0.3032 − 1.0518i |
| w12 | 0000110 | +0.4952 + 1.0059i |
| w13 | 0000110 | +0.4952 − 1.0059i |
| w14 | 0000111 | +0.3032 + 1.0518i |
| w15 | 0000111 | +0.3032 − 1.0518i |
| w16 | 0001000 | −1.1670 + 1.1014i |

| w index | bit label | Constellation point | | w index | bit label | Constellation point |
| --- | --- | --- | --- | --- | --- | --- |
| w17 | 0001000 | −1.1670 − 1.1014i | | w94 | 01011110 | +0.0731 + 0.1767i |
| w18 | 0001001 | −0.1010 + 1.2545i | | w95 | 01011111 | +0.0731 − 0.1767i |
| w19 | 0001001 | −0.1010 − 1.2545i | | w96 | 01100000 | −0.6467 + 0.5036i |
| w20 | 0001010 | +1.1670 + 1.1014i | | w97 | 01100001 | −0.6467 − 0.5036i |
| w21 | 0001010 | +1.1670 − 1.1014i | | w98 | 01100010 | −0.4946 + 0.4818i |
| w22 | 0001011 | +0.1010 + 1.2545i | | w99 | 01100011 | −0.4946 − 0.4818i |
| w23 | 0001011 | +0.1010 − 1.2545i | | w100 | 01100100 | +0.6467 + 0.5036i |
| w24 | 0001100 | −1.2421 + 0.8557i | | w101 | 01100101 | +0.6467 − 0.5036i |
| w25 | 0001100 | −1.2421 − 0.8557i | | w102 | 01100110 | +0.4946 + 0.4818i |
| w26 | 0001101 | −0.0956 + 1.0676i | | w103 | 01100111 | +0.4946 − 0.4818i |
| w27 | 0001101 | −0.0956 − 1.0676i | | w104 | 01101000 | −0.6572 + 0.3526i |
| w28 | 0001110 | +1.2421 + 0.8557i | | w105 | 01101001 | −0.6572 − 0.3526i |
| w29 | 0001110 | +1.2421 − 0.8557i | | w106 | 01101010 | −0.5050 + 0.3380i |
| w30 | 0001111 | +0.0956 + 1.0676i | | w107 | 01101011 | −0.5050 − 0.3380i |
| w31 | 0001111 | +0.0956 − 1.0676i | | w108 | 01101100 | +0.6572 + 0.3526i |
| w32 | 0010000 | −0.6286 + 0.6639i | | w109 | 01101101 | +0.6572 − 0.3526i |
| w33 | 0010000 | −0.6286 − 0.6639i | | w110 | 01101110 | +0.5050 + 0.3380i |
| w34 | 0010001 | −0.4729 + 0.6321i | | w111 | 01101111 | +0.5050 − 0.3380i |
| w35 | 0010001 | −0.4729 − 0.6321i | | w112 | 01110000 | −1.4264 + 0.3764i |
| w36 | 0010010 | +0.6286 + 0.6639i | | w113 | 01110001 | −1.4264 − 0.3764i |
| w37 | 0010010 | +0.6286 − 0.6639i | | w114 | 01110010 | −0.0715 + 0.4218i |
| w38 | 0010011 | +0.4729 + 0.6321i | | w115 | 01110011 | −0.0715 − 0.4218i |
| w39 | 0010011 | +0.4729 − 0.6321i | | w116 | 01110100 | +1.4264 + 0.3764i |
| w40 | 0010100 | −0.5851 + 0.8353i | | w117 | 01110101 | +1.4264 − 0.3764i |
| w41 | 0010100 | −0.5851 − 0.8353i | | w118 | 01110110 | +0.0715 + 0.4218i |
| w42 | 0010101 | −0.4392 + 0.7880i | | w119 | 01110111 | +0.0715 − 0.4218i |
| w43 | 0010101 | −0.4392 − 0.7880i | | w120 | 01111000 | −1.2130 + 0.3237i |
| w44 | 0010110 | +0.5851 + 0.8353i | | w121 | 01111001 | −1.2130 − 0.3237i |
| w45 | 0010110 | +0.5851 − 0.8353i | | w122 | 01111010 | −0.0725 + 0.2978i |
| w46 | 0010111 | +0.4392 + 0.7880i | | w123 | 01111011 | −0.0725 − 0.2978i |
| w47 | 0010111 | +0.4392 − 0.7880i | | w124 | 01111100 | +1.2130 + 0.3237i |
| w48 | 0011000 | −1.2110 + 0.5795i | | w125 | 01111101 | +1.2130 − 0.3237i |
| w49 | 0011000 | −1.2110 − 0.5795i | | w126 | 01111110 | +0.0725 + 0.2978i |
| w50 | 0011001 | −0.0690 + 0.5518i | | w127 | 01111111 | +0.0725 − 0.2978i |
| w51 | 0011001 | −0.0690 − 0.5518i | | w128 | 10000000 | −0.5901 + 1.4171i |
| w52 | 0011010 | +1.2110 + 0.5795i | | w129 | 10000001 | −0.5901 − 1.4171i |
| w53 | 0011010 | +1.2110 − 0.5795i | | w130 | 10000010 | −0.3511 + 1.4584i |
| w54 | 0011011 | +0.0690 + 0.5518i | | w131 | 10000011 | −0.3511 − 1.4584i |
| w55 | 0011011 | +0.0690 − 0.5518i | | w132 | 10000100 | +0.5901 + 1.4171i |
| w56 | 0011100 | −1.4215 + 0.6637i | | w133 | 10000101 | +0.5901 − 1.4171i |
| w57 | 0011100 | −1.4215 − 0.6637i | | w134 | 10000110 | +0.3511 + 1.4584i |
| w58 | 0011101 | −0.0552 + 0.6903i | | w135 | 10000111 | +0.3511 − 1.4584i |
| w59 | 0011101 | −0.0552 − 0.6903i | | w136 | 10001000 | −0.6935 + 1.0466i |
| w60 | 0011110 | +1.4215 + 0.6637i | | w137 | 10001001 | −0.6935 − 1.0466i |
| w61 | 0011110 | +1.4215 − 0.6637i | | w138 | 10001010 | −0.2603 + 0.9107i |
| w62 | 0011111 | +0.0552 + 0.6903i | | w139 | 10001011 | −0.2603 − 0.9107i |
| w63 | 0011111 | +0.0552 − 0.6903i | | w140 | 10001100 | +0.6935 + 1.0466i |
| w64 | 01000000 | −0.6596 + 0.0715i | | w141 | 10001101 | +0.6935 − 1.0466i |
| w65 | 01000001 | −0.6596 − 0.0715i | | w142 | 10001110 | +0.2603 + 0.9107i |
| w66 | 01000010 | −0.5124 + 0.0667i | | w143 | 10001111 | +0.2603 − 0.9107i |
| w67 | 01000011 | −0.5124 − 0.0667i | | w144 | 10010000 | −0.8039 + 1.2957i |
| w68 | 01000100 | +0.6596 + 0.0715i | | w145 | 10010001 | −0.8039 − 1.2957i |
| w69 | 01000101 | +0.6596 − 0.0715i | | w146 | 10010010 | −0.1167 + 1.4782i |
| w70 | 01000110 | +0.5124 + 0.0667i | | w147 | 10010011 | −0.1167 − 1.4782i |
| w71 | 01000111 | +0.5124 − 0.0667i | | w148 | 10010100 | +0.8039 + 1.2957i |
| w72 | 01001000 | −0.6597 + 0.2116i | | w149 | 10010101 | +0.8039 − 1.2957i |
| w73 | 01001001 | −0.6597 − 0.2116i | | w150 | 10010110 | +0.1167 + 1.4782i |
| w74 | 01001010 | −0.5095 + 0.2008i | | w151 | 10010111 | +0.1167 − 1.4782i |
| w75 | 01001011 | −0.5095 − 0.2008i | | w152 | 10011000 | −0.8956 + 1.0881i |
| w76 | 01001100 | +0.6597 + 0.2116i | | w153 | 10011001 | −0.8956 − 1.0881i |
| w77 | 01001101 | +0.6597 − 0.2116i | | w154 | 10011010 | −0.0882 + 0.8981i |
| w78 | 01001110 | +0.5095 + 0.2008i | | w155 | 10011011 | −0.0882 − 0.8981i |
| w79 | 01001111 | +0.5095 − 0.2008i | | w156 | 10011100 | +0.8956 + 1.0881i |
| w80 | 01010000 | −1.4366 + 0.1213i | | w157 | 10011101 | +0.8956 − 1.0881i |
| w81 | 01010001 | −1.4366 − 0.1213i | | w158 | 10011110 | +0.0882 + 0.8981i |
| w82 | 01010010 | −0.0739 + 0.0596i | | w159 | 10011111 | +0.0882 − 0.8981i |
| w83 | 01010011 | −0.0739 − 0.0596i | | w160 | 10100000 | −0.8022 + 0.6879i |
| w84 | 01010100 | +1.4366 + 0.1213i | | w161 | 10100001 | −0.8022 − 0.6879i |
| w85 | 01010101 | +1.4366 − 0.1213i | | w162 | 10100010 | −0.3274 + 0.6045i |
| w86 | 01010110 | +0.0739 + 0.0596i | | w163 | 10100011 | −0.3274 − 0.6045i |
| w87 | 01010111 | +0.0739 − 0.0596i | | w164 | 10100100 | +0.8022 + 0.6879i |
| w88 | 01011000 | −1.2098 + 0.1077i | | w165 | 10100101 | +0.8022 − 0.6879i |
| w89 | 01011001 | −1.2098 − 0.1077i | | w166 | 10100110 | +0.3274 + 0.6045i |
| w90 | 01011010 | −0.0731 + 0.1767i | | w167 | 10100111 | +0.3274 − 0.6045i |
| w91 | 01011011 | −0.0731 − 0.1767i | | w168 | 10101000 | −0.7622 + 0.8634i |
| w92 | 01011100 | +1.2098 + 0.1077i | | w169 | 10101001 | −0.7622 − 0.8634i |
| w93 | 01011101 | +1.2098 − 0.1077i | | w170 | 10101010 | −0.2965 + 0.7629i |

| w index | bit label | Constellation point |
|---|---|---|
| w171 | 10101011 | −0.2965 − 0.7629i |
| w172 | 10101100 | +0.7622 + 0.8634i |
| w173 | 10101101 | +0.7622 − 0.8634i |
| w174 | 10101110 | +0.2965 + 0.7629i |
| w175 | 10101111 | +0.2965 − 0.7629i |
| w176 | 10110000 | −1.0082 + 0.6930i |
| w177 | 10110001 | −1.0082 − 0.6930i |
| w178 | 10110010 | −0.1987 + 0.5742i |
| w179 | 10110011 | −0.1987 − 0.5742i |
| w180 | 10110100 | +1.0082 + 0.6930i |
| w181 | 10110101 | +1.0082 − 0.6930i |
| w182 | 10110110 | +0.1987 + 0.5742i |
| w183 | 10110111 | +0.1987 − 0.5742i |
| w184 | 10111000 | −0.9647 + 0.8849i |
| w185 | 10111001 | −0.9647 − 0.8849i |
| w186 | 10111010 | −0.1564 + 0.7374i |
| w187 | 10111011 | −0.1564 − 0.7374i |
| w188 | 10111100 | +0.9647 + 0.8849i |
| w189 | 10111101 | +0.9647 − 0.8849i |
| w190 | 10111110 | +0.1564 + 0.7374i |
| w191 | 10111111 | +0.1564 − 0.7374i |
| w192 | 11000000 | −0.8131 + 0.0729i |
| w193 | 11000001 | −0.8131 − 0.0729i |
| w194 | 11000010 | −0.3658 + 0.0625i |
| w195 | 11000011 | −0.3658 − 0.0625i |
| w196 | 11000100 | +0.3131 + 0.0729i |
| w197 | 11000101 | +0.3131 − 0.0729i |
| w198 | 11000110 | +0.3658 + 0.0625i |
| w199 | 11000111 | +0.3658 − 0.0625i |
| w200 | 11001000 | −0.8245 + 0.2158i |
| w201 | 11001001 | −0.8246 − 0.2158i |
| w202 | 11001010 | −0.3642 + 0.1899i |
| w203 | 11001011 | −0.3642 − 0.1899i |
| w204 | 11001100 | +0.8246 + 0.2158i |
| w205 | 11001101 | +0.8246 − 0.2158i |
| w206 | 11001110 | +0.3642 + 0.1899i |
| w207 | 11001111 | +0.3642 − 0.1899i |
| w208 | 11010000 | −0.9801 + 0.0651i |
| w209 | 11010001 | −0.9801 − 0.0651i |
| w210 | 11010010 | −0.2198 + 0.0612i |
| w211 | 11010011 | −0.2198 − 0.0612i |
| w212 | 11010100 | +0.9801 + 0.0651i |
| w213 | 11010101 | +0.9801 − 0.0651i |
| w214 | 11010110 | +0.2198 + 0.0612i |
| w215 | 11010111 | +0.2198 − 0.0612i |
| w216 | 11011000 | −1.0115 + 0.2009i |
| w217 | 11011001 | −1.0115 − 0.2009i |
| w218 | 11011010 | −0.2192 + 0.1815i |
| w219 | 11011011 | −0.2192 − 0.1815i |
| w220 | 11011100 | +1.0115 + 0.2009i |
| w221 | 11011101 | +1.0115 − 0.2009i |
| w222 | 11011110 | +0.2192 + 0.1815i |
| w223 | 11011111 | +0.2192 − 0.1815i |
| w224 | 11100000 | −0.8086 + 0.5185i |
| w225 | 11100001 | −0.8086 − 0.5185i |
| w226 | 11100010 | −0.3499 + 0.4571i |
| w227 | 11100011 | −0.3499 − 0.4571i |
| w228 | 11100100 | +0.8086 + 0.5185i |
| w229 | 11100101 | +0.8086 − 0.5185i |
| w230 | 11100110 | +0.3499 + 0.4571i |
| w231 | 11100111 | +0.3499 − 0.4571i |
| w232 | 11101000 | −0.8245 + 0.3593i |
| w233 | 11101001 | −0.8245 − 0.3593i |
| w234 | 11101010 | −0.3599 + 0.3216i |
| w235 | 11101011 | −0.3599 − 0.3216i |
| w236 | 11101100 | +0.8245 + 0.3593i |
| w237 | 11101101 | +0.8245 − 0.3593i |
| w238 | 11101110 | +0.3599 + 0.3216i |
| w239 | 11101111 | +0.3599 − 0.3216i |
| w240 | 11110000 | −0.9814 + 0.5205i |
| w241 | 11110001 | −0.9814 − 0.5205i |
| w242 | 11110010 | −0.2115 + 0.4337i |
| w243 | 11110011 | −0.2115 − 0.4337i |
| w244 | 11110100 | +0.9814 + 0.5205i |
| w245 | 11110101 | +0.9814 − 0.5205i |
| w246 | 11110110 | +0.2115 + 0.4337i |
| w247 | 11110111 | +0.2115 − 0.4337i |
| w248 | 11111000 | −1.0163 + 0.3615i |
| w249 | 11111001 | −1.0163 − 0.3615i |
| w250 | 11111010 | −0.2167 + 0.3057i |
| w251 | 11111011 | −0.2167 − 0.3057i |
| w252 | 11111100 | +1.0163 + 0.3615i |
| w253 | 11111101 | +1.0167 − 0.3615i |
| w254 | 11111110 | +0.2167 + 0.3057i |
| w255 | 11111111 | +0.2167 − 0.3057i | for R=13/16 (or R=1/2, 5/8 or 3/4):

| w index | bit label | Constellation point |
|---|---|---|
| w0 | 0000000 | −0.4934 + 1.1976i |
| w1 | 0000000 | −0.6474 + 0.6881i |
| w2 | 0000001 | −0.6614 + 0.0730i |
| w3 | 0000001 | −0.6545 + 0.5220i |
| w4 | 0000010 | −0.4787 + 1.0113i |
| w5 | 0000010 | −0.6010 + 0.8566i |
| w6 | 0000011 | −0.6676 + 0.2192i |
| w7 | 0000011 | −0.6674 + 0.3672i |
| w8 | 0000100 | −1.1592 + 1.0404i |
| w9 | 0000100 | −1.1898 + 0.5538i |
| w10 | 0000101 | −1.3908 + 0.1102i |
| w11 | 0000101 | −1.4081 + 0.3370i |
| w12 | 0000110 | −1.2410 + 0.8061i |
| w13 | 0000110 | −1.3911 + 0.5975i |
| w14 | 0000111 | −1.1855 + 0.1041i |
| w15 | 0000111 | −1.2043 + 0.3138i |
| w16 | 0001000 | −0.2985 + 1.2655i |
| w17 | 0001000 | −0.4920 + 0.6512i |
| w18 | 0001001 | −0.5130 + 0.0697i |
| w19 | 0001001 | −0.5045 + 0.4981i |
| w20 | 0001010 | −0.2876 + 1.0856i |
| w21 | 0001010 | −0.4556 + 0.8064i |
| w22 | 0001011 | −0.5147 + 0.2097i |
| w23 | 0001011 | −0.5132 + 0.3515i |
| w24 | 0001100 | −0.0980 + 1.2511i |
| w25 | 0001100 | −0.0701 + 0.5794i |
| w26 | 0001101 | −0.0734 + 0.0629i |
| w27 | 0001101 | −0.0724 + 0.4460i |
| w28 | 0001110 | −0.0934 + 1.0735i |
| w29 | 0001110 | −0.0582 + 0.7208i |
| w30 | 0001111 | −0.0734 + 0.1890i |
| w31 | 0001111 | −0.0731 + 0.3164i |
| w32 | 0010000 | −0.5534 + 1.3936i |
| w33 | 0010000 | −0.8188 + 0.7082i |
| w34 | 0010001 | −0.8139 + 0.0752i |
| w35 | 0010001 | −0.8096 + 0.5376i |
| w36 | 0010010 | −0.6787 + 1.0583i |
| w37 | 0010010 | −0.7729 + 0.8860i |
| w38 | 0010011 | −0.8305 + 0.2250i |
| w39 | 0010011 | −0.8315 + 0.3759i |
| w40 | 0010100 | −0.7567 + 1.2808i |
| w41 | 0010100 | −1.0161 + 0.7012i |
| w42 | 0010101 | −0.9757 + 0.0702i |
| w43 | 0010101 | −0.9739 + 0.5345i |
| w44 | 0010110 | −0.8952 + 1.0953i |
| w45 | 0010110 | −0.9646 + 0.8865i |
| w46 | 0010111 | −1.0091 + 0.2141i |
| w47 | 0010111 | −1.0164 + 0.3745i |
| w48 | 0011000 | −0.3350 + 1.4701i |
| w49 | 0011000 | −0.3446 + 0.6254i |
| w50 | 0011001 | −0.3664 + 0.0666i |
| w51 | 0011001 | −0.3586 + 0.4775i |
| w52 | 0011010 | −0.2713 + 0.9300i |
| w53 | 0011010 | −0.3149 + 0.7791i |
| w54 | 0011011 | −0.3666 + 0.2005i |
| w55 | 0011011 | −0.3649 + 0.3365i |
| w56 | 0011100 | −0.1095 + 1.4559i |
| w57 | 0011100 | −0.2067 + 0.6018i |
| w58 | 0011101 | −0.2200 + 0.0642i |
| w59 | 0011101 | −0.2160 + 0.4587i |
| w60 | 0011110 | −0.0910 + 0.9104i |
| w61 | 0011110 | −0.1761 + 0.7590i |

-continued

| w index | bit label | Constellation point |
|---|---|---|
| w62 | 0011111 | −0.2199 + 0.1932i |
| w63 | 0011111 | −0.2191 + 0.3239i |
| w64 | 01000000 | −0.4934 − 1.1976i |
| w65 | 01000001 | −0.6474 − 0.6881i |
| w66 | 01000010 | −0.6614 − 0.0730i |
| w67 | 01000011 | −0.6545 − 0.5220i |
| w68 | 01000100 | −0.4787 − 1.0113i |
| w69 | 01000101 | −0.6010 − 0.8566i |
| w70 | 01000110 | −0.6676 − 0.2192i |
| w71 | 01000111 | −0.6674 − 0.3672i |
| w72 | 01001000 | −1.1592 − 1.0404i |
| w73 | 01001001 | −1.1898 − 0.5538i |
| w74 | 01001010 | −1.3908 − 0.1102i |
| w75 | 01001011 | −1.4081 − 0.3370i |
| w76 | 01001100 | −1.2410 − 0.8061i |
| w77 | 01001101 | −1.3911 − 0.5975i |
| w78 | 01001110 | −1.1855 − 0.1041i |
| w79 | 01001111 | −1.2043 − 0.3138i |
| w80 | 01010000 | −0.2985 − 1.2655i |
| w81 | 01010001 | −0.4920 − 0.6512i |
| w82 | 01010010 | −0.5130 − 0.0697i |
| w83 | 01010011 | −0.5045 − 0.4981i |
| w84 | 01010100 | −0.2876 − 1.0856i |
| w85 | 01010101 | −0.4556 − 0.8064i |
| w86 | 01010110 | −0.5147 − 0.2097i |
| w87 | 01010111 | −0.5132 − 0.3515i |
| w88 | 01011000 | −0.0980 − 1.2511i |
| w89 | 01011001 | −0.0701 − 0.5794i |
| w90 | 01011010 | −0.0734 − 0.0629i |
| w91 | 01011011 | −0.0724 − 0.4460i |
| w92 | 01011100 | −0.0934 − 1.0735i |
| w93 | 01011101 | −0.0582 − 0.7208i |
| w94 | 01011110 | −0.0734 − 0.1890i |
| w95 | 01011111 | −0.0731 − 0.3164i |
| w96 | 01100000 | −0.5534 − 1.3936i |
| w97 | 01100001 | −0.8188 − 0.7082i |
| w98 | 01100010 | −0.8139 − 0.0752i |
| w99 | 01100011 | −0.8096 − 0.5376i |
| w100 | 01100100 | −0.6787 − 1.0583i |
| w101 | 01100101 | −0.7729 − 0.8860i |
| w102 | 01100110 | −0.8305 − 0.2250i |
| w103 | 01100111 | −0.8315 − 0.3759i |
| w104 | 01101000 | −0.7567 − 1.2808i |
| w105 | 01101001 | −1.0161 − 0.7012i |
| w106 | 01101010 | −0.9757 − 0.0702i |
| w107 | 01101011 | −0.9739 − 0.5345i |
| w108 | 01101100 | −0.8952 − 1.0953i |
| w109 | 01101101 | −0.9646 − 0.8865i |
| w110 | 01101110 | −1.0091 − 0.2141i |
| w111 | 01101111 | −1.0164 − 0.3745i |
| w112 | 01110000 | −0.3350 − 1.4701i |
| w113 | 01110001 | −0.3446 − 0.6254i |
| w114 | 01110010 | −0.3664 − 0.0666i |
| w115 | 01110011 | −0.3586 − 0.4775i |
| w116 | 01110100 | −0.2713 − 0.9300i |
| w117 | 01110101 | −0.3149 − 0.7791i |
| w118 | 01110110 | −0.3666 − 0.2005i |
| w119 | 01110111 | −0.3649 − 0.3365i |
| w120 | 01111000 | −0.1095 − 1.4559i |
| w121 | 01111001 | −0.2067 − 0.6018i |
| w122 | 01111010 | −0.2200 − 0.0642i |
| w123 | 01111011 | −0.2160 − 0.4587i |
| w124 | 01111100 | −0.0910 − 0.9104i |
| w125 | 01111101 | −0.1761 − 0.7590i |
| w126 | 01111110 | −0.2199 − 0.1932i |
| w127 | 01111111 | −0.2191 − 0.3239i |
| w128 | 10000000 | +0.4934 + 1.1976i |
| w129 | 10000001 | +0.6474 + 0.6881i |
| w130 | 10000010 | +0.6614 + 0.0730i |
| w131 | 10000011 | +0.6545 + 0.5220i |
| w132 | 10000100 | +0.4787 + 1.0113i |
| w133 | 10000101 | +0.6010 + 0.8566i |
| w134 | 10000110 | +0.6676 + 0.2192i |
| w135 | 10000111 | +0.6674 + 0.3672i |
| w136 | 10001000 | +1.1592 + 1.0404i |
| w137 | 10001001 | +1.1898 + 0.5538i |
| w138 | 10001010 | +1.3908 + 0.1102i |
| w139 | 10001011 | +1.4081 + 0.3370i |
| w140 | 10001100 | +1.2410 + 0.8061i |
| w141 | 10001101 | +1.3911 + 0.5975i |
| w142 | 10001110 | +1.1855 + 0.1041i |
| w143 | 10001111 | +1.2043 + 0.3138i |
| w144 | 10010000 | +0.2985 + 1.2655i |
| w145 | 10010001 | +0.4920 + 0.6512i |
| w146 | 10010010 | +0.5130 + 0.0697i |
| w147 | 10010011 | +0.5045 + 0.4981i |
| w148 | 10010100 | +0.2876 + 1.0856i |
| w149 | 10010101 | +0.4556 + 0.8064i |
| w150 | 10010110 | +0.5147 + 0.2097i |
| w151 | 10010111 | +0.5132 + 0.3515i |
| w152 | 10011000 | +0.0980 + 1.2511i |
| w153 | 10011001 | +0.0701 + 0.5794i |
| w154 | 10011010 | +0.0734 + 0.0629i |
| w155 | 10011011 | +0.0724 + 0.4460i |
| w156 | 10011100 | +0.0934 + 1.0735i |
| w157 | 10011101 | +0.0582 + 0.7208i |
| w158 | 10011110 | +0.0734 + 0.1890i |
| w159 | 10011111 | +0.0731 + 0.3164i |
| w160 | 10100000 | +0.5534 + 1.3936i |
| w161 | 10100001 | +0.8188 + 0.7082i |
| w162 | 10100010 | +0.8139 + 0.0752i |
| w163 | 10100011 | +0.8096 + 0.5376i |
| w164 | 10100100 | +0.6787 + 1.0583i |
| w165 | 10100101 | +0.7729 + 0.8860i |
| w166 | 10100110 | +0.8305 + 0.2250i |
| w167 | 10100111 | +0.8315 + 0.3759i |
| w168 | 10101000 | +0.7567 + 1.2808i |
| w169 | 10101001 | +1.0161 + 0.7012i |
| w170 | 10101010 | +0.9757 + 0.0702i |
| w171 | 10101011 | +0.9739 + 0.5345i |
| w172 | 10101100 | +0.8952 + 1.0953i |
| w173 | 10101101 | +0.9646 + 0.8865i |
| w174 | 10101110 | +1.0091 + 0.2141i |
| w175 | 10101111 | +1.0164 + 0.3745i |
| w176 | 10110000 | +0.3350 + 1.4701i |
| w177 | 10110001 | +0.3446 + 0.6254i |
| w178 | 10110010 | +0.3664 + 0.0666i |
| w179 | 10110011 | +0.3586 + 0.4775i |
| w180 | 10110100 | +0.2713 + 0.9300i |
| w181 | 10110101 | +0.3149 + 0.7791i |
| w182 | 10110110 | +0.3666 + 0.2005i |
| w183 | 10110111 | +0.3649 + 0.3365i |
| w184 | 10111000 | +0.1095 + 1.4559i |
| w185 | 10111001 | +0.2067 + 0.6018i |
| w186 | 10111010 | +0.2200 + 0.0642i |
| w187 | 10111011 | +0.2160 + 0.4587i |
| w188 | 10111100 | +0.0910 + 0.9104i |
| w189 | 10111101 | +0.1761 + 0.7590i |
| w190 | 10111110 | +0.2199 + 0.1932i |
| w191 | 10111111 | +0.2191 + 0.3239i |
| w192 | 11000000 | +0.4934 − 1.1976i |
| w193 | 11000001 | +0.6474 − 0.6881i |
| w194 | 11000010 | +0.6614 − 0.0730i |
| w195 | 11000011 | +0.6545 − 0.5220i |
| w196 | 11000100 | +0.4787 − 1.0113i |
| w197 | 11000101 | +0.6010 − 0.8566i |
| w198 | 11000110 | +0.6676 − 0.2192i |
| w199 | 11000111 | +0.6674 − 0.3672i |
| w200 | 11001000 | +1.1592 − 1.0404i |
| w201 | 11001001 | +1.1898 − 0.5538i |
| w202 | 11001010 | +1.3908 − 0.1102i |
| w203 | 11001011 | +1.4081 − 0.3370i |
| w204 | 11001100 | +1.2410 − 0.8061i |
| w205 | 11001101 | +1.3911 − 0.5975i |
| w206 | 11001110 | +1.1855 − 0.1041i |
| w207 | 11001111 | +1.2043 − 0.3138i |
| w208 | 11010000 | +0.2985 − 1.2655i |
| w209 | 11010001 | +0.4920 − 0.6512i |
| w210 | 11010010 | +0.5130 − 0.0697i |
| w211 | 11010011 | +0.5045 − 0.4981i |
| w212 | 11010100 | +0.2876 − 1.0856i |
| w213 | 11010101 | +0.4556 − 0.8064i |
| w214 | 11010110 | +0.5147 − 0.2097i |
| w215 | 11010111 | +0.5132 − 0.3505i |

| w index | bit label | Constellation point |
|---|---|---|
| w216 | 11011000 | +0.0980 − 1.2511i |
| w217 | 11011001 | +0.0701 − 0.5794i |
| w218 | 11011010 | +0.0734 − 0.0629i |
| w219 | 11011011 | +0.0724 − 0.4460i |
| w220 | 11011100 | +0.0934 − 1.0735i |
| w221 | 11011101 | +0.0582 − 0.7208i |
| w222 | 11011110 | +0.0734 − 0.1890i |
| w223 | 11011111 | +0.0731 − 0.3164i |
| w224 | 11100000 | +0.5534 − 1.3936i |
| w225 | 11100001 | +0.8188 − 0.7082i |
| w226 | 11100010 | +0.8139 − 0.0752i |
| w227 | 11100011 | +0.8096 − 0.5376i |
| w228 | 11100100 | +0.6787 − 1.0583i |
| w229 | 11100101 | +0.7729 − 0.8860i |
| w230 | 11100110 | +0.8305 − 0.2250i |
| w231 | 11100111 | +0.8315 − 0.3759i |
| w232 | 11101000 | +0.7567 − 1.2808i |
| w233 | 11101001 | +1.0161 − 0.7012i |
| w234 | 11101010 | +0.9757 − 0.0702i |
| w235 | 11101011 | +0.9739 − 0.5345i |
| w236 | 11101100 | +0.8952 − 1.0953i |
| w237 | 11101101 | +0.9646 − 0.8865i |
| w238 | 11101110 | +1.0091 − 0.2141i |
| w239 | 11101111 | +1.0164 − 0.3745i |
| w240 | 11110000 | +0.3350 − 1.4701i |
| w241 | 11110001 | +0.3446 − 0.6254i |
| w242 | 11110010 | +0.3664 − 0.0666i |
| w243 | 11110011 | +0.3586 − 0.4775i |
| w244 | 11110100 | +0.2713 − 0.9300i |
| w245 | 11110101 | +0.3149 − 0.7791i |
| w246 | 11110110 | +0.3666 − 0.2005i |
| w247 | 11110111 | +0.3649 − 0.3365i |
| w248 | 11111000 | +0.1095 − 1.4559i |
| w249 | 11111001 | +0.2067 − 0.6018i |
| w250 | 11111010 | +0.2200 − 0.0642i |
| w251 | 11111011 | +0.2160 − 0.4587i |
| w252 | 11111100 | +0.0910 − 0.9104i |
| w253 | 11111101 | +0.1761 − 0.7590i |
| w254 | 11111110 | +0.2199 − 0.1932i |
| w255 | 11111111 | +0.2191 − 0.3239i |

B) M-QAM non-uniform constellations of group B for single carrier mode as PHY mode:

B1) 16-QAM NUC

| w | bit label | R = ½ (MCS = 10) (or R = ⅝ or ¾) | R = ⅝ (MCS = 11) (or R = ½ or ¾) | R = ¾ (MCS = 12) (or R = ½ or ⅝) |
|---|---|---|---|---|
| w0 | 0000 | +0.4925 + 1.2040i | +0.2173 + 0.4189i | +0.2949 − 0.2949i |
| w1 | 0001 | +0.4925 − 1.2040i | +0.4326 + 1.1445i | +0.9555 − 0.2949i |
| w2 | 0010 | +0.2530 + 0.4936i | −0.2173 + 0.4189i | −0.2949 − 0.2949i |
| w3 | 0011 | +0.2530 − 0.4936i | −0.4326 + 1.1445i | −0.9555 − 0.2949i |
| w4 | 0100 | −0.4925 + 1.2040i | +0.2173 − 0.4189i | +0.2949 − 0.9555i |
| w5 | 0101 | −0.4925 − 1.2040i | +0.4326 − 1.14451 | +0.9555 − 0.9555i |
| w6 | 0110 | −0.2530 + 0.4936i | −0.2173 − 0.4189i | −0.2949 − 0.9555i |
| w7 | 0111 | −0.2530 − 0.4936i | −0.4326 − 1.14451 | −0.9555 − 0.9555i |
| w8 | 1000 | +1.2040 + 0.4925i | +0.6578 + 0.2571i | +0.2949 + 0.2949i |
| w9 | 1001 | +1.2040 − 0.4925i | +1.2088 + 0.5659i | +0.9555 + 0.2949i |
| w10 | 1010 | +0.4936 + 0.2530i | −0.6578 + 0.2571i | −0.2949 + 0.2949i |
| w11 | 1011 | +0.4936 − 0.2530i | −1.2088 + 0.5659i | −0.9555 + 0.2949i |
| w12 | 1100 | −1.2040 + 0.4925i | +0.6578 − 0.2571i | +0.2949 + 0.9555i |
| w13 | 1101 | −1.2040 − 0.4925i | +1.2088 − 0.5659i | +0.9555 + 0.9555i |
| w14 | 1110 | −0.4936 + 0.2530i | −0.6578 − 0.2571i | −0.2949 + 0.9555i |
| w15 | 1111 | −0.4936 − 0.2530i | −1.2088 − 0.5659i | −0.9555 + 0.9555i |

B2) 32-QAM NUC

| w/MCS index | bit label | R = ½ (or R = ⅝, ¾ or 13/16) | R = ⅝ (or R = ½, ¾ or 13/16) | R = ¾ (or R = ½, ⅝ or 13/16) | R = 13/16 (or R = ½, ⅝ or ¾) |
|---|---|---|---|---|---|
| w0 | 00000 | +0.1929 + 0.1744i | +0.2187 + 0.1559i | +0.2113 + 0.1819i | +0.2082 + 0.1996i |
| w1 | 00001 | +0.2283 + 0.5036i | +0.2225 + 0.5103i | +0.6163 + 1.2930i | +0.6964 + 1.2272i |
| w2 | 00010 | +0.6963 + 0.1782i | +0.2187 − 0.1559i | +0.2113 − 0.1819i | +0.2041 + 0.6147i |
| w3 | 00011 | +0.6364 + 0.4437i | +0.2225 − 0.5103i | +0.6163 − 1.2930i | +0.2297 + 1.0778i |
| w4 | 00100 | +0.1929 − 0.1744i | −0.2187 + 0.1559i | +0.6590 + 0.1934i | +0.6409 + 0.2027i |
| w5 | 00101 | +0.2283 − 0.5036i | −0.2225 + 0.5103i | +1.1691 + 0.2524i | +1.1236 + 0.2383i |
| w6 | 00110 | +0.6963 − 0.1782i | −0.2187 − 0.1559i | +0.6590 − 0.1934i | +0.6262 + 0.6234i |
| w7 | 00111 | +0.6364 − 0.4437i | −0.2225 − 0.5103i | +1.1691 − 0.2524i | +1.0921 + 0.7399i |
| w8 | 01000 | +0.3541 + 1.4168i | +0.7211 + 0.1755i | −0.2113 + 0.1819i | +0.2082 − 0.1996i |
| w9 | 01001 | +0.2627 + 0.9170i | +0.6446 + 0.5183i | −0.6163 + 1.2930i | +0.6964 − 1.2272i |
| w10 | 01010 | +1.3162 + 0.3270i | +0.7211 − 0.1755i | −0.2113 − 0.1819i | +0.2041 − 0.6147i |
| w11 | 01011 | +0.9382 + 0.8637i | +0.6446 − 0.5183i | −0.6163 − 1.2930i | +0.2297 − 1.0778i |
| w12 | 01100 | +0.3541 − 1.4168i | −0.7211 + 0.1755i | −0.6590 + 0.1934i | +0.6409 − 0.2027i |
| w13 | 01101 | +0.2627 − 0.9170i | −0.6446 + 0.5183i | −1.1691 + 0.2524i | +1.1236 − 0.2383i |
| w14 | 01110 | +1.3162 − 0.3270i | −0.7211 − 0.1755i | −0.6590 − 0.1334i | +0.6262 − 0.6234i |
| w15 | 01111 | +0.9382 − 0.8637i | −0.6446 − 0.5183i | −1.1691 − 0.2524i | +1.0921 − 0.7399i |
| w16 | 10000 | −0.1929 + 0.1744i | +0.3459 + 1.3987i | +0.2042 + 0.5736i | −0.2082 + 0.1996i |
| w17 | 10001 | −0.2283 + 0.5036i | +0.2415 + 0.9207i | +0.2154 + 1.0277i | −0.6964 + 1.2272i |
| w18 | 10010 | −0.6963 + 0.1782i | +0.3459 − 1.3987i | +0.2042 − 0.5736i | −0.2041 + 0.6147i |
| w19 | 10011 | −0.6364 + 0.4437i | +0.2415 − 0.9207i | +0.2154 − 1.0277i | −0.2297 + 1.0778i |
| w20 | 10100 | −0.1929 − 0.1744i | −0.3459 + 1.3987i | +0.6214 + 0.5984i | −0.6409 + 0.2027i |
| w21 | 10101 | −0.2283 − 0.5036i | −0.2415 + 0.9207i | +1.0670 + 0.7825i | −1.1236 + 0.2383i |
| w22 | 10110 | −0.6963 − 0.1782i | −0.3459 − 1.3987i | +0.6214 − 0.5984i | −0.6262 + 0.6234i |

-continued

| w/MCS index | bit label | R = ½ (or R = ⅝, ¾ or ¹³⁄₁₆) | R = ⅝ (or R = ½, ¾ or ¹³⁄₁₆) | R = ¾ (or R = ½, ⅝ or ¹³⁄₁₆) | R = ¹³⁄₁₆ (or R = ½, ⅝ or ¾) |
|---|---|---|---|---|---|
| w23 | 10111 | −0.6364 − 0.4437i | −0.2415 − 0.9207i | +1.0670 − 0.7825i | −1.0921 + 0.7399i |
| w24 | 11000 | −0.3541 + 1.4168i | +1.2734 + 0.3186i | −0.2042 + 0.5736i | −0.2082 − 0.1996i |
| w25 | 11001 | −0.2627 + 0.9170i | +0.9258 + 0.9059i | −0.2154 + 1.0277i | −0.6964 − 1.2272i |
| w26 | 11010 | −1.3162 + 0.3270i | +1.2734 − 0.3186i | −0.2042 − 0.5736i | −0.2041 − 0.6147i |
| w27 | 11011 | −0.9382 + 0.8637i | +0.9258 − 0.9059i | −0.2154 − 1.0277i | −0.2297 − 1.0778i |
| w28 | 11100 | −0.3541 − 1.4168i | −1.2734 + 0.3186i | −0.6214 + 0.5984i | −0.6409 − 0.2027i |
| w29 | 11101 | −0.2627 − 0.9170i | −0.9258 + 0.9059i | −1.0670 + 0.7825i | −1.1236 − 0.2383i |
| w30 | 11110 | −1.3162 − 0.3270i | −1.2734 − 0.3186i | −0.6214 − 0.5984i | −0.6262 − 0.6234i |
| w31 | 11111 | −0.9382 − 0.8637i | −0.9258 − 0.9059i | −1.0670 − 0.7825i | −1.0921 − 0.7399i |

B3) 64-QAM NUC

| w/MCS index | bit label | R = ½ (or R = ⅝, ¾ or ¹³⁄₁₆) | R = ⅝ (or R = ½, ¾ or ¹³⁄₁₆) | R = ¾ (or R = ½, ⅝ or ¹³⁄₁₆) | R = ¹³⁄₁₆ (or R = ½, ⅝ or ¾) |
|---|---|---|---|---|---|
| w0 | 000000 | +1.4732 + 0.2920i | +1.4730 + 0.3009i | +1.0501 − 0.1676i | +1.0414 − 0.1712i |
| w1 | 000001 | +1.2487 + 0.8348i | −1.4730 + 0.3019i | +1.4380 − 0.2294i | +0.7230 − 0.1517i |
| w2 | 000010 | +1.4732 − 0.2920i | +1.0895 + 0.2172i | +0.1398 − 0.1309i | +1.0997 − 0.5419i |
| w3 | 000011 | +1.2487 − 0.8348i | −1.0895 − 0.2172i | +0.1680 − 1.0338i | +0.7484 − 0.4563i |
| w4 | 000100 | +1.0283 + 0.2071i | +0.1419 + 0.1122i | +1.0725 − 0.5328i | −1.0414 − 0.1712i |
| w5 | 000101 | +0.8760 + 0.5811i | −0.1419 + 0.1122i | +1.0771 − 0.9315i | −0.7230 − 0.1517i |
| w6 | 000110 | +1.0283 − 0.2071i | +0.7863 + 0.1337i | +0.1361 − 0.4023i | −1.0997 − 0.5419i |
| w7 | 000111 | +0.8760 − 0.5811i | −0.7863 + 0.1337i | +0.1373 − 0.7043i | −0.7484 − 0.4663i |
| w8 | 001000 | −1.4732 + 0.2920i | +1.4730 − 0.3019i | +1.0501 + 0.1676i | +1.0414 + 0.1712i |
| w9 | 001001 | −1.2487 + 0.8348i | −1.4730 − 0.3019i | +1.4380 + 0.2294i | +0.7230 + 0.1517i |
| w10 | 001010 | −1.4732 − 0.2920i | +1.0895 − 0.2172i | +0.1398 + 0.1309i | +1.0997 + 0.5419i |
| w11 | 001011 | −1.2487 − 0.8348i | −1.0895 − 0.2172i | +0.1680 + 1.0338i | +0.7484 + 0.4663i |
| w12 | 001100 | −1.0283 + 0.2071i | +0.1419 − 0.1122i | +1.0725 + 0.53281i | −1.0414 + 0.1712i |
| w13 | 001101 | −0.8760 + 0.5811i | −0.1419 − 0.1122i | +1.0771 + 0.9315i | −0.7230 + 0.1517i |
| w14 | 001110 | −1.0283 − 0.2071i | +0.7863 − 0.1337i | +0.1361 + 0.4023i | −1.0997 + 0.5419i |
| w15 | 001111 | −0.8760 − 0.5811i | −0.7863 − 0.1337i | +0.1373 + 0.7043i | −0.7484 + 0.4663i |
| w16 | 010000 | +0.2920 + 1.4732i | +1.2124 + 0.8333i | +0.7233 − 0.1496i | +0.1414 − 0.1379i |
| w17 | 010001 | +0.8348 + 1.2487i | −1.2124 + 0.8333i | +0.6220 − 1.1896i | +0.4272 − 0.1421i |
| w18 | 010010 | +0.2920 − 1.4732i | +0.8988 + 0.5768i | +0.4246 − 0.1370i | +0.1440 − 0.4167i |
| w19 | 010011 | +0.8348 − 1.2487i | −0.8988 + 0.5768i | +0.2326 − 1.3986i | +0.4369 − 0.4317i |
| w20 | 010100 | +0.2071 + 1.0283i | +0.3733 + 0.1498i | +0.7267 − 0.4592i | −0.1414 − 0.1379i |
| w21 | 010101 | +0.5811 + 0.5760i | −0.3733 + 0.1498i | +0.6956 − 0.8095i | −0.4272 − 0.1421i |
| w22 | 010110 | +0.2071 − 1.0283i | +0.6394 + 0.3211i | +0.4198 − 0.4151i | −0.1440 − 0.4167i |
| w23 | 010111 | +0.5811 − 0.8760i | −0.6394 + 0.3211i | +0.4114 − 0.7109i | −0.4369 − 0.4317i |
| w24 | 011000 | −0.2920 + 1.4732i | +1.2124 − 0.8333i | +0.7233 + 0.1496i | +0.1414 + 0.1379i |
| w25 | 011001 | −0.8348 + 1.2487i | −1.2124 − 0.8333i | +0.6220 + 1.1896i | +0.4272 + 0.1421i |
| w26 | 011010 | −0.2920 − 1.4732i | +0.8988 − 0.5768i | +0.4246 + 0.1370i | +0.1440 + 0.4167i |
| w27 | 011011 | −0.8348 − 1.2487i | −0.8988 − 0.5768i | +0.2326 + 1.3986i | +0.4369 + 0.4317i |
| w28 | 011100 | −0.2071 + 1.0283i | +0.3733 − 0.1498i | +0.7267 + 0.4592i | −0.1414 + 0.1379i |
| w29 | 011101 | −0.5811 + 0.8760i | −0.3733 − 0.1498i | +0.6956 + 0.8095i | −0.4272 + 0.1421i |
| w30 | 011110 | −0.2071 − 1.0283i | +0.6394 − 0.3211i | +0.4198 + 0.4151i | −0.1440 + 0.4167i |
| w31 | 011111 | −0.5811 − 0.8760i | −0.6394 − 0.3211i | +0.4114 + 0.7109i | −0.4369 + 0.4317i |
| w32 | 100000 | +0.3138 + 0.1393i | +0.2775 + 1.4188i | −1.0501 − 0.1676i | +1.4058 − 0.2115i |
| w33 | 100001 | +0.3094 + 0.1671i | −0.2775 + 1.4188i | −1.4380 − 0.2294i | +0.5981 − 1.1597i |
| w34 | 100010 | +0.3138 − 0.1393i | +0.2177 + 1.0243i | −0.1398 − 0.1309i | +1.0691 − 0.9443i |
| w35 | 100011 | +0.3094 − 0.1671i | −0.2177 + 1.0243i | −0.1580 − 1.0338i | +0.7360 − 0.8042i |
| w36 | 100100 | +0.7004 + 0.1720i | +0.1138 + 0.3999i | −1.0725 − 0.5328i | −1.4058 − 0.2115i |
| w37 | 100101 | +0.6174 + 0.3741i | −0.1138 + 0.3999i | −1.0771 − 0.9315i | −0.5981 − 1.1597i |
| w38 | 100110 | +0.7004 − 0.1720i | +0.1487 + 0.7260i | −0.1361 − 0.4023i | −1.0691 − 0.9443i |
| w39 | 100111 | +0.6174 − 0.3741i | −0.1487 + 0.7260i | −0.1373 − 0.7043i | −0.7360 − 0.8042i |
| w40 | 101000 | −0.3138 + 0.1393i | +0.2775 − 1.4188i | −1.0501 + 0.1676i | +1.4058 + 0.2115i |
| w41 | 101001 | −0.3094 + 0.1671i | −0.2775 − 1.4188i | −1.4380 + 0.2294i | +0.5981 + 1.1597i |
| w42 | 101010 | −0.3138 − 0.1393i | +0.2177 − 1.0243i | −0.1398 + 0.1309i | +1.0691 + 0.9443i |
| w43 | 101011 | −0.3094 − 0.1671i | −0.2177 − 1.0243i | −0.1680 + 1.0338i | +0.7360 + 0.8042i |
| w44 | 101100 | −0.7004 + 0.1720i | +0.1138 − 0.3999i | −1.0725 + 0.5328i | −1.4058 + 0.2115i |
| w45 | 101101 | −0.6174 + 0.3741i | −0.1138 − 0.3999i | −1.0771 + 0.9315i | −0.5981 + 1.1597i |
| w46 | 101110 | −0.7004 − 0.1720i | +0.1487 − 0.7260i | −0.1361 + 0.4023i | −1.0691 + 0.9443i |
| w47 | 101111 | −0.6174 − 0.3741i | −0.1487 − 0.7260i | −0.1373 + 0.7043i | −0.7360 + 0.8042i |
| w48 | 110000 | +0.1393 + 0.3138i | +0.7921 + 1.2096i | −0.7233 − 0.1496i | +0.1695 − 1.0298i |
| w49 | 110001 | +0.1671 + 0.3094i | −0.7921 + 1.2096i | −0.6220 − 1.1896i | +0.2236 − 1.3784i |
| w50 | 110010 | +0.1393 − 0.3138i | +0.6056 + 0.8481i | −0.4246 − 0.1370i | +0.1426 − 0.7102i |
| w51 | 110011 | +0.1671 − 0.3094i | −0.6056 + 0.8481i | −0.2326 − 1.3986i | +0.4351 − 0.7394i |
| w52 | 110100 | +0.1720 + 0.7004i | +0.2891 + 0.3910i | −0.7267 − 0.4592i | −0.1695 − 1.0298i |
| w53 | 110101 | +0.3741 + 0.6174i | −0.2891 + 0.3910i | −0.6956 − 0.8095i | −0.2236 − 1.3784i |
| w54 | 110110 | +0.1720 − 0.7004i | +0.4397 + 0.5853i | −0.4198 − 0.4151i | −0.1426 − 0.7102i |
| w55 | 110111 | +0.3741 − 0.6174i | −0.4397 + 0.5853i | −0.4114 − 0.7109i | −0.4351 − 0.7394i |

-continued

| w/MCS index | bit label | R = ½ (or R = ⅝, ¾ or ¹³⁄₁₆) | R = ⅝ (or R = ½, ¾ or ¹³⁄₁₆) | R = ¾ (or R = ½, ⅝ or ¹³⁄₁₆) | R = ¹³⁄₁₆ (or R = ½, ⅝ or ¾) |
|---|---|---|---|---|---|
| w56 | 111000 | −0.1393 + 0.3138i | +0.7921 − 1.2096i | −0.7233 + 0.1496i | +0.1695 + 1.0298i |
| w57 | 111001 | −0.1671 + 0.3094i | −0.7921 − 1.2096i | −0.6220 + 1.1896i | +0.2236 + 1.3784i |
| w58 | 111010 | −0.1393 − 0.3138i | +0.6056 − 0.8481i | −0.4246 + 0.1370i | +0.1426 + 0.7102i |
| w59 | 111011 | −0.1671 − 0.3094i | −0.6055 − 0.8481i | −0.2326 + 1.3986i | +0.4351 + 0.7394i |
| w60 | 111100 | −0.1720 + 0.7004i | +0.2891 − 0.3910i | −0.7267 + 0.4592i | −0.1695 + 1.0298i |
| w61 | 111101 | −0.3741 + 0.6174i | −0.2891 − 0.3910i | −0.6956 + 0.8095i | −0.2236 + 1.3784i |
| w62 | 111110 | −0.1720 − 0.7004i | +0.4397 − 0.5853i | −0.4198 + 0.4151i | −0.1426 + 0.7102i |
| w63 | 111111 | −0.3741 − 0.6174i | −0.4397 − 0.5853i | −0.4114 + 0.7109i | −0.4351 + 0.7394i |

B4) 128-QAM NUC for R=1/2 (or R=5/8, 3/4 or 13/16):

| w index | bit label | Constellation point |
|---|---|---|
| w0 | 0000000 | +0.7383 − 1.3947i |
| w1 | 0000000 | +0.2726 − 1.6070i |
| w2 | 0000001 | +0.7383 + 1.3947i |
| w3 | 0000001 | +0.2726 + 1.6070i |
| w4 | 0000010 | −0.7383 − 1.3947i |
| w5 | 0000010 | −0.2726 − 1.6070i |
| w6 | 0000011 | −0.7383 + 1.3947i |
| w7 | 0000011 | −0.2726 + 1.6070i |
| w8 | 0000000 | +1.0680 − 1.0753i |
| w9 | 0000100 | +1.0389 − 0.7336i |
| w10 | 0000001 | +1.0680 + 1.0753i |
| w11 | 0000101 | +1.0389 + 0.7336i |
| w12 | 0000110 | −1.0680 − 1.0753i |
| w13 | 0000110 | −1.0389 − 0.7336i |
| w14 | 0000111 | −1.0680 + 1.0753i |
| w15 | 0000111 | −1.0389 + 0.7336i |
| w16 | 0001000 | +0.5286 − 1.0997i |
| w17 | 0001000 | +0.1915 − 1.2689i |
| w18 | 0001001 | +0.5286 + 1.0997i |
| w19 | 0001001 | +0.1915 + 1.2689i |
| w20 | 0001010 | −0.5286 − 1.0997i |
| w21 | 0001010 | −0.1915 − 1.2689i |
| w22 | 0001011 | −0.5286 + 1.0997i |
| w23 | 0001011 | −0.1915 + 1.2689i |
| w24 | 0001100 | +0.6878 − 0.8578i |
| w25 | 0001100 | +0.7725 − 0.6723i |
| w26 | 0001101 | +0.6878 + 0.5578i |
| w27 | 0001101 | +0.7725 + 0.6723i |
| w28 | 0001110 | −0.6878 − 0.8578i |
| w29 | 0001110 | −0.7725 − 0.6723i |
| w30 | 0001111 | −0.6878 + 0.8578i |
| w31 | 0001111 | −0.7725 + 0.6723i |
| w32 | 0010000 | +0.1315 − 0.7332i |
| w33 | 0010000 | +0.1038 − 0.7607i |
| w34 | 0010001 | +0.1315 + 0.7332i |
| w35 | 0010001 | +0.1038 + 0.7607i |
| w36 | 0010010 | −0.1315 − 0.7332i |
| w37 | 0010010 | −0.1038 − 0.7607i |
| w38 | 0010011 | −0.1315 + 0.7332i |
| w39 | 0010011 | −0.1038 + 0.7607i |
| w40 | 0010100 | +0.1647 − 0.5388i |
| w41 | 0010100 | +0.1629 − 0.5296i |
| w42 | 0010101 | +0.1647 + 0.5388i |
| w43 | 0010001 | +0.1629 + 0.5296i |
| w44 | 0010110 | −0.1647 − 0.5388i |
| w45 | 0010110 | −0.1629 − 0.5296i |
| w46 | 0010111 | −0.1647 + 0.5388i |
| w47 | 0010111 | −0.1629 + 0.5296i |
| w48 | 0011000 | +0.3255 − 0.9067i |
| w49 | 0011000 | +0.1588 − 1.0122i |
| w50 | 0011001 | +0.3255 + 0.9067i |
| w51 | 0011001 | +0.1588 + 1.0122i |
| w52 | 0011010 | −0.3255 − 0.9067i |
| w53 | 0011010 | −0.1588 − 1.0122i |
| w54 | 0011011 | −0.3255 + 0.9067i |
| w55 | 0011011 | −0.1588 + 1.0122i |
| w56 | 0011100 | +0.4535 − 0.6452i |
| w57 | 0011100 | +0.4545 − 0.5898i |
| w58 | 0011101 | +0.4535 + 0.6452i |
| w59 | 0011101 | +0.4545 + 0.5898i |
| w60 | 0011110 | −0.4535 − 0.6452i |
| w61 | 0011110 | −0.4545 − 0.5898i |
| w62 | 0011111 | −0.4535 + 0.6452i |
| w63 | 0011111 | −0.4545 + 0.5898i |
| w64 | 01000000 | +1.5779 − 0.2230i |
| w65 | 01000001 | +1.2114 − 0.1662i |
| w66 | 01000010 | +1.5779 + 0.2230i |
| w67 | 01000011 | +1.2114 + 0.1662i |
| w68 | 01000000 | −1.5779 − 0.2230i |
| w69 | 01000101 | −1.2114 − 0.1662i |
| w70 | 01000110 | −1.5779 + 0.2230i |
| w71 | 01000111 | −1.2114 + 0.16S2i |
| w72 | 01001000 | +1.4915 − 0.6927i |
| w73 | 01001001 | +1.1447 − 0.4719i |
| w74 | 01001010 | +1.4915 + 0.6927i |
| w75 | 01001011 | +1.1447 + 0.4719i |
| w76 | 01001100 | −1.4915 − 0.6927i |
| w77 | 01001101 | −1.1447 − 0.4719i |
| w78 | 01001110 | −1.4915 + 0.6927i |
| w79 | 01001111 | −1.1447 + 0.4719i |
| w80 | 01010000 | +0.7620 − 0.1121i |
| w81 | 01010001 | +0.9103 − 0.1272i |
| w82 | 01010010 | +0.7620 + 0.1121i |
| w83 | 01010011 | +0.9103 + 0.1272i |
| w84 | 01010100 | −0.7620 − 0.1121i |
| w85 | 01010101 | −0.9103 − 0.1272i |
| w86 | 01010110 | −0.7620 + 0.1121i |
| w87 | 01010111 | −0.9103 + 0.1272i |
| w88 | 01011000 | +0.7359 − 0.3230i |
| w89 | 01011001 | +0.8236 − 0.3936i |
| w90 | 01011010 | +0.7359 + 0.3230i |
| w91 | 01011011 | +0.8236 + 0.3936i |
| w92 | 01011100 | −0.7359 − 0.3230i |
| w93 | 01011101 | −0.8236 − 0.3936i |
| w94 | 01011110 | −0.7359 + 0.3230i |
| w95 | 01011111 | −0.8236 + 0.3936i |
| w96 | 01100000 | +0.1461 − 0.1146i |
| w97 | 01100001 | +0.1573 − 0.1142i |
| w98 | 01100010 | +0.1461 + 0.1146i |
| w99 | 01100011 | +0.1573 + 0.1142i |
| w100 | 01100100 | −0.1461 − 0.1146i |
| w101 | 01100101 | −0.1573 − 0.1142i |
| w102 | 01100110 | −0.1461 + 0.1146i |
| w103 | 01100111 | −0.1573 + 0.1142i |
| w104 | 01101000 | +0.1535 − 0.3082i |
| w105 | 01101001 | +0.1629 − 0.3084i |
| w106 | 01101010 | +0.1535 + 0.3082i |
| w107 | 01101011 | +0.1629 + 0.3084i |
| w108 | 01101100 | −0.1535 − 0.3082i |
| w109 | 01101101 | −0.1629 − 0.3084i |
| w110 | 01101110 | −0.1535 + 0.3082i |
| w111 | 01101111 | −0.1629 + 0.3084i |
| w112 | 01110000 | +0.4774 − 0.1074i |
| w113 | 01110001 | +0.4323 − 0.1096i |
| w114 | 01110010 | +0.4774 + 0.1074i |
| w115 | 01110011 | +0.4323 + 0.1096i |
| w116 | 01110100 | −0.4774 − 0.1074i |
| w117 | 01110101 | −0.4323 − 0.1096i |

-continued

| w index | bit label | Constellation point |
|---|---|---|
| w118 | 01110110 | −0.4774 + 0.1074i |
| w119 | 01110111 | −0.4323 + 0.1096i |
| w120 | 01111000 | +0.4853 − 0.3237i |
| w121 | 01111001 | +0.4637 − 0.3425i |
| w122 | 01111010 | +0.4853 + 0.3237i |
| w123 | 01111011 | +0.4637 + 0.3425i |
| w124 | 01111100 | −0.4853 − 0.3237i |
| w125 | 01111101 | −0.4537 − 0.3425i |
| w126 | 01111110 | −0.4853 + 0.3237i |
| w127 | 01111111 | −0.4637 + 0.3425i | for R=5/8 (or R=1/2, 3/4 or 13/16):

| w index | bit label | Constellation point |
|---|---|---|
| w0 | 0000000 | +1.1438 + 0.4323i |
| w1 | 0000000 | +0.1045 + 0.4578i |
| w2 | 0000001 | −1.1438 + 0.4323i |
| w3 | 0000001 | −0.1045 + 0.4578i |
| w4 | 0000010 | +0.9006 + 0.4173i |
| w5 | 0000010 | +0.1067 + 0.3515i |
| w6 | 0000011 | −0.9006 + 0.4173i |
| w7 | 0000011 | −0.1067 + 0.3515i |
| w8 | 0000100 | +1.1598 + 0.1437i |
| w9 | 0000100 | +0.1075 + 0.0988i |
| w10 | 0000101 | −1.1598 + 0.1437i |
| w11 | 0000101 | −0.1075 + 0.0988i |
| w12 | 0000110 | +0.9102 + 0.1324i |
| w13 | 0000110 | +0.1136 + 0.1402i |
| w14 | 0000111 | −0.9102 + 0.1324i |
| w15 | 0000111 | −0.1136 + 0.1402i |
| w16 | 0001000 | +0.5578 + 0.4216i |
| w17 | 0001000 | +0.3411 + 0.4189i |
| w18 | 0001001 | −0.5578 + 0.4216i |
| w19 | 0001001 | −0.3411 + 0.4189i |
| w20 | 0001010 | +0.6797 + 0.3850i |
| w21 | 0001010 | +0.3088 + 0.3456i |
| w22 | 0001011 | −0.6797 + 0.3850i |
| w23 | 0001011 | −0.3088 + 0.3456i |
| w24 | 0001100 | +0.5755 + 0.1222i |
| w25 | 0001100 | +0.3700 + 0.1151i |
| w26 | 0001101 | −0.5755 + 0.1222i |
| w27 | 0001101 | −0.3700 + 0.1151i |
| w28 | 0001110 | +0.6787 + 0.1401i |
| w29 | 0001110 | +0.3294 + 0.1448i |
| w30 | 0001111 | −0.6787 + 0.1401i |
| w31 | 0001111 | −0.3294 + 0.1448i |
| w32 | 0010000 | +1.1837 + 0.8001i |
| w33 | 0010000 | +0.1121 + 0.6749i |
| w34 | 0010001 | −1.1837 + 0.8001i |
| w35 | 0010001 | −0.1121 + 0.6749i |
| w36 | 0010010 | +0.9008 + 0.6972i |
| w37 | 0010010 | +0.1179 + 0.8955i |
| w38 | 0010011 | −0.9008 + 0.6972i |
| w39 | 0010011 | −0.1179 + 0.8955i |
| w40 | 0010100 | +1.4855 + 0.1793i |
| w41 | 0010100 | +0.1933 + 1.4991i |
| w42 | 0010101 | −1.4855 + 0.1793i |
| w43 | 0010101 | −0.1933 + 1.4991i |
| w44 | 0010110 | +1.5681 + 0.5636i |
| w45 | 0010110 | +0.1440 + 1.1691i |
| w46 | 0010111 | −1.5681 + 0.5636i |
| w47 | 0010111 | −0.1440 + 1.1691i |
| w48 | 0011000 | +0.5354 + 0.6351i |
| w49 | 0011000 | +0.3342 + 0.6628i |
| w50 | 0011001 | −0.5354 + 0.6351i |
| w51 | 0011001 | −0.3342 + 0.6528i |
| w52 | 0011010 | +0.6549 + 0.7546i |
| w53 | 0011010 | +0.3585 + 0.8699i |
| w54 | 0011011 | −0.6549 + 0.7546i |
| w55 | 0011011 | −0.3585 + 0.8699i |
| w56 | 0011100 | +0.9727 + 1.2109i |
| w57 | 0011100 | +0.5835 + 1.4250i |
| w58 | 0011101 | −0.9727 + 1.2109i |
| w59 | 0011101 | −0.5835 + 1.4250i |

-continued

| w index | bit label | Constellation point |
|---|---|---|
| w60 | 0011110 | +0.7102 + 1.0171i |
| w61 | 0011110 | +0.4344 + 1.1140i |
| w62 | 0011111 | −0.7102 + 1.0171i |
| w63 | 0011111 | −0.4344 + 1.1140i |
| w64 | 01000000 | +1.1438 − 0.4323i |
| w65 | 01000001 | +0.1045 − 0.4578i |
| w66 | 01000010 | −1.1438 − 0.4323i |
| w67 | 01000011 | −0.1045 − 0.4578i |
| w68 | 01000100 | +0.9006 − 0.4173i |
| w69 | 01000101 | +0.1067 − 0.3515i |
| w70 | 01000110 | −0.9006 − 0.4173i |
| w71 | 01000111 | −0.1067 − 0.3515i |
| w72 | 01001000 | +1.1598 − 0.1437i |
| w73 | 01001001 | +0.1075 − 0.0988i |
| w74 | 01001010 | −1.1598 − 0.1437i |
| w75 | 01001011 | −0.1075 − 0.0988i |
| w76 | 01001100 | +0.9102 − 0.1324i |
| w77 | 01001101 | +0.1136 − 0.1402i |
| w78 | 01001110 | −0.9102 − 0.1324i |
| w79 | 01001111 | −0.1136 − 0.1402i |
| w80 | 01010000 | +0.5578 − 0.4216i |
| w81 | 01010001 | +0.3411 − 0.4189i |
| w82 | 01010010 | −0.5578 − 0.4216i |
| w83 | 01010011 | −0.3411 − 0.4189i |
| w84 | 01010100 | +0.6797 − 0.3850i |
| w85 | 01010101 | +0.3088 − 0.3456i |
| w86 | 01010110 | −0.6797 − 0.3850i |
| w87 | 01010111 | −0.3088 − 0.3456i |
| w88 | 01011000 | +0.5755 − 0.1222i |
| w89 | 01011001 | +0.3700 − 0.1151i |
| w90 | 01011010 | −0.5755 − 0.1222i |
| w91 | 01011011 | −0.3700 − 0.1151i |
| w92 | 01011100 | +0.6787 − 0.1401i |
| w93 | 01011101 | +0.3294 − 0.1408i |
| w94 | 01011110 | −0.6787 − 0.1401i |
| w95 | 01011111 | −0.3294 − 0.1448i |
| w96 | 01100000 | +1.1837 − 0.8001i |
| w97 | 01100001 | +0.1121 − 0.6749i |
| w98 | 01100010 | −1.1837 − 0.8001i |
| w99 | 01100011 | −0.1121 − 0.6749i |
| w100 | 01100100 | +0.9008 − 0.6972i |
| w101 | 01100101 | +0.1179 − 0.8955i |
| w102 | 01100110 | −0.9008 − 0.6972i |
| w103 | 01100111 | −0.1179 − 0.8955i |
| w104 | 01101000 | +1.4855 − 0.1793i |
| w105 | 01101001 | +0.1933 − 1.4991i |
| w106 | 01101010 | −1.4855 − 0.1793i |
| w107 | 01101011 | −0.1933 − 1.4991i |
| w108 | 01101100 | +1.5681 − 0.5636i |
| w109 | 01101101 | +0.1440 − 1.1691i |
| w110 | 01101110 | −1.5681 − 0.5636i |
| w111 | 01101111 | −0.1440 − 1.1691i |
| w112 | 01110000 | +0.5354 − 0.6351i |
| w113 | 01110001 | +0.3342 − 0.6628i |
| w114 | 01110010 | −0.5354 − 0.6351i |
| w115 | 01110011 | −0.3342 − 0.6628i |
| w116 | 01110100 | +0.6549 − 0.7546i |
| w117 | 01110101 | +0.3585 − 0.8699i |
| w118 | 01110110 | −0.6549 − 0.7546i |
| w119 | 01110111 | −0.3585 − 0.5699i |
| w120 | 01111000 | +0.9727 − 1.2109i |
| w121 | 01111001 | +0.5835 − 1.4250i |
| w122 | 01111010 | −0.9727 − 1.2109i |
| w123 | 01111011 | −0.5835 − 1.4250i |
| w124 | 01111100 | +0.7102 − 1.0171i |
| w125 | 01111101 | +0.4344 − 1.1140i |
| w126 | 01111110 | −0.7102 − 1.0171i |
| w127 | 01111111 | −0.4344 − 1.1140i | for R=3/4 (or R=1/2, 5/8 or 13/16):

| w index | bit label | Constellation point |
|---|---|---|
| w0 | 0000000 | +1.0837 + 0.3878i |
| w1 | 0000000 | +0.5568 + 0.5351i |

-continued

| w index | bit label | Constellation point |
|---|---|---|
| w2 | 0000001 | +1.0837 − 0.3878i |
| w3 | 0000001 | +0.5568 − 0.5351i |
| w4 | 0000010 | +0.8372 + 0.4015i |
| w5 | 0000010 | +0.5992 + 0.3732i |
| w6 | 0000011 | +0.8372 − 0.4015i |
| w7 | 0000011 | +0.5992 − 0.3732i |
| w8 | 0000100 | +1.1795 + 0.6737i |
| w9 | 0000100 | +0.5823 + 0.7120i |
| w10 | 0000101 | +1.1795 − 0.6737i |
| w11 | 0000101 | +0.5823 − 0.7120i |
| w12 | 0000110 | +0.8934 + 0.6718i |
| w13 | 0000110 | +0.7091 + 0.8942i |
| w14 | 0000111 | +0.8934 − 0.6718i |
| w15 | 0000111 | +0.7091 − 0.8942i |
| w16 | 0001000 | +0.1125 + 0.5652i |
| w17 | 0001000 | +0.3356 + 0.5485i |
| w18 | 0001001 | +0.1125 − 0.5652i |
| w19 | 0001001 | +0.3356 − 0.5485i |
| w20 | 0001010 | +0.1063 + 0.3959i |
| w21 | 0001010 | +0.3354 + 0.3801i |
| w22 | 0001011 | +0.1063 − 0.3959i |
| w23 | 0001011 | +0.3354 − 0.3801i |
| w24 | 0001100 | +0.1174 + 0.7565i |
| w25 | 0001100 | +0.3498 + 0.7450i |
| w26 | 0001101 | +0.1174 − 0.7565i |
| w27 | 0001101 | +0.3498 − 0.7450i |
| w28 | 0001110 | +0.1285 + 0.9672i |
| w29 | 0001110 | +0.3973 + 0.9520i |
| w30 | 0001111 | +0.1285 − 0.9672i |
| w31 | 0001111 | +0.3973 − 0.9520i |
| w32 | 0010000 | −1.0837 + 0.3878i |
| w33 | 0010000 | −0.5568 + 0.5351i |
| w34 | 0010001 | −1.0837 − 0.3878i |
| w35 | 0010001 | −0.5568 − 0.5351i |
| w36 | 0010010 | −0.8372 + 0.4015i |
| w37 | 0010010 | −0.5992 + 0.3732i |
| w38 | 0010011 | −0.8372 − 0.4015i |
| w39 | 0010011 | −0.5992 − 0.3732i |
| w40 | 0010100 | −1.1795 + 0.6737i |
| w41 | 0010100 | −0.5823 + 0.7120i |
| w42 | 0010101 | −1.1795 − 0.6737i |
| w43 | 0010101 | −0.5823 − 0.7120i |
| w44 | 0010110 | −0.8934 + 0.6718i |
| w45 | 0010110 | −0.7091 + 0.8942i |
| w46 | 0010111 | −0.8934 − 0.6718i |
| w47 | 0010111 | −0.7091 − 0.5942i |
| w48 | 0011000 | −0.1125 + 0.5652i |
| w49 | 0011000 | −0.3356 + 0.5485i |
| w50 | 0011001 | −0.1125 − 0.5652i |
| w51 | 0011001 | −0.3356 − 0.5485i |
| w52 | 0011010 | −0.1063 + 0.3959i |
| w53 | 0011010 | −0.3354 + 0.3801i |
| w54 | 0011011 | −0.1063 − 0.3959i |
| w55 | 0011011 | −0.3354 − 0.3801i |
| w56 | 0011100 | −0.1174 + 0.7565i |
| w57 | 0011100 | −0.3498 + 0.7450i |
| w58 | 0011101 | −0.1174 − 0.7565i |
| w59 | 0011101 | −0.3498 − 0.7450i |
| w60 | 0011110 | −0.1285 + 0.9672i |
| w61 | 0011110 | −0.3973 + 0.9520i |
| w62 | 0011111 | −0.1285 − 0.9672i |
| w63 | 0011111 | −0.3973 − 0.9520i |
| w64 | 01000000 | +1.0605 + 0.1271i |
| w65 | 01000001 | +0.5216 + 0.0747i |
| w66 | 01000010 | +1.0605 − 0.1271i |
| w67 | 01000011 | +0.5216 − 0.0747i |
| w68 | 01000100 | +0.8209 + 0.1292i |
| w69 | 01000101 | +0.6018 + 0.1929i |
| w70 | 01000110 | +0.8209 − 0.1292i |
| w71 | 01000111 | +0.6018 − 0.1929i |
| w72 | 01001000 | +1.3525 + 0.1471i |
| w73 | 01001001 | +1.0702 + 1.0357i |
| w74 | 01001010 | +1.3525 − 0.1471i |
| w75 | 01001011 | +1.0702 − 1.0357i |
| w76 | 01001100 | +1.4799 + 0.4422i |
| w77 | 01001101 | +0.7653 + 1.1720i |
| w78 | 01001110 | +1.4799 − 0.4422i |

-continued

| w index | bit label | Constellation point |
|---|---|---|
| w79 | 01001111 | +0.7653 − 1.1720i |
| w80 | 01010000 | +0.1054 + 0.0790i |
| w81 | 01010001 | +0.3169 + 0.0841i |
| w82 | 01010010 | +0.1054 − 0.0790i |
| w83 | 01010011 | +0.3169 − 0.0841i |
| w84 | 01010100 | +0.1042 + 0.2345i |
| w85 | 01010101 | +0.3223 + 0.2346i |
| w86 | 01010110 | +0.1042 − 0.2345i |
| w87 | 01010111 | +0.3223 − 0.2348i |
| w88 | 01011000 | +0.1687 + 1.4929i |
| w89 | 01011001 | +0.5173 + 1.4708i |
| w90 | 01011010 | +0.1687 − 1.4929i |
| w91 | 01011011 | +0.5173 − 1.4708i |
| w92 | 01011100 | +0.1455 + 1.2047i |
| w93 | 01011101 | +0.4442 + 1.1814i |
| w94 | 01011110 | +0.1455 − 1.2047i |
| w95 | 01011111 | +0.4442 − 1.1814i |
| w96 | 01100000 | −1.0605 + 0.1271i |
| w97 | 01100001 | −0.5216 + 0.0747i |
| w98 | 01100010 | −1.0605 − 0.1271i |
| w99 | 01100011 | −0.5216 − 0.0747i |
| w100 | 01100100 | −0.8209 + 0.1292i |
| w101 | 01100101 | −0.8018 + 0.1929i |
| w102 | 01100110 | −0.8209 − 0.1292i |
| w103 | 01100111 | −0.8018 − 0.1929i |
| w104 | 01101000 | −1.3525 + 0.1471i |
| w105 | 01101001 | −1.0702 + 1.0357i |
| w106 | 01101010 | −1.3525 − 0.1471i |
| w107 | 01101011 | −1.0702 − 1.0357i |
| w108 | 01101100 | −1.4799 + 0.4422i |
| w109 | 01101101 | −0.7653 + 1.1720i |
| w110 | 01101110 | −1.4799 − 0.4422i |
| w111 | 01101111 | −0.7653 − 1.1720i |
| w112 | 01110000 | −0.1054 + 0.0790i |
| w113 | 01110001 | −0.3169 + 0.0841i |
| w114 | 01110010 | −0.1054 − 0.0790i |
| w115 | 01110011 | −0.3169 − 0.0841i |
| w116 | 01110100 | −0.1042 + 0.2345i |
| w117 | 01110101 | −0.3223 + 0.2346i |
| w118 | 01110110 | −0.1042 − 0.2345i |
| w119 | 01110111 | −0.3223 − 0.2346i |
| w120 | 01111000 | −0.1687 + 1.4929i |
| w121 | 01111001 | −0.5173 + 1.4708i |
| w122 | 01111010 | −0.1687 − 1.4929i |
| w123 | 01111011 | −0.5173 − 1.4708i |
| w124 | 01111100 | −0.1455 + 1.2047i |
| w125 | 01111101 | −0.4442 + 1.1814i |
| w126 | 01111110 | −0.1455 − 1.2047i |
| w127 | 01111111 | −0.4442 − 1.1814i | for R=13/16 (or R=1/2, 5/8 or 3/4):

| w index | bit label | Constellation point |
|---|---|---|
| w0 | 0000000 | +1.0422 + 0.3376i |
| w1 | 0000000 | −1.0422 + 0.3376i |
| w2 | 0000001 | −1.0422 − 0.3376i |
| w3 | 0000001 | −1.0422 − 0.3376i |
| w4 | 0000010 | +0.1125 + 0.6269i |
| w5 | 0000010 | −0.1125 + 0.6269i |
| w6 | 0000011 | +0.1125 − 0.6269i |
| w7 | 0000011 | −0.1125 − 0.6269i |
| w8 | 0000100 | +1.0010 + 0.1105i |
| w9 | 0000100 | −1.0010 + 0.1105i |
| w10 | 0000101 | +1.0010 − 0.1105i |
| w11 | 0000101 | −1.0010 − 0.1105i |
| w12 | 0000110 | +0.0978 + 0.0913i |
| w13 | 0000110 | −0.0978 + 0.0913i |
| w14 | 0000111 | +0.0978 − 0.0913i |
| w15 | 0000111 | −0.0978 − 0.0913i |
| w16 | 0001000 | +0.7966 + 0.3496i |
| w17 | 0001000 | −0.7966 + 0.3496i |
| w18 | 0001001 | +0.7966 − 0.3496i |
| w19 | 0001001 | −0.7966 − 0.3496i |
| w20 | 0001010 | +0.1109 + 0.4454i |

-continued

| w index | bit label | Constellation point |
|---|---|---|
| w21 | 0001010 | −0.1109 + 0.4454i |
| w22 | 0001011 | +0.1109 − 0.4454i |
| w23 | 0001011 | −0.1109 − 0.4454i |
| w24 | 0001100 | +0.7613 + 0.1187i |
| w25 | 0001100 | −0.7613 + 0.1187i |
| w26 | 0001101 | +0.7613 − 0.1187i |
| w27 | 0001101 | −0.7613 − 0.1187i |
| w28 | 0001110 | +0.1038 + 0.2705i |
| w29 | 0001110 | −0.1038 + 0.2705i |
| w30 | 0001111 | +0.1038 − 0.2705i |
| w31 | 0001111 | −0.1038 − 0.2705i |
| w32 | 0010000 | +0.5556 + 0.6306i |
| w33 | 0010000 | −0.5556 + 0.6306i |
| w34 | 0010001 | +0.5556 − 0.6306i |
| w35 | 0010001 | −0.5556 − 0.6306i |
| w36 | 0010010 | +0.3351 + 0.6308i |
| w37 | 0010010 | −0.3351 + 0.6303i |
| w38 | 0010011 | +0.3351 − 0.6308i |
| w39 | 0010011 | −0.3351 − 0.6308i |
| w40 | 0010100 | +0.4942 + 0.0780i |
| w41 | 0010100 | −0.4942 + 0.0780i |
| w42 | 0010101 | +0.4942 − 0.0780i |
| w43 | 0010101 | −0.4942 − 0.0780i |
| w44 | 0010110 | +0.2935 + 0.0906i |
| w45 | 0010110 | −0.2935 + 0.0906i |
| w46 | 0010111 | +0.2935 − 0.0906i |
| w47 | 0010111 | −0.2935 − 0.0906i |
| w48 | 0011000 | +0.5761 + 0.4286i |
| w49 | 0011000 | −0.5761 + 0.4286i |
| w50 | 0011001 | +0.5761 − 0.4286i |
| w51 | 0011001 | −0.5761 − 0.4286i |
| w52 | 0011010 | +0.3383 + 0.4404i |
| w53 | 0011010 | −0.3383 + 0.4401i |
| w54 | 0011011 | +0.3383 − 0.4404i |
| w55 | 0011011 | −0.3383 − 0.4404i |
| w56 | 0011100 | +0.5456 + 0.2367i |
| w57 | 0011100 | −0.5456 + 0.2367i |
| w58 | 0011101 | +0.5456 − 0.2367i |
| w59 | 0011101 | −0.5456 − 0.2367i |
| w60 | 0011110 | +0.3172 + 0.2666i |
| w61 | 0011110 | −0.3172 + 0.2666i |
| w62 | 0011111 | +0.3172 − 0.2666i |
| w63 | 0011111 | −0.3172 − 0.2666i |
| w64 | 01000000 | +1.1154 + 0.5839i |
| w65 | 01000001 | −1.1154 + 0.5839i |
| w66 | 01000010 | +1.1154 − 0.5839i |
| w67 | 01000011 | −1.1154 − 0.5839i |
| w68 | 01000100 | +0.1155 + 0.8217i |
| w69 | 01000101 | −0.1155 + 0.8217i |
| w70 | 01000110 | +0.1155 − 0.8217i |
| w71 | 01000111 | −0.1155 − 0.8217i |
| w72 | 01001000 | +1.2844 + 0.1345i |
| w73 | 01001001 | −1.2844 + 0.1345i |
| w74 | 01001010 | +1.2844 − 0.1345i |
| w75 | 01001011 | −1.2844 − 0.1345i |
| w76 | 01001100 | +0.1645 + 1.5274i |
| w77 | 01001101 | −0.1646 + 1.5274i |
| w78 | 01001110 | +0.1646 − 1.5274i |
| w79 | 01001111 | −0.1646 − 1.5274i |
| w80 | 01010000 | +0.8563 + 0.5705i |
| w81 | 01010001 | −0.8563 + 0.5705i |
| w82 | 01010010 | +0.8563 − 0.5705i |
| w83 | 01010011 | −0.8563 − 0.5705i |
| w84 | 01010100 | +0.1239 + 1.0311i |
| w85 | 01010101 | −0.1239 + 1.0311i |
| w86 | 01010110 | +0.1239 − 1.0311i |
| w87 | 01010111 | −0.1239 − 1.0311i |
| w88 | 01011000 | +1.4001 + 0.4092i |
| w89 | 01011001 | −1.4001 + 0.4092i |
| w90 | 01011010 | +1.4001 − 0.4092i |
| w91 | 01011011 | −1.4001 − 0.4032i |
| w92 | 01011100 | +0.1345 + 1.2611i |
| w93 | 01011101 | −0.1345 + 1.2611i |
| w94 | 01011110 | +0.1345 − 1.2611i |
| w95 | 01011111 | −0.1345 − 1.2611i |
| w96 | 01100000 | +0.5970 + 0.8482i |
| w97 | 01100001 | −0.5970 + 0.8482i |

-continued

| w index | bit label | Constellation point |
|---|---|---|
| w98 | 01100010 | +0.5970 − 0.8482i |
| w99 | 01100011 | −0.5970 − 0.8482i |
| w100 | 01100100 | +0.3510 + 0.8405i |
| w101 | 01100101 | −0.3510 + 0.8405i |
| w102 | 01100110 | +0.3510 − 0.8405i |
| w103 | 01100111 | −0.3510 − 0.5405i |
| w104 | 01101000 | +1.1670 + 0.8997i |
| w105 | 01101001 | −1.1670 + 0.8997i |
| w106 | 01101010 | +1.1670 − 0.8997i |
| w107 | 01101011 | −1.1670 − 0.8997i |
| w108 | 01101100 | +0.4543 + 1.3933i |
| w109 | 01101101 | −0.4543 + 1.3933i |
| w110 | 01101110 | +0.4543 − 1.3933i |
| w111 | 01101111 | −0.4543 − 1.3933i |
| w112 | 01110000 | +0.8378 + 0.8041i |
| w113 | 01110001 | −0.8378 + 0.8041i |
| w114 | 01110010 | +0.8378 − 0.8041i |
| w115 | 01110011 | −0.8378 − 0.5041i |
| w116 | 01110100 | +0.3850 + 1.0724i |
| w117 | 01110101 | −0.3850 + 1.0724i |
| w118 | 01110110 | +0.3850 − 1.0724i |
| w119 | 01110111 | −0.3850 − 1.0724i |
| w120 | 01111000 | +0.9031 + 1.0698i |
| w121 | 01111001 | −0.9031 + 1.0698i |
| w122 | 01111010 | +0.9031 − 1.0698i |
| w123 | 01111011 | −0.9031 − 1.0698i |
| w124 | 01111100 | +0.6436 + 1.1770i |
| w125 | 01111101 | −0.6436 + 1.1770i |
| w126 | 01111110 | +0.6436 − 1.1770i |
| w127 | 01111111 | −0.6436 − 1.1770i |

B5) 256-QAM NUC
for R=1/2 (or R=5/8, 3/4 or 13/16):

| w index | bit label | Constellation point |
|---|---|---|
| w0 | 0000000 | −1.2901 + 1.0495i |
| w1 | 0000000 | −1.6350 + 0.1593i |
| w2 | 0000001 | −0.2844 + 0.1296i |
| w3 | 0000001 | −0.3237 + 0.0849i |
| w4 | 0000010 | −1.4625 + 0.7740i |
| w5 | 0000010 | −1.5776 + 0.4735i |
| w6 | 0000011 | −0.2853 + 0.1309i |
| w7 | 0000011 | −0.3228 + 0.0867i |
| w8 | 0000100 | +1.2901 + 1.0495i |
| w9 | 0000100 | +1.6350 + 0.1593i |
| w10 | 0000101 | +0.2844 + 0.1296i |
| w11 | 0000101 | +0.3237 + 0.0849i |
| w12 | 0000110 | +1.4625 + 0.7740i |
| w13 | 0000110 | +1.5776 + 0.4735i |
| w14 | 0000111 | +0.2853 + 0.1309i |
| w15 | 0000111 | +0.3228 + 0.0867i |
| w16 | 0001000 | −0.7273 + 0.6160i |
| w17 | 0001000 | −0.9430 + 0.1100i |
| w18 | 0001001 | −0.5902 + 0.4857i |
| w19 | 0001001 | −0.7502 + 0.1138i |
| w20 | 0001010 | −0.8177 + 0.4841i |
| w21 | 0001010 | −0.9069 + 0.2829i |
| w22 | 0001011 | −0.6355 + 0.4185i |
| w23 | 0001011 | −0.7325 + 0.2088i |
| w24 | 0001100 | +0.7273 + 0.6160i |
| w25 | 0001100 | +0.9430 + 0.1100i |
| w26 | 0001101 | +0.5902 + 0.4857i |
| w27 | 0001101 | +0.7502 + 0.1138i |
| w28 | 0001110 | +0.8177 + 0.4841i |
| w29 | 0001110 | +0.9069 + 0.2829i |
| w30 | 0001111 | +0.6355 + 0.4185i |
| w31 | 0001111 | +0.7325 + 0.2088i |
| w32 | 0010000 | −1.0646 + 1.2876i |
| w33 | 0010000 | −0.1658 + 1.6747i |
| w34 | 0010001 | −0.1053 + 0.1494i |
| w35 | 0010001 | −0.0872 + 0.1390i |
| w36 | 0010010 | −0.7949 + 1.4772i |
| w37 | 0010010 | −0.4907 + 1.6084i |
| w38 | 0010011 | −0.1052 + 0.1495i |

-continued

| w index | bit label | Constellation point |
|---|---|---|
| w39 | 0010011 | −0.0871 + 0.1392i |
| w40 | 0010100 | +1.0646 + 1.2876i |
| w41 | 0010100 | +0.1658 + 1.6747i |
| w42 | 0010101 | +0.1053 + 0.1494i |
| w43 | 0010101 | +0.0872 + 0.1390i |
| w44 | 0010110 | +0.7949 + 1.4772i |
| w45 | 0010110 | +0.4907 + 1.6084i |
| w46 | 0010111 | +0.1052 + 0.1495i |
| w47 | 0010111 | +0.0871 + 0.1392i |
| w48 | 0011000 | −0.5707 + 0.7662i |
| w49 | 0011000 | −0.1088 + 0.9530i |
| w50 | 0011001 | −0.4294 + 0.6363i |
| w51 | 0011001 | −0.1091 + 0.7656i |
| w52 | 0011010 | −0.4490 + 0.8461i |
| w53 | 0011010 | −0.2464 + 0.9270i |
| w54 | 0011011 | −0.3744 + 0.6744i |
| w55 | 0011011 | −0.1699 + 0.7537i |
| w56 | 0011100 | +0.5707 + 0.7662i |
| w57 | 0011100 | +0.1088 + 0.9530i |
| w58 | 0011101 | +0.4294 + 0.6363i |
| w59 | 0011101 | +0.1091 + 0.7656i |
| w60 | 0011110 | +0.4490 + 0.8461i |
| w61 | 0011110 | +0.2464 + 0.9270i |
| w62 | 0011111 | +0.3744 + 0.6744i |
| w63 | 0011111 | +0.1699 + 0.7537i |
| w64 | 01000000 | −1.0382 + 0.8623i |
| w65 | 01000001 | −1.3225 + 0.1320i |
| w66 | 01000010 | −0.3734 + 0.2560i |
| w67 | 01000011 | −0.4582 + 0.1123i |
| w68 | 01000100 | −1.1794 + 0.6376i |
| w69 | 01000101 | −1.2742 + 0.3922i |
| w70 | 01000110 | −0.3799 + 0.2517i |
| w71 | 01000111 | −0.4545 + 0.1251i |
| w72 | 01001000 | +1.0382 + 0.8623i |
| w73 | 01001001 | +1.3225 + 0.1320i |
| w74 | 01001010 | +0.3734 + 0.2560i |
| w75 | 01001011 | +0.4582 + 0.1123i |
| w76 | 01001100 | +1.1794 + 0.6376i |
| w77 | 01001101 | +1.2742 + 0.3922i |
| w78 | 01001110 | +0.3799 + 0.2517i |
| w79 | 01001111 | +0.4545 + 0.1251i |
| w80 | 01010000 | −0.8504 + 0.7217i |
| w81 | 01010001 | −1.0854 + 0.1139i |
| w82 | 01010010 | −0.4968 + 0.3947i |
| w83 | 01010011 | −0.6473 + 0.1138i |
| w84 | 01010100 | −0.9638 + 0.5407i |
| w85 | 01010101 | −1.0441 + 0.3296i |
| w86 | 01010110 | −0.5231 + 0.3644i |
| w87 | 01010111 | −0.6339 + 0.1702i |
| w88 | 01011000 | +0.8504 + 0.7217i |
| w89 | 01011001 | +1.0854 + 0.1139i |
| w90 | 01011010 | +0.4968 + 0.3947i |
| w91 | 01011011 | +0.6473 + 0.1138i |
| w92 | 01011100 | +0.9638 + 0.5407i |
| w93 | 01011101 | +1.0441 + 0.3296i |
| w94 | 01011110 | +0.5231 + 0.3644i |
| w95 | 01011111 | +0.6339 + 0.1702i |
| w96 | 01100000 | −0.8555 + 1.0542i |
| w97 | 01100001 | −0.1322 + 1.3631i |
| w98 | 01100010 | −0.1938 + 0.3621i |
| w99 | 01100011 | −0.0928 + 0.3970i |
| w100 | 01100100 | −0.6363 + 1.2064i |
| w101 | 01100101 | −0.3929 + 1.3102i |
| w102 | 01100110 | −0.1909 + 0.3627i |
| w103 | 01100111 | −0.0937 + 0.3973i |
| w104 | 01101000 | +0.8555 + 1.0542i |
| w105 | 01101001 | +0.1322 + 1.3631i |
| w106 | 01101010 | +0.1938 + 0.3621i |
| w107 | 01101011 | +0.0928 + 0.3970i |
| w108 | 01101100 | +0.6363 + 1.2064i |
| w109 | 01101101 | +0.3929 + 1.3102i |
| w110 | 01101110 | +0.1909 + 0.3627i |
| w111 | 01101111 | +0.0937 + 0.3973i |
| w112 | 01110000 | −0.6961 + 0.8850i |
| w113 | 01110001 | −0.1124 + 1.1327i |
| w114 | 01110010 | −0.3224 + 0.5236i |
| w115 | 01110011 | −0.1054 + 0.5979i |

-continued

| w index | bit label | Constellation point |
|---|---|---|
| w116 | 01110100 | −0.5229 + 1.0037i |
| w117 | 01110101 | −0.3160 + 1.0913i |
| w118 | 01110110 | −0.3016 + 0.5347i |
| w119 | 01110111 | −0.1230 + 0.5949i |
| w120 | 01111000 | +0.6961 + 0.8850i |
| w121 | 01111001 | +0.1124 + 1.1327i |
| w122 | 01111010 | +0.3224 + 0.5236i |
| w123 | 01111011 | +0.1054 + 0.5979i |
| w124 | 01111100 | +0.5229 + 1.0037i |
| w125 | 01111101 | +0.3160 + 1.0913i |
| w126 | 01111110 | +0.3016 + 0.5347i |
| w127 | 01111111 | +0.1230 + 0.5949i |
| w128 | 10000000 | −1.2901 − 1.0495i |
| w129 | 10000001 | −1.6350 − 0.1593i |
| w130 | 10000010 | −0.2844 − 0.1296i |
| w131 | 10000011 | −0.3237 − 0.0849i |
| w132 | 10000100 | −1.4625 − 0.7740i |
| w133 | 10000101 | −1.5776 − 0.4735i |
| w134 | 10000110 | −0.2853 − 0.1309i |
| w135 | 10000111 | −0.3228 − 0.0867i |
| w136 | 10001000 | +1.2901 − 1.0495i |
| w137 | 10001001 | +1.6350 − 0.1593i |
| w138 | 10001010 | +0.2844 − 0.1296i |
| w139 | 10001011 | +0.3237 − 0.0849i |
| w140 | 10001100 | +1.4625 − 0.7740i |
| w141 | 10001101 | +1.5776 − 0.4735i |
| w142 | 10001110 | +0.2853 − 0.1309i |
| w143 | 10001111 | +0.3228 − 0.0867i |
| w144 | 10010000 | −0.7273 − 0.6160i |
| w145 | 10010001 | −0.9430 − 0.1100i |
| w146 | 10010010 | −0.5902 − 0.4857i |
| w147 | 10010011 | −0.7502 − 0.1138i |
| w148 | 10010100 | −0.8177 − 0.4841i |
| w149 | 10010101 | −0.9069 − 0.2829i |
| w150 | 10010110 | −0.6355 − 0.4185i |
| w151 | 10010111 | −0.7325 − 0.2088i |
| w152 | 10011000 | +0.7273 − 0.6160i |
| w153 | 10011001 | +0.9430 − 0.1100i |
| w154 | 10011010 | +0.5902 − 0.4857i |
| w155 | 10011011 | +0.7502 − 0.1138i |
| w156 | 10011100 | +0.8177 − 0.4841i |
| w157 | 10011101 | +0.9069 − 0.2829i |
| w158 | 10011110 | +0.6355 − 0.4185i |
| w159 | 10011111 | +0.7325 − 0.2088i |
| w160 | 10100000 | −1.0646 − 1.2876i |
| w161 | 10100001 | −0.1658 − 1.6747i |
| w162 | 10100010 | −0.1053 − 0.1494i |
| w163 | 10100011 | −0.0872 − 0.1390i |
| w164 | 10100100 | −0.7949 − 1.4772i |
| w165 | 10100101 | −0.4907 − 1.6084i |
| w166 | 10100110 | −0.1052 − 0.1495i |
| w167 | 10100111 | −0.0871 − 0.1392i |
| w168 | 10101000 | +1.0646 − 1.2876i |
| w169 | 10101001 | +0.1658 − 1.6747i |
| w170 | 10101010 | +0.1053 − 0.1494i |
| w171 | 10101011 | +0.0872 − 0.1390i |
| w172 | 10101100 | +0.7949 − 1.4772i |
| w173 | 10101101 | +0.4907 − 1.6084i |
| w174 | 10101110 | +0.1052 − 0.1495i |
| w175 | 10101111 | +0.0871 − 0.1392i |
| w176 | 10110000 | −0.5707 − 0.7662i |
| w177 | 10110001 | −0.1088 − 0.9530i |
| w178 | 10110010 | −0.4294 − 0.6363i |
| w179 | 10110011 | −0.1091 − 0.7656i |
| w180 | 10110100 | −0.4490 − 0.8461i |
| w181 | 10110101 | −0.2464 − 0.9270i |
| w182 | 10110110 | −0.3744 − 0.6744i |
| w183 | 10110111 | −0.1699 − 0.7537i |
| w184 | 10111000 | +0.5707 − 0.7662i |
| w185 | 10111001 | +0.1088 − 0.9530i |
| w186 | 10111010 | +0.4294 − 0.6363i |
| w187 | 10111011 | +0.1091 − 0.7656i |
| w188 | 10111100 | +0.4490 − 0.8461i |
| w189 | 10111101 | +0.2464 − 0.9270i |
| w190 | 10111110 | +0.3744 − 0.6744i |
| w191 | 10111111 | +0.1699 − 0.7537i |
| w192 | 11000000 | −1.0382 − 0.8623i |

| w index | bit label | Constellation point |
|---|---|---|
| w193 | 11000001 | −1.3225 − 0.1320i |
| w194 | 11000010 | −0.3734 − 0.2560i |
| w195 | 11000011 | −0.4582 − 0.1123i |
| w196 | 11000100 | −1.1794 − 0.6376i |
| w197 | 11000101 | −1.2742 − 0.3922i |
| w198 | 11000110 | −0.3799 − 0.2517i |
| w199 | 11000111 | −0.4545 − 0.1251i |
| w200 | 11001000 | +1.0382 − 0.8623i |
| w201 | 11001001 | +1.3225 − 0.1320i |
| w202 | 11001010 | +0.3734 − 0.2560i |
| w203 | 11001011 | +0.4582 − 0.1123i |
| w204 | 11001100 | +1.1794 − 0.6376i |
| w205 | 11001101 | +1.2742 − 0.3922i |
| w206 | 11001110 | +0.3799 − 0.2517i |
| w207 | 11001111 | +0.4545 − 0.1251i |
| w208 | 11010000 | −0.8504 − 0.7217i |
| w209 | 11010001 | −1.0854 − 0.1139i |
| w210 | 11010010 | −0.4968 − 0.3947i |
| w211 | 11010011 | −0.6473 − 0.1138i |
| w212 | 11010100 | −0.9638 − 0.5407i |
| w213 | 11010101 | −1.0441 − 0.3296i |
| w214 | 11010110 | −0.5231 − 0.3644i |
| w215 | 11010111 | −0.6339 − 0.1702i |
| w216 | 11011000 | +0.8504 − 0.7217i |
| w217 | 11011001 | +1.0854 − 0.1139i |
| w218 | 11011010 | +0.4968 − 0.3947i |
| w219 | 11011011 | +0.6473 − 0.1138i |
| w220 | 11011100 | +0.9638 − 0.5407i |
| w221 | 11011101 | +1.0441 − 0.3296i |
| w222 | 11011110 | +0.5231 − 0.3644i |
| w223 | 11011111 | +0.6339 − 0.1702i |
| w224 | 11100000 | −0.8555 − 1.0542i |
| w225 | 11100001 | −0.1322 − 1.3631i |
| w226 | 11100010 | −0.1938 − 0.3621i |
| w227 | 11100011 | −0.0928 − 0.3970i |
| w228 | 11100100 | −0.6363 − 1.2064i |
| w229 | 11100101 | −0.3929 − 1.3102i |
| w230 | 11100110 | −0.1909 − 0.3627i |
| w231 | 11100111 | −0.0937 − 0.3973i |
| w232 | 11101000 | +0.8555 − 1.0542i |
| w233 | 11101001 | +0.1322 − 1.3631i |
| w234 | 11101010 | +0.1938 − 0.3621i |
| w235 | 11101011 | +0.0928 − 0.3970i |
| w236 | 11101100 | +0.6363 − 1.2064i |
| w237 | 11101101 | +0.3929 − 1.3102i |
| w238 | 11101110 | +0.1909 − 0.3627i |
| w239 | 11101111 | +0.0937 − 0.3973i |
| w240 | 11110000 | −0.6961 − 0.8850i |
| w241 | 11110001 | −0.1124 − 1.1327i |
| w242 | 11110010 | −0.3224 − 0.5236i |
| w243 | 11110011 | −0.1054 − 0.5979i |
| w244 | 11110100 | −0.5229 − 1.0037i |
| w245 | 11110101 | −0.3160 − 1.0913i |
| w246 | 11110110 | −0.3016 − 0.5347i |
| w247 | 11110111 | −0.1230 − 0.5949i |
| w248 | 11111000 | +0.6961 − 0.8850i |
| w249 | 11111001 | +0.1124 − 1.1327i |
| w250 | 11111010 | +0.3224 − 0.5236i |
| w251 | 11111011 | +0.1054 − 0.5979i |
| w252 | 11111100 | +0.5229 − 1.0037i |
| w253 | 11111101 | +0.3160 − 1.0913i |
| w254 | 11111110 | +0.3016 − 0.5347i |
| w255 | 11111111 | +0.1230 − 0.5949i | for R=5/8 (or R=1/2, 3/4 or 13/16):

| w index | bit label | Constellation point |
|---|---|---|
| w0 | 0000000 | −1.2639 + 1.0084i |
| w1 | 0000000 | −0.7380 + 0.6059i |
| w2 | 0000001 | −1.0466 + 1.2415i |
| w3 | 0000001 | −0.6190 + 0.7456i |
| w4 | 0000010 | −1.2639 − 1.0084i |
| w5 | 0000010 | −0.7380 − 0.6059i |
| w6 | 0000011 | −1.0466 − 1.2415i |
| w7 | 0000011 | −0.6190 − 0.7456i |
| w8 | 0000100 | −1.4263 + 0.7399i |
| w9 | 0000100 | −0.8292 + 0.4496i |
| w10 | 0000101 | −0.7829 + 1.4275i |
| w11 | 0000101 | −0.4707 + 0.8613i |
| w12 | 0000110 | −1.4263 − 0.7399i |
| w13 | 0000110 | −0.8292 − 0.4496i |
| w14 | 0000111 | −0.7829 − 1.4275i |
| w15 | 0000111 | −0.4707 − 0.8613i |
| w16 | 0001000 | −1.0529 + 0.8398i |
| w17 | 0001000 | −0.8839 + 0.7116i |
| w18 | 0001001 | −0.8751 + 1.0349i |
| w19 | 0001001 | −0.7380 + 0.8761i |
| w20 | 0001010 | −1.0529 − 0.8398i |
| w21 | 0001010 | −0.8839 − 0.7116i |
| w22 | 0001011 | −0.8751 − 1.0349i |
| w23 | 0001011 | −0.7380 − 0.8761i |
| w24 | 0001100 | −1.1857 + 0.6167i |
| w25 | 0001100 | −0.9935 + 0.5250i |
| w26 | 0001101 | −0.6570 + 1.1922i |
| w27 | 0001101 | −0.5568 + 1.0106i |
| w28 | 0001110 | −1.1857 − 0.6167i |
| w29 | 0001110 | −0.9935 − 0.5250i |
| w30 | 0001111 | −0.6570 − 1.1922i |
| w31 | 0001111 | −0.5568 − 1.0106i |
| w32 | 0010000 | +1.2639 + 1.0084i |
| w33 | 0010000 | +0.7380 + 0.6059i |
| w34 | 0010001 | +1.0466 + 1.2415i |
| w35 | 0010001 | +0.6190 + 0.7456i |
| w36 | 0010010 | +1.2639 − 1.0084i |
| w37 | 0010010 | +0.7380 − 0.6059i |
| w38 | 0010011 | +1.0466 − 1.2435i |
| w39 | 0010011 | +0.6190 − 0.7456i |
| w40 | 0010100 | +1.4263 + 0.7399i |
| w41 | 0010100 | +0.8292 + 0.4496i |
| w42 | 0010101 | +0.7829 + 1.4275i |
| w43 | 0010101 | +0.4707 + 0.8613i |
| w44 | 0010110 | +1.4263 − 0.7399i |
| w45 | 0010110 | +0.8292 − 0.4496i |
| w46 | 0010111 | +0.7829 − 1.4275i |
| w47 | 0010111 | +0.4707 − 0.8613i |
| w48 | 0011000 | +1.0529 + 0.8398i |
| w49 | 0011000 | +0.8839 + 0.7116i |
| w50 | 0011001 | +0.8751 + 1.0349i |
| w51 | 0011001 | +0.7380 + 0.8761i |
| w52 | 0011010 | +1.0529 − 0.8398i |
| w53 | 0011010 | +0.8839 − 0.7116i |
| w54 | 0011011 | +0.8751 − 1.0349i |
| w55 | 0011011 | +0.7380 − 0.8761i |
| w56 | 0011100 | +1.1857 + 0.6167i |
| w57 | 0011100 | +0.9935 + 0.5250i |
| w58 | 0011101 | +0.6570 + 1.1922i |
| w59 | 0011101 | +0.5568 + 1.0106i |
| w60 | 0011110 | +1.1857 − 0.6167i |
| w61 | 0011110 | +0.9935 − 0.5250i |
| w62 | 0011111 | +0.6570 − 1.1922i |
| w63 | 0011111 | +0.5568 − 1.0106i |
| w64 | 01000000 | −0.2459 + 0.2059i |
| w65 | 01000001 | −0.6025 + 0.5077i |
| w66 | 01000010 | −0.0949 + 0.2552i |
| w67 | 01000011 | −0.5005 + 0.6310i |
| w68 | 01000100 | −0.2459 − 0.2059i |
| w69 | 01000101 | −0.6025 − 0.5077i |
| w70 | 01000110 | −0.0949 − 0.2552i |
| w71 | 01000111 | −0.5005 − 0.6310i |
| w72 | 01001000 | −0.2508 + 0.2016i |
| w73 | 01001001 | −0.6756 + 0.3836i |
| w74 | 01001010 | −0.0912 + 0.2556i |
| w75 | 01001011 | −0.3899 + 0.7222i |
| w76 | 01001100 | −0.2508 − 0.2016i |
| w77 | 01001101 | −0.6756 − 0.3836i |
| w78 | 01001110 | −0.0912 − 0.2556i |
| w79 | 01001111 | −0.3899 − 0.7222i |
| w80 | 01010000 | −0.3507 + 0.3002i |
| w81 | 01010001 | −0.4734 + 0.4072i |
| w82 | 01010010 | −0.2035 + 0.4116i |
| w83 | 01010011 | −0.3688 + 0.5265i |

-continued

| w index | bit label | Constellation point |
|---|---|---|
| w84 | 01010100 | −0.3507 − 0.3002i |
| w85 | 01010101 | −0.4734 − 0.4072i |
| w86 | 01010110 | −0.2035 − 0.4116i |
| w87 | 01010111 | −0.3688 − 0.5265i |
| w88 | 01011000 | −0.3739 + 0.2698i |
| w89 | 01011001 | −0.5263 + 0.3281i |
| w90 | 01011010 | −0.1890 + 0.4220i |
| w91 | 01011011 | −0.3094 + 0.5791i |
| w92 | 01011100 | −0.3739 − 0.2698i |
| w93 | 01011101 | −0.5263 − 0.3281i |
| w94 | 01011110 | −0.1890 − 0.4220i |
| w95 | 01011111 | −0.3094 − 0.5791i |
| w96 | 01100000 | +0.2459 + 0.2059i |
| w97 | 01100001 | +0.6025 + 0.5077i |
| w98 | 01100010 | +0.0949 + 0.2552i |
| w99 | 01100011 | +0.5005 + 0.6310i |
| w100 | 01100100 | +0.2459 − 0.2059i |
| w101 | 01100101 | +0.6025 − 0.5077i |
| w102 | 01100110 | +0.0949 − 0.2552i |
| w103 | 01100111 | +0.5005 − 0.6310i |
| w104 | 01101000 | +0.2508 + 0.2016i |
| w105 | 01101001 | +0.6756 + 0.3836i |
| w106 | 01101010 | +0.0912 + 0.2556i |
| w107 | 01101011 | +0.3899 + 0.7222i |
| w108 | 01101100 | +0.2508 − 0.2016i |
| w109 | 01101101 | +0.6756 − 0.3836i |
| w110 | 01101110 | +0.0912 − 0.2556i |
| w111 | 01101111 | +0.3899 − 0.7222i |
| w112 | 01110000 | +0.3507 + 0.3002i |
| w113 | 01110001 | +0.4734 + 0.4072i |
| w114 | 01110010 | +0.2035 + 0.4116i |
| w115 | 01110011 | +0.3688 + 0.5265i |
| w116 | 01110100 | +0.3507 − 0.3002i |
| w117 | 01110101 | +0.4734 − 0.4072i |
| w118 | 01110110 | +0.2035 − 0.4116i |
| w119 | 01110111 | +0.3688 − 0.5265i |
| w120 | 01111000 | +0.3739 + 0.2698i |
| w121 | 01111001 | +0.5263 + 0.3281i |
| w122 | 01111010 | +0.1890 + 0.4220i |
| w123 | 01111011 | +0.3094 + 0.5791i |
| w124 | 01111100 | +0.3739 − 0.2698i |
| w125 | 01111101 | +0.5263 − 0.3281i |
| w126 | 01111110 | +0.1890 − 0.4220i |
| w127 | 01111111 | +0.3094 − 0.5791i |
| w128 | 10000000 | −1.5843 + 0.1512i |
| w129 | 10000001 | −0.9275 + 0.0940i |
| w130 | 10000010 | −0.1639 + 1.6237i |
| w131 | 10000011 | −0.1000 + 0.9905i |
| w132 | 10000100 | −1.5843 − 0.1512i |
| w133 | 10000101 | −0.9275 − 0.0940i |
| w134 | 10000110 | −0.1639 − 1.6237i |
| w135 | 10000111 | −0.1000 − 0.9905i |
| w136 | 10001000 | −1.5329 + 0.4508i |
| w137 | 10001001 | −0.8933 + 0.2781i |
| w138 | 10001010 | −0.4843 + 1.5571i |
| w139 | 10001011 | −0.2959 + 0.9454i |
| w140 | 10001100 | −1.5329 − 0.4508i |
| w141 | 10001101 | −0.8933 − 0.2781i |
| w142 | 10001110 | −0.4843 − 1.5571i |
| w143 | 10001111 | −0.2959 − 0.9454i |
| w144 | 10010000 | −1.3147 + 0.1263i |
| w145 | 10010001 | −1.1029 + 0.1084i |
| w146 | 10010010 | −0.1381 + 1.3595i |
| w147 | 10010011 | −0.1179 + 1.1562i |
| w148 | 10010100 | −1.3147 − 0.1263i |
| w149 | 10010101 | −1.1029 − 0.1084i |
| w150 | 10010110 | −0.1381 − 1.3595i |
| w151 | 10010111 | −0.1179 − 1.1562i |
| w152 | 10011000 | −1.2724 + 0.3763i |
| w153 | 10011001 | −1.0662 + 0.3220i |
| w154 | 10011010 | −0.4077 + 1.3024i |
| w155 | 10011011 | −0.3470 + 1.1060i |
| w156 | 10011100 | −1.2724 − 0.3763i |
| w157 | 10011101 | −1.0662 − 0.3220i |
| w158 | 10011110 | −0.4077 − 1.3024i |
| w159 | 10011111 | −0.3470 − 1.1060i |
| w160 | 10100000 | +1.5843 + 0.1512i |
| w161 | 10100001 | +0.9275 + 0.0940i |
| w162 | 10100010 | +0.1639 + 1.6237i |
| w163 | 10100011 | +0.1000 + 0.9905i |
| w164 | 10100100 | +1.5843 − 0.1512i |
| w165 | 10100101 | +0.9275 − 0.0940i |
| w166 | 10100110 | +0.1639 − 1.6237i |
| w167 | 10100111 | +0.1000 − 0.9905i |
| w168 | 10101000 | +1.5329 + 0.4508i |
| w169 | 10101001 | +0.8933 + 0.2781i |
| w170 | 10101010 | +0.4843 + 1.5571i |
| w171 | 10101011 | +0.2959 + 0.9454i |
| w172 | 10101100 | +1.5329 − 0.4508i |
| w173 | 10101101 | +0.8933 − 0.2781i |
| w174 | 10101110 | +0.4843 − 1.5571i |
| w175 | 10101111 | +0.2959 − 0.9454i |
| w176 | 10110000 | +1.3147 + 0.1263i |
| w177 | 10110001 | +1.1029 + 0.1084i |
| w178 | 10110010 | +0.1381 + 1.3595i |
| w179 | 10110011 | +0.1179 + 1.1562i |
| w180 | 10110100 | +1.3147 − 0.1263i |
| w181 | 10110101 | +1.1029 − 0.1084i |
| w182 | 10110110 | +0.1381 − 1.3595i |
| w183 | 10110111 | +0.1179 − 1.1562i |
| w184 | 10111000 | +1.2724 + 0.3763i |
| w185 | 10111001 | +1.0662 + 0.3220i |
| w186 | 10111010 | +0.4077 + 1.3024i |
| w187 | 10111011 | +0.3470 + 1.1060i |
| w188 | 10111100 | +1.2724 − 0.3763i |
| w189 | 10111101 | +1.0662 − 0.3220i |
| w190 | 10111110 | +0.4077 − 1.3024i |
| w191 | 10111111 | +0.3470 − 1.1060i |
| w192 | 11000000 | −0.2552 + 0.0725i |
| w193 | 11000001 | −0.7681 + 0.0832i |
| w194 | 11000010 | −0.0726 + 0.0865i |
| w195 | 11000011 | −0.0867 + 0.8378i |
| w196 | 11000100 | −0.2552 − 0.0725i |
| w197 | 11000101 | −0.7681 − 0.0832i |
| w198 | 11000110 | −0.0726 − 0.0865i |
| w199 | 11000111 | −0.0867 − 0.8378i |
| w200 | 11001000 | −0.2567 + 0.0753i |
| w201 | 11001001 | −0.7371 + 0.2323i |
| w202 | 11001010 | −0.0722 + 0.0866i |
| w203 | 11001011 | −0.2417 + 0.8000i |
| w204 | 11001100 | −0.2567 − 0.0753i |
| w205 | 11001101 | −0.7371 − 0.2323i |
| w206 | 11001110 | −0.0722 − 0.0866i |
| w207 | 11001111 | −0.2417 − 0.8000i |
| w208 | 11010000 | −0.4495 + 0.0766i |
| w209 | 11010001 | −0.6140 + 0.0811i |
| w210 | 11010010 | −0.0717 + 0.5169i |
| w211 | 11010011 | −0.0837 + 0.6868i |
| w212 | 11010100 | −0.4495 − 0.0766i |
| w213 | 11010101 | −0.6140 − 0.0811i |
| w214 | 11010110 | −0.0717 − 0.5169i |
| w215 | 11010111 | −0.0837 − 0.6868i |
| w216 | 11011000 | −0.4423 + 0.1097i |
| w217 | 11011001 | −0.5925 + 0.1765i |
| w218 | 11011010 | −0.0883 + 0.5092i |
| w219 | 11011011 | −0.1746 + 0.6612i |
| w220 | 11011100 | −0.4423 − 0.1097i |
| w221 | 11011101 | −0.5925 − 0.1765i |
| w222 | 11011110 | −0.0883 − 0.5092i |
| w223 | 11011111 | −0.1746 − 0.6612i |
| w224 | 11100000 | +0.2552 + 0.0725i |
| w225 | 11100001 | +0.7681 + 0.0832i |
| w226 | 11100010 | +0.0726 + 0.0865i |
| w227 | 11100011 | +0.0867 + 0.8378i |
| w228 | 11100100 | +0.2552 − 0.0725i |
| w229 | 11100101 | +0.7681 − 0.0832i |
| w230 | 11100110 | +0.0726 − 0.0865i |
| w231 | 11100111 | +0.0867 − 0.8378i |
| w232 | 11101000 | +0.2567 + 0.0753i |
| w233 | 11101001 | +0.7371 + 0.2323i |
| w234 | 11101010 | +0.0722 + 0.0866i |
| w235 | 11101011 | +0.2417 + 0.8000i |
| w236 | 11101100 | +0.2567 − 0.0753i |
| w237 | 11101101 | +0.7371 − 0.2323i |

-continued

| w index | bit label | Constellation point |
|---|---|---|
| w238 | 11101110 | +0.0722 − 0.0866i |
| w239 | 11101111 | +0.2417 − 0.8000i |
| w240 | 11110000 | +0.4495 + 0.0766i |
| w241 | 11110001 | +0.6140 + 0.0811i |
| w242 | 11110010 | +0.0717 + 0.5169i |
| w243 | 11110011 | +0.0837 + 0.6868i |
| w244 | 11110100 | +0.4495 − 0.0766i |
| w245 | 11110101 | +0.6140 − 0.0811i |
| w246 | 11110110 | +0.0717 − 0.5169i |
| w247 | 11110111 | +0.0837 − 0.6868i |
| w248 | 11111000 | +0.4423 − 0.1097i |
| w249 | 11111001 | +0.5925 + 0.1765i |
| w250 | 11111010 | +0.0883 + 0.5092i |
| w251 | 11111011 | +0.1746 + 0.6612i |
| w252 | 11111100 | +0.4423 − 0.1097i |
| w253 | 11111101 | +0.5925 − 0.1765i |
| w254 | 11111110 | +0.0883 − 0.5092i |
| w255 | 11111111 | +0.1746 − 0.6612i | for R=3/4 (or R=1/2, 5/8 or 13/16):

| w index | bit label | Constellation point |
|---|---|---|
| w0 | 0000000 | −0.5207 + 1.2132i |
| w1 | 0000000 | −0.3103 + 1.2359i |
| w2 | 0000001 | −1.1610 + 1.1297i |
| w3 | 0000001 | −0.1051 + 1.2649i |
| w4 | 0000010 | −0.6193 + 0.6523i |
| w5 | 0000010 | −0.4533 + 0.6225i |
| w6 | 0000011 | −1.2194 + 0.5861i |
| w7 | 0000011 | −0.0684 + 0.5460i |
| w8 | 0000100 | +0.5207 + 1.2132i |
| w9 | 0000100 | +0.3103 + 1.2359i |
| w10 | 0000101 | +1.1610 + 1.1297i |
| w11 | 0000101 | +0.1051 + 1.2649i |
| w12 | 0000110 | +0.6193 + 0.6523i |
| w13 | 0000110 | +0.4633 + 0.6225i |
| w14 | 0000111 | +1.2194 + 0.5861i |
| w15 | 0000111 | +0.0684 + 0.5460i |
| w16 | 0001000 | −0.6089 + 1.4273i |
| w17 | 0001000 | −0.3588 + 1.4645i |
| w18 | 0001001 | −0.8292 + 1.2973i |
| w19 | 0001001 | −0.1197 + 1.4960i |
| w20 | 0001010 | −0.7956 + 0.6768i |
| w21 | 0001010 | −0.3209 + 0.5978i |
| w22 | 0001011 | −1.0079 + 0.6851i |
| w23 | 0001011 | −0.1960 + 0.5676i |
| w24 | 0001100 | +0.6089 + 1.4273i |
| w25 | 0001100 | +0.3588 + 1.4645i |
| w26 | 0001101 | +0.8292 + 1.2973i |
| w27 | 0001101 | +0.1197 + 1.4960i |
| w28 | 0001110 | +0.7956 + 0.6768i |
| w29 | 0001110 | +0.3209 + 0.5978i |
| w30 | 0001111 | +1.0079 + 0.6851i |
| w31 | 0001111 | +0.1960 + 0.5676i |
| w32 | 0010000 | −0.5207 − 1.2132i |
| w33 | 0010000 | −0.3103 − 1.2359i |
| w34 | 0010001 | −1.1610 − 1.1297i |
| w35 | 0010001 | −0.1051 − 1.2649i |
| w36 | 0010010 | −0.6193 − 0.6523i |
| w37 | 0010010 | −0.4533 − 0.6225i |
| w38 | 0010011 | −1.2194 − 0.5861i |
| w39 | 0010011 | −0.0684 − 0.5460i |
| w40 | 0010100 | +0.5207 − 1.2132i |
| w41 | 0010100 | +0.3103 − 1.2359i |
| w42 | 0010101 | +1.1610 − 1.1297i |
| w43 | 0010101 | +0.1051 − 1.2649i |
| w44 | 0010110 | +0.6193 − 0.6523i |
| w45 | 0010110 | +0.4633 − 0.6225i |
| w46 | 0010111 | +1.2194 − 0.5861i |
| w47 | 0010111 | +0.0684 − 0.5460i |
| w48 | 0011000 | −0.6089 − 1.4273i |
| w49 | 0011000 | −0.3588 − 1.4545i |
| w50 | 0011001 | −0.8292 − 1.2973i |
| w51 | 0011001 | −0.1197 − 1.4960i |
| w52 | 0011010 | −0.7956 − 0.6768i |
| w53 | 0011010 | −0.3209 − 0.5978i |
| w54 | 0011011 | −1.0079 − 0.6851i |
| w55 | 0011011 | −0.1960 − 0.5676i |
| w56 | 0011100 | +0.6089 − 1.4273i |
| w57 | 0011100 | +0.3588 − 1.4645i |
| w58 | 0011101 | +0.8292 − 1.2973i |
| w59 | 0011101 | +0.1197 − 1.4960i |
| w60 | 0011110 | +0.7956 − 0.6768i |
| w61 | 0011110 | +0.3209 − 0.5978i |
| w62 | 0011111 | +1.0079 − 0.6851i |
| w63 | 0011111 | +0.1960 − 0.5676i |
| w64 | 01000000 | −0.4992 + 1.0060i |
| w65 | 01000001 | −0.3097 + 1.0437i |
| w66 | 01000010 | −1.2435 + 0.8749i |
| w67 | 01000011 | −0.0961 + 1.0730i |
| w68 | 01000100 | −0.5761 + 0.8259i |
| w69 | 01000101 | −0.4319 + 0.7814i |
| w70 | 01000110 | −1.4344 + 0.6815i |
| w71 | 01000111 | −0.0548 + 0.6842i |
| w72 | 01001000 | +0.4992 + 1.0060i |
| w73 | 01001001 | +0.3097 + 1.0437i |
| w74 | 01001010 | +1.2435 + 0.8749i |
| w75 | 01001011 | +0.0961 + 1.0730i |
| w76 | 01001100 | +0.5761 + 0.8259i |
| w77 | 01001101 | +0.4319 + 0.7814i |
| w78 | 01001110 | +1.4344 + 0.6815i |
| w79 | 01001111 | +0.0548 + 0.6842i |
| w80 | 01010000 | −0.6956 + 1.0381i |
| w81 | 01010001 | −0.2552 + 0.9082i |
| w82 | 01010010 | −0.8938 + 1.0757i |
| w83 | 01010011 | −0.0867 + 0.8997i |
| w84 | 01010100 | −0.7562 + 0.8504i |
| w85 | 01010101 | −0.2903 + 0.7608i |
| w86 | 01010110 | −0.9633 + 0.8762i |
| w87 | 01010111 | −0.1482 + 0.7338i |
| w88 | 01011000 | +0.6956 + 1.0381i |
| w89 | 01011001 | +0.2552 + 0.9082i |
| w90 | 01011010 | +0.8938 + 1.0757i |
| w91 | 01011011 | +0.0867 + 0.8997i |
| w92 | 01011100 | +0.7562 + 0.8504i |
| w93 | 01011101 | +0.2903 + 0.7608i |
| w94 | 01011110 | +0.9633 + 0.8762i |
| w95 | 01011111 | +0.1482 + 0.7338i |
| w96 | 01100000 | −0.4992 − 1.0060i |
| w97 | 01100001 | −0.3097 − 1.0437i |
| w98 | 01100010 | −1.2435 − 0.8749i |
| w99 | 01100011 | −0.0961 − 1.0730i |
| w100 | 01100100 | −0.5761 − 0.8259i |
| w101 | 01100101 | −0.4319 − 0.7814i |
| w102 | 01100110 | −1.4344 − 0.6815i |
| w103 | 01100111 | −0.0548 − 0.6842i |
| w104 | 01101000 | +0.4992 − 1.0060i |
| w105 | 01101001 | +0.3097 − 1.0437i |
| w106 | 01101010 | +1.2435 − 0.8749i |
| w107 | 01101011 | +0.0961 − 1.0730i |
| w108 | 01101100 | +0.5761 − 0.8259i |
| w109 | 01101101 | +0.4319 − 0.7814i |
| w110 | 01101110 | +1.4344 − 0.6815i |
| w111 | 01101111 | +0.0548 − 0.6842i |
| w112 | 01110000 | −0.6956 − 1.0381i |
| w113 | 01110001 | −0.2552 − 0.9082i |
| w114 | 01110010 | −0.8938 − 1.0757i |
| w115 | 01110011 | −0.0857 − 0.8997i |
| w116 | 01110100 | −0.7562 − 0.8504i |
| w117 | 01110101 | −0.2903 − 0.7608i |
| w118 | 01110110 | −0.9633 − 0.8762i |
| w119 | 01110111 | −0.1482 − 0.7338i |
| w120 | 01111000 | +0.6956 − 1.0381i |
| w121 | 01111001 | +0.2552 − 0.9082i |
| w122 | 01111010 | +0.8938 − 1.0757i |
| w123 | 01111011 | +0.0867 − 0.8997i |
| w124 | 01111100 | +0.7562 − 0.8504i |
| w125 | 01111101 | +0.2903 − 0.7608i |
| w126 | 01111110 | +0.9633 − 0.8762i |
| w127 | 01111111 | +0.1482 − 0.7338i |
| w128 | 10000000 | −0.6538 + 0.0691i |

-continued

| w index | bit label | Constellation point |
| --- | --- | --- |
| w129 | 10000001 | −0.5051 + 0.0654i |
| w130 | 10000010 | −1.4515 + 0.1246i |
| w131 | 10000011 | −0.0720 + 0.0589i |
| w132 | 10000100 | −0.6396 + 0.4933i |
| w133 | 10000101 | −0.4850 + 0.4726i |
| w134 | 10000110 | −1.4339 + 0.3828i |
| w135 | 10000111 | −0.0708 + 0.4166i |
| w136 | 10001000 | +0.6538 + 0.0691i |
| w137 | 10001001 | +0.5051 + 0.0654i |
| w138 | 10001010 | +1.4515 + 0.1246i |
| w139 | 10001011 | +0.0720 + 0.0589i |
| w140 | 10001100 | +0.6396 + 0.4933i |
| w141 | 10001101 | +0.4850 + 0.4726i |
| w142 | 10001110 | +1.4339 + 0.3828i |
| w143 | 10001111 | +0.0708 + 0.4166i |
| w144 | 10010000 | −0.8080 + 0.0721i |
| w145 | 10010001 | −0.3603 + 0.0619i |
| w146 | 10010010 | −0.9770 + 0.0640i |
| w147 | 10010011 | −0.2162 + 0.0599i |
| w148 | 10010100 | −0.8066 + 0.5082i |
| w149 | 10010101 | −0.3436 + 0.4483i |
| w150 | 10010110 | −0.9839 + 0.5111i |
| w151 | 10010111 | −0.2091 + 0.4280i |
| w152 | 10011000 | +0.8080 + 0.0721i |
| w153 | 10011001 | +0.3603 + 0.0619i |
| w154 | 10011010 | +0.9770 + 0.0640i |
| w155 | 10011011 | +0.2162 + 0.0599i |
| w156 | 10011100 | +0.8066 + 0.5082i |
| w157 | 10011101 | +0.3436 + 0.4483i |
| w158 | 10011110 | +0.9839 + 0.5111i |
| w159 | 10011111 | +0.2091 + 0.4280i |
| w160 | 10100000 | −0.6538 − 0.0691i |
| w161 | 10100001 | −0.5051 − 0.0654i |
| w162 | 10100010 | −1.4515 − 0.1246i |
| w163 | 10100011 | −0.0720 − 0.0589i |
| w164 | 10100100 | −0.6396 − 0.4933i |
| w165 | 10100101 | −0.4850 − 0.4726i |
| w166 | 10100110 | −1.4339 − 0.3828i |
| w167 | 10100111 | −0.0708 − 0.4166i |
| w168 | 10101000 | +0.6538 − 0.0691i |
| w169 | 10101001 | +0.5051 − 0.0654i |
| w170 | 10101010 | +1.4515 − 0.1246i |
| w171 | 10101011 | +0.0720 − 0.0589i |
| w172 | 10101100 | +0.6396 − 0.4933i |
| w173 | 10101101 | +0.4850 − 0.4726i |
| w174 | 10101110 | +1.4339 − 0.3828i |
| w175 | 10101111 | +0.0708 − 0.4166i |
| w176 | 10110000 | −0.8080 − 0.0721i |
| w177 | 10110001 | −0.3603 − 0.0619i |
| w178 | 10110010 | −0.9770 − 0.0640i |
| w179 | 10110011 | −0.2162 − 0.0599i |
| w180 | 10110100 | −0.8066 − 0.5082i |
| w181 | 10110101 | −0.3436 − 0.4483i |
| w182 | 10110110 | −0.9839 − 0.5111i |
| w183 | 10110111 | −0.2091 − 0.4280i |
| w184 | 10111000 | +0.8080 − 0.0721i |
| w185 | 10111001 | +0.3603 − 0.0619i |
| w186 | 10111010 | +0.9770 − 0.0640i |
| w187 | 10111011 | +0.2162 − 0.0599i |
| w188 | 10111100 | +0.8066 − 0.5082i |
| w189 | 10111101 | +0.3436 − 0.4483i |
| w190 | 10111110 | +0.9839 − 0.5111i |
| w191 | 10111111 | +0.2091 − 0.4280i |
| w192 | 11000000 | −0.6518 + 0.2064i |
| w193 | 11000001 | −0.5023 + 0.1959i |
| w194 | 11000010 | −1.2169 + 0.1086i |
| w195 | 11000011 | −0.0716 + 0.1743i |
| w196 | 11000100 | −0.6490 + 0.3456i |
| w197 | 11000101 | −0.4967 + 0.3308i |
| w198 | 11000110 | −1.2175 + 0.3244i |
| w199 | 11000111 | −0.0713 + 0.2951i |
| w200 | 11001000 | +0.6518 + 0.2064i |
| w201 | 11001001 | +0.5023 + 0.1959i |
| w202 | 11001010 | +1.2169 + 0.1086i |
| w203 | 11001011 | +0.0716 + 0.1743i |
| w204 | 11001100 | +0.6490 + 0.3456i |
| w205 | 11001101 | +0.4967 + 0.3308i |
| w206 | 11001110 | +1.2175 + 0.3244i |
| w207 | 11001111 | +0.0713 + 0.2951i |
| w208 | 11010000 | −0.8177 + 0.2121i |
| w209 | 11010001 | −0.3587 + 0.1857i |
| w210 | 11010010 | −1.0126 + 0.1946i |
| w211 | 11010011 | −0.2150 + 0.1782i |
| w212 | 11010100 | −0.8186 + 0.3517i |
| w213 | 11010101 | −0.3540 + 0.3139i |
| w214 | 11010110 | −1.0159 + 0.3531i |
| w215 | 11010111 | −0.2130 + 0.3012i |
| w216 | 11011000 | +0.8177 + 0.2121i |
| w217 | 11011001 | +0.3587 + 0.1857i |
| w218 | 11011010 | +1.0126 + 0.1946i |
| w219 | 11011011 | +0.2150 + 0.1782i |
| w220 | 11011100 | +0.8186 + 0.3517i |
| w221 | 11011101 | +0.3540 + 0.3139i |
| w222 | 11011110 | +1.0159 + 0.3531i |
| w223 | 11011111 | +0.2130 + 0.3012i |
| w224 | 11100000 | −0.6518 − 0.2064i |
| w225 | 11100001 | −0.5023 − 0.1959i |
| w226 | 11100010 | −1.2169 − 0.1086i |
| w227 | 11100011 | −0.0716 − 0.1743i |
| w228 | 11100100 | −0.6490 − 0.3456i |
| w229 | 11100101 | −0.4967 − 0.3308i |
| w230 | 11100110 | −1.2175 − 0.3244i |
| w231 | 11100111 | −0.0713 − 0.2951i |
| w232 | 11101000 | +0.6518 − 0.2064i |
| w233 | 11101001 | +0.5023 − 0.1959i |
| w234 | 11101010 | +1.2169 − 0.1086i |
| w235 | 11101011 | +0.0716 − 0.1743i |
| w236 | 11101100 | +0.6490 − 0.3456i |
| w237 | 11101101 | +0.4967 − 0.3308i |
| w238 | 11101110 | +1.2175 − 0.3244i |
| w239 | 11101111 | +0.0713 − 0.2951i |
| w240 | 11110000 | −0.8177 − 0.2121i |
| w241 | 11110001 | −0.3587 − 0.1857i |
| w242 | 11110010 | −1.0126 − 0.1946i |
| w243 | 11110011 | −0.2150 − 0.1782i |
| w244 | 11110100 | −0.8186 − 0.3517i |
| w245 | 11110101 | −0.3540 − 0.3139i |
| w246 | 11110110 | −1.0159 − 0.3531i |
| w247 | 11110111 | −0.2130 − 0.3012i |
| w248 | 11111000 | +0.8177 − 0.2121i |
| w249 | 11111001 | +0.3587 − 0.1857i |
| w250 | 11111010 | +1.0126 − 0.1946i |
| w251 | 11111011 | +0.2150 − 0.1782i |
| w252 | 11111100 | +0.8186 − 0.3517i |
| w253 | 11111101 | +0.3540 − 0.3139i |
| w254 | 11111110 | +1.0159 − 0.3531i |
| w255 | 11111111 | +0.2130 − 0.3012i | for R=13/16 (or R=1/2, 5/8 or 3/4):

| w index | bit label | Constellation point |
| --- | --- | --- |
| w0 | 0000000 | −0.4976 + 1.2018i |
| w1 | 0000000 | +0.4976 + 1.2018i |
| w2 | 0000001 | −0.4976 − 1.2018i |
| w3 | 0000001 | +0.4976 − 1.2018i |
| w4 | 0000010 | −0.4821 + 1.0103i |
| w5 | 0000010 | +0.4821 + 1.0103i |
| w6 | 0000011 | −0.4821 − 1.0103i |
| w7 | 0000011 | +0.4821 − 1.0103i |
| w8 | 0000100 | −1.1616 + 1.0595i |
| w9 | 0000100 | +1.1616 + 1.0595i |
| w10 | 0000101 | −1.1616 − 1.0595i |
| w11 | 0000101 | +1.1616 − 1.0595i |
| w12 | 0000110 | −1.2384 + 0.8218i |
| w13 | 0000110 | +1.2384 + 0.8218i |
| w14 | 0000111 | −1.2384 − 0.8218i |
| w15 | 0000111 | +1.2384 − 0.8218i |
| w16 | 0001000 | −0.6618 + 0.0721i |
| w17 | 0001000 | +0.6618 + 0.0721i |
| w18 | 0001001 | −0.6618 − 0.0721i |
| w19 | 0001001 | +0.6618 − 0.0721i |

| w index | bit label | Constellation point |
|---|---|---|
| w20 | 0001010 | −0.6653 + 0.2161i |
| w21 | 0001010 | +0.6653 + 0.2161i |
| w22 | 0001011 | −0.6653 − 0.2161i |
| w23 | 0001011 | +0.6653 − 0.2161i |
| w24 | 0001100 | −1.4070 + 0.1153i |
| w25 | 0001100 | +1.4070 + 0.1153i |
| w26 | 0001101 | −1.4070 − 0.1153i |
| w27 | 0001101 | +1.4070 − 0.1153i |
| w28 | 0001110 | −1.1945 + 0.1045i |
| w29 | 0001110 | +1.1945 + 0.1045i |
| w30 | 0001111 | −1.1945 − 0.1045i |
| w31 | 0001111 | +1.1945 − 0.1045i |
| w32 | 0010000 | −0.2993 + 1.2594i |
| w33 | 0010000 | +0.2993 + 1.2594i |
| w34 | 0010001 | −0.2993 − 1.2594i |
| w35 | 0010001 | +0.2993 − 1.2594i |
| w36 | 0010010 | −0.2906 + 1.0772i |
| w37 | 0010010 | +0.2906 + 1.0772i |
| w38 | 0010011 | −0.2906 − 1.0772i |
| w39 | 0010011 | +0.2906 − 1.0772i |
| w40 | 0010100 | −0.0985 + 1.2520i |
| w41 | 0010100 | +0.0985 + 1.2520i |
| w42 | 0010101 | −0.0985 − 1.2520i |
| w43 | 0010101 | +0.0985 − 1.2520i |
| w44 | 0010110 | −0.0938 + 1.0710i |
| w45 | 0010110 | +0.0938 + 1.0710i |
| w46 | 0010111 | −0.0938 − 1.0710i |
| w47 | 0010111 | +0.0938 − 1.0710i |
| w48 | 0011000 | −0.5134 + 0.0686i |
| w49 | 0011000 | +0.5134 + 0.0686i |
| w50 | 0011001 | −0.5134 − 0.0686i |
| w51 | 0011001 | +0.5134 − 0.0686i |
| w52 | 0011010 | −0.5133 + 0.2063i |
| w53 | 0011010 | +0.5133 + 0.2063i |
| w54 | 0011011 | −0.5133 − 0.2063i |
| w55 | 0011011 | +0.5133 − 0.2063i |
| w56 | 0011100 | −0.0735 + 0.0614i |
| w57 | 0011100 | +0.0735 + 0.0614i |
| w58 | 0011101 | −0.0735 − 0.0614i |
| w59 | 0011101 | +0.0735 − 0.0614i |
| w60 | 0011110 | −0.0734 + 0.1846i |
| w61 | 0011110 | +0.0734 + 0.1846i |
| w62 | 0011111 | −0.0734 − 0.1846i |
| w63 | 0011111 | +0.0734 − 0.1846i |
| w64 | 01000000 | −0.5648 + 1.4016i |
| w65 | 01000001 | +0.5648 + 1.4016i |
| w66 | 01000010 | −0.5648 − 1.4016i |
| w67 | 01000011 | +0.5648 − 1.4016i |
| w68 | 01000100 | −0.6826 + 1.0558i |
| w69 | 01000101 | +0.6826 + 1.0558i |
| w70 | 01000110 | −0.6826 − 1.0558i |
| w71 | 01000111 | +0.6826 − 1.0558i |
| w72 | 01001000 | −0.7696 + 1.2863i |
| w73 | 01001001 | +0.7696 + 1.2863i |
| w74 | 01001010 | −0.7696 − 1.2863i |
| w75 | 01001011 | +0.7696 − 1.2863i |
| w76 | 01001100 | −0.8965 + 1.0947i |
| w77 | 01001101 | +0.8965 + 1.0947i |
| w78 | 01001110 | −0.8965 − 1.0947i |
| w79 | 01001111 | +0.8965 − 1.0947i |
| w80 | 01010000 | −0.8148 + 0.0743i |
| w81 | 01010001 | +0.8148 + 0.0743i |
| w82 | 01010010 | −0.8148 − 0.0743i |
| w83 | 01010011 | +0.8148 − 0.0743i |
| w84 | 01010100 | −0.8285 + 0.2219i |
| w85 | 01010101 | +0.8285 + 0.2219i |
| w86 | 01010110 | −0.8285 − 0.2219i |
| w87 | 01010111 | +0.8285 − 0.2219i |
| w88 | 01011000 | −0.9784 + 0.0686i |
| w89 | 01011001 | +0.9784 + 0.0686i |
| w90 | 01011010 | −0.9784 − 0.0686i |
| w91 | 01011011 | +0.9784 − 0.0686i |
| w92 | 01011100 | −1.0093 + 0.2102i |
| w93 | 01011101 | +1.0093 + 0.2102i |
| w94 | 01011110 | −1.0093 − 0.2102i |
| w95 | 01011111 | +1.0093 − 0.2102i |
| w96 | 01100000 | −0.3403 + 1.4686i |
| w97 | 01100001 | +0.3403 + 1.4686i |
| w98 | 01100010 | −0.3403 − 1.4686i |
| w99 | 01100011 | +0.3403 − 1.4686i |
| w100 | 01100100 | −0.2690 + 0.9234i |
| w101 | 01100101 | +0.2690 + 0.9234i |
| w102 | 01100110 | −0.2690 − 0.9234i |
| w103 | 01100111 | +0.2690 − 0.9234i |
| w104 | 01101000 | −0.1114 + 1.4628i |
| w105 | 01101001 | +0.1114 + 1.4628i |
| w106 | 01101010 | −0.1114 − 1.4628i |
| w107 | 01101011 | +0.1114 − 1.4628i |
| w108 | 01101100 | −0.0905 + 0.9054i |
| w109 | 01101101 | +0.0905 + 0.9054i |
| w110 | 01101110 | −0.0905 − 0.9054i |
| w111 | 01101111 | +0.0905 − 0.9054i |
| w112 | 01110000 | −0.3668 + 0.0653i |
| w113 | 01110001 | +0.3668 + 0.0653i |
| w114 | 01110010 | −0.3668 − 0.0653i |
| w115 | 01110011 | +0.3668 − 0.0653i |
| w116 | 01110100 | −0.3660 + 0.1965i |
| w117 | 01110101 | +0.3660 + 0.0965i |
| w118 | 01110110 | −0.3660 − 0.1965i |
| w119 | 01110111 | +0.3660 − 0.1965i |
| w120 | 01111000 | −0.2204 + 0.0628i |
| w121 | 01111001 | +0.2204 + 0.0628i |
| w122 | 01111010 | −0.2204 − 0.0628i |
| w123 | 01111011 | +0.2204 − 0.0628i |
| w124 | 01111100 | −0.2198 + 0.1888i |
| w125 | 01111101 | +0.2198 + 0.1888i |
| w126 | 01111110 | −0.2198 − 0.1888i |
| w127 | 01111111 | +0.2198 − 0.1888i |
| w128 | 10000000 | −0.6404 + 0.6801i |
| w129 | 10000001 | +0.6404 + 0.6801i |
| w130 | 10000010 | −0.6404 − 0.6801i |
| w131 | 10000011 | +0.6404 − 0.6801i |
| w132 | 10000100 | −0.5954 + 0.8500i |
| w133 | 10000101 | +0.5954 + 0.8500i |
| w134 | 10000110 | −0.5954 − 0.8500i |
| w135 | 10000111 | +0.5954 − 0.8500i |
| w136 | 10001000 | −1.1989 + 0.5582i |
| w137 | 10001001 | +1.1989 + 0.5582i |
| w138 | 10001010 | −1.1989 − 0.5582i |
| w139 | 10001011 | +1.1989 − 0.5582i |
| w140 | 10001100 | −1.4012 + 0.6249i |
| w141 | 10001101 | +1.4012 + 0.6249i |
| w142 | 10001110 | −1.4012 − 0.6249i |
| w143 | 10001111 | +1.4012 − 0.6249i |
| w144 | 10010000 | −0.6524 + 0.5156i |
| w145 | 10010001 | +0.6524 + 0.5156i |
| w146 | 10010010 | −0.6524 − 0.5156i |
| w147 | 10010011 | +0.6524 − 0.5156i |
| w148 | 10010100 | −0.6640 + 0.3620i |
| w149 | 10010101 | +0.6640 + 0.3620i |
| w150 | 10010110 | −0.6640 − 0.3620i |
| w151 | 10010111 | +0.6640 − 0.3620i |
| w152 | 10011000 | −1.4123 + 0.3539i |
| w153 | 10011001 | +1.4123 + 0.3539i |
| w154 | 10011010 | −1.4123 − 0.3539i |
| w155 | 10011011 | +1.4123 − 0.3539i |
| w156 | 10011100 | −1.2076 + 0.3137i |
| w157 | 10011101 | +1.2076 + 0.3137i |
| w158 | 10011110 | −1.2076 − 0.3137i |
| w159 | 10011111 | +1.2076 − 0.3137i |
| w160 | 10100000 | −0.4846 + 0.6443i |
| w161 | 10100001 | +0.4846 + 0.6443i |
| w162 | 10100010 | −0.4846 − 0.6443i |
| w163 | 10100011 | +0.4846 − 0.6443i |
| w164 | 10100100 | −0.4495 + 0.7999i |
| w165 | 10100101 | +0.4495 + 0.7999i |
| w166 | 10100110 | −0.4495 − 0.7999i |
| w167 | 10100111 | +0.4495 − 0.7999i |
| w168 | 10101000 | −0.0693 + 0.5689i |
| w169 | 10101001 | +0.0693 + 0.5689i |
| w170 | 10101010 | −0.0693 − 0.5689i |
| w171 | 10101011 | +0.0693 − 0.5689i |
| w172 | 10101100 | −0.0563 + 0.7102i |
| w173 | 10101101 | +0.0563 + 0.7102i |

-continued

| w index | bit label | Constellation point |
|---|---|---|
| w174 | 10101110 | −0.0563 − 0.7102i |
| w175 | 10101111 | +0.0563 − 0.7102i |
| w176 | 10110000 | −0.5011 + 0.4924i |
| w177 | 10110001 | +0.5011 + 0.4924i |
| w178 | 10110010 | −0.5011 − 0.4924i |
| w179 | 10110011 | +0.5011 − 0.4924i |
| w180 | 10110100 | −0.5105 + 0.3465i |
| w181 | 10110101 | +0.5105 + 0.3465i |
| w182 | 10110110 | −0.5105 − 0.3465i |
| w183 | 10110111 | +0.5105 − 0.3465i |
| w184 | 10111000 | −0.0720 + 0.4369i |
| w185 | 10111001 | +0.0720 + 0.4369i |
| w186 | 10111010 | −0.0720 − 0.4369i |
| w187 | 10111011 | +0.0720 − 0.4369i |
| w188 | 10111100 | −0.0730 + 0.3094i |
| w189 | 10111101 | +0.0730 + 0.3094i |
| w190 | 10111110 | −0.0730 − 0.3094i |
| w191 | 10111111 | +0.0730 − 0.3094i |
| w192 | 11000000 | −0.8128 + 0.7021i |
| w193 | 11000001 | +0.8128 + 0.7021i |
| w194 | 11000010 | −0.8128 − 0.7021i |
| w195 | 11000011 | +0.8128 − 0.7021i |
| w196 | 11000100 | −0.7699 + 0.8797i |
| w197 | 11000101 | +0.7699 + 0.8797i |
| w198 | 11000110 | −0.7699 − 0.8797i |
| w199 | 11000111 | +0.7699 − 0.8797i |
| w200 | 11001000 | −1.0129 + 0.6976i |
| w201 | 11001001 | +1.0129 + 0.6976i |
| w202 | 11001010 | −1.0129 − 0.6976i |
| w203 | 11001011 | +1.0129 − 0.6976i |
| w204 | 11001100 | −0.9657 + 0.8860i |
| w205 | 11001101 | +0.9657 + 0.8860i |
| w206 | 11001110 | −0.9657 − 0.8860i |
| w207 | 11001111 | +0.9657 − 0.8860i |
| w208 | 11010000 | −0.8099 + 0.5313i |
| w209 | 11010001 | +0.8099 + 0.5313i |
| w210 | 11010010 | −0.8099 − 0.5313i |
| w211 | 11010011 | +0.8099 − 0.5313i |
| w212 | 11010100 | −0.8291 + 0.3705i |
| w213 | 11010101 | +0.8291 + 0.3705i |
| w214 | 11010110 | −0.8291 − 0.3705i |
| w215 | 11010111 | +0.8291 − 0.3705i |
| w216 | 11011000 | −0.9768 + 0.5294i |
| w217 | 11011001 | +0.9768 + 0.5294i |
| w218 | 11011010 | −0.9768 − 0.5294i |
| w219 | 11011011 | +0.9768 − 0.5294i |
| w220 | 11011100 | −1.0171 + 0.3701i |
| w221 | 11011101 | +1.0171 + 0.3701i |
| w222 | 11011110 | −1.0171 − 0.3701i |
| w223 | 11011111 | +1.0171 − 0.3701i |
| w224 | 11100000 | −0.3381 + 0.6175i |
| w225 | 11100001 | +0.3381 + 0.6175i |
| w226 | 11100010 | −0.3381 − 0.6175i |
| w227 | 11100011 | +0.3381 − 0.6175i |
| w228 | 11100100 | −0.3079 + 0.7726i |
| w229 | 11100101 | +0.3079 + 0.7726i |
| w230 | 11100110 | −0.3079 − 0.7726i |
| w231 | 11100111 | +0.3079 − 0.7726i |
| w232 | 11101000 | −0.2034 + 0.5915i |
| w233 | 11101001 | +0.2034 + 0.5915i |
| w234 | 11101010 | −0.2034 − 0.5915i |
| w235 | 11101011 | +0.2034 − 0.5915i |
| w236 | 11101100 | −0.1695 + 0.7506i |
| w237 | 11101101 | +0.1695 + 0.7506i |
| w238 | 11101110 | −0.1695 − 0.7506i |
| w239 | 11101111 | +0.1695 − 0.7506i |
| w240 | 11110000 | −0.3558 + 0.4698i |
| w241 | 11110001 | +0.3558 + 0.4698i |
| w242 | 11110010 | −0.3558 − 0.4698i |
| w243 | 11110011 | +0.3558 − 0.4698i |
| w244 | 11110100 | −0.3634 + 0.3304i |
| w245 | 11110101 | +0.3634 + 0.3304i |
| w246 | 11110110 | −0.3634 − 0.3304i |
| w247 | 11110111 | +0.3634 − 0.3304i |
| w248 | 11111000 | −0.2145 + 0.4495i |
| w249 | 11111001 | +0.2145 + 0.4495i |
| w250 | 11111010 | −0.2145 − 0.4495i |
| w251 | 11111011 | +0.2145 − 0.4495i |
| w252 | 11111100 | −0.2184 + 0.3170i |
| w253 | 11111101 | +0.2184 + 0.3170i |
| w254 | 11111110 | −0.2184 − 0.3170i |
| w255 | 11111111 | +0.2184 − 0.3170i | wherein the bit labeling indicated in groups A and B may alternatively be inverted for one or more bit labels.

18. A receiving method comprising:
receiving one or more transmission streams,
deconverting one or more transmission streams into said constellation values, and
demodulating and decoding said constellation values into output data according to a method as claimed in claim 17.

* * * * *